(12) United States Patent
Konno et al.

(10) Patent No.: US 8,384,770 B2
(45) Date of Patent: Feb. 26, 2013

(54) IMAGE DISPLAY SYSTEM, IMAGE DISPLAY APPARATUS, AND IMAGE DISPLAY METHOD

(75) Inventors: Hideki Konno, Kyoto (JP); Ryuji Umezu, Kyoto (JP); Kenichi Sugino, Kyoto (JP); Kouichi Kawamoto, Kyoto (JP); Kenta Kubo, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 90 days.

(21) Appl. No.: 13/006,039

(22) Filed: Jan. 13, 2011

(65) Prior Publication Data
US 2012/0113228 A1 May 10, 2012

(30) Foreign Application Priority Data

| | | |
|---|---|---|
| Jun. 2, 2010 | (JP) | 2010-127091 |
| Jun. 11, 2010 | (JP) | 2010-134450 |
| Jun. 11, 2010 | (JP) | 2010-134545 |
| Jun. 11, 2010 | (JP) | 2010-134575 |
| Jun. 14, 2010 | (JP) | 2010-135193 |
| Jun. 14, 2010 | (JP) | 2010-135507 |
| Sep. 27, 2010 | (JP) | 2010-215654 |
| Sep. 28, 2010 | (JP) | 2010-217700 |
| Dec. 29, 2010 | (JP) | 2010-294571 |

(51) Int. Cl.
*H04N 7/18* (2006.01)
(52) U.S. Cl. .......................... 348/51; 348/56
(58) Field of Classification Search .............. 348/42–60
See application file for complete search history.

(56) References Cited

U.S. PATENT DOCUMENTS

| | | | |
|---|---|---|---|
| 6,020,891 | A | 2/2000 | Rekimoto |
| 6,057,833 | A | 5/2000 | Heidmann et al. |
| 6,252,624 | B1 * | 6/2001 | Yuasa et al. ............ 348/56 |
| 6,325,287 | B1 | 12/2001 | Nakajima et al. |
| 6,342,900 | B1 | 1/2002 | Ejima et al. |

(Continued)

FOREIGN PATENT DOCUMENTS

| | | |
|---|---|---|
| EP | 1 720 131 | 11/2006 |
| EP | 2 157 545 | 2/2010 |

(Continued)

OTHER PUBLICATIONS

Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.

(Continued)

*Primary Examiner* — Andy Rao
(74) *Attorney, Agent, or Firm* — Nixon & Vanderhye P.C.

(57) ABSTRACT

A hand-held image display apparatus includes a touch panel, a stereoscopic display apparatus, a first imaging section, and a second imaging section. The hand-held image display apparatus detects a marker from a real world image shot by at least one of the first imaging section and the second imaging section, and determines the relative positions of a virtual object and a pair of virtual cameras with respect to each other in a virtual space, based on the result of the detection. Then, the hand-held image display apparatus superimposes virtual space images drawn based on the first virtual camera and the second virtual camera, onto the real world images shot by the first imaging section and the second imaging section, and displays images that are stereoscopically visible by naked eyes, on the stereoscopic display apparatus.

10 Claims, 96 Drawing Sheets

U.S. PATENT DOCUMENTS

| | | | |
|---|---|---|---|
| 6,474,819 | B2 | 11/2002 | Yoder et al. |
| 6,708,046 | B1 | 3/2004 | Takagi |
| 6,897,865 | B2 | 5/2005 | Higashiyama |
| 7,519,218 | B2 | 4/2009 | Takemoto et al. |
| 8,115,814 | B2 * | 2/2012 | Iwase et al. .................. 348/169 |
| 8,189,038 | B2 * | 5/2012 | DeCusatis et al. .............. 348/58 |
| 2001/0019946 | A1 | 9/2001 | Okuda |
| 2005/0239521 | A1 | 10/2005 | Harada et al. |
| 2005/0270368 | A1 | 12/2005 | Hashimoto |
| 2006/0038833 | A1 | 2/2006 | Mallinson et al. |
| 2006/0060463 | A1 | 3/2006 | Tokusashi |
| 2006/0171582 | A1 | 8/2006 | Eichhorn |
| 2007/0001003 | A1 | 1/2007 | Lee et al. |
| 2007/0273644 | A1 | 11/2007 | Natucci |
| 2008/0100620 | A1 | 5/2008 | Nagai et al. |
| 2009/0059497 | A1 | 3/2009 | Kuwahara et al. |
| 2009/0060490 | A1 | 3/2009 | Kuwahara et al. |
| 2009/0070476 | A1 | 3/2009 | Brackx et al. |
| 2009/0224999 | A1 | 9/2009 | Kuwahara et al. |
| 2009/0278764 | A1 | 11/2009 | Kuwahara et al. |
| 2009/0278974 | A1 | 11/2009 | Kuwahara et al. |
| 2009/0285484 | A1 | 11/2009 | Mallinson et al. |
| 2010/0316367 | A1 | 12/2010 | Kuwahara et al. |

FOREIGN PATENT DOCUMENTS

| | | |
|---|---|---|
| JP | 06-339155 | 12/1994 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-230586 | 8/2002 |
| JP | 2004-7214 | 1/2004 |
| JP | 2005-20559 | 1/2005 |
| JP | 2005-151162 | 6/2005 |
| JP | 2005-165776 | 6/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-271663 | 10/2006 |
| JP | 2007-12025 | 1/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 4260215 | 2/2009 |
| JP | 2009-089435 | 4/2009 |
| JP | 2009-205556 | 9/2009 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |

OTHER PUBLICATIONS

Report on Nintendo DS Lite Hardwire, Mar. 2, 2006, 5 pages, http://pc.watch.impress.co.jp/does/2006/0302/nintendo.htm.
U.S. Appl. No. 12/862,119, filed Aug. 24, 2010, Shinji Kitabara et al.
U.S. Appl. No. 12/946,248, filed Nov. 15, 2010, Yasuyuki Oyagi et al.
U.S. Appl. No. 13/030,499, filed Feb. 18, 2011, Yui Ehara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.
U.S. Appl. No. 12/862,119, filed Aug. 24, 2010, Shinji Kitahara et al.
U.S. Appl. No. 13/006,039, filed Jan. 13, 2011, Hideki Konno et al.
U.S. Appl. No. 13/243,622, filed Sep. 23, 2011, Yuichiro Ito et al.
Report on Nintendo DS Lite Hardware, Mar. 2, 2006, download from the internet, with a partial English translation, 13 pages.
Kato et al., "An Augmented Reality System and its Calibration based on Marker Tracking", Transactions of the Virtual Reality Society of Japan, vol. 4, No. 4, 1999, pp. 607-616.
Sep. 20, 2012 Office Action in U.S. Appl. No, 12/862,119, 21 pages.

\* cited by examiner

F I G. 1 1

| | |
|---|---|
| IMAGE DISPLAY PROGRAM | A70 |
| LATEST LEFT REAL WORLD IMAGE | A71L |
| LATEST RIGHT REAL WORLD IMAGE | A71R |
| DISPLAY LEFT REAL WORLD IMAGE | A72L |
| DISPLAY RIGHT REAL WORLD IMAGE | A72R |
| STEREOSCOPIC VIEW ZERO DISTANCE | A73 |
| VIRTUAL OBJECT INFORMATION | A74 |
| LEFT TRANSFORM MATRIX | A75L |
| RIGHT TRANSFORM MATRIX | A75R |
| LEFT VIEW MATRIX | A76L |
| RIGHT VIEW MATRIX | A76R |
| LEFT PROJECTION MATRIX | A77L |
| RIGHT PROJECTION MATRIX | A77R |
| DISPLAY MODE (SYNCHRONOUS DISPLAY/ASYNCHRONOUS DISPLAY) | A78 |
| MARKER RECOGNITION MODE (ONE-IMAGE RECOGNITION/BOTH-IMAGE RECOGNITION) | A79 |
| MAIN REAL WORLD IMAGE IDENTIFICATION INFORMATION (LEFT REAL WORLD IMAGE/RIGHT REAL WORLD IMAGE) | A80 |
| VARIABLES | A81 |

FIG. 12

| VARIABLES |
|---|
| ARActive(true/false) |
| EyeWidth |
| EyeDepth |
| EyeMeasure(true/false) |
| V0 (3-DIMENSIONAL VECTOR) |
| V1 (3-DIMENSIONAL VECTOR) |
| ew |
| ed |
| LogWidth[1]~[LogMax] |
| LogDepth[1]~[LogMax] |
| LogIndex |
| V (4-DIMENSIONAL VECTOR) |
| SyncCount |

ORIGIN OF WORLD
COORDINATE SYSTEM

F I G. 2 7
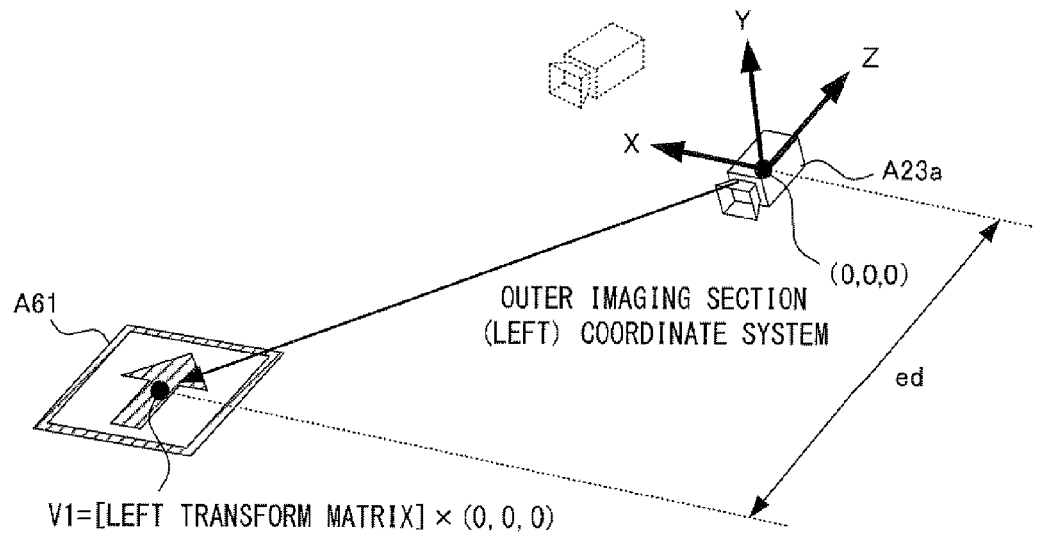
F I G. 2 8
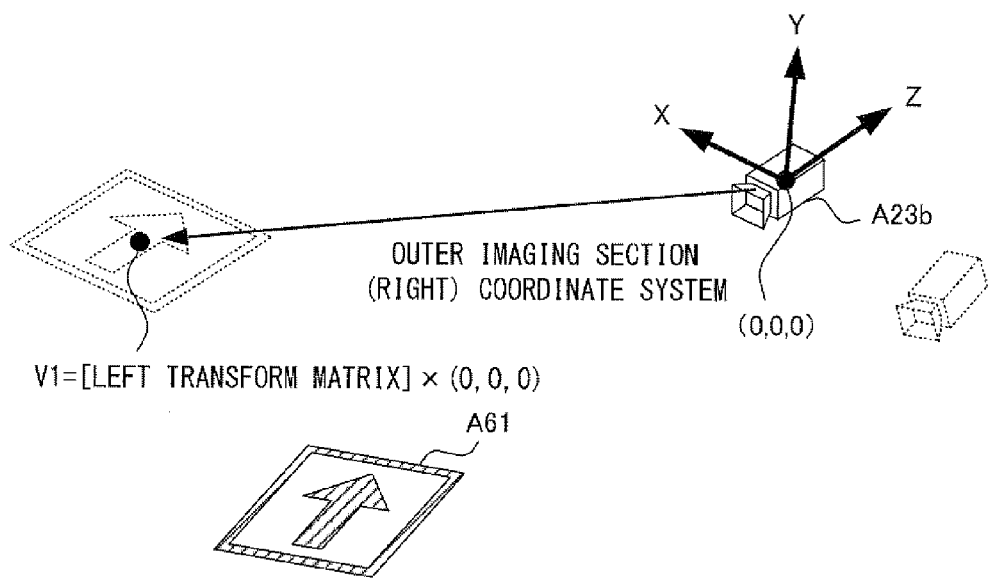

F I G. 3 2
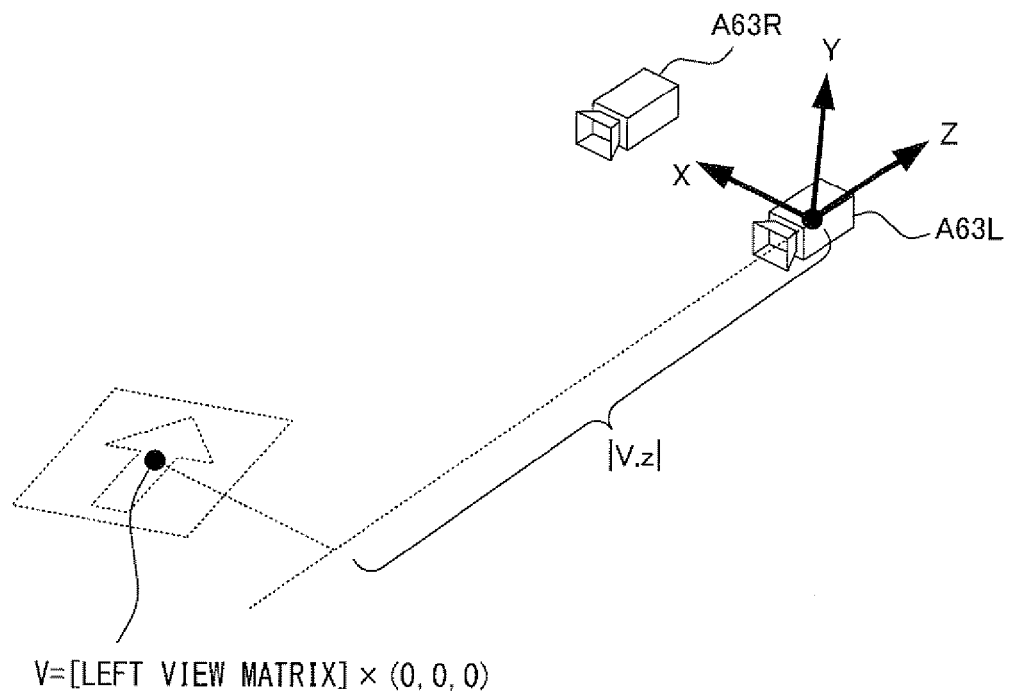

(THIRD POSITION)

(FIRST POSITION)

FIG. 70

| SOUND RECOGNITION RESULT | CHARACTER ACTION | ACTION BASIS |
|---|---|---|
| REGISTERED SOUND 1 (SIT DOWN) | SITTING DOWN ACTION | MARKER BASIS |
| REGISTERED SOUND 2 (HAND) | HANDING ACTION | MARKER BASIS |
| REGISTERED SOUND 3 (STAND UP) | STANDING UP ACTION | MARKER BASIS |
| REGISTERED SOUND 4 (NAME) | BARKING ACTION | MARKER BASIS |
| ⋮ | ⋮ | ⋮ |
| CLAPPING | ACTION OF FACING CAMERA ON FOUR LEGS | CAMERA BASIS |
| WHISTLE | ACTION OF HOWLING FACING AT CAMERA | CAMERA BASIS |
| BREATH | ACTION OF HATING BEING BLOWN (FRONT ONLY) | MARKER BASIS |
| ⋮ | ⋮ | ⋮ |

F I G. 7 8
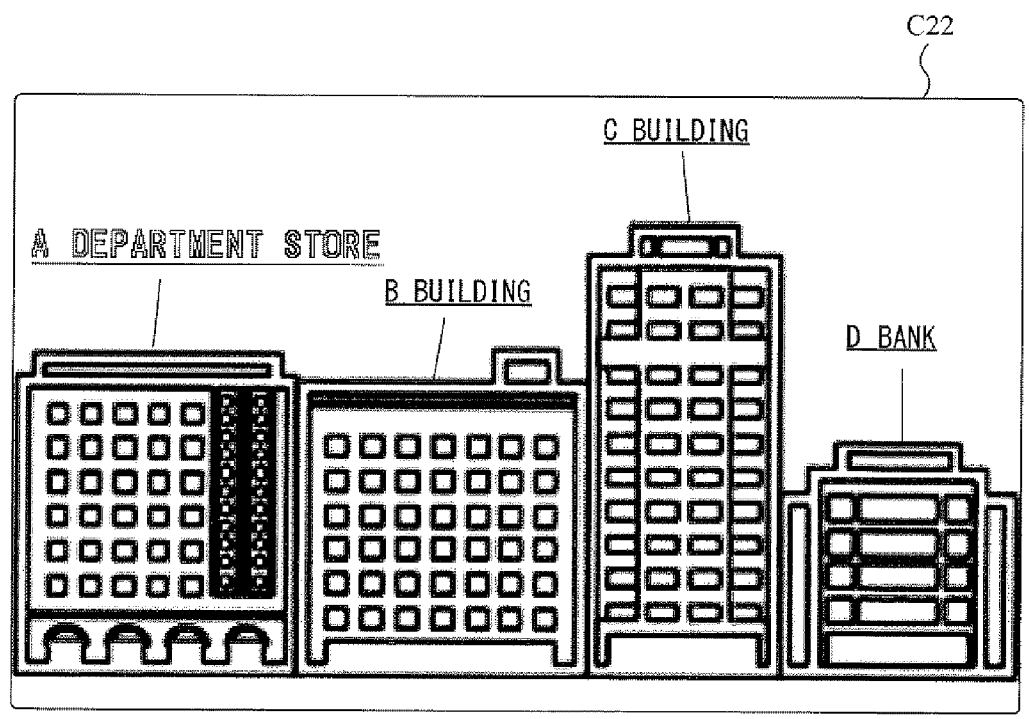

(a)

(b)

IMAGE DISPLAY SYSTEM, IMAGE DISPLAY APPARATUS, AND IMAGE DISPLAY METHOD

CROSS REFERENCE TO RELATED APPLICATION

The disclosure of Japanese Patent Application No. 2010-294571, filed on Dec. 29, 2010, is incorporated herein by reference.

BACKGROUND OF THE INVENTION

1. Field of the Invention

The present invention relates to an image display system, an image display apparatus, and an image display method, and more particularly, to an image display system, an image display apparatus, and an image display method for stereoscopically displaying a real world image onto which a 3-dimensional virtual object is superimposed, on a stereoscopic display section capable of providing an image that is stereoscopically visible.

2. Description of the Background Art

In recent years, development of an AR (Augmented Reality) technique has been advanced in which a virtual object is superimposed onto an image of a real world and the resultant image is displayed, whereby the virtual object appears to be present in the real world.

For example, a stereoscopic display apparatus disclosed in Japanese Laid-Open Patent Publication No. 2008-146109 calculates the relative positions and relative orientations of a camera for a right eye and a camera for a left eye with respect to a marker placed in the real world, from respective images shot by the camera for a right eye and the camera for a left eye, which are attached to a head mounted display, and then, based on the result of the calculation, generates an image of a virtual object for a right eye and an image for the virtual object for a left eye. Then, the stereoscopic display apparatus superimposes the image of the virtual object for a right eye and the image for the virtual object for a left eye onto the images shot by the camera for a right eye and the camera for a left eye, respectively, and displays the resultant composite images on an LCD (liquid crystal display) for a right eye and an LCD for a left eye, respectively.

However, the stereoscopic display apparatus disclosed in Japanese Laid-Open Patent Publication No. 2008-146109 forces a user to wear the head mounted display. Therefore, the user cannot easily and comfortably enjoy applications using the AR technique.

SUMMARY OF THE INVENTION

Therefore, an object of the present invention is to provide an image display system, an image display apparatus, and an image display method that allow the user to more easily and comfortably enjoy applications using the AR technique.

The present invention has the following features to solve the problems mentioned above.

An aspect of an image display system of the present invention is an image display system for superimposing a virtual space image onto a real world image and displaying the resultant composite image. The image display system comprises: an image display apparatus that is of a hand-held type; and a marker to be placed in a real world.

The image display apparatus comprises: an upper housing and a lower housing; a planar display section; a touch panel; a stereoscopic display section; a first imaging section and a second imaging section; detection means; determination means; first virtual space image generation means; second virtual space image generation means; and display control means.

The upper housing and the lower housing are connected in a foldable manner via connection sections provided at the respective longitudinal sides of the upper housing and the lower housing, and have rectangular shapes that are longer in the lateral direction than in the height direction. The planar display section is provided on an inner side surface of the lower housing, which is a main surface of the lower housing that faces the upper housing when the upper housing and the lower housing are folded, the planar display section being adjacent to the connection section of the lower housing. The touch panel is provided on a screen of the planar display section. The stereoscopic display section is capable of providing an image that is stereoscopically visible by naked eyes; has a screen whose area is larger than the area of the screen of the planar display section; does not have a touch panel on the screen thereof; is provided on an inner side surface of the upper housing, which is a main surface of the upper housing that faces the lower housing when the upper housing and the lower housing are folded; and is adjacent to the connection section of the upper housing. The first imaging section and the second imaging section are provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing. The detection means automatically detects a position and an orientation of the marker from a real world image shot by at least one of the first imaging section and the second imaging section. The determination means determines and updates positions and orientations of a pair of virtual cameras including a first virtual camera and a second virtual camera in a virtual space, based on the position and the orientation of the marker in the real world image detected by the marker detection means, without using coordinates in the real world that indicate the position of the marker. The first virtual space image generation means generates a first virtual space image by drawing the virtual space, based on the first virtual camera. The second virtual space image generation means generates a second virtual space image by drawing the virtual space, based on the second virtual camera. The display control means displays an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section.

One or more operation buttons are provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand. The image display apparatus further comprises a switch for switching display between stereoscopic display and planar display, the switch being provided at end portions of the inner side surface and a right side surface of the upper housing. The display control means switches display between the stereoscopic display in which an image is displayed in a stereoscopically visible manner, and the planar display in which an image is displayed in a planar manner, in accordance with a state of the switch.

In another aspect of the image display system of the present invention, a third imaging section may be provided on the inner side surface of the upper housing and on a line vertically dividing in half the screen of the stereoscopic display section.

In another aspect of the image display system of the present invention, a pair of speakers may be provided in the upper housing, and a pair of speaker holes corresponding to the pair of speakers may be provided on the inner side surface of the upper housing such that the screen of the stereoscopic display section is sandwiched between the pair of speaker holes in the left-right direction.

In another aspect of the image display system of the present invention, operation buttons may be provided at a right end portion and a left end portion of one, of two side surfaces of the lower housing that are parallel to a long-side direction of the lower housing, that is connected to the upper housing.

In another aspect of the image display system of the present invention, the image display apparatus may be a portable game apparatus.

An aspect of the image display apparatus of the present invention is an image display apparatus, of a hand-held type, that superimposes a virtual space image onto a real world image and displays the resultant composite image, the image display apparatus comprising: an upper housing and a lower housing; a planar display section; a touch panel; a stereoscopic display section; a first imaging section and a second imaging section; detection means; determination means; first virtual space image generation means; second virtual space image generation means; and display control means.

The upper housing and the lower housing are connected in a foldable manner via connection sections provided at the respective longitudinal sides of the upper housing and the lower housing, and have rectangular shapes that are longer in the lateral direction than in the height direction. The planar display section is provided on an inner side surface of the lower housing, which is a main surface of the lower housing that faces the upper housing when the upper housing and the lower housing are folded, the planar display section being adjacent to the connection section of the lower housing. The touch panel is provided on a screen of the planar display section. The stereoscopic display section is capable of providing an image that is stereoscopically visible by naked eyes; has a screen whose area is larger than the area of the screen of the planar display section; does not have a touch panel on the screen thereof; is provided on an inner side surface of the upper housing, which is a main surface of the upper housing that faces the lower housing when the upper housing and the lower housing are folded; and is adjacent to the connection section of the upper housing. The first imaging section and the second imaging section are provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing. The detection means automatically detects a position and an orientation of the marker from a real world image shot by at least one of the first imaging section and the second imaging section. The determination means determines and updates positions and orientations of a pair of virtual cameras including a first virtual camera and a second virtual camera in a virtual space, based on the position and the orientation of the marker in the real world image detected by the marker detection means, without using coordinates in the real world that indicate the position of the marker. The first virtual space image generation means generates a first virtual space image by drawing the virtual space, based on the first virtual camera. The second virtual space image generation means generates a second virtual space image by drawing the virtual space, based on the second virtual camera. The display control means displays an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section.

One or more operation buttons are provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand. The image display apparatus further comprises a switch for switching display between stereoscopic display and planar display, the switch being provided at end portions of the inner side surface and a right side surface of the upper housing. The display control means switches display between the stereoscopic display in which an image is displayed in a stereoscopically visible manner, and the planar display in which an image is displayed in a planar manner, in accordance with a state of the switch.

An aspect of the image display apparatus of the present invention is an image display method for superimposing a virtual space image onto a real world image and displaying the resultant composite image, in an image display system comprising: an image display apparatus that is of a hand-held type; and a marker to be placed in a real world.

The image display apparatus comprises: an upper housing and a lower housing; a planar display section; a touch panel; a stereoscopic display section; a first imaging section and a second imaging section; one or more operation buttons; and a switch.

The upper housing and the lower housing are connected in a foldable manner via connection sections provided at the respective longitudinal sides of the upper housing and the lower housing, and have rectangular shapes that are longer in the lateral direction than in the height direction. The planar display section is provided on an inner side surface of the lower housing, which is a main surface of the lower housing that faces the upper housing when the upper housing and the lower housing are folded, the planar display section being adjacent to the connection section of the lower housing. The touch panel is provided on a screen of the planar display section. The stereoscopic display section is capable of providing an image that is stereoscopically visible by naked eyes; has a screen whose area is larger than the area of the screen of the planar display section; does not have a touch panel on the screen thereof; is provided on an inner side surface of the upper housing, which is a main surface of the upper housing that faces the lower housing when the upper housing and the lower housing are folded; and is adjacent to the connection section of the upper housing. The first imaging section and the second imaging section are provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing. The one or more operation buttons are provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand. The switch switches display between stereoscopic display and planar display, the switch being provided at end portions of the inner side surface and a right side surface of the upper housing.

The image display method comprises: a step of detection means of the image display apparatus detecting a position and an orientation of the marker from a real world image shot by at least one of the first imaging section and the second imaging section; a step of determination means of the image display apparatus determining and updating positions and orientations of a pair of virtual cameras including a first virtual camera and a second virtual camera in a virtual space, based on the position and the orientation of the marker in the real world image detected by the marker detection means, without using coordinates in the real world that indicate the position of the marker; a step of first virtual space image generation means of the image display apparatus generating a first virtual space image by drawing the virtual space, based on the first virtual camera; a step of second virtual space image generation means of the image display apparatus generating a second virtual space image by drawing the virtual space, based on the second virtual camera; a step of display control means of the image display apparatus displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section; and a step of the display control means switching display between the stereoscopic display in which an image is displayed in a stereoscopically visible manner, and the planar display in which an image is displayed in a planar manner, in accordance with a state of the switch.

The present invention allows the user to easily and comfortably enjoy applications using the AR technique.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows a memory map of a main memory A32 of the game apparatus A10;
FIG. 12 shows an example of variables stored in the main memory A32;
FIG. 27 shows a method of calculating coordinates of a right virtual camera A63R represented in a left virtual camera coordinate system;
FIG. 28 shows ew and ed;
FIG. 32 shows $|V \cdot z|$;

FIG. 70 shows an example of sound-action correspondence table data Di in FIG. 69;

FIG. 78 shows an example of letter information being superimposed as additional information on a shot image;

FIG. 90 shows a position relationship between the marker D61 and an outer imaging section (left) D23a;

DESCRIPTION OF THE PREFERRED EMBODIMENTS (Structure of Game Apparatus)

Figure 1:
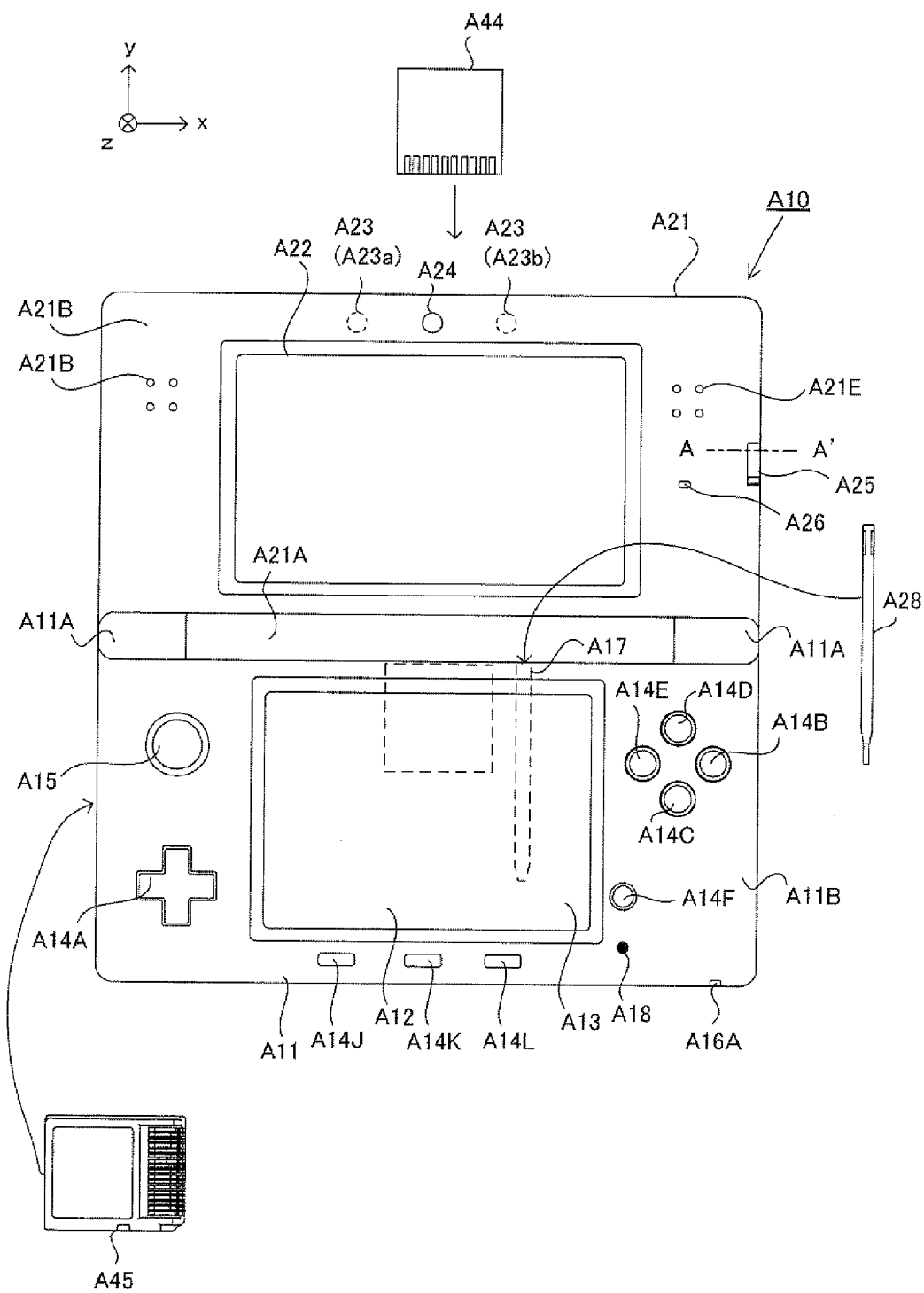
FIG. 1 is a front view of a game apparatus A10 in its opened state.
Figure 2:
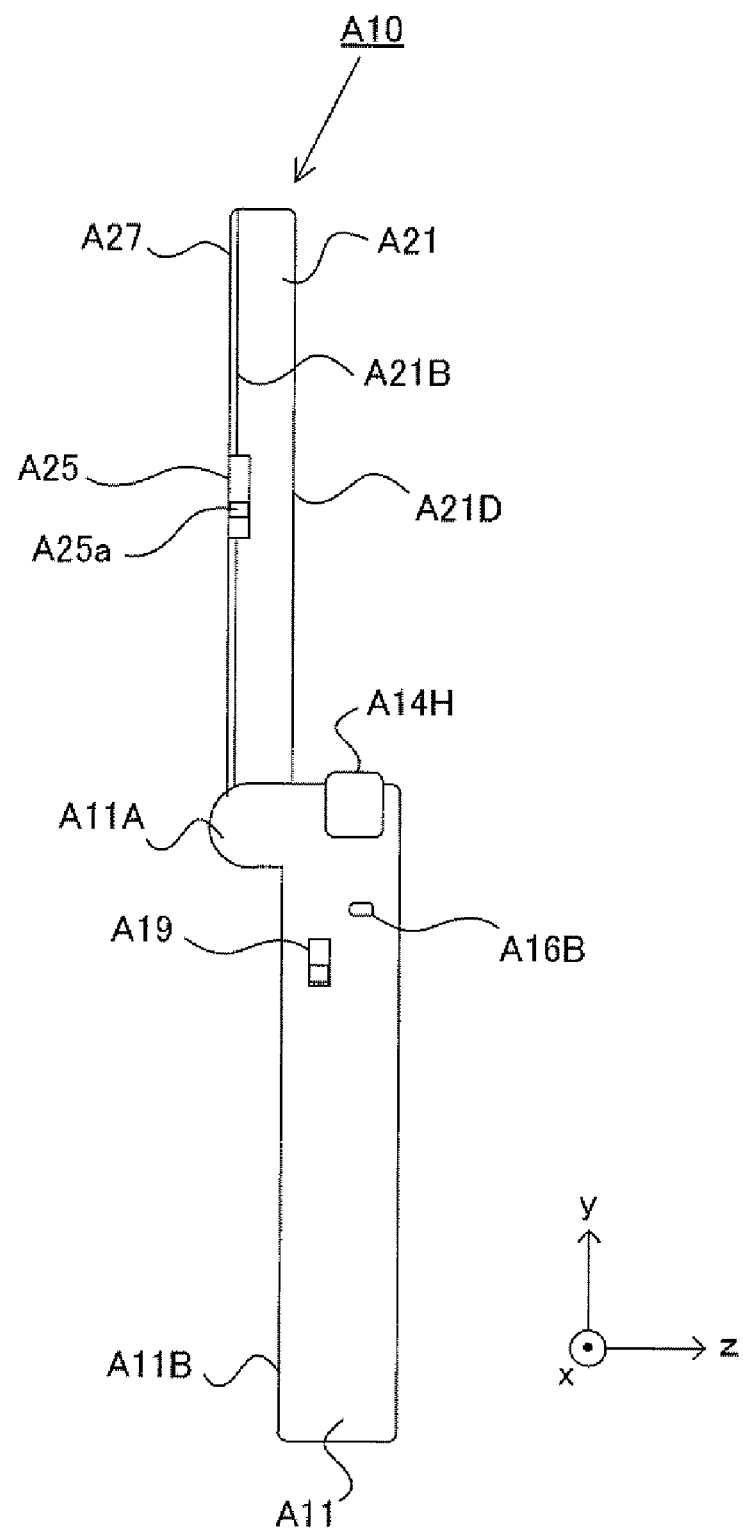
FIG. 2 is a side view of the game apparatus A10 in its opened state.
Figure 3:
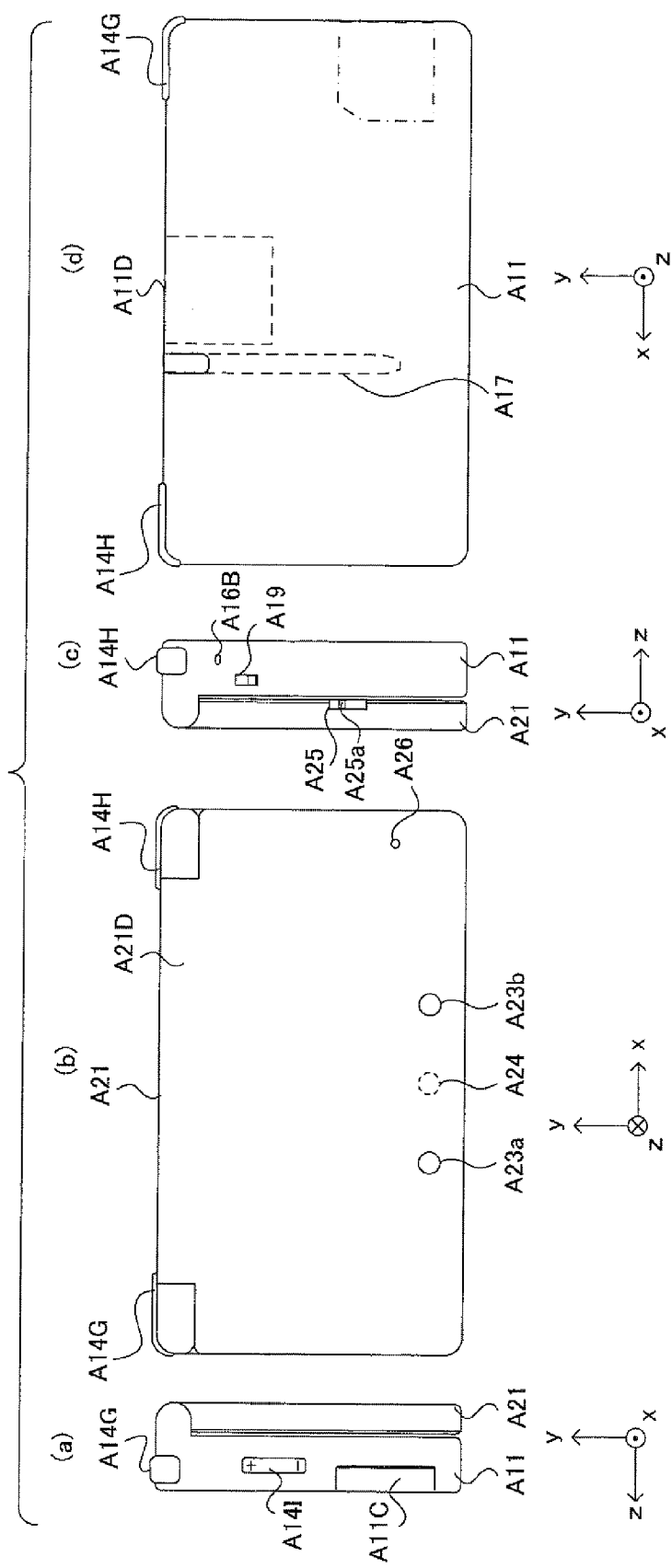
FIG. 3 shows a left side view, a front view, a right side view, and a rear view of the game apparatus A10 in its closed state.

Hereinafter, a game apparatus according to one embodiment of the present invention will be described. FIG. 1 to FIG. 3 are each a plan view of an outer appearance of a game apparatus A10. The game apparatus A10 is a hand-held game apparatus, and is configured to be foldable as shown in FIG. 1 to FIG. 3. FIG. 1 and FIG. 2 show the game apparatus A10 in an opened state, and FIG. 3 shows the game apparatus A10 in a closed state. FIG. 1 is a front view of the game apparatus A10 in the opened state, and FIG. 2 is a right side view of the game apparatus A10 in the opened state. The game apparatus A10 is able to shoot an image by means of an imaging section, display the shot image on a screen, and store data of the shot image. The game apparatus A10 can execute a game program which is stored in an exchangeable memory card or a game program which is received from a server or another game apparatus, and can display, on the screen, an image generated by computer graphics processing, such as an image shot by a virtual camera set in a virtual space, for example.

Initially, an external structure of the game apparatus A10 will be described with reference to FIG. 1 to FIG. 3. The game apparatus A10 includes a lower housing A11 and an upper housing A21 as shown in FIG. 1 to FIG. 3. The lower housing A11 and the upper housing A21 are connected to each other so as to be openable and closable (foldable). In the present embodiment, the lower housing A11 and the upper housing A21 are each formed in a horizontally long plate-like rectangular shape, and are connected to each other at long side portions thereof so as to be pivotable with respect to each other.

As shown in FIG. 1 and FIG. 2, projections A11A each of which projects in a direction orthogonal to an inner side surface (main surface) A11B of the lower housing A11 are provided at the upper long side portion of the lower housing A11, whereas a projection A21A which projects from the lower side surface of the upper housing A21 in a direction orthogonal to the lower side surface of the upper housing A21 is provided at the lower long side portion of the upper housing A21. Since the projections A11A of the lower housing A11 and the projection A21A of the upper housing A21 are connected to each other, the lower housing A11 and the upper housing A21 are foldably connected to each other.

(Description of Lower Housing)

Initially, a structure of the lower housing A11 will be described. As shown in FIG. 1 to FIG. 3, in the lower housing A11, a lower LCD (Liquid Crystal Display) A12, a touch panel A13, operation buttons A14A to A14L (FIG. 1, FIG. 3), an analog stick A15, an LED A16A and an LED A16B, an insertion opening A17, and a microphone hole A18 are provided. Hereinafter, these components will be described in detail.

As shown in FIG. 1, the lower LCD A12 is accommodated in the lower housing A11. The lower LCD A12 has a horizontally long shape, and is located such that a long side direction thereof corresponds to a long side direction of the lower housing A11. The lower LCD A12 is positioned at the center of the lower housing A11. The lower LCD A12 is provided on the inner side surface (main surface) of the lower housing A11, and a screen of the lower LCD A12 is exposed at an opening of the lower housing A11. When the game apparatus A10 is not used, the game apparatus A10 is in the closed state, thereby preventing the screen of the lower LCD A12 from becoming unclean and damaged. The number of pixels of the lower LCD A12 may be, for example, 256 dots×192 dots (width×height). The lower LCD A12 is a display device for displaying an image in a planar manner (not in a stereoscopically visible manner), which is different from the upper LCD A22 as described below. Although an LCD is used as a display device in the present embodiment, any other display device such as a display device using an EL (Electro Luminescence), or the like may be used. In addition, a display device having any resolution may be used as the lower LCD A12.

As shown in FIG. 1, the game apparatus A10 includes the touch panel A13 as an input device. The touch panel A13 is mounted on the screen of the lower LCD A12. In the present embodiment, the touch panel A13 may be, but is not limited to, a resistive film type touch panel. A touch panel of any type such as electrostatic capacitance type may be used. In the present embodiment, the touch panel A13 has the same resolution (detection accuracy) as that of the lower LCD A12. However, the resolution of the touch panel A13 and the resolution of the lower LCD A12 may not necessarily be the same. Further, the insertion opening A17 (indicated by dashed line in FIG. 1 and FIG. 3(d)) is provided on the upper side surface of the lower housing A11. The insertion opening A17 is used for accommodating a touch pen A28 which is used for performing an operation on the touch panel A13. Although an input on the touch panel A13 is usually made by using the touch pen A28, a finger of a user may be used for making an input on the touch panel A13, besides the touch pen A28.

The operation buttons A14A to A14L are each an input device for making a predetermined input. As shown in FIG. 1, among operation buttons A14A to A14L, a cross button A14A (a direction input button A14A), a button A14B, a button A14C, a button A14D, a button A14E, a power button A14F, a selection button A14J, a HOME button A14K, and a start button A14L are provided on the inner side surface (main surface) of the lower housing A11. The cross button A14A is cross-shaped, and includes buttons for indicating an upward, a downward, a leftward, or a rightward direction. The button A14B, button A14C, button A14D, and button A14E are positioned so as to form a cross shape. The buttons A14A to A14E, the selection button A14J, the HOME button A14K, and the start button A14L are assigned functions, respectively, in accordance with a program executed by the game apparatus A10, as necessary. For example, the cross button A14A is used for selection operation and the like, and the operation buttons A14B to A14E are used for, for example, determination operation and cancellation operation. The power button A14F is used for powering the game apparatus A10 on/off.

The analog stick A15 is a device for indicating a direction, and is provided to the left of the lower LCD A12 in an upper portion of the inner side surface of the lower housing A11. As shown in FIG. 1, the cross button A14A is provided to the left of the lower LCD A12 in the lower portion of the lower housing A11. That is, the analog stick A15 is provided above the cross button A14A. The analog stick A15 and the cross button A14A are positioned so as to be operated by a thumb of a left hand with which the lower housing is held. Further, the analog stick A15 is provided in the upper area, and thus the analog stick A15 is positioned such that a thumb of a left hand with which the lower housing A11 is held is naturally positioned on the position of the analog stick A15, and the cross button A14A is positioned such that the thumb of the left hand is positioned on the position of the cross button A14A when the thumb of the left hand is slightly moved downward from the analog stick A15. The analog stick A15 has a top, corresponding to a key, which slides parallel to the inner side surface of the lower housing A11. The analog stick A15 acts in accordance with a program executed by the game apparatus A10. For example, when a game in which a predetermined object appears in a 3-dimensional virtual space is executed by the game apparatus A10, the analog stick A15 acts as an input device for moving the predetermined object in the 3-dimensional virtual space. In this case, the predetermined object is moved in a direction in which the top corresponding to the key of the analog stick A15 slides. As the analog stick A15, a component which enables an analog input by being tilted by a predetermined amount, in any direction, such as the upward, the downward, the rightward, the leftward, or the diagonal direction, may be used.

Four buttons, that is, the button A1413, the button A14C, the button A14D, and the button A14E, which are positioned so as to form a cross shape, are positioned such that a thumb of a right hand with which the lower housing A11 is held is naturally positioned on the positions of the four buttons. Further, the four buttons and the analog stick A15 sandwich the lower LCD A12, so as to be bilaterally symmetrical in position with respect to each other. Thus, depending on a game program, for example, a left-handed person can make a direction instruction input by using these four buttons.

Further, the microphone hole A18 is provided on the inner side surface of the lower housing A11. Under the microphone hole A18, a microphone (see FIG. 7) is provided as a sound input device described below, and the microphone detects for a sound from the outside of the game apparatus A10.

FIG. 3(a) is a left side view of the game apparatus A10 in the closed state. FIG. 3(b) is a front view of the game apparatus A10 in the closed state. FIG. 3(c) is a right side view of the game apparatus A10 in the closed state. FIG. 3(d) is a rear view of the game apparatus A10 in the closed state. As shown in FIG. 3(b) and FIG. 3(d), an L button A14G and an R button A14H are provided on the upper side surface of the lower housing A11 The L button A14G is positioned on the left end portion of the upper side surface of the lower housing A11 and the R button A14H is positioned on the right end portion of the upper side surface of the lower housing A11. The L button A14G and the R button A14H can function as shutter buttons (imaging instruction buttons) of the imaging section, for example. Further, as shown in FIG. 3(*a*), a sound volume button A14I is provided on the left side surface of the lower housing A11. The sound volume button A14I is used for adjusting a sound volume of a speaker of the game apparatus A10.

As shown in FIG. 3(*a*), a cover section A11C is provided on the left side surface of the lower housing A11 so as to be openable and closable. Inside the cover section A11C, a connector (not shown) is provided for electrically connecting between the game apparatus A10 and an external data storage memory A45. The external data storage memory A45 is detachably connected to the connector. The external data storage memory A45 is used for, for example, recording (storing) data of an image shot by the game apparatus A10. The connector and the cover section A11C may be provided on the right side surface of the lower housing A11.

Further, as shown in FIG. 3(*d*), an insertion opening AHD through which an external memory A44 having a game program stored therein is inserted is provided on the upper side surface of the lower housing A11. A connector (not shown) for electrically connecting between the game apparatus A10 and the external memory A44 in a detachable manner is provided inside the insertion opening A11D. A predetermined game program is executed by connecting the external memory A44 to the game apparatus A10. The connector and the insertion opening A11D may be provided on another side surface (for example, the right side surface) of the lower housing A11.

Further, as shown in FIG. 1 and FIG. 3(*c*), a first LED A16A for notifying a user of an ON/OFF state of a power supply of the game apparatus A10 is provided on the lower side surface of the lower housing A11, and a second LED A16B for notifying a user of an establishment state of a wireless communication of the game apparatus A10 is provided on the right side surface of the lower housing A11. The game apparatus A10 can make wireless communication with other devices, and the second LED A16B is lit up when the wireless communication is established. The game apparatus A10 has a function of connecting to a wireless LAN in a method based on, for example, IEEE 802.11.b/g standard. A wireless switch A19 for enabling/disabling the function of the wireless communication is provided on the right side surface of the lower housing A11 (see FIG. 3(*c*)).

A rechargeable battery (not shown) acting as a power supply for the game apparatus A10 is accommodated in the lower housing A11, and the battery can be charged through a terminal provided on a side surface (for example, the upper side surface) of the lower housing A11.

(Description of Upper Housing)

Next, a structure of the upper housing A21 will be described. As shown in FIG. 1 to FIG. 3, in the upper housing A21, an upper LCD (Liquid Crystal Display) A22, an outer imaging section A23 (an outer imaging section (left) A23*a* and an outer imaging section (right) A23*b*), an inner imaging section A24, a 3D adjustment switch A25, and a 3D indicator A26 are provided. Hereinafter, theses components will be described in detail.

As shown in FIG. 1, the upper LCD A22 is accommodated in the upper housing A21. The upper LCD A22 has a horizontally long shape, and is located such that a long side direction thereof corresponds to a long side direction of the upper housing A21. The upper LCD A22 is positioned at the center of the upper housing A21. The area of a screen of the upper LCD A22 is set so as to be greater than the area of the screen of the lower LCD A12. Further, the screen of the upper LCD A22 is horizontally elongated as compared to the screen of the lower LCD A12. Specifically, a rate of the horizontal width in the aspect ratio of the screen of the upper LCD A22 is set so as to be greater than a rate of the horizontal width in the aspect ratio of the screen of the lower LCD A12.

The screen of the upper LCD A22 is provided on the inner side surface (main surface) A21B of the upper housing A21, and the screen of the upper LCD A22 is exposed at an opening of the upper housing A21. Further, as shown in FIG. 2, the inner side surface of the upper housing A21 is covered with a transparent screen cover A27. The screen cover A27 protects the screen of the upper LCD A22, and integrates the upper LCD A22 and the inner side surface of the upper housing A21 with each other, thereby achieving unity. The number of pixels of the upper LCD A22 may be, for example, 640 dots×200 dots (the horizontal line×the vertical line). Although, in the present embodiment, the upper LCD A22 is an LCD, a display device using an EL (Electro Luminescence), or the like may be used. In addition, a display device having any resolution may be used as the upper LCD A22.

The upper LCD A22 is a display device capable of displaying a stereoscopically visible image. Further, in the present embodiment, an image for a left eye and an image for a right eye are displayed by using substantially the same display area. Specifically, the upper LCD A22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD A22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD A22 of a parallax barrier type is used. The upper LCD A22 displays, by using the image for a right eye and the image for a left eye, an image (a stereoscopic image) which is stereoscopically visible with naked eyes. That is, the upper LCD A22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD A22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD A22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch A25 described later.

Two imaging sections (A23*a* and A23*b*) provided on the outer side surface (the back surface reverse of the main surface on which the upper LCD A22 is provided) A21D of the upper housing A21 are generically referred to as the outer imaging section A23. The imaging directions of the outer imaging section (left) A23a and the outer imaging section (right) A23b are each the same as the outward normal direction of the outer side surface A21D. Further, these imaging sections are each designed so as to be positioned in a direction which is opposite to the normal direction of the display surface (inner side surface) of the upper LCD A22 by 180 degrees. Specifically, the imaging direction of the outer imaging section (left) A23a and the imaging direction of the outer imaging section (right) A23b are parallel to each other. The outer imaging section (left) A23a and the outer imaging section (right) A23b can be used as a stereo camera depending on a program executed by the game apparatus A10. Further, depending on a program, when any one of the two outer imaging sections (A23a and A23b) is used alone, the outer imaging section A23 may be used as a non-stereo camera. Further, depending on a program, images shot by the two outer imaging sections (A23a and A23b) may be combined with each other or may compensate for each other, thereby enabling imaging using an extended imaging range. In the present embodiment, the outer imaging section A23 is structured so as to include two imaging sections, that is, the outer imaging section (left) A23a and the outer imaging section (right) A23b. Each of the outer imaging section (left) A23a and the outer imaging section (right) A23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(b), the outer imaging section (left) A23a and the outer imaging section (right) A23b forming the outer imaging section A23 are aligned so as to be parallel to the horizontal direction of the screen of the upper LCD A22. Specifically, the outer imaging section (left) A23a and the outer imaging section (right) A23b are positioned such that a straight line connecting between the two imaging sections is parallel to the horizontal direction of the screen of the upper LCD A22. Reference numerals A23a and A23b which are indicated as dashed lines in FIG. 1 represent the outer imaging section (left) A23a and the outer imaging section (right) A23b, respectively, which are positioned on the outer side surface reverse of the inner side surface of the upper housing A21. As shown in FIG. 1, when a user views the screen of the upper LCD A22 from the front thereof, the outer imaging section (left) A23a is positioned to the left of the upper LCD A22 and the outer imaging section (right) A23b is positioned to the right of the upper LCD A22. When a program for causing the outer imaging section A23 to function as a stereo camera is executed, the outer imaging section (left) A23a shoots an image for a left eye, which is viewed by a left eye of a user, and the outer imaging section (right) A23b shoots an image for a right eye, which is viewed by a right eye of the user. A distance between the outer imaging section (left) A23a and the outer imaging section (right) A23b is set so as to be approximately the same as a distance between both eyes of a person, that is, may be set so as to be within a range from 30 mm to 70 mm, for example. However, the distance between the outer imaging section (left) A23a and the outer imaging section (right) A23b is not limited to a distance within the range described above.

In the present embodiment, the outer imaging section (left) A23a and the outer imaging section (right) A23b are secured to the housing, and the imaging directions thereof cannot be changed.

Further, the outer imaging section (left) A23a and the outer imaging section (right) A23b are positioned to the left and to the right, respectively, of the upper LCD A22 (on the left side and the right side, respectively, of the upper housing A21) so as to be horizontally symmetrical with respect to the center of the upper LCD A22. Specifically, the outer imaging section (left) A23a and the outer imaging section (right) A23b are positioned so as to be symmetrical with respect to a line which divides the upper LCD A22 into two equal parts, that is, the left part and the right part. Further, the outer imaging section (left) A23a and the outer imaging section (right) A23b are positioned at positions which are reverse of positions above the upper edge of the screen of the upper LCD A22 and which are on the upper portion of the upper housing A21 in an opened state. Specifically, when the upper LCD A22 is projected on the outer side surface of the upper housing A21, the outer imaging section (left) A23a and the outer imaging section (right) A23b are positioned, on the outer side surface of the upper housing A21, at a position above the upper edge of the screen of the upper LCD A22 having been projected.

As described above, the two imaging sections (A23a and A23b) of the outer imaging section A23 are positioned to the left and the right of the upper LCD A22 so as to be horizontally symmetrical with respect to the center of the upper LCD A22. Therefore, when a user views the upper LCD A22 from the front thereof, the imaging direction of the outer imaging section A23 can be the same as the direction of the line of sight of the user. Further, the outer imaging section A23 is positioned at a position reverse of a position above the upper edge of the screen of the upper LCD A22. Therefore, the outer imaging section A23 and the upper LCD A22 do not interfere with each other inside the upper housing A21. Therefore, the upper housing A21 may have a reduced thickness as compared to a case where the outer imaging section A23 is positioned on a position reverse of a position of the screen of the upper LCD A22.

The inner imaging section A24 is positioned on the inner side surface (main surface) A21B of the upper housing A21, and acts as an imaging section which has an imaging direction which is the same direction as the inward normal direction of the inner side surface. The inner imaging section A24 includes an imaging device, such as a CCD image sensor and a CMOS image sensor, having a predetermined resolution, and a lens. The lens may have a zooming mechanism.

As shown in FIG. 1, when the upper housing A21 is in the opened state, the inner imaging section A24 is positioned, on the upper portion of the upper housing A21, above the upper edge of the screen of the upper LCD A22. Further, in this state, the inner imaging section A24 is positioned at the horizontal center of the upper housing A21 (on a line which separates the upper housing A21 (the screen of the upper LCD A22) into two equal parts, that is, the left part and the right part). Specifically, as shown in FIG. 1 and FIG. 3(b), the inner imaging section A24 is positioned on the inner side surface of the upper housing A21 at a position reverse of the middle position between the left and the right imaging sections (the outer imaging section (left) A23a and the outer imaging section (right) A23b) of the outer imaging section A23. Specifically, when the left and the right imaging sections of the outer imaging section A23 provided on the outer side surface of the upper housing A21 are projected on the inner side surface of the upper housing A21, the inner imaging section A24 is positioned at the middle position between the left and the right imaging sections having been projected. The dashed line A24 indicated in FIG. 3(b) represents the inner imaging section A24 positioned on the inner side surface of the upper housing A21.

As described above, the inner imaging section A24 is used for shooting an image in the direction opposite to that of the outer imaging section A23. The inner imaging section A24 is positioned on the inner side surface of the upper housing A21 at a position reverse of the middle position between the left and the right imaging sections of the outer imaging section A23. Thus, when a user views the upper LCD A22 from the front thereof, the inner imaging section A24 can shoot an image of a face of the user from the front thereof. Further, the left and the right imaging sections of the outer imaging section A23 do not interfere with the inner imaging section A24 inside the upper housing A21, thereby enabling reduction of the thickness of the upper housing A21.

The 3D adjustment switch A25 is a slide switch, and is used for switching a display mode of the upper LCD A22 as described above. Further, the 3D adjustment switch A25 is used for adjusting the stereoscopic effect of a stereoscopically visible image (stereoscopic image) which is displayed on the upper LCD A22. As shown in FIG. 1 to FIG. 3, the 3D adjustment switch A25 is provided at the end portions of the inner side surface and the right side surface of the upper housing A21, and is positioned at a position at which the 3D adjustment switch A25 is visible to a user when the user views the upper LCD A22 from the front thereof. Further, an operation section of the 3D adjustment switch A25 projects on the inner side surface and the right side surface, and can be viewed and operated from both sides. All the switches other than the 3D adjustment switch A25 are provided on the lower housing A11.

Figure 4:
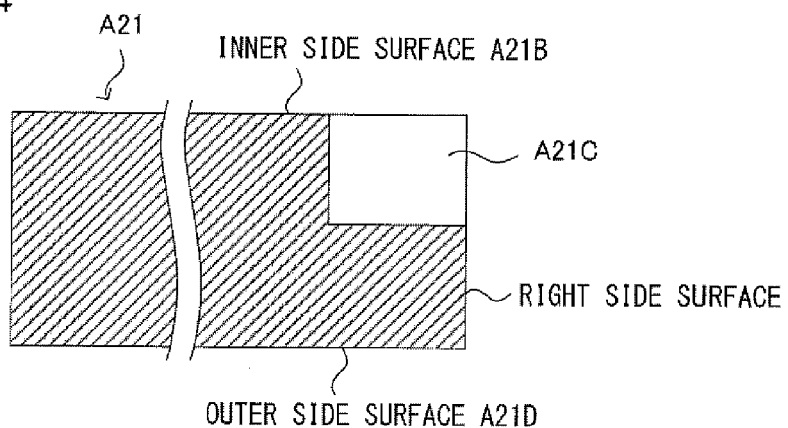
FIG. 4 is a cross-sectional view of an upper housing A21 shown in FIG. 1 taken along a line A-A'.

FIG. 4 is a cross-sectional view of the upper housing A21 shown in FIG. 1 taken along a line A-A'. As shown in FIG. 4, a recessed portion A21C is formed at the right end portion of the inner side surface of the upper housing A21, and the 3D adjustment switch A25 is provided in the recessed portion A21C. The 3D adjustment switch A25 is provided so as to be visible from the front surface and the right side surface of the upper housing A21 as shown in FIG. 1 and FIG. 2. A slider A25a of the 3D adjustment switch A25 is slidable to any position in a predetermined direction (the height direction), and a display mode of the upper LCD A22 is determined in accordance with the position of the slider A25a.

Figure 5A:
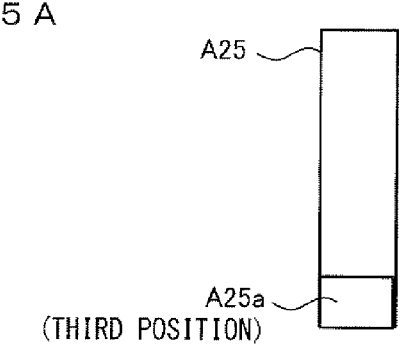
FIG. 5A is a diagram illustrating a state in which a slider A25a of a 3D adjustment switch A25 is positioned at the lowermost position (a third position)
Figure 5B:
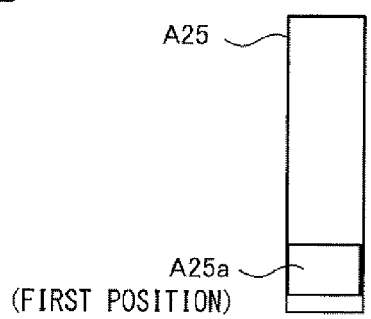
FIG. 5B is a diagram illustrating a state in which the slider A25a of the 3D adjustment switch A25 is positioned at a position (a first position) above the lowermost position.
Figure 5C:
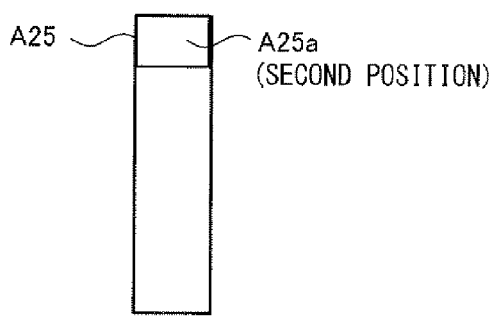
FIG. 5C is a diagram illustrating a state in which the slider A25a of the 3D adjustment switch A25 is positioned at the uppermost position (a second position)

FIG. 5A to FIG. 5C are each a diagram illustrating a state in which the slider A25a of the 3D adjustment switch A25 slides. FIG. 5A is a diagram illustrating a state in which the slider A25a of the 3D adjustment switch A25 is positioned at the lowermost position (a third position). FIG. 5B is a diagram illustrating a state in which the slider A25a of the 3D adjustment switch A25 is positioned above the lowermost position (a first position). FIG. 5C is a diagram illustrating a state in which the slider A25a of the 3D adjustment switch A25 is positioned at the uppermost position (a second position).

As shown in FIG. 5A, when the slider A25a of the 3D adjustment switch A25 is positioned at the lowermost position (the third position), the upper LCD A22 is set to the planar display mode, and a planar image is displayed on the screen of the upper LCD A22 (the upper LCD A22 may remain set to the stereoscopic display mode, and the same image may be used for the image for a left eye and the image for a right eye, to perform planar display). On the other hand, when the slider A25a is positioned between a position shown in FIG. 5B (a position (first position) above the lowermost position) and a position shown in FIG. 5C (the uppermost position (the second position)), the upper LCD A22 is set to the stereoscopic display mode. In this case, a stereoscopically visible image is displayed on the screen of the upper LCD A22. When the slider A25a is positioned between the first position and the second position, a manner in which the stereoscopic image is visible is adjusted in accordance with the position of the slider A25a. Specifically, an amount of deviation in the horizontal direction between a position of an image for a right eye and a position of an image for a left eye is adjusted in accordance with the position of the slider A25a. The slider A25a of the 3D adjustment switch A25 is configured so as to be fixed at the third position, and is slidable, along the height direction, to any position between the first position and the second position. For example, the slider A25a is fixed at the third position by a projection (not shown) which projects, from the side surface of the 3D adjustment switch A25, in the lateral direction shown in FIG. 5A, and does not slide upward from the third position unless a predetermined force or a force greater than the predetermined force is applied upward. When the slider A25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The 3D indicator A26 indicates whether or not the upper LCD A22 is in the stereoscopic display mode. The 3D indicator A26 is implemented as a LED, and is lit up when the stereoscopic display mode of the upper LCD A22 is enabled. The 3D indicator A26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD A22 is in the stereoscopic display mode. As shown in FIG. 1, the 3D indicator A26 is positioned near the screen of the upper LCD A22 on the inner side surface of the upper housing A21. Therefore, when a user views the screen of the upper LCD A22 from the front thereof, the user can easily view the 3D indicator A26. Therefore, also when a user is viewing the screen of the upper LCD A22, the user can easily recognize the display mode of the upper LCD A22.

Further, a speaker hole A21E is provided on the inner side surface of the upper housing A21. A sound is outputted through the speaker hole A21E from a speaker A43 described below.

(Internal Configuration of Game Apparatus A10)

Figure 6:
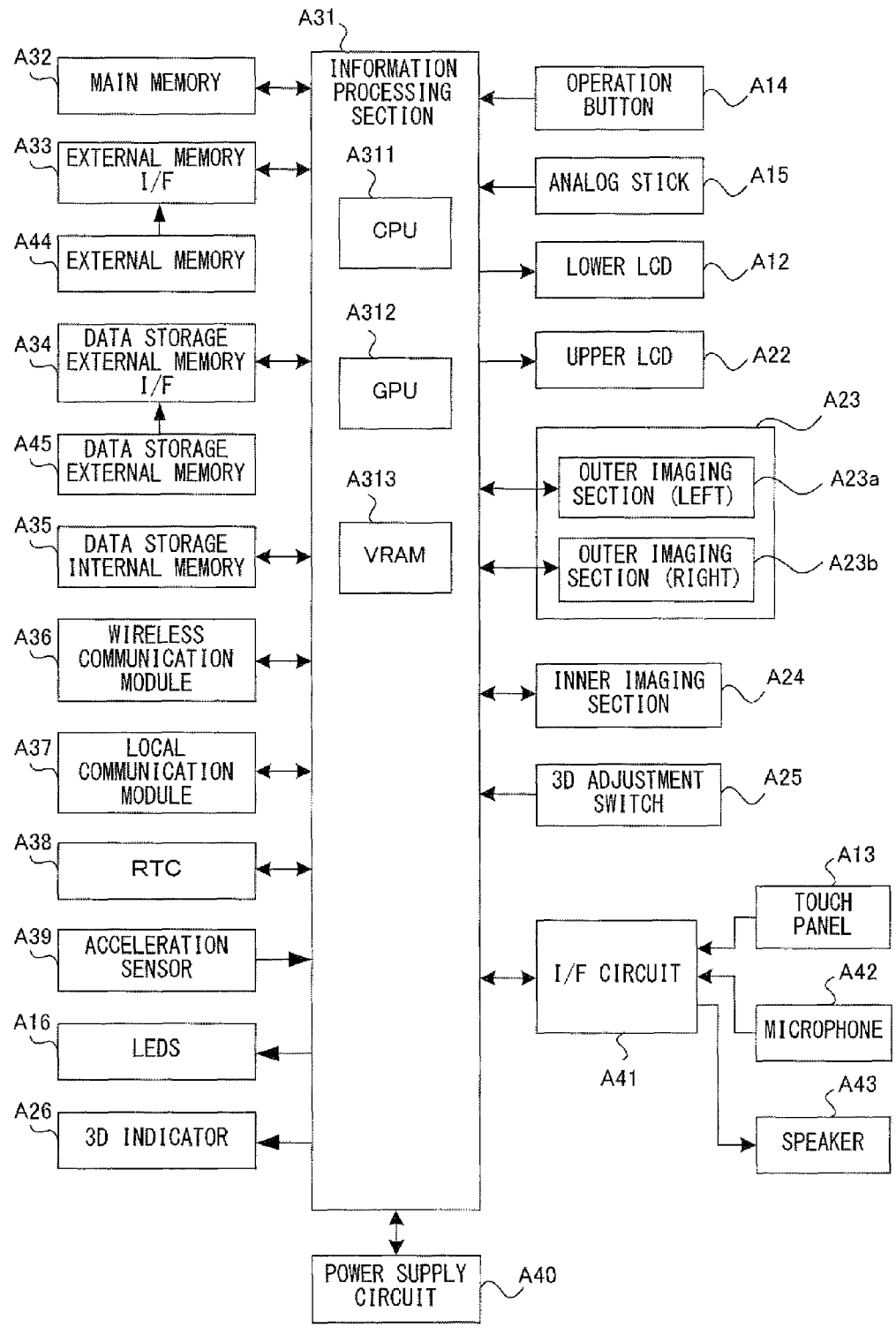
FIG. 6 is a block diagram illustrating an internal configuration of the game apparatus A10.

Next, an internal electrical configuration of the game apparatus A10 will be described with reference to FIG. 6. FIG. 6 is a block diagram illustrating an internal configuration of the game apparatus A10. As shown in FIG. 6, the game apparatus A10 includes, in addition to the components described above, electronic components such as an information processing section A31, a main memory A32, an external memory interface (external memory I/F) A33, an external data storage memory I/F A34, an internal data storage memory A35, a wireless communication module A36, a local communication module A37, a real-time clock (RTC) A38, an acceleration sensor A39, a power supply circuit A40, an interface circuit (I/F circuit) A41, and the like. These electronic components are mounted on an electronic circuit substrate, and accommodated in the lower housing A11 (or the upper housing A21).

The information processing section A31 is information processing means which includes a CPU (Central Processing Unit) A311 for executing a predetermined program, a GPU (Graphics Processing Unit) A312 for performing image processing, and the like. The CPU A311 of the information processing section A31 executes a program stored in a memory (for example, the external memory A44 connected to the external memory I/F A33 or the internal data storage memory A35) inside the game apparatus A10, thereby executing processing (for example, shooting processing, or image display processing described later) corresponding to the program. The program executed by the CPU A311 of the information processing section A31 may be acquired from another device through communication with the other device. The information processing section A31 further includes a VRAM (Video RAM) A313. The GPU A312 of the information processing section A31 generates an image in accordance with an instruction from the CPU A311 of the information processing section A31, and renders the image in the VRAM A313. The GPU A312 of the information processing section A31 outputs the image rendered in the VRAM A313, to the upper LCD A22 and/or the lower LCD A12, and the image is displayed on the upper LCD A22 and/or the lower LCD A12.

To the information processing section A31, the main memory A32, the external memory I/F A33, the external data storage memory I/F A34, and the internal data storage memory A35 are connected. The external memory I/F A33 is an interface for detachably connecting to the external memory A44. The external data storage memory I/F A34 is an interface for detachably connecting to the external data storage memory A45.

The main memory A32 is volatile storage means used as a work area and a buffer area for (the CPU A311 of) the information processing section A31. That is, the main memory A32 temporarily stores various types of data used for the processing based on the program, and temporarily stores a program acquired from the outside (the external memory A44, another device, or the like), for example. In the present embodiment, for example, a PSRAM (Pseudo-SRAM) is used as the main memory A32.

The external memory A44 is nonvolatile storage means for storing a program executed by the information processing section A31. The external memory A44 is implemented as, for example, a read-only semiconductor memory. When the external memory A44 is connected to the external memory I/F A33, the information processing section A31 can load a program stored in the external memory A44. Predetermined processing is performed by the program loaded by the information processing section A31 being executed. The external data storage memory A45 is implemented as a non-volatile readable and writable memory (for example, a NAND flash memory), and is used for storing predetermined data. For example, images shot by the outer imaging section A23 and/or images shot by another device are stored in the external data storage memory A45. When the external data storage memory A45 is connected to the external data storage memory I/F A34, the information processing section A31 loads an image stored in the external data storage memory A45, and the image can be displayed on the upper LCD A22 and/or the lower LCD A12.

The internal data storage memory A35 is implemented as a non-volatile readable and writable memory (for example, a NAND flash memory), and is used for storing predetermined data. For example, data and/or programs downloaded through the wireless communication module A36 by wireless communication is stored in the internal data storage memory A35.

The wireless communication module A36 has a function of connecting to a wireless LAN by using a method based on, for example, IEEE 802.11.b/g standard. The local communication module A37 has a function of performing wireless communication with the same type of game apparatus in a predetermined communication method (for example, communication by a unique protocol, or infrared communication). The wireless communication module A36 and the local communication module A37 are connected to the information processing section A31. The information processing section A31 can perform data transmission to and data reception from another device via the Internet by using the wireless communication module A36, and can perform data transmission to and data reception from the same type of another game apparatus by using the local communication module A37.

The acceleration sensor A39 is connected to the information processing section A31. The acceleration sensor A39 detects magnitudes of accelerations (linear accelerations) in the directions of the straight lines along the three axial (xyz axial) directions, respectively. The acceleration sensor A39 is provided inside the lower housing A11. In the acceleration sensor A39, as shown in FIG. 1, the long side direction of the lower housing A11 is defined as x axial direction, the short side direction of the lower housing A11 is defined as y axial direction, and the direction orthogonal to the inner side surface (main surface) of the lower housing A11 is defined as z axial direction, thereby detecting magnitudes of the linear accelerations for the respective axes. The acceleration sensor A39 is, for example, an electrostatic capacitance type acceleration sensor. However, another type of acceleration sensor may be used. The acceleration sensor A39 may be an acceleration sensor for detecting a magnitude of acceleration for one axial direction or two-axial directions. The information processing section A31 can receive data (acceleration data) representing accelerations detected by the acceleration sensor A39, and detect an orientation and a motion of the game apparatus A10.

The RTC A38 and the power supply circuit A40 are connected to the information processing section A31. The RTC A38 counts time, and outputs the time to the information processing section A31. The information processing section A31 calculates a current time (date) based on the time counted by the RTC A38. The power supply circuit A40 controls power from the power supply (the rechargeable battery accommodated in the lower housing A11 as described above) of the game apparatus A10, and supplies power to each component of the game apparatus A10.

The I/F circuit A41 is connected to the information processing section A31. The microphone A42 and the speaker A43 are connected to the I/F circuit A41. Specifically, the speaker A43 is connected to the I/F circuit A41 through an amplifier which is not shown. The microphone A42 detects a voice from a user, and outputs a sound signal to the I/F circuit A41. The amplifier amplifies a sound signal outputted from the I/F circuit A41, and a sound is outputted from the speaker A43. The touch panel A13 is connected to the I/F circuit A41. The I/F circuit A41 includes a sound control circuit for controlling the microphone A42 and the speaker A43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel A13, and outputs the touch position data to the information processing section A31. The touch position data represents a coordinate of a position, on an input surface of the touch panel A13, on which an input is made. The touch panel control circuit reads a signal outputted from the touch panel A13, and generates the touch position data every predetermined time. The information processing section A31 acquires the touch position data, to recognize a position on which an input is made on the touch panel A13.

The operation button A14 includes the operation buttons A14A to A14L described above, and is connected to the information processing section A31. Operation data representing an input state of each of the operation buttons A14A to A14I is outputted from the operation button A14 to the information processing section A31, and the input state indicates whether or not each of the operation buttons A14A to A14I has been pressed. The information processing section A31 acquires the operation data from the operation button A14 to perform processing in accordance with the input on the operation button A14.

The lower LCD A12 and the upper LCD A22 are connected to the information processing section A31. The lower LCD A12 and the upper LCD A22 each display an image in accordance with an instruction from (the GPU A312 of) the information processing section A31. In the present embodiment, the information processing section A31 causes the upper LCD A22 to display a stereoscopic image (image that is stereoscopically visible).

Specifically, the information processing section A31 is connected to an LCD controller (not shown) of the upper LCD A22, and causes the LCD controller to set the parallax barrier to ON or OFF. When the parallax barrier is set to ON in the upper LCD A22, an image for a right eye and an image for a left eye, which are stored in the VRAM A313 of the information processing section A31 are outputted to the upper LCD A22. More specifically, the LCD controller alternately repeats reading of pixel data of the image for a right eye for one line in the vertical direction, and reading of pixel data of the image for a left eye for one line in the vertical direction, thereby reading, from the VRAM A313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD A22. A user views the images through the parallax barrier in the upper LCD A22, so that the image for the right eye is viewed by the user's right eye, and the image for the left eye is viewed by the user's left eye. Thus, the stereoscopically visible image is displayed on the screen of the upper LCD A22.

The outer imaging section A23 and the inner imaging section A24 are connected to the information processing section A31. The outer imaging section A23 and the inner imaging section A24 each shoot an image in accordance with an instruction from the information processing section A31, and output data of the shot image to the information processing section A31.

The 3D adjustment switch A25 is connected to the information processing section A31. The 3D adjustment switch A25 transmits, to the information processing section A31, an electrical signal in accordance with the position of the slider A25a.

The 3D indicator A26 is connected to the information processing section A31. The information processing section. A31 controls whether or not the 3D indicator A26 is to be lit up. For example, the information processing section A31 lights up the 3D indicator A26 when the upper LCD A22 is in the stereoscopic display mode. The game apparatus A10 has the internal configuration as described above.

(Outline of Operation of Game Apparatus A10)

Hereinafter, the outline of operation of the game apparatus A10 according to the present embodiment will be described. In the present embodiment, a composite image obtained by combining an image of the real world currently shot by the outer imaging section A23 (the outer imaging section (left) A23a and the outer imaging section (right) A23b), and an image of a virtual object present in a 3-dimensional virtual space is displayed in a stereoscopically visible manner on the screen of the upper LCD A22, based on an image display program.

(Stereoscopic Display of Real World Image)

Two images shot by the outer imaging section A23 are supplied to the upper LCD such that the two images have a predetermined parallax, and then are stereoscopically displayed.

Figure 7:
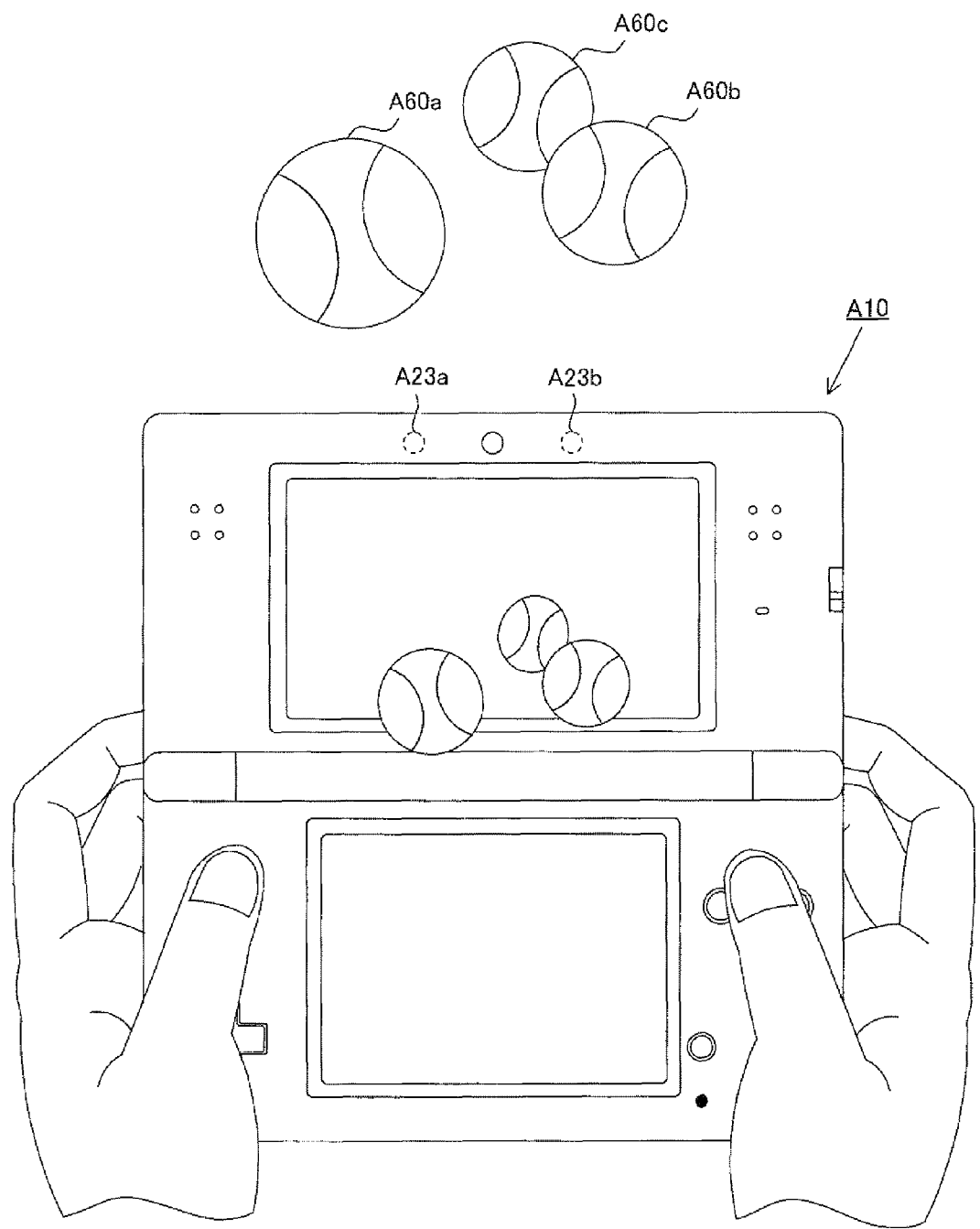
FIG. 7 shows an example of a stereoscopic image displayed on a screen of an upper LCD A22.

FIG. 7 shows an example of a stereoscopic image displayed on the screen of the upper LCD A22 when three balls A60a to A60c (real objects) are shot by the outer imaging section A23. When the balls A60a to A60c are shot by the outer imaging section A23, the balls A60a to A60c are displayed in a stereoscopically visible manner on the screen of the upper LCD A22. As shown in FIG. 7, on the screen of the upper LCD A22, the ball A60a which is nearest the outer imaging section A23 appears to be at the nearest position when viewed by the user, and the ball A60c which is farthest from the outer imaging section A23 appears to be at the farthest position when viewed by the user. It is noted that in FIG. 7, the state in which balls are partially beyond the screen of the upper LCD A22 is shown for the purpose of facilitating the understanding, but actually, the balls are displayed in the screen. The same holds true for FIG. 8 and FIG. 10 described later. It is noted that in FIG. 7, since a marker A61 (see FIG. 8) described later is not shot by the outer imaging section A23, a virtual object is not displayed on the screen of the upper LCD A22. In addition, although in FIG. 7, FIG. 8, FIG. 10, and the like, the states in which a display target appears to protrude when viewed by the user are shown, displaying in a stereoscopically visible manner includes not only the case where the display target appears to protrude when viewed by the user, but also the case where the display target is displayed with depth so as to appear to be in the back of the screen.

(Stereoscopic Display of Real World Image and CG Image)

Figure 8:
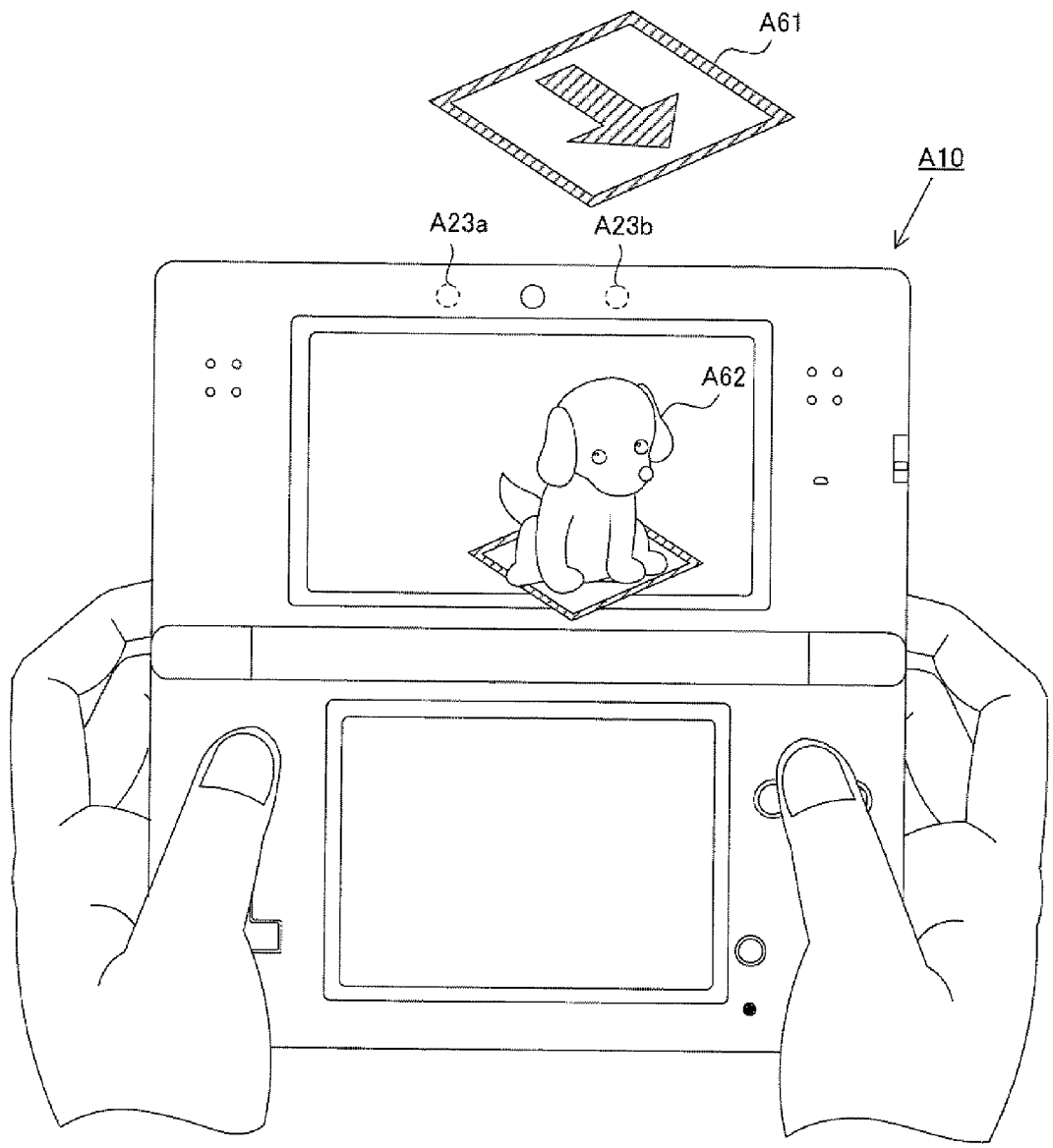
FIG. 8 shows another example of a stereoscopic image displayed on the screen of the upper LCD A22.
Figure 9:
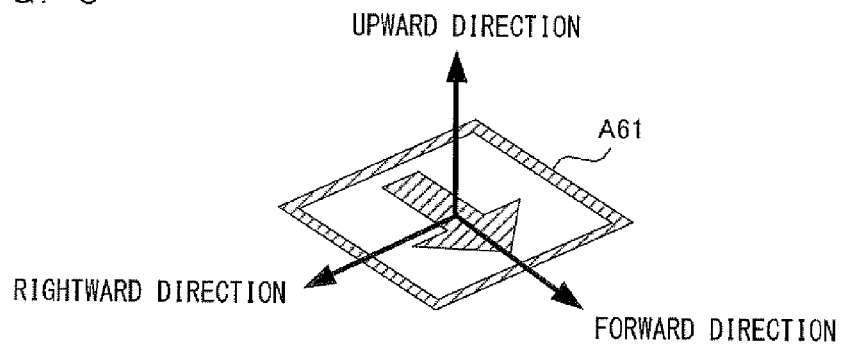
FIG. 9 shows a marker A61.

FIG. 8 shows an example of a stereoscopic image displayed on the screen of the upper LCD A22 when the marker A61 (real object) is being shot by the outer imaging section A23. As shown in FIG. 8, a square including an arrow is drawn on the marker A61 The CPU A311 performs image processing such as pattern matching for an image obtained by the outer imaging section A23, thereby determining whether or not the marker is included in the image. When the marker A61 is being shot by the outer imaging section A23, the marker A61 is displayed as a real world image in a stereoscopically visible manner on the upper LCD A22, and a virtual object A62 (for example, a virtual object representing a dog) is displayed being superimposed onto the real world image, in a stereoscopically visible manner at the position of the marker A61. It is noted that as shown in FIG. 9, directions (forward direction, rightward direction, and upward direction) are set for the marker A61, a virtual object can be placed with its orientation corresponding to the orientation of the marker A61. For example, the virtual object A62 can be placed on the marker A61 such that the forward direction of the virtual object A62 coincides with the forward direction of the marker A61.

Figure 10:
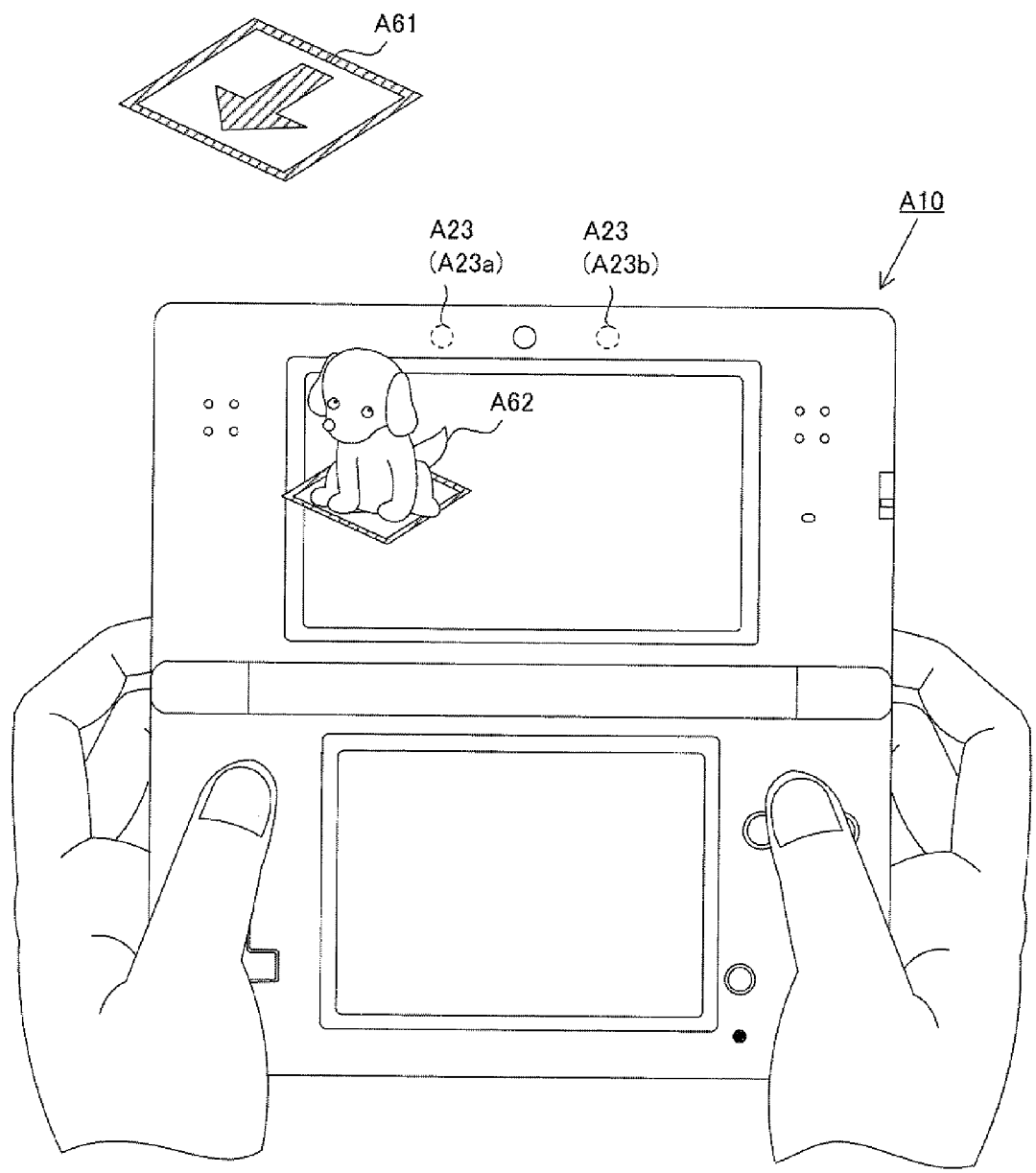
FIG. 10 shows another example of a stereoscopic image displayed on the screen of the upper LCD A22.

FIG. 10 shows another example of a stereoscopic image displayed on the screen of the upper LCD A22 when the marker A61 is being shot by the outer imaging section A23. As shown in FIG. 10, if the position and the direction of the marker A61 displayed on the screen of the upper LCD A22 have changed by the user moving the game apparatus A10, the position and the direction of the virtual object A62 change so as to follow the change. Therefore, it appears to the user as if the virtual object A62 were actually present in the real world.

Hereinafter, with reference to FIG. 11 to FIG. 40, the details of image display processing executed based on the image display program by the game apparatus A10 will be described.

(Memory Map)

First, main data stored in the main memory A32 when the image display processing is performed will be described. FIG. 11 is a diagram showing a memory map of the main memory A32 of the game apparatus A10. As shown in FIG. 11, the main memory A32 stores an image display program A70, a latest left real world image A71L, a latest right real world image A71R, a display left real world image A72L, a display right real world image A72R, a stereoscopic view zero distance A73, a virtual object information A74, a left transform matrix A75L, a right transform matrix A75R, a left view matrix A76L, a right view matrix A76R, a left projection matrix A77L, a right projection matrix A77R, a display mode A78, a marker recognition mode A79, a main real world image identification information A80, variables A81, and the like.

The image display program A70 is a program for causing the CPU A311 to execute the image display processing.

The latest left real world image A71L is the latest image shot by the outer imaging section (left) A23a.

The latest right real world image A71R is the latest image shot by the outer imaging section (right) A23b.

The display left real world image A72L is the latest image that has been determined as an image that is to be displayed on the upper LCD A22, among images shot by the outer imaging section (left) A23a.

The display left real world image A72R is the latest image that has been determined to be displayed on the upper LCD A22, among images shot by the outer imaging section (right) A23b.

The stereoscopic view zero distance A73 is a variable indicating the distance, of an object from the outer imaging section A23 in the shooting direction, that allows the object to appear to be present at a position with the same depth as the screen of the upper LCD A22 when the object is stereoscopically displayed on the screen of the upper LCD A22. For example, the stereoscopic view zero distance A73 is represented by unit of centimeter. In the present embodiment, the stereoscopic view zero distance A73 has a fixed value of 25 cm, but this value is merely an example. The stereoscopic view zero distance A73 may be changed anytime as needed, in accordance with instructions from the user, or automatically by a computer. The stereoscopic view zero distance A73 may be defined by a distance from the marker A61 or a ratio about the distance between the outer imaging section A23 and the marker A61. Alternatively, the stereoscopic view zero distance A73 does not necessarily need to be defined as a distance in the real world, but may be defined as a distance in the virtual world. If, for example, the size of the marker A61 is known, it is possible to cause the unit of length in the real world and the unit of length in the virtual space to coincide with each other. In this way, if it is possible to cause both units to coincide with each other, the stereoscopic view zero distance A73 can be set by using the unit of length in the real world. However, if it is not possible to cause both units to coincide with each other, the stereoscopic view zero distance A73 may be set by using the unit of length in the virtual world. It is noted that, as described later, in the present embodiment, it is possible to cause the unit of length in the real world and the unit of length in the virtual space to coincide with each other without using the size of the marker A61.

The virtual object information A74 is information that relates to the aforementioned virtual object A62, and includes 3D model data (polygon data) indicating the shape of the virtual object A62, texture data indicating the pattern of the virtual object A62, information about the position and the orientation of the virtual object A62 in the virtual space, and the like.

The left transform matrix A75L is a coordinate transform matrix that transforms coordinates represented in a coordinate system (marker coordinate system) set based on the position and the orientation of the marker A61, into coordinates represented in a coordinate system (outer imaging section (left) coordinate system) set based on the position and the orientation of the outer imaging section (left) A23a, which matrix is calculated by recognizing the position and the orientation of the marker A61 in a left real world image. The left transform matrix A75L includes information about the relative position and relative orientation of the outer imaging section (left) A23a with respect to the position and the orientation of the marker A61. More specifically, the left transform matrix A75L includes information about the position and the orientation of the outer imaging section (left) A23a in the marker coordinate system.

The right transform matrix A75R is a coordinate transform matrix that transforms coordinates represented in the marker coordinate system, into coordinates represented in a coordinate system (outer imaging section (right) coordinate system) set based on the position and the orientation of the outer imaging section (right) A23b, which matrix is calculated by recognizing the position and the orientation of the marker A61 in a right real world image. The right transform matrix A75R includes information about the relative position and relative orientation of the outer imaging section (right) A23b with respect to the position and the orientation of the marker A61. More specifically, the right transform matrix A75R includes information about the position and the orientation of the outer imaging section (right) A23b in the marker coordinate system.

It is noted that in the present specification, a transform matrix that transforms the marker coordinate system into the outer imaging section (left) coordinate system or the outer imaging section (right) coordinate system, is referred to as a "marker-camera transform matrix". The left transform matrix A75L and the right transform matrix A75R are the "marker-camera transform matrices".

The left view matrix A76L is a coordinate transform matrix that transforms coordinates represented in a world coordinate system of the virtual world, into coordinates represented in a left virtual camera coordinate system, which matrix is used for drawing the virtual object A62 as it is looked at by the left virtual camera. The left view matrix A76L includes information about the position and the orientation of the left virtual camera in the world coordinate system of the virtual world.

The right view matrix A76R is a coordinate transform matrix that transforms coordinates represented in the world coordinate system of the virtual world, into coordinates represented in a right virtual camera coordinate system, which matrix is used for drawing the virtual object A62 as it is looked at by the right virtual camera. The right view matrix A76R includes information about the position and the orientation of the right virtual camera in the world coordinate system of the virtual world.

The left projection matrix A77L is a coordinate transform matrix that transforms coordinates represented in a left virtual camera coordinate system, into coordinates represented in a screen coordinate system, which matrix is used for drawing the virtual world (the virtual object A62 present in the virtual world) as it is looked at by the left virtual camera.

The right projection matrix A77R is a coordinate transform matrix that transforms coordinates represented in a right virtual camera coordinate system, into coordinates represented in the screen coordinate system, which matrix is used for drawing the virtual world (the virtual object A62 present in the virtual world) as it is looked at by the right virtual camera.

The display mode A78 is data indicating the current display mode. More specifically, the display mode A78 is data indicating a synchronous display mode in which the real world image and the virtual space image are superimposed and displayed being synchronized with each other, or an asynchronous display mode in which the real world image and the virtual space image are superimposed and displayed without synchronizing the real world image and the virtual space image with each other.

The marker recognition mode A79 is data indicating the current marker recognition mode. More specifically, the marker recognition mode A79 is data indicating a one-image recognition mode in which marker recognition processing is performed for only one of the left real world image and the right real world image, or a both-image recognition mode in which the marker recognition processing is performed for both the left real world image and the right real world image.

The main real world image identification information A80 is data indicating which of the left real world image and the right real world image is a main real world image. In the above one-image recognition mode, the marker recognition processing is performed for only the main real world image, whereas the marker recognition processing is not performed for the other real world image (hereinafter, referred to as a sub real world image).

The variables A81 are used in executing the image display program A70, and include variables shown in FIG. 12. The meanings of the variables will be described below as needed.

When the game apparatus A10 is powered on, the information processing section A31 (CPU A311) of the game apparatus A10 executes a boot program stored in a ROM, which is not shown, thereby initializing units such as the main memory A32. Next, the image display program stored in the data storage internal memory A35 is loaded onto the main memory A32, and then the CPU A311 of the information processing section A31 starts to execute the image display program.

Hereinafter, with reference to flowcharts shown in FIG. 13 to FIG. 19, the flow of processing executed based on the image display program will be described. It is noted that the flowcharts shown in FIG. 13 to FIG. 19 are merely an example. Therefore, the order of the processing steps may be changed as long as the same result is obtained. In addition, the values of the variables, and threshold values used in determination steps are merely an example, and other values may be used as the values of the variables or the threshold values as appropriate. In addition, although in the present embodiment, the CPU A311 executes processing of all steps in the flowcharts shown in FIG. 13 to FIG. 19, a processor or a dedicated circuit other than the CPU A311 may execute some of the steps in the flowcharts shown in FIG. 13 to FIG. 19.

(Marker Processing)

Figure 13:
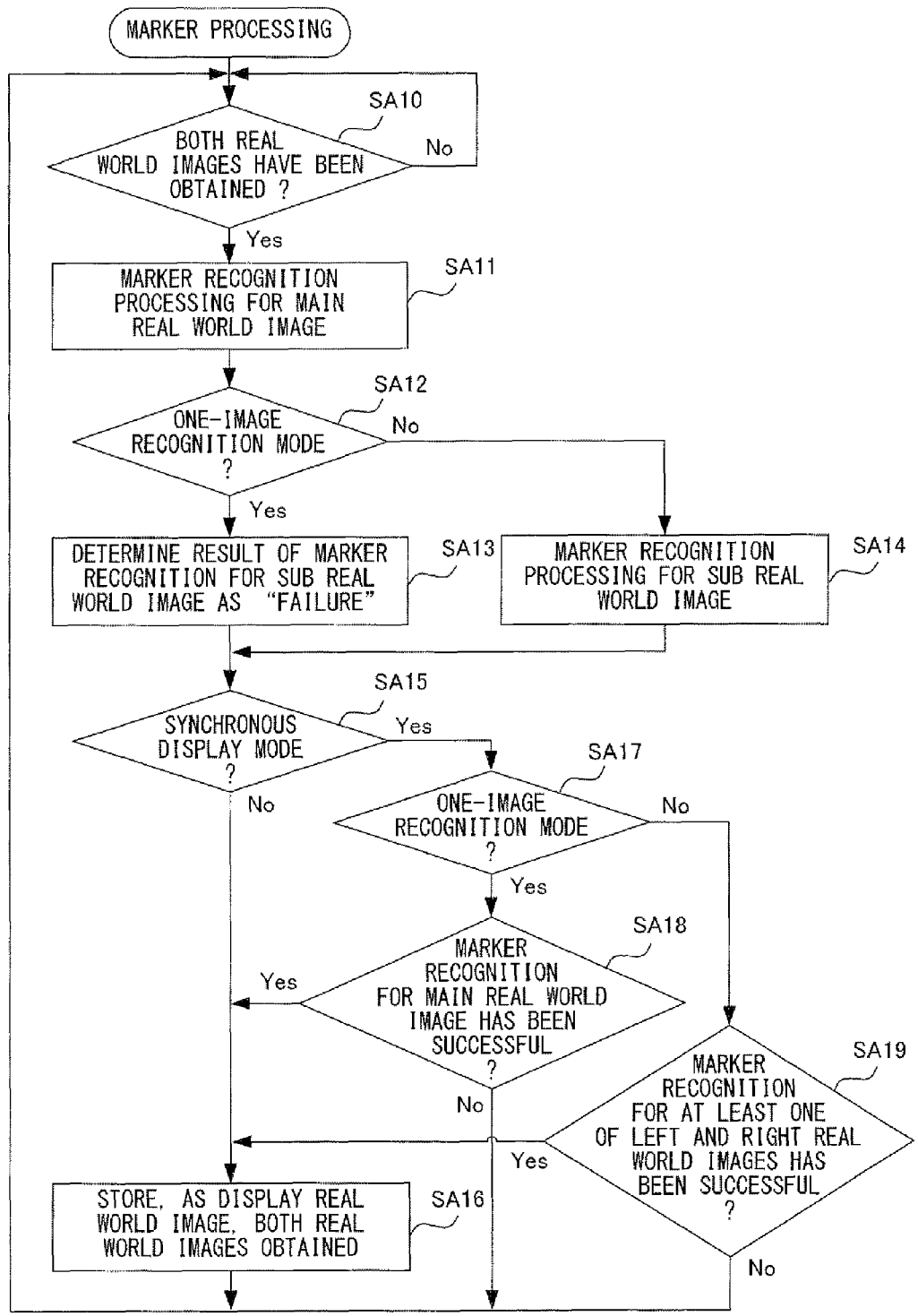
FIG. 13 is a flowchart showing a flow of marker processing.

FIG. 13 is a flowchart showing a flow of marker processing executed based on the image display program A70 by the CPU A311. The marker processing is executed in parallel with main processing described later. In the present embodiment, the marker processing is executed when the CPU A311 is in an idle state. Hereinafter, the details of the marker processing will be described.

In step SA10 in FIG. 13, the CPU A311 determines whether or not both real world images (that is, the left real world image and the right real world image) have been obtained by the outer imaging section A23. If both real world images have been obtained, the CPU A311 proceeds to step SA11. The latest one of left real world images obtained by the outer imaging section A23 is stored, as the latest left real world image A71L, in the main memory A32, and the latest one of right real world images obtained by the outer imaging section A23 is stored, as the latest right real world image A71R, in the main memory A32.

Figure 20:
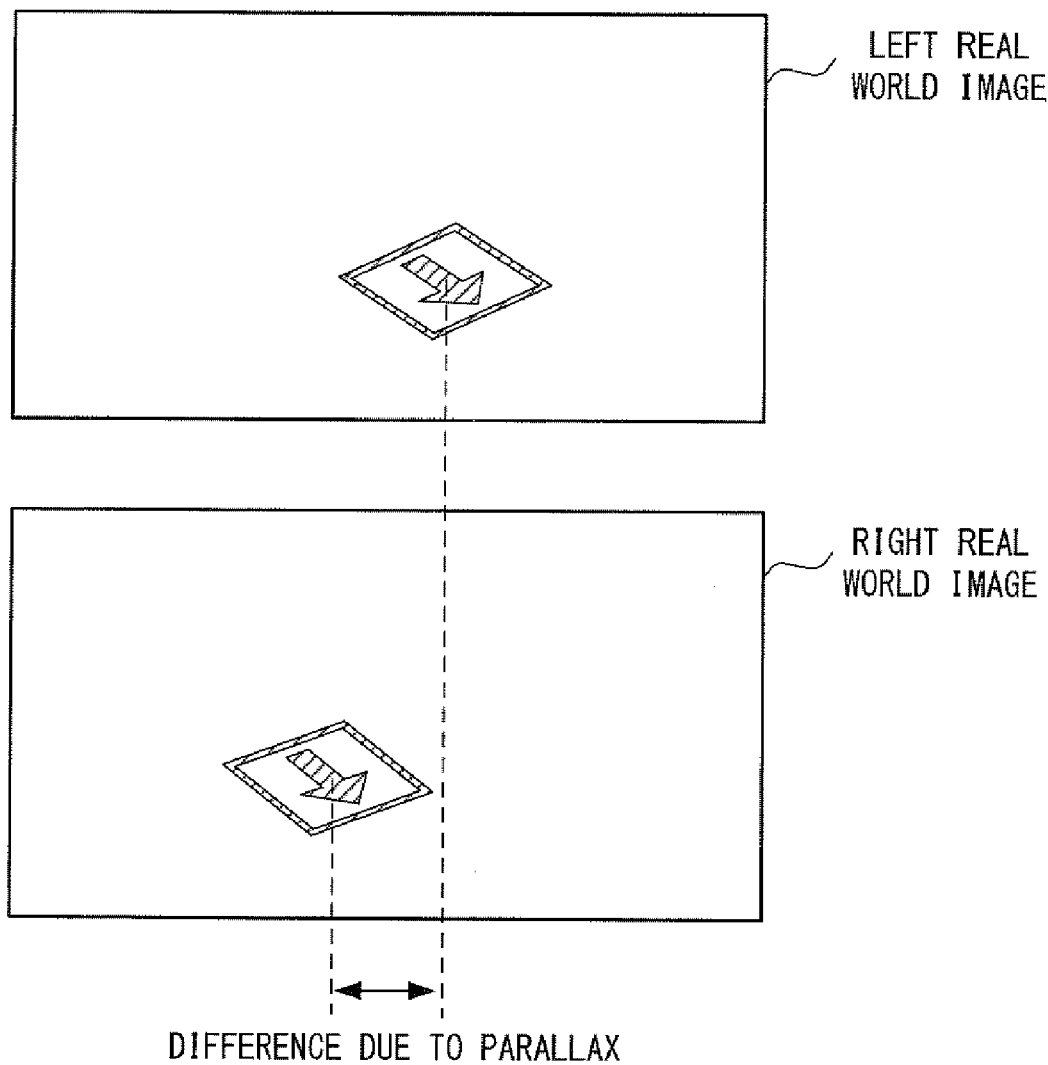
FIG. 20 shows an example of a left real world image and a right real world image.

It is noted that, as previously described, the outer imaging section (left) A23a and the outer imaging section (right) A23b of the upper housing A21 are separated by a certain distance away (for example, 3.5 cm, hereinafter, referred to as imaging sections distance). Therefore, when the marker A61 is shot by the outer imaging section (left) A23a and the outer imaging section (right) A23b at the same time, a difference due to a parallax occurs between each of the position and the orientation of the marker A61 in the left real world image shot by the outer imaging section (left) A23a, and each of the position and the orientation of the marker A61 in the right real world image shot by the outer imaging section (right) A23b, as shown in FIG. 20.

In step SA11, the CPU A311 performs the marker recognition processing for the main real world image. More specifically, the CPU A311 determines whether or not the marker A61 is included in the main real world image by a pattern matching method or the like. If the marker A61 is included in the main real world image, the CPU A311 calculates the left transform matrix A75L or the right transform matrix A75R, based on the position and the orientation of the marker A61 in the main real world image (if the main real world image is the left real world image, the CPU A61 calculates the left transform matrix A75L, and if the main real world image is the right real world image, the CPU A61 calculates the right transform matrix A75R).

Figure 21:
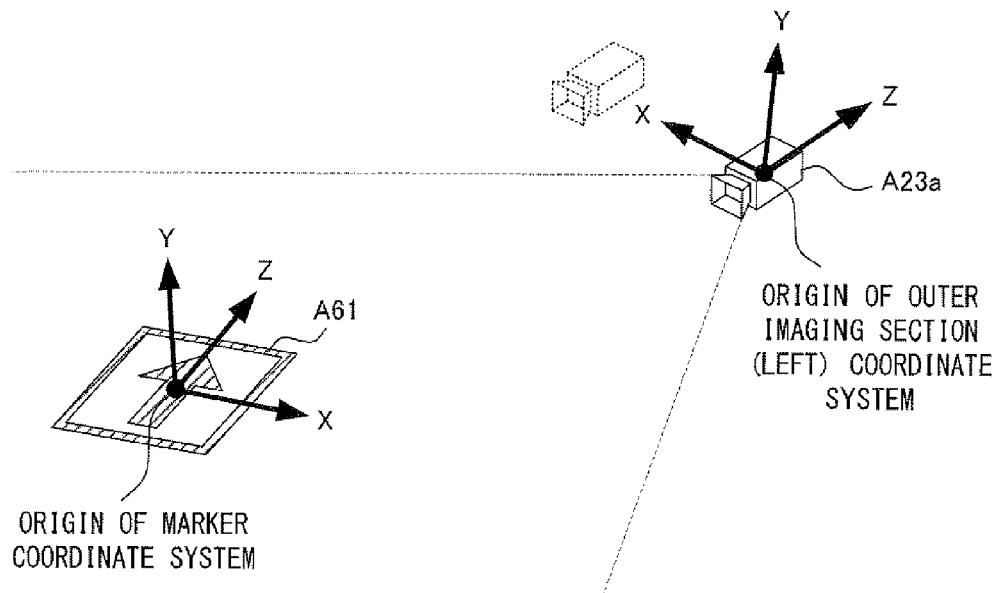
FIG. 21 shows the position and the orientation of a left virtual camera A63L calculated in accordance with a result of marker recognition processing.

It is noted that the left transform matrix A75L is a matrix reflecting therein the position and the orientation of the outer imaging section (left) A23a which are calculated based on the position and the orientation of the marker A61 in the left real world image. To be more exact, as shown in FIG. 21, the left transform matrix A75L is a coordinate transform matrix that transforms coordinates represented in the marker coordinate system (in which the position of the marker A61 in the real world is the origin, and the forward direction, the lateral direction, and the normal direction of the marker A61 correspond to the respective axes), into coordinates represented in the outer imaging section (left) coordinate system based on the position and the orientation of the outer imaging section (left) A23a which are calculated based on the position and the orientation of the marker A61 in the left real world image.

Figure 22:
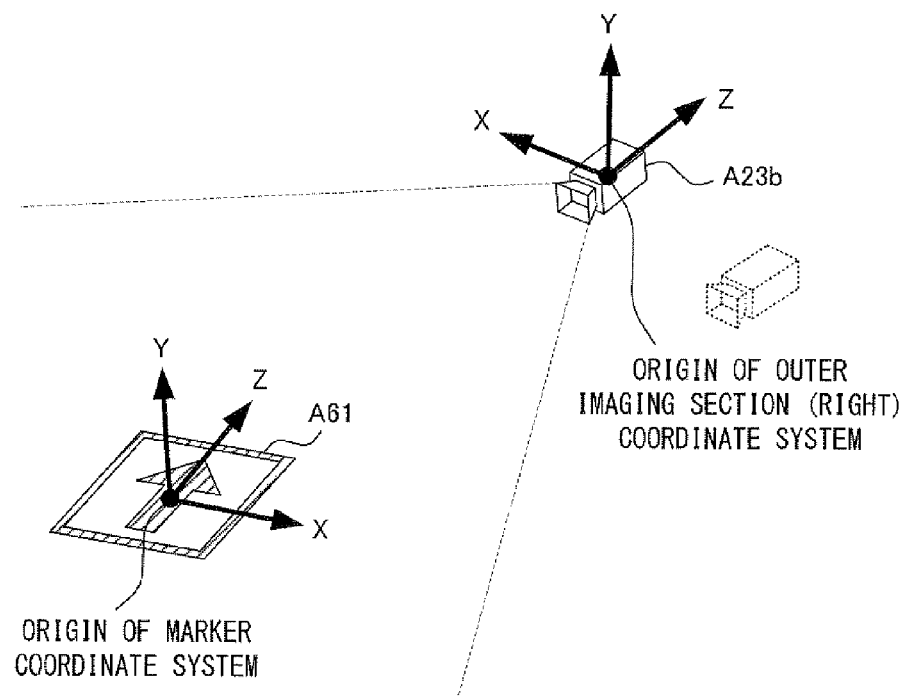
FIG. 22 shows the position and the orientation of a right virtual camera A63R calculated in accordance with a result of marker recognition processing

In addition, the right transform matrix A75R is a matrix reflecting therein the position and the orientation of the outer imaging section (right) A23b which are calculated based on the position and the orientation of the marker A61 in the right real world image. To be more exact, as shown in FIG. 22, the right transform matrix A75R is a coordinate transform matrix that transforms coordinates represented in the marker coordinate system, into coordinates represented in the outer imaging section (right) coordinate system based on the position and the orientation of the outer imaging section (right) A23*b* which are calculated based on the position and the orientation of the marker A61 in the right real world image.

It is noted that if it is assumed that the accuracy of the marker recognition is sufficiently high so that there is no error, and that the accuracy in the attachment of the outer imaging section (left) A23*a* and the outer imaging section (right) A23*b* to the game apparatus A10 is sufficiently high so that there is no error, the position of the outer imaging section (right) A23*b* indicated by the right transform matrix A75R which is the result of the marker recognition for the right real world image coincides with a position separated by the certain distance (imaging sections distance), along the x-axis direction of the outer imaging section (left) coordinate system (which direction is the lateral direction of the game apparatus A10 and is included in the horizontal directions when the game apparatus A10 is used), from the position of the outer imaging section (left) A23*a* indicated by the left transform matrix A75L which is the result of the marker recognition for the left real world image. In addition, the orientation of the outer imaging section (right) A23*b* indicated by the right transform matrix A75R, and the orientation of the outer imaging section (left) A23*a* indicated by the left transform matrix A75L are the same as the state of the attachment of the outer imaging section (left) A23*a* and the outer imaging section (right) A23*b* to the game apparatus A10. In the present embodiment, the game apparatus A10 is designed such that the outer imaging section (left) A23*a* and the outer imaging section (right) A23*b* are attached so as to be in parallel with each other. Therefore, the x-axis, the y-axis, and the z-axis of the outer imaging section (left) coordinate system are in parallel with the x-axis, the y-axis, and the z-axis of the outer imaging section (right) coordinate system. However, actually, the marker recognition has some error, and the attachment of the outer imaging section (left) A23*a* and the outer imaging section (right) A23*b* to the game apparatus A10 has some error. Therefore, the relationship between each of the position and the orientation of the outer imaging section (left) A23*a* indicated by the left transform matrix A75L, and each of the position and the orientation of the outer imaging section (right) A23*b* indicated by the right transform matrix A75R, is not ideal. For example, the left transform matrix A75L and the right transform matrix A75R are such that the outer imaging section (left) A23*a* and the outer imaging section (right) A23*b* are rather close to each other or rather away from each other, or such that the orientation of the outer imaging section (left) A23*a* and the orientation of the outer imaging section (right) A23*b* are different. Alternatively, the left transform matrix A75L and the right transform matrix A75R are such that the orientation of the outer imaging section (left) A23*a* and the orientation of the outer imaging section (right) A23*b* are not in parallel with each other.

Here, in the AR technology, a matrix that transforms the marker coordinate system into the outer imaging section (left) coordinate system or the outer imaging section (right) coordinate system is designated as a view matrix of a virtual camera, to superimpose a CG image onto the real world image. However, if the left transform matrix A75L is merely designated as the left view matrix A76L, and the right transform matrix A75R is merely designated as the right view matrix A76R in stereoscopically displaying a virtual space image on the upper LCD A22, a normal stereoscopic view of the virtual object A62 might not be provided. Accordingly, in the present embodiment, as is obvious from the description below, based on the position and the orientation (view matrix) of one of the virtual cameras calculated from the result of the marker recognition (marker-camera transform matrix) for the corresponding one of the left real world image and the right real world image, the position and the orientation (view matrix) of the other one of the virtual cameras are determined such that the relationship between each of the position and the orientation of the left virtual camera A63L, and each of the position and the orientation of the right virtual camera A63R, is ideal.

It is noted that if the marker A61 has not been recognized in the main real world image in step SA11, a null value is stored in the left transform matrix A75L or the right transform matrix A75R, whereby the failure of the recognition of the marker A61 in the left real world image or the right real world image is recorded.

In step SA12, the CPU A311 determines whether or not the current marker recognition mode is the one-image recognition mode. Then, if the current marker recognition mode is the one-image recognition mode, the CPU A311 proceeds to step SA13, and if the current marker recognition mode is not the one-image recognition mode (that is, the marker recognition mode is the both-image recognition mode), the CPU A311 proceeds to step SA14.

In step SA13, the CPU A311 determines, as a failure, the result of the marker recognition for one of the left real world image and the right real world image that is not the main real world image (hereinafter, the one is referred to as a sub real world image). More specifically, if the main real world image is the left real world image, a null value is stored in the right transform matrix A75R, and if the main real world image is the right real world image, a null value is stored in the left transform matrix A75L.

In step SA14, the CPU A311 performs the marker recognition processing for the sub real world image. More specifically, the CPU A311 determines whether or not the marker A61 is included in the sub real world image by a pattern matching method or the like. If the marker A61 is included in the sub real world image, the CPU A311 calculates the left transform matrix A75L or the right transform matrix A75R, based on the position and the orientation of the marker A61 in the sub real world image (if the sub real world image is the left real world image, the CPU A311 calculates the left transform matrix A75L, and if the sub real world image is the right real world image, the CPU A311 calculates the right transform matrix A75R).

In step SA15, the CPU A311 determines whether or not the current display mode is the synchronous display mode. Then, if the current display mode is the synchronous display mode, the CPU A311 proceeds to step SA17, and if the current display mode is not the synchronous display mode (that is, the current display mode is the asynchronous display mode), the CPU A311 proceeds to step SA16.

In step SA16, the CPU A311 stores the latest left real world image A71L and the latest right real world image A71R as the display left real world image A72L and the display right real world image A72R, respectively, in the main memory A32. Then, the CPU A311 returns to step SA10.

In step SA17, the CPU A311 determines whether or not the current marker recognition mode is the one-image recognition mode. Then, if the current marker recognition mode is the one-image recognition mode, the CPU A311 proceeds to step SA18, and if the current marker recognition mode is the one-image recognition mode (the current marker recognition mode is the both-image recognition mode), the CPU A311 proceeds to step SA19.

In step SA18, the CPU A311 determines whether or not the marker recognition for the main real world image has been successful. More specifically, if the main real world image is the left real world image, the CPU A311 determines whether or not a valid matrix which is not a null value is stored in the left transform matrix A75L, and if the main real world image is the right real world image, the CPU A311 determines whether or not a valid matrix which is not a null value is stored in the right transform matrix A75R. Then, if the marker recognition for the main real world image has been successful, the CPU A311 proceeds to step SA16, and if the marker recognition for the main real world image has not been successful, the CPU A311 returns to step SA10.

In step SA19, the CPU A311 determines whether or not at least one of the marker recognition for the left real world image and the marker recognition for the right real world image has been successful. More specifically, the CPU A311 determines whether or not valid matrices which are not null values are stored in the left transform matrix A75L and the right transform matrix A75R. Then, if at least one of the marker recognition for the left real world image and the marker recognition for the right real world image has been successful, the CPU A311 proceeds to step SA16, and if not, the CPU A311 returns to step SA10.

(Main Processing)

Figure 14:
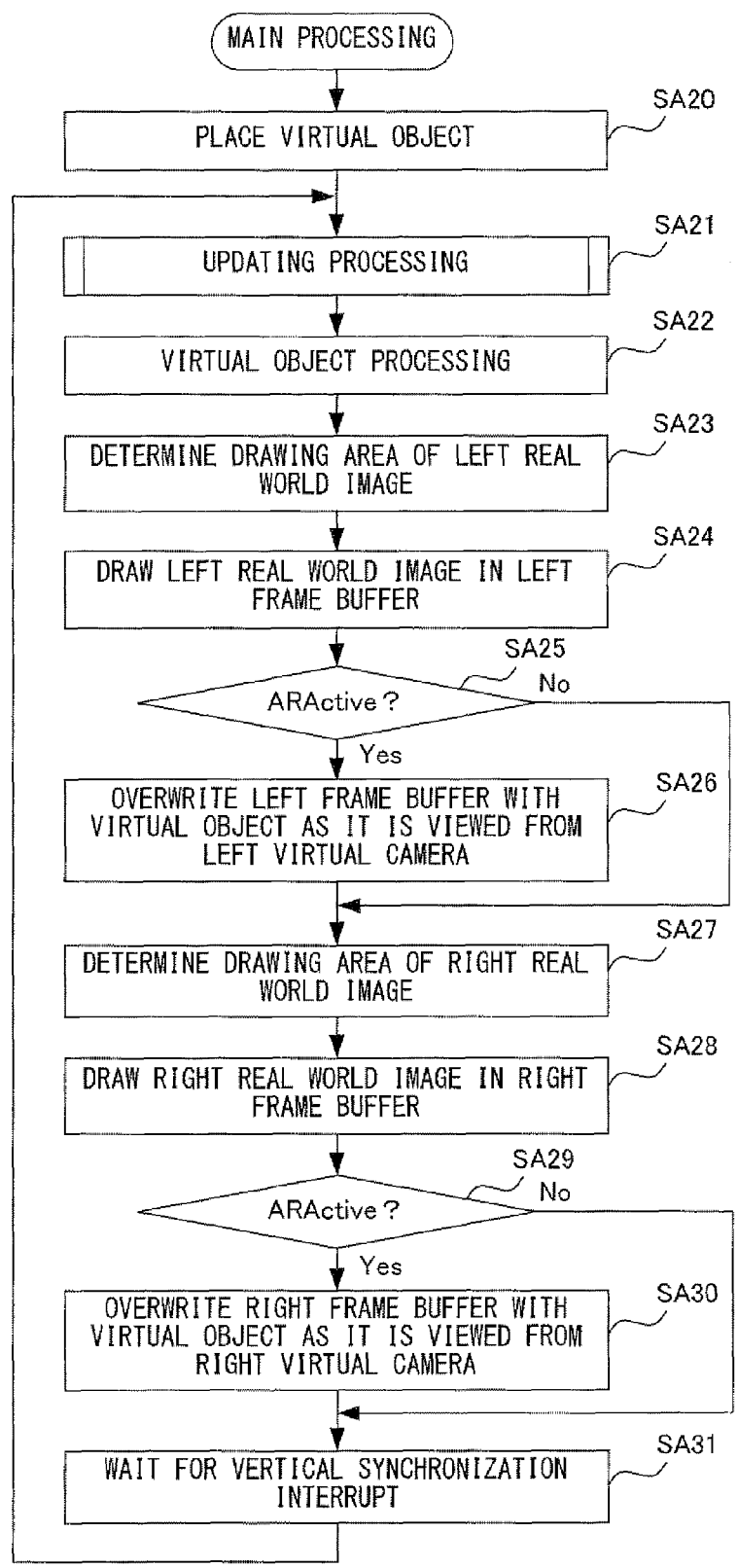
FIG. 14 is a flowchart showing a flow of main processing.

FIG. 14 is a flowchart showing a flow of main processing executed based on the image display program A70 by the CPU A311. The main processing is executed in parallel with the marker processing. Hereinafter, the details of the main processing will be described.

In step SA20 in FIG. 14, the CPU A311 places the virtual object A62 at a predetermined position in the 3-dimensional virtual space. In the present embodiment, the virtual object A62 is placed at the origin of the virtual space (the origin of the world coordinate system).

In step SA21, the CPU A311 executes updating processing. In the updating processing, the CPU A311 updates variables used for drawing the virtual object A62. The details of the updating processing will be described later.

In step SA22, the CPU A311 executes virtual object processing. The virtual object processing relates to the virtual object A62 placed in the virtual space. For example, as needed, the size of the virtual object A62 is changed, or the virtual object A62 is caused to take a predetermined action (The virtual object A62 is caused to move in the virtual space. For example, if the virtual object A62 is caused to move around the origin of the virtual space, the virtual object A62 walking around the origin of the marker coordinate system is displayed). It is noted that control of a movement of the virtual object A62 is realized by changing the coordinates of the position of the virtual object A62 in the world coordinate system in the virtual space.

Figure 23:
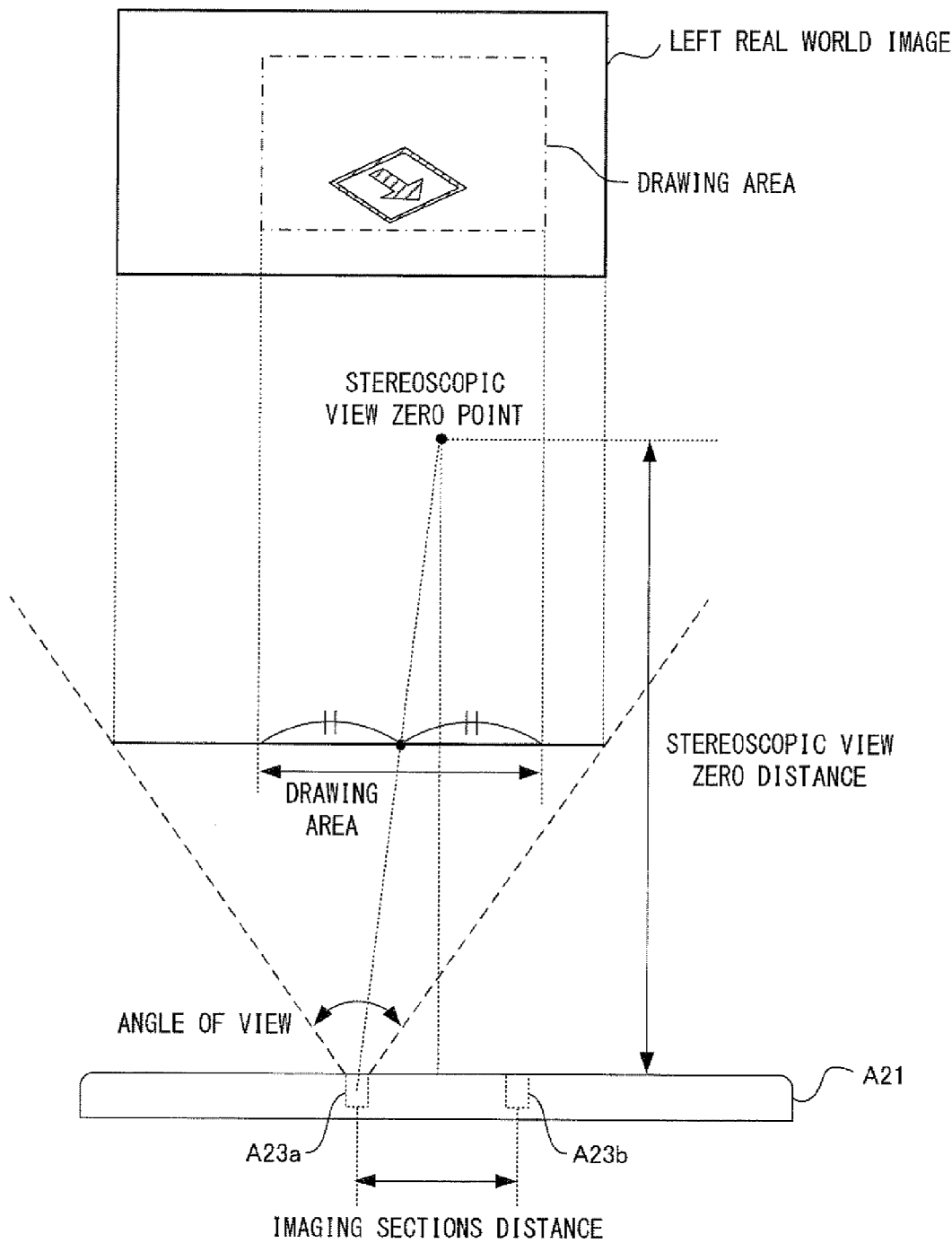
FIG. 23 shows an area cut from the left real world image, based on a stereoscopic view zero distance.

In step SA23, in accordance with the stereoscopic view zero distance A73, the CPU A311 determines a drawing area that is an area, of the left real world image, used for display. More specifically, as shown in FIG. 23, a point that is separated by the value of the stereoscopic view zero distance A73 (for example, 30 μm) in the shooting direction from the outer imaging section A23, and that is at the same distance from the outer imaging section (left) A23a and the outer imaging section (right) A23b, is defined as a stereoscopic view zero point. An area whose center overlaps with the stereoscopic view zero point as they are viewed from the outer imaging section (left) A23a, is determined as the drawing area of the left real world image. For example, as shown in FIG. 23, the length in the lateral direction of the drawing area is obtained as a ratio on a segment, taken from a line perpendicular to the shooting direction of the outer imaging section (left) A23a, between the lines creating the angle of view of the outer imaging section (left) A23a. The ratio is applied to the length in the lateral direction of the real world image, whereby the length of the drawing area of the real world image is determined. It is noted that the length in the height direction of the drawing area is determined based on the length in the lateral direction so as to adapt to the ratio of the height and the width of the display screen.

Figure 24:
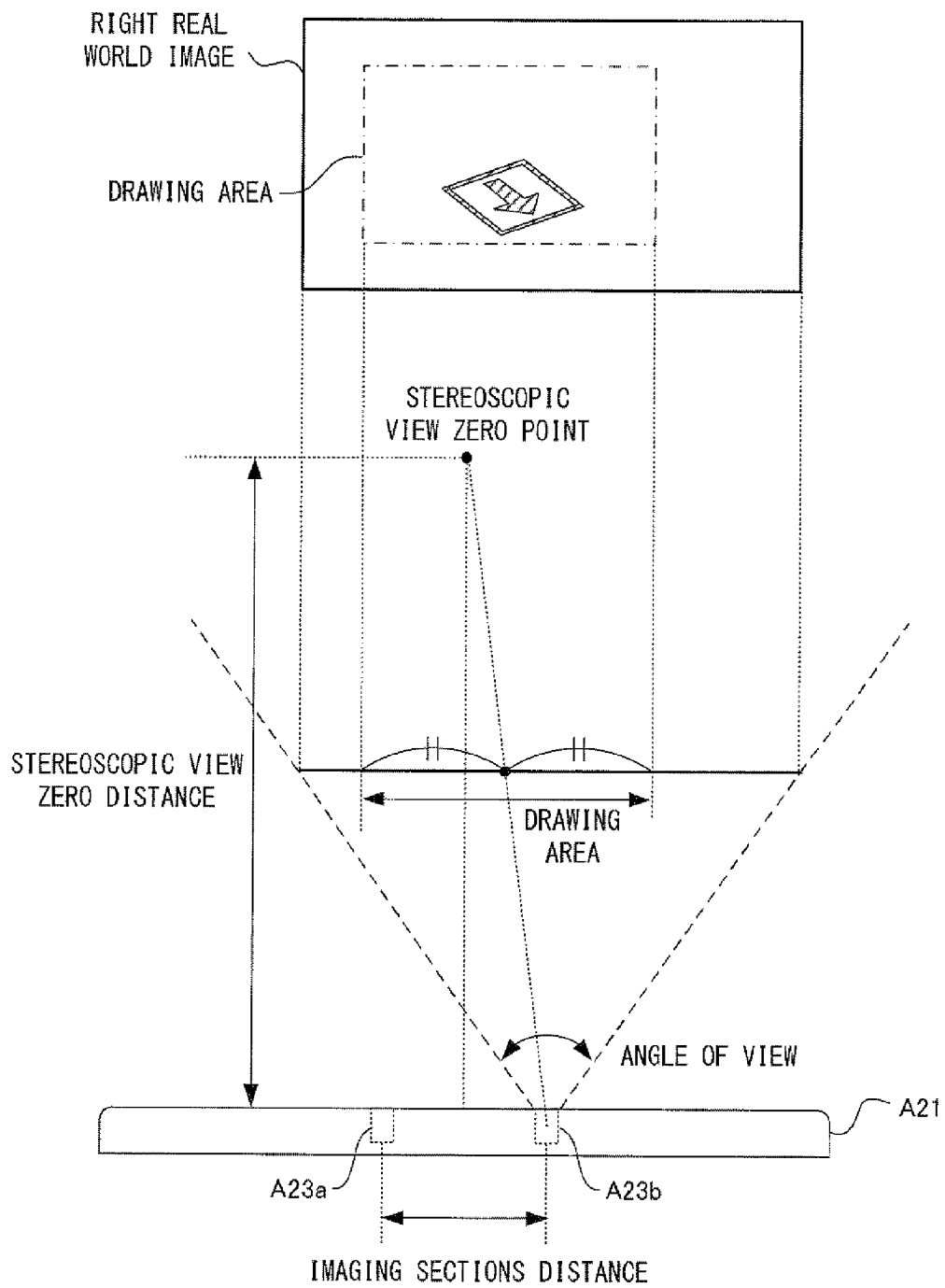
FIG. 24 shows an area cut from the right real world image, based on the stereoscopic view zero distance.
Figure 25:
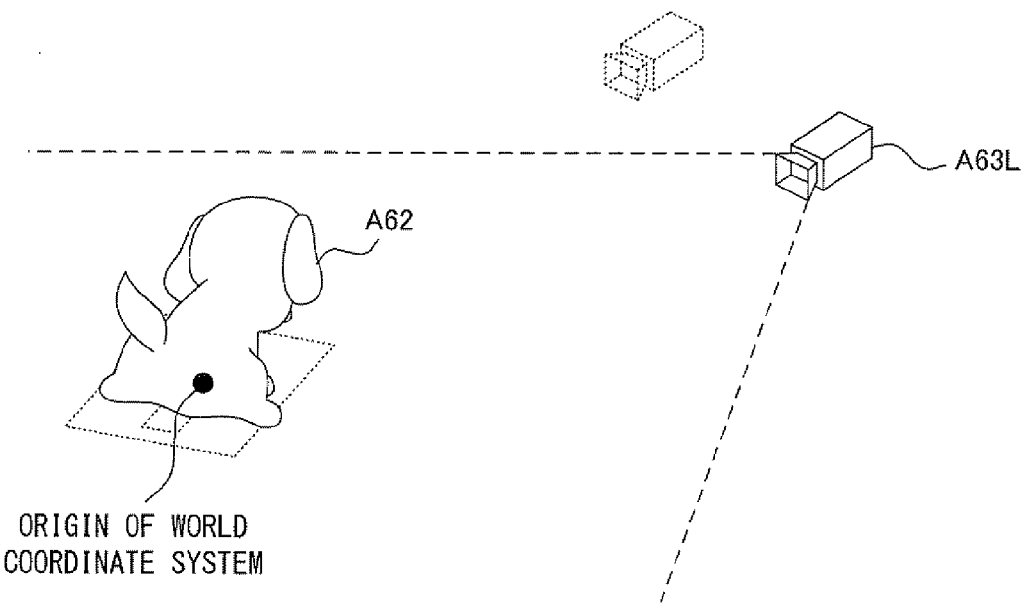
FIG. 25 shows a position relationship between a virtual object A62 and a left virtual camera A63L.

It is noted that in step SA27 for determining a drawing area of the right real world image, which step will be described later, an area whose center overlaps with the stereoscopic view zero point as they are viewed from the outer imaging section (right) A23b, is determined as the drawing area of the right real world image, as shown in FIG. 24. As a result, on the screen of the upper LCD A22, the position of the stereoscopic view zero point on an image for a left eye, and the position of the stereoscopic view zero point on an image for a right eye coincide with each other, and appear to have the same depth when viewed by the user.

In step SA24, the CPU A311 draws a drawing area of the display left real world image A72L which is determined in step SA23, in a predetermined storage area (hereinafter, referred to as a left frame buffer) for temporarily storing an image for a left eye to be supplied to the upper LCD A22, in the VRAM A313.

In step SA25, the CPU A311 determines whether or not the value of an AR-Active (see FIG. 12) is true. The AR-Active is a variable (flag) indicating whether or not a virtual object can be displayed being superimposed onto the real world image. If a virtual object can be displayed being superimposed onto the real world image, the value of the AR-Active is set at true, and if a virtual object cannot be displayed being superimposed onto the real world image (for example, in the case where the marker A61 cannot be recognized at all), the value of the AR-Active is set at false (initial value). If the value of the AR-Active is true, the CPU A311 proceeds to step SA26, and if the value of the AR-Active is not true (that is, the value of the AR-Active is false), the CPU A311 proceeds to step SA27.

Figure 26:
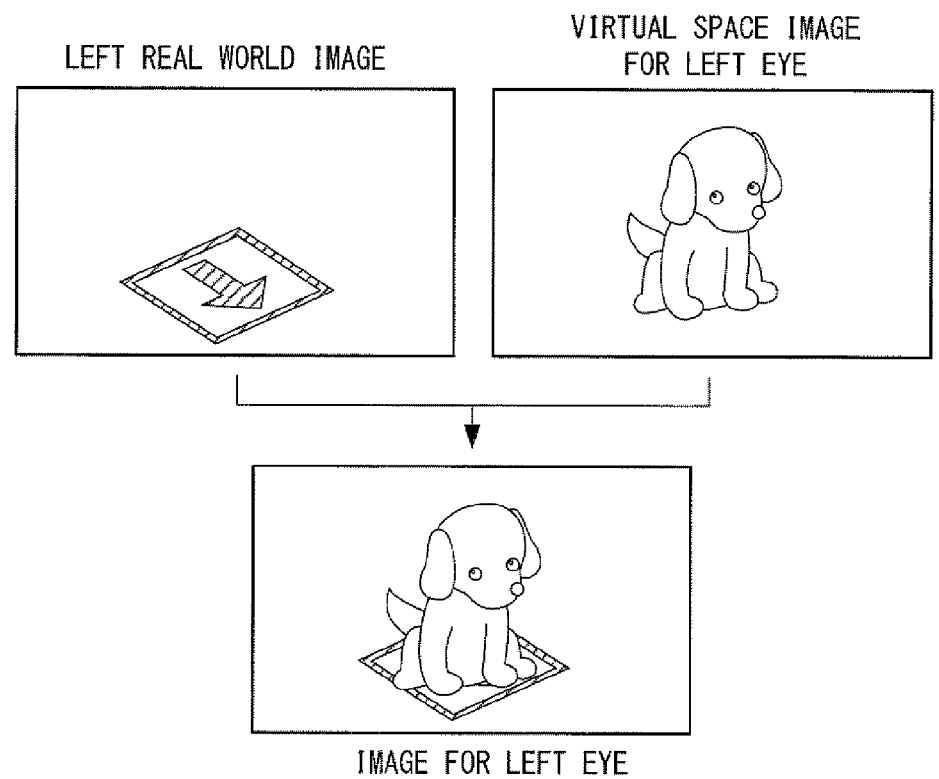
FIG. 26 shows a method of generating an image for a left eye.

In step SA26, for example, the CPU A311 overwrites the left frame buffer with the virtual space (hereinafter, referred to as a virtual space image for a left eye) as it is viewed from the left virtual camera A63L, as shown in FIG. 23 (actually and typically, the GPU A312 draws the virtual space in accordance with an instruction from the CPU A311). As a result, the virtual space image for a left eye is superimposed onto the left real world image drawn in the left frame buffer in step SA24, as shown in FIG. 26. The resultant image in the left frame buffer is supplied, as an image for a left eye, to the upper LCD A22 at a predetermined timing. It is noted that the background of the virtual space in the virtual space image for a left eye is transparent. Therefore, superimposing the virtual space image onto the real world image generates an image in which the virtual object A62 is present on the real world image.

In step SA27, the CPU A311 determines a drawing area of the right real world image in accordance with the stereoscopic view zero distance A73. It is noted that the details of processing of determining the drawing area are omitted because the processing is the same as processing of determining the drawing area of the left real world image.

In step SA28, the CPU A311 draws a drawing area of the display right real world image A72R which is determined in step SA27, in a predetermined storage area (hereinafter, referred to as a right frame buffer) for temporarily storing an image for a right eye to be supplied to the upper LCD A22, in the VRAM A313.

In step SA29, the CPU A311 determines whether or not the value of the AR-Active is true. If the value of the AR-Active is true, the CPU A311 proceeds to step SA30, and if the value of the AR-Active is not true (that is, the value of the AR-Active is false), the CPU A311 proceeds to step SA31.

In step SA30, the CPU A311 overwrites the right frame buffer with the virtual space (hereinafter, referred to as a virtual space image for a right eye) as it is viewed from the right virtual camera A63R (actually and typically, the GPU A312 draws the virtual space in accordance with an instruction from the CPU A311). As a result, the virtual space image for a right eye is superimposed onto the right real world image drawn in the right frame buffer in step SA28. The resultant image in the right frame buffer is supplied, as an image for a right eye, to the upper LCD A22 at a predetermined timing.

In step SA31, the CPU A311 waits for an interrupt signal (vertical synchronization interrupt) from the upper LCD A22. If the interrupt signal is generated, the CPU A311 returns to step SA21. As a result, steps SA21 to SA31 are repeated in cycles of a predetermined period (for example, 1/60 second).

(Updating Processing)

Next, the details of the updating processing in step SA21 in the main processing will be described with reference to the flowchart in FIG. 15.

Figure 15:
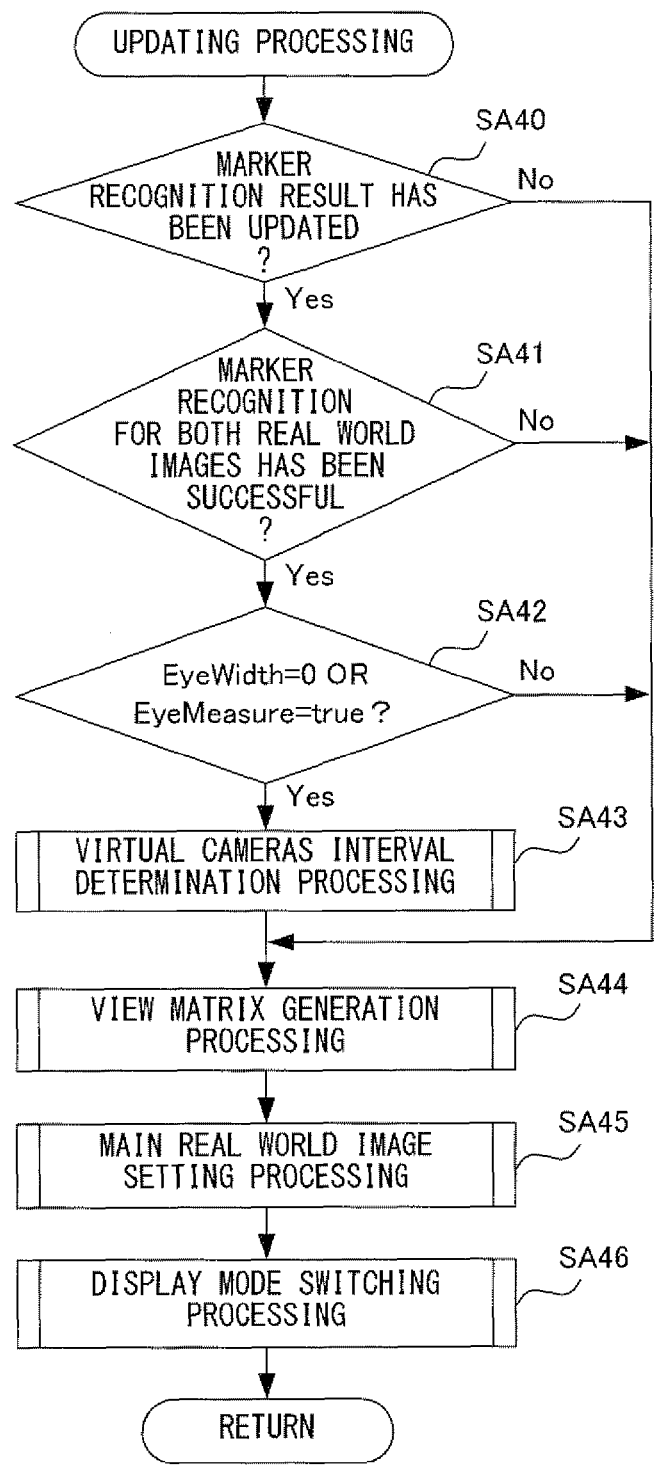
FIG. 15 is a flowchart showing the details of updating processing.

In step SA40 in FIG. 15, the CPU A311 determines whether or not the result of the marker recognition (that is, the left transform matrix A75L and the right transform matrix A75R) in the aforementioned marker processing has been updated. If the result of the marker recognition has been updated, the CPU A311 proceeds to step SA41, and if the result of the marker recognition has not been updated, the CPU A311 proceeds to step SA44.

In step SA41, the CPU A311 determines whether or not both the marker recognition for the left real world image and the marker recognition for the right real world image have been successful. If both the marker recognition for the left real world image and the marker recognition for the right real world image have been successful, the CPU A311 proceeds to step SA42, and if at least one of or both of the marker recognition for the left real world image and the marker recognition for the right real world image have been failed, the CPU A311 proceeds to step SA44.

In step SA42, the CPU A311 determines whether or not the value of EyeWidth (see FIG. 12) is 0, or whether or not the value of EyeMeasure (see FIG. 12) is true. The EyeWidth indicates the distance, between the outer imaging section (left) A23a and the outer imaging section (right) A23b, that is based on the position relationship therebetween, and is calculated by using the left transform matrix A75L and the right transform matrix A75R. It is noted that the distance does not need to be calculated on a scale of the real world, and may be calculated as a distance in the virtual space. Specifically, a relationship between the position of the outer imaging section (left) A23a and the position of the outer imaging section (right) A23b is calculated based on the position of the marker A61, by using a relationship between the position of the marker A61 and the position of the outer imaging section (left) A23a, which is indicated by the left transform matrix A75L, and a relationship between the position of the marker A61 and the position of the outer imaging section (right) A23b, which is indicated by the right transform matrix A75R, whereby the distance is calculated. It is noted that if the distance is yet to be determined, the value of the distance is set at 0 (initial value). It is noted that in the present embodiment, the EyeWidth is a scalar value. However, the EyeWidth may be a vector connecting the position of the outer imaging section (left) A23a indicated by the left transform matrix A75L, and the position of the outer imaging section (right) A23b indicated by the right transform matrix A75R. In addition, the EyeWidth may be the magnitude of the component, perpendicular to the shooting direction, of the vector connecting the position of the outer imaging section (left) A23a indicated by the left transform matrix A75L, and the position of the outer imaging section (right) A23b indicated by the right transform matrix A75R. It is noted that as described later, the EyeWidth is used for setting the distance (interval) between the left virtual camera A63L and the right virtual camera A63R in the virtual space. The EyeMeasure is a variable (flag) indicating whether or not the EyeWidth needs to be calculated again. If the EyeWidth needs to be calculated again, the EyeMeasure is set at true, and if the EyeWidth does not need to be calculated again, the EyeMeasure is set at false (initial value). If the value of the EyeWidth is 0 or if the value of the EyeMeasure is true, the CPU A311 proceeds to step SA43, and if not (that is, if the value of the EyeWidth is not 0 and the value of the EyeMeasure is false), the CPU A311 proceeds to step SA44.

In step SA43, the CPU A311 executes virtual cameras interval determination processing. In the virtual cameras interval determination processing, the interval between left virtual camera A63L and the right virtual camera A63R (that is, the EyeWidth) is determined and updated, as appropriate. The details of the virtual cameras interval determination processing will be described later.

In step SA44, the CPU A311 executes view matrix generation processing. In the view matrix generation processing, the left view matrix A76L and the right view matrix A76R are calculated, based on the interval between the left virtual camera A63L and the right virtual camera A63R (that is, the EyeWidth) which has been already determined. The details of the view matrix generation processing will be described later.

In step SA45, the CPU A311 executes main real world image setting processing. In the main real world image setting processing, the left real world image and the right real world image take turns switching to the main real world image, as appropriate (this is equivalent to the outer imaging section (left) A23a and the outer imaging section (right) taking turns switching to a main imaging section). The details of the main real world image setting processing will be described later.

In step SA46, the CPU A311 executes display mode switching processing, and ends the updating processing. In the display mode switching processing, the display mode is switched between the synchronous display mode and the asynchronous display mode, as appropriate. The details of the display mode switching processing will be described later.

(Virtual Cameras Interval Determination Processing)

Next, the details of the virtual cameras interval determination processing in step SA43 in the updating processing (FIG. 15) will be described with reference to the flowchart in FIG. 16. In this processing, as previously described, the distance between the position of the outer imaging section (left) A23a relative to the position of the marker A61, which is indicated by the left transform matrix A75L, and the position of the outer imaging section (right) A23b relative to the position of the marker A61, which is indicated by the right transform matrix A75R, is calculated. There are several methods for calculating the distance. In the present embodiment, the following method is employed as an example of the methods for the calculation.

Figure 16:
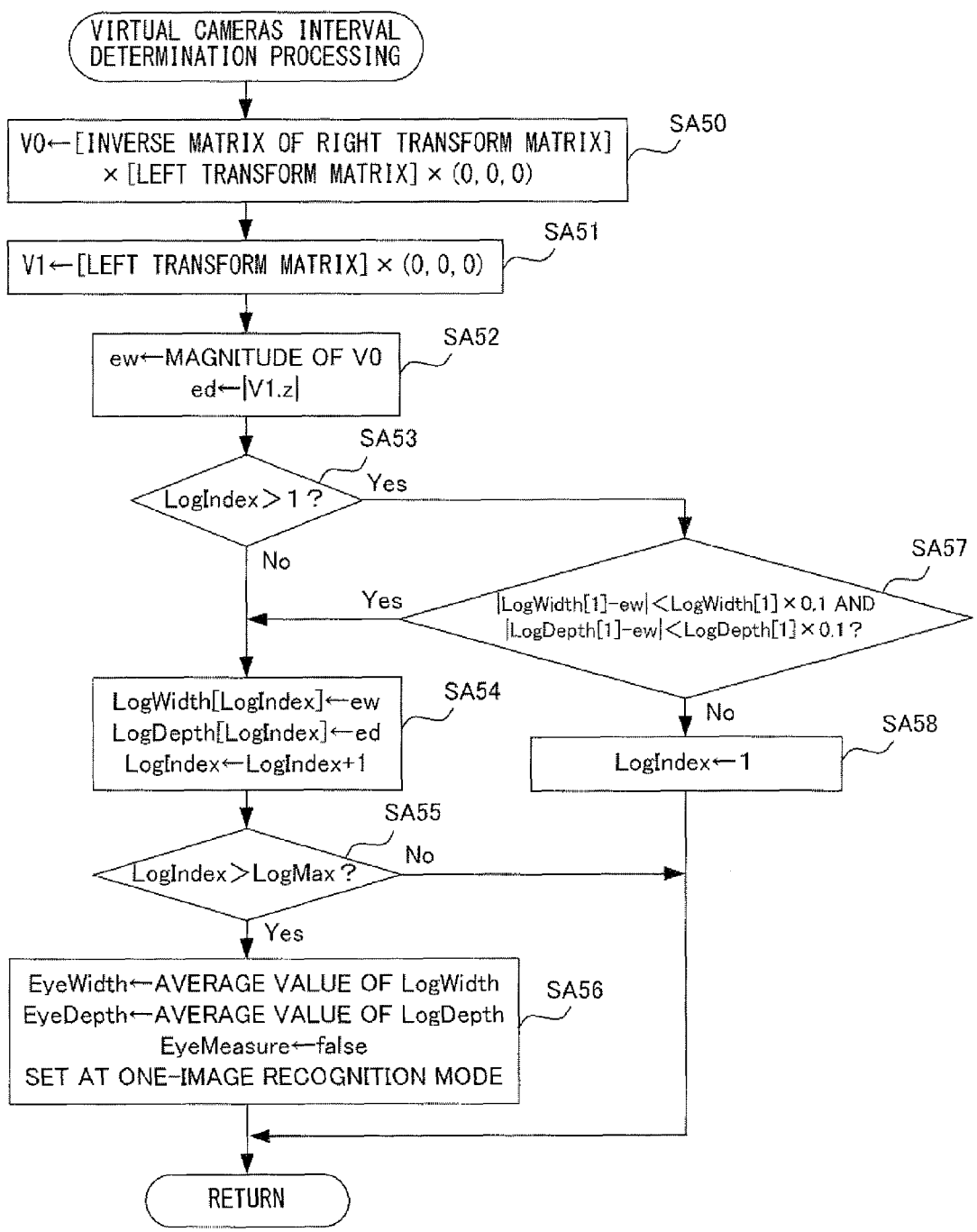
FIG. 16 is a flowchart showing the details of virtual cameras interval determination processing.

In step SA50 in FIG. 16, the CPU A311 calculates coordinates V0, based on the left transform matrix A75L and the right transform matrix A75R. Hereinafter, with reference to FIG. 27 to FIG. 29, a method of calculating the V0 will be described. It is noted that in FIG. 27 to FIG. 29, the shooting direction of the outer imaging section (left) A23a, and the shooting direction of the outer imaging section (right) A23b are drawn so as to be greatly different from each other, for the purpose of emphasizing that a relationship between each of the position and the orientation of the outer imaging section (left) A23a relative to the marker A61, which are calculated based on the left real world image, and each of the position and the orientation of the outer imaging section (right) A23b relative to the marker A61, which are calculated based on the right real world image, is not always ideal, as previously described.

Figure 29:
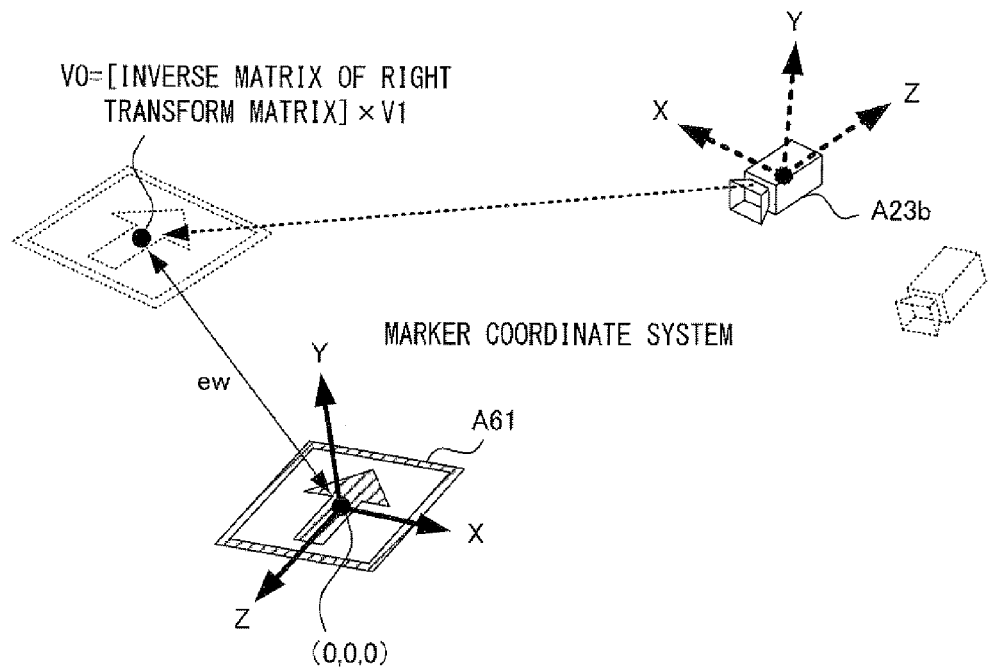
FIG. 29 shows a method of calculating coordinates of the left virtual camera A63L and coordinates of the right virtual camera A63R represented in a marker coordinate system.

First, as shown in FIG. 27, (0, 0, 0) is multiplied by the left transform matrix A75L, thereby obtaining coordinates V1, of the origin of the marker coordinate system, that are represented in the outer imaging section (left) coordinate system. The coordinates V1 indicate the position, of the marker A61 relative to the outer imaging section (left) A23a, which is calculated based on the left real world image. When the coordinates V1 is considered as coordinates represented in the outer imaging section (right) coordinate system, the coordinates V1 indicates a position shown in FIG. 28, in the outer imaging section (right) coordinate system. The resultant coordinates V1 is multiplied by the inverse matrix of the right transform matrix A75R. Multiplication by the inverse matrix of the right transform matrix A75R corresponds to transform of coordinates represented in the outer imaging section (right) coordinate system into coordinates represented in the marker coordinate system. Therefore, the multiplication by the inverse matrix transforms the coordinate V1 (FIG. 28) represented in the outer imaging section (right) coordinate system into the coordinates V0 represented in the marker coordinate system as shown in FIG. 29. The coordinate V0 thus calculated indicates the difference between the position (coordinates, of the origin of the marker coordinate system, that are represented in the outer imaging section (left) coordinate system) of the marker A61 relative to the outer imaging section (left) A23a, which is calculated based on the left real world image, and the position (coordinates, of the origin of the marker coordinate system, that are represented in the outer imaging section (right) coordinate system) of the marker A61 relative to the outer imaging section (right) A23a, which is calculated based on the right real world image. In the present embodiment, the difference between the relative positions of the marker A61 is considered as being due to the difference between the attachment positions of the outer imaging section (left) A23a and the outer imaging section (right) A23b, thereby estimating the attachment positions of the outer imaging section (left) A23a and the outer imaging section (right) A23b.

In step SA51, based on the left transform matrix A75L, the CPU A311 calculates the coordinates V1, of the origin of the marker coordinate system, that are represented in the outer imaging section (left) coordinate system. Specifically, (0, 0, 0) is multiplied by the left transform matrix A75L, thereby obtaining the coordinates V1, of the origin of the marker coordinate system, that are represented in the outer imaging section (left) coordinate system. It is noted that in the present embodiment, the coordinates, of the origin of the marker coordinate system, that are represented in the outer imaging section (left) coordinate system, are defined as V1. However, instead, the coordinates, of the origin of the marker coordinate system, that are represented in the outer imaging section (right) coordinate system, may be defined as V1.

In step SA52, the CPU A311 stores, in ew (see FIG. 12), the magnitude (the distance from the origin) (see FIG. 29) of the V0 obtained in step SA50, and stores, in ed (see FIG. 12), the absolute value (see FIG. 27) of the z-axis component of the V1 obtained in step SA51. However, the value of ew is calculated in unit of length in the marker coordinate system. Therefore, the unit of ew does not coincide with unit of length in the real world. Moreover, as previously described, the actual distance between the outer imaging section (left) A23a and the outer imaging section (right) A23b is known (for example, 3.5 cm). Therefore, by using the actual distance and the value of ew, it is possible to match the unit of length in virtual space to the unit of length in the real world. It is noted that if the size of the marker A61 is known, it is also possible to match the unit of length in virtual space to the unit of length in the real world, by using a correspondence relationship between the size of the marker A61 calculated based on the result of recognition of the marker image, and the size of the marker A61 in the real world.

It is noted that in the case where the shooting direction of the outer imaging section (left) A23a and the shooting direction of the outer imaging section (right) A23b are not in parallel with each other owing to error in the attachment of the outer imaging section (left) A23a and the outer imaging section (right) A23b to the game apparatus A10, the distance (ew) between the outer imaging section (left) A23a and the outer imaging section (right) A23b calculated as described above varies in accordance with the distance in the shooting direction between the outer imaging section A23 and the marker A61. Therefore, as described later, when the distance in the shooting direction between the outer imaging section A23 and the marker A61 has varied, the distance (Eye Width described later) between the outer imaging section (left) A23a and the outer imaging section (right) A23b is calculated again by using the marker-camera transform matrix as it is at this time.

It is noted that in the present embodiment, the ew indicates the magnitude of the V0. However, the ew may indicate the component of the V0 in the direction of a line connecting the position of the outer imaging section (left) A23a, which is indicated by the left transform matrix A75L, and the position of the outer imaging section (right) A23b, which is indicated by the right transform matrix A75R.

The ew calculated as described above indicates the interval between the outer imaging section (left) A23a and the outer imaging section (right) A23b in the marker coordinate system. The ew is used as the interval between the left virtual camera A63R and the right virtual camera A63R (in step SA65 or S68 described later).

It is noted that there is another method of calculating the ew other than the above-described method. For example, (0, 0, 0) is multiplied by the left transform matrix A75L, thereby obtaining the coordinates V1, of the origin of the marker coordinate system, that are represented in the outer imaging section (left) coordinate system (that is, the position of the marker A61 relative to the outer imaging section (left) A23a). Moreover, (0, 0, 0) is multiplied by the right transform matrix A75R, thereby obtaining coordinates Vr, of the origin of the marker coordinate system, that are represented in the outer imaging section (right) (that is, the position of the marker A61 relative to the outer imaging section (right) A23b). The ew may be obtained by calculating the distance between the coordinates V1 and the coordinates Vr calculated as described above.

In step SA53, the CPU A311 determines whether or not the value of LogIndex (see FIG. 12) is larger than 1 (initial value). If the value of the LogIndex is larger than 1, the CPU A311 proceeds to step SA57, and if not (that is, if the value of the LogIndex is 1), the CPU A311 proceeds to step SA54. The LogIndex is a variable for identifying each component of arrays (LogWidth and LogDepth).

In step SA54, the CPU A311 stores the value of the ew obtained in step SA52 in the array LogWidth [LogIndex]. Moreover, the CPU A311 stores the value of the ed obtained in step SA52 in the array LogDepth [LogIndex]. Moreover, the value of the LogIndex is incremented. The LogWidth is array variables for storing a plurality of values of the ew. The LogDepth is array variables for storing a plurality of values of the ed.

In step SA55, the CPU A311 determines whether or not the value of the LogIndex is larger than the value of LogMax. If the value of the LogIndex is larger than the value of the LogMax, the CPU A311 proceeds to step SA56, and if not (that is, if the value of the LogIndex is equal to or smaller than the value of the LogMax), the CPU A311 ends the virtual cameras interval determination processing.

In step SA56, the CPU A311 calculates the average value of the components of the LogWidth, and stores the average value in the EyeWidth. Moreover, the CPU A311 calculates the average value of the components of the LogDepth, and stores the average value in the EyeDepth. Moreover, the CPU A311 sets the value of the EyeMeasure at false. Moreover, the CPU A311 sets the marker recognition mode A79 at the one-image recognition mode. The EyeDepth is a variable indicating the depth distance (the depth, the distance in the shooting direction) to the origin of the marker coordinate system from the coordinates of the position of the outer imaging section (left) A23a in the marker coordinate system, which is indicated by the left transform matrix A75L (or the coordinates of the position of the outer imaging section (right) A23b in the marker coordinate system, which is indicated by the right transform matrix A75R). The EyeDepth is used as a reference value for determination in step SA72 in FIG. 17 described later. The initial value of the EyeDepth is 0. If processing in step SA56 has been finished, the virtual cameras interval determination processing is ended.

In step SA57, the CPU A311 determines whether or not: the absolute value of the difference between the value of the ew obtained in step SA52 and the value of the LogWidth [1] is smaller than 10 percent of the value of the LogWidth [1]; and the absolute value of the difference between the value of the ed obtained in step SA52 and the value of the LogDepth [1] is smaller than 10 percent of the value of the LogDepth [1]. If the result of the determination in step SA57 is positive, the CPU A311 proceeds to step SA54, and if the result of the determination in step SA57 is negative, the CPU A311 proceeds to step SA58.

In step SA58, the CPU A311 resets the value of the LogIndex at 1 (initial value), and ends the virtual cameras interval determination processing.

As described above, in the virtual cameras interval determination processing, the ew and the ed are calculated based on the position of the outer imaging section (left) A23a calculated based on the position and the orientation of the marker A61 in the left real world image, and the position of the outer imaging section (right) A23b calculated based on the position and the orientation of the marker A61 in the right real world image. The values of the ew and the values of the ed calculated in this manner are sequentially stored in the LogWidth and the LogDepth, respectively. At this time, if the value of the ew newly calculated is out of a predetermined range (±10%) from the value of the ew that was stored earliest in the LogWidth (that is, the value of the LogWidth [1]), or if the value of the ed newly calculated is out of a predetermined range (±10%) from the value of the ed that was stored earliest in the LogDepth (that is, the value of the LogDepth [1]), values of the ew or values of the ed are stored again in the LogWidth or the LogDepth from the beginning. Therefore, only when values of the ew and values of the ed which are sequentially calculated do not vary significantly (that is, values of the ew and the values of the ed have been stable, to a certain extent, for a certain period), the average value of the values of the ew and the average value of the values of the ed are stored in the EyeWidth and the EyeDepth.

It is noted that when the user is moving or turning the game apparatus A10, the left real world image and the right real world image shot by the outer imaging section A23 are likely to be blurred, and the accuracy of the recognition of the marker A61 significantly decreases. As a result, values of the ew or values of the ed which are sequentially detected are likely to vary significantly. It is desired to avoid determining the value of the EyeWidth and the value of the EyeDepth, based on values of the ew and values of the ed, having low reliability, detected in such a situation as described above. Therefore, in the present embodiment, only when values of the ew and values of the ed which are sequentially calculated do not vary significantly, the value of the EyeWidth and the value of the EyeDepth are determined based on the values of the ew and the values of the ed. In addition, the accuracies of the value of the EyeWidth and the value of the EyeDepth can be enhanced because the average value of a plurality of values of the ew and the average value of a plurality of values of the ed obtained by calculations performed a plurality of times are used as the value of the EyeWidth and the value of the EyeDepth, respectively.

(View Matrix Generation Processing)

Next, the view matrix generation processing in step SA44 in the updating processing (FIG. 15) will be described with reference to the flowchart in FIG. 17.

Figure 17:
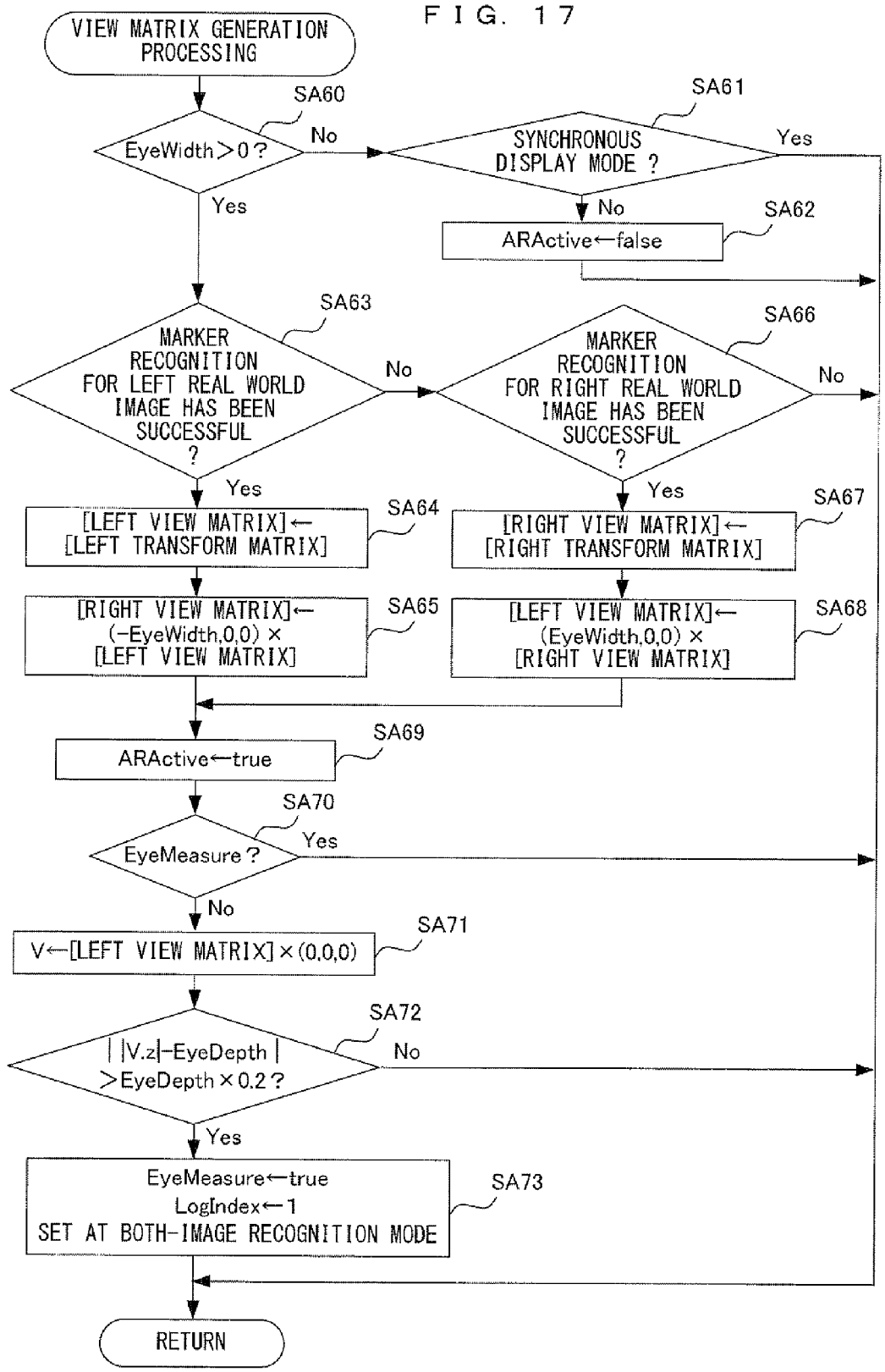
FIG. 17 is a flowchart showing the details of view matrix generation processing.

In step SA60 in FIG. 17, the CPU A311 determines whether or not the value of the EyeWidth is larger than 0. If the value of the EyeWidth is larger than 0, the CPU A311 proceeds to step SA63, and if not (that is, if the value of the EyeWidth is 0), the CPU A311 proceeds to step SA61.

In step SA61, the CPU A311 determines whether or not the display mode is the synchronous display mode. If the display mode is the synchronous display mode, the CPU A311 ends the view matrix generation processing, and if not (that is, if the display mode is the asynchronous display mode), the CPU A311 proceeds to step SA62.

In step SA62, the CPU A311 sets the value of the ARActive at false. Then, the CPU A311 ends the view matrix generation processing.

In step SA63, the CPU A311 determines whether or not the marker recognition for the left real world image has been successful, with reference to the left transform matrix A75L. If the marker recognition for the left real world image has been successful, the CPU A311 proceeds to step SA64, and if not (that is, the value of the left transform matrix A75L is a null value), the CPU A311 proceeds to step SA66.

In step SA64, the CPU A311 stores the value of the left transform matrix A75L in the left view matrix A76L. This means that the position and the orientation of the outer imaging section (left) A23a in the marker coordinate system, which are calculated based on the position and the orientation of the marker A61 in the left real world image, are directly used as the position and the orientation of the left virtual camera A63L for generating a virtual space image for a left eye.

Figure 30:
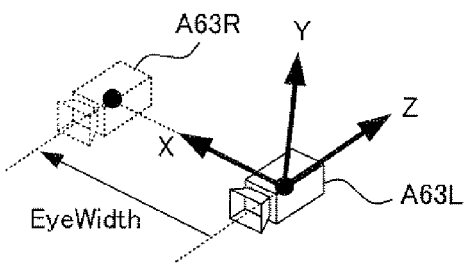
FIG. 30 shows the position of the right virtual camera A63R determined based on the position and the orientation of the left virtual camera A63L.

In step SA65, the CPU A311 stores, in the right view matrix A76R, the value of the left view matrix A76L multiplied by a parallel movement matrix (−EyeWidth, 0, 0). This means that a position that is separated by the value of the EyeWidth in the positive direction of the x-axis in the left virtual camera coordinate system from the position of the left virtual camera A63L in the world coordinate system of the virtual space, which has been set in step SA64, is used as the position of the right virtual camera A63R for generating a virtual space image for a right eye, as shown in FIG. 30. In addition, the orientation of the right virtual camera A63R is the same as that of the left virtual camera A63L (that is, the x-axis, the y-axis, and the z-axis in the left virtual camera coordinate system are in parallel with those in the right virtual camera coordinate system). As a result, the position and the orientation of the left virtual camera A63L, and the position and the orientation of the right virtual camera A63R are kept consistent with each other, whereby the virtual object A62 can be displayed on the upper LCD A22 so as to provide a normal stereoscopic view.

In step SA66, the CPU A311 determines whether or not the marker recognition for the right real world image has been successful, with reference to the right transform matrix A75R. If the marker recognition for the right real world image has been successful, the CPU A311 proceeds to step SA67, and if not (that is, the value of the right transform matrix A75R is a null value), the CPU A311 ends the view matrix generation processing.

In step SA67, the CPU A311 stores the value of the right transform matrix A75R in the right view matrix A76R. This means that the position and the orientation of the outer imaging section (right) A23b in the marker coordinate system, which are calculated based on the position and the orientation of the marker A61 in the right real world image, are directly used as the position and the orientation of the right virtual camera A63R for generating a virtual space image for a right eye.

Figure 31:
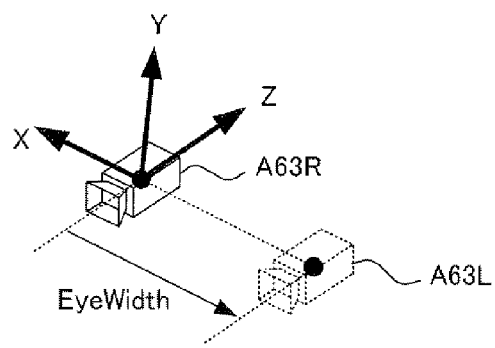
FIG. 31 shows the position of the left virtual camera A63L determined based on the position and the orientation of the right virtual camera A63R.

In step SA68, the CPU A311 stores, in the left view matrix A76L, the value of the right view matrix A76R multiplied by a parallel movement matrix (EyeWidth, 0, 0). This means that a position that is separated by the value of the EyeWidth in the negative direction of the x-axis in the right virtual camera coordinate system from the position of the right virtual camera A63R in the world coordinate system of the virtual space, which has been set in step SA67, is used as the position of the left virtual camera A63L for generating a virtual space image for a left eye, as shown in FIG. 31. In addition, the orientation of the left virtual camera A63L is the same as that of the right virtual camera A63R (that is, the x-axis, the y-axis, and the z-axis in the left virtual camera coordinate system are in parallel with those in the right virtual camera coordinate system). As a result, the position and the orientation of the left virtual camera A63L, and the position and the orientation of the right virtual camera A63R are kept consistent with each other, whereby the virtual object A62 can be displayed on the upper LCD A22 so as to provide normal stereoscopic viewing.

As described above, in the present embodiment, while the position and the orientation of one of the virtual cameras (for example, the left virtual camera A63L) are set by using (more specifically, directly using) a "marker-camera transform matrix" calculated from an image shot by one of the outer imaging sections (for example, the outer imaging section (left) A23a), the position and the orientation of the other one of the virtual cameras (for example, the right virtual camera A63R) are set without using a "marker-camera transform matrix" calculated from an image shot by the other one of the outer imaging sections (for example, the outer imaging section (right) A23b).

In providing a stereoscopic view of AR by using a stereo camera, two virtual cameras for right and left need to be set, and a transform matrix (left transform matrix A25L) for the outer imaging section (left) A23a and a transform matrix (right transform matrix A25R) for the outer imaging section (right) A23b are used as the "marker-camera transform matrices". In the present embodiment, in setting the virtual cameras A63L and A63R, the respective transform matrices A25L and A25R are not used. Instead, one transform matrix is set (one of the transform matrices A25L and A25R is directly used, or one new transform matrix (for example, using an average position and an average orientation) is generated from both the transform matrices A25L and A25R), and then the positions and the orientations of both the virtual cameras A63L and A63R are set by using the one transform matrix that has been set. In this way, problems on the accuracy of AR recognition can be solved.

In step SA69, the CPU A311 sets the value of AR-Active at true. As a result, processing of displaying the virtual object A62 being superimposed onto the real world image is started, or restarted.

In step SA70, the CPU A311 determines whether or not the value of the EyeMeasure is true. If the value of the EyeMeasure is true, the CPU A311 ends the view matrix generation processing, and if not (that is, if the value of the EyeMeasure is false), the CPU A311 proceeds to step SA71.

In step SA71, based on the left view matrix A76L determined in step SA64 or step SA68, the CPU A311 calculates coordinates V, of the origin of the virtual space, that are represented in the left virtual camera coordinate system. Specifically, as shown in FIG. 32, (0, 0, 0) is multiplied by the left view matrix A76L, thereby obtaining the coordinates V, of the origin of the virtual space, that are represented in the left virtual camera coordinate system. It is noted that in the present embodiment, the coordinates, of the origin of the virtual space, that are represented in the left virtual camera coordinate system are defined as V. However, instead, of the origin of the virtual space, that are represented in the right virtual camera coordinate system, which coordinates are calculated based on the right view matrix A76R determined in step SA65 or step SA67, may be defined as V. The V calculated as described above is substantially the same as the position of the marker A61 in the outer imaging section (left) coordinate system (it is noted that the value of the V is calculated in unit of length in the virtual space or the marker coordinate system, and does not coincides with unit of length in the real world).

In step SA72, the CPU A311 determines whether or not the absolute value of the difference between the absolute value (|V·z|) of the z-coordinate value of the V and the value of the EyeDepth is larger than 20 percent of the value of the EyeDepth. If the absolute value of the difference is larger than 20 percent of the value of the EyeDepth, the CPU A311 proceeds to step SA73, and if not, the CPU A311 ends the view matrix generation processing. The |V·| is substantially the same as the distance (depth), in the shooting direction, from the outer imaging section A23 to the marker A61. That is, in step SA72, the CPU A311 determines whether or not the depth distance (depth) from the outer imaging section A23 to the marker A61 has varied beyond a range of ±20 percent in comparison with the depth distance as it was when the value of the EyeWidth was calculated in the virtual cameras interval determination processing (FIG. 16).

In step SA73, the CPU A311 sets the value of the EyeMeasure at true, resets the value of the LogIndex at 1, and sets the marker recognition mode A79 at the both-image recognition mode, thereby ending the view matrix generation processing. As a result, calculation of the EyeWidth in the virtual cameras interval determination processing is started again.

Figure 33:
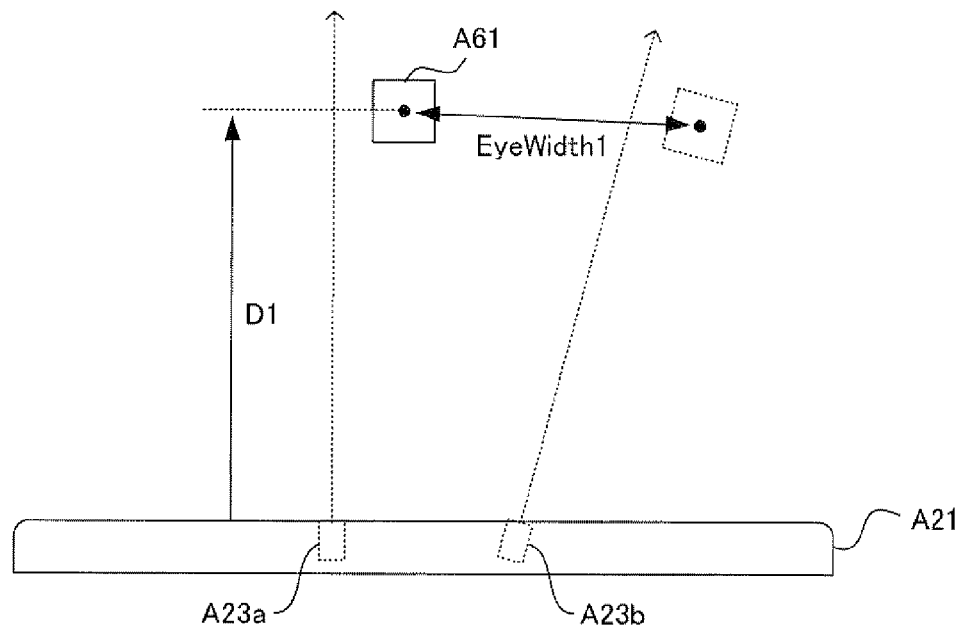
FIG. 33 is a diagram illustrating a reason for calculating EyeWidth again.
Figure 34:
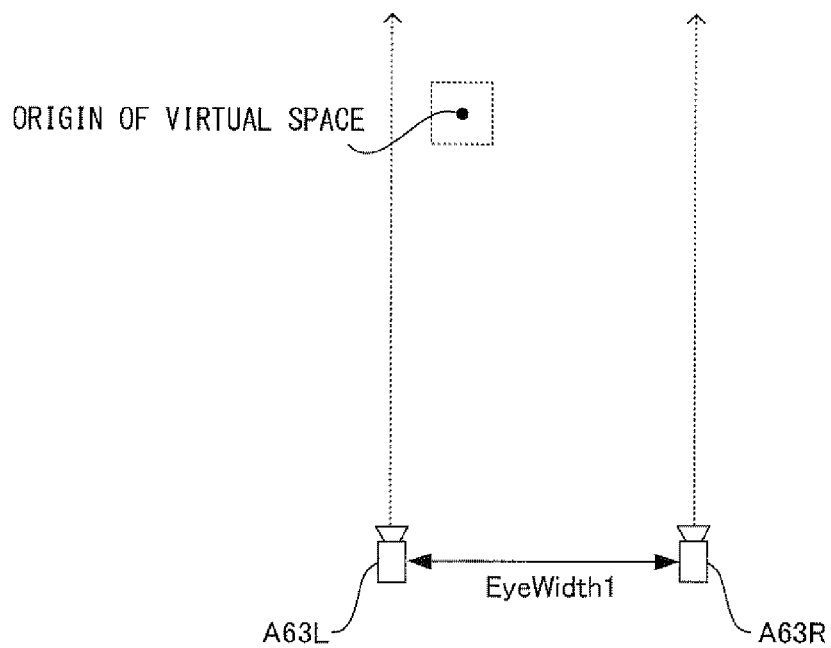
FIG. 34 is a diagram illustrating the reason for calculating EyeWidth again.
Figure 35:
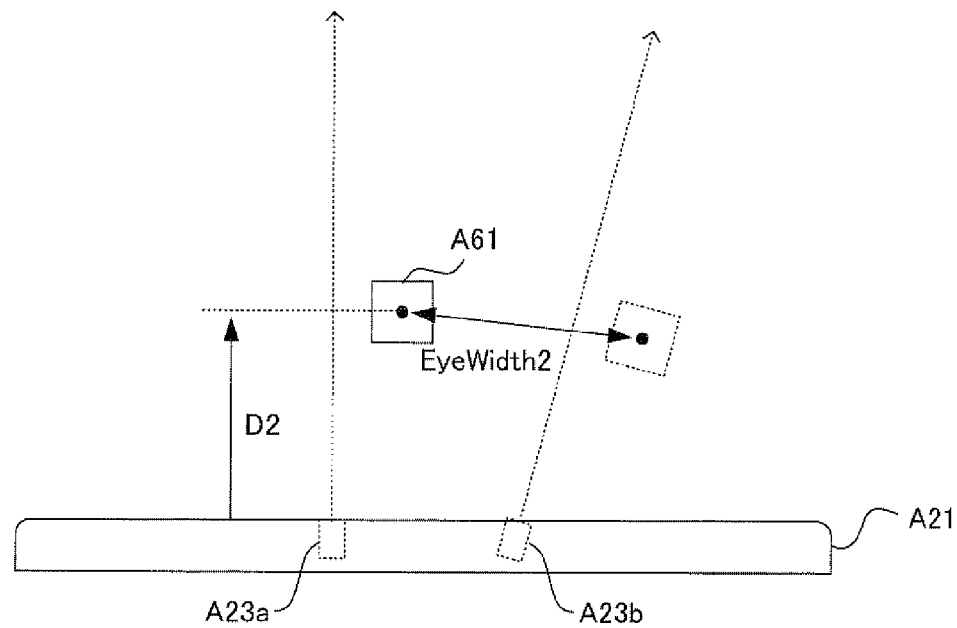
FIG. 35 is a diagram illustrating the reason for calculating EyeWidth again.
Figure 36:
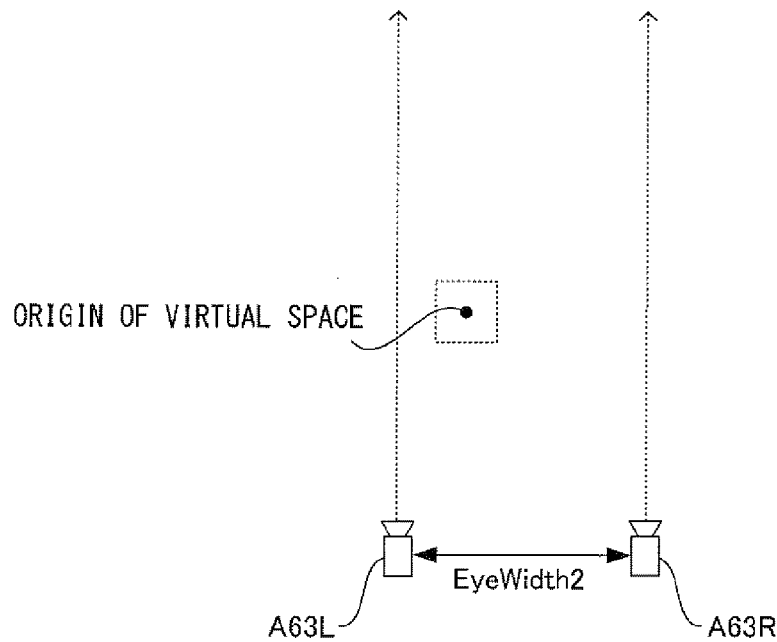
FIG. 36 is a diagram illustrating the reason for calculating EyeWidth again.

The reason why, as described above, the EyeWidth is calculated again when the depth distance (depth) from the outer imaging section A23 to the marker A61 has varied beyond a predetermined range in comparison with the depth distance as it was when the value of the EyeWidth was previously calculated in the virtual cameras interval determination processing, is because the optimum interval (EyeWidth) between the virtual cameras varies in accordance with the depth distance (depth) from the outer imaging section A23 to the marker A61 owing to error in the attachment of the outer imaging section (left) A23a and the outer imaging section (right) A23b to the game apparatus A10. For example, under the condition that the shooting direction of the outer imaging section (left) A23a and the shooting direction of the outer imaging section (right) A23b are not in parallel with each other, it is assumed that when the depth distance from the outer imaging section A23 to the marker A61 is D1, the value of the EyeWidth calculated in the virtual cameras interval determination processing is EyeWidth 1, as shown in FIG. 33. In this case, it is appropriate that in the virtual space, the left virtual camera A63L and the right virtual camera A63R are placed with an interval of the EyeWidth 1 provided therebetween as shown in FIG. 34 (as a result, for example, a virtual object placed at the origin of the virtual space is appropriately displayed in a stereoscopic manner as if the virtual object were really existent on the marker A61). Then, if the depth distance from the outer imaging section A23 to the marker A61 varies to D2 that is smaller than D1 as shown in FIG. 35, the value of the EyeWidth calculated in the virtual cameras interval determination processing is EyeWidth 2 that is smaller than the EyeWidth2. Therefore, it is appropriate that in the virtual space, the left virtual camera A63L and the right virtual camera A63R are placed with an interval of the EyeWidth 2 provided therebetween as shown in FIG. 36.

(Main Real World Image Setting Processing)

Next, the details of the main real world image setting processing in step SA45 in the updating processing (FIG. 15) will be described with reference to the flowchart in FIG. 18.

Figure 18:
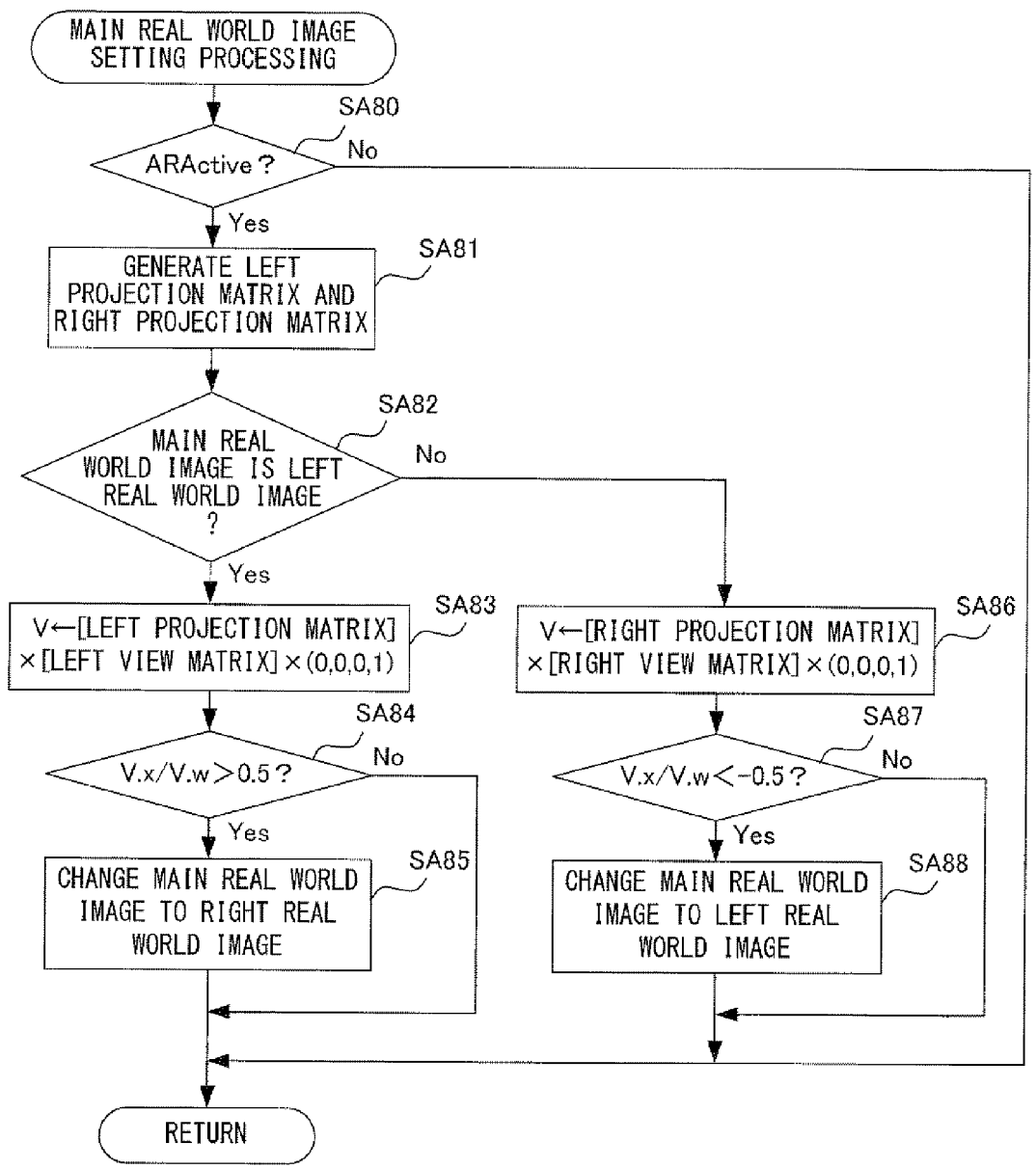
FIG. 18 is a flowchart showing the details of main real world image setting processing.

In step SA80 in FIG. 18, the CPU A311 determines whether or not the value of the AR-Active is true. If the value of the AR-Active is true, the CPU A311 proceeds to step SA81, and if not (that is, if the value of the AR-Active is false), the CPU A311 ends the main real world image setting processing.

Figure 37:
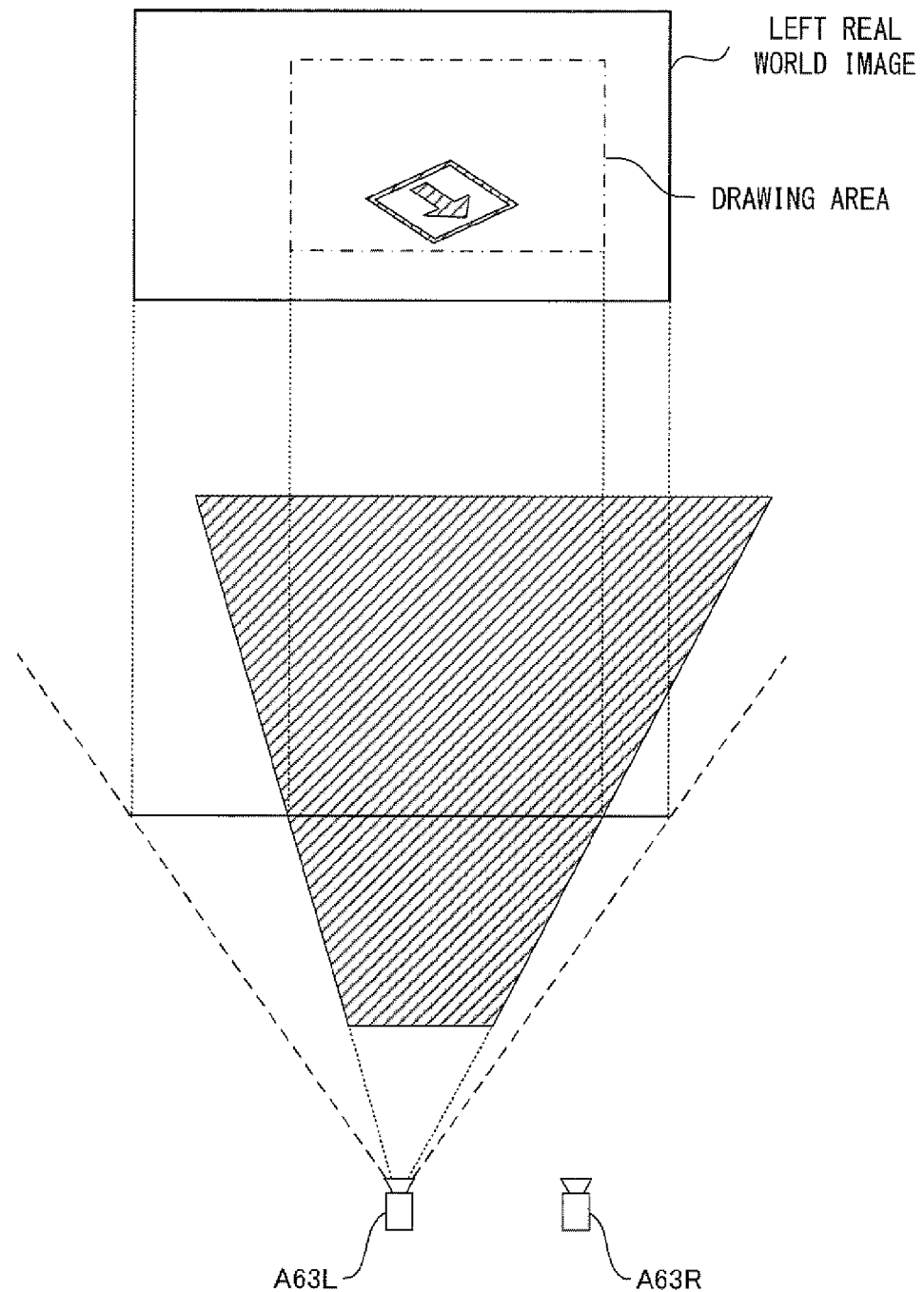
FIG. 37 is a diagram illustrating a left projection matrix.
Figure 38:
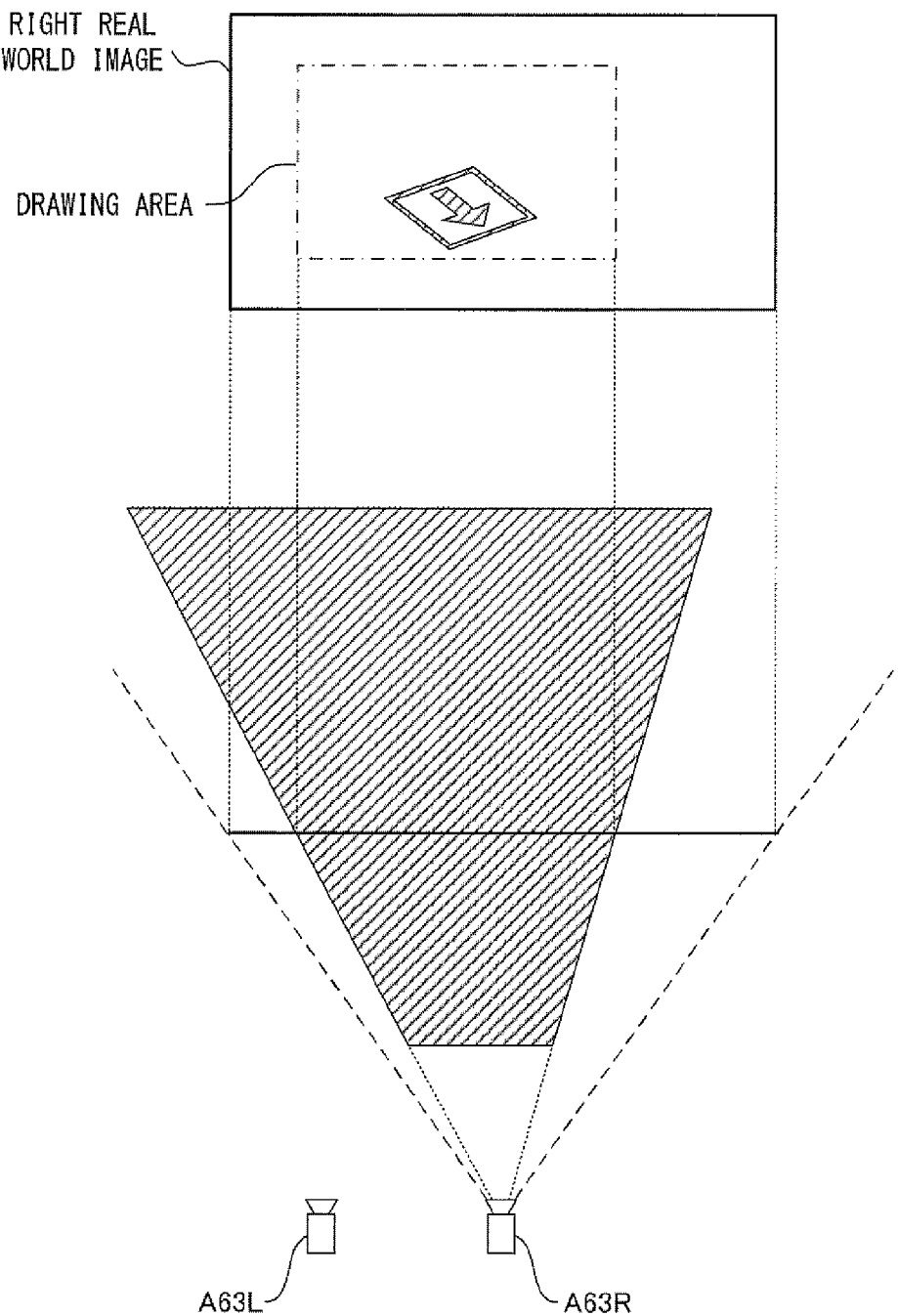
FIG. 38 is a diagram illustrating a right projection matrix.
Figure 39:
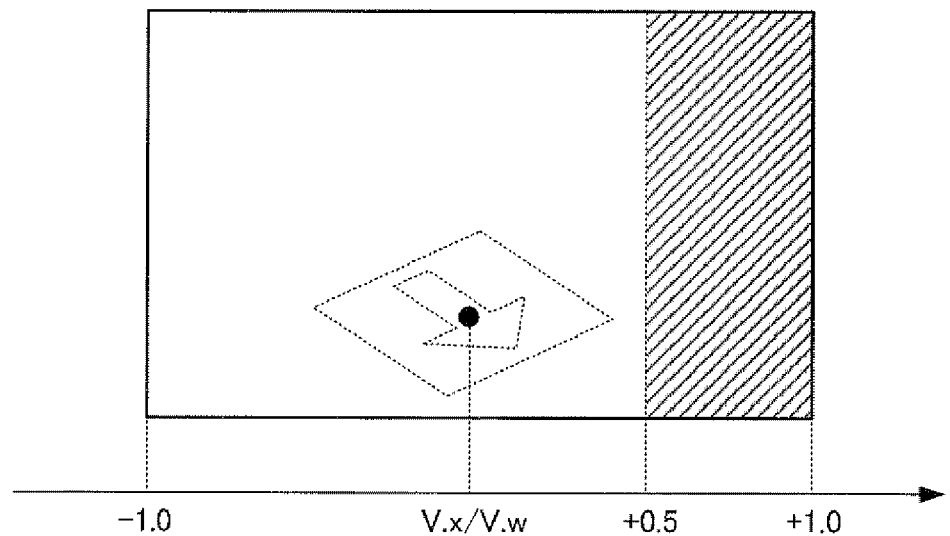
FIG. 39 is a diagram illustrating a method of determining whether or not to switch a main real world image from the left real world image to the right real world image.
Figure 40:
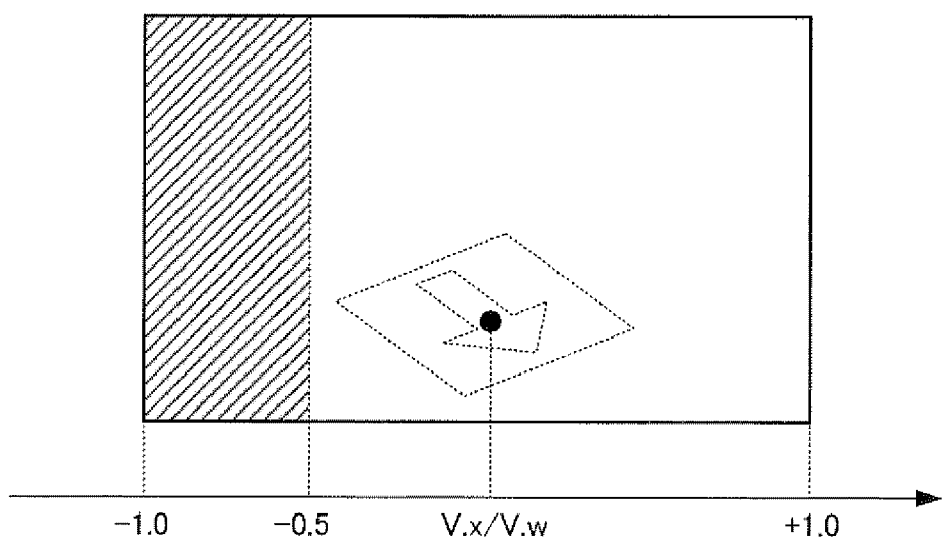
FIG. 40 is a diagram illustrating a method of determining whether or not to switch the main real world image from the right real world image to the left real world image.

In step SA81, the CPU A311 generates the left projection matrix A77L and the right projection matrix A77R. The left projection matrix A77L is a matrix for specifying a drawing area of the virtual space as viewed from the left virtual camera A63L. In the present embodiment, as shown in FIG. 37, the left projection matrix A77L is generated so as to correspond to the drawing area of the left real world image determined in step SA23 in the main processing. The right projection matrix A77R is a matrix for specifying a drawing area of the virtual space as viewed from the right virtual camera A63R. In the present embodiment, as shown in FIG. 38, the right projection matrix A77R is generated so as to correspond to the drawing area of the right real world image determined in step SA27 in the main processing.

Specifically, the projection matrix for the left virtual camera A63L is set as a projection matrix that defines a view volume that has an angle of view such that the ratio of the angle of view in the horizontal direction of the outer imaging section (left) A23a, and the angle of view in the horizontal direction of the left virtual camera A63L is the same as the ratio representing the position and the size in the lateral direction of the drawing area with respect to the length in the lateral direction of the left real world image.

In step SA82, the CPU A311 determines whether or not the left real world image is the main real world image. If the left real world image is the main real world image, the CPU A311 proceeds to step SA83, and if not (that is, if the right real world image is the main real world image), the CPU A311 proceeds to step SA86.

In step SA83, the CPU A311 multiplies (0, 0, 0, 1) by the left view matrix A76L and the left projection matrix A77L, thereby obtaining a vector V.

In step SA84, the CPU A311 determines whether or not a value (V·x/V·w) obtained by multiplying the first component (x) of the vector V by the fourth component (w) is larger than 0.5. If the value (V·x/V·w) is larger than 0.5, the CPU A311 proceeds to step SA85, and if not, the CPU A311 ends the main real world image setting processing. The value of the V·x/V·w indicates the position in the lateral direction, in the virtual space image for a left eye, where the origin of the world coordinate system in the virtual space is present (it is noted that the position in the lateral direction, in the virtual space image for a left eye, where the origin of the world coordinate system in the virtual space is present, is equivalent to the position in the lateral direction, in an image shot by the outer imaging section (left) A23a, where the origin of the marker coordinate system is present). If the origin of the world coordinate system in the virtual space is at the middle of the virtual space image for a left eye, the value of the V·x/V·w is 0. The value of the V·x/V·w approaches −1.0 as the origin of the world coordinate system in the virtual space approaches the left end of the virtual space image for a left eye, and the value of the V·x/V·w approaches +1.0 as the origin of the world coordinate system in the virtual space approaches the right end of the virtual space image for a left eye. If the value of V·x/V·w is larger than 0.5, the origin of the world coordinate system in the virtual space is in the right end area (diagonal-line area in FIG. 39) of the virtual space image for a left eye. In other words, the marker A61 is in the right end area of the left real world image shot by the outer imaging section (left) A23a.

In step SA85, the CPU A311 changes the main real world image from the left real world image to the right real world image. That is, in the virtual space image shot by the left virtual camera A63L, if the origin in the virtual space is present to the right of a position separated rightward by a predetermined distance (or by a predetermined percent of the lateral width of the virtual space image) from the middle of the virtual space image, the CPU A311 changes the main real world image to the right real world image. Alternatively, in the image shot by the outer imaging section (left) A23a, if the origin of the marker coordinate system is present to the right of a position separated rightward by a predetermined distance (or by a predetermined percent of the lateral width of the shot image) from the middle of the shot image, the CPU A311 changes the main real world image to the right real world image. Thus, even if, for example, the position of the marker A61 in the left real world image gradually moves rightward to end up disappearing from the left real world image, the CPU A311 changes the main real world image to the right real world image before the marker A61 disappears from the left real world image. Therefore, it is possible to continuously recognize the marker A61 in the one-image recognition mode. If processing in step SA85 has been finished, the main real world image setting processing is ended.

In step SA86, the CPU A311 multiplies (0, 0, 0, 1) by the right view matrix A76R and the right projection matrix A77R, thereby obtaining the vector V.

In step SA87, the CPU A311 determines whether or not the value (V·x/V·w) obtained by multiplying the first component (x) of the vector V by the fourth component (w) is smaller than −0.5. If the value (V·x/N·w) is smaller than −0.5, the CPU A311 proceeds to step SA87, and if not, the CPU A311 ends the main real world image setting processing. The value of the V·x/V·w indicates the position in the lateral direction, in the virtual space image for a right eye, where the origin of the world coordinate system in the virtual space is present. If the origin of the world coordinate system in the virtual space is at the middle of the virtual space image for a right eye, the value of the V·x/V·w is 0. The value of the V·x/V·w approaches −1.0 as the origin of the world coordinate system in the virtual space approaches the left end of the virtual space image for a right eye, and the value of the V·x/V·w approaches −1.0 as the origin of the world coordinate system in the virtual space approaches the right end of the virtual space image for a right eye. If the value of V·x/V·w is smaller than −0.5, the origin of the world coordinate system in the virtual space is in the left end area (diagonal-line area in FIG. 40) of the virtual space image for a right eye. In other words, the marker A61 is in the left end area of the right real world image shot by the outer imaging section (right) A23b.

In step SA88, the CPU A311 changes the main real world image from the right real world image to the left real world image. Thus, even if, for example, the position of the marker A61 in the right real world image gradually moves leftward to end up disappearing from the right real world image, the CPU A311 changes the main real world image to the left real world image before the marker A61 disappears from the right real world image. Therefore, it is possible to continuously recognize the marker A61 in the one-image recognition mode. If processing in step SA88 has been finished, the main real world image setting processing is ended.

(Display Mode Switching Processing)

Next, the details of the display mode switching processing in step SA46 in the updating processing (FIG. 15) will be described with reference to the flowchart in FIG. 19.

Figure 19:
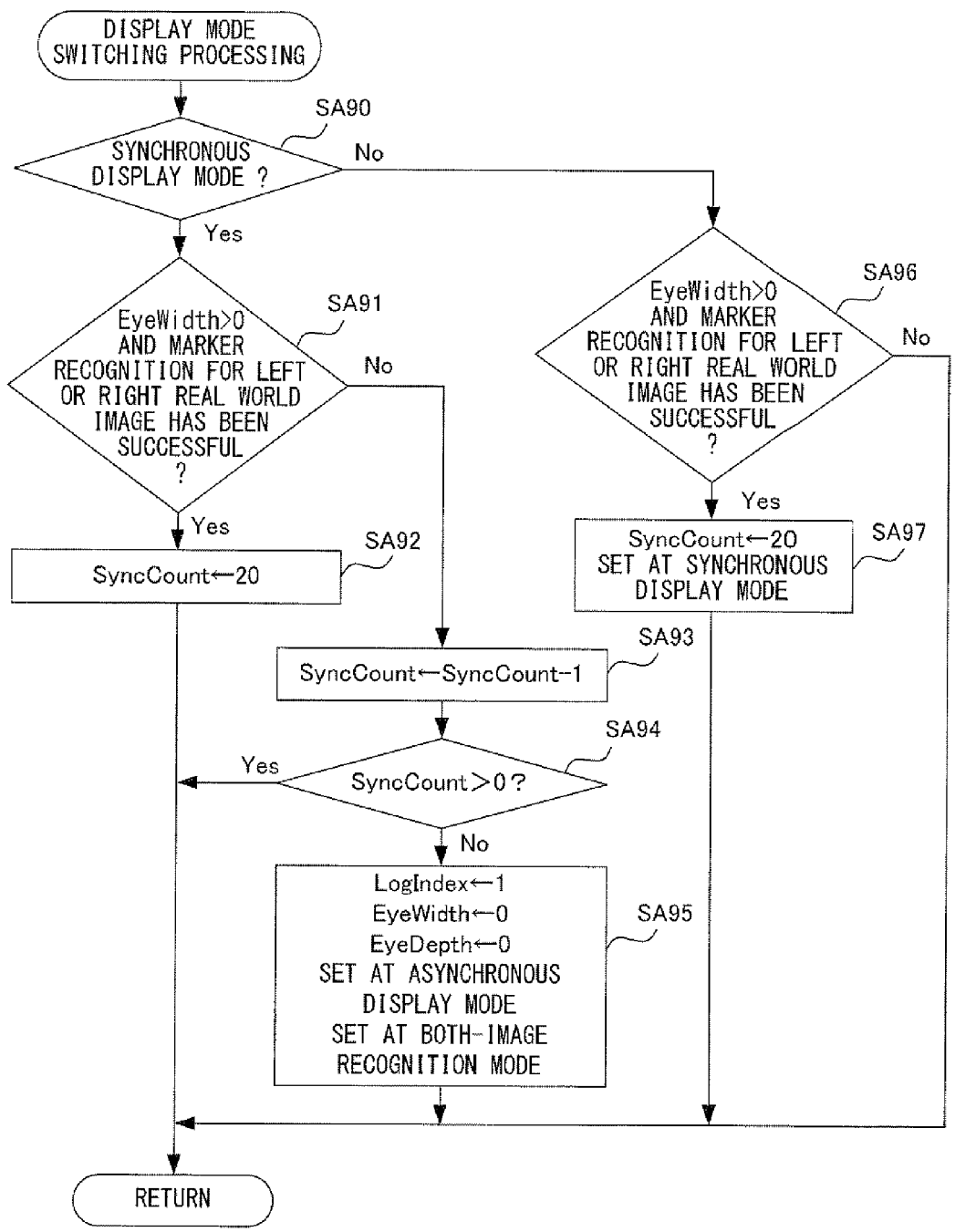
FIG. 19 is a flowchart showing the details of display mode switching processing.

In step SA90 in FIG. 19, the CPU A311 determines whether or not the display mode is the synchronous display mode. If the display mode is the synchronous display mode, the CPU A311 proceeds to step SA91, and if not (that is, if the display mode is the asynchronous display mode), the CPU A311 proceeds to step SA96.

In step SA91, the CPU A311 determines whether or not: the EyeWidth is larger than 0; and the marker recognition for the left real world image or the marker recognition for the right real world image has been successful. Then, if the result of the determination is positive, the CPU A311 proceeds to step SA92, and if the result of the determination is negative (that is, if the EyeWidth is 0 or if both the marker recognition for the left real world image and the marker recognition for the right real world image have been failed), the CPU A311 proceeds to step SA93.

In step SA92, the CPU A311 sets the value of SyncCount (see FIG. 12) at 20. The SyncCount is a variable for determining a timing of switching the display mode from the synchronous display mode to the asynchronous display mode. If processing in step SA92 has been finished, the display mode switching processing is ended.

In step SA93, the CPU A311 decrements the value of SyncCount.

In step SA94, the CPU A311 determines whether or not the value of the SyncCount is larger than 0. If the value of the SyncCount is larger than 0, the CPU A311 ends the display mode switching processing, and if not (that is, the value of the SyncCount is 0), the CPU A311 proceeds to step SA95.

In step SA95, the CPU A311 sets the value of the LogIndex at 1, sets the value of the EyeWidth and the value of the EyeDepth at 0, changes the display mode A78 from the synchronous display mode to the asynchronous display mode, and sets the marker recognition mode A79 to the both-image recognition mode. If processing in step SA95 has been finished, the display mode switching processing is ended.

In step SA96, the CPU A311 determines whether or not: the EyeWidth is larger than 0; and the marker recognition for the left real world image or the marker recognition for the right real world image has been successful. Then, if the result of the determination is positive, the CPU A311 proceeds to step SA97, and if the result of the determination is negative (that is, if the EyeWidth is 0 or if both the marker recognition for the left real world image and the marker recognition for the right real world image have been failed), the CPU A311 ends the display mode switching processing.

In step SA97, the CPU A311 sets the value of SyncCount at 20, and changes the display mode from the asynchronous display mode to the synchronous display mode. If processing in step SA97 has been finished, the display mode switching processing is ended.

As described above, the display mode switching processing appropriately switches the display mode between the synchronous display mode and the asynchronous display mode. More specifically, just after execution of the image display program has been started, the display mode is the asynchronous display mode, and the latest real world image is constantly displayed on the upper LCD A22. Thereafter, at the time when the marker A61 has been recognized and it has become possible to display the virtual object A62 being superimposed onto the real world image displayed on the upper LCD A22, the display mode is changed from the asynchronous display mode to the synchronous display mode. In the synchronous display mode, in order to superimpose and display the virtual object A62 at a proper position in the real world image, a composite image obtained by superimposing the virtual object A62 onto the last real world image in which the marker A61 has been recognized (which is not always the latest real world image) is displayed on the upper LCD A22. In this way, the position on the real world image where the virtual object A62 is superimposed and displayed can be prevented from being out of a proper position. Thereafter, at the time when the marker A61 has continued to be unrecognized for a predetermined time period, the display mode is changed from the synchronous display mode to the asynchronous display mode, and the latest real world image is constantly displayed on the upper LCD A22. In this way, when the marker A61 continues to be unrecognized, it is possible to prevent an old image from continuing to be displayed on the upper LCD A22.

EFFECTS OF THE PRESENT EMBODIMENT

As described above, in the present embodiment, the position and the orientation of one of the virtual cameras is determined based on the position and the orientation of one of the outer imaging sections (the outer imaging section (left) A23a or the outer imaging section (right) A23b) in the marker coordinate system, which are calculated from the result of the marker recognition for the corresponding one of the left real world image and the right real world image. In addition, the position and the orientation of the other one of the virtual cameras are determined such that the relationship between each of the position and the orientation of the left virtual camera A63L, and each of the position and the orientation of the right virtual camera A63R, is ideal. Therefore, the virtual object A62 can be displayed so as to provide a normal stereoscopic view, on a display apparatus capable of providing a stereoscopic view.

In addition, the interval between the two outer imaging sections are calculated based on the position of the outer imaging section (left) A23a calculated based on the result of the marker recognition for the left real world image, and the position of the outer imaging section (right) A23b calculated based on the result of the marker recognition for the right real world image. The virtual cameras interval (EyeWidth) is determined based on the result of the calculation. A position separated, by the calculated interval in the direction perpendicular to the shooting direction in a coordinate system of one of the virtual cameras, from the position of the one of the virtual cameras, is calculated, to set the other one of the virtual cameras at the calculated position. As a result, both the virtual cameras are set so as to be placed along the direction perpendicular to the shooting direction. In addition, even if the interval between the outer imaging section (left) A23a and the outer imaging section (right) A23b is not known, or even if the accuracy in the attachment of the outer imaging section (left) A23a and the outer imaging section (right) A23b to the game apparatus A10 is bad, it is possible to place the left virtual camera A63L and the right virtual camera A63R with an ideal interval provided therebetween.

In addition, after the virtual cameras interval (Eye Width) has been determined in the virtual cameras interval determination processing, the marker recognition processing needs to be performed only for the main real world image. Therefore, a load of processing can be reduced in comparison with the case where the marker recognition processing is always performed for both the left real world image and the right real world image.

It is noted that if the interval between the outer imaging section (left) A23a and the outer imaging section (right) A23b is known, the interval (EyeWidth), between the outer imaging section (left) A23a and the outer imaging section (right) A23b in the marker coordinate system, that corresponds to the interval (for example, 3.5 cm) between the outer imaging section (left) A23a and the outer imaging section (right) A23b in the real world, is figured out based on the result of the virtual cameras interval determination processing. Therefore, for example, it is possible to, in the virtual space, perform processing based on a scale of the real world such as displaying a character (virtual object) having a height of 30 cm being superimposed onto the real world image, or moving a character (virtual object) displayed being superimposed onto the real world image real world image at a velocity of 10 cm per second.

(Variations)

It is noted that in the present embodiment, the position and the orientation of the marker A61 in the real world image are recognized, and the virtual object A62 is superimposed onto the real world image in accordance with the result of the recognition. However, in other embodiments, instead of the marker A61, the position and/or the orientation of any recognition target may be recognized, and the virtual object A62 may be superimposed onto the real world image in accordance with the result of the recognition. An example of a recognition target is the face of a person.

In addition, in the present embodiment, a stereoscopic image is displayed on the upper LCD A22, based on the real world image being shot in real time by the outer imaging section A23. However, in other embodiments, a stereoscopic image may be displayed on the upper LCD A22, based on data of moving images shot in the past by the outer imaging section A23, an external stereo camera, or the like.

In addition, in the present embodiment, the outer imaging section A23 is provided in the game apparatus A10 in advance. However, in other embodiments, an external camera attachable to and detachable from the game apparatus A10 may be used.

In addition, in the present embodiment, the upper LCD A22 is provided in the game apparatus A10 in advance. However, in other embodiments, an external stereoscopic display attachable to and detachable from the game apparatus A10 may be used.

In addition, in the present embodiment, the virtual object A62 is placed at the position of the origin of the marker coordinate system. However, in other embodiments, the virtual object A62 may be placed at a position away from the origin of the marker coordinate system.

In addition, in the present embodiment, one virtual object is placed in the virtual space. However, in other embodiments, a plurality of virtual objects may be placed in the virtual space.

In addition, in the present embodiment, in the virtual cameras interval determination processing, the interval (EyeWidth) between the outer imaging section (left) A23a and the outer imaging section (right) A23b in the marker coordinate system is calculated, and based on the interval, the position and the orientation of one of the left virtual camera A63L and the right virtual camera A63R are determined from the position and the orientation of the other one of the virtual cameras calculated based on the result of the marker recognition. However, in other embodiments, the position and the orientation of the outer imaging section A23 (for example, the average position of the position of the outer imaging section (right) A23a and the position of the outer imaging section (left) A23b, and the average orientation of the orientation of the outer imaging section (right) A23a and the orientation of the outer imaging section (left) A23b) may be calculated based on the position and the orientation of the outer imaging section (left) A23a calculated based on the result of the marker recognition for the left real world image, and the position and the orientation of the outer imaging section (right) A23b calculated based on the result of the marker recognition for the right real world image. Based on the result of the calculation, the positions and/or the orientations of the left virtual camera A63L and the right virtual camera A63R may be determined. For example, the orientations of the left virtual camera A63L and the right virtual camera A63R may be determined such that both the orientations are intermediate between the orientation of the outer imaging section (left) A23a calculated based on the result of the marker recognition for the left real world image, and the orientation of the outer imaging section (right) A23b calculated based on the result of the marker recognition for the right real world image. In addition, for example, after the interval (EyeWidth) between the outer imaging section (left) A23a and the outer imaging section (right) A23b is calculated in the virtual cameras interval determination processing, positions separated, by distances of EyeWidth/2 in the respective directions opposite to each other and perpendicular to the shooting direction of the virtual cameras, from a position in the virtual space corresponding to the average position of the position of the outer imaging section (left) A23a calculated based on the result of the marker recognition for the left real world image, and the position of the outer imaging section (right) A23b calculated based on the result of the marker recognition for the right real world image, may be calculated, and the positions of the left virtual camera A63L and the right virtual camera A63R may be determined so as to be the calculated positions.

In addition, in the present embodiment, after the virtual cameras interval (EyeWidth) is calculated in the virtual cameras interval determination processing, the marker recognition processing is performed for only the main real world image. However, in other embodiments, the marker recognition processing may be always performed for both the left real world image and the right real world image.

In addition, in the present embodiment, the upper LCD A22 is a stereoscopic display apparatus of a parallax barrier type. However, in other embodiments, the upper LCD A22 may be a stereoscopic display apparatus of any other type such as lenticular lens type. For example, if a stereoscopic display apparatus of a lenticular lens type is used, an image for a left eye and an image for a right eye may be combined with each other by the CPU A311 or another processor, and the resultant composite image may be supplied to the stereoscopic display apparatus of a lenticular lens type.

In addition, in the present embodiment, the game apparatus A10 is used for superimposing a virtual object onto the real world image and displaying the resultant image. However, in another embodiment, any information processing apparatus or any information processing system (for example, a PDA (Personal Digital Assistant), a mobile phone, a personal computer, or a camera) may be used for superimposing a virtual object onto the real world image and displaying the resultant image.

In addition, in the present embodiment, the image display processing is executed by using only one information processing apparatus (game apparatus A10). However, in other embodiments, a plurality of information processing apparatuses, included in an image display system, that can communicate with each other may share the execution of the image display processing.

(Structure of Game Apparatus)

Hereinafter, a game apparatus as an information processing apparatus according to another embodiment of the present invention will be described. The present invention is not limited to such an apparatus. An information processing program to be executed in such an apparatus and an information processing system relating to such an apparatus are also within the scope of the present invention. Further, an information processing method performed by such an apparatus is also within the scope of the present invention.

Figure 41:
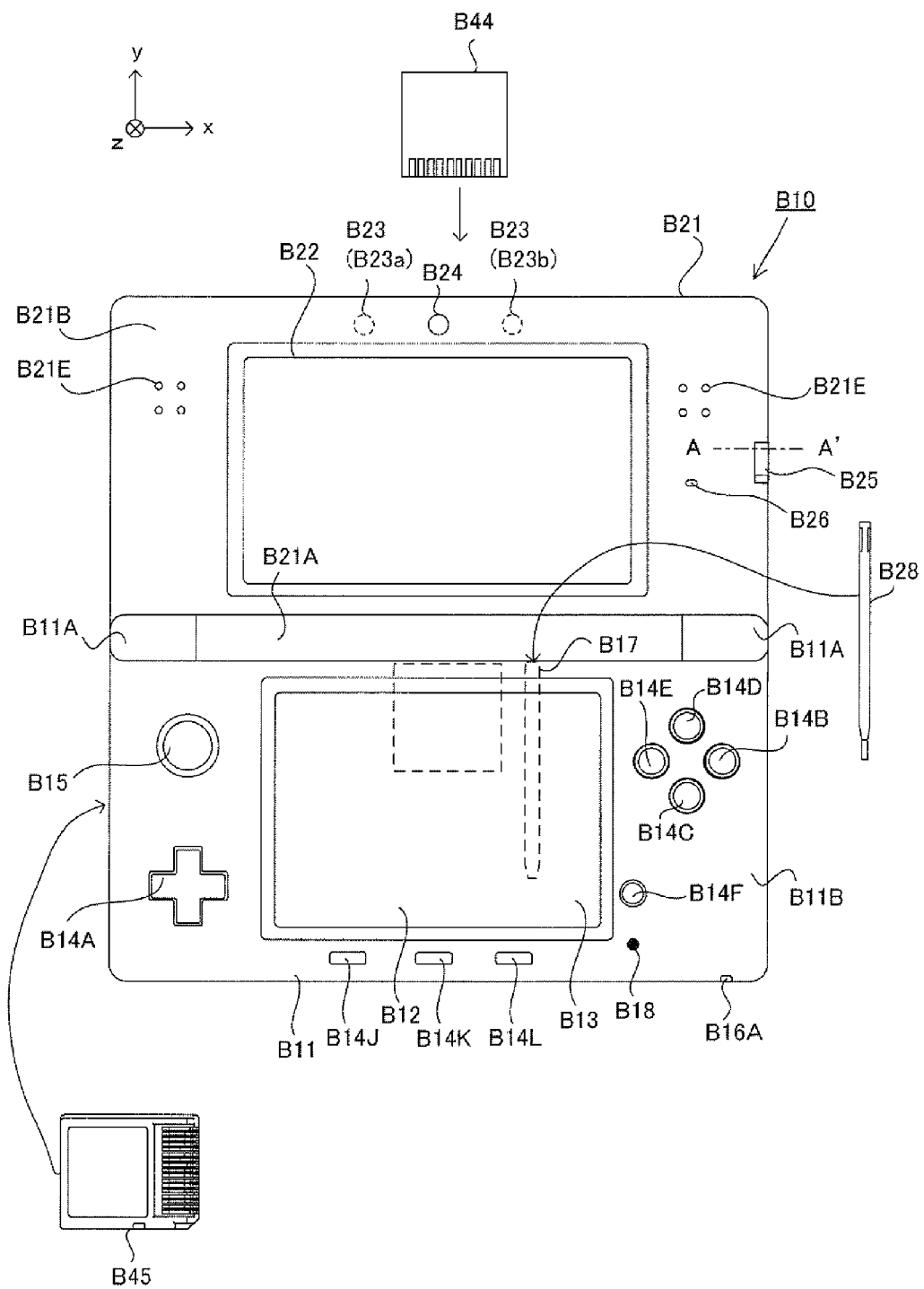
FIG. 41 is a front view of a game apparatus B10 in its opened state.
Figure 42:
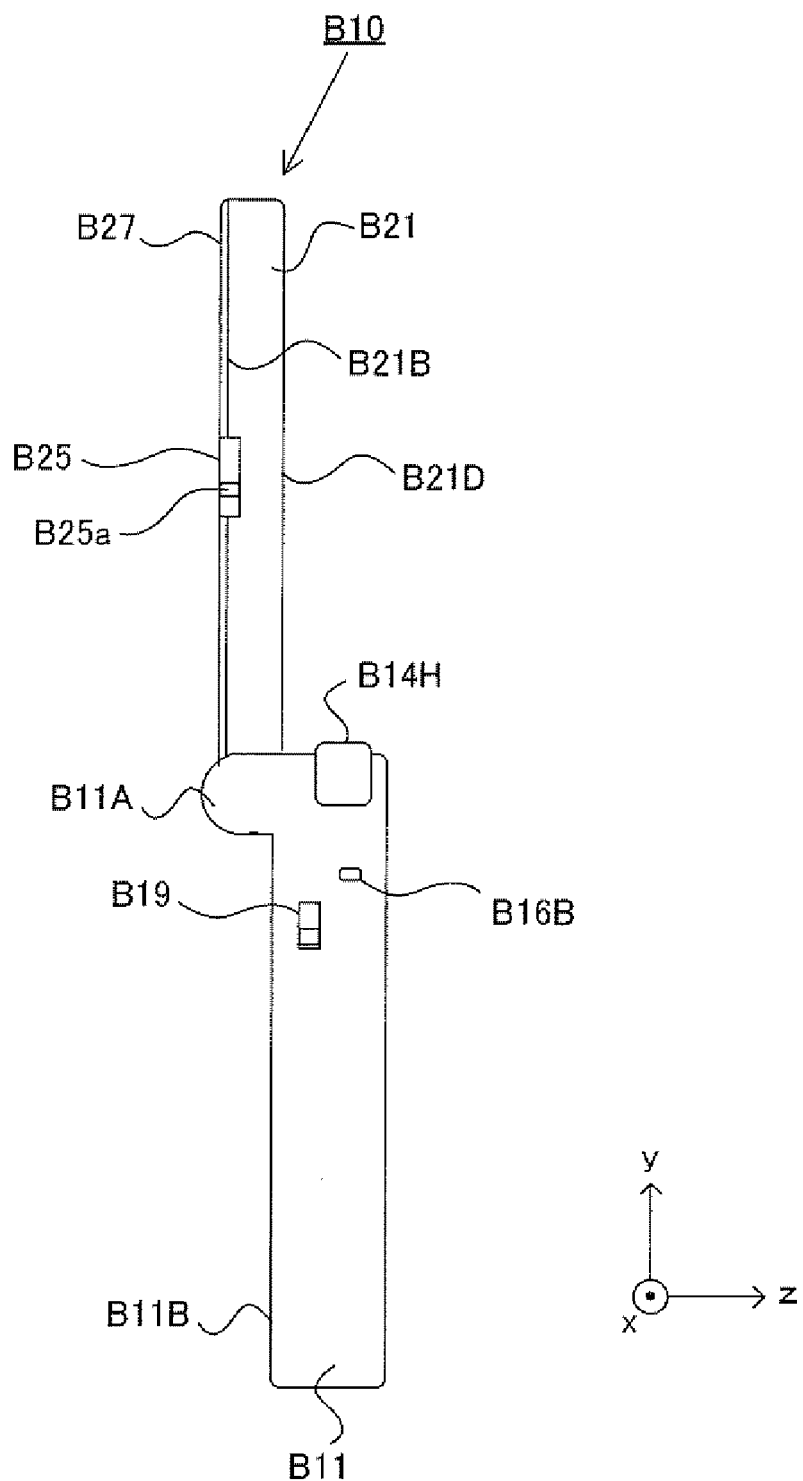
FIG. 42 is a right side view of the game apparatus B10 in its opened state.
Figure 43:
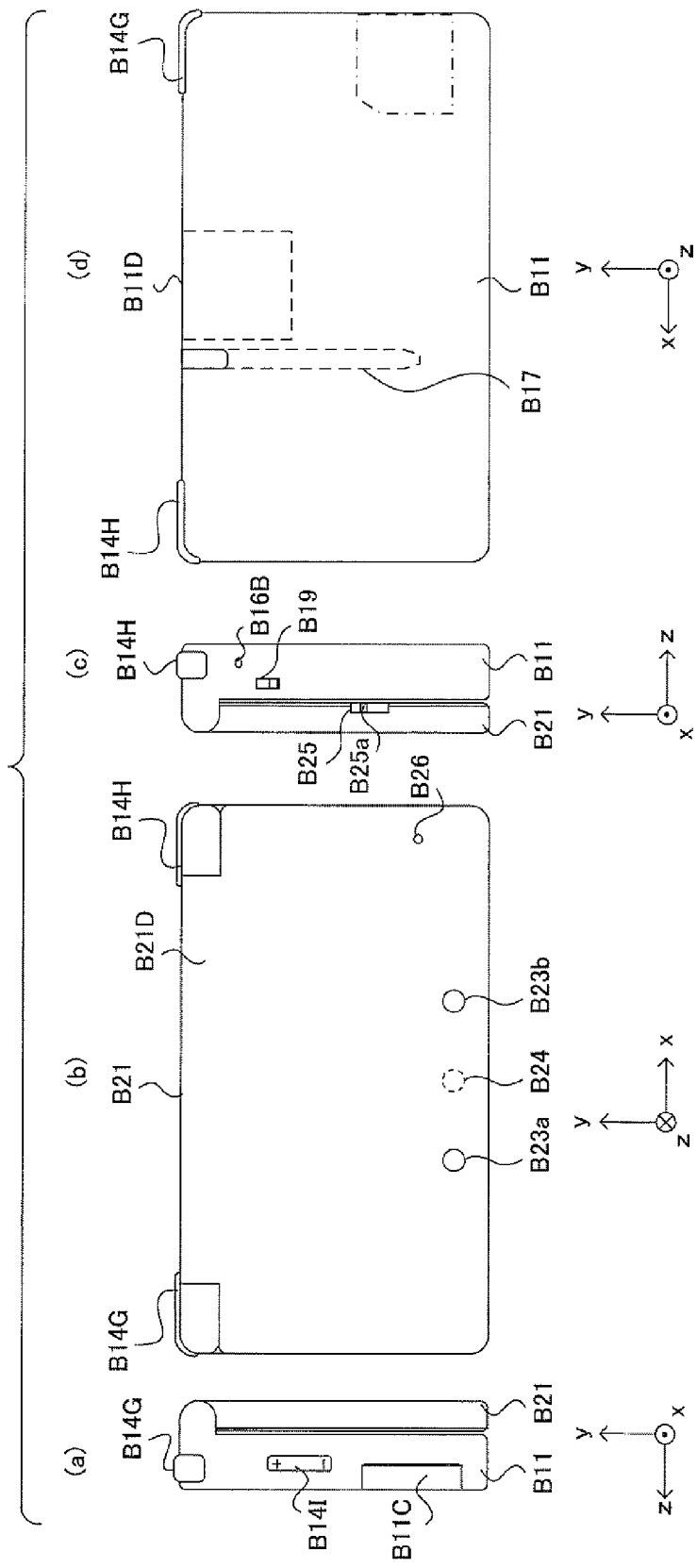
FIG. 43 shows a left side view, a front view, a right side view, and a rear view of the game apparatus B10 in its closed state.

FIG. 41 to FIG. 43 are each a plan view of an outer appearance of a game apparatus B10. The game apparatus B10 is a hand-held game apparatus, and is configured to be foldable as shown in FIG. 41 to FIG. 43. FIG. 41 and FIG. 42 show the game apparatus B10 in an opened state, and FIG. 43 shows the game apparatus B10 in a closed state. FIG. 41 is a front view of the game apparatus B10 in the opened state, and FIG. 42 is a right side view of the game apparatus B10 in the opened state. The game apparatus B10 is able to shoot an image by means of an imaging section, display the shot image on a screen, and store data of the shot image. The game apparatus B10 can execute a game program which is stored in an exchangeable memory card or a game program which is received from a server or another game apparatus, and can display, on the screen, an image generated by computer graphics processing, such as an image shot by a virtual camera set in a virtual space, for example.

Initially, an external structure of the game apparatus B10 will be described with reference to FIG. 41 to FIG. 43. The game apparatus B10 includes a lower housing B11 and an upper housing B21 as shown in FIG. 41 to FIG. 43. The lower housing B11 and the upper housing B21 are connected to each other so as to be openable and closable (foldable). In the present embodiment, the lower housing B11 and the upper housing B21 are each formed in a horizontally long plate-like rectangular shape, and are connected to each other at long side portions thereof so as to be pivotable with respect to each other.

As shown in FIG. 41 and FIG. 42, projections B11A each of which projects in a direction orthogonal to an inner side surface (main surface) B11B of the lower housing B11 are provided at the upper long side portion of the lower housing B11, whereas a projection B21A which projects from the lower side surface of the upper housing B21 in a direction orthogonal to the lower side surface of the upper housing B21 is provided at the lower long side portion of the upper housing B21. Since the projections B11A of the lower housing B11 and the projection B21A of the upper housing B21 are connected to each other, the lower housing B11 and the upper housing B21 are foldably connected to each other.

(Description of Lower Housing)

Initially, a structure of the lower housing B11 will be described. As shown in FIG. 41 to FIG. 43, in the lower housing B11, a lower LCD (Liquid Crystal Display) B12, a touch panel B13, operation buttons B14A to B14L (FIG. 41, FIG. 43), an analog stick B15, an LED B16A and an LED B16B, an insertion opening B17, and a microphone hole B18 are provided. Hereinafter, these components will be described in detail.

As shown in FIG. 41, the lower LCD B12 is accommodated in the lower housing B11. The lower LCD B12 has a horizontally long shape, and is located such that a long side direction thereof corresponds to a long side direction of the lower housing B11. The lower LCD B12 is positioned at the center of the lower housing B11. The lower LCD B12 is provided on the inner side surface (main surface) of the lower housing B11, and a screen of the lower LCD B12 is exposed at an opening of the lower housing B11. When the game apparatus B10 is not used, the game apparatus B10 is in the closed state, thereby preventing the screen of the lower LCD B12 from becoming unclean and damaged. The number of pixels of the lower LCD B12 may be, for example, 256 dots×192 dots (width×height). The lower LCD B12 is a display device for displaying an image in a planar manner (not in a stereoscopically visible manner), which is different from the upper LCD B22 as described below. Although an LCD is used as a display device in the present embodiment, any other display device such as a display device using an EL (Electro Luminescence), or the like may be used. In addition, a display device having any resolution may be used as the lower LCD B12.

As shown in FIG. 41, the game apparatus B10 includes the touch panel B13 as an input device. The touch panel B13 is mounted on the screen of the lower LCD B12. In the present embodiment, the touch panel B13 may be, but is not limited to, a resistive film type touch panel. A touch panel of any type such as electrostatic capacitance type may be used. In the present embodiment, the touch panel B13 has the same resolution (detection accuracy) as that of the lower LCD B12. However, the resolution of the touch panel B13 and the resolution of the lower LCD B12 may not necessarily be the same. Further, the insertion opening B17 (indicated by dashed line in FIG. 41 and FIG. 43D) is provided on the upper side surface of the lower housing B11. The insertion opening B17 is used for accommodating a touch pen B28 which is used for performing an operation on the touch panel B13. Although an input on the touch panel B13 is usually made by using the touch pen B28, a finger of a user may be used for making an input on the touch panel B13, in addition to the touch pen B28.

The operation buttons B14A to B14L are each an input device for making a predetermined input. As shown in FIG. 41, among operation buttons B14A to B14L, a cross button B14A (a direction input button B14A), a button B14B, a button B14C, a button B14D, a button B14E, a power button B14F, a selection button B14J, a HOME button B14K, and a start button B14L are provided on the inner side surface (main surface) of the lower housing B11. The cross button B14A is cross-shaped, and includes buttons for indicating an upward, a downward, a leftward, or a rightward direction. The button B14B, button B14C, button B14D, and button B14E are positioned so as to form a cross shape. The button B14A to B14E, the selection button B14J, the HOME button B14K, and the start button B14L are assigned functions, respectively, in accordance with a program executed by the game apparatus B10, as necessary. For example, the cross button B14A is used for selection operation and the like, and the operation buttons B14B to B14E are used for, for example, determination operation and cancellation operation. The power button B14F is used for powering the game apparatus B10 on/off.

The analog stick B15 is a device for indicating a direction, and is provided to the left of the lower LCD B12 in an upper portion of the inner side surface of the lower housing B11. As shown in FIG. 41, the cross button B14A is provided to the left of the lower LCD B12 in the lower portion of the lower housing B11. That is, the analog stick B15 is provided above the cross button B14A. The analog stick B15 and the cross button B14A are positioned so as to be operated by a thumb of a left hand with which the lower housing is held. Further, the analog stick B15 is provided in the upper area, and thus the analog stick B15 is positioned such that a thumb of a left hand with which the lower housing B11 is held is naturally positioned on the position of the analog stick B15, and the cross button B14A is positioned such that the thumb of the left hand is positioned on the position of the cross button B14A when the thumb of the left hand is slightly moved downward from the analog stick B15. The analog stick B15 has a top, corresponding to a key, which slides parallel to the inner side surface of the lower housing B11. The analog stick B15 acts in accordance with a program executed by the game apparatus B10. For example, when a game in which a predetermined object appears in a 3-dimensional virtual space is executed by the game apparatus B10, the analog stick B15 acts as an input device for moving the predetermined object in the 3-dimensional virtual space. In this case, the predetermined object is moved in a direction in which the top corresponding to the key of the analog stick B15 slides. As the analog stick B15, a component which enables an analog input by being tilted by a predetermined amount, in any direction, such as the upward, the downward, the rightward, the leftward, or the diagonal direction, may be used.

Four buttons, that is, the button B14B, the button B14C, the button B14D, and the button B14E, which are positioned so as to form a cross shape, are positioned such that a thumb of a right hand with which the lower housing B11 is held is naturally positioned on the positions of the four buttons. Further, the four buttons and the analog stick B15 sandwich the lower LCD B12, so as to be bilaterally symmetrical in position with respect to each other. Thus, depending on a game program, for example, a left-handed person can make a direction instruction input by using these four buttons.

Further, the microphone hole B18 is provided on the inner side surface of the lower housing B11. Under the microphone hole B18, a microphone (see FIG. 47) is provided as a sound input device described below, and the microphone detects for a sound from the outside of the game apparatus B10.

FIG. 43(a) is a left side view of the game apparatus B10 in the closed state. FIG. 43(b) is a front view of the game apparatus B10 in the closed state. FIG. 43(c) is a right side view of the game apparatus B10 in the closed state. FIG. 43(d) is a rear view of the game apparatus B10 in the closed state. As shown in FIG. 43(b) and FIG. 43(d), an L button B14G and an R button B14H are provided on the upper side surface of the lower housing B11. The L button B14G is positioned on the left end portion of the upper side surface of the lower housing B11 and the R button B14H is positioned on the right end portion of the upper side surface of the lower housing B11. As described below, the L button B14G and the R button B14H act as shutter buttons (imaging instruction buttons) of the imaging section. Further, as shown in FIG. 43(a), a sound volume button B141 is provided on the left side surface of the lower housing B11. The sound volume button B141 is used for adjusting a sound volume of a speaker of the game apparatus B10.

As shown in FIG. 43(a), a cover section B11C is provided on the left side surface of the lower housing B11 so as to be openable and closable. Inside the cover section B11C, a connector (not shown) is provided for electrically connecting between the game apparatus B10 and an external data storage memory B45. The external data storage memory B45 is detachably connected to the connector. The external data storage memory B45 is used for, for example, recording (storing) data of an image shot by the game apparatus B10. The connector and the cover section B11C may be provided on the right side surface of the lower housing B11.

Further, as shown in FIG. 43(d), an insertion opening B11D through which an external memory B44 having a game program stored therein is inserted is provided on the upper side surface of the lower housing B11. A connector (not shown) for electrically connecting between the game apparatus B10 and the external memory B44 in a detachable manner is provided inside the insertion opening B11D. A predetermined game program is executed by connecting the external memory B44 to the game apparatus B10. The connector and the insertion opening B11D may be provided on another side surface (for example, the right side surface) of the lower housing B11.

Further, as shown in FIG. 41 and FIG. 43(c), a first LED B16A for notifying a user of an ON/OFF state of a power supply of the game apparatus B10 is provided on the lower side surface of the lower housing B11, and a second LED B16B for notifying a user of an establishment state of a wireless communication of the game apparatus B10 is provided on the right side surface of the lower housing B11. The game apparatus B10 can make wireless communication with other devices, and the second LED B16B is lit up when the wireless communication is established. The game apparatus B10 has a function of connecting to a wireless LAN in a method based on, for example, IEEE 802.11.b/g standard. A wireless switch B19 for enabling/disabling the function of the wireless communication is provided on the right side surface of the lower housing B11 (see FIG. 43(c)).

A rechargeable battery (not shown) acting as a power supply for the game apparatus B10 is accommodated in the lower housing B11, and the battery can be charged through a terminal provided on a side surface (for example, the upper side surface) of the lower housing B11.

(Description of Upper Housing)

Next, a structure of the upper housing B21 will be described. As shown in FIG. 41 to FIG. 43, in the upper housing B21, an upper LCD (Liquid Crystal Display) B22, an outer imaging section B23 (an outer imaging section (left) B23a and an outer imaging section (right) B23b), an inner imaging section B24, a 3D adjustment switch B25, and a 3D indicator B26 are provided. Hereinafter, theses components will be described in detail.

As shown in FIG. 41, the upper LCD B22 is accommodated in the upper housing B21. The upper LCD B22 has a horizontally long shape, and is located such that a long side direction thereof corresponds to a long side direction of the upper housing B21. The upper LCD B22 is positioned at the center of the upper housing B21. The area of a screen of the upper LCD B22 is set so as to be greater than the area of the screen of the lower LCD B12. Further, the screen of the upper LCD B22 is horizontally elongated as compared to the screen of the lower LCD B12. Specifically, a rate of the horizontal width in the aspect ratio of the screen of the upper LCD B22 is set so as to be greater than a rate of the horizontal width in the aspect ratio of the screen of the lower LCD B12.

Figure 44:
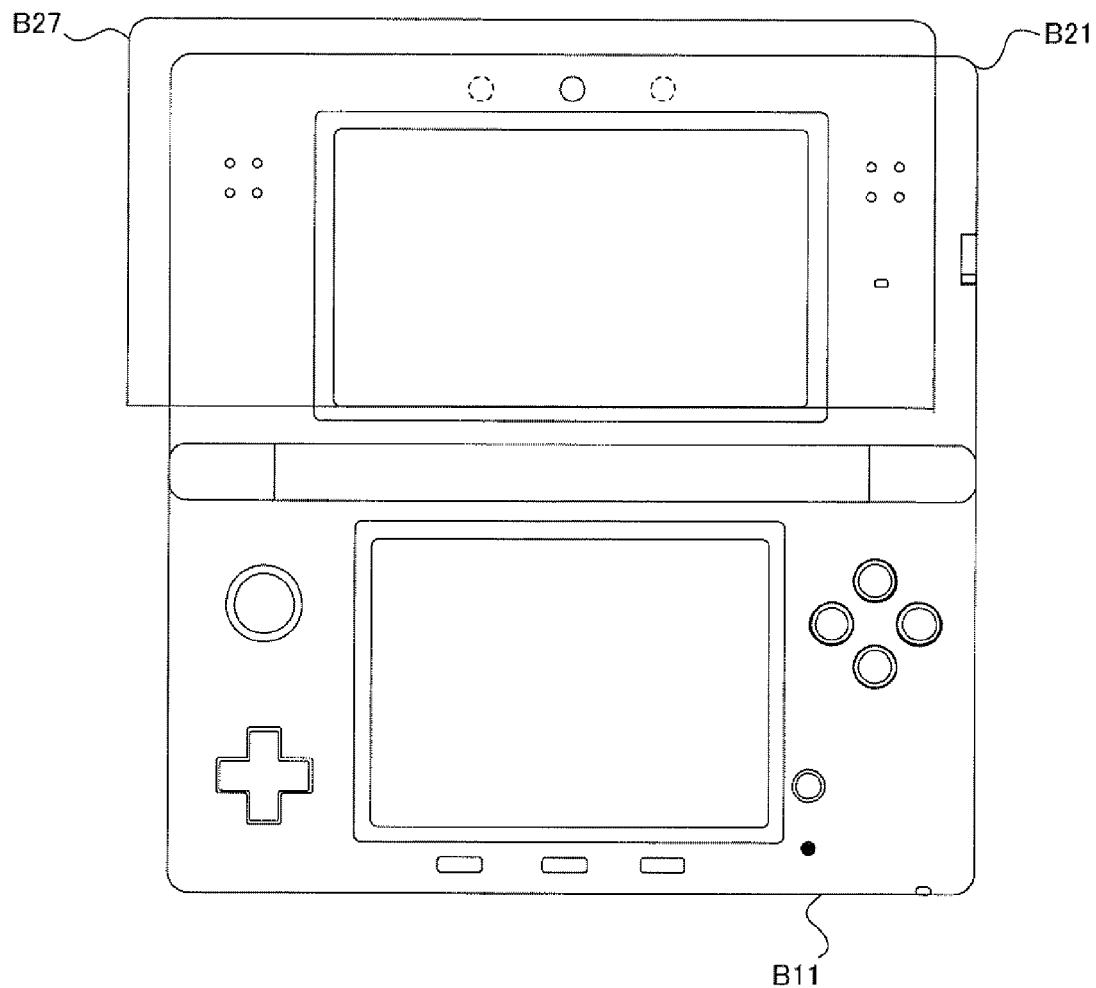
FIG. 44 is an exploded view illustrating a state in which a screen cover B27 is removed from an inner side surface of an upper housing B21.

The screen of the upper LCD B22 is provided on the inner side surface (main surface) B21B of the upper housing B21, and the screen of the upper LCD B22 is exposed at an opening of the upper housing B21. Further, as shown in FIG. 42 and FIG. 44, the inner side surface of the upper housing B21 is covered with a transparent screen cover B27. FIG. 44 is an exploded view illustrating a state in which the screen cover B27 is removed from the inner side surface of the upper housing B21. The screen cover B27 protects the screen of the upper LCD B22, and integrates the upper LCD B22 and the inner side surface of the upper housing B21 with each other, thereby achieving unity. The number of pixels of the upper LCD B22 may be, for example, 640 dots×200 dots (the horizontal line×the vertical line). Although, in the present embodiment, the upper LCD B22 is an LCD, a display device using an EL (Electro Luminescence), or the like may be used. In addition, a display device having any resolution may be used as the upper LCD B22.

The upper LCD B22 is a display device capable of displaying a stereoscopically visible image. Further, in the present embodiment, an image for a left eye and an image for a right eye are displayed by using substantially the same display area. Specifically, the upper LCD B22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD B22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD B22 of a parallax barrier type is used. The upper LCD B22 displays, by using the image for a right eye and the image for a left eye, an image (a stereoscopic image) which is stereoscopically visible with naked eyes. That is, the upper LCD B22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD B22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD B22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch B25 described below.

Two imaging sections (B23a and B23b) provided on the outer side surface (the back surface reverse of the main surface on which the upper LCD B22 is provided) B21D of the upper housing B21 are generically referred to as the outer imaging section B23. The imaging directions of the outer imaging section (left) B23a and the outer imaging section (right) B23b are each the same as the outward normal direction of the outer side surface B21D. Further, these imaging sections are each designed so as to be positioned in a direction which is opposite to the normal direction of the display surface (inner side surface) of the upper LCD B22 by 180 degrees. Specifically, the imaging direction of the outer imaging section (left) B23a and the imaging direction of the outer imaging section (right) B23b are parallel to each other. The outer imaging section (left) B23a and the outer imaging section (right) B23b can be used as a stereo camera depending on a program executed by the game apparatus B10. Further, depending on a program, when any one of the two outer imaging sections (B23a and B23b) is used alone, the outer imaging section B23 may be used as a non-stereo camera. Further, depending on a program, images shot by the two outer imaging sections (B23a and B23b) may be combined with each other or may compensate for each other, thereby enabling imaging using an extended imaging range. In the present embodiment, the outer imaging section B23 is structured so as to include two imaging sections, that is, the outer imaging section (left) B23a and the outer imaging section (right) B23b. Each of the outer imaging section (left) B23a and the outer imaging section (right) B23b includes an imaging device, such as a CCD image sensor or a CMOS image sensor, having a common predetermined resolution, and a lens. The lens may have a zooming mechanism.

As indicated by dashed lines in FIG. 41 and by solid lines in FIG. 43(b), the outer imaging section (left) B23a and the outer imaging section (right) B23b forming the outer imaging section B23 are aligned so as to be parallel to the horizontal direction of the screen of the upper LCD B22. Specifically, the outer imaging section (left) B23a and the outer imaging section (right) B23b are positioned such that a straight line connecting between the two imaging sections is parallel to the horizontal direction of the screen of the upper LCD B22. Reference numerals B23a and B23b which are indicated as dashed lines in FIG. 41 represent the outer imaging section (left) B23a and the outer imaging section (right) B23b, respectively, which are positioned on the outer side surface reverse of the inner side surface of the upper housing B21. As shown in FIG. 41, when a user views the screen of the upper LCD B22 from the front thereof, the outer imaging section (left) B23a is positioned to the left of the upper LCD B22 and the outer imaging section (right) B23b is positioned to the right of the upper LCD B22. When a program for causing the outer imaging section B23 to function as a stereo camera is executed, the outer imaging section (left) B23a shoots an image for a left eye, which is viewed by a left eye of a user, and the outer imaging section (right) B23b shoots an image for a right eye, which is viewed by a right eye of the user. A distance between the outer imaging section (left) B23a and the outer imaging section (right) B23b is set so as to be approximately the same as a distance between both eyes of a person, that is, may be set so as to be within a range from 30 mm to 70 mm, for example. However, the distance between the outer imaging section (left) B23a and the outer imaging section (right) B23b is not limited to a distance within the range described above.

In the present embodiment, the outer imaging section (left) B23a and the outer imaging section (right) B23b are secured to the housing, and the imaging directions thereof cannot be changed.

Further, the outer imaging section (left) B23a and the outer imaging section (right) B23b are positioned to the left and to the right, respectively; of the upper LCD B22 (on the left side and the right side, respectively, of the upper housing B21) so as to be horizontally symmetrical with respect to the center of the upper LCD B22. Specifically, the outer imaging section (left) B23a and the outer imaging section (right) B23b are positioned so as to be symmetrical with respect to a line which divides the upper LCD B22 into two equal parts, that is, the left part and the right part. Further, the outer imaging section (left) B23a and the outer imaging section (right) B23b are positioned at positions which are reverse of positions above the upper edge of the screen of the upper LCD B22 and which are on the upper portion of the upper housing B21 in an opened state. Specifically, when the upper LCD B22 is projected on the outer side surface of the upper housing B21, the outer imaging section (left) B23a and the outer imaging section (right) B23b are positioned, on the outer side surface of the upper housing B21, at a position above the upper edge of the screen of the upper LCD B22 having been projected.

As described above, the two imaging sections (B23a and B23b) of the outer imaging section B23 are positioned to the left and the right of the upper LCD B22 so as to be horizontally symmetrical with respect to the center of the upper LCD B22. Therefore, when a user views the upper LCD B22 from the front thereof, the imaging direction of the outer imaging section B23 can be the same as the direction of the line of sight of the user. Further, the outer imaging section B23 is positioned at a position reverse of a position above the upper edge of the screen of the upper LCD B22. Therefore, the outer imaging section B23 and the upper LCD B22 do not interfere with each other inside the upper housing B21. Therefore, the upper housing B21 may have a reduced thickness as compared to a ease where the outer imaging section B23 is positioned on a position reverse of a position of the screen of the upper LCD B22.

The inner imaging section B24 is positioned on the inner side surface (main surface) B21B of the upper housing B21, and acts as an imaging section which has an imaging direction which is the same direction as the inward normal direction of the inner side surface. The inner imaging section B24 includes an imaging device, such as a CCD image sensor and a CMOS image sensor, having a predetermined resolution, and a lens. The lens may have a zooming mechanism.

As shown in FIG. 41, when the upper housing B21 is in the opened state, the inner imaging section B24 is positioned, on the upper portion of the upper housing B21, above the upper edge of the screen of the upper LCD B22. Further, in this state, the inner imaging section B24 is positioned at the horizontal center of the upper housing B21 (on a line which separates the upper housing B21 (the screen of the upper LCD B22) into two equal parts, that is, the left part and the right part). Specifically, as shown in FIG. 41 and FIG. 43(b), the inner imaging section B24 is positioned on the inner side surface of the upper housing B21 at a position reverse of the middle position between the left and the right imaging sections (the outer imaging section (left) B23a and the outer imaging section (right) B23b) of the outer imaging section B23. Specifically, when the left and the right imaging sections of the outer imaging section B23 provided on the outer side surface of the upper housing B21 are projected on the inner side surface of the upper housing B21, the inner imaging section B24 is positioned at the middle position between the left and the right imaging sections having been projected. The dashed line B24 indicated in FIG. 43(b) represents the inner imaging section B24 positioned on the inner side surface of the upper housing B21.

As described above, the inner imaging section B24 is used for shooting an image in the direction opposite to that of the outer imaging section B23. The inner imaging section B24 is positioned on the inner side surface of the upper housing B21 at a position reverse of the middle position between the left and the right imaging sections of the outer imaging section B23. Thus, when a user views the upper LCD B22 from the front thereof, the inner imaging section B24 can shoot an image of a face of the user from the front thereof. Further, the left and the right imaging sections of the outer imaging section B23 do not interfere with the inner imaging section B24 inside the upper housing B21, thereby enabling reduction of the thickness of the upper housing B21.

The 3D adjustment switch B25 is a slide switch, and is used for switching a display mode of the upper LCD B22 as described above. Further, the 3D adjustment switch B25 is used for adjusting the stereoscopic effect of a stereoscopically visible image (stereoscopic image) which is displayed on the upper LCD B22. As shown in FIG. 41 to FIG. 43, the 3D adjustment switch B25 is provided at the end portions of the inner side surface and the right side surface of the upper housing B21, and is positioned at a position at which the 3D adjustment switch B25 is visible to a user when the user views the upper LCD B22 from the front thereof. Further, an operation section of the 3D adjustment switch B25 projects on the inner side surface and the right side surface, and can be viewed and operated from both sides. All the switches other than the 3D adjustment switch B25 are provided on the lower housing B11.

Figure 45:
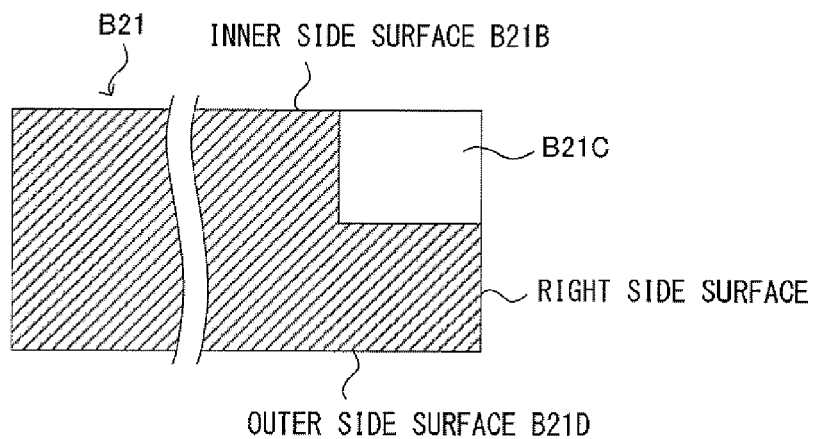
FIG. 45 is a cross-sectional view of an upper housing B21 shown in FIG. 41 taken along a line A-A'.

FIG. 45 is a cross-sectional view of the upper housing B21 shown in FIG. 41 taken along a line A-A'. As shown in FIG. 45, a recessed portion B21C is formed at the right end portion of the inner side surface of the upper housing B21, and the 3D adjustment switch B25 is provided in the recessed portion B21C. The 3D adjustment switch B25 is provided so as to be visible from the front surface and the right side surface of the upper housing B21 as shown in FIG. 41 and FIG. 42. A slider B25a of the 3D adjustment switch B25 is slidable to any position in a predetermined direction (the height direction), and a display mode of the upper LCD B22 is determined in accordance with the position of the slider B25a.

Figure 46A:
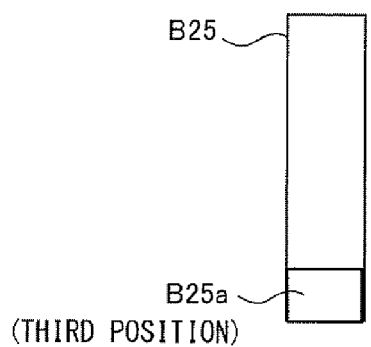
FIG. 46A is a diagram illustrating a state in which a slider B25a of a 3D adjustment switch B25 is positioned at the lowermost position (a third position)
Figure 46B:
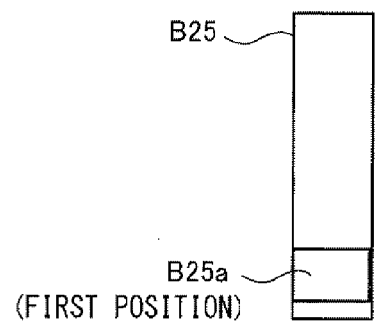
FIG. 46B is a diagram illustrating a state in which the slider B25a of the 3D adjustment switch B25 is positioned above the lowermost position (a first position)
Figure 46C:
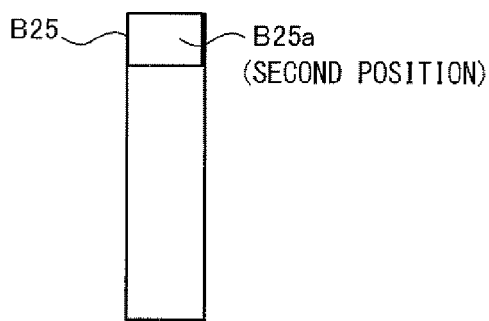
FIG. 46C is a diagram illustrating a state in which the slider B25a of the 3D adjustment switch B25 is positioned at the uppermost position (a second position)

FIG. 46(a) to FIG. 46(c) are each a diagram illustrating a state in which the slider B25a of the 3D adjustment switch B25 slides. FIG. 46(a) is a diagram illustrating a state in which the slider B25a of the 3D adjustment switch B25 is positioned at the lowermost position (a third position). FIG. 46(b) is a diagram illustrating a state in which the slider B25a of the 3D adjustment switch B25 is positioned above the lowermost position (a first position). FIG. 46(c) is a diagram illustrating a state in which the slider B25a of the 3D adjustment switch B25 is positioned at the uppermost position (a second position).

As shown in FIG. 46(a), when the slider B25a of the 3D adjustment switch B25 is positioned at the lowermost position (the third position), the upper LCD B22 is set to the planar display mode, and a planar image is displayed on the screen of the upper LCD B22 (the upper LCD B22 may remain set to the stereoscopic display mode, and the same image may be used for the image for a left eye and the image for a right eye, to perform planar display). On the other hand, when the slider B25a is positioned between a position shown in FIG. 46(b) (a position (first position) above the lowermost position) and a position shown in FIG. 46(c) (the uppermost position (the second position)), the upper LCD B22 is set to the stereoscopic display mode. In this case, a stereoscopically visible image is displayed on the screen of the upper LCD B22. When the slider B25a is positioned between the first position and the second position, a manner in which the stereoscopic image is visible is adjusted in accordance with the position of the slider B25a. Specifically, an amount of deviation in the horizontal direction between a position of an image for a right eye and a position of an image for a left eye is adjusted in accordance with the position of the slider B25a. An adjustment for a manner in which a stereoscopic image is visible in the stereoscopic display mode will be described below. The slider B25a of the 3D adjustment switch B25 is configured so as to be fixed at the third position, and is slidable, in the height direction, to any position between the first position and the second position. For example, the slider B25a is fixed at the third position by a projection (not shown) which projects, from the side surface of the 3D adjustment switch B25, in the lateral direction shown in FIG. 46(a), and does not slide upward from the third position unless a predetermined force or a force greater than the predetermined force is applied upward. When the slider B25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for shooting an image of a virtual space by means of a virtual camera for a left eye and a virtual camera for a right eye to generate an image for the left eye and an image for the right eye. The game apparatus according to the present embodiment adjusts the stereoscopic effect by changing a distance between the two virtual cameras in accordance with the position of the slider B25a of the 3D adjustment switch B25 when executing such a program.

The 3D indicator B26 indicates whether or not the upper LCD B22 is in the stereoscopic display mode. The 3D indicator B26 is implemented as a LED, and is lit up when the stereoscopic display mode of the upper LCD B22 is enabled. The 3D indicator B26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD B22 is in the stereoscopic display mode. As shown in FIG. 41, the 3D indicator B26 is positioned near the screen of the upper LCD 822 on the inner side surface of the upper housing B21. Therefore, when a user views the screen of the upper LCD B22 from the front thereof, the user can easily view the 3D indicator B26. Therefore, also when a user is viewing the screen of the upper LCD B22, the user can easily recognize the display mode of the upper LCD B22.

Further, a speaker hole B21E is provided on the inner side surface of the upper housing B21. A sound is outputted through the speaker hole B21E from a speaker B43 described below.

(Internal Configuration of Game Apparatus B10)

Figure 47:
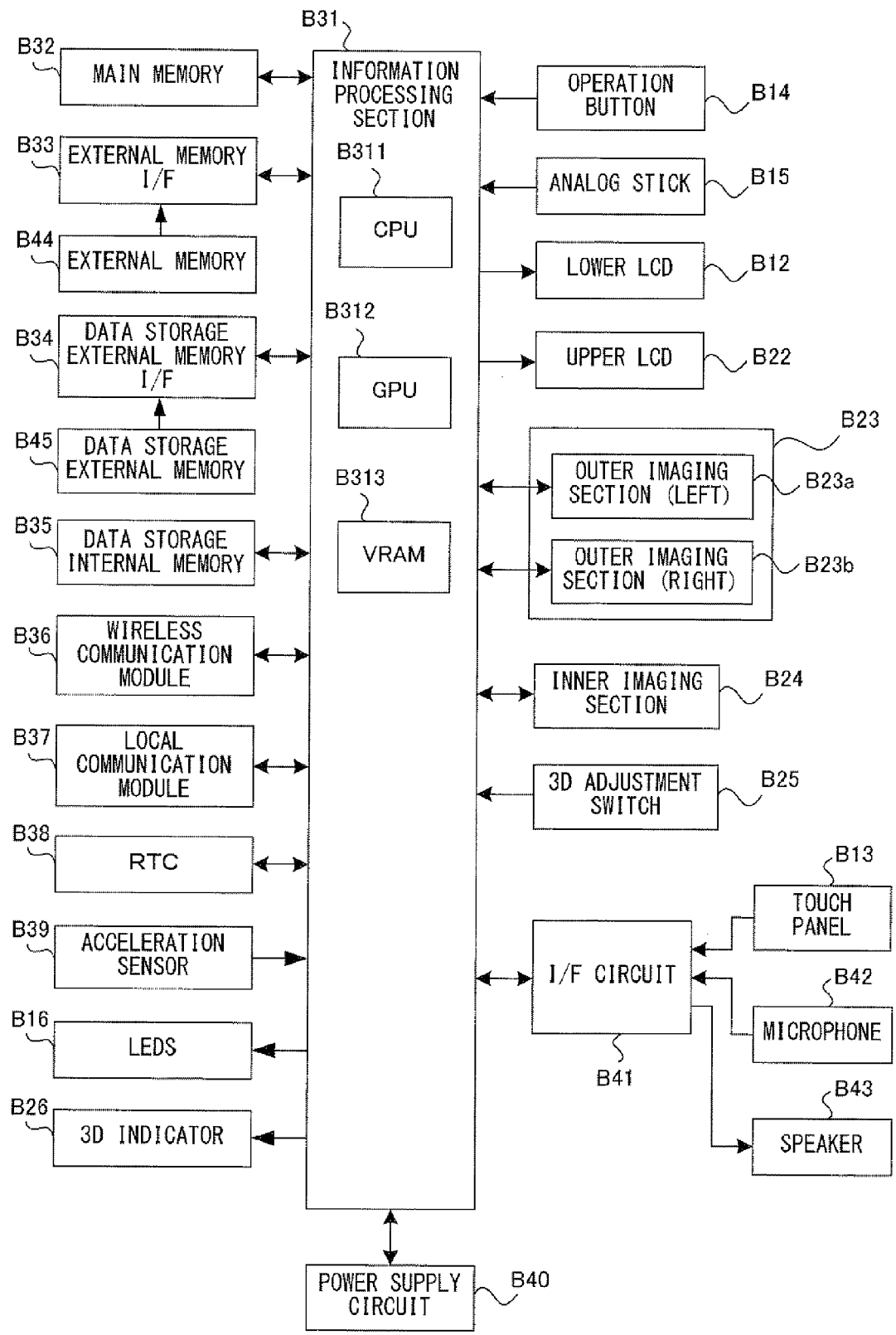
FIG. 47 is a block diagram illustrating an internal configuration of the game apparatus B10.

Next, an internal electrical configuration of the game apparatus B10 will be described with reference to FIG. 47. FIG. 47 is a block diagram illustrating an internal configuration of the game apparatus B10. As shown in FIG. 47, the game apparatus B10 includes, in addition to the components described above, electronic components such as an information processing section B31, a main memory B32, an external memory interface (external memory I/F) B33, an external data storage memory I/F B34, an internal data storage memory B35, a wireless communication module B36, a local communication module B37, a real-time clock (RTC) B38, an acceleration sensor B39, a power supply circuit B40, an interface circuit (I/F circuit) B41, and the like. These electronic components are mounted on an electronic circuit substrate, and accommodated in the lower housing B11 (or the upper housing B21).

The information processing section B31 is information processing means which includes a CPU (Central Processing Unit) B311 for executing a predetermined program, a GPU (Graphics Processing Unit) B312 for performing image processing, and the like. In the present embodiment, a predetermined program is stored in a memory (for example, the external memory B44 connected to the external memory I/F B33 or the internal data storage memory B35) inside the game apparatus B10. The CPU B311 of the information processing section B31 executes hand-drawn object display processing (FIG. 49) described below by executing the predetermined program. The program executed by the CPU B311 of the information processing section B31 may be acquired from another device through communication with the other device. The information processing section B31 further includes a VRAM (Video RAM) B313. The GPU B312 of the information processing section B31 generates an image in accordance with an instruction from the CPU B311 of the information processing section B31, and renders the image in the VRAM B313. The GPU B312 of the information processing section B31 outputs the image rendered in the VRAM B313, to the upper LCD B22 and/or the lower LCD B12, and the image is displayed on the upper LCD B22 and/or the lower LCD B12. In the present embodiment, the VRAM B313 includes a storage area for the lower LCD B12 (hereinafter, referred to as a touch panel VRAM) and a storage area for the upper LCD B22 (hereinafter, referred to as a texture VRAM).

To the information processing section B31, the main memory B32, the external memory I/F B33, the external data storage memory I/F B34, and the internal data storage memory B35 are connected. The external memory I/F B33 is an interface for detachably connecting to the external memory B44. The external data storage memory I/F B34 is an interface for detachably connecting to the external data storage memory B45.

The main memory B32 is volatile storage means used as a work area and a buffer area for (the CPU B311 of) the information processing section B31. That is, the main memory B32 temporarily stores various types of data used for the hand-drawn object display processing, and temporarily stores a program acquired from the outside (the external memory B44, another device, or the like), for example. In the present embodiment, for example, a PSRAM (Pseudo-SRAM) is used as the main memory B32.

The external memory B44 is nonvolatile storage means for storing a program executed by the information processing section B31. The external memory B44 is implemented as, for example, a read-only semiconductor memory. When the external memory B44 is connected to the external memory I/F B33, the information processing section B31 can load a program stored in the external memory B44. Predetermined processing is performed by the program loaded by the information processing section B31 being executed. The external data storage memory B45 is implemented as a non-volatile readable and writable memory (for example, a NAND flash memory), and is used for storing predetermined data. For example, images shot by the outer imaging section B23 and/or images shot by another device are stored in the external data storage memory B45. When the external data storage memory B45 is connected to the external data storage memory I/F B34, the information processing section B31 loads an image stored in the external data storage memory B45, and the image can be displayed on the upper LCD B22 and/or the lower LCD B12.

The internal data storage memory B35 is implemented as a non-volatile readable and writable memory (for example, a NAND flash memory), and is used for storing predetermined data. For example, data and/or programs downloaded through the wireless communication module B36 by wireless communication is stored in the internal data storage memory B35.

The wireless communication module B36 has a function of connecting to a wireless LAN by using a method based on, for example, IEEE 802.11.b/g standard. The local communication module B37 has a function of performing wireless communication with the same type of game apparatus in a predetermined communication method (for example, infrared communication). The wireless communication module B36 and the local communication module B37 are connected to the information processing section B31. The information processing section B31 can perform data transmission to and data reception from another device via the Internet by using the wireless communication module B36, and can perform data transmission to and data reception from the same type of another game apparatus by using the local communication module B37.

The acceleration sensor B39 is connected to the information processing section B31. The acceleration sensor B39 detects magnitudes of accelerations (linear accelerations) in the directions of the straight lines along the three axial (xyz axial) directions, respectively. The acceleration sensor B39 is provided inside the lower housing B11. In the acceleration sensor B39, as shown in FIG. 41, the long side direction of the lower housing B11 is defined as x axial direction, the short side direction of the lower housing B11 is defined as x axial direction, and the direction orthogonal to the inner side surface (main surface) of the lower housing B11 is defined as z axial direction, thereby detecting magnitudes of the linear accelerations for the respective axes. The acceleration sensor B39 is, for example, an electrostatic capacitance type acceleration sensor. However, another type of acceleration sensor may be used. The acceleration sensor B39 may be an acceleration sensor for detecting a magnitude of an acceleration for one axial direction or two-axial directions. The information processing section B31 can receive data (acceleration data) representing accelerations detected by the acceleration sensor B39, and detect an orientation and a motion of the game apparatus B10.

The RTC B38 and the power supply circuit B40 are connected to the information processing section B31. The RTC B38 counts time, and outputs the time to the information processing section B31. The information processing section B31 calculates a current time (date) based on the time counted by the RTC B38. The power supply circuit B40 controls power from the power supply (the rechargeable battery accommodated in the lower housing B11 as described above) of the game apparatus B10, and supplies power to each component of the game apparatus B10.

The I/F circuit B41 is connected to the information processing section B31. The microphone B42 and the speaker B43 are connected to the I/F circuit B41. Specifically, the speaker B43 is connected to the I/F circuit B41 through an amplifier which is not shown. The microphone B42 detects a voice from a user, and outputs a sound signal to the I/F circuit B41. The amplifier amplifies a sound signal outputted from the I/F circuit B41, and a sound is outputted from the speaker B43. The touch panel B13 is connected to the I/F circuit B41. The I/F circuit B41 includes a sound control circuit for controlling the microphone B42 and the speaker B43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel B13, and outputs the touch position data to the information processing section B31. The touch position data represents a coordinate of a position, on an input surface of the touch panel B13, on which an input is made. The touch panel control circuit reads a signal outputted from the touch panel B13, and generates the touch position data every predetermined time. The information processing section B31 acquires the touch position data, to recognize a position on which an input is made on the touch panel B13.

The operation button B14 includes the operation buttons B14A to B14L described above, and is connected to the information processing section B31. Operation data representing an input state of each of the operation buttons B14A to B14I is outputted from the operation button B14 to the information processing section B31, and the input state indicates whether or not each of the operation buttons B14A to B14I has been pressed. The information processing section B31 acquires the operation data from the operation button B14 to perform processing in accordance with the input on the operation button B14.

The lower LCD B12 and the upper LCD B22 are connected to the information processing section B31. The lower LCD B12 and the upper LCD B22 each display an image in accordance with an instruction from (the GPU B312 of) the information processing section B31. In the present embodiment, the information processing section B31 causes the lower LCD B12 to display an image for operation, and causes the upper LCD B22 to display an image acquired from one of the imaging sections B23 or B24. That is, the information processing section B31 causes the upper LCD B22 to display a stereoscopic image (stereoscopically visible image) using an image for a right eye and an image for a left eye which are shot by the outer imaging section B23, and causes the upper LCD B22 to display a planar image shot by the inner imaging section B24, for example.

Specifically, the information processing section B31 is connected to an LCD controller (not shown) of the upper LCD B22, and causes the LCD controller to set the parallax barrier to ON or OFF. When the parallax barrier is set to ON in the upper LCD B22, an image for a right eye and an image for a left eye, (shot by the outer imaging section B23), which are stored in the VRAM B313 of the information processing section B31 are outputted to the upper LCD B22. More specifically, the LCD controller alternately repeats reading of pixel data of the image for a right eye for one line in the vertical direction, and reading of pixel data of the image for a left eye for one line in the vertical direction, thereby reading, from the VRAM B313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD B22. A user views the images through the parallax barrier in the upper LCD B22, so that the image for the right eye is viewed by the user's right eye, and the image for the left eye is viewed by the user's left eye. Thus, the stereoscopically visible image is displayed on the screen of the upper LCD B22.

The outer imaging section B23 and the inner imaging section B24 are connected to the information processing section B31. The outer imaging section B23 and the inner imaging section B24 each shoot an image in accordance with an instruction from the information processing section B31, and output data of the shot image to the information processing section B31. In the present embodiment, the information processing section B31 issues an instruction for shooting an image to one of the outer imaging section B23 or the inner imaging section B24, and the imaging section which receives the instruction for shooting an image shoots an image and transmits data of the shot image to the information processing section B31. Specifically, in the present embodiment, a user selects the imaging section to be used through a touch operation using the touch panel B13. When the information processing section B31 (the CPU B311) detects that the imaging section is selected, the information processing section B31 instructs one of the outer imaging section B32 or the inner imaging section B24 to shoot an image.

The 3D adjustment switch B25 is connected to the information processing section B31. The 3D adjustment switch B25 transmits, to the information processing section B31, an electrical signal in accordance with the position of the slider B25a.

The 3D indicator B26 is connected to the information processing section B31. The information processing section B31 controls whether or not the 3D indicator B26 is to be lit up. In the present embodiment, the information processing section B31 lights up the 3D indicator B26 when the upper LCD B22 is in the stereoscopic display mode. The game apparatus B10 has the internal configuration as described above.

(Details of Hand-Drawn Object Display Processing)

Figure 48:
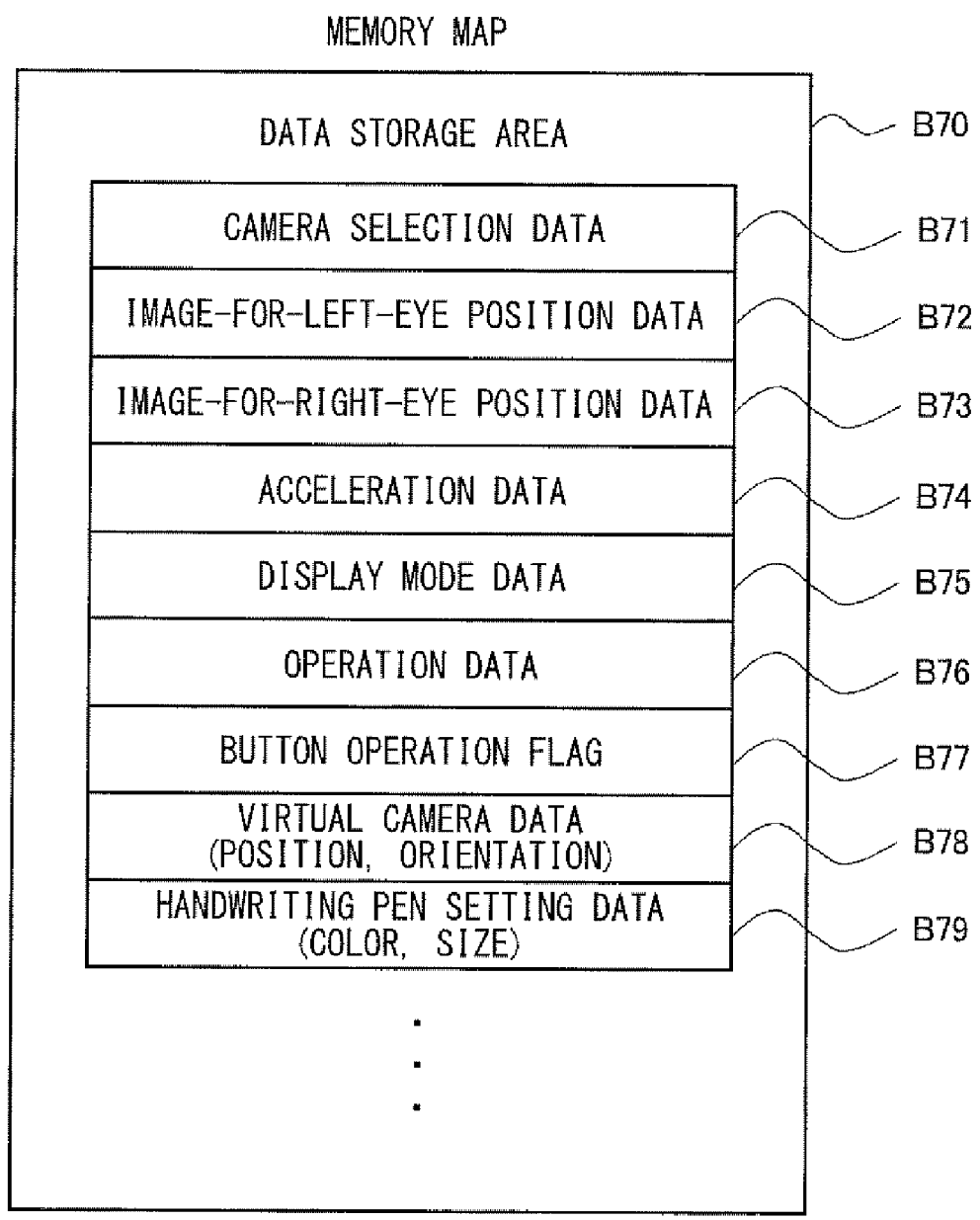
FIG. 48 is a diagram illustrating a memory map of a main memory B32 in the game apparatus B10.

Next, with reference to FIGS. 48 to 51, the hand-drawn object display processing according to the present embodiment will be described in detail. First of all, main data stored in the main memory B32 when performing the hand-drawn object display processing will be described. FIG. 48 is a diagram illustrating a memory map of the main memory B32 in the game apparatus B10. As shown in FIG. 48, a data storage area B70 is provided in the main memory B32. In the data storage area B70, camera selection data B71, image-for-left-eye position data B72, image-for-right-eye position data B73, acceleration data B74, display mode data B75, operation data B76, button operation flag B77, virtual camera data (position, orientation) B78, and hand-drawing pen setting data B79, and the like are stored in the main memory B32. In addition to these data, a program for executing the above-described imaging processing, data indicating a touch position on the touch panel B13, data indicating an image for camera selection which is displayed on the lower LCD B12, manually inputted image data which is displayed on the lower LCD B12, and the like are stored in the main memory B32. Hereinafter, the "imaging section" is sometimes referred to as a "camera".

The camera selection data B71 indicates an imaging section which is currently selected. The camera selection data B71 indicates whether the currently selected imaging section is the outer imaging section B23 or the inner imaging section B24.

The image-for-left-eye position data B72 indicates a display position, on the upper LCD B22, of an image for a left eye, which is captured by the outer imaging section (left) B23a, and indicates coordinates of an image center of the image for the left eye. The right-eye image position data B73 indicates a display position, on the upper LCD B22, of an image for a right eye, which is captured by the outer imaging section (right) B23b, and indicates coordinates of an image center of the image for the right eye.

The acceleration data B74 indicates a latest acceleration detected by the acceleration sensor B39. Specifically, the acceleration data B74 indicates accelerations in the x-, y-, and z-axes directions which are detected by the acceleration sensor B39. The acceleration sensor B39 detects an acceleration once every predetermined period, and transmits the detected acceleration to the information processing section B31 (CPU B311). The information processing section B31 updates the acceleration data B74 in the main memory B32 every time the acceleration sensor B39 detects an acceleration.

The display mode data B75 indicates whether the display mode of the upper LCD B22 is the stereoscopic display mode or the planar display mode.

The operation data B76 indicates operations performed on the respective operation buttons B14A to B14E and B14G to B14H, and the analog stick B15.

The button operation flag B77 is data of two values. The button operation flag B77 is updated and stored when any of the operation buttons B14B to B14E is pressed at a predetermined timing. If the operation button B14B is pressed when "0" (OFF) is stored as the button operation flag B77, the button operation flag B77 is updated from "0" (OFF) to "1" (ON) and stored. In the following description, the button operated state is stored as "1" (ON), while the button non-operated state is stored as "0" (OFF). However, another operation button may be used, and a flag of another mode (other than "0" and "1") may be used.

The virtual camera data B78 includes position data and orientation data of a virtual camera in a marker coordinate system, which are calculated based on a marker recognition result described later.

The hand-drawing pen setting data B79 indicates the color and the size of the touch pen B28 when a hand-drawn object is input to the touch panel B13 using the touch pen B28. Initial values (e.g., "black" and "heavy line") are previously stored. When the cursor moves in response to a user's operation on the cross button B14A and selects a color designating icon or a size designating icon, it is determined that the user requests to change the color or the size of the touch pen B28, and the color or the size of the touch pen B28 is changed according to the user's request. The color or the size of the touch pen B28 having been changed is stored as the hand-drawing pen setting data B79.

Figure 49:
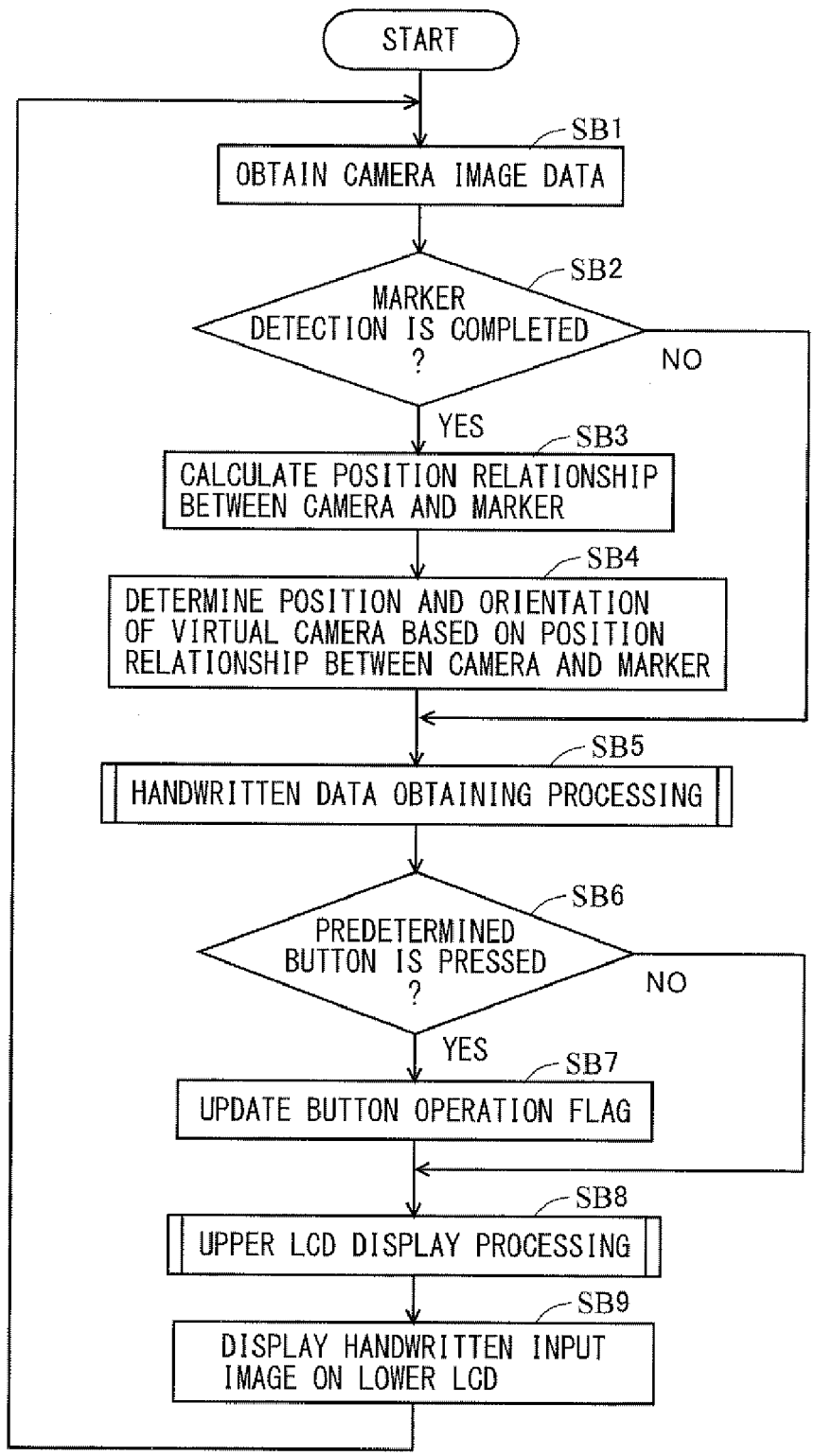
FIG. 49 is a main flowchart illustrating in detail hand-drawn object display processing of the present invention.

Next, the hand-drawn object display processing will be described in detail with reference to FIGS. 49 to 51. FIG. 49 is a main flowchart illustrating the hand-drawn object display processing of the present embodiment. When a game apparatus B10 is powered on, the information processing section B31 (CPU B311) of the game apparatus B10 executes a start-up program stored in a ROM (not shown), and thereby the respective units such as the main memory B32 are initialized. Next, a hand-drawn object display processing program stored in the internal data storage memory B35 is read into the main memory B32, and the CPU B311 in the information processing section B31 starts execution of the program.

Figure 50:
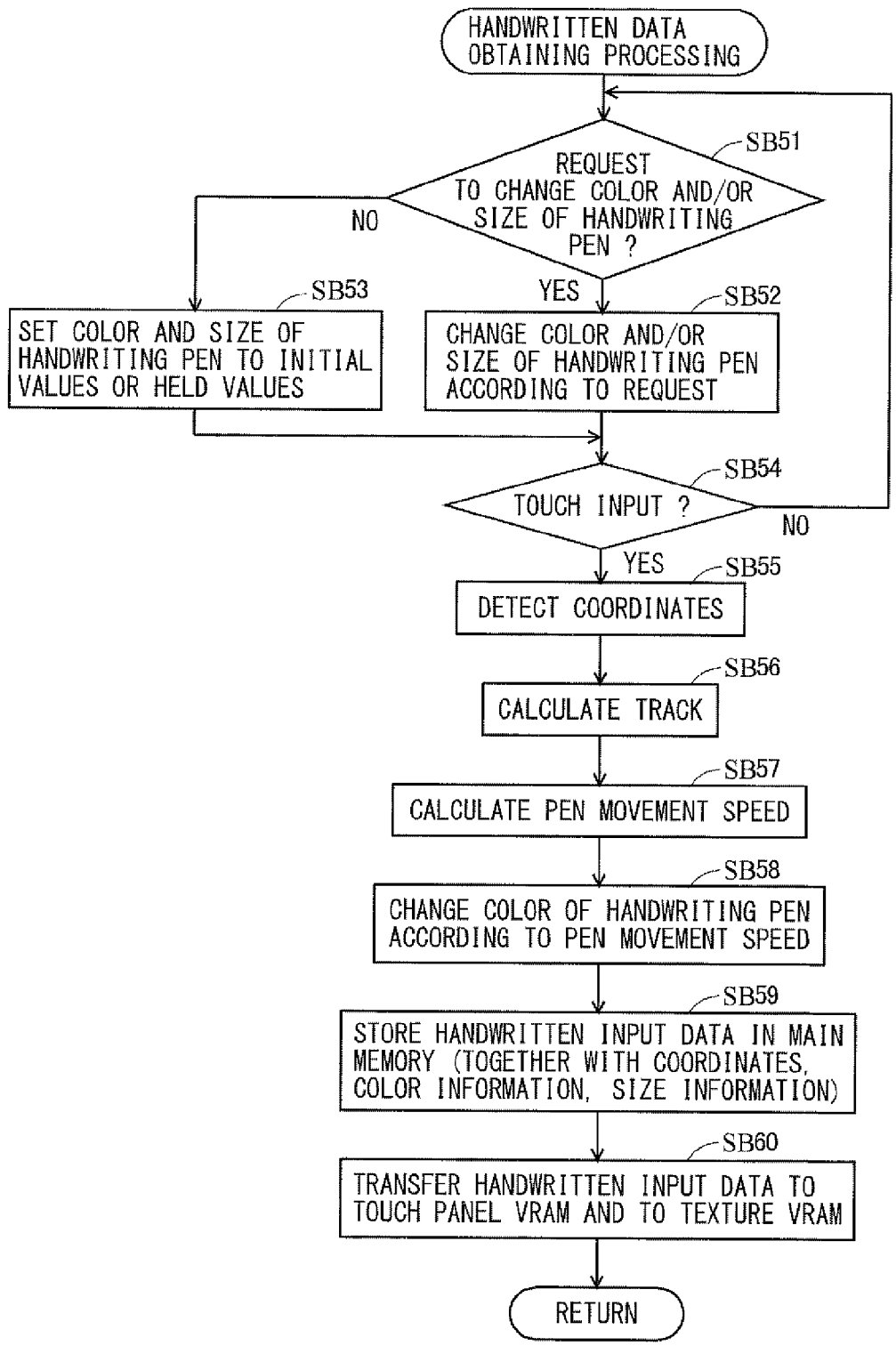
FIG. 50 is a flowchart illustrating in detail hand-drawn data obtaining processing (step SB5) in a lower LCD B12.

A flowchart shown in FIG. 50 illustrates, in detail, hand-drawn data obtaining processing (step SB5) shown in FIG. 49. A flowchart shown in FIG. 51 illustrates, in detail, upper LCD display processing (step SB8) shown in FIG. 49. A processing loop including steps BS1 to BS9 shown in FIG. 49 is repeatedly executed in every frame period (e.g., 1/30 sec.). In the following description, it is assumed that the outer imaging section B23 is selected, and the stereoscopic display mode is selected. The present invention is applicable not only to the stereoscopic display mode but also to the planar display mode. When setting is changed so as to perform only one of processing for a right eye and processing for a left eye in the stereoscopic display mode described below, processing in the planar display mode is achieved.

Initially, main routine of the hand-drawn object display processing will be described with reference to FIG. 49. In step SB1, the information processing section B31 obtains the camera image data. Specifically, the information processing section B31 obtains image data indicating an image captured by the currently selected camera, and stores the image data in the VRAM B313. Since the outer imaging section B23 is selected, the information processing section B31 obtains image data for a right eye and image data for a left eye indicating an image for the right eye and an image for the left eye, respectively, which are captured by the outer imaging section B23.

In step SB2, the information processing section B31 determines, based on the obtained camera image data, whether a marker is detected from the image captured by the outer imaging section B23. The marker is a Roman letter "M" which is white-outlined in a black quadrangle which is printed in the center of a white slip. However, the shape, the pattern, and the color of the marker are not limited to those described above. Any marker may be used so long as the position (the positions of four points) of the marker and the orientation of the marker can be recognized. Specifically, the information processing section B31 initially extracts a region, which is encloses by four line segments, from the image captured by the outer imaging section. B23, and obtains a pattern image inside the extracted region. Then, the information processing section B31 calculates the degree of similarity of pattern image data indicating the obtained pattern image to pattern image data previously stored in the external memory B44. When a value indicating the degree of similarity, which is obtained as a result of calculation, is equal to or greater than a predetermined threshold value (YES in step SB2), the processing goes to step SB3. When the value indicating the degree of similarity is smaller than the threshold value (NO in step SB2), the processing goes to step SB5.

In step SB3, the information processing section B31 calculates, based on the result of marker detection, a position relationship between the outer imaging section B23 (the game apparatus B10) and the marker. For example, the position relationship is expressed as, when one of the outer imaging section B23 and the marker is a reference, 3-dimensional position and orientation of the other. The calculation of the position relationship is realized by processing similar to that in the conventional augmented reality technology.

In step SB4, the information processing section B31 determines the position and orientation of the virtual camera, based on the position relationship between the outer imaging section B23 and the marker. At this time, since the stereoscopic display mode is selected, the information processing section B31 calculates the position and orientation of the virtual camera for a left eye, based on the camera image data obtained by the outer imaging section (left) B23a, and calculates the position and orientation of the virtual camera for a right eye, based on the camera image data obtained by the outer imaging section (right) B23b. The position and orientation of the virtual camera are obtained by using a view matrix of the virtual camera, which is obtained from the position relationship between the outer imaging section B23 and the marker. The determined position and orientation of the virtual camera are stored as the virtual camera data B78 in the data storage area B70 in the main memory B32.

In step SB5, the information processing section B31 executes the hand-drawn data obtaining processing. The hand-drawn data obtaining processing in step SB5 is subroutined, and the details thereof will be described later.

In step SB6, the information processing section B31 determines whether a predetermined button is pressed. At this time, if the user presses, for example, the operation button B14B, the information processing section B31 determines that the predetermined button is pressed. When the information processing section B31 determines that the predetermined button is pressed (YES in step SB6), the processing goes to step SB7. Otherwise (NO in step SB6), the processing goes to step SB8. The predetermined button is not limited to the operation button B14B. The predetermined button may be another operation button, or another event. An example of an event is end of hand-drawing by the user (no touch input to the touch panel B13 for a predetermined period).

In step SB7, the information processing section B31 updates the button operation flag B77. At this time, as described above, every time the operation button B14B is pressed, "0" is changed to "1" or "1" is changed to "0", thereby updating the button operation flag B77.

In step SB8, the information processing section B31 executes upper LCD display processing. The upper LCD display processing in step SB8 is subroutined, and the details thereof will be described later.

In step SB9, the information processing section B31 displays a hand-drawn input image on the lower LCD B12. At this time, the information processing section B31 displays the hand-drawn input image on the lower LCD B12, based on the hand-drawn input data stored in the touch panel VRAM.

Next, with reference to FIG. 50, the subroutine of the hand-drawn data obtaining processing will be described. In step SB51, the information processing section B31 determines whether a request to change the color and/or the size of the hand-drawing pen is inputted by the user. When it is determined that a request to change the color and/or the size of the hand-drawing pen is inputted (YES in step SB51), the processing goes to step SB52. Otherwise (NO in step SB51), the processing goes to step SB53.

In step SB52, the information processing section B31 changes the color and/or the size of the hand-drawing pen in accordance with the user's request. The color and/or the size of the hand-drawing pen having been changed are stored as the hand-drawing pen setting data B79 in the data storage area B70 in the main memory B32. Thereafter, the processing goes to step SB54.

In step SB53, the information processing section B31 reads the hand-drawing pen setting data B79 from the data storage area B70 in the main memory B32, and sets the color and/or the size of the hand-drawing pen. At this time, the color and/or the size of the hand-drawing pen are set to the initial values or held values, which have been stored as the hand-drawing pen setting data B79.

In step SB54, the information processing section B31 determines whether the user performs a touch input onto the touch panel B13. When it is determined that the user performs a touch input onto the touch panel B13 (YES in step SB54), the processing goes to step SB55. Otherwise, (No in step SB54), the processing is returned to step SB51 to perform the hand-drawing pen setting processing and the touch detection processing.

In step SB55, the information processing section B31 detects coordinates indicating the touch position on the touch panel B13. In step SB56, the information processing section B31 calculates a track on the touch panel B13, based on the detected coordinates and the coordinates detected in the last processing. By repeatedly calculating the track, image data of the hand-drawn object can be detected.

In step SB57, the information processing section B31 calculates a movement speed of the hand-drawing pen. Specifically, the information processing section B31 calculates a movement speed of the hand-drawing pen, based on the distance of the track and the cycle time (frame period) of the program.

In step SB58, the information processing section B31 changes the color of the hand-drawing pen based on the movement speed of the hand-drawing pen. At this time, when the movement speed is high, the brightness is increased (or reduced) or the chromaticness is increased (or reduced). Alternatively, the size of the hand-drawing pen may be reduced with an increase in the movement speed.

In step SB59, the information processing section B31 stores the hand-drawn input data into the main memory B32. At this time, the coordinates, the color information, and the size information are also stored as additional information. In step SB60, the information processing section B31 converts the hand-drawn input data (track data) into image data (bit map data), and transfers the converted data to the touch panel VRAM and to the texture VRAM in the VRAM B313. Thereafter, the processing is ended (returned to main routine).

Next, with reference to FIG. 51, the subroutine of the upper LCD display processing will be described. In step SB81, the information processing section B31 determines whether the marker is not detected for a predetermined period from the image captured by the outer imaging section B23. At this time, if a period during which the marker position is outside the imaging range of the outer imaging section B23, which is caused by that the user tilts the game apparatus B10, reaches a predetermined period, the information processing section B31 determines that the marker is not detected for the predetermined period. When it is determined that the marker is not detected for the predetermined period (NO in step SB81), the processing goes to step SB92. Otherwise (YES in step SB81), that is, if the outer imaging section B23 detects the marker before the predetermined period is elapsed when the user tilts the game apparatus B10, the processing goes to step SB82. Note that the marker detection may be performed in processing similar to that described for step SB2.

In step SB82, the information processing section B31 determines whether the button operation flag is ON. When it is determined that the button operation flag is ON (YES in step SB82), the processing goes to step SB83. Otherwise (NO in step SB82), the processing goes to step SB85.

In step SB83, the information processing section B31 changes the position of a fundamental polygon, based on the elapsed time, and sets the fundamental polygon. As an example of change in the position of the fundamental polygon, the position of the fundamental polygon in the marker coordinate system may be changed periodically (every time a predetermined period elapses). Thereby, the fundamental polygon is set so as to jump in the vertical direction or the horizontal direction, for example. Note that the elapsed time is, for example, a time elapsed from when the button operation flag B77 was turned ON from its OFF state.

In step SB84, the information processing section B31 changes the shape of the fundamental polygon, based on the elapsed time. As an example of change in the shape of the fundamental polygon, the aspect ratio of the fundamental polygon may be changed periodically (every time a predetermined period elapses). Thereby, the fundamental polygon is set so as to expand and contract laterally and/or longitudinally. Thereafter, the processing goes to step SB86. Note that the elapsed time is a time elapsed from when the button operation flag B77 was turned ON from its OFF state.

In step SB85, the information processing section B31 sets the position of the fundamental polygon at an origin of the marker coordinate system. The origin of the marker coordinate system is, for example, a center position of the marker.

In step SB86, the information processing section B31 sets a polygon for shadow display in accordance with the set position and shape of the fundamental polygon. At this time, the information processing section B31 sets the polygon for shadow display at a position where the fundamental polygon is tilted at 90 degrees. Note that, when the position of the fundamental polygon is set so as to be changed, the polygon for shadow display should be set at a position according to the change.

In step SB87, the information processing section B31 sets polygons for thickness display in accordance with the set position and shape of the fundamental polygon. At this time, the information processing section B31 arranges a predetermined number of polygons along the normal direction of the fundamental polygon (the fundamental polygon has a thin-plate shape). If the position of the fundamental polygon is set so as to be changed, the polygons for thickness display should be set at a position according to the change.

In step SB88, the information processing section B31 applies a hand-drawn image texture to the polygons (the fundamental polygon, the polygon for shadow display, the polygons for thickness display). Note that texture data indicating the hand-drawn image texture is image data obtained by converting the hand-drawn input data, and is read from the texture VRAM. At this time, as for the polygon for shadow display, the texture data is changed so as to reduce the brightness of the hand-drawn image texture to a predetermined extent, and then the hand-drawn image texture with the reduced brightness is applied to the polygon for shadow display. Further, as for the polygons for thickness display, the texture data is changed so that the brightness of the hand-drawn image texture is gradually reduced with increasing distance from the fundamental polygon, and then the hand-drawn image texture with such brightness is applied to the polygon for thickness display.

In step SB89, the information processing section B31 captures, with the virtual camera, the polygons to which the hand-drawn image texture is applied, to generate hand-drawn image (hand-drawn object image) data. Since the stereoscopic display mode is selected, a hand-drawn image for a left eye is generated based on the position and orientation of the virtual camera for the left eye, and a hand-drawn image for a right eye is generated based on the position and orientation of the virtual camera for the right eye.

In step SB90, the information processing section B31 superimposes the hand-drawn image on the camera image, based on the hand-drawn image data and the camera image data. At this time, since the stereoscopic display mode is selected, the information processing section B31 superimposes the hand-drawn image for the left eye on the camera image captured by the outer imaging section (left) B23a to generate a superimposed image for the left eye, and superimposes the hand-drawn image for the right eye on the camera image captured by the outer imaging section (right) B23b to generate a superimposed image for the right eye.

In step SB91, the information processing section B31 displays, on the upper LCD B22, the superimposed image in which the hand-drawn image is superimposed on the camera image. At this time, the superimposed image for the left eye and the superimposed image for the right eye are synthesized so as to enable the user to view the displayed image stereoscopically. Thereafter, this processing is ended (returns to the main routine).

In step SB92, the information processing section B31 displays the camera image on the upper LCD B22. Thereafter, this processing is ended (returns to the main routine).

The operation of the game apparatus B10 according to the present embodiment, based on the above-described structure and flowchart, will be described with reference to FIGS. 52 to 57. In these figures, in a part where the hand-drawn image is superimposed on the marker in the upper LCD B22, both the hand-drawn image and the marker are displayed actually. However, in order to clarify the expression in the figures, a part of the marker is not displayed. Further, although the following will describe a case where the user tilts the game apparatus B10 without moving the marker, the user may move the marker. Moreover, the user may move the marker, and simultaneously, the user may tilt the game apparatus B10.

(Fundamental Display of Hand-Drawn Object)

The user selects the outer imaging section B23, and selects the stereoscopic display mode, thereby setting the game apparatus B10 to execute the above-described program. If the user shoots, with the outer imaging section B23, a range including the marker placed on a desk or the like, camera image data is obtained (step SB1). When the marker is detected (YES in step SB2), the position relationship between the outer imaging section B23 and the marker is calculated based on the marker detection result (step SB3), and the position and orientation of the virtual camera are determined based on the calculated position relationship (step SB4).

Figure 52:
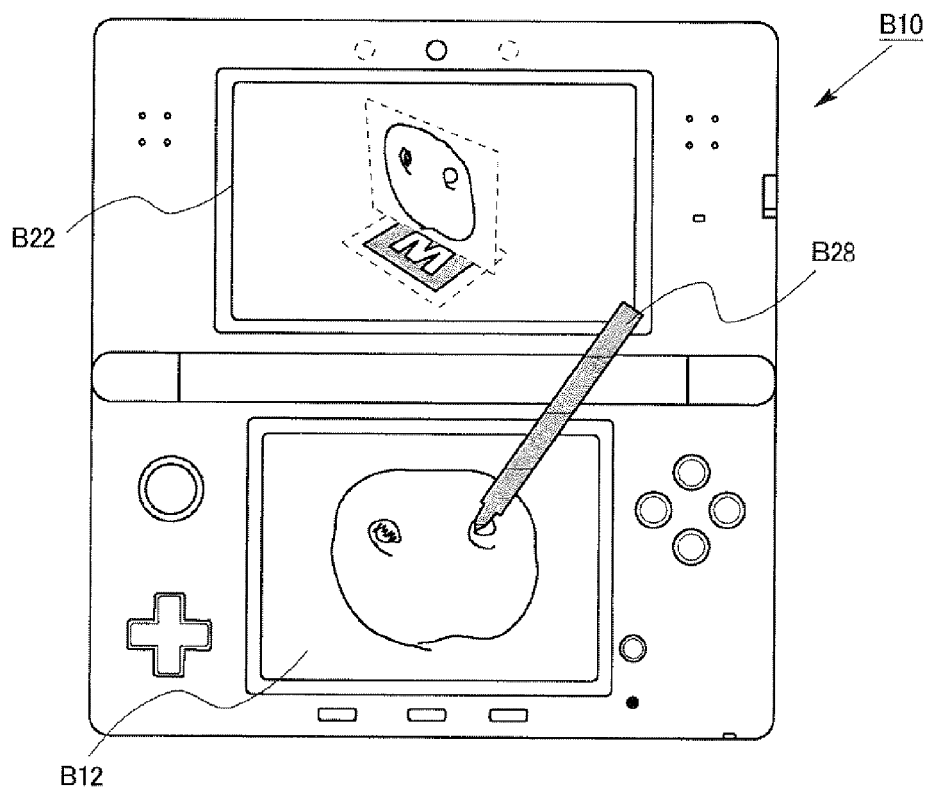
FIG. 52 is a (first) diagram illustrating a state in which a user draws an object to be displayed on the upper LCD B22, by using a touch panel B13.

In such a situation, as shown in FIG. 52, the user hand-draws (hand-writes) a face of a person on the lower LCD B12. It is assumed that the user does not request to change the color and the size of the hand-drawing pen, that is, the hand-drawing is performed with the initial values of the hand-drawing pen (NO in step B51). FIG. 52 shows a state where the user draws the face halfway. When the user touches the lower LCD B12 with the touch pen B28 (step SB54), coordinates are detected (step SB55), a track is detected (step SB56), a movement speed of the pen is calculated (step SB57), and the color of the hand-drawing pen is changed according to the movement speed (step SB58). Hand-drawn input data is converted to image data, and the image data is stored in the main memory B32 (step SB59) and transferred to the touch panel VRAM and to the texture VRAM (step SB60).

Figure 51:
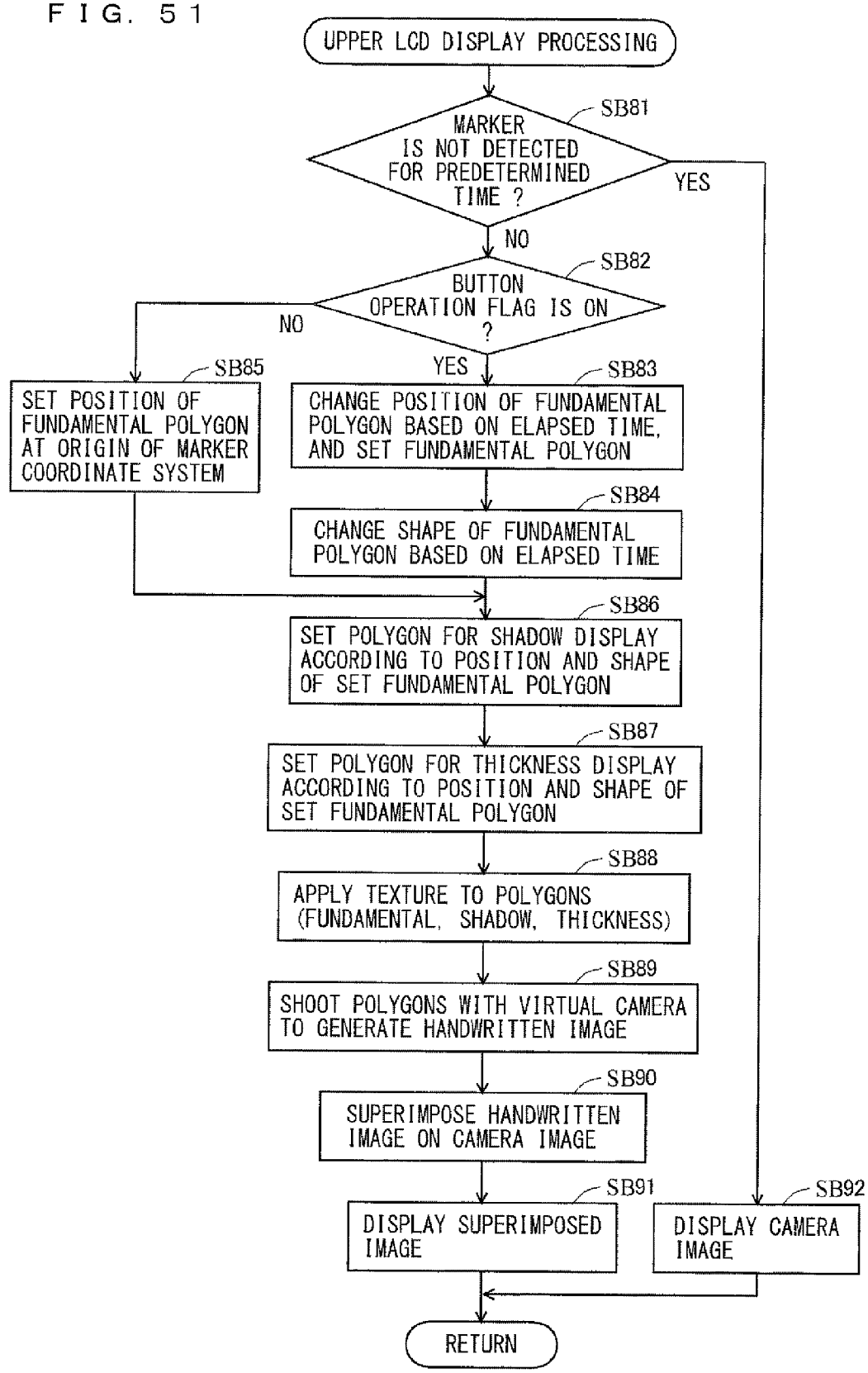
FIG. 51 is a flowchart illustrating in detail display processing (step SB8) on an upper LCD B22.

Even in the middle of such hand-drawing, since the program shown in FIGS. 49 to 51 is operated periodically (at a predetermined cycle time), the halfway hand-drawn object is displayed on the upper LCD B22 as shown in FIG. 52.

The following will describe the operation of the game apparatus B10 in a case where the hand-drawn object is displayed as shown in FIG. 52. The operation in a case where a predetermined button is not pressed will be initially described, followed by the operation in a case where the predetermined button is pressed.

Since the predetermined button is not pressed (NO in step SB6), the button operation flag is not updated but maintained at "0". If the marker is detected before a predetermined period elapses (YES in step SB81), since the button operation flag is OFF (NO in step SB82), the position of the fundamental polygon is set at the origin of the marker coordinate system (step SB85).

A shadow and/or a thickness may be applied to the hand-drawn object as necessary. The operation in such a case will be described later. The hand-drawn image texture is applied to the fundamental polygon (step SB88), and the polygon to which the hand-drawn image texture is applied is captured by the virtual camera to generate hand-drawn image (hand-drawn object image) data (step SB89). The hand-drawn image is superimposed on the camera image (step SB90), and the superimposed image is displayed on the upper LCD B22 (step SB91). At this time, as shown in FIG. 52, the halfway hand-drawn object is displayed on the upper LCD B22 so as to be located at the origin of the marker coordinate system. Note that the marker coordinate system and its origin have previously been set. As shown in FIG. 52, the hand-drawn object is also displayed on the lower LCD B12 (step SB9).

Figure 53:
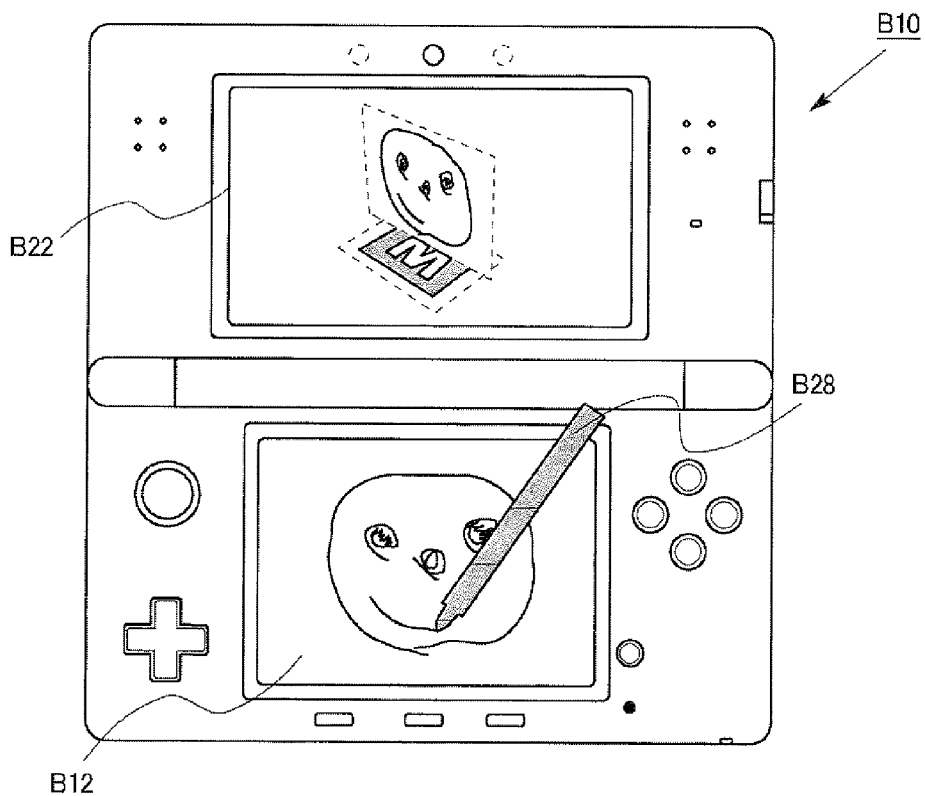
FIG. 53 is a (second) diagram illustrating the state in which the user draws the object to be displayed on the upper LCD B22, by using the touch panel B13.
Figure 54:
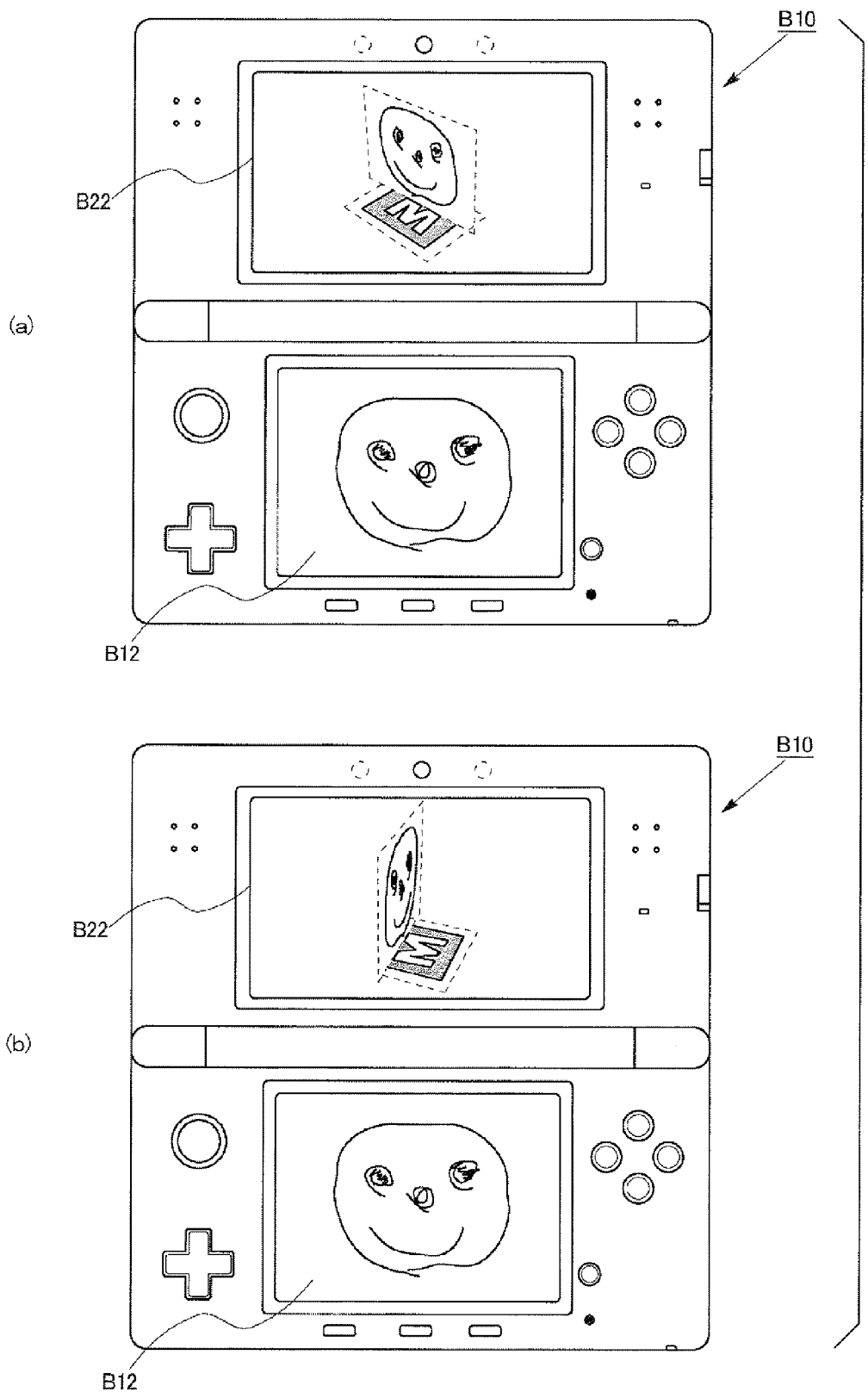
FIG. 54 shows examples of displayed images in a case where the position of the game apparatus B10 is changed.
Figure 55:
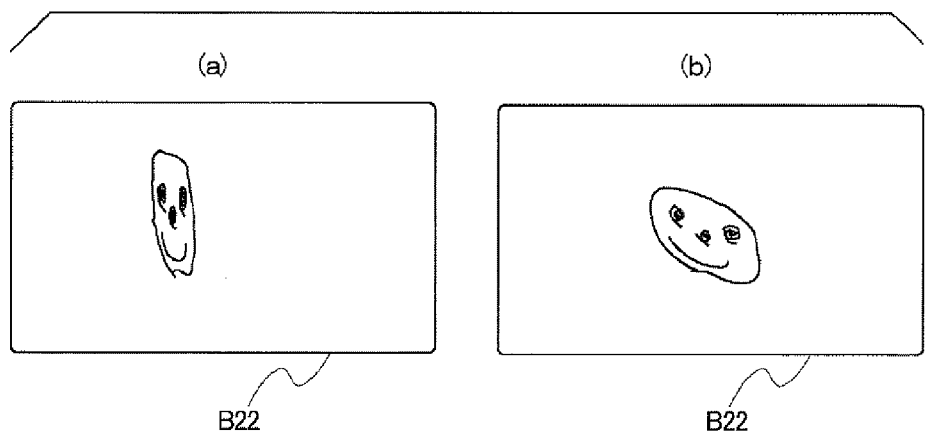
FIG. 55 shows an (first) example of change in a displayed shape of a hand-drawn image (object image)
Figure 56:
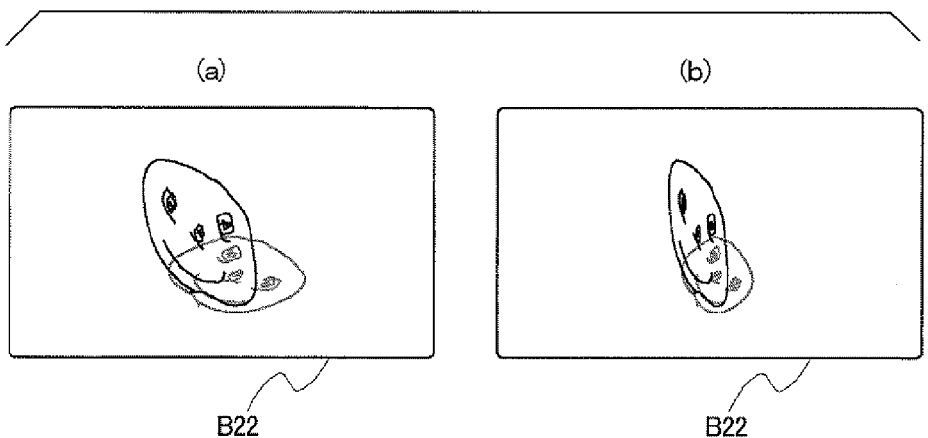
FIG. 56 shows an (second) example of change in a displayed shape of a hand-drawn image (object image)
Figure 57:
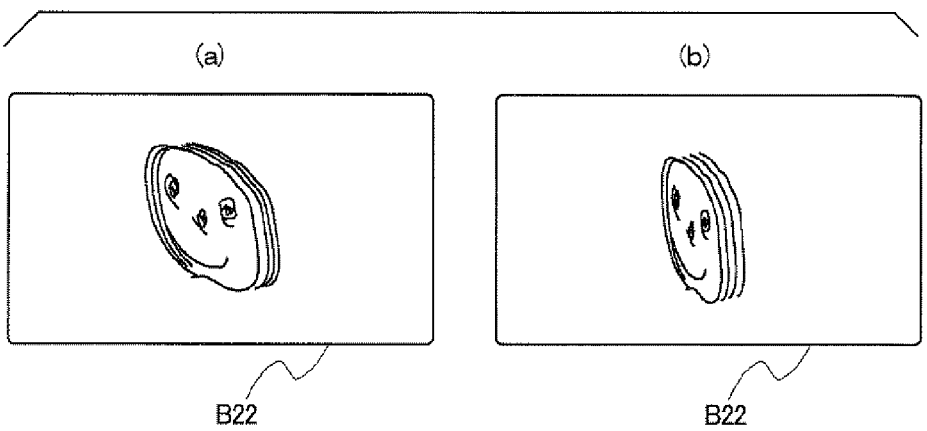
FIG. 57 shows an (third) example of change in a displayed shape of a hand-drawn image (object image)

As the user advances hand-drawing, the above-described operation is repeated. As shown in FIG. 53, the object hand-drawn by the user is displayed, on the upper LCD B22, in the stereoscopic display mode as if it exists in a 3-dimensional virtual space, and simultaneously, the hand-drawn object is planarly displayed on the lower LCD B12.

(A Case where the Game Apparatus B10 is Tilted)

As shown in FIG. 54(a) (corresponding to FIG. 53 from which the touch pen B28 is removed), when the object hand-drawn by the user is displayed on the upper LCD B22 as if it exists in the 3-dimensional virtual space, the user tilts the game apparatus B10 within the range where the marker is captured by the outer imaging section B23. Herein, the game apparatus B10 is tilted (rotated) at about 90 degrees in a clockwise fashion, centering around the marker.

Even when the game apparatus B10 is tilted, since the program shown in FIGS. 49 to 51 is operated periodically (at a cycle time), camera image data is successively obtained by the outer imaging section B23 (step SB1), the marker is detected (YES in step SB2), the position relationship between the outer imaging section B23 and the marker is successively calculated based on the marker detection result (step SB3), and the position and orientation of the virtual camera are determined based on the calculated position relationship (step SB4). The position of the fundamental polygon is successively set at the origin of the marker coordinate system (step SB85), the hand-drawn image texture is applied to the fundamental polygon (step SB88), the polygon to which the hand-drawn image texture is applied is captured by the virtual camera to generate hand-drawn image (hand-drawn object image) data (step SB89), the hand-drawn image is superimposed on the camera image (step SB90), and the superimposed image is successively displayed on the upper LCD B22 (step SB91).

When, in the state shown in FIG. 54(a), the game apparatus B10 is tilted at about 90 degrees in a clockwise fashion centering around the marker, the display on the upper LCD B22 is changed to the state shown in FIG. 54(b). As shown in FIGS. 54(a) and 54(b), the relative positions of the virtual camera and the fundamental polygon are changed based on the result of recognition of the marker which is included in the image successively captured by the outer imaging section B23. Therefore, when the imaging direction is changed by tilting the game apparatus B10, the relative positions of the virtual camera and the fundamental polygon are changed in accordance with a change in the manner in which the marker is visible. Therefore, the display of the hand-drawn image captured by the virtual camera is changed in accordance with the change in the imaging direction due to the tilting of the game apparatus B10. In this way, the image hand-drawn by the user is displayed as if it exists in the real world, and thus augmented reality can be realized.

(A Case where a Predetermined Button is Pressed: Positional Change of Fundamental Polygon)

When a predetermined button is pressed (YES in step SB6), the button operation flag is updated and changed to "1" (ON) (step SB7). If the marker is detected before a predetermined time elapses (YES in step SB81), since the button operation flag is ON (YES in step SB82), the position of the fundamental polygon (the relative position and the relative orientation to the origin of the marker coordinate system) is set based on the elapsed time (step SB83).

At this time, the display position of the fundamental polygon is changed so as to periodically reciprocate in the vertical direction. The hand-drawn image texture is applied to the fundamental polygon (step SB88), and the polygon to which the hand-drawn image texture is applied is captured by the virtual camera to generate hand-drawn image (hand-drawn object image) data (step SB89). The hand-drawn image is superimposed on the camera image (step SB90), and the superimposed image is displayed on the upper LCD B22 (step SB91). At this time, the hand-drawn image is displayed so as to jump in the vertical direction or the horizontal direction. Therefore, the image hand-drawn by the user can be displayed more naturally as if it exists in the real world.

(A Case where a Predetermined Button is Pressed: Shape Change of Fundamental Polygon)

The following will describe the operation in a case where the shape of the fundamental polygon is changed when a predetermined button is pressed as described above.

Since the button operation flag is ON (YES in step SB82), the shape of the fundamental polygon is changed with time (step SB84). For example, the aspect ratio of the fundamental polygon is changed periodically (every time a predetermined period elapses). The hand-drawn image texture is applied to the fundamental polygon (step SB88), and the polygon to which the hand-drawn image texture is applied is captured by the virtual camera to generate hand-drawn image (hand-drawn object image) data (step SB89). The hand-drawn image is superimposed on the camera image (step SB90), and the superimposed image is displayed on the upper LCD B22 (step SB91). At this time, the hand-drawn image is displayed so as to expand and contract laterally and/or longitudinally.

FIGS. 55(a) and 55(b) show examples of display on the upper LCD B22. FIG. 55(a) shows an example of display in which the fundamental polygon expands longitudinally (contracts laterally), and FIG. 55(b) shows an example of display in which the fundamental polygon expands laterally (contracts longitudinally). Actually, since the aspect ratio of the fundamental polygon changes periodically, the display shown in FIG. 55(a) and the display shown in FIG. 55(b) are alternately displayed at short intervals. Therefore, the hand-drawn image is displayed as if the facial expression changes. Thereby, the image hand-drawn by the user can be displayed more naturally as if it exists in the real world.

In addition to the change in the shape of the fundamental polygon, the position of the fundamental polygon may be changed as described above. In this case, the hand-drawn image is displayed such that the face jumps in the vertical direction or the horizontal direction while changing its expression. Accordingly, more natural augmented reality can be realized.

(A Case where Shadow or Thickness is Applied)

The following will describe the operation in a case where a shadow or a thickness is applied, regardless of whether a predetermined button is pressed.

Regardless of whether the button operation flag is ON or OFF, a polygon for shadow display is set according to the position and the shape of the fundamental polygon (step SB86). At this time, if the position of the fundamental polygon is changed, the polygon for shadow display is set at a position according to the change. Therefore, if the position of the fundamental polygon is changed such that the hand-drawn image jumps in the vertical direction or the horizontal direction, a shadow according to the jumping hand-drawn image is displayed.

Further, polygons for thickness display are set according to the position and the shape of the fundamental polygon (step SB87). At this time, a predetermined number of polygons for thickness display are arranged. Therefore, if the position of the fundamental polygon is changed, the polygons for thickness display are set at a position according to the change. Therefore, if the position of the fundamental polygon is changed such that the hand-drawn image jumps in the vertical direction or the horizontal direction, a thickness according to the jumping hand-drawn image is displayed.

The texture is applied to the fundamental polygon, the polygon for shadow display, and the polygons for thickness display (step SB88), and the polygons to which the texture is applied are captured by the virtual camera to generate hand-drawn image (hand-drawn object image) data (step SB89). The hand-drawn image is superimposed on the camera image (step SB90), and the superimposed image is displayed on the upper LCD B22 (step SB91).

FIGS. 56(a) and 56(b) show examples of display on the upper LCD B22 in the case where a shadow is applied. As shown in these figures, the hand-drawn image having a shadow is displayed. Therefore, the image hand-drawn by the user can be displayed more naturally as if it exists in the real world.

FIGS. 57(a) and 57(b) show examples of display on the upper LCD B22 in the case where a thickness is applied. As shown in these figures, the hand-drawn image having a thickness is displayed. Therefore, the image hand-drawn by the user can be displayed more naturally as if it exists in the real world.

(A Case where No Marker is Detected for a Predetermined Period)

For example, if the user excessively tilts the game apparatus B10, the marker may not be captured by the outer imaging section B23. In this case, since the marker is not detected from the captured image for a predetermined period (NO in step SB81), the camera image is displayed on the upper LCD B22 without executing setting of the fundamental polygon (step SB92). At this time, neither the marker nor the hand-drawn image are displayed on the upper LCD B22, and only the landscape captured by the outer imaging section B23 is displayed.

As described above, according to the game apparatus B10 of the present invention, an image hand-drawn on the touch panel by the user is displayed on a landscape (background) captured by the outer imaging section B23 so as to be changed in its display position, changed in its shape, given a shadow, and/or given a thickness, and thus an image providing natural augmented reality can be displayed on the upper LCD B22. Therefore, it is possible to cause the user to have stronger sense of reality for the hand-drawn image, or stronger interest in the hand-drawn image. In this case, even an image, which is in the middle of being drawn on the touch panel, can be displayed on the upper LCD B22. Accordingly, the user can complete the image being hand-drawn while checking the augmented reality.

(Modifications)

In step SB86, the shape of the fundamental polygon is changed, and the texture is applied to the shape-changed fundamental polygon, thereby changing the shape of the hand-drawn object. However, the present invention is not limited thereto. The shape of the texture may be deformed.

Further, the game apparatus B10 of the present embodiment may execute a predetermined game. For example, a predetermined game program is stored in the internal data storage memory B35 or the external memory B44, and the game apparatus B10 executes the program to perform a game. For example, in the game, the hand-drawn object created on the lower LCD B12 by the user is displayed on the upper LCD B22.

Further, the present invention is applicable not only to a game apparatus but also to any hand-held electronic device (for example, a PDA (Personal Digital Assistant) or a mobile telephone), a personal computer, a camera, and the like.

Further, in the present embodiment, the information processing section B31 of the game apparatus B10 executes the predetermined program, and thereby the hand-drawn object display processing according to the above flowchart is performed. However, the present invention is not limited thereto. A portion of or all of the hand-drawn object display processing may be performed by a special circuit included in the game apparatus B10.

Further, while in the present embodiment the above-described processes are performed by one game apparatus (the information processing apparatus), a plurality of information processing apparatuses which are communicably connected to each other may cooperate with each other to perform the above-described processes.

Further, instead of applying a hand-drawn image as a texture to one polygon, a 3D polygon model having a shape according to a hand-drawn image may be successively created to be arranged in place of the fundamental polygon.

Further, in the present embodiment, the touch panel B13 is adopted as an input means for inputting hand-drawn data indicating a hand-drawn object constituted by a hand-drawn track. However, the present invention is not limited thereto. For example, the input means may be a pointing device such as a mouse or a touch pad. Alternatively, the input means may be configured such that an orientation of an input device is detected by a camera or an acceleration sensor, and a position on a certain plane, which is pointed by the input device, is calculated based on the detected orientation, thereby inputting hand-drawn data. Alternatively, the input means may be configured such that, when a cursor displayed on the lower LCD B12 is moved by the cross button B14A while pressing the button B14C, a track that follows the moving cursor is inputted as hand-drawn data.

Further, in the present embodiment, the video see-through method is adopted, in which a hand-drawn image is superimposed on a camera image captured by the outer imaging section B23, and a superimposed image is displayed on the upper LCD B22. However, the present invention is not limited thereto. For example, the present invention may have a configuration to realize the optical see-through method. In this case, a head mounted display has at least a camera, and a user can view a real space through a display section corresponding to lenses of glasses. This display section is made of a material through which the real space is directly guided to the user's eyes. Further, an image of a virtual object generated by a computer can be displayed on this display section. Thereby, the user can view an image in which an image of the virtual object is superimposed on the real space. Note that the camera included in the head mounted display is used to detect a marker placed in the real space.

Figure 58:
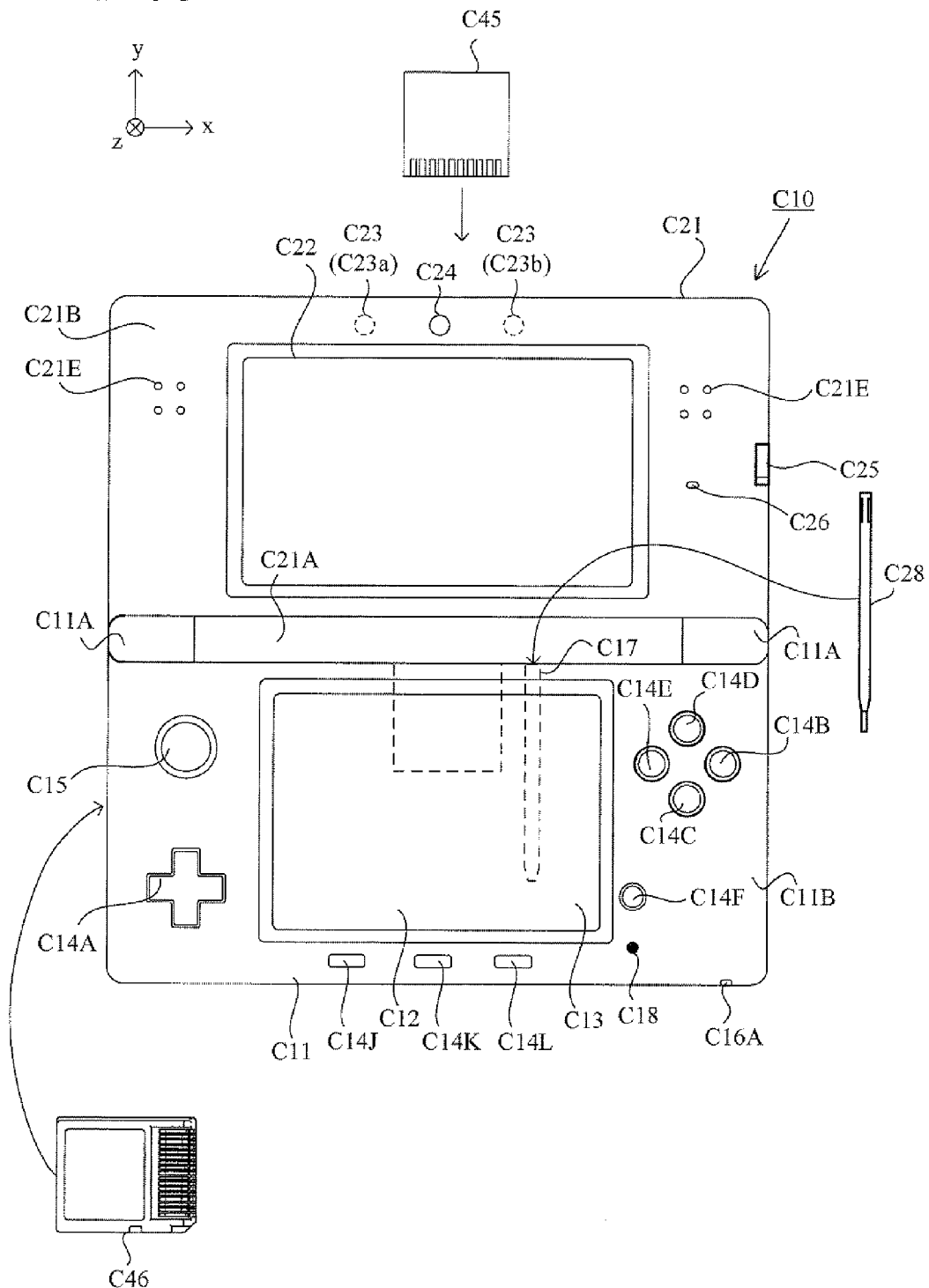
FIG. 58 is a front view showing an example of a game apparatus C10 in an opened state.
Figure 59:
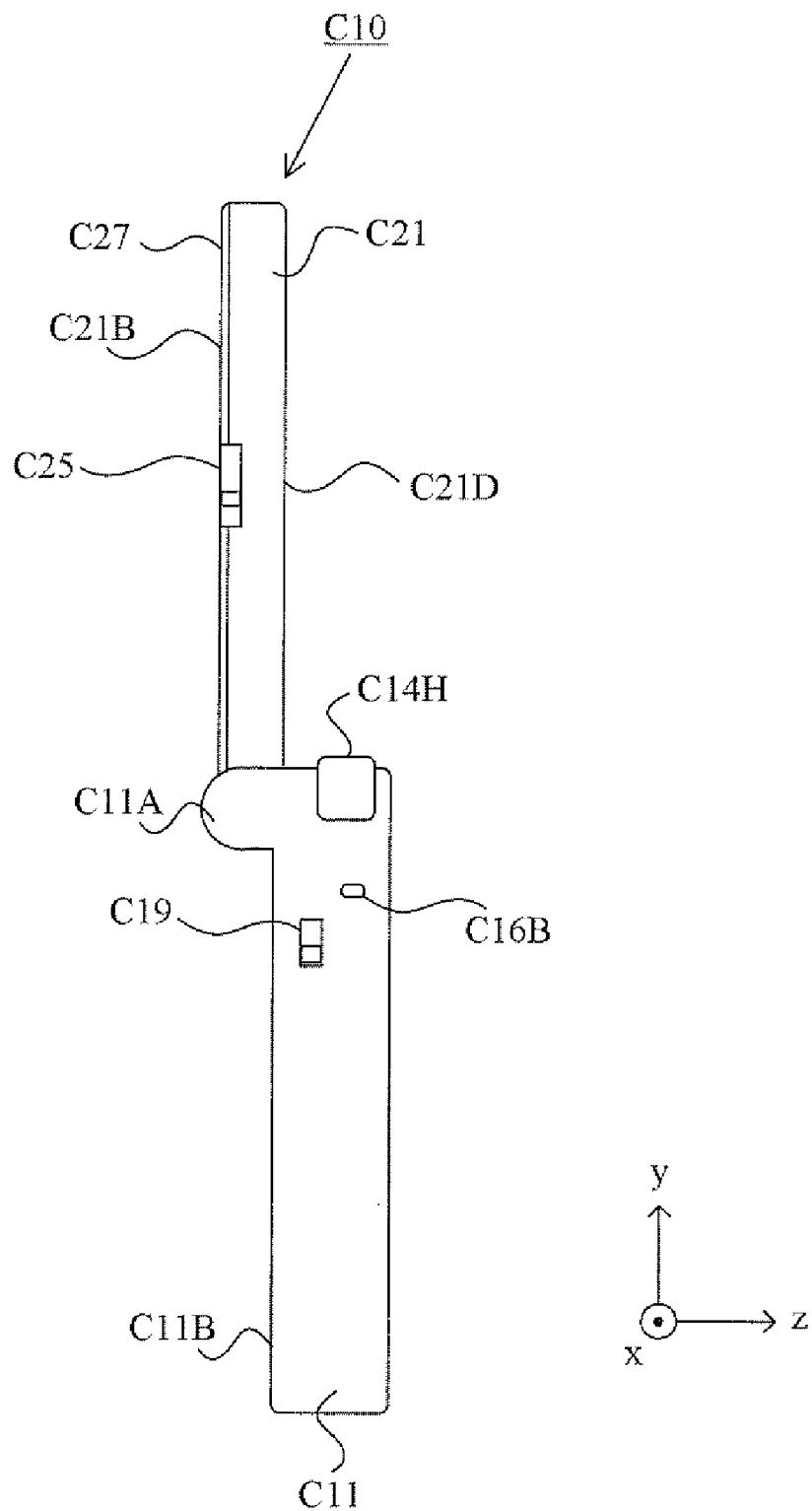
FIG. 59 is a side view showing an example of the game apparatus C10 in an opened state.
Figure 60:
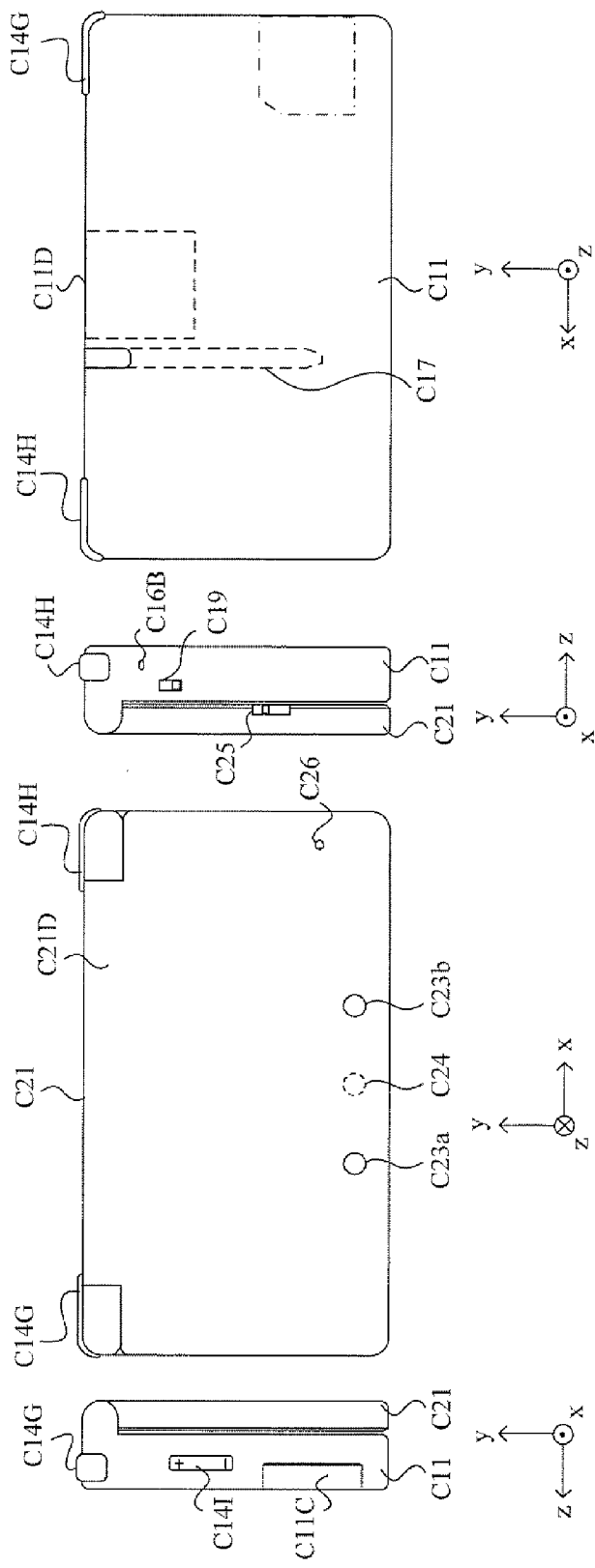
FIG. 60A is a left side view showing an example of the game apparatus C10 in an closed state.
FIG. 60B is a front view showing an example of the game apparatus C10 in a closed state.
FIG. 60C is a right side view showing an example of the game apparatus C10 in a closed state.
FIG. 60D is a rear view showing an example of the game apparatus C10 in the closed state.

With reference to the drawings, an image processing apparatus which executes an image processing program according to another embodiment of the present invention will be described. The image processing program of the present invention can be executed by any computer system, to be practically used. However, in the present embodiment, a hand-held game apparatus C10 is used as an example of an image processing apparatus, and the image processing program is executed by the game apparatus C10. FIG. 58 to FIG. 60D are each a plan view of an example of an outer appearance of a game apparatus C10. The game apparatus C10 is, for example, a hand-held game apparatus, and is configured to be foldable as shown in FIG. 58 to FIG. 60D. FIG. 58 is a front view showing an example of the game apparatus C10 in an opened state. FIG. 59 is a right side view showing an example of the game apparatus C10 in the opened state. FIG. 60A is a left side view showing an example of the game apparatus C10 in a closed state. FIG. 60B is a front view showing an example of the game apparatus C10 in the closed state. FIG. 60C is a right side view showing an example of the game apparatus C10 in the closed state. FIG. 60D is a rear view showing an example of the game apparatus C10 in the closed state. The game apparatus C10 includes an imaging section, and is able to shoot an image by means of the imaging section, display the shot image on a screen, and store data of the shot image. The game apparatus C10 can execute a game program which is stored in an exchangeable memory card or a game program which is received from a server or another game apparatus, and can display on the screen an image generated by computer graphics processing, such as an virtual space image seen from a virtual camera set in a virtual space, for example.

As shown in FIG. 58 to FIG. 60D, the game apparatus C10 includes a lower housing C11 and an upper housing C21. The lower housing C11 and the upper housing C21 are connected to each other so as to be openable and closable (foldable). In the example of FIG. 58, the lower housing C11 and the upper housing C21 are each formed in a horizontally long plate-like rectangular shape, and are connected to each other at long side portions thereof so as to be pivotable with respect to each other. Usually, the user uses the game apparatus C10 in the opened state. When not using the game apparatus C10, the user keeps the game apparatus C10 in the closed state. In addition to the closed state and the opened state, the game apparatus C10 is capable of maintaining an angle between the lower housing C11 and the upper housing C21 at any angle ranging between the closed state and the opened state by frictional force generated at a connection portion and the like. In other words, the upper housing C21 can be stationary at any angle with respect to the lower housing C11.

As shown in FIG. 58 and FIG. 59, projections C11A each of which projects in a direction orthogonal to an inner side surface (main surface) C11 of the lower housing C11 are provided at the upper long side portion of the lower housing C11, whereas a projection C21A which projects from the lower side surface of the upper housing C21 in a direction orthogonal to the lower side surface of the upper housing C21 is provided at the lower long side portion of the upper housing C21. Since the projections C11A of the lower housing C11 and the projection C21A of the upper housing C21 are connected to each other, the lower housing C11 and the upper housing C21 are foldably connected to each other.

In the lower housing C11, a lower LCD (Liquid Crystal Display) C12, a touch panel C13, operation buttons C14A to C14L (FIG. 58, FIG. 60A to FIG. 60D), an analog stick C15, an LED C16A and an LED C16B, an insertion opening C17, and a microphone hole C18 are provided. Hereinafter, these components will be described in detail.

As shown in FIG. 58, the lower LCD C12 is accommodated in the lower housing C11. The lower LCD C12 has a horizontally long shape, and is located such that a long side direction thereof corresponds to a long side direction of the lower housing C11. The lower LCD C12 is positioned at the center of the lower housing C11. The lower LCD C12 is provided on the inner side surface (main surface) of the lower housing C11, and a screen of the lower LCD C12 is exposed at an opening in the inner side surface of the lower housing C11. When the game apparatus C10 is not used, the game apparatus C10 is in the closed state, thereby preventing the screen of the lower LCD C12 from becoming unclean and damaged. The number of pixels of the lower LCD C12 is, as one example, 256 dots×192 dots (the longitudinal line×the vertical line). As another example, the number of pixels of the lower LCD C12 is 320 dots×240 dots (the longitudinal line× the vertical line). The lower LCD C12 is a display device for displaying an image in a planar manner (not in a stereoscopically visible manner), which is different from the upper LCD C22 as described below. Although an LCD is used as a display device in the present embodiment, any other display device such as a display device using an EL (Electro Luminescence), or the like may be used. In addition, a display device having any resolution may be used as the lower LCD C12.

As shown in FIG. 58, the game apparatus C10 includes the touch panel C13 as an input device. The touch panel C13 is mounted on the screen of the lower LCD C12 in such a manner as to cover the screen. In the present embodiment, the touch panel C13 may be, but is not limited to, a resistive film type touch panel. A touch panel of any press type such as electrostatic capacitance type may be used. In the present embodiment, the touch panel C13 has the same resolution (detection accuracy) as that of the lower LCD C12. However, the resolution of the touch panel C13 and the resolution of the lower LCD C12 may not necessarily be the same. Further, the insertion opening C17 (indicated by dashed line in FIG. 58 and FIG. 60D) is provided on the upper side surface of the lower housing C11. The insertion opening C17 is used for accommodating a touch pen C28 which is used for performing an operation on the touch panel C13. Although an input on the touch panel C13 is usually made by using the touch pen C28, a finger of a user may be used for making an input on the touch panel C13, in addition to the touch pen C28.

The operation buttons C14A to C14L are each an input device for making a predetermined input. As shown in FIG. 58, among operation buttons C14A to C14L, a cross button C14A (a direction input button C14A), a button C14B, a button C14C, a button C14D, a button C14E, a power button C14E a selection button C14J, a HOME button C14K, and a start button C14L are provided on the inner side surface (main surface) of the lower housing C11. The cross button C14A is cross-shaped, and includes buttons for indicating an upward, a downward, a leftward, or a rightward direction. The button C14B, button C14C, button C14D, and button C14E are positioned so as to form a cross shape. The button C14A to C14E, the selection button C14J, the HOME button C14K, and the start button C14L are assigned functions, respectively, in accordance with a program executed by the game apparatus C10, as necessary. For example, the cross button C14A is used for selection operation and the like, and the operation buttons C14B to C14E are used for, for example, determination operation and cancellation operation. The power button C14F is used for powering the game apparatus C10 on/off.

The analog stick C15 is a device for indicating a direction, and is provided to the left of the lower LCD C12 in an upper portion of the inner side surface of the lower housing C11. As shown in FIG. 58, the cross button C14A is provided to the left of the lower LCD C12 in the lower portion of the lower housing C11. That is, the analog stick C15 is provided above the cross button C14A. The analog stick C15 and the cross button C14A are positioned so as to be operated by a thumb of a left hand with which the lower housing C11 is held. Further, the analog stick C15 is provided in the upper portion, and thus the analog stick C15 is positioned such that a thumb of a left hand with which the lower housing C11 is held is naturally positioned on the position of the analog stick C15, and the cross button C14A is positioned such that the thumb of the left hand is positioned on the position of the cross button C14A when the thumb of the left hand is slightly moved downward from the analog stick C15. The analog stick C15 has a top, corresponding to a key, which slides parallel to the inner side surface of the lower housing C11. The analog stick C15 acts in accordance with a program executed by the game apparatus C10. For example, when a game in which a predetermined object appears in a 3-dimensional virtual space is executed by the game apparatus C10, the analog stick C15 acts as an input device for moving the predetermined object in the 3-dimensional virtual space. In this case, the predetermined object is moved in a direction in which the top corresponding to the key of the analog stick C15 slides. As the analog stick C15, a component which enables an analog input by being tilted by a predetermined amount, in any direction, such as the upward, the downward, the rightward, the leftward, or the diagonal direction, may be used.

Four buttons, that is, the button C14B, the button C14C, the button C14D, and the button C14E, which are positioned so as to form a cross shape, are positioned such that a thumb of a right hand with which the lower housing C11 is held is naturally positioned on the positions of the four buttons. Further, the four buttons and the analog stick C15 sandwich the lower LCD C12, so as to be bilaterally symmetrical in position with respect to each other. Thus, depending on a game program, for example, a left-handed person can make a direction instruction input by using these four buttons.

Further, the microphone hole C18 is provided on the inner side surface of the lower housing C11. Under the microphone hole C18, a microphone (see FIG. 61) is provided as a sound input device described below, and the microphone detects a sound from the outside of the game apparatus C10.

As shown in FIG. 60 B and FIG. 60 D, an L button C14G and an R button C14H are provided on the upper side surface of the lower housing C11. The L button C14G is positioned on the left end portion of the upper side surface of the lower housing C11 and the R button C14H is positioned on the right end portion of the upper side surface of the lower housing C11. As described below, the L button C14G and the R button C14H act as shutter buttons (photographing instruction buttons) of the imaging section. Further, as shown in FIG. 60 A, a sound volume button C14I is provided on the left side surface of the lower housing C11. The sound volume button C14I is used for adjusting a sound volume of a speaker of the game apparatus C10.

As shown in FIG. 60A, a cover section C11C is provided on the left side surface of the lower housing C11 so as to be openable and closable. Inside the cover section C11C, a connector (not shown) is provided for electrically connecting the game apparatus C10 to an external data storage memory C46. The external data storage memory C46 is detachably connected to the connector. The external data storage memory C46 is used for, for example, recording (storing) data of an image shot by the game apparatus C10. The connector and the cover section C11C may be provided on the right side surface of the lower housing C11.

Further, as shown in FIG. 60D, an insertion opening C11D through which an external memory C45 having a game program stored therein is inserted is provided on the upper side surface of the lower housing C11. A connector (not shown) for electrically connecting the game apparatus C10 to the external memory C45 in a detachable manner is provided inside the insertion opening C11D. A predetermined game program is executed by connecting the external memory C45 to the game apparatus C10. The connector and the insertion opening C11D may be provided on another side surface (for example, the right side surface) of the lower housing C11.

As shown in FIG. 58, a first LED C16A for notifying a user of an ON/OFF state of a power supply of the game apparatus C10 is provided on the lower side surface of the lower housing C11. As shown in FIG. 60C, a second LED C16B for notifying a user of an establishment state of a wireless communication of the game apparatus C10 is provided on the right side surface of the lower housing C11. The game apparatus C10 can make wireless communication with other devices, and the second LED C16B is lit up when the wireless communication is established with another device. The game apparatus C10 has a function of connecting to a wireless LAN in a method based on, for example. IEEE 802.11.b/g standard. A wireless switch C19 for enabling/disabling the function of the wireless communication is provided on the right side surface of the lower housing C11 (see FIG. 60C).

A rechargeable battery (not shown) acting as a power supply for the game apparatus C10 is accommodated in the lower housing C11, and the battery can be charged through a terminal provided on a side surface (for example, the upper side surface) of the lower housing C11.

In the upper housing C21, an upper LCD (Liquid Crystal Display) C22, two outer imaging sections C23 (a outer left imaging section C23a and a outer right imaging section C23b), an inner imaging section C24, a 3D adjustment switch C25, and a 3D indicator C26 are provided. Hereinafter, theses components will be described in detail.

As shown in FIG. 58, the upper LCD C22 is accommodated in the upper housing C21. The upper LCD C22 has a horizontally long shape, and is located such that a long side direction thereof corresponds to a long side direction of the upper housing C21. The upper LCD C22 is positioned at the center of the upper housing C21. The area of a screen of the upper LCD C22 is set so as to be greater than, for example, the area of the screen of the lower LCD C12. Specifically, the screen of the upper LCD C22 is horizontally elongated as compared to the screen of the lower LCD C12. That is, a rate of the horizontal width in the aspect ratio of the screen of the upper LCD C22 is set so as to be greater than a rate of the horizontal width in the aspect ratio of the screen of the lower LCD C12.

The screen of the upper LCD C22 is provided on the inner side surface (main surface) C21B of the upper housing C21, and the screen of the upper LCD C22 is exposed at an opening in the inner side surface of the upper housing C21. Further, as shown in FIG. 59, the inner side surface of the upper housing C21 is covered with a transparent screen cover C27. The screen cover C27 protects the screen of the upper LCD C22, and integrates the upper LCD C22 and the inner side surface of the upper housing C21 with each other, thereby achieving unity. The number of pixels of the upper LCD C22 is, as one example, 640 dots×200 dots (the horizontal line×the vertical line). As another example, the number of pixels of the upper LCD C22 is 800 dots×240 dots (the horizontal line×the vertical line). Although, in the present embodiment, the upper LCD C22 is an LCD, a display device using an EL (Electro Luminescence), or the like may be used. In addition, a display device having any resolution may be used as the upper LCD C22.

The upper LCD C22 is a display device capable of displaying a stereoscopically visible image. The upper LCD C22 can display an image for a left eye and an image for a right eye by using substantially the same display area. Specifically, the upper LCD C22 may be a display device using a method in which the image for a left eye and the image for a right eye are alternately displayed in the horizontal direction in predetermined units (for example, every other line). As an example, when the upper LCD C22 is configured to have a number of pixels of 800 dots in the horizontal direction ×240 dots in the vertical direction, a stereoscopic view is realized by assigning to the image 400 pixels in the horizontal direction for a left eye and 400 pixels in the horizontal direction for a right eye such that the pixels of the image for a left eye and the pixels of the image for a right eye are alternately arranged. It should be noted that the upper LCD C22 may be a display device using a method in which the image for a left eye and the image for a right eye are alternately displayed for a predetermined time period. Further, the upper LCD C22 is a display device capable of displaying an image which is stereoscopically visible with naked eyes. In this case, as the upper LCD C22, a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD C22 of a parallax barrier type is used. The upper LCD C22 displays, by using the image for a right eye and the image for a left eye, an image (a stereoscopic image) which is stereoscopically visible with naked eyes. That is, the upper LCD C22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD C22 may disable the parallax barrier. When the parallax barrier is disabled, an image can be displayed in a planar manner (it is possible to display a planar visible image which is different from a stereoscopically visible image as described above. Specifically, the planner manner is a display mode in which the same displayed image is viewed with a left eye and a right eye). Thus, the upper LCD C22 is a display device capable of switching between a stereoscopic display mode for displaying a stereoscopically visible image and a planar display mode for displaying an image in a planar manner (for displaying a planar visible image). The switching of the display mode is performed by the 3D adjustment switch C25 described below.

Two imaging sections (outer left imaging section C23a and outer right imaging section C23b) provided on the outer side surface (the back surface reverse of the main surface on which the upper LCD C22 is provided) C21D of the upper housing C21 are collectively referred to as the outer imaging section C23. The imaging directions of the outer left imaging section C23a and the outer right imaging section C23b are each the same as the outward normal direction of the outer side surface C21D. Further, the outer left imaging section C23a and the outer right imaging section C23b are each designed so as to be positioned in a direction which is opposite to the normal direction of the display surface (inner side surface) of the upper LCD C22 by 180 degrees. Specifically, the imaging direction of the outer left imaging section C23a and the imaging direction of the outer right imaging section C23b are parallel to each other. The outer left imaging section C23a and the outer right imaging section C23b can be used as a stereo camera depending on a program executed by the game apparatus C10. Further, depending on a program, when any one of the two outer imaging sections (outer left imaging section C23a and outer right imaging section C23b) is used alone, the outer imaging section C23 may be used as a non-stereo camera. Further, depending on a program, images shot by the two outer imaging sections (outer left imaging section C23a and outer right imaging section C23b) may be combined with each other or may compensate for each other, thereby enabling imaging using an extended imaging range. In the present embodiment, the outer imaging section C23 is structured so as to include two imaging sections, that is, the outer left imaging section C23a and the outer right imaging section C23b. Each of the outer left imaging section C23a and the outer right imaging section C23b includes an imaging device, such as a CCD image sensor or a CMOS image sensor, having a common predetermined resolution, and a lens. The lens may have a zooming mechanism.

As indicated by dashed lines in FIG. 58 and by solid lines in FIG. 60 B, the outer left imaging section C23a and the outer right imaging section C23b forming the outer imaging section C23 are aligned so as to be parallel to the horizontal direction of the screen of the upper LCD C22. Specifically, the outer left imaging section C23a and the outer right imaging section C23b are positioned such that a straight line connecting the two imaging sections is parallel to the horizontal direction of the screen of the upper LCD C22. Reference numerals C23a and C23b which are indicated as dashed lines in FIG. 58 represent the outer left imaging section C23a and the outer right imaging section C23b, respectively, which are positioned on the outer side surface reverse of the inner side surface of the upper housing C21. As shown in FIG. 58, when a user views the screen of the upper LCD C22 from the front thereof, the outer left imaging section C23a is positioned to the left of the outer right imaging section C23b. When a program for causing the outer imaging section C23 to function as a stereo camera is executed, the outer left imaging section C23a shoots an image for a left eye, which is viewed by a left eye of a user, and the outer right imaging section C23b shoots an image for a right eye, which is viewed by a right eye of the user. A distance between the outer left imaging section C23a and the outer right imaging section C23b is set so as to be approximately the same as a distance between both eyes of a person, that is, may be set so as to be within a range from 30 mm to 70 mm, for example. However, the distance between the outer left imaging section C23a and the outer right imaging section C23b is not limited to a distance within the range described above.

In the present embodiment, the outer left imaging section C23a and the outer right imaging section C23b are secured to the housing, and the imaging directions thereof cannot be changed.

Further, the outer left imaging section C23a and the outer right imaging section C23b are positioned to the left and to the right, respectively, of the upper LCD C22 (on the left side and the right side, respectively, of the upper housing C21) so as to be horizontally symmetrical with respect to the center of the upper LCD C22. Specifically, the outer left imaging section C23a and the outer right imaging section C23b are positioned so as to be symmetrical with respect to a line which divides the upper LCD C22 into two equal parts, that is, the left part and the right part. Further, the outer left imaging section C23a and the outer right imaging section C23b are positioned at positions which are reverse of positions above the upper edge of the screen of the upper LCD C22 and on the upper portion of the upper housing C21 in an opened state. Specifically, when the upper LCD C22 is projected on the outer side surface of the upper housing C21, the outer left imaging section C23a and the outer right imaging section C23b are positioned, on the outer side surface of the upper housing C21, at a position above the upper edge of the screen of the upper LCD C22 having been projected.

As described above, the two imaging sections (outer left imaging section C23a and outer right imaging section C23b) of the outer imaging section C23 are positioned to the left and the right of the upper LCD C22 so as to be horizontally symmetrical with respect to the center of the upper LCD C22. Therefore, when a user views the upper LCD C22 from the front thereof, the imaging directions of the outer imaging sections C23 can be the same as the direction of the line of sight of the left eye and the direction of the line of sight of the right eye of the user, respectively. Further, the outer imaging section C23 is positioned at a position reverse of a position above the upper edge of the screen of the upper LCD C22. Therefore, the outer imaging section C23 and the upper LCD C22 do not interfere with each other inside the upper housing C21. Therefore, the upper housing C21 may have a reduced thickness as compared to a case where the outer imaging section C23 is positioned on a position reverse of a position of the screen of the upper LCD C22.

The inner imaging section C24 is positioned on the inner side surface (main surface) C21B of the upper housing C21, and acts as an imaging section which has an imaging direction which is the same direction as the inward normal direction of the inner side surface. The inner imaging section C24 includes an imaging device, such as a CCD image sensor and a CMOS image sensor, having a predetermined resolution, and a lens. The lens may have a zooming mechanism.

As shown in FIG. 58, when the upper housing C21 is in the opened state, the inner imaging section C24 is positioned, on the upper portion of the upper housing C21, above the upper edge of the screen of the upper LCD C22. Further, in this state, the inner imaging section C24 is positioned at the horizontal center of the upper housing C21 (on a line which separates the upper housing C21 (the screen of the upper LCD C22) into two equal parts, that is, the left part and the right part). Specifically, as shown in FIG. 58 and FIG. 60 B, the inner imaging section C24 is positioned on the inner side surface of the upper housing C21 at a position reverse of the middle position between the outer left imaging section C23a and the outer right imaging section C23b. Specifically, when the outer left imaging section C23a and the outer right imaging section C23b provided on the outer side surface of the upper housing C21 are projected on the inner side surface of the upper housing C21, the inner imaging section C24 is positioned at the middle position between the outer left imaging section C23a and the outer right imaging section C23b having been projected. The dashed line C24 indicated in FIG. 60B represents the inner imaging section C24 positioned on the inner side surface of the upper housing C21.

As described above, the inner imaging section C24 is used for shooting an image in the direction opposite to that of the outer imaging sections C23. The inner imaging section C24 is positioned on the inner side surface of the upper housing C21 at a position reverse of the middle position between the two outer imaging sections C23. Thus, when a user views the upper LCD C22 from the front thereof, the inner imaging section C24 can shoot an image of a face of the user from the front thereof. Further, the outer left imaging section C23a and the outer right imaging section C23b do not interfere with the inner imaging section C24 inside the upper housing C21, thereby enabling reduction of the thickness of the upper housing C21.

The 3D adjustment switch C25 is a slide switch, and is used for switching a display mode of the upper LCD C22 as described above. Further, the 3D adjustment switch C25 is used for adjusting the stereoscopic effect of a stereoscopically visible image (stereoscopic image) which is displayed on the upper LCD C22. As shown in FIG. 58 to FIG. 60D, the 3D adjustment switch C25 is provided at the end portions of the inner side surface and the right side surface of the upper housing C21, and is positioned at a position at which the 3D adjustment switch C25 is visible to a user when the user views the upper LCD C22 from the front thereof. The 3D adjustment switch C25 has a slider which is slidable to any position in a predetermined direction (for example, the height direction), and a display mode of the upper LCD C22 is determined in accordance with the position of the slider.

For example, when the slider of the 3D adjustment switch C25 is positioned at the lowermost position, the upper LCD C22 is set to the planar display mode, and a planar image is displayed on the screen of the upper LCD C22. The upper LCD C22 may remain set to the stereoscopic display mode, and the same image may be used for the image for a left eye and the image for a right eye, to perform planar display. On the other hand, when the slider is positioned at a position higher than the lowermost position, the upper LCD C22 is set to the stereoscopic display mode. In this case, a stereoscopically visible image is displayed on the screen of the upper LCD C22. When the slider is positioned at a position higher than the lowermost position, a manner in which the stereoscopic image is visible is adjusted in accordance with the position of the slider. Specifically, an amount of displacement in the horizontal direction between a position of an image for a right eye and a position of an image for a left eye is adjusted in accordance with the position of the slider.

The 3D indicator C26 indicates whether or not the upper LCD C22 is in the stereoscopic display mode. The 3D indicator C26 is implemented as a LED, and is lit up when the stereoscopic display mode of the upper LCD C22 is enabled. As shown in FIG. 58, the 3D indicator C26 is positioned near the screen of the upper LCD C22 on the inner side surface of the upper housing C21. Therefore, when a user views the screen of the upper LCD C22 from the front thereof, the user can easily view the 3D indicator C26. Therefore, also when a user is viewing the screen of the upper LCD C22, the user can easily recognize the display mode of the upper LCD C22.

Further, a speaker hole C21E is provided on the inner side surface of the upper housing C21. A sound is outputted through the speaker hole C21E from a speaker C44 described below.

Figure 61:
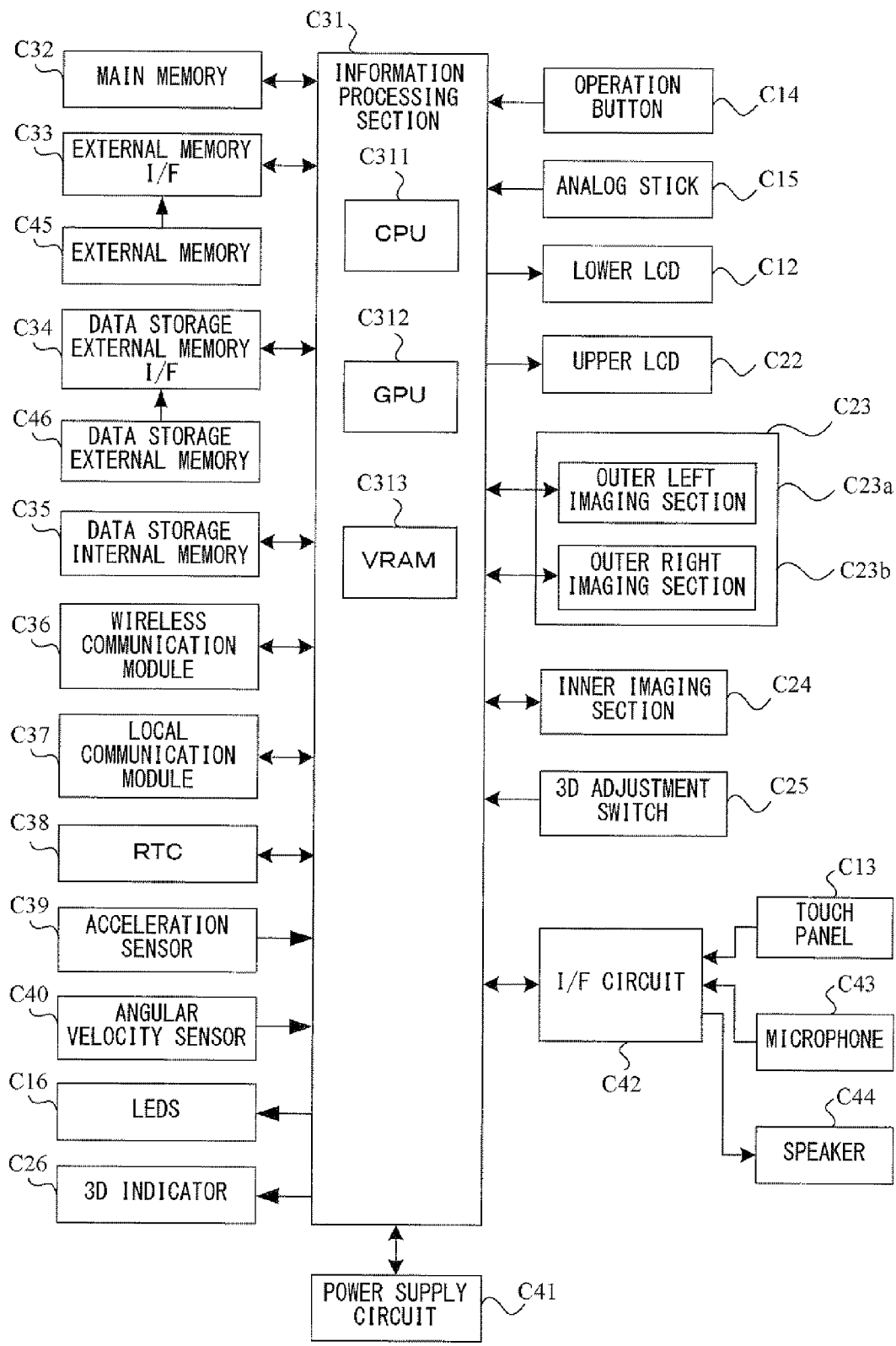
FIG. 61 is a block diagram showing an example of an internal configuration of the game apparatus C10.

Next, an internal configuration of the game apparatus C10 will be described with reference to FIG. 61. FIG. 61 is a block diagram showing an example of an internal configuration of the game apparatus C10.

In FIG. 61, the game apparatus C10 includes, in addition to the components described above, electronic components such as an information processing section C31, a main memory C32, an external memory interface (external memory I/F) C33, an external data storage memory I/F C34, an internal data storage memory C35, a wireless communication module C36, a local communication module C37, a real-time clock (RTC) C38, an acceleration sensor C39, an angular velocity sensor C40, a power supply circuit C41, an interface circuit (I/F circuit) C42, and the like. These electronic components are mounted on an electronic circuit substrate, and accommodated in the lower housing C11 (or the upper housing C21).

The information processing section C31 is information processing means which includes a CPU (Central Processing Unit) C311 for executing a predetermined program, a GPU (Graphics Processing Unit) C312 for performing image processing, and the like. In the present embodiment, a predetermined program is stored in a memory (for example, the external memory C45 connected to the external memory I/F C33 or the internal data storage memory C35) inside the game apparatus C10. The CPU C311 of the information processing section C31 executes image processing and game processing described below by executing the predetermined program. The program executed by the CPU C311 of the information processing section C31 may be obtained from another device through communication with the other device. The information processing section C31 further includes a VRAM (Video RAM) C313. The GPU C312 of the information processing section C31 generates an image in accordance with an instruction from the CPU C311 of the information processing section C31, and renders the image in the VRAM C313. The GPU C312 of the information processing section C31 outputs the image rendered in the VRAM C313, to the upper LCD C22 and/or the lower LCD C12, and the image is displayed on the upper LCD C22 and/or the lower LCD C12.

To the information processing section C31, the main memory C32, the external memory I/F C33, the external data storage memory I/F C34, and the internal data storage memory C35 are connected. The external memory I/F C33 is an interface for detachably connecting to the external memory C45. The external data storage memory I/F C34 is an interface for detachably connecting to the external data storage memory C46.

The main memory C32 is volatile storage means used as a work area and a buffer area for (the CPU C311 of) the information processing section C31. That is, the main memory C32 temporarily stores various types of data used for the image processing and the game processing, and temporarily stores a program obtained from the outside (the external memory C45, another device, or the like), for example. In the present embodiment, for example, a PSRAM (Pseudo-SRAM) is used as the main memory C32.

The external memory C45 is nonvolatile storage means for storing a program executed by the information processing section C31. The external memory C45 is implemented as, for example, a read-only semiconductor memory. When the external memory C45 is connected to the external memory I/F C33, the information processing section C31 can load a program stored in the external memory C45. A predetermined processing is performed by the program loaded by the information processing section C31 being executed. The external data storage memory C46 is implemented as a non-volatile readable and writable memory (for example, a NAND flash memory), and is used for storing predetermined data. For example, images shot by the outer imaging section C23 and/or images shot by another device are stored in the external data storage memory C46. When the external data storage memory C46 is connected to the external data storage memory I/F C34, the information processing section C31 loads an image stored in the external data storage memory C46, and the image can be displayed on the upper LCD C22 and/or the lower LCD C12.

The internal data storage memory C35 is implemented as a non-volatile readable and writable memory (for example, a NAND flash memory), and is used for storing predetermined data. For example, data and/or programs downloaded through the wireless communication module C36 by wireless communication is stored in the internal data storage memory C35.

The wireless communication module C36 has a function of connecting to a wireless LAN by using a method based on, for example, IEEE 802.11.b/g standard. The local communication module C37 has a function of performing wireless communication with the same type of game apparatus in a predetermined communication method (for example, infrared communication). The wireless communication module C36 and the local communication module C37 are connected to the information processing section C31. The information processing section C31 can perform data transmission to and data reception from another device via the Internet by using the wireless communication module C36, and can perform data transmission to and data reception from the same type of another game apparatus by using the local communication module C37.

The acceleration sensor C39 is connected to the information processing section C31. The acceleration sensor C39 detects magnitudes of accelerations (linear accelerations) in the directions of the straight lines along the three axial directions (xyz axial directions in the present embodiment), respectively. The acceleration sensor C39 is provided inside the lower housing C11, for example. In the acceleration sensor C39, as shown in FIG. 58, the long side direction of the lower housing C11 is defined as x axial direction, the short side direction of the lower housing C11 is defined as y axial direction, and the direction orthogonal to the inner side surface (main surface) of the lower housing C11 is defined as z axial direction, thereby detecting magnitudes of the linear accelerations generated in the respective axial directions of the game apparatus C10, respectively. The acceleration sensor C39 is, for example, an electrostatic capacitance type acceleration sensor. However, another type of acceleration sensor may be used. The acceleration sensor C39 may be an acceleration sensor for detecting a magnitude of an acceleration for one axial direction or two-axial directions. The information processing section C31 receives data (acceleration data) representing accelerations detected by the acceleration sensor C39, and calculates an orientation and a motion of the game apparatus C10.

The angular velocity sensor C40 is connected to the information processing section C31. The angular velocity sensor C40 detects angular velocities generated around the three axes (xyz axes in the present embodiment), respectively, of the game apparatus C10, and outputs data representing the detected angular velocities (angular velocity data) to the information processing section C31. The angular velocity sensor C40 is provided in the lower housing C11, for example. The information processing section C31 receives the angular velocity data outputted by the angular velocity sensor C40 and calculates an orientation and a motion of the game apparatus C10.

The RTC C38 and the power supply circuit C41 are connected to the information processing section C31. The RTC C38 counts time, and outputs the time to the information processing section C31. The information processing section C31 calculates a current time (date) based on the time counted by the RTC C38. The power supply circuit C41 controls power from the power supply (the rechargeable battery accommodated in the lower housing C11 as described above) of the game apparatus C10, and supplies power to each component of the game apparatus C10.

The I/F circuit C42 is connected to the information processing section C31. The microphone C43, the speaker C44, and the touch panel C13 are connected to the I/F circuit C42. Specifically, the speaker C44 is connected to the I/F circuit C42 through an amplifier which is not shown. The microphone C43 detects a voice from a user, and outputs a sound signal to the I/F circuit C42. The amplifier amplifies a sound signal outputted from the I/F circuit C42, and a sound is outputted from the speaker C44. The I/F circuit C42 includes a sound control circuit for controlling the microphone C43 and the speaker C44 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel C13, and outputs the touch position data to the information processing section C31. The touch position data represents coordinates of a position, on an input surface of the touch panel C13, on which an input is made (touch position). The touch panel control circuit reads a signal outputted from the touch panel C13, and generates the touch position data every predetermined time. The information processing section C31 obtains the touch position data, to recognize a touch position on which an input is made on the touch panel C13.

The operation button C14 includes the operation buttons C14A to C14L described above, and is connected to the information processing section C31. Operation data representing an input state of each of the operation buttons C14A to C14I is outputted from the operation button C14 to the information processing section C31, and the input state indicates whether or not each of the operation buttons C14A to C14I has been pressed. The information processing section C31 obtains the operation data from the operation button C14 to perform processing in accordance with the input on the operation button C14.

The lower LCD C12 and the upper LCD C22 are connected to the information processing section C31. The lower LCD C12 and the upper LCD C22 each display an image in accordance with an instruction from (the GPU C312 of) the information processing section C31. In the present embodiment, for example, the information processing section C31 causes the lower LCD C12 to display an image for input operation, and causes the upper LCD C22 to display an image obtained from one of the outer imaging section C23 or the inner imaging section C24. That is, the information processing section C31 causes the upper LCD C22 to display a stereoscopic image (stereoscopically visible image) using an image for a right eye and an image for a left eye which are shot by the outer imaging section C23, causes the upper LCD C22 to display a planar image shot by the inner imaging section C24, and causes the upper LCD C22 to display a planar image using one of an image for a right eye and an image for a left eye which are shot by the outer imaging section C23, for example.

Specifically, the information processing section C31 is connected to an LCD controller (not shown) of the upper LCD C22, and causes the LCD controller to set the parallax barrier to ON or OFF. When the parallax barrier is set to ON in the upper LCD C22, an image for a right eye and an image for a left eye, (shot by the outer imaging section C23), which are stored in the VRAM C313 of the information processing section C31 are outputted to the upper LCD C22. More specifically, the LCD controller alternately repeats reading of pixel data of the image for a right eye for one line in the vertical direction, and reading of pixel data of the image for a left eye for one line in the vertical direction, thereby reading, from the VRAM C313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD C22. A user views the images through the parallax barrier in the upper LCD C22, so that the image for the right eye is viewed by the user's right eye, and the image for the left eye is viewed by the user's left eye. Thus, the stereoscopically visible image is displayed on the screen of the upper LCD C22.

The outer imaging section C23 and the inner imaging section C24 are connected to the information processing section C31. The outer imaging section C23 and the inner imaging section C24 each shoot an image in accordance with an instruction from the information processing section C31, and output data of the shot image to the information processing section C31. In the present embodiment, the information processing section C31 issues an instruction for shooting an image to one of the outer imaging section C23 or the inner imaging section C24, and the imaging section which receives the instruction for shooting an image shoots an image and transmits data of the shot image to the information processing section C31. Specifically, a user selects the imaging section to be used through an operation using the touch panel C13 and the operation buttons C14. When the information processing section C31 (the CPU C311) detects that the imaging section is selected, the information processing section C31 instructs one of the outer imaging section C32 or the inner imaging section C24 to shoot an image.

The 3D adjustment switch C25 is connected to the information processing section C31. The 3D adjustment switch C25 transmits, to the information processing section C31, an electrical signal in accordance with the position of the slider.

The 3D indicator C26 is connected to the information processing section C31. The information processing section C31 controls whether or not the 3D indicator C26 is to be lit up. For example, the information processing section C31 lights up the 3D indicator C26 when the upper LCD C22 is in the stereoscopic display mode.

Figure 62:
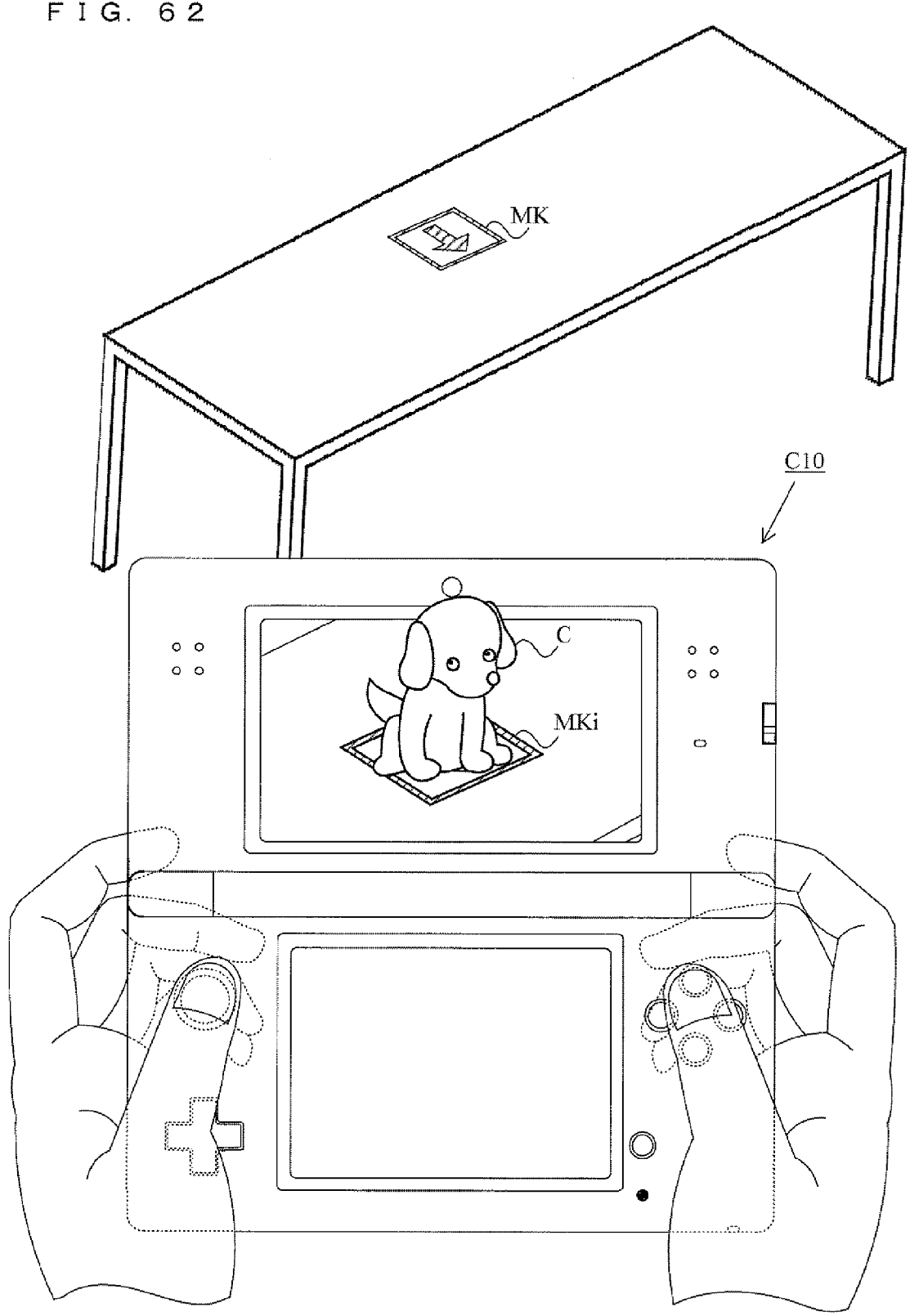
FIG. 62 shows an example of the game apparatus C10 held by the user with both hands.
Figure 63:
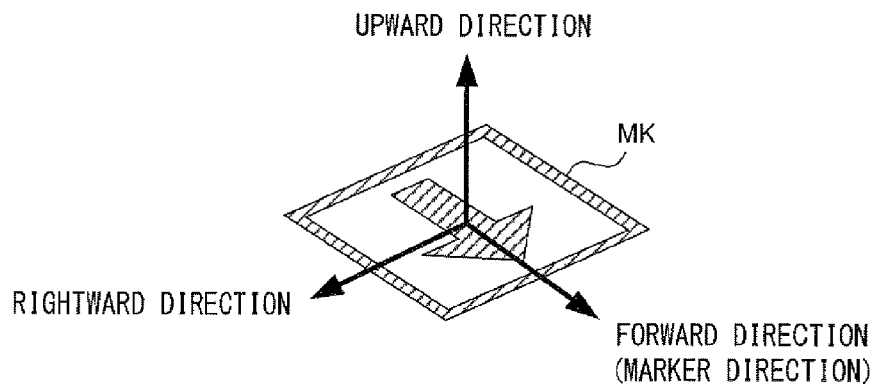
FIG. 63 shows an example of a marker MK whose image is shot by an outer imaging section C23.
Figure 64:
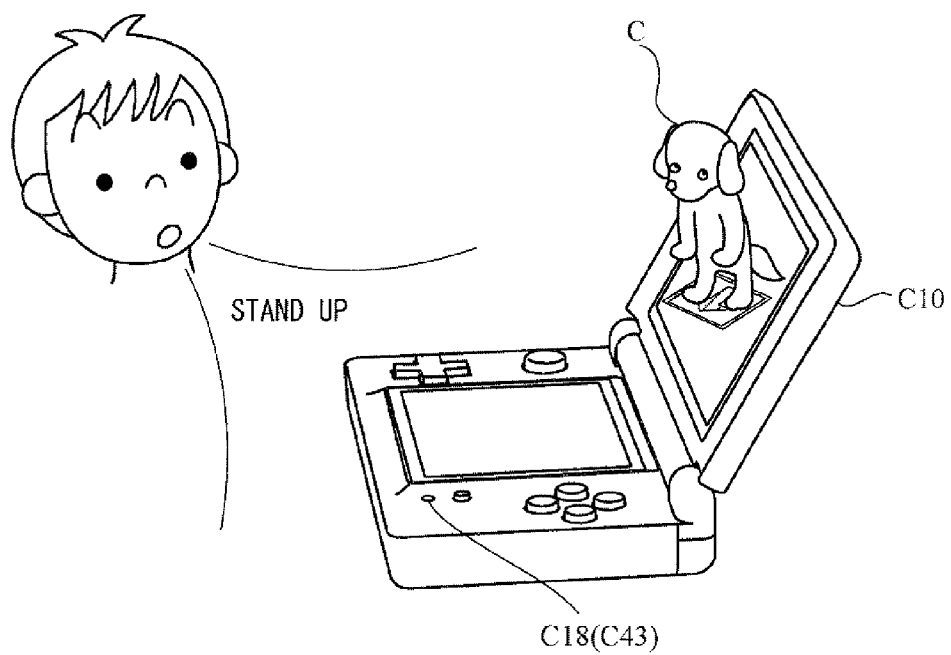
FIG. 64 schematically shows an example illustrating the user inputting a sound into the game apparatus C10.

Next, with reference to FIG. 62 to FIG. 68, description is given of an example of a state in which the game apparatus C10 is used and of display contents to be displayed on the game apparatus C10. FIG. 62 shows an example of the game apparatus C10 held by the user with both hands. FIG. 63 shows an example of a marker MK whose image is shot by the outer imaging section C23. FIG. 64 schematically shows an example illustrating the user inputting a sound into the game apparatus C10. FIG. 65 to FIG. 68 each show an example of a display form displayed on the upper LCD C22.

As shown in FIG. 62, the user holds the side surfaces and the outer side surface (the surface reverse of the inner side surface) of the lower housing C11 with his/her palms, middle fingers, ring fingers, and little fingers of both hands such that the lower LCD C12 and the upper LCD C22 face the user. This allows the user to perform operations onto the operation buttons C14A to C14E and the analog stick C15 by using his/her thumbs, and operations onto the L button C14G and the R button C14H with his/her index fingers, while holding the lower housing C11. In the example shown in FIG. 62, a real world image of a real world on the side of the back surface of the game apparatus C10 shot by the outer left imaging section C23a and the outer right imaging section C23b is stereoscopically displayed on the upper LCD C22.

In the present embodiment, in accordance with the image processing program, a combined image generated by combining an real world image currently being shot by the outer imaging section C23 (outer left imaging section C23a and outer right imaging section C23b) with an image of a virtual object present in a 3-dimensional virtual space is displayed on the screen of the upper LCD C22 in a stereoscopically visible manner. Specifically, two images shot by the outer imaging section C23 are supplied to the upper LCD C22 in such a manner as to have a predetermined parallax, to be stereoscopically displayed on the upper LCD C22. On the screen of the upper LCD C22, a subject that is relatively nearer to the outer imaging section C23 is viewed by the user as if the subject is located relatively nearer to the user, and a subject that is relatively farther from the outer imaging section C23 is viewed by the user as if the subject is located relatively farther from the user.

FIG. 62 shows an example of a virtual character C (stereoscopic image), which is a virtual object displayed on the screen of the upper LCD C22 while an image of the marker MK (a real object whose image is shot) is being shot by the outer imaging section C23. As shown in FIG. 62, a square including an exemplary arrow is drawn as an example of the marker MK. The CPU C311 can determine, with respect to a shot image obtained from the outer imaging section C23, whether the shot image includes the marker MK by performing image processing such as pattern matching. When an image of the marker MK has been shot by the outer imaging section C23, the marker MK is displayed on the upper LCD C22 in a stereoscopically visible manner as a real world image, which is a marker image MKi and, at the same time, the virtual character C (for example, a virtual object which looks like a dog) is displayed in a stereoscopically visible manner in combination with the MKi at a position at which the marker image MKi included in the real world image is displayed. FIG. 62 shows the virtual character C extending out of the screen of the upper LCD C22 in order to facilitate understanding. Actually, however, the virtual character C is displayed within the screen. FIG. 64 is drawn in the same manner as FIG. 62. Moreover, FIG. 62 and FIG. 64 each show the subject in such a manner as if it jumps out of the screen. However, the expression "displaying a subject in a stereoscopically visible manner" means not only displaying the subject as if it jumps out of the screen but also displaying the subject with a depth in a direction extending away from the user relative to the screen.

Here, as shown in FIG. 63, the marker MK has definitions of directions (forward direction, rightward direction, and upward direction) and the virtual character C can be arranged in an orientation based on the orientation of the marker MK. For example, the virtual character C can be arranged on the marker image MKi such that the forward direction of the virtual character C corresponds to the forward direction of the marker image MKi. It should be noted that, in the description below, the forward direction of the marker image MKi may be described as a "marker direction".

As shown in FIG. 64, when giving an action instruction to the virtual character C displayed on the game apparatus C10, the user can give such an action instruction by means of a sound. It can be considered that the sound that the user inputs into the game apparatus C10 may be whistle sound, clapping sound, breath sound or the like as well as speech sound (words). However, these sounds are collectively called as "sound" herein.

In order to cause the game apparatus C10 to determine the type of the sound from the user, the user inputs his/her own sound through the microphone C43 (microphone hole C18). The game apparatus C10 obtains sound data representing a sound signal of the sound inputted through the microphone C43 via the I/F circuit C42, analyzes the sound data, and determines the type of the sound inputted through the microphone C43. Then, the game apparatus C10 performs processing in accordance with the result of the determination regarding the sound inputted through the microphone C43, and causes the virtual character C to perform an action in accordance with the result of the determination. As one example, when the game apparatus C10 determines that the sound inputted through the microphone C43 is words (e.g., "stand up") to instruct the virtual character C to perform an action of standing up, the game apparatus C10 causes the virtual character C to perform the action of standing up in accordance with the sound for which the determination has been performed, to be displayed on the upper LCD C22 (the state shown in FIG. 64).

Next, with reference to FIG. 65 to FIG. 68, description is given of another example of the virtual character C to be displayed on the screen of the upper LCD C22 while an image of the marker MK is being shot by the outer imaging section C23.

Figure 65:
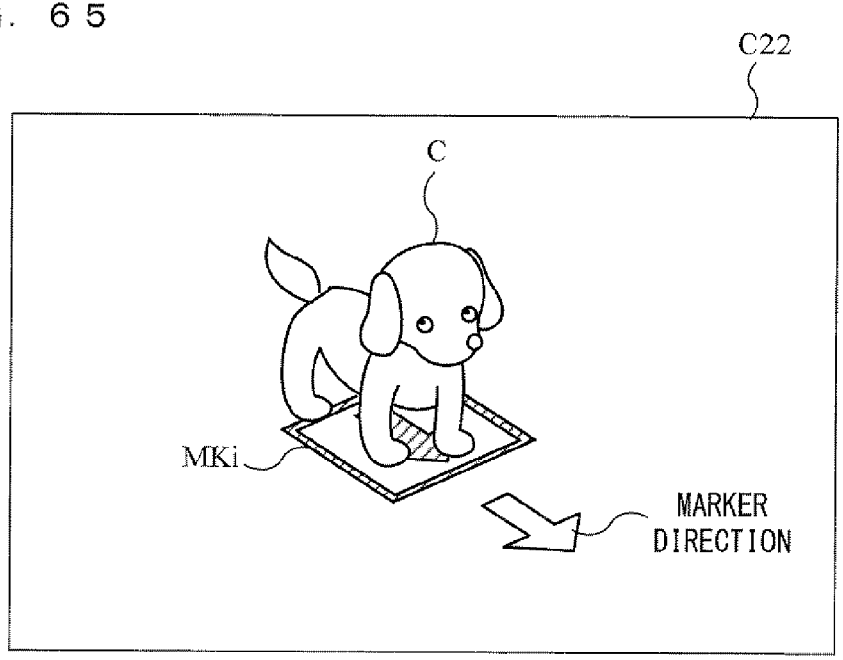
FIG. 65 shows an example of a display form displayed on an upper LCD C22.

In FIG. 65, the virtual character C is being displayed in a "normal state". Here, the "normal state" is a state where the virtual character C is not performing an action designated by an action instruction by the user and is acting in a predetermined manner. For example, in the "normal state", the virtual character C stays still with the four legs on the ground (on the marker image MKi or on the same plane as the marker image MKi) or freely moves around. In the example shown in FIG. 65, a state where the virtual character C is standing with its four legs on the ground in such a manner that the forward direction of the virtual character C coincides with the forward direction of the marker image MKi, is set as the "normal state".

Figure 66:
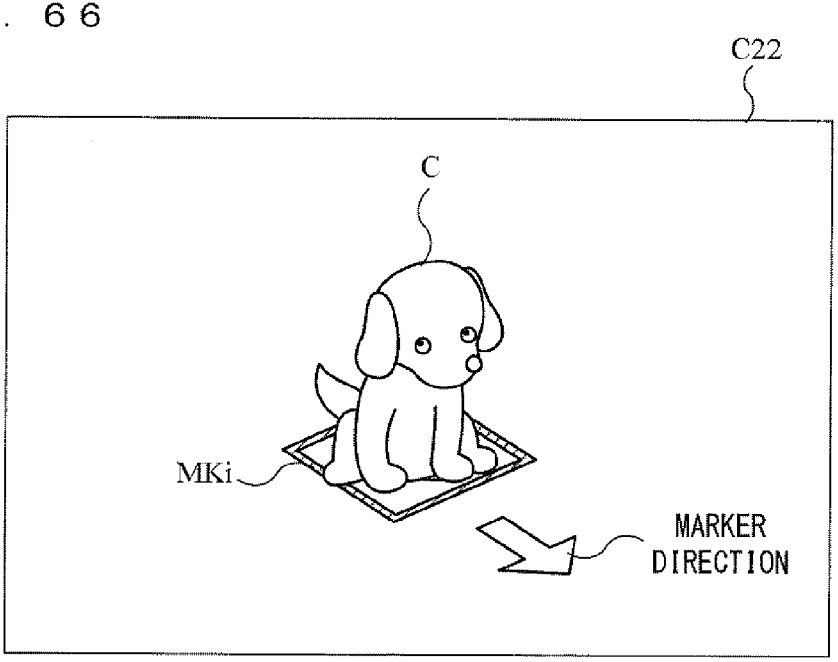
FIG. 66 shows an example of a display form displayed on the upper LCD C22.

FIG. 66 shows an action performed by the virtual character C when words (e.g., "sit down") to instruct the virtual character C to perform an action of sitting down are inputted to the game apparatus C10. As shown in FIG. 66, when the sound to instruct the virtual character C to perform an action of sitting down is inputted to the game apparatus C10, the virtual character C starts the action of sitting down on the ground (on the marker image MKi or on the same plane as the marker image MKi), and sits down on the ground in such a manner that the forward direction of the virtual character C coincides with the forward direction of the marker image MKi. In this manner, when words (e.g., "sit down" or "lie down") representing the name of an action to be performed by the virtual character C are inputted to the game apparatus C10, the virtual character C may perform the action corresponding to the words in such a manner that the forward direction of the virtual character C coincides with the forward direction of the marker image MKi. As another example, when words representing the name of the virtual character C is inputted to the game apparatus C10, the virtual character C may bark in such a manner that the forward direction of the virtual character C coincides with the forward direction of the marker image MKi.

Figure 67:
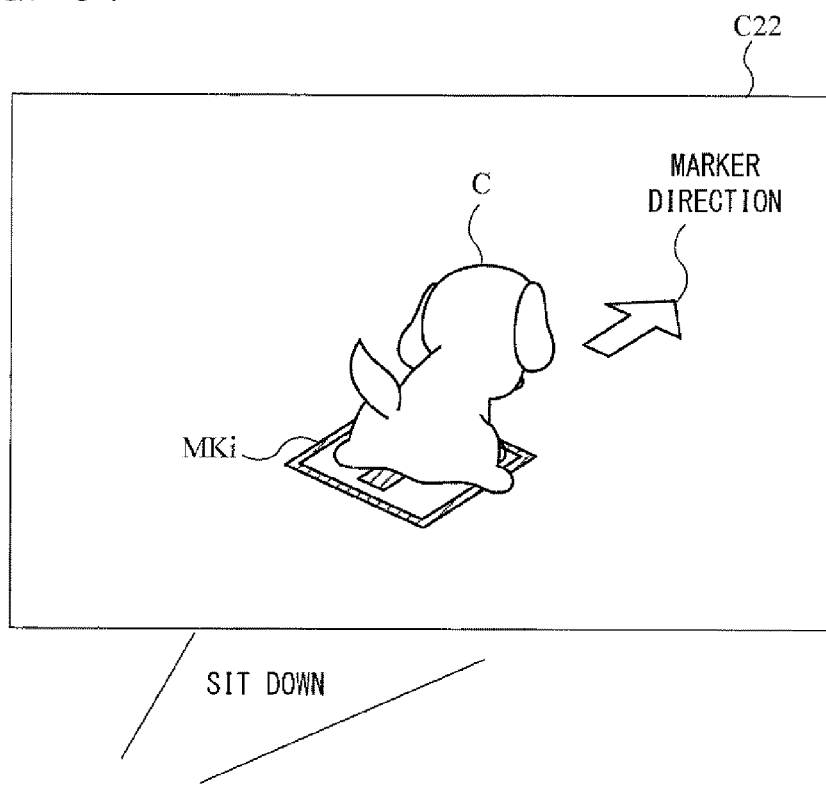
FIG. 67 shows an example of a display form displayed on the upper LCD C22.

For example, it is assumed that the position and the orientation of the marker MK whose image is shot are changed by the user moving the game apparatus C10, that is, the position and the orientation of the marker image MKi displayed on the screen of the upper LCD C22 are changed, as shown in FIG. 67. In this case, the position and the orientation of the virtual character C are changed in such a manner as to follow the change in the shot image. For example, when the marker direction is changed from that in the image where the virtual character C is sitting as shown in FIG. 66, the virtual character C continues to sit on the marker image MKi with the orientation of the virtual character C changed so as to follow the change of the marker direction (state shown in FIG. 67). Accordingly, the user sees the virtual character C as if it exists in the real world.

Figure 68:
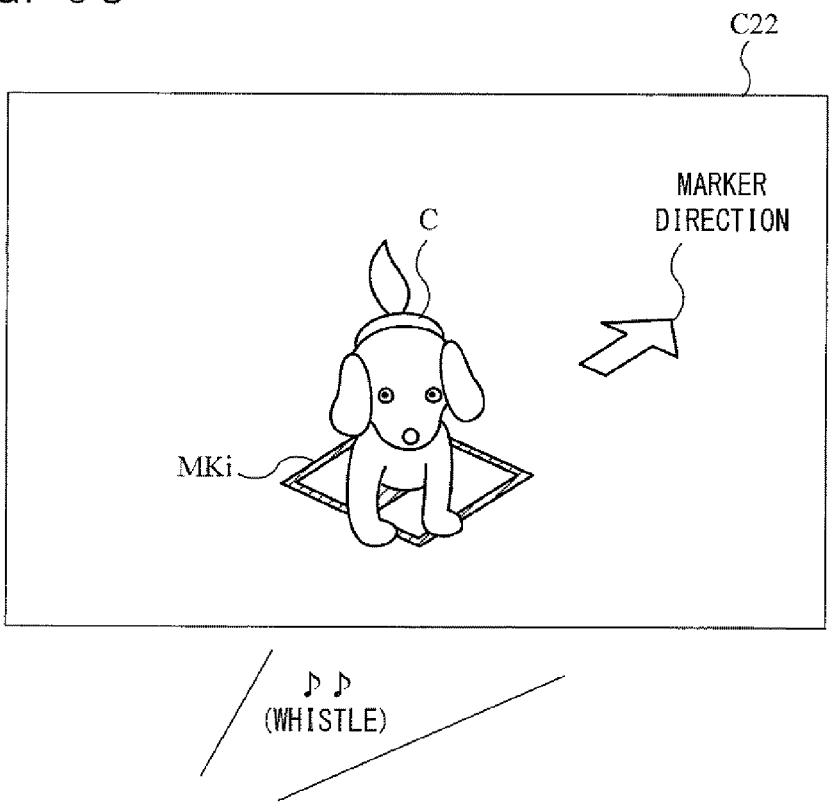
FIG. 68 shows an example of a display form displayed on the upper LCD C22.

Meanwhile, in the present embodiment, in accordance with an action instruction by means of a sound which has been given to the virtual character C, the virtual character C can perform an action not in the orientation that coincides with the marker direction, but in the orientation based on the position of the camera generating the image (that is, the virtual camera generating the virtual world image in which the virtual character C is arranged). For example, FIG. 68 shows the virtual character C performing an action in response to a sound for calling over the virtual character C (e.g., whistle sound) which has been inputted into the game apparatus C10 as an action instruction. As shown in FIG. 68, when the sound for calling over the virtual character C is inputted to the game apparatus C10, the virtual character C stands on its four legs and acts in such a manner that the forward direction of the virtual character C coincides with the direction to the virtual camera. That is, in the above action, the orientation in which the virtual character C is displayed is not set in the direction of the marker image MKi, but is set based on the position of the virtual camera which generates the virtual world image. It should be noted that a whistle sound is used as an example of the action instruction to cause the virtual character C to act in response to the sound for calling over the virtual character C in the above description. However, another sound may be used. For example, a clapping sound may be set as the sound for calling over the virtual character C as the action instruction to cause the virtual character C to act in response to the sound, and when a clapping sound is inputted, the virtual character C may move on its four legs in such a manner that the forward direction of the virtual character C coincides with the direction to the virtual camera. In this case, when a whistle sound is inputted, the virtual character C may perform an action of howling in such a manner that the forward direction of the virtual character C coincides with the direction to the virtual camera.

In the present embodiment, when an action instruction by means of a sound is given to the virtual character C, the action instruction given to the virtual character C may be changed depending on the direction in which the image of the virtual character C is being shot (being displayed) at the time when the action instruction is given. For example, in a case where a breath sound is inputted into the game apparatus C10, if the virtual character C is present in a display range of the upper LCD C22 and the forward direction of the virtual character C is directed toward the vicinity of the virtual camera at the time when the input is given, the virtual character C may act as if it hates being blown by the breath. On the other hand, if the forward direction of the virtual character C is not directed toward the vicinity of the virtual camera at the time when the breath sound is inputted into the game apparatus C10, even when the virtual character C is present in the display range of the upper LCD C22, the virtual character C does not act in accordance with the input or react at all. For example, the action of the virtual character C hating being blown by the breath is an action generated when the virtual character C is being displayed in the "normal state". In this case, the virtual character C is displayed in such an orientation that the forward direction of the virtual character C coincides with the forward direction of the marker image MKi. Therefore, it can be considered that such an action instruction can be enabled when the relationship between the marker direction and the position of the virtual camera satisfies a predetermined position relationship.

As described above, in the present embodiment, a virtual object is arranged and additionally displayed in a real world image, which is shot by a real camera and displayed in the upper LCD C22, and the virtual object acts in accordance with an instruction based on a sound which has been recognized through sound recognition. Therefore, by employing a sound as an interface between the real space and the computer when realizing Augmented Reality (AR), the simplicity of input operations is improved, and a variety of input contents is allowed. Accordingly, the interactiveness between the real space and the computer is improved, and the interest and the operability are enhanced. Moreover, the operation by means of a sound input can enhance realistic feeling and directness of the operation compared with a case where a conventional input device such as an operation button, keyboard, touch panel, mouse, joystick, or track ball is used for the operation. In the example described above, the virtual character C is used as an example of the virtual object to be additionally displayed in the real world image. Alternatively, other virtual objects or letters may be additionally displayed in the real world image. In the example described above, the virtual character C which is additionally being displayed acts in accordance with an instruction based on a sound which has been recognized through sound recognition. However, another processing may be performed in accordance with an instruction based on a sound which has been recognized through sound recognition. For example, in accordance with an instruction based on a sound which has been recognized through sound recognition, various types of processing may be performed, such as: processing of altering virtual objects or letters additionally displayed in the real world image, processing of changing the display form thereof, processing of selection, processing of causing the virtual objects or letters to appear/disappear, and the like.

Figure 69:
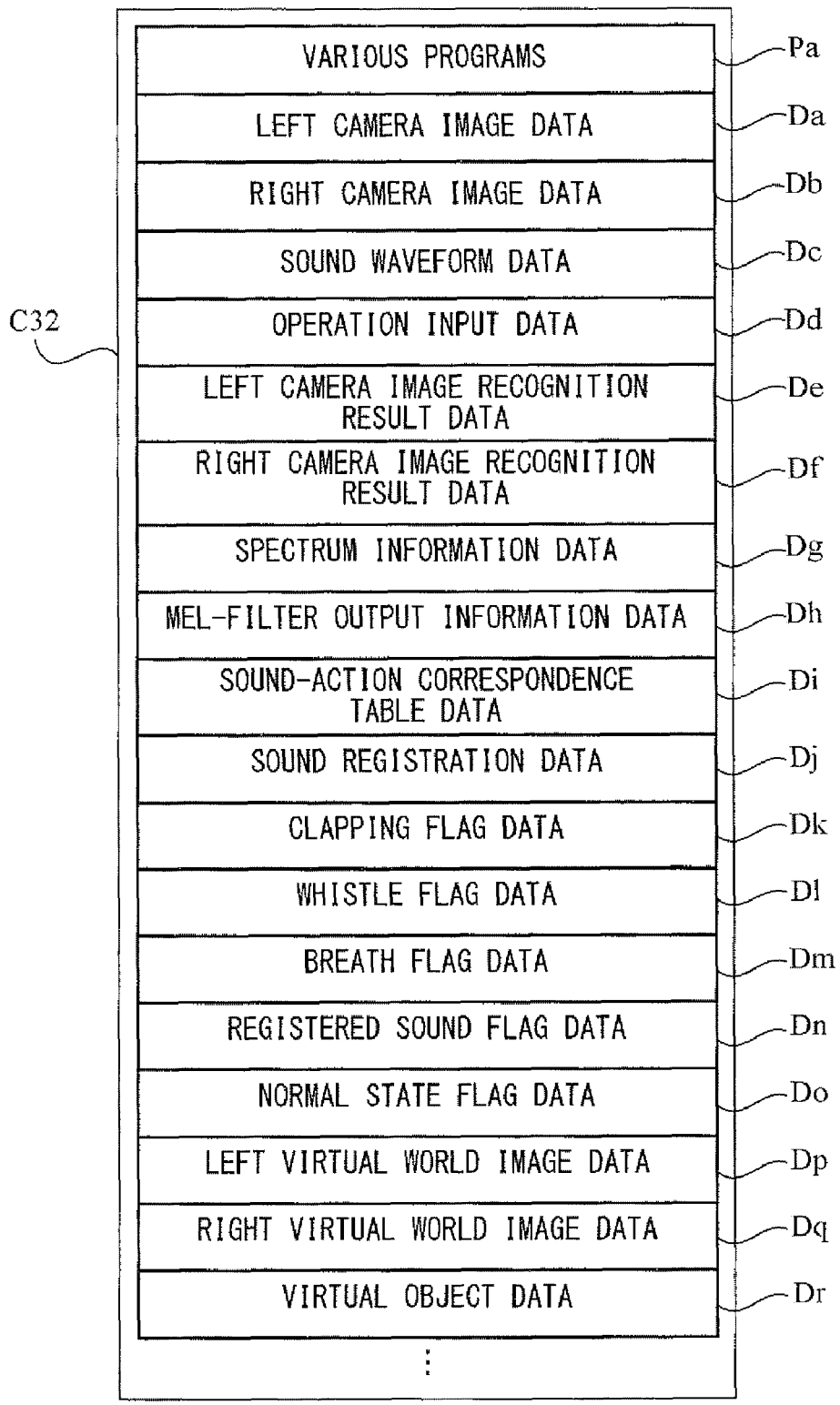
FIG. 69 shows an example of various kinds of data to be stored in a main memory C32 in accordance with an execution of an image processing program.
Figure 71:
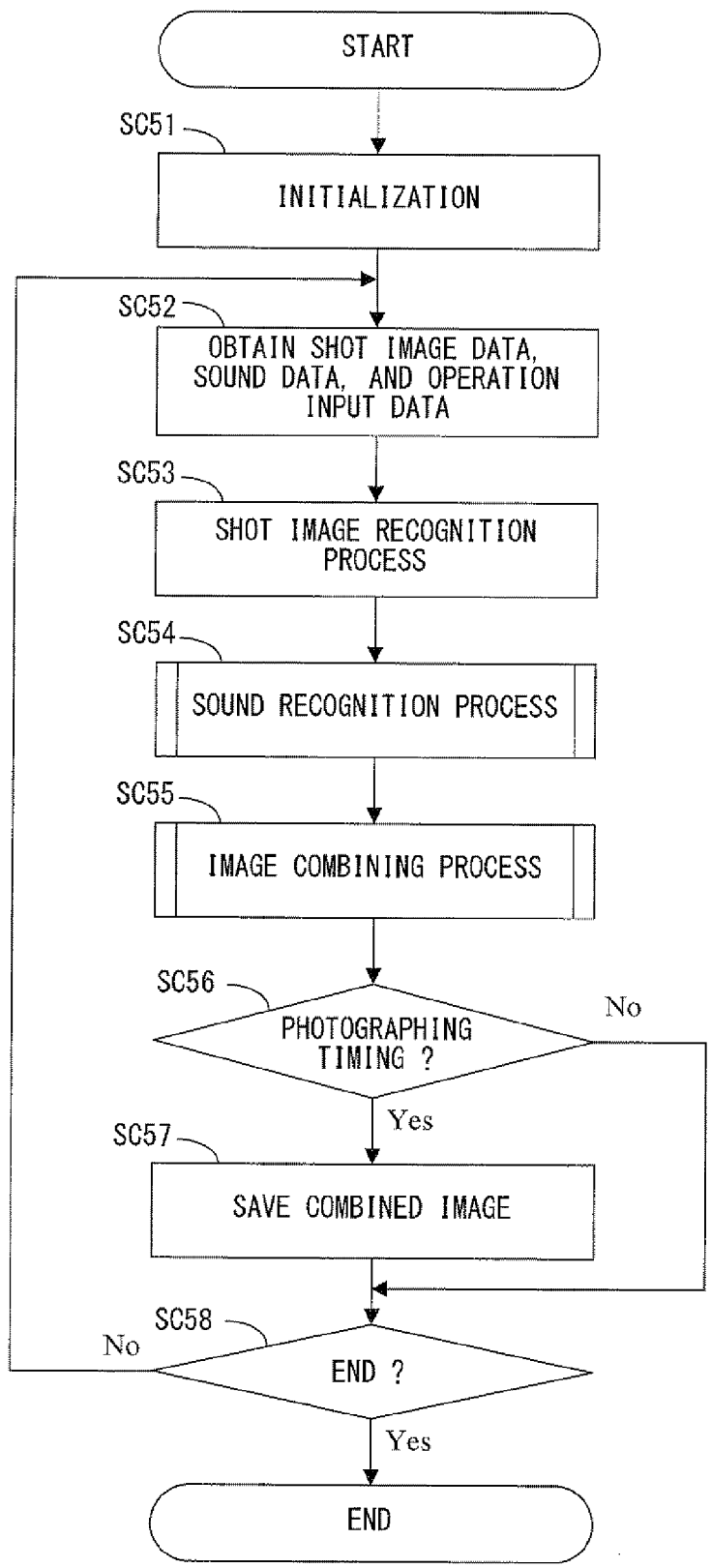
FIG. 71 is a flow chart showing an example of image processing operations performed by the game apparatus C10 in accordance with the execution of the image processing program.
Figure 72:
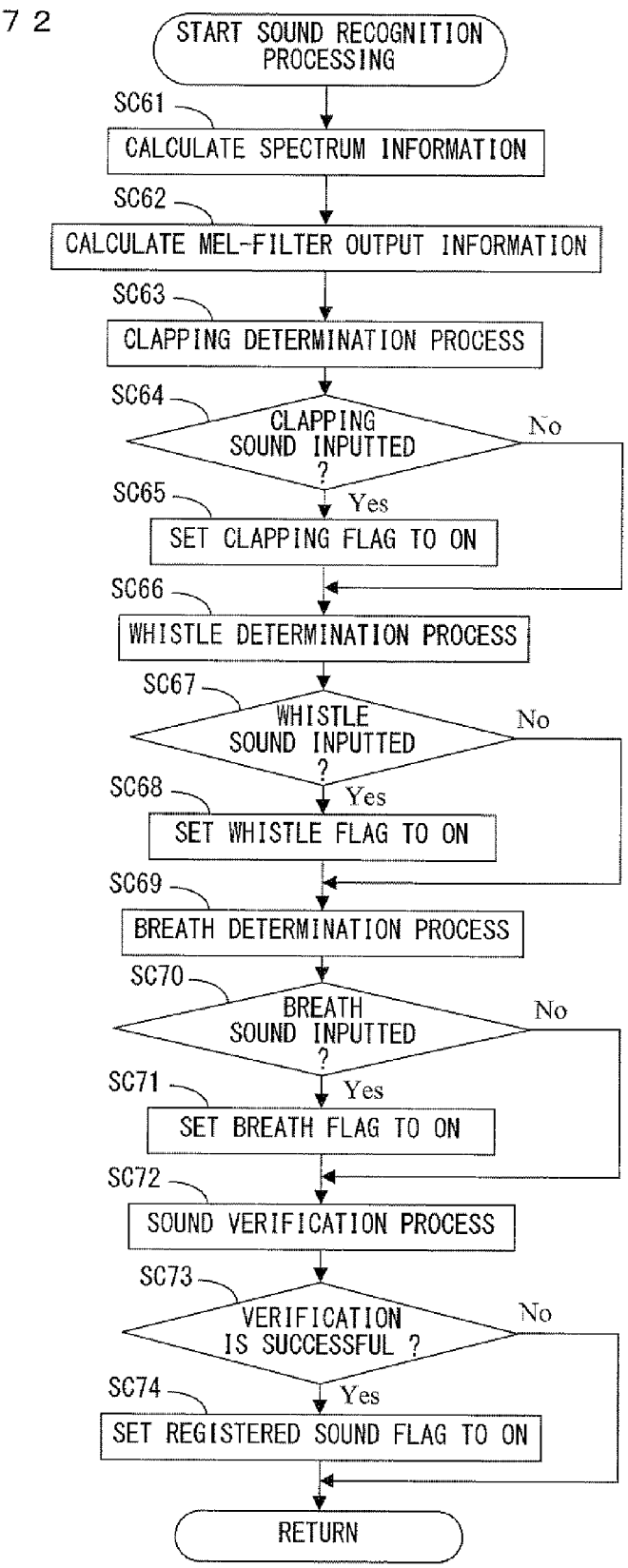
FIG. 72 is a sub-routine showing in detail an example of operations of sound recognition processing performed in step C54 in FIG. 71.
Figure 73:
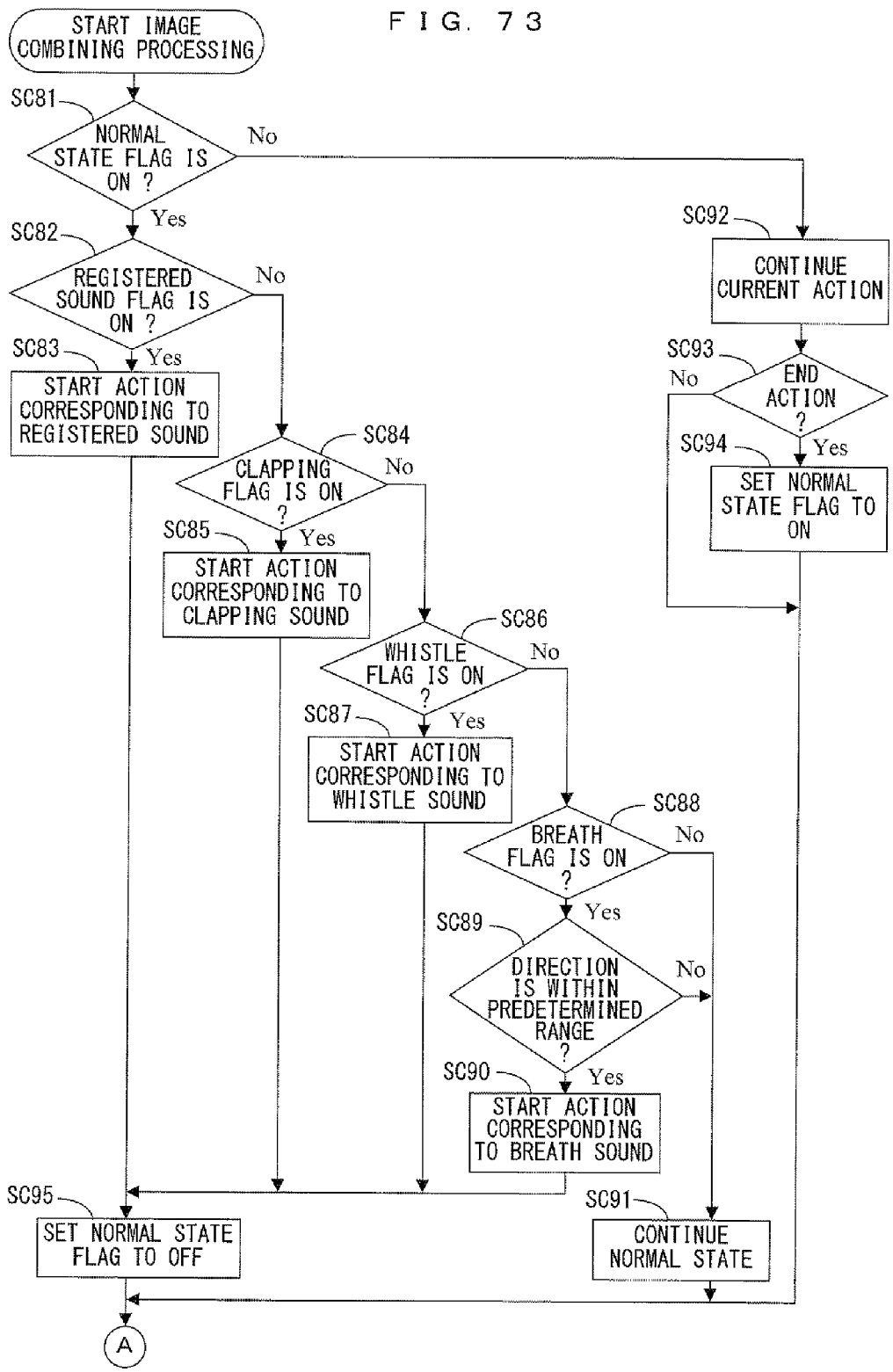
FIG. 73 is a sub-routine showing in detail an example of a first half of operations of image combining processing performed in step C55 in FIG. 71.
Figure 74:
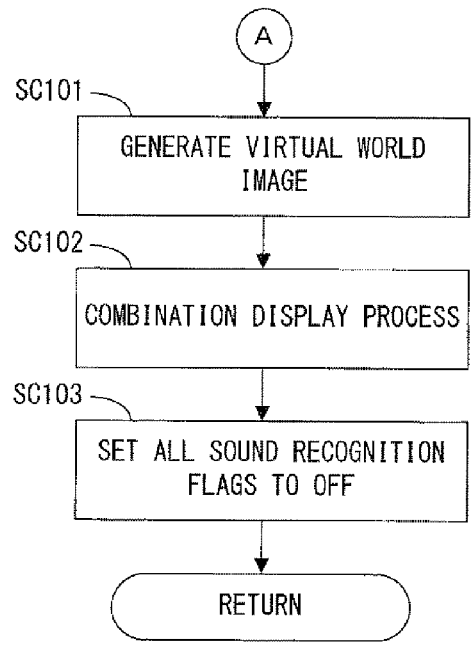
FIG. 74 is a sub-routine showing in detail an example of a second half of operations of the image combining processing performed in step C55 in FIG. 71.

Next, with reference to FIG. 69 to FIG. 74, processing operations performed by the image processing program executed by the game apparatus C10 will be described in detail. FIG. 69 shows an example of various kinds of data to be stored in the main memory C32 in accordance with the execution of the image processing program. FIG. 70 shows an example of the sound-action correspondence table data Di in FIG. 69. FIG. 71 is a flow chart showing an example of image processing operations performed by the game apparatus C10 in accordance with the execution of the image processing program. FIG. 72 is a sub-routine showing in detail an example of operations of sound recognition processing performed in step C54 in FIG. 71. FIG. 73 is a sub-routine showing in detail an example of a first half of operations of image combining processing performed in step C55 in FIG. 71. FIG. 74 is a sub-routine showing in detail an example of a second half of operations of the image combining processing performed in step C55 in FIG. 71. It should be noted that the program for performing these processes is included in the memory incorporated in the game apparatus C10 (e.g., internal data storage memory C35) or in the external memory C45 or the external data storage memory C46. When the game apparatus C10 is powered on, the program is loaded into the main memory C32 from the incorporated memory, or from the external memory C45 or the external data storage memory C46 via the external memory I/F C33 or the external data storage memory I/F C34, respectively, and the CPU C311 executes the program.

With reference to FIG. 69, the main memory C32 stores the program loaded from the incorporated memory, the external memory C45, or the external data storage memory C46, and temporary data generated in the image processing. In FIG. 69, the data storage area of the main memory C32 stores left camera image data Da, right camera image data Db, sound waveform data Dc, operation input data Dd, left camera image recognition result data De, right camera image recognition result data Df, spectrum information data Dg, Mel-filter output information data Dh, sound-action correspondence table data Di, sound registration data Dj, clapping flag data Dk, whistle flag data Dl, breath flag data Dm, registered sound flag data Dn, normal state flag data Do, left virtual world image data Dp, right virtual world image data Dq, virtual object data Dr, and the like. The program storage area of the main memory C32 stores various programs Pa forming the image processing program.

The left camera image data Da is data representing a latest camera image for a left eye shot by the outer left imaging section C23a. The right camera image data Db is data representing a latest camera image for a right eye shot by the outer right imaging section C23b. It should be noted that the cycle in which the outer left imaging section C23a and the outer right imaging section C23b shoot images, respectively, and the left camera image data Da and the right camera image data Db are updated by using the shot camera images, respectively, may be the same as the time unit of processing performed by the game apparatus C10 (e.g., 1/60 sec) or shorter than this time unit. In a case where the cycle of updating each of the left camera image data Da and the right camera image data Db is shorter than the cycle of processing performed by the game apparatus C10, each of the left camera image data Da and the right camera image data Db may be updated as appropriate, independently of the processing described below. In this case, in a step of obtaining shot images described below, latest camera images represented by the left camera image data Da and the right camera image data Db, respectively, may always be used.

The sound waveform data Dc is sound data corresponding to a sound waveform inputted through the microphone C43. For example, the sound waveform data De is sound data obtained at each sampling performed with respect to the microphone C43 (e.g., 128 samples for each time unit (one frame; e.g., 1/60 sec) of the game processing), and is used for each time unit of the game processing performed by the game apparatus C10. In the present embodiment, a history of frames, by the number of frames necessary for the sound recognition processing described below, is stored as sound data of the sound waveform data Dc. Therefore, the sound data of the sound waveform data Dc may be updated in the FIFO method such that the sound data corresponding to the above number of frames is stored as the sound waveform data Dc.

The operation input data Dd is data representing information of the operation performed by the user onto the game apparatus C10. For example, the operation input data Dd includes data representing that an operational device such as the operation button C14, the analog stick C15, or the like of the game apparatus C10 has been operated by the user. The operation data from the operation button C14 or the analog stick C15 is obtained every time unit (e.g., 1/60 sec) of the processing performed by the game apparatus C10 and stored in the operation input data Dd, and the operation input data Dd is updated at each timing at which the operation data is obtained. In processing flow described below, an example is used in which the operation input data Dd is updated every frame, which is processing cycle. However, the operation input data Dd may be updated at another processing cycle. For example, the operation input data Dd may be updated at every cycle of detecting that the user has operated an operational device such as the operation button C14 or the analog stick C15, and the updated operation input data Dd may be used for each processing cycle. In this case, the cycle of updating the operation input data Dd is different from the processing cycle.

The left camera image recognition result data De is data regarding the position relationship between the outer left imaging section C23a and the marker MK and calculated by using a camera image for a left eye shot by the outer left imaging section C23a. As a first example, the data regarding the position relationship is data representing a relative position relationship between the outer left imaging section C23a and the marker MK. As an example, the data regarding the position relationship is data representing the position and/or the orientation of the outer left imaging section C23a in the real world with reference to the position of the marker MK. As another example, the data regarding the position relationship is data representing the position and/or the orientation of the marker MK in the real world with reference to the position and the imaging direction of the outer left imaging section C23a. As a second example, the data regarding the position relationship is data representing a matrix calculated by recognizing the position and/or the orientation of the marker image MKi in a camera image shot by the outer left imaging section C23a. For example, the matrix is a coordinate transformation matrix for transforming coordinates represented in a coordinate system set with reference to the position and the orientation of the marker MK (marker coordinate system) into a coordinate system represented with reference to the position and the orientation of the outer left imaging section C23a (outer left imaging section coordinate system). That is, the matrix is a matrix including information of the position and the orientation of the outer left imaging section C23a relative to the position and the orientation of the marker MK, and more specifically, is a matrix including information of the position and the orientation of the outer left imaging section C23a in the marker coordinate system.

The right camera image recognition result data Df is data regarding the position relationship between the outer right imaging section C23b and the marker MK and calculated by using a camera image for a right eye shot by the outer right imaging section C23b. As a first example, the data regarding the position relationship is data representing a relative position relationship between the outer right imaging section C23b and the marker MK. As an example, the data regarding the position relationship is data representing the position and/or the orientation of the outer right imaging section C23b in the real world with reference to the position of the marker MK. As another example, the data regarding the position relationship is data representing the position and/or the orientation of the marker MK in the real world with reference to the position and the imaging direction of the outer right imaging section C23b. As a second example, the data regarding the position relationship is data representing a matrix calculated by recognizing the position and/or the orientation of the marker image MKi in a camera image shot by the outer right imaging section C23b. For example, the matrix is a coordinate transformation matrix for transforming coordinates represented in the marker coordinate system into a coordinate system represented with reference to the position and the orientation of the outer right imaging section C23b (outer right imaging section coordinate system). That is, the matrix is a matrix including information of the position and the orientation of the outer right imaging section C23b relative to the position and the orientation of the marker MK, and more specifically, is a matrix including information of the position and the orientation of the outer right imaging section C23b in the marker coordinate system.

It should be noted that, in this specification, the matrix that transforms the marker coordinate system into the outer left imaging section coordinate system or into the outer right imaging section coordinate system is referred to as a "marker-camera transformation matrix". That is, each of the above matrixes is a "marker-camera transformation matrix".

The spectrum information data Dg is data representing a spectrum obtained by subjecting sound waveform information representing the sound waveform of the sound inputted through the microphone C43 to Fast Fourier Transform (FFT) analysis for a short period of time, and stores data corresponding to the number of frames necessary for the sound recognition processing described below.

The Mel-filter output information data Dh is data representing an output of a band-pass filter bank obtained by subjecting the spectrum obtained by the FFT analysis to Mel-filter bank analysis, and stores data corresponding to the number of frames necessary for the sound recognition processing described below.

The sound-action correspondence table data Di is data representing a table which contains descriptions of actions to be instructed in accordance with sound recognition results, respectively. As shown in FIG. 70, the sound-action correspondence table data Di describes contents of the actions performed by the character and the bases on which the actions are performed in accordance with sound recognition results, respectively. For example, it is described that when a sound recognition result is obtained indicating that the inputted sound has been verified as a registered sound 1 (e.g., "sit down") which has been registered in advance or through a registration operation, the character performs an action of sitting down on a marker basis in accordance with the sound input. It is also described that when a sound recognition result is obtained indicating that a clapping sound has been inputted, the character stands on its four legs and changes its orientation toward the camera on a camera basis in accordance with the sound input. It is also described that when a sound recognition result is obtained indicating that a whistle sound has been inputted, the character changes its orientation toward the camera and performs an action of howling on the camera basis in accordance with the sound input. Here, registered sounds described in the sound-action correspondence table data Di may each be registered by using a sound (words) which is inputted in advance by the user when the user is urged to input a sound by the game apparatus C10, as described below, or may be registered in advance when the image processing program is installed. With respect to action bases described in the sound-action correspondence table data Di, actions performed by the character with reference to the marker direction are defined as "marker basis", and actions performed by the character with reference to the position or the direction of the virtual camera are defined as "camera basis".

The sound registration data Dj is data representing a sound (words) inputted to be registered in advance by the user when urged to input a sound by the game apparatus C10. For example, when the user registers a sound, the user is urged to input a sound corresponding to an action instruction to be given to the character. Then, data representing the inputted sound is registered in the sound registration data Dj in association with the action instruction for which the user has been urged to input a sound (for example, in association with a registered sound number described in the sound-action correspondence table data Di). It should be noted that the sound to be registered into the sound registration data Dj may be registered in advance when the image processing program is installed.

The clapping flag data Dk is data representing a clapping flag, which is set to ON when it is determined in the sound recognition processing that the sound inputted through the microphone C43 is a clapping sound. The whistle flag data Dl is data representing a whistle flag, which is set to ON when it is determined in the sound recognition processing that the sound inputted through the microphone C43 is a whistle sound. The breath flag data Dm is data representing a breath flag, which is set to ON when it is determined in the sound recognition processing that the sound inputted through the microphone C43 is a breath sound. The registered sound flag data Dn is data representing a registered sound flag, which is set to ON when it is determined in the sound recognition processing that the sound inputted through the microphone C43 has been verified as a registered sound. The normal state flag data Do is data representing a normal state flag, which is set to ON when the virtual character C is in "normal state".

The left virtual world image data Dp is data representing an image of a virtual space in which a virtual object is arranged and which is seen from a left virtual camera (a virtual world image for a left eye). For example, the left virtual world image data Dp is data representing a virtual world image for a left eye which is obtained by perspectively projecting a virtual space in which a virtual object is arranged and which is seen from the left virtual camera. The right virtual world image data Dq is data representing an image of a virtual space in which a virtual object is arranged and which is seen from a right virtual camera (a virtual world image for a right eye). For example, the right virtual world image data Dq is data representing a virtual world image for right eye which is obtained by perspectively projecting a virtual space in which a virtual object is arranged and which is seen from the right virtual camera.

The virtual object data Dr is information regarding the above described virtual object, and includes 3D model data (polygon data) representing the shape of the virtual object, texture data representing a pattern of the virtual object, information of the position and the orientation of the virtual object in the virtual space, and the like.

Next, with reference to FIG. 71, operations performed by the information processing section C31 will be described. First, when the power supply (power button C14F) of the game apparatus C10 is turned on, a boot program (not shown) is executed by the CPU C311, whereby the program stored in the incorporated memory, the external memory C45, or the external data storage memory C46 is loaded to the main memory C32. Then, the loaded program is executed in the information processing section C31 (CPU C311), whereby steps shown in FIG. 71 (each step is abbreviated as "S" in FIG. 71 to FIG. 74) are performed. With respect to FIG. 71 to FIG. 74, description of processes not directly relevant to the present invention will be omitted. In the present embodiment, processes of all the steps in the flow charts in FIG. 71 to FIG. 74 are performed by the CPU C311. However, processes of some steps in the flow charts in FIG. 71 to FIG. 74 may be performed by a processor other than the CPU C311 or a dedicated circuit.

In FIG. 71, the CPU C311 performs initialization (step C51) of the image processing and advances the processing to the next step. For example, the CPU C311 initializes parameters to be used in the image processing in step C51. It should be noted that the CPU C311 initializes all the sound recognition flags (clapping flag, whistle flag, breath flag, and registered sound flag) by setting them to OFF, and initializes the normal state flag by setting it to ON.

Next, the CPU C311 obtains shot image data representing both camera images outputted from the outer imaging section C23 (that is, a camera image for a left eye and a camera image for a right eye), sound data corresponding to the sound waveform of a sound inputted through the microphone C43, and operation input data representing information of operations performed by the user onto operational devices such as the operation button C14 and the analog stick C15 (step C52), and advances the processing to the next step. For example, the CPU C311 updates the left camera image data Da by using the obtained shot image data representing the camera image for a left eye. The CPU C311 updates the right camera image data Db by using the obtained shot image data representing the camera image for a right eye. The CPU C311 updates the sound waveform data Dc by using the obtained sound data. Then, the CPU C311 updates the operation input data Dd by using the obtained operation input data.

Next, the CPU C311 performs shot image recognition processing by using the shot image data representing the camera image for a left eye and the shot image data representing the camera image a right eye (step C53), and advances the processing to the next step. Hereinafter, an example of the shot image recognition processing performed in step C53 will be described.

As described above, the outer left imaging section C23a and the outer right imaging section. C23b are spaced from each other by a certain distance in the upper housing C21. Accordingly, when images of the marker MK are shot by the outer left imaging section C23a and the outer right imaging section C23b at the same time, respectively, there is a deviation due to parallax between the position and the orientation of the marker MK in the left camera image shot by the outer left imaging section C23a and the position and the orientation of the marker MK in the right camera image shot by the outer right imaging section C23b. In the shot image recognition processing, the position relationship between the outer left imaging section C23a and the outer right imaging section C23b, and the marker MK is calculated.

For example, the CPU C311 determines whether both of the left and the right camera images include the marker MK by means of a pattern matching technique or the like. When the marker MK (marker image MKi) is included in the camera images, the CPU C311 calculates the position relationship between the outer left imaging section C23a and the marker MK, and the position relationship between the outer right imaging section C23b and the marker MK, based on the position and the orientation of the marker MK in the camera images, respectively. As an example, the CPU C311 calculates a marker-camera transformation matrix for a left eye by recognizing the position and/or the orientation of the marker image MKi in the camera image for a left eye, and updates the left camera image recognition result data De. Meanwhile, the CPU C311 calculates a marker-camera transformation matrix for a right eye by recognizing the position and/or the orientation of the marker image MKi in the camera image for a right eye, and updates the right camera image recognition result data Df.

It should be noted that the marker-camera transformation matrix for a left eye is a matrix reflecting the position and the orientation of the outer left imaging section C23a calculated based on the position and the orientation of the marker MK in the left camera image. More specifically, the marker-camera transformation matrix for a left eye is a coordinate transformation matrix for transforming coordinates represented in the marker coordinate system (coordinate system having the position of the marker MK in the real world defined as the origin and having the axes in the longitudinal direction (Z-axis direction), the lateral direction (X-axis direction), and the normal direction (Y-axis direction) of the marker MK), into coordinates represented in the outer left imaging section coordinate system defined with reference to the position and the orientation of the outer left imaging section C23a calculated based on the position and the orientation of the marker image MKi in the left camera image.

The marker-camera transformation matrix for a right eye is a matrix reflecting the position and the orientation of the outer right imaging section C23b calculated based on the position and the orientation of the marker MK in the right camera image. More specifically, the marker-camera transformation matrix for a right eye is a coordinate transformation matrix for transforming coordinates represented in the marker coordinate system into coordinates represented in the outer right imaging section coordinate system defined with reference to the position and the orientation of the outer right imaging section C23b calculated based on the position and the orientation of the marker image MKi in the right camera image.

Here, in AR, by designating the marker-camera transformation matrix for a left eye for transforming the marker coordinate system into the outer left imaging section coordinate system as a view matrix for the left virtual camera, and by designating the marker-camera transformation matrix for a right eye for transforming the marker coordinate system into the outer right imaging section coordinate system as a view matrix for the right virtual camera, it is possible to combine CG images (left virtual world image and right virtual world image) with the real world images (left camera image and right camera image), respectively.

In step C53, in a case where the marker image MKi is not recognized in at least one of the left camera image and the right camera image, a null value is stored as the marker-camera transformation matrix for a left eye and/or the marker-camera transformation matrix for a right eye in the left camera image recognition result data De and/or the right camera image recognition result data Df, respectively. Accordingly, a failure of recognition of the marker MK in the left camera image or the right camera image is recorded.

It is assumed that there is no difference between the accuracies of recognizing the marker and there is no difference between the accuracies of mounting the outer left imaging section C23a and the outer right imaging section C23b onto the game apparatus C10. In this case, the position of the right virtual camera calculated based on the result of the image recognition of the right camera image is the position which is obtained by displacing the position of the left virtual camera calculated based on the result of the image recognition of the left camera image, by a certain distance along the lateral direction (e.g., X-axis direction) of the left virtual camera coordinate system. That is, the orientation of the right virtual camera calculated based on the result of the image recognition of the right camera image is the same as the orientation of the left virtual camera calculated based on the result of the image recognition of the left camera image (that is, the X-axis, the Y-axis, the Z-axis of the left virtual camera coordinate system are parallel to the X-axis, the Y-axis, and the Z-axis of the right virtual camera coordinate system, respectively). Accordingly, based on the position and the orientation of one virtual camera (e.g., left virtual camera) calculated based on a result of image recognition of one camera image (e.g., left camera image), the position and the orientation of the other virtual camera (e.g., right virtual camera) may be determined, and the other marker-camera transformation matrix may be calculated. In this case, the image recognition processing with respect to the other camera image (e.g., right camera image) is not necessary.

Next, the CPU C311 performs sound recognition processing (step C54) and advances the processing to the next step. Hereinafter with reference to FIG. 72, the sound recognition processing performed in step C54 will be described.

In FIG. 72, the CPU C311 calculates spectrum information based on the sound waveform of the sound inputted through the microphone C43 (step C61), and advances the processing to the next step. For example, the CPU C311 calculates a spectrum by subjecting the sound waveform information stored in the sound waveform data De to FFT analysis for a short period of time, and updates the spectrum information data Dg by using the spectrum.

Next, the CPU C311 calculates Mel-filter output information based on the spectrum calculated in step C61 (step C62), and advances the processing to the next step. For example, the CPU C311 calculates an output of a band-pass filter bank by subjecting the spectrum stored in the spectrum information data Dg to Mel-filter bank analysis, and updates the Mel-filter output information data Dh by using data representing the output.

Next, the CPU C311 performs clapping determination processing (step C63) and advances the processing to the next step. For example, the CPU C311 determines whether a clapping sound is inputted through the microphone C43, by using the sound waveform information stored in the sound waveform data Dc. As an example, the CPU C311 obtains the maximum value of the amplitude level in the sound waveform corresponding to the latest frame stored in the sound waveform data Dc, and stores the history of such maximum values corresponding to a predetermined period of time (e.g., nine frames). Then, the CPU C311 determines that the inputted sound is a clapping sound, when a maximum value corresponding to the middle time point of the predetermined period of time in the maximum value history (for example, in the maximum value history corresponding to nine frames, the maximum value in the fifth frame) is greater than or equal to a predetermined threshold value $\alpha$, and when maximum values corresponding to the history before and after the above maximum value (for example, the history corresponding to two frames before and after the fifth frame) are all less than or equal to a predetermined threshold value $\beta$, and when the average value of the whole maximum value history is less than or equal to a predetermined threshold value $\gamma$. In this manner, in the example of the clapping determination processing performed in step C63, only the information representing the sound waveform of the sound inputted through the microphone C43 is referred to, and when a sound waveform that has an outstanding amplitude in a relatively short period of time is obtained, it is determined that the inputted sound is a clapping sound.

Next, the CPU C311 determines whether it has been determined in the clapping determination processing in step C63 that a clapping sound has been inputted (step C64). When it has been determined that a clapping sound has been inputted, the CPU C311 updates the clapping flag data Dk by setting the clapping flag to ON (step C65), and advances the processing to the next step C66. Meanwhile, when it has been determined that a clapping sound has not been inputted, the CPU C311 advances the processing directly to the next step C66.

In step C66, the CPU C311 performs whistle determination processing and advances the processing to the next step. For example, the CPU C311 determines whether a whistle sound has been inputted through the microphone C43 by using the spectrum stored in the spectrum information data Dg. As an example, the CPU C311 subjects spectrum data corresponding to the latest frame stored in the spectrum information data Dg to logarithmic transformation and transforms the spectrum data into decibel data. Next, when in the frequency range corresponding to the latest one frame (for example, frequency in horizontal axis, decibel in vertical axis), the number of times of cases where the decibel value of the spectrum is greater than or equal to a reference decibel value $\delta$ is one, and the average decibel value in a low frequency value range is less than a reference value $\epsilon$, the CPU C311 counts a whistle event. Then, when in the history corresponding to a predetermined number of frames immediately prior to the whistle event, the total number of whistle event counts is greater than or equal to a threshold value $\xi$, the CPU C311 determines that the inputted sound is a whistle sound. In this manner, in the example of the whistle determination processing in step C66, it is determined whether the inputted sound is a whistle sound, by referring only to the spectrum information obtained from the sound waveform of the sound inputted through the microphone C43.

Next, the CPU C311 determines whether it has been determined in the whistle determination processing in step C66 that a whistle sound has been inputted (step C67). When it has been determined that a whistle sound has been inputted, the CPU C311 updates the whistle flag data Dl by setting the whistle flag to ON (step C68), and advances the processing to the next step C69. On the other hand, when it has been determined that a whistle sound has not been inputted, the CPU C311 advances the processing directly to the next step C69.

In step C69, the CPU C311 performs breath determination processing and advances the processing to the next step. For example, the CPU C311 determines whether a breath sound has been inputted through the microphone C43 by using the sound waveform information stored in the sound waveform data Dc and the output of the band-pass filter bank stored in the Mel-filter output information data Dh. As an example, the CPU C311 determines whether the average amplitude value and the maximum amplitude value of the sound waveform stored in the sound waveform data Dc are within predetermined ranges, respectively. Further, the CPU C311 determines whether the number of zero crosses of the sound waveform (a zero cross is a point at which a sound waveform crosses the zero level when the amplitude thereof becomes from a plus value to a minus value or vice-versa) is less than or equal to a predetermined threshold value $\eta$. Further, the CPU determines, with respect to the output of the band-pass filter bank stored in the Mel-filter output information data Dh, whether the average value of amplitudes in a frequency range which does not include a low frequency range is greater than or equal to a predetermined threshold value $\theta$. Then, if all the above determinations are positive, the CPU C311 determines that the inputted sound is a breath sound. In this manner, in the example of the breath determination processing in step C69, it is determined whether the inputted sound is a breath sound, by referring to the sound waveform of the sound inputted through the microphone C43 and the Mel-filter output information.

Next, the CPU C311 determines whether it has been determined in the breath determination processing in step C69 that a breath sound has been inputted (step C70). Then, when it has been determined that a breath sound has been inputted, the CPU C311 updates the breath flag data Dm by setting the breath flag to ON (step C71), and advances the processing to the next step C72. On the other hand, when it has been determined that a breath sound has not been inputted, the CPU C311 advances the processing directly to next step C72.

In step C72, the CPU C311 performs sound verification processing and advances the processing to the next step. The CPU C311 determines the likelihood of a feature parameter time series obtained from the sound input pattern inputted through the microphone C43 against a feature parameter time series registered in advance, and determines that a registered sound which has a likelihood which is the maximum and greater than or equal to a predetermined threshold value corresponds to the inputted sound. For example, the CPU C311 determines whether there is a registered sound which can be verified as the sound inputted though the microphone C43, by using the sound waveform information stored in the sound waveform data Dc and the output of the band-pass filter bank stored in the Mel-filter output information data Dh. As an example, the CPU C311 detects a section (sound section) during which the sound has been inputted through the microphone C43, by using the sound waveform information stored in the sound waveform data Dc and the output of the band-pass filter bank stored in the Mel-filter output information data Dh. Specifically, based on the shape of the spectrum obtained from the output of the band-pass filter bank, the CPU C311 detects the time point at which the input of the sound through the microphone C43 has been started, and based on the level of the sound waveform, detects the time point at which the input of the sound through the microphone C43 has been ended, and defines the interval between these time points as a sound section. It should be noted that the time point at which the sound input has been started may be determined by checking the level of the sound waveform in the history of the past sound waveforms. Then, with respect to the output of the band-pass filter bank obtained in the detected sound section, the CPU C311 performs normalization of the time axis and normalization of the level by using a triangular window, and calculates by using a dynamic programming method the distance between the resultant value and each pieces of the registered sound data (registered data) registered in the sound registration data Dj. If the calculated distance is less than or equal to a predetermined threshold value $\tau$, the CPU C311 determines that the inputted sound has been verified as the piece of the registered data which has the distance described above. As described above, in the example of the breath determination processing in step C69, the processing of verifying the inputted sound against the registered sound is performed by referring to the sound waveform of the sound inputted through the microphone C43 and the Mel-filter output information.

Next, the CPU C311 determines whether the inputted sound has been verified as a registered sound in the sound verification processing in step C72 (step C73). When the inputted sound has been verified as a registered sound, the CPU C311 updates the registered sound flag data Dn by setting the registered sound flag to ON (step C74), and ends the processing of the sub-routine. On the other hand, when the input sound has not verified as a registered sound, the CPU C311 ends the processes of the sub-routine.

With reference back to FIG. 71, after the sound recognition processing in step C54, the CPU C311 performs image combining processing (step C55), and advances the processing to the next step. Hereinafter, with reference to FIG. 73, the image combining processing performed in step C55 will be described.

In FIG. 73, the CPU C311 determines whether the normal state flag represented by the normal state flag data Do is ON (step C81). When the normal state flag is ON, the CPU C311 advances the processing to the next step C82. On the other hand, when the normal state flag is OFF, the CPU C311 advances the processing to the next step C92.

In step C82, the CPU C311 determines whether the registered sound flag represented by the registered sound flag data Dn is ON. When the registered sound flag is ON, the CPU C311 advances the processing to the next step C83. On the other hand, when the registered sound flag is OFF, the CPU C311 advances the processing to the next step C84.

In step C83, the CPU C311 causes, in accordance with the registered sound which has been verified as the sound input, the virtual character C to start an action corresponding to the registered sound, and advances the processing to the next step C95. For example, with reference to the sound-action correspondence table data Di, the CPU C311 extracts a character action and an action basis corresponding to the registered sound which has been verified as the sound input, and causes the virtual character C to start the action based on the extracted character action and action basis.

Meanwhile, in step C84, the CPU C311 determines whether the clapping flag represented by the clapping flag data Dk is ON. When the clapping flag is ON, the CPU C311 advances the processing to the next step C85. On the other hand, when the clapping flag is OFF, the CPU C311 advances the processing to the next step C86.

In step C85, the CPU C311 causes the virtual character C to start an action corresponding to the input of the clapping sound, and advances the processing to the next step C95. For example, with reference to the sound-action correspondence table data Di, the CPU C311 extracts a character action and an action basis corresponding to the recognition of the clapping sound, and causes the virtual character C to start the action in accordance with the extracted character action and action basis.

In step C86, the CPU C311 determines whether the whistle flag represented by the whistle flag data Dl is ON. When the whistle flag is ON, the CPU C311 advances the processing to the next step C87. On the other hand, when the whistle flag is OFF, the CPU C311 advances the processing to the next step C88.

In step C87, the CPU C311 causes the virtual character C to start an action corresponding to the input of the whistle sound, and advances the processing to the next step C95. For example, with reference to the sound-action correspondence table data Di, the CPU C311 extracts a character action and an action basis corresponding to the recognition of the whistle sound, and causes the virtual character C to start the action in accordance with the extracted character action and action basis.

In step C88, the CPU C311 determines whether the breath flag represented by the breath flag data Dm is ON. When the breath flag is ON, the CPU C311 advances the processing to the next step C89. On the other hand, when the breath flag is OFF, the CPU C311 advances the processing to the next step C91.

In step C89, the CPU C311 determines whether the direction in which the virtual character C is being displayed is within a predetermined range. As described above, in a case where a breath sound is inputted into the game apparatus C10, when the virtual character C is present in the display range of the upper LCD C22 and when the forward direction of the virtual character C is directed toward the vicinity of the virtual camera at the time when the input has been performed, the action instruction corresponding to the input is enabled. For example, when the position of the virtual character C is within the display range of the upper LCD C22 (that is, the position at which the virtual character C is arranged is within the view volume of the left virtual camera and/or the view volume of the right virtual camera), and when the left virtual camera and/or right virtual camera is arranged within a predetermined range which is defined with reference to the forward direction of the virtual character C, the CPU C311 makes a positive determination in step C89. When a positive determination has been made in step C89, the CPU C311 advances the processing to the next step C90. On the other hand, when a negative determination is made in step C89, the CPU C311 advances the processing to the next step C91.

In step C90, the CPU C311 causes the virtual character C to start an action corresponding to the input of the breath sound, and advances the processing to the next step C95. For example, with reference to the sound-action correspondence table data Di, the CPU C311 extracts a character action and an action basis corresponding to the recognition of the breath sound, and causes the virtual character C to start the action in accordance with the extracted character action and action basis.

In step C91, the CPU C311 causes the virtual character C to continue the action in the normal state, which action is the same action currently being performed, and advances the processing to the next step C101 (see FIG. 74).

After the processing of causing the virtual character C to start the action corresponding to the input of the sound which has been recognized through sound recognition (step C83, step C85, step C87, and step C90), the CPU C311 updates the normal state flag represented by the normal state flag data Do to OFF (step C95), and advances the processing to the next step C101.

In step C81, when it has been determined that the normal state flag is set to OFF, the CPU C311 causes the virtual character C to continue the action which it is currently performing (step C92), and advances the processing to the next step. Here, as is described below, the normal state flag is set to OFF at the time when the virtual character C starts the action corresponding to the input of the sound which has been recognized through sound recognition, and is set to ON at the time when the virtual character C has ended the action. That is, in the image processing, even if another sound recognition is performed while the virtual character C is performing the action corresponding to the input of the sound which has been recognized through sound recognition, the current action is performed with priority.

Next, the CPU C311 determines whether the action of the virtual character C corresponding to the input of the sound which has been recognized through sound recognition has been ended (step C93). When the action of the virtual character C corresponding to the input of the sound which has been recognized through sound recognition is ended, the CPU 311 updates the normal state flag represented by the normal state flag data Do to ON (step C94), and advances the processing to the next step C101. On the other hand, when the action of the virtual character C corresponding to the input of the sound which has been recognized through sound recognition is being continued, the CPU C311 advances the processing directly to the next step C101.

Figure 75:
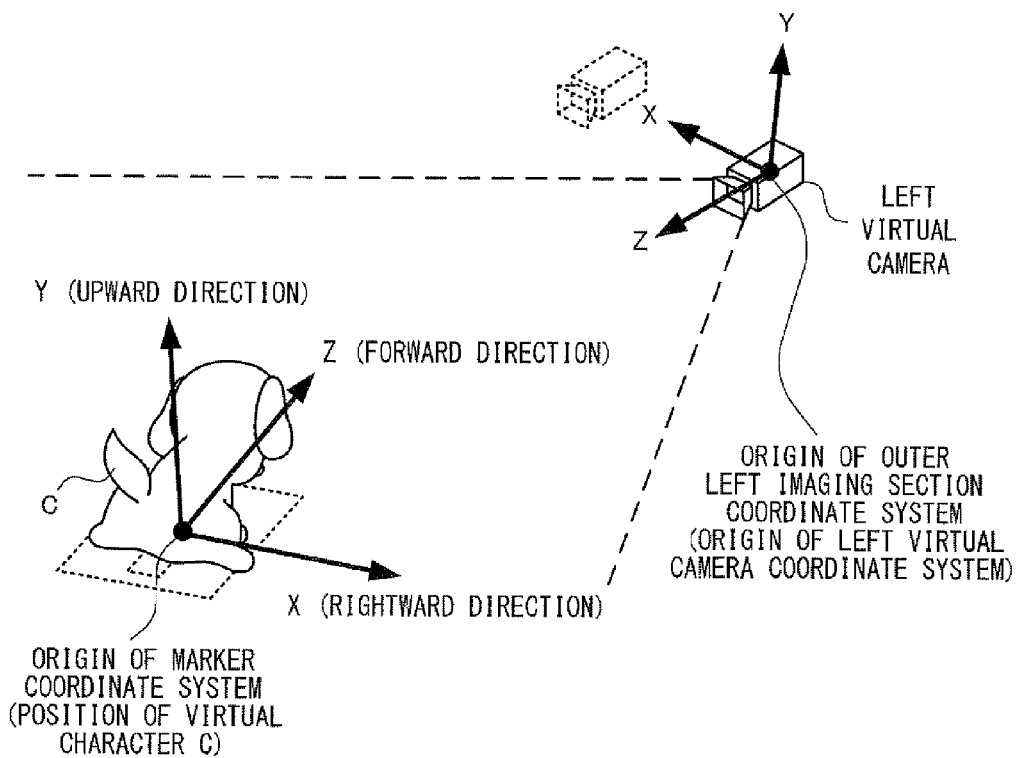
FIG. 75 shows an example of a position relationship between a virtual character C and a left virtual camera.
Figure 76:
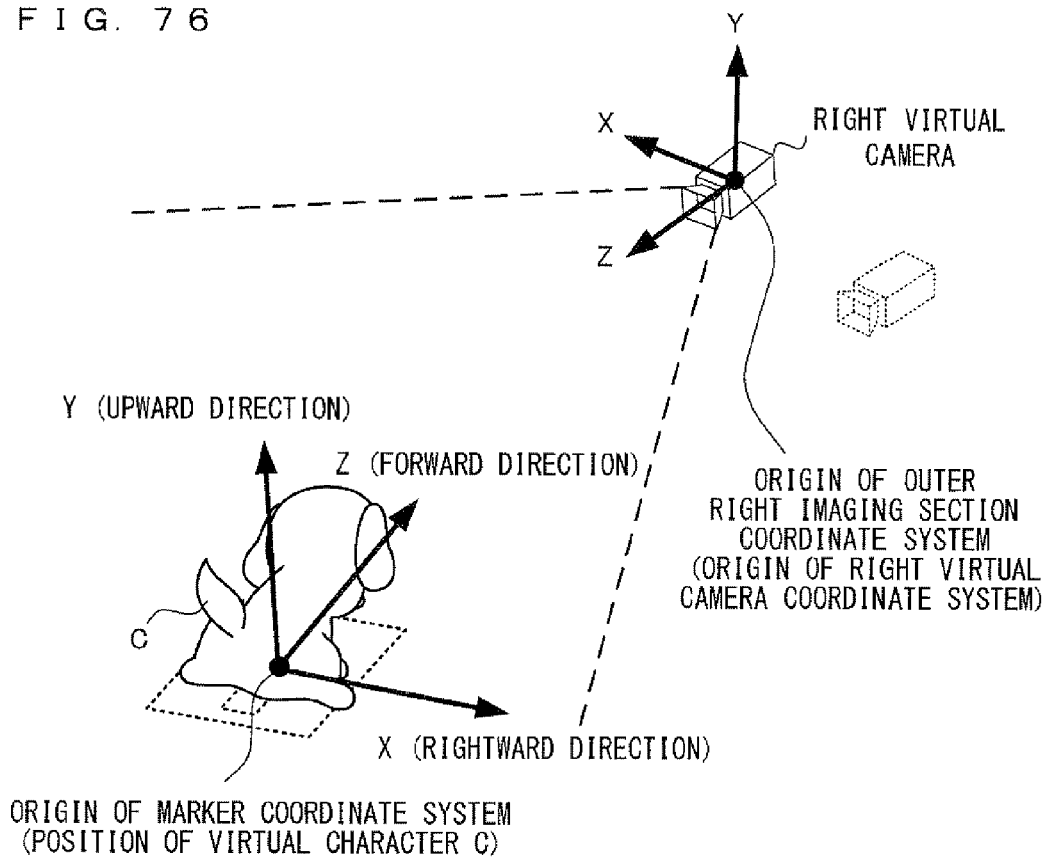
FIG. 76 shows an example of a position relationship between the virtual character C and a right virtual camera.

With reference to FIG. 74, in step C101, the CPU C311 generates a virtual world image and advances the processing to the next step. For example, as shown in FIG. 75 and FIG. 76, the CPU C311 arranges the virtual character C in the virtual space defined by the marker coordinate system (the coordinate system having the position of marker image MKi defined as the origin and having the axes in the longitudinal direction (Z-axis direction), the lateral direction (X-axis direction), and the normal direction (Y-axis direction) of the marker image MKi), changes the size of the virtual character C as necessary, and causes the virtual character C to perform the action set through the steps C81 to step C95. For example, when the virtual character C is caused to walk around the origin of the marker coordinate system, a display as if the virtual character C is walking around the marker image MKi is shown. The control of the movement of the virtual character C is realized by changing the position coordinates of the virtual character C at the origin or the vicinity of the origin of the marker coordinate system, and in a direction which is defined with reference to the plane including the marker image Mki (for example, at a position in a predetermined range in the Y-axis direction which is defined with reference to a direction on the X-Z plane in the marker coordinate system).

In the processing in step C101, the vertical direction (Y-axis negative direction) in the marker coordinate system is defined as the vertical direction of the virtual space, and the virtual character C is arranged in this virtual space. When an action basis (e.g., marker basis or camera basis, see FIG. 70) is assigned to the action being currently performed by the virtual character C, the direction of the virtual character C is set in accordance with the action basis. For example, in the case of an action whose action basis is set to the marker basis, the orientation of the virtual character C in the virtual space is controlled such that the forward direction of the virtual character C coincides with the longitudinal positive direction (Z-axis positive direction) of the marker coordinate system, which corresponds to the marker direction (e.g., the forward direction of the marker image MKi), or is within a predetermined range from the marker direction. In the case of an action whose action basis is set to the camera basis, the orientation of the virtual character C in the virtual space is controlled such that the forward direction of the virtual character C coincides with the direction which passes through the middle point between the position of the left virtual camera and the position of the right virtual camera, or passes through a point in a predetermined range from the middle point. It should be noted that the position of the left virtual camera and the position of the right virtual camera in the virtual space defined in the marker coordinate system can be calculated by using the marker-camera transformation matrix for a left eye and the marker-camera transformation matrix for a right eye calculated in step C53.

As shown in FIG. 75, the CPU C311 creates the virtual space seen from the left virtual camera as a virtual world image for a left eye, and updates the left virtual world image data Dp. For example, by designating the marker-camera transformation matrix for a left eye represented by the left camera image recognition result data De as a view matrix for the left virtual camera, the CPU C311 can display a CG model (virtual character C) expressed in the marker coordinate system at the same position where the CG model would be displayed on the upper LCD C22 (e.g., on the marker image MKi in a left camera image) if the CG model existed in the real world. That is, in the display image for a left eye displayed on the upper LCD C22, it is possible to display the virtual object arranged in the virtual space defined by the marker coordinate system as if the virtual object exists in association with the marker MK in the real world.

As shown in FIG. 76, the CPU C311 creates the virtual space seen from the right virtual camera as a virtual world image for a right eye, and updates the right virtual world image data Dq. For example, by designating the marker-camera transformation matrix for a right eye represented by the right camera image recognition result data Df as a view matrix for the right virtual camera, the CPU C311 can display a CG model (virtual character C) expressed in the marker coordinate system at the same position where the CG model would be displayed on the upper LCD C22 (e.g., on the marker image MKi in a right camera image) if the CG model existed in the real world. That is, in the display image for a right eye displayed on the upper LCD C22, it is possible to display the virtual object arranged in the virtual space defined by the marker coordinate system as if the virtual object exists, in association with the marker MK in the real world.

Next, the CPU C311 performs combination processing (step C102), and advances the processing to the next step. For example, the CPU C311 generates a display image obtained by combining the real world image with the virtual space image, and displays the display image on the upper LCD C22.

Figure 77:
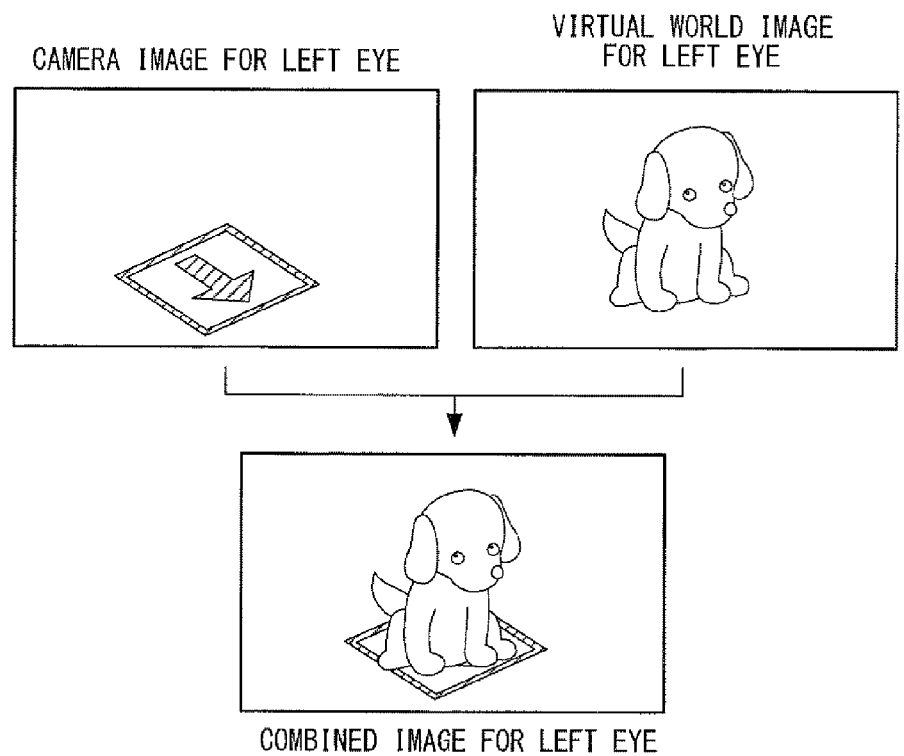
FIG. 77 shows an example of a manner of generating an image for a left eye.

Specifically, the CPU C311 renders the camera image for a left eye represented by the left camera image data Da in a predetermined storage area in the VRAM C313 (hereinafter referred to as left frame buffer), in which an image for a left eye to be supplied to the upper LCD C22 is temporarily stored. Then, the CPU C311 overwrites the virtual world image for a left eye represented by the left virtual world image data Dp (that is, the image of the virtual space seen from the left virtual camera) in the left frame buffer (typically, the GPU C312 performs the rendering in accordance with an instruction from the CPU C311). Accordingly, as shown in FIG. 77, the virtual world image for a left eye is combined with the camera image for a left eye rendered in the left frame buffer (left real world image). The image rendered in the left frame buffer is supplied to the upper LCD C22 as an image for a left eye at a predetermined timing, to be displayed on the upper LCD C22. In the virtual world image for a left eye, the background of the virtual space is transparent, and therefore, by combining the virtual world image for a left eye with the left real world image, an image as if the virtual character C exists in the real world image is generated.

Meanwhile, the CPU C311 renders the camera image for a right eye represented by the right camera image data Db in a predetermined storage area in the VRAM C313 (hereinafter referred to as right frame buffer), in which an image for a right eye to be supplied to the upper LCD C22 is temporarily stored. Then, the CPU C311 overwrites the virtual world image for a right eye represented by the right virtual world image data Dq (that is, the image of the virtual space seen from the right virtual camera) in the right frame buffer. Accordingly, the virtual world image for a right eye is combined with the camera image for a right eye rendered in the right frame buffer (right real world image). The image rendered in the right frame buffer is supplied to the upper LCD C22 as an image for a right eye at a predetermined timing, to be displayed on the upper LCD C22. Also in the virtual world image for a right eye, the background of the virtual space is transparent, and therefore, by combining the virtual world image for a right eye with the right real world image, an image as if the virtual character C exists in the real world image is generated.

Next, the CPU C311 sets all the sound recognition flags to OFF (step C103), and ends the processes of the sub-routine. For example, the CPU C311 sets all the sound recognition flags (clapping flag, whistle flag, breath flag, and registered sound flag) to OFF, respectively, thereby updating the clapping flag data Dk, whistle flag data Dl, breath flag data Dm and registered sound flag data Dn.

With reference back to FIG. 71, after the image combining processing in step C55, the CPU C311 determines whether the current time point is a photographing timing (step C56). As an example, when the operation input stored in the operation input data Dd represents a photographing operation, the CPU C311 determines that the current time point is the photographing timing. As another example, when the CPU C311 has obtained in step C52 operation input data representing a self-timer operation, which is an automatic photographing performed after a certain period of time elapses, and when the certain period of time has elapsed, the CPU C311 determines that the current time point is the photographing timing. When the current time point is a photographing timing, the CPU C311 advances the processing to the next step C57. On the other hand, when the current time point is not a photographing timing, the CPU C311 advances the processing to the next step C58. It should be noted that the photographing operation to be determined in step C56 may be performed by means of a sound inputted by the user. In this case, the CPU C311 determines whether a photographing instruction has been given by the user through sound recognition of the sound waveform represented by the sound waveform data Dc.

In step C57, the CPU C311 saves the image obtained by the combination processing in step C102, and advances the processing to the next step C58. For example, the CPU C311 stores in the internal data storage memory C35 or the external data storage memory C46 the combined image data representing the image for a left eye and the image data representing the image for a right eye, which have been obtained in the combination processing in step C102.

In step C58, the CPU C311 determines whether the image processing is to be ended. The image processing is ended, for example, when a condition for automatically ending the image processing is satisfied, when a condition for the game currently performing image processing to be over has been satisfied, when the user has performed an operation for ending the image processing, or the like. If not ending the image processing, the CPU C311 causes the processing back to step C52, and repeats the processes. On the other hand, when ending the image processing, the CPU C311 ends the processes of the flow chart.

As described above, in the image processing according to the embodiment, when the virtual character C is additionally displayed in the camera image, it is possible to perform operations onto the virtual character C by means of a sound, and thus, possible to perform operations onto the virtual object additionally displayed in the real world image, by using a new input method.

In the above description, the marker MK arranged in the real world is used as the imaging subject whose image is to be shot. When an image of the marker MK is shot and the marker MK is displayed as a marker image MKi, the virtual character C is additionally displayed on or near the marker image MKi. For realizing this, the marker MK is used in order to recognize the relative position relationship between the real world and the imaging apparatus (outer imaging section C23) as well as the orientation of the imaging apparatus, and to set a position at which the virtual object, a letter, or the like is to be additionally displayed in accordance with the result of the recognition. However, the present invention can be realized without using the marker MK.

For example, the relative position relationship between the real world and the imaging apparatus can be processed in a similar manner to the image processing described above if a characteristic point (e.g., an edge or contour of the subject) in an image shot by the imaging apparatus is recognized, if a characteristic in the shot image for detecting a horizontal plane or the like in the shot image is detected, and if the position and orientation of the imaging apparatus in the real world is obtained by using UPS or sensors. Specifically, by using an algorithm or the like used for extracting a characteristic point in the shot image and its characteristic amount (for example, SIFT (Scale-invariant feature transform)), it is possible to detect a characteristic in the shot image without using the marker MK.

For example, as shown in FIG. 78, the present invention can be applied to a case where while a real time image being shot by an imaging apparatus is being displayed on a display device, information (e.g., letter information or icons) related to the location or the subject (buildings, signboards, and the like) whose image is being shot by the imaging apparatus is superimposed as additional information, and displayed on the shot image. This display technique identifies the current position by using GPS incorporated in the imaging apparatus (game apparatus C10) and recognizes the imaging direction by means of a magnetic sensor (electronic compass, or the like) which is also incorporated in the imaging apparatus. Then, additional information corresponding to the identified position and imaging direction is superimposed on the shot image to be displayed. In this case, image recognition of the shot image is not necessary. However, in another method, artificial landmarks are widely arranged and the positions of the landmarks extracted through image recognition of the shot image are additionally used to estimate the position and the orientation of the imaging apparatus. Further, in still another method, the position and the orientation of a camera which has shot an image is estimated by associating a two-dimensional characteristic point (edge, contour, or the like) on the shot image with a 3-dimensional position of a natural characteristic point.

As described above, it is possible to obtain the position and the orientation of the imaging apparatus in the real world without using the marker MK. If these techniques are used, the present invention can be realized without using the marker MK. For example, with reference to FIG. 78, an image of four buildings (A department store, B building, C building, and D bank) is shot as a subject by the outer imaging section C23, and the shot image is being displayed on the upper LCD C22. On each of the four buildings being displayed, letter information indicating the name of the corresponding building is superimposed as additional information. If one piece of the additional information is selected, further detailed information of the selected building can be displayed. In such a case, by selecting one piece of the additional information by means of a sound, the present invention can display such further detailed information of the building selected by means of the sound. Specifically, in a case where the user inputs a sound (words) of "A department store", which is a speech sound, into the game apparatus C10, the game apparatus C10 performs sound recognition with respect to "A department store", which has been inputted as a sound, and changes the display form of the letter information (additional information) selected in accordance with the sound recognition result. For example, by changing the display form of the color, font, letter size, letter thickness, letter decoration, letter display position, and the like of the letter information selected by means of the sound input, and thereby distinctively displaying the selected letter information from the other pieces of letter information, it is possible to notify the user of the selected letter information. Then, the game apparatus C10 displays on the upper LCD C22 further detailed information regarding the subject to which the selected letter information has been added. In this manner, also in a case where letters are additionally displayed as a virtual object while the position and the orientation of the imaging apparatus in the real world is being obtained without using the marker MK, it is possible to perform the operation of selecting the letters through a sound input. In the conventional input methods, it is an onerous operation to select, while an image of the real world image is being shot, a target from among a plurality of choices superimposed on the real world image. However, with the present invention, the operability is greatly improved by selecting a target through a sound input which does not require the fingers of the user holding the imaging apparatus (game apparatus C10).

In the above, description has been given of an exemplary case where an image which is stereoscopically visible by naked eyes (stereoscopic image) is displayed on the upper LCD C22. However, a planar image (a planarly visible image which is different from the above described stereoscopically visible image) of the real world obtained from either one of the outer imaging section C23 and the inner imaging section C24 may be displayed on the upper LCD C22.

In the embodiment above where the upper LCD C22 is a liquid crystal display device of a parallax barrier type, it is possible to switch the stereoscopic display mode to the planar display mode and vice versa by controlling ON/OFF of the parallax barrier. In another embodiment, for example, a stereoscopic image and a planar image may be displayed by using a liquid crystal display device of a lenticular lens type as the upper LCD C22. Also in the case of the lenticular lens type display device, by dividing each of two images shot by the outer imaging section C23 into rectangle-shaped images in the vertical direction and alternately aligning the rectangle-shaped images, the images are stereoscopically displayed. Even in the case of the lenticular lens type display device, by causing the left and right eyes of the user to view one image shot by the inner imaging section C24, it is possible to display the image in a planar manner. That is, even with a liquid crystal display device of a lenticular lens type, it is possible to cause the left and right eyes of the user to view the same image by dividing the same image into rectangle-shaped images in the vertical direction and alternately aligning the rectangle-shaped images. Accordingly, it is possible to display the image shot by the inner imaging section C24 as a planar image.

In the above, description has been given of an exemplary case where the upper LCD C22 is a display device capable of displaying an image which is stereoscopically visible by naked eyes. However, the upper LCD C22 may be configured by using another method in such a manner as to display an image in a stereoscopically visible manner. For example, the upper LCD C22 may be configured such that it can display an image in a stereoscopically visible manner by using polarizing filter method, time sharing system, anaglyph method, or the like.

In the embodiment, description has been given of a case where the lower LCD C12 and the upper LCD C22, which are physically separated components and vertically aligned, are used as an example of the liquid crystal display corresponding to two screens (the two screens are vertically aligned). However, the present invention can be realized by an apparatus including a single display screen (e.g., the upper LCD C22 only) or an apparatus which performs image processing onto an image to be displayed on a single display device. Alternatively, the configuration of the display screen corresponding to two screens may be realized by another configuration. For example, the lower LCD C12 and the upper LCD C22 may be arranged on one main surface of the lower housing C11, such that they are arranged side by side in the horizontal direction. Still alternatively, one vertically long LCD which has the same horizontal dimension as that of the lower LCD C12 and has a longitudinal dimension twice of that of the lower LCD C12 (that is, physically one LCD having a display area corresponding to two screens which are vertically arranged) may be provided on one main surface of the lower housing C11, and two images (e.g., a shot image, an image of a screen indicating operational descriptions, and the like) mat be vertically displayed (that is, the two images are displayed vertically side by side without the border portion therebetween). Still alternatively, one horizontally long LCD which has the same longitudinal dimension as that of the lower LCD C12 and has a horizontal dimension twice of that of the lower LCD C12 mat be provided on one main surface of the lower housing C11, and two images mat be horizontally displayed (that is, the two images are displayed horizontally side by side without the border portion therebetween). That is, by dividing one screen into two display portions, two images may be displayed on the display portions, respectively. Still alternatively, when the two images are displayed on the two display portions provided on the physically one screen, the touch panel C13 may be provided in such a manner as to cover the entire screen.

In the embodiment described above, the touch panel C13 is provided integrally with the game apparatus C10. However, it will be understood that the present invention can be realized even when the touch panel is provided separately from the game apparatus. Still alternatively, the touch panel C13 may be provided on the surface of the upper LCD C22, and the display image displayed on the lower LCD C12 may be displayed on the upper LCD C22, and the display image displayed on the upper LCD C22 may be displayed on the lower LCD C12. Still alternatively, the touch panel C13 may not be provided when realizing the present invention.

The embodiment has been described by using the handheld game apparatus C10. However, the image processing program of the present invention may be executed by using an information processing apparatus such as a stationary game apparatus or a general personal computer, to realize the present invention. In another embodiment, instead of the game apparatus, any hand-held electronic device, such as PDA (Personal Digital Assistant) or a mobile telephone, a personal computer, a camera, or the like may be used.

In the above, description has been given of an exemplary case where the image processing is performed by the game apparatus C10. However, at least a part of the processing steps in the image processing may be performed by other apparatuses. For example, when the game apparatus C10 is allowed to communicate with another apparatus (for example, server or another game apparatus), the processing steps in the image processing may be performed by the game apparatus C10 in combination with the other apparatus. As an example, another apparatus may perform the processing of setting the real world image and the virtual character C, and the game apparatus C10 may obtain data regarding the real world image and the virtual character C and perform the processes of step C54 to step C68. In this manner, also when at least a part of the processing steps in the above image processing is performed by another apparatus, the processing similar to the above described image processing can be performed. The above described image processing can be performed by one processor or by a cooperation of a plurality of processors included in an information processing system formed by at least one information processing apparatus. In the above embodiment, the processes in the above flow charts are performed by the information processing section C31 of the game apparatus C10 performing a predetermined program. However, a part or the whole of the above processes may be performed by a dedicated circuit included in the game apparatus C10.

In addition, the shape of the game apparatus C10 is only an example. The shapes and the number of the various operation buttons C14, the analog stick C15, and the touch panel C13 are examples only, and the positions at which the various operation buttons C14, the analog stick C15, and the touch panel C13 are mounted, respectively, are also examples only. It will be understood that other shapes, other number, or other positions may be used for realizing the present invention. The order of the processing steps, the setting values, the values used for determinations, and the like which are used in the image processing described above are only examples. It will be understood that other order of processing steps and other values may be used for realizing the present invention.

Furthermore, the image processing program (game program) may be supplied to the game apparatus C10 not only via an external storage medium such as the external memory C45 or the external data storage memory C46, but also via a wired or wireless communication line. Furthermore, the program may be stored in advance in a nonvolatile storage unit in the game apparatus C10. The information storage medium for storing the program may be a CD-ROM, a DVD, a like optical disc-shaped storage medium, a flexible disc, a hard disk, a magneto-optical disc, or a magnetic tape, other than a nonvolatile memory. The information storage medium for storing the above program may be a volatile memory for storing the program.

(Structure of Game Apparatus)

Figure 79:
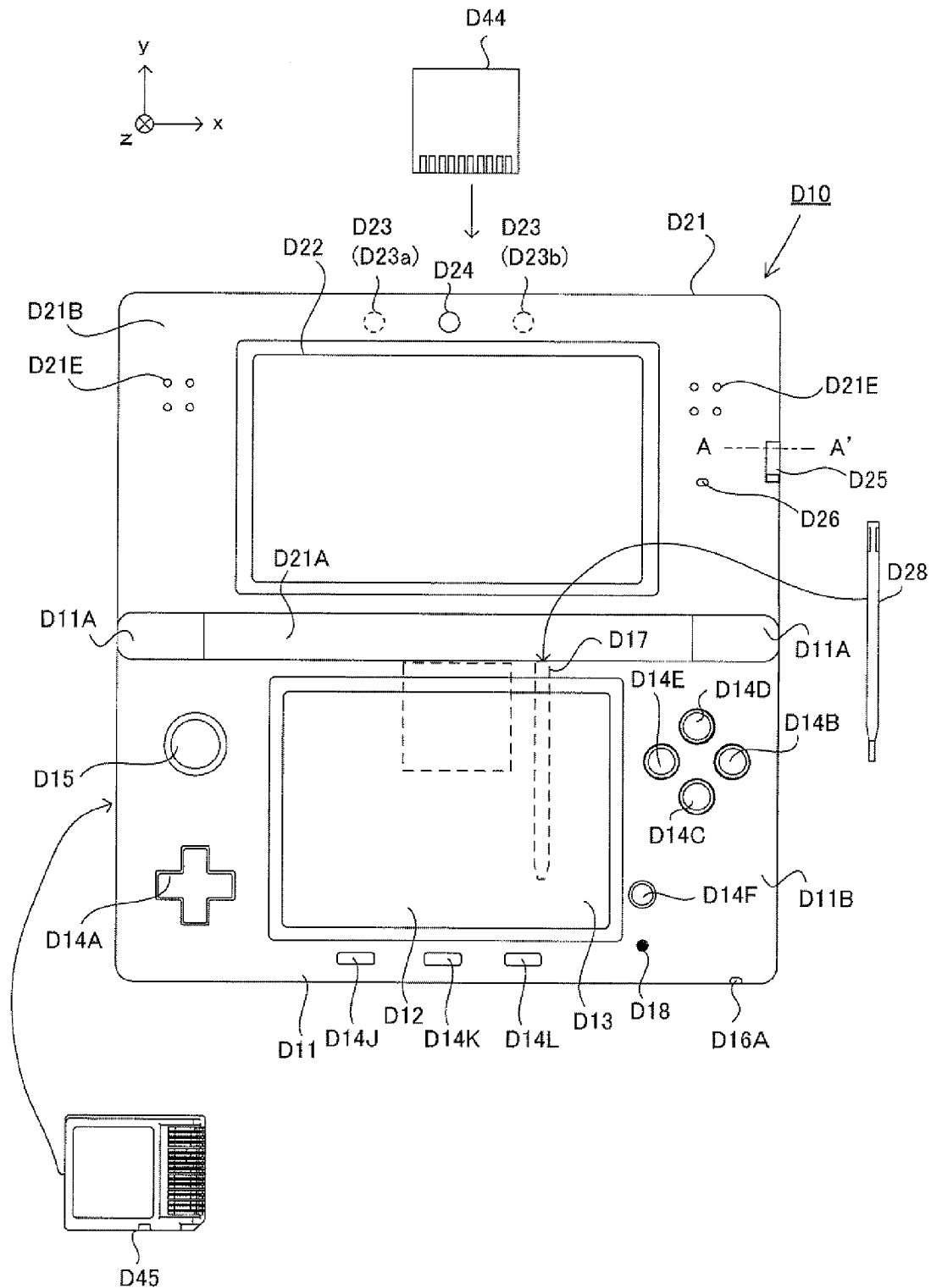
FIG. 79 is a front view of a game apparatus D10 in its opened state.
Figure 80:
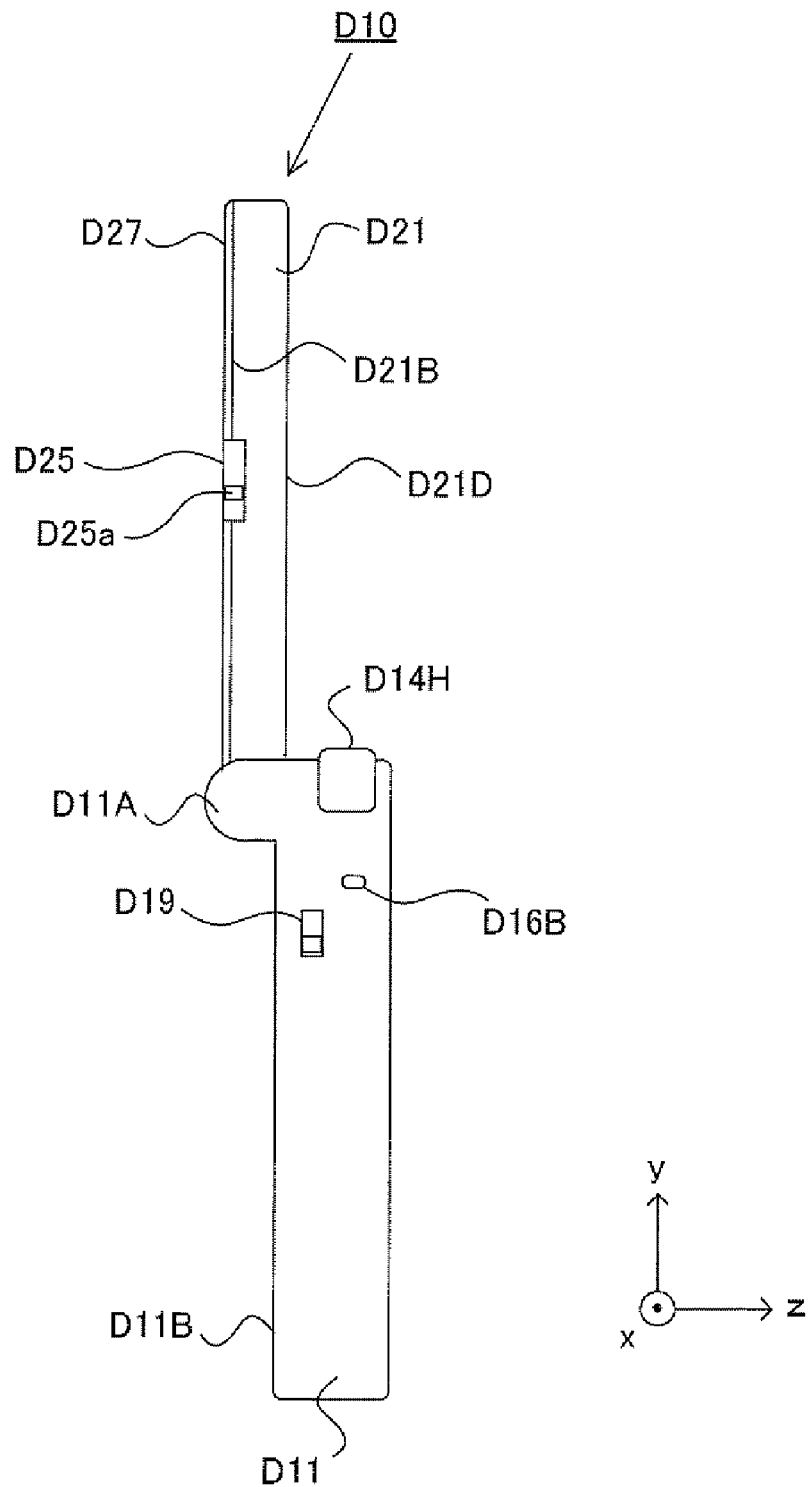
FIG. 80 is a right side view of the game apparatus D10 in its opened state.
Figure 81:
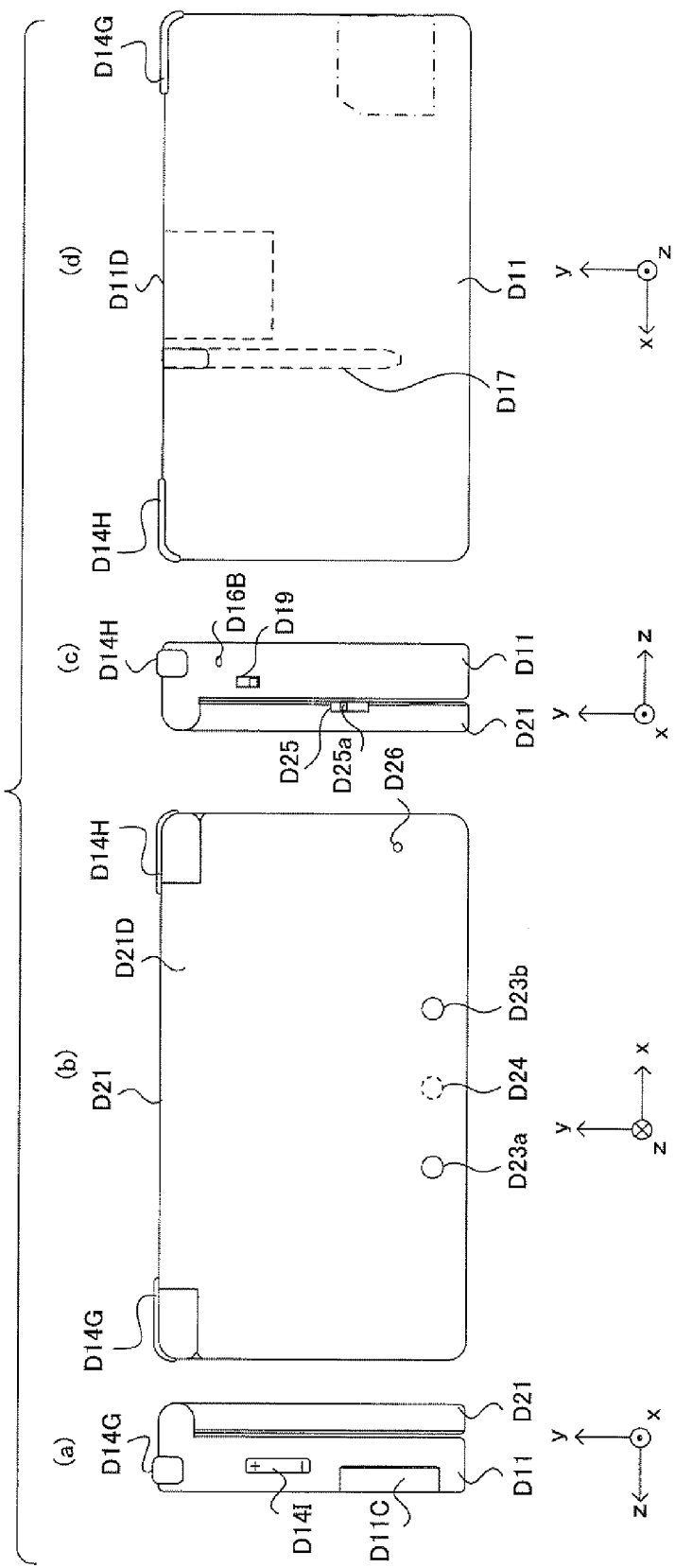
FIG. 81 shows a left side view, a front view, a right side view, and a rear view of the game apparatus D10 in its closed state.

Hereinafter, a game apparatus according to another embodiment of the present invention will be described. FIG. 79 to FIG. 81 are each a plan view of an outer appearance of a game apparatus D10. The game apparatus D10 is a handheld game apparatus, and is configured to be foldable as shown in FIG. 79 to FIG. 81. FIG. 79 and FIG. 80 show the game apparatus D10 in an opened state, and FIG. 81 shows the game apparatus D10 in a closed state. FIG. 79 is a front view of the game apparatus D10 in the opened state, and FIG. 80 is a right side view of the game apparatus D10 in the opened state. The game apparatus D10 is able to shoot an image by means of an imaging section, display the shot image on a screen, and store data of the shot image. The game apparatus D10 can execute a game program which is stored in an exchangeable memory card or a game program which is received from a server or another game apparatus, and can display, on the screen, an image generated by computer graphics processing, such as an image shot by a virtual camera set in a virtual space, for example.

Initially, an external structure of the game apparatus D10 will be described with reference to FIG. 79 to FIG. 81. The game apparatus D10 includes a lower housing D11 and an upper housing D21 as shown in FIG. 79 to FIG. 81. The lower housing D11 and the upper housing D21 are connected to each other so as to be openable and closable (foldable). In the present embodiment, the lower housing D11 and the upper housing D21 are each formed in a horizontally long plate-like rectangular shape, and are connected to each other at long side portions thereof so as to be pivotable with respect to each other.

As shown in FIG. 79 and FIG. 80, projections D11A each of which projects in a direction orthogonal to an inner side surface (main surface) D11B of the lower housing D11 are provided at the upper long side portion of the lower housing D11, whereas a projection D21A which projects from the lower side surface of the upper housing D21 in a direction orthogonal to the lower side surface of the upper housing D21 is provided at the lower long side portion of the upper housing D21. Since the projections D11A of the lower housing D11 and the projection D21A of the upper housing D21 are connected to each other, the lower housing D11 and the upper housing D21 are foldably connected to each other.

(Description of Lower Housing)

Initially, a structure of the lower housing D11 will be described. As shown in FIG. 79 to FIG. 81, in the lower housing D11, a lower LCD (Liquid Crystal Display) D12, a touch panel D13, operation buttons D14A to D14L (FIG. 79, FIG. 81), an analog stick D15, an LED D16A and an LED D16B, an insertion opening D17, and a microphone hole D18 are provided. Hereinafter, these components will be described in detail.

As shown in FIG. 79, the lower LCD D12 is accommodated in the lower housing D11. The lower LCD D12 has a horizontally long shape, and is located such that a long side direction thereof corresponds to a long side direction of the lower housing D11. The lower LCD D12 is positioned at the center of the lower housing D11. The lower LCD D12 is provided on the inner side surface (main surface) of the lower housing D11, and a screen of the lower LCD D12 is exposed at an opening of the lower housing D11. When the game apparatus D10 is not used, the game apparatus D10 is in the closed state, thereby preventing the screen of the lower LCD D12 from becoming unclean and damaged. The number of pixels of the lower LCD D12 may be, for example, 256 dots×192 dots (the longitudinal line×the vertical line). The lower LCD D12 is a display device for displaying an image in a planar manner (not in a stereoscopically visible manner), which is different from the upper LCD D22 as described below. Although an LCD is used as a display device in the present embodiment, any other display device such as a display device using an EL (Electro Luminescence), or the like may be used. In addition, a display device having any resolution may be used as the lower LCD D12.

As shown in FIG. 79, the game apparatus D10 includes the touch panel D13 as an input device. The touch panel D13 is mounted on the screen of the lower LCD D12. In the present embodiment, the touch panel D13 may be, but is not limited to, a resistive film type touch panel. A touch panel of any type such as electrostatic capacitance type may be used. In the present embodiment, the touch panel D13 has the same resolution (detection accuracy) as that of the lower LCD D12. However, the resolution of the touch panel D13 and the resolution of the lower LCD D12 may not necessarily be the same. Further, the insertion opening D17 (indicated by dashed line in FIG. 79 and FIG. 81(d)) is provided on the upper side surface of the lower housing D11. The insertion opening D17 is used for accommodating a touch pen D28 which is used for performing an operation on the touch panel D13. Although an input on the touch panel D13 is usually made by using the touch pen D28, a finger of a user may be used for making an input on the touch panel D13, besides the touch pen D28.

The operation buttons D14A to D14L are each an input device for making a predetermined input. As shown in FIG. 79, among operation buttons D14A to D14L, a cross button D14A (a direction input button D14A), an a-button D14B, a b-button D14C, an x-button D14D, a y-button D14E, a power button D14F, a selection button D14J, a HOME button D14K, and a start button D14L are provided on the inner side surface (main surface) of the lower housing D11. The cross button D14A is cross-shaped, and includes buttons for indicating an upward, a downward, a leftward, or a rightward direction. The button DNB, button D14C, button D14D, and button D14E are positioned so as to form a cross shape. The buttons D14A to D14E, the selection button D14J, the HOME button D14K, and the start button DIAL are assigned functions, respectively, in accordance with a program executed by the game apparatus D10, as necessary. For example, the cross button D14A is used for selection operation and the like, and the operation buttons D14B to D14E are used for, for example, determination operation and cancellation operation. The power button D14F is used for powering the game apparatus D10 on/off.

The analog stick D15 is a device for indicating a direction, and is provided to the left of the lower LCD D12 in an upper portion of the inner side surface of the lower housing D11. As shown in FIG. 79, the cross button D14A is provided to the left of the lower LCD D12 in the lower portion of the lower housing D11. That is, the analog stick D15 is provided above the cross button D14A. The analog stick D15 and the cross button D14A are positioned so as to be operated by a thumb of a left hand with which the lower housing is held. Further, the analog stick D15 is provided in the upper area, and thus the analog stick D15 is positioned such that a thumb of a left hand with which the lower housing D11 is held is naturally positioned on the position of the analog stick D15, and the cross button D14A is positioned such that the thumb of the left hand is positioned on the position of the cross button D14A when the thumb of the left hand is slightly moved downward from the analog stick D15. The analog stick D15 has a top, corresponding to a key, which slides parallel to the inner side surface of the lower housing D11. The analog stick D15 acts in accordance with a program executed by the game apparatus D10. For example, when a game in which a predetermined object appears in a 3-dimensional virtual space is executed by the game apparatus D10, the analog stick D15 acts as an input device for moving the predetermined object in the 3-dimensional virtual space. In this case, the predetermined object is moved in a direction in which the top corresponding to the key of the analog stick D15 slides. As the analog stick D15, a component which enables an analog input by being tilted by a predetermined amount, in any direction, such as the upward, the downward, the rightward, the leftward, or the diagonal direction, may be used.

Four buttons, that is, the a-button D14B, the b-button D14C, the x-button D14D, and the y-button D14E, which are positioned so as to form a cross shape, are positioned such that a thumb of a right hand with which the lower housing D11 is held is naturally positioned on the positions of the four buttons. Further, the four buttons and the analog stick D15 sandwich the lower LCD D12, so as to be bilaterally symmetrical in position with respect to each other. Thus, depending on a game program, for example, a left-handed person can make a direction instruction input by using these four buttons.

Further, the microphone hole D18 is provided on the inner side surface of the lower housing D11. Under the microphone hole D18, a microphone (see FIG. 82) is provided as a sound input device described below, and the microphone detects for a sound from the outside of the game apparatus D10.

FIG. 81(a) is a left side view of the game apparatus D10 in the closed state. FIG. 81(b) is a front view of the game apparatus D10 in the closed state. FIG. 81(e) is a right side view of the game apparatus D10 in the closed state. FIG. 81(d) is a rear view of the game apparatus D10 in the closed state. As shown in FIG. 81(b) and FIG. 81(d), an L button D14G and an R button D14H are provided on the upper side surface of the lower housing D11 The L button D14G is positioned on the left end portion of the upper side surface of the lower housing D11 and the R button D14H is positioned on the right end portion of the upper side surface of the lower housing D11. Further, as shown in FIG. 81(a), a sound volume button D141 is provided on the left side surface of the lower housing D11. The sound volume button D141 is used for adjusting a sound volume of a speaker of the game apparatus D10.

As shown in FIG. 81(a), a cover section D11C is provided on the left side surface of the lower housing D11 so as to be openable and closable. Inside the cover section D11C, a connector (not shown) is provided for electrically connecting between the game apparatus D10 and an external data storage memory D45. The external data storage memory D45 is detachably connected to the connector. The external data storage memory D45 is used for, for example, recording (storing) data of an image shot by the game apparatus D10. The connector and the cover section D11C may be provided on the right side surface of the lower housing D11.

Further, as shown in FIG. 81(d), an insertion opening D11D through which an external memory D44 having a game program stored therein is inserted is provided on the upper side surface of the lower housing D11. A connector (not shown) for electrically connecting between the game apparatus D10 and the external memory D44 in a detachable manner is provided inside the insertion opening D11D. A predetermined game program is executed by connecting the external memory D44 to the game apparatus D10. The connector and the insertion opening D11D may be provided on another side surface (for example, the right side surface) of the lower housing D11.

Further, as shown in FIG. 79 and FIG. 81(c), a first LED D16A for notifying a user of an ON/OFF state of a power supply of the game apparatus D10 is provided on the lower side surface of the lower housing D11, and a second LED D16B for notifying a user of an establishment state of a wireless communication of the game apparatus D10 is provided on the right side surface of the lower housing D11. The game apparatus D10 can make wireless communication with other devices, and the second LED D16B is lit up when the wireless communication is established. The game apparatus D10 has a function of connecting to a wireless LAN in a method based on, for example, IEEE802.11.b/g standard. A wireless switch D19 for enabling/disabling the function of the wireless communication is provided on the right side surface of the lower housing D11 (see FIG. 81(c)).

A rechargeable battery (not shown) acting as a power supply for the game apparatus D10 is accommodated in the lower housing D11, and the battery can be charged through a terminal provided on a side surface (for example, the upper side surface) of the lower housing D11.

(Description of Upper Housing)

Next, a structure of the upper housing D21 will be described. As shown in FIG. 79 to FIG. 81, in the upper housing D21, an upper LCD (Liquid Crystal Display) D22, an outer imaging section D23 (an outer imaging section (left) D23a and an outer imaging section (right) D23b), an inner imaging section D24, a 3D adjustment switch D25, and a 3D indicator D26 are provided. Hereinafter, theses components will be described in detail.

As shown in FIG. 79, the upper LCD D22 is accommodated in the upper housing D21. The upper LCD D22 has a horizontally long shape, and is located such that a long side direction thereof corresponds to a long side direction of the upper housing D21. The upper LCD D22 is positioned at the center of the upper housing D21. The area of a screen of the upper LCD D22 is set so as to be greater than the area of the screen of the lower LCD D12. Further, the screen of the upper LCD D22 is horizontally elongated as compared to the screen of the lower LCD D12. Specifically, a rate of the horizontal width in the aspect ratio of the screen of the upper LCD D22 is set so as to be greater than a rate of the horizontal width in the aspect ratio of the screen of the lower LCD D12.

The screen of the upper LCD D22 is provided on the inner side surface (main surface) D21B of the upper housing D21, and the screen of the upper LCD D22 is exposed at an opening of the upper housing D21. Further, as shown in FIG. 80, the inner side surface of the upper housing D21 is covered with a transparent screen cover D27. The screen cover D27 protects the screen of the upper LCD D22, and integrates the upper LCD D22 and the inner side surface of the upper housing D21 with each other, thereby achieving unity. The number of pixels of the upper LCD D22 may be, for example, 640 dots×200 dots (the horizontal line×the vertical line). Although, in the present embodiment, the upper LCD D22 is an LCD, a display device using an EL (Electro Luminescence), or the like may be used. In addition, a display device having any resolution may be used as the upper LCD D22.

The upper LCD D22 is a display device capable of displaying a stereoscopically visible image (also referred to as a stereoscopic view image or a stereoscopic image). Further, in the present embodiment, an image for a left eye and an image for a right eye are displayed by using substantially the same display area. Specifically, the upper LCD D22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD D22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD D22 of a parallax barrier type is used. The upper LCD D22 displays, by using the image for a right eye and the image for a left eye, an image (a stereoscopic image) which is stereoscopically visible with naked eyes. That is, the upper LCD D22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD D22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD D22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch D25 described later.

Two imaging sections (D23a and D23b) provided on the outer side surface (the back surface reverse of the main surface on which the upper LCD D22 is provided) D21D of the upper housing D21 are generically referred to as the outer imaging section D23. The imaging directions of the outer imaging section (left) D23a and the outer imaging section (right) D23b are each the same as the outward normal direction of the outer side surface D21D. Further, these imaging sections are each designed so as to be positioned in a direction which is opposite to the normal direction of the display surface (inner side surface) of the upper LCD D22 by 180 degrees. Specifically, the imaging direction of the outer imaging section (left) D23a and the imaging direction of the outer imaging section (right) D23b are parallel to each other. The outer imaging section (left) D23a and the outer imaging section (right) D23b can be used as a stereo camera depending on a program executed by the game apparatus D10. Further, depending on a program, when any one of the two outer imaging sections (D23a and D23b) is used alone, the outer imaging section D23 may be used as a non-stereo camera.

Further, depending on a program, images shot by the two outer imaging sections (D23a and D23b) may be combined with each other or may compensate for each other, thereby enabling imaging using an extended imaging range. In the present embodiment, the outer imaging section D23 is structured so as to include two imaging sections, that is, the outer imaging section (left) D23a and the outer imaging section (right) D23b. Each of the outer imaging section (left) D23a and the outer imaging section (right) D23b includes an imaging device, such as a CCD image sensor or a CMOS image sensor, having a common predetermined resolution, and a lens. The lens may have a zooming mechanism.

As indicated by dashed lines in FIG. 79 and by solid lines in FIG. 81(b), the outer imaging section (left) D23a and the outer imaging section (right) D23b forming the outer imaging section D23 are aligned so as to be parallel to the horizontal direction of the screen of the upper LCD D22. Specifically, the outer imaging section (left) D23a and the outer imaging section (right) D23b are positioned such that a straight line connecting between the two imaging sections is parallel to the horizontal direction of the screen of the upper LCD D22. Reference numerals D23a and D23b which are indicated as dashed lines in FIG. 79 represent the outer imaging section (left) D23a and the outer imaging section (right) D23b, respectively, which are positioned on the outer side surface reverse of the inner side surface of the upper housing D21. As shown in FIG. 79, when a user views the screen of the upper LCD D22 from the front thereof, the outer imaging section (left) D23a is positioned to the left of the upper LCD D22 and the outer imaging section (right) D23b is positioned to the right of the upper LCD D22. When a program for causing the outer imaging section D23 to function as a stereo camera is executed, the outer imaging section (left) D23a shoots an image for a left eye, which is viewed by a left eye of a user, and the outer imaging section (right) D23b shoots an image for a right eye, which is viewed by a right eye of the user. A distance between the outer imaging section (left) D23a and the outer imaging section (right) D23b is set so as to be approximately the same as a distance between both eyes of a person, that is, may be set so as to be within a range from 30 mm to 70 mm, for example. However, the distance between the outer imaging section (left) D23a and the outer imaging section (right) D23b is not limited to a distance within the range described above.

In the present embodiment, the outer imaging section (left) D23a and the outer imaging section (right) D23b are secured to the housing, and the imaging directions thereof cannot be changed.

Further, the outer imaging section (left) D23a and the outer imaging section (right) D23b are positioned to the left and to the right, respectively, of the upper LCD D22 (on the left side and the right side, respectively, of the upper housing D21) so as to be horizontally symmetrical with respect to the center of the upper LCD D22. Specifically, the outer imaging section (left) D23a and the outer imaging section (right) D23b are positioned so as to be symmetrical with respect to a line which divides the upper LCD D22 into two equal parts, that is, the left part and the right part. Further, the outer imaging section (left) D23a and the outer imaging section (right) D23b are positioned at positions which are reverse of positions above the upper edge of the screen of the upper LCD D22 and which are on the upper portion of the upper housing D21 in an opened state. Specifically, when the upper LCD D22 is projected on the outer side surface of the upper housing D21, the outer imaging section (left) D23a and the outer imaging section (right) D23b are positioned, on the outer side surface of the upper housing D21, at a position above the upper edge of the screen of the upper LCD D22 having been projected.

As described above, the two imaging sections (D23a and D23b) of the outer imaging section D23 are positioned to the left and the right of the upper LCD D22 so as to be horizontally symmetrical with respect to the center of the upper LCD D22. Therefore, when a user views the upper LCD D22 from the front thereof, the imaging direction of the outer imaging section D23 can be the same as the direction of the line of sight of the user. Further, the outer imaging section D23 is positioned at a position reverse of a position above the upper edge of the screen of the upper LCD D22. Therefore, the outer imaging section D23 and the upper LCD D22 do not interfere with each other inside the upper housing D21. Therefore, the upper housing D21 may have a reduced thickness as compared to a case where the outer imaging section D23 is positioned on a position reverse of a position of the screen of the upper LCD D22.

The inner imaging section D24 is positioned on the inner side surface (main surface) D21B of the upper housing D21, and acts as an imaging section which has an imaging direction which is the same direction as the inward normal direction of the inner side surface. The inner imaging section D24 includes an imaging device, such as a CCD image sensor and a CMOS image sensor, having a predetermined resolution, and a lens. The lens may have a zooming mechanism.

As shown in FIG. 79, when the upper housing D21 is in the opened state, the inner imaging section D24 is positioned, on the upper portion of the upper housing D21, above the upper edge of the screen of the upper LCD D22. Further, in this state, the inner imaging section D24 is positioned at the horizontal center of the upper housing D21 (on a line which separates the upper housing D21 (the screen of the upper LCD D22) into two equal parts, that is, the left part and the right part). Specifically, as shown in FIG. 79 and FIG. 81(b), the inner imaging section D24 is positioned on the inner side surface of the upper housing D21 at a position reverse of the middle position between the left and the right imaging sections (the outer imaging section (left) D23a and the outer imaging section (right) D23b) of the outer imaging section D23. Specifically, when the left and the right imaging sections of the outer imaging section D23 provided on the outer side surface of the upper housing D21 are projected on the inner side surface of the upper housing D21, the inner imaging section D24 is positioned at the middle position between the left and the right imaging sections having been projected. The dashed line D24 indicated in FIG. 81(b) represents the inner imaging section D24 positioned on the inner side surface of the upper housing D21.

As described above, the inner imaging section D24 is used for shooting an image in the direction opposite to that of the outer imaging section D23. The inner imaging section D24 is positioned on the inner side surface of the upper housing D21 at a position reverse of the middle position between the left and the right imaging sections of the outer imaging section D23. Thus, when a user views the upper LCD D22 from the front thereof, the inner imaging section D24 can shoot an image of a face of the user from the front thereof. Further, the left and the right imaging sections of the outer imaging section D23 do not interfere with the inner imaging section D24 inside the upper housing D21, thereby enabling reduction of the thickness of the upper housing D21.

The 3D adjustment switch D25 is a slide switch, and is used for switching a display mode of the upper LCD D22 as described above. Further, the 3D adjustment switch D25 is used for adjusting the stereoscopic effect of a stereoscopically visible image (stereoscopic image) which is displayed on the upper LCD D22. As shown in FIG. 79 to FIG. 81, the 3D adjustment switch D25 is provided at the end portions of the inner side surface and the right side surface of the upper housing D21, and is positioned at a position at which the 3D adjustment switch D25 is visible to a user when the user views the upper LCD D22 from the front thereof. Further, an operation section of the 3D adjustment switch D25 projects on the inner side surface and the right side surface, and can be viewed and operated from both sides. All the switches other than the 3D adjustment switch D25 are provided on the lower housing D11.

The 3D adjustment switch D25 is provided so as to be visible from the front surface and the right side surface of the upper housing D21 as shown in FIG. 79 and FIG. 80. A slider D25a of the 3D adjustment switch D25 is slidable to any position in a predetermined direction (the height direction). A display mode of the upper LCD D22 may be determined or feeling of stereoscopic viewing may be adjusted, in accordance with the position of the slider D25a. For example, a cameras distance between virtual cameras (virtual stereo cameras) described later may be set in accordance with the position of the slider D25a of the 3D adjustment switch D25. In addition, the position relationship between an image for a left eye shot by a left virtual camera of the virtual stereo cameras, and an image for a right eye shot by a right virtual camera of the virtual stereo cameras, may be adjusted in accordance with the position of the slider D25a. Specifically, for example, if the slider D25a of the 3D adjustment switch D25 is positioned at the uppermost point (in the upward direction in FIG. 79 and FIG. 80), the difference, in the lateral direction (the longitudinal direction of the screen of the upper LCD D22, the right-left direction in FIG. 79), between the positions of the image for a left eye and the image for a right eye is set at the upper limit value. In this way, when the difference, in the lateral direction, between the positions of the image for a left eye and the image for a right eye has been set at the upper limit value, the parallax between the two images increases. Therefore, when the user views the two images displayed on the upper LCD D22 via the parallax barrier, the images appear to protrude toward the user from the screen of the upper LCD D22. In this way, the parallax between the two images may be adjusted by using the 3D adjustment switch D25.

The 3D indicator D26 indicates whether or not the upper LCD D22 is in the stereoscopic display mode. The 3D indicator D26 is implemented as a LED, and is lit up when the stereoscopic display mode of the upper LCD D22 is enabled. The 3D indicator D26 may be lit up only when the program processing for displaying a stereoscopically visible image is performed in a state where the upper LCD D22 is in the stereoscopic display mode. As shown in FIG. 79, the 3D indicator D26 is positioned near the screen of the upper LCD D22 on the inner side surface of the upper housing D21. Therefore, when a user views the screen of the upper LCD D22 from the front thereof, the user can easily view the 3D indicator D26. Therefore, also when a user is viewing the screen of the upper LCD D22, the user can easily recognize the display mode of the upper LCD D22.

Further, a speaker hole D21E is provided on the inner side surface of the upper housing D21. A sound is outputted through the speaker hole D21E from a speaker D43 described later.

(Internal Configuration of Game Apparatus D10)

Figure 82:
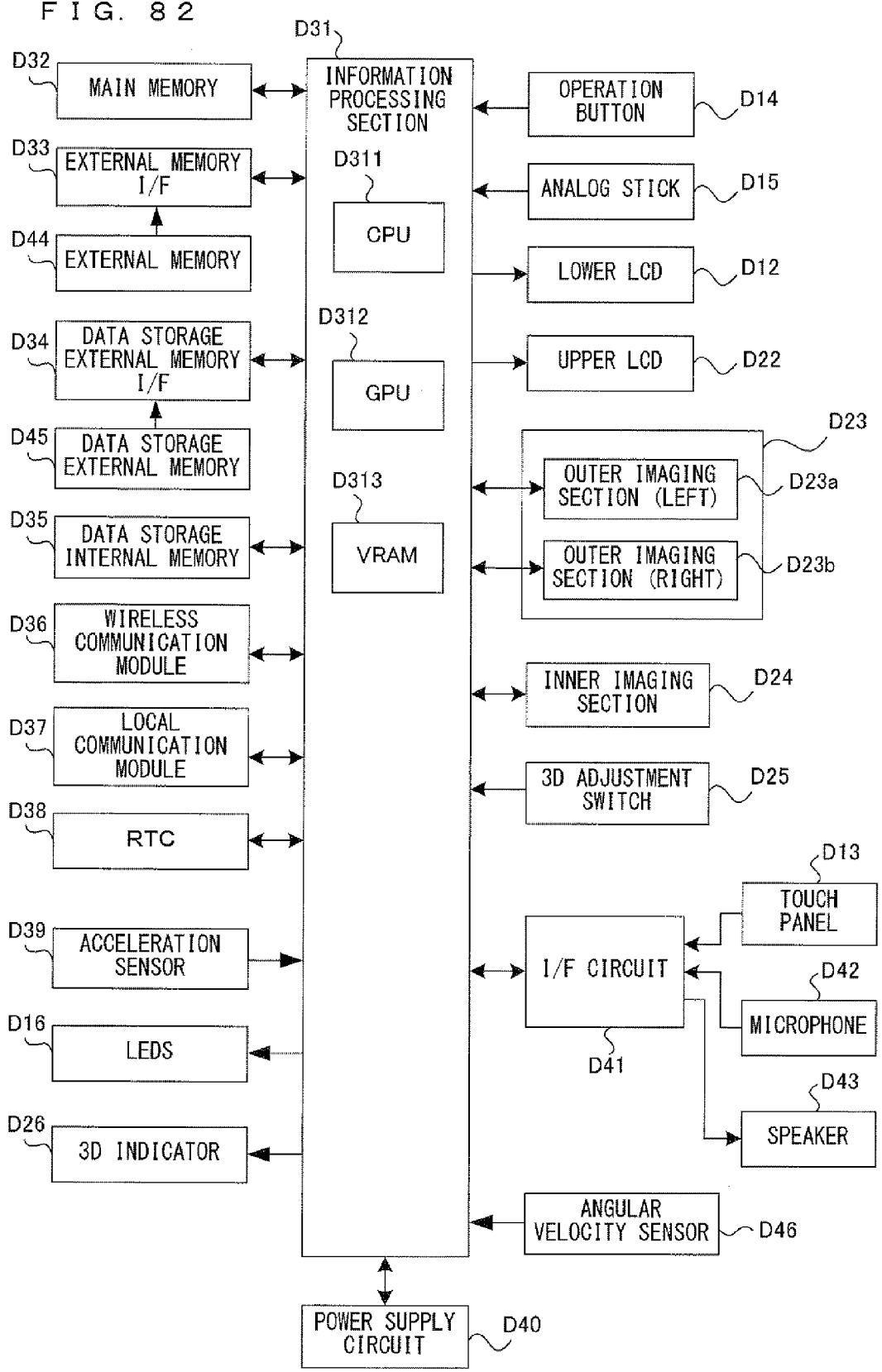
FIG. 82 is a block diagram illustrating an internal configuration of the game apparatus D10.

Next, an internal electrical configuration of the game apparatus D10 will be described with reference to FIG. 82. FIG. 82 is a block diagram illustrating an internal configuration of the game apparatus D10. As shown in FIG. 82, the game apparatus D10 includes, in addition to the components described above, electronic components such as an information processing section D31, a main memory D32, an external memory interface (external memory IN) D33, an external data storage memory I/F D34, an internal data storage memory D35, a wireless communication module D36, a local communication module D37, a real-time clock (RTC) D38, an acceleration sensor D39, a power supply circuit D40, an interface circuit (I/F circuit) D41, and the like. These electronic components are mounted on an electronic circuit substrate, and accommodated in the lower housing D11 (or the upper housing D21).

The information processing section D31 is information processing means which includes a CPU (Central Processing Unit) D311 for executing a predetermined program, a GPU (Graphics Processing Unit) D312 for performing image processing, and the like. In the present embodiment, a predetermined program is stored in a memory (for example, the external memory D44 connected to the external memory I/F D33 or the internal data storage memory D35) inside the game apparatus D10. The CPU D311 of the information processing section D31 executes a image processing (FIG. 90) described later by executing the predetermined program. The program executed by the CPU D311 of the information processing section. D31 may be acquired from another device through communication with the other device. The information processing section D31 further includes a VRAM (Video RAM) D313. The GPU D312 of the information processing section D31 generates an image in accordance with an instruction from the CPU D311 of the information processing section D31, and renders the image in the VRAM D313. The GPU D312 of the information processing section D31 outputs the image rendered in the VRAM D313, to the upper LCD D22 and/or the lower LCD D12, and the image is displayed on the upper LCD D22 and/or the lower LCD D12.

The main memory D32, the external memory I/F D33, the external data storage memory I/F D34, and the internal data storage memory D35 are connected to the information processing section D31. The external memory I/F D33 is an interface for detachably connecting to the external memory D44. The external data storage memory I/F D34 is an interface for detachably connecting to the external data storage memory D45.

The main memory D32 is volatile storage means used as a work area and a buffer area for (the CPU D311 of) the information processing section D31. That is, the main memory D32 temporarily stores various types of data used for the image processing, and temporarily stores a program acquired from the outside (the external memory D44, another device, or the like), for example. In the present embodiment, for example, a PSRAM (Pseudo-SRAM) is used as the main memory D32.

The external memory D44 is nonvolatile storage means for storing a program executed by the information processing section D31. The external memory D44 is implemented as, for example, a read-only semiconductor memory. When the external memory D44 is connected to the external memory I/F D33, the information processing section D31 can load a program stored in the external memory D44. A predetermined processing is performed by the program loaded by the information processing section D31 being executed. The external data storage memory D45 is implemented as a non-volatile readable and writable memory (for example, a NAND flash memory), and is used for storing predetermined data. For example, images shot by the outer imaging section D23 and/or images shot by another device are stored in the external data storage memory D45. When the external data storage memory D45 is connected to the external data storage memory I/F D34, the information processing section D31 loads an image stored in the external data storage memory D45, and the image can be displayed on the upper LCD D22 and/or the lower LCD D12.

The internal data storage memory D35 is implemented as a non-volatile readable and writable memory (for example, a NAND flash memory), and is used for storing predetermined data. For example, data and/or programs downloaded through the wireless communication module D36 by wireless communication is stored in the internal data storage memory D35.

The wireless communication module D36 has a function of connecting to a wireless LAN by using a method based on, for example, IEEE 802.11.b/g standard. The local communication module D37 has a function of performing wireless communication with the same type of game apparatus in a predetermined communication method (for example, infrared communication). The wireless communication module D36 and the local communication module D37 are connected to the information processing section D31. The information processing section D31 can perform data transmission to and data reception from another device via the Internet by using the wireless communication module D36, and can perform data transmission to and data reception from the same type of another game apparatus by using the local communication module D37.

The acceleration sensor D39 is connected to the information processing section D31. The acceleration sensor D39 detects magnitudes of accelerations (linear accelerations) in the directions of the straight lines along the three axial (xyz axial) directions, respectively. The acceleration sensor D39 is provided inside the lower housing D11. In the acceleration sensor D39, as shown in FIG. 79, the long side direction of the lower housing D11 is defined as x axial direction, the short side direction of the lower housing D11 is defined as y axial direction, and the direction orthogonal to the inner side surface (main surface) of the lower housing D11 is defined as z axial direction, thereby detecting magnitudes of the linear accelerations for the respective axes. The acceleration sensor D39 is, for example, an electrostatic capacitance type acceleration sensor. However, another type of acceleration sensor may be used. The acceleration sensor D39 may be an acceleration sensor for detecting a magnitude of an acceleration for one axial direction or two-axial directions. The information processing section D31 can receive data (acceleration data) representing accelerations detected by the acceleration sensor D39, and detect an orientation and a motion of the game apparatus D10. In the present embodiment, the information processing section D31 the orientation (inclination) of the game apparatus D10, based on the acceleration detected by the acceleration sensor D39.

The RTC D38 and the power supply circuit D40 are connected to the information processing section D31. The RTC D38 counts time, and outputs the time to the information processing section D31. The information processing section D31 calculates a current time (date) based on the time counted by the RTC D38. The power supply circuit D40 controls power from the power supply (the rechargeable battery accommodated in the lower housing D11 as described above) of the game apparatus D10, and supplies power to each component of the game apparatus D10.

The I/F circuit D41 is connected to the information processing section D31. The microphone D42 and the speaker D43 are connected to the I/F circuit D41. Specifically, the speaker D43 is connected to the I/F circuit D41 through an amplifier which is not shown. The microphone D42 detects a voice from a user, and outputs a sound signal to the I/F circuit D41. The amplifier amplifies a sound signal outputted from the I/F circuit D41, and a sound is outputted from the speaker D43. The touch panel D13 is connected to the I/F circuit D41. The I/F circuit D41 includes a sound control circuit for controlling the microphone D42 and the speaker D43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel D13, and outputs the touch position data to the information processing section D31. The touch position data represents a coordinate of a position, on an input surface of the touch panel D13, on which an input is made. The touch panel control circuit reads a signal outputted from the touch panel D13, and generates the touch position data every predetermined time. The information processing section D31 acquires the touch position data, to recognize a position on which an input is made on the touch panel D13.

The operation button D14 includes the operation buttons D14A to D14L described above, and is connected to the information processing section D31. Operation data representing an input state of each of the operation buttons D14A to D14l is outputted from the operation button D14 to the information processing section D31, and the input state indicates whether or not each of the operation buttons D14A to D14l has been pressed. The information processing section D31 acquires the operation data from the operation button D14 to perform processing in accordance with the input on the operation button D14.

The lower LCD D12 and the upper LCD D22 are connected to the information processing section D31. The lower LCD D12 and the upper LCD D22 each display an image in accordance with an instruction from (the GPU D312 of) the information processing section D31.

Specifically, the information processing section D31 is connected to an LCD controller (not shown) of the upper LCD D22, and causes the LCD controller to set the parallax barrier to ON or OFF. When the parallax barrier is set to ON in the upper LCD D22, an image for a right eye and an image for a left eye, which are stored in the VRAM D313 of the information processing section D31 are outputted to the upper LCD D22. More specifically, the LCD controller alternately repeats reading of pixel data of the image for a right eye for one line in the vertical direction, and reading of pixel data of the image for a left eye for one line in the vertical direction, thereby reading, from the VRAM D313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD D22. A user views the images through the parallax barrier in the upper LCD D22, so that the image for the right eye is viewed by the user's right eye, and the image for the left eye is viewed by the user's left eye. Thus, the stereoscopically visible image is displayed on the screen of the upper LCD D22.

The outer imaging section D23 and the inner imaging section D24 are connected to the information processing section D31. The outer imaging section D23 and the inner imaging section D24 each shoot an image in accordance with an instruction from the information processing section D31, and output data of the shot image to the information processing section D31. For example, the information processing section D31 issues an instruction for shooting an image to one of the outer imaging section D23 or the inner imaging section D24, and the imaging section which receives the instruction for shooting an image shoots an image and transmits data of the shot image to the information processing section D31. For example, in the present embodiment, a user selects the imaging section to be used through a touch operation using the touch panel D13. When the information processing section D31 (the CPU D311) detects that the imaging section is selected, the information processing section D31 instructs one of the outer imaging section D32 or the inner imaging section D24 to shoot an image.

The 3D adjustment switch D25 is connected to the information processing section D31. The 3D adjustment switch D25 transmits, to the information processing section D31, an electrical signal in accordance with the position of the slider D25a.

The 3D indicator D26 is connected to the information processing section D31. The information processing section D31 controls whether or not the 3D indicator D26 is to be lit up. In the present embodiment, the information processing section D31 lights up the 3D indicator D26 when the upper LCD D22 is in the stereoscopic display mode. The game apparatus D10 has the internal configuration as described above.

In addition, the angular velocity sensor D46 is connected to the information processing section D31. The angular velocity sensor D46 detects angular velocities about the respective axes (x-axis, y-axis, and z-axis). The game apparatus D10 can calculate the orientation of the game apparatus D10 in the real space, based on the angular velocities sequentially detected by the angular velocity sensor D46. Specifically, the game apparatus D10 integrates the angular velocities about the respective axes detected by the angular velocity sensor D46 with respect to time, thereby calculating the rotation angles of the game apparatus D10 about the respective axes.

(Outline of Game Processing)

Next, the outline of a game executed by the game apparatus D10 according to the present embodiment will be described. In the game according to the present embodiment, when a marker is placed on a plane (for example, a table) in the real space, and then the marker is shot by the outer imaging section D23, a fishing rod and a fish which is a virtual object are superimposed onto a real image obtained by shooting a real space, and the resultant image is displayed on the upper LCD D22. Then, if the user performs a predetermined operation, a scene in which an end portion of a fishing line comes into contact with the plane in the real space and the plane heaves is displayed on the upper LCD D22. Hereinafter, first, an image displayed on the game apparatus D10 will be described, and then processing of displaying the plane in the real space heaving will be described.

Figure 83:
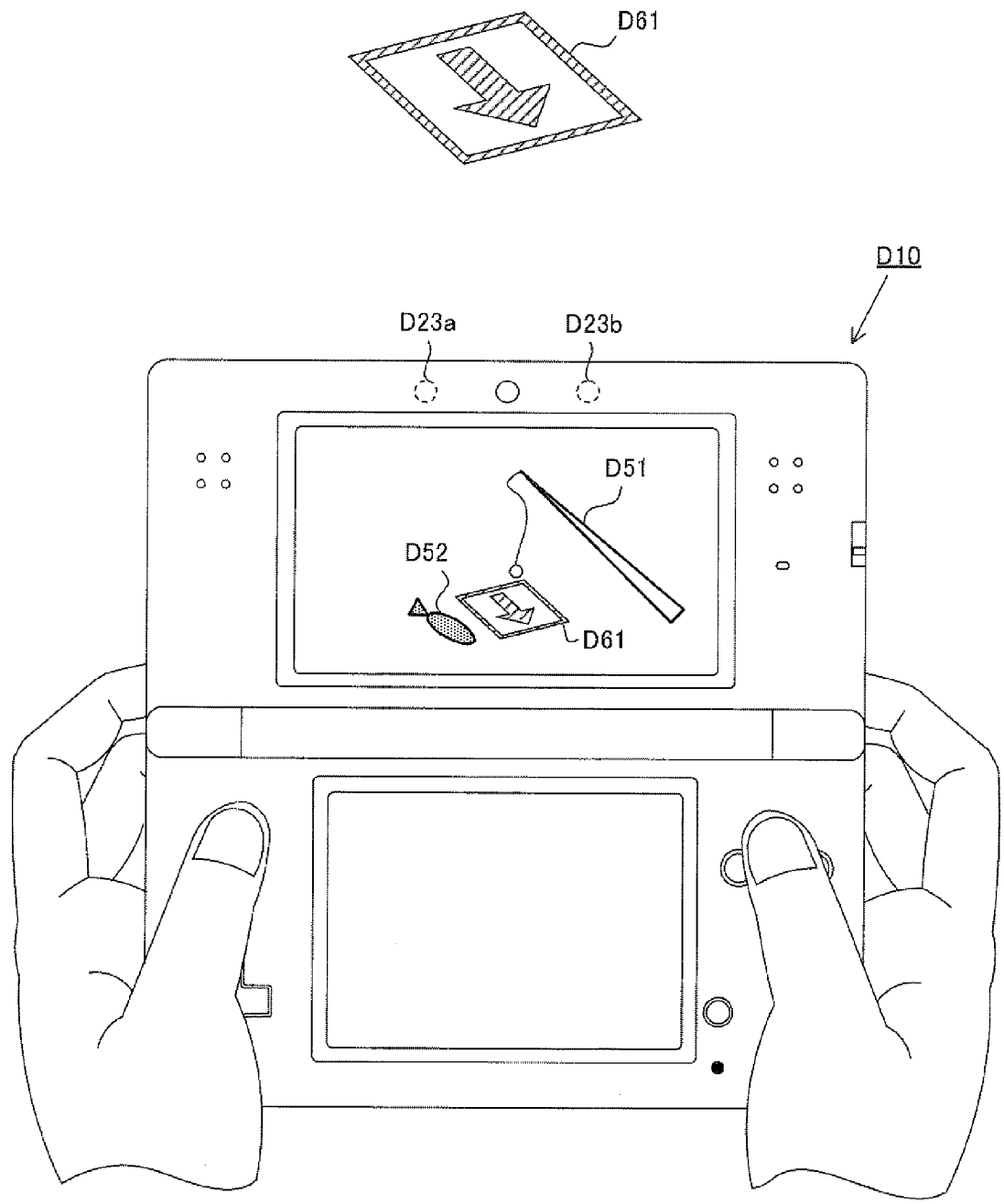
FIG. 83 shows an example of an image displayed on an upper LCD D22 when a marker D61 which is placed in advance in the real space is shot by an outer imaging section D23, while game processing is being executed.

FIG. 83 shows an example of an image displayed on the upper LCD D22 when a marker D61 which is placed in advance in the real space is shot by the outer imaging section D23, while the game according to the present embodiment is being executed.

As shown in FIG. 83, the marker D61 is placed on the plane (a table or the like, which is not shown) in the real space, and in the shooting direction of the outer imaging section D23. The marker D61 is a piece of paper that is rectangular-shaped, and an arrow is drawn at the center of the marker D61. The direction of the arrow drawn at the center of the marker D61 is in parallel with the longitudinal sides of the marker D61. The information processing section D31 (CPU D311) of the game apparatus D10 performs image processing such as pattern matching for an image shot by the outer imaging section D23, thereby detecting the marker D61 in the shot image. When the marker D61 has been detected in the image shot by the outer imaging section D23, a fishing rod object D51 and a fish object D52 are displayed on the upper LCD D22. Specifically, when the marker D61 has been detected, the fishing rod object D51 and the fish object D52 are superimposed onto a real image (a shot image of the real space including the marker D61 and the background) shot by the outer imaging section D23, and the resultant image is displayed on the upper LCD D22. When the marker D61 has not been detected in the image shot by the outer imaging section D23, a message indicating that the marker D61 has not been detected is displayed on the upper LCD D22, and the fishing rod object D51 is not displayed.

The outer imaging section D23 shoots a real image for a left eye to be viewed by the left eye of the user, and a real image for a right eye to be viewed by the right eye of the user, and the two real images that have been shot are displayed on the upper LCD D22. Therefore, the image displayed on the upper LCD D22 shown in FIG. 83 includes stereoscopically visible images (stereoscopic images).

In the state where the image shown in FIG. 83 is displayed on the upper LCD D22, when the user performs a predetermined operation, the image indicating a scene in which an end portion of a fishing line of the fishing rod object D51 moves downward to come into contact with the plane on which the marker D61 is placed, and then the plane heaves, is displayed. The predetermined operation is, for example, an operation of moving the outer imaging section D23 of the game apparatus D10 toward the marker D61, or an operation of inclining the game apparatus D10 so as to be in parallel with the plane on which the marker D61 is placed.

Figure 84:
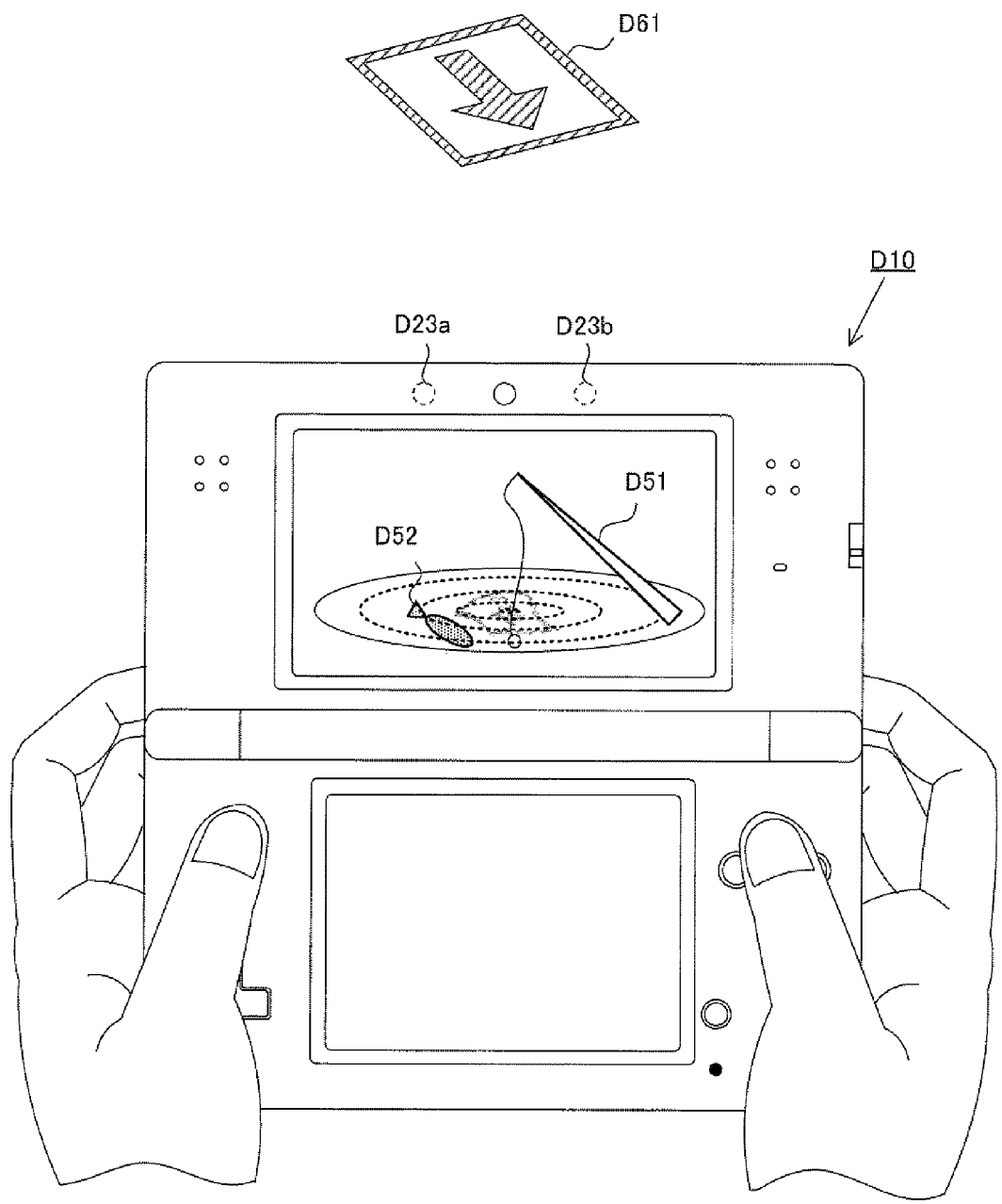
FIG. 84 shows a scene in which a plane on which the marker D61 is placed is heaving when the user has performed a predetermined operation.

FIG. 84 shows a scene in which the plane on which the marker D61 is placed is heaving when the user has performed the predetermined operation. As shown in FIG. 84, when the user has performed the predetermined operation, an image in which the plane in the real space on which the marker D61 is placed is heaving is displayed on the upper LCD D22. Specifically, a real image for a left eye and a real image for a right eye are shot by the outer imaging section D23, and the two real images that have been shot are deformed, whereby the plane in the real space stereoscopically heaving is displayed.

Figure 85:
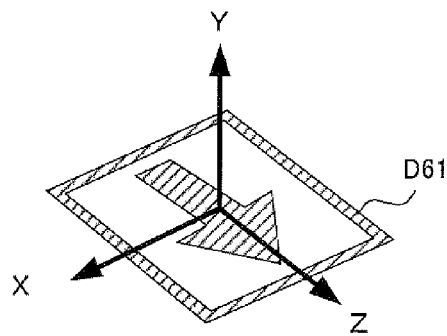
FIG. 85 shows the definition of a marker coordinate system.

It is noted that a marker coordinate system is set for the marker D61. FIG. 85 shows a definition of the marker coordinate system. As shown in FIG. 85, the marker coordinate system is defined as an XYZ coordinate system whose origin is at the center of the marker D61. A Z-axis is set in the same direction (forward direction) as the direction of the arrow of the marker D61, an X-axis is set rightward (in the rightward direction) with respect to the direction of the arrow, and a Y-axis is set vertically and upward (in the upward direction) with respect to the marker D61, in this way, a coordinate system (the marker coordinate system) in a virtual space is defined based on the marker D61 placed in the real space, thereby associating the virtual space with the real space.

The fish object D52 is set in the virtual space defined by the marker coordinate system. Therefore, when the position or the orientation of the game apparatus D10 (outer imaging section D23) is changed, a manner in which the fish object D52 is visible also changes. For example, when the user turns the game apparatus D10 90 degrees around the marker D61 (turns the game apparatus D10 90 degrees around the Y-axis), the fish object D52 is displayed so as to turn 90 degrees. Therefore, the user can feel as if the fish object D52 were present in the real space. It is noted that even if the position of the game apparatus D10 is changed, the fishing rod object D51 does not change (as the user holds the fishing rod object D51, the position of the fishing rod object D51 in the virtual space changes in accordance with the position of the user in the real space).

Hereinafter, processing for displaying the above-described image, which is executed on the game apparatus D10, will be described in detail.

(Details of Game Processing)

Figure 86:
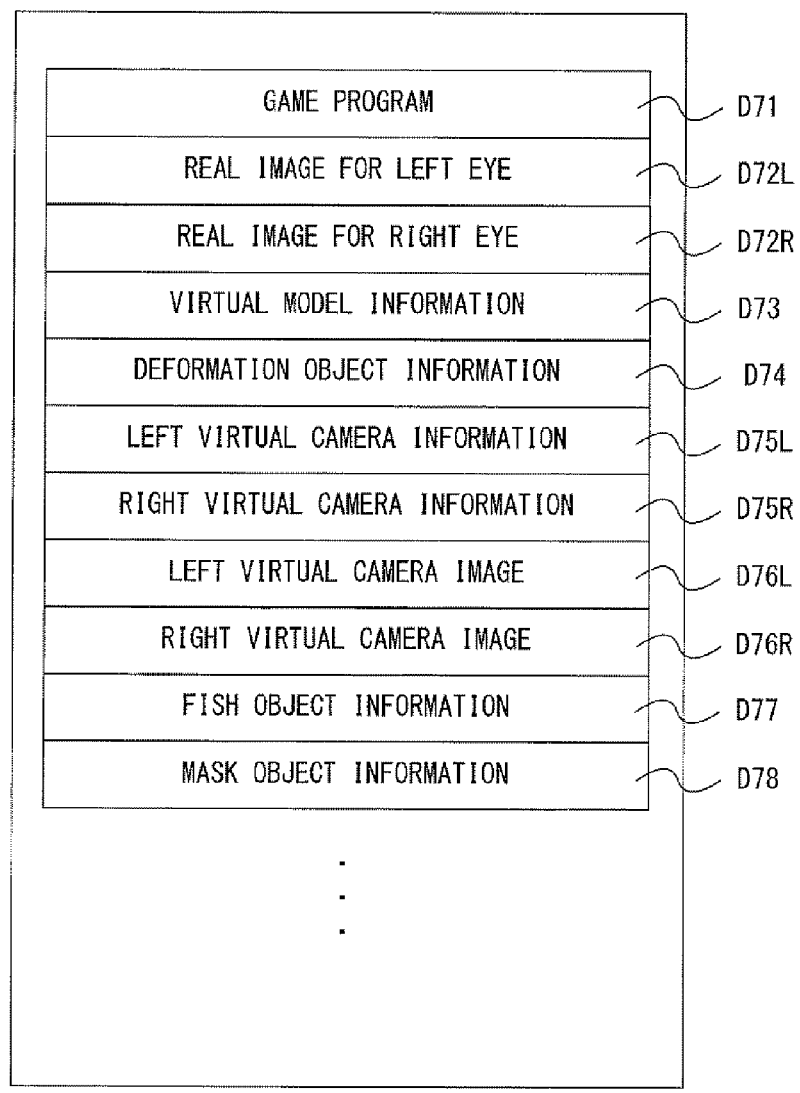
FIG. 86 shows a memory map of a RAM of the game apparatus D10.

Next, with reference to FIG. 86 to FIG. 89, the details of display processing according to the present embodiment will be described. First, main data to be stored in the main memory D32 and the VRAM D313 (which, hereinafter, may be collectively referred to as a RAM) in the display processing will be described. FIG. 86 shows a memory map of the RAM of the game apparatus D10. As shown in FIG. 86, the RAM stores a game program D71, a real image for a left eye D72L, a real image for a right eye D72R, virtual model information D73, deformed object information D74, left virtual camera information D75L, right virtual camera information D75R, a left virtual camera image D76L, a right virtual camera image D76R, fish object information D77, mask object information D78, and the like.

The game program. D71 is a program for causing the information processing section D31 (CPU D311) to execute game processing shown in flowcharts described later.

The real image for a left eye D72L is an image of the real space shot by the outer imaging section (left) D23a.

The real image for a right eye D72R is an image of the real space shot by the outer imaging section (right) D23b.

The virtual model information D73 is information relevant to a virtual model D55 (see FIG. 91) described later. Specifically, the virtual model information D73 is data representing a polygon having a planar shape, and indicates vertices P(i) (i=1 to n). As described later, the points P included in the virtual model D55 are represented by coordinate values in the marker coordinate system.

The deformed object information D74 is information relevant to a deformation object D56 (see FIG. 92) into which the virtual model. D55 having a planar shape is deformed. Specifically, the deformed object information D74 indicates vertices Q(i) (i=1 to n), and normal vectors N(i) of the vertices Q(i). The points Q included in the deformation object D56 are represented by coordinate values in the marker coordinate system.

The left virtual camera information D75L indicates the position and the orientation of a left virtual camera D53a (see FIG. 90) in the virtual space. Specifically, the left virtual camera information D75L is a matrix calculated based on the position and the orientation of the marker D61 in the real image for a left eye D72L.

The right virtual camera information D75R indicates the position and the orientation of a right virtual camera D53b (see FIG. 90) in the virtual space. Specifically, the right virtual camera information D75R is a matrix calculated based on the position and the orientation of the marker D61 in the real image for a right eye D72R.

The left virtual camera image D76L is an image obtained by the left virtual camera D53a shooting the deformation object D56.

The right virtual camera image D76R is an image obtained by the right virtual camera D53b shooting the deformation object D56.

The fish object information D77 is information relevant to the fish object D52 placed in the virtual space, and indicates the position and the shape of the fish object D52.

The mask object information D78 is information relevant to a mask object D57 (see FIG. 98) for masking the fish object D52 placed in the virtual space such that the fish object D52 is not visible from a predetermined direction.

(Description of Main Flow)

Figure 87:
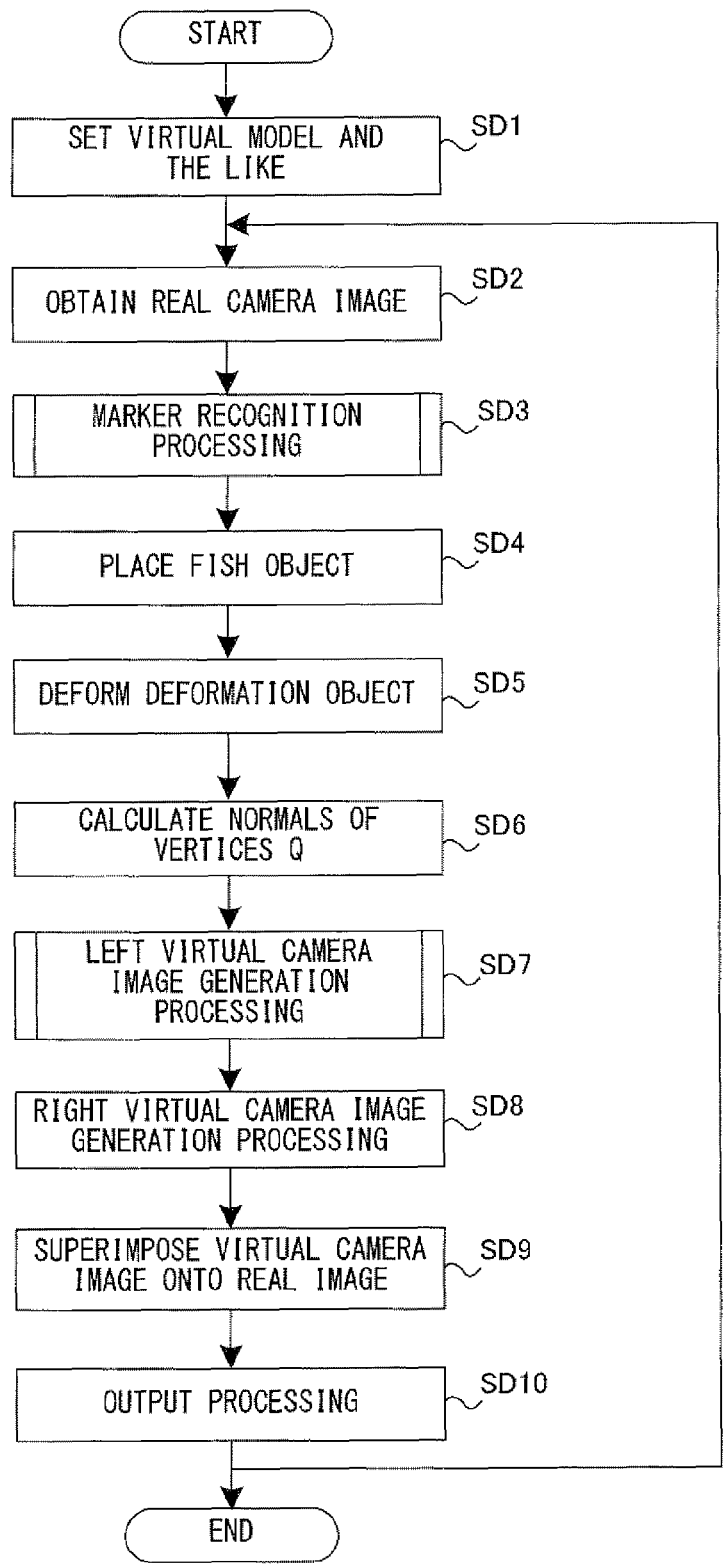
FIG. 87 is a main flowchart showing the details of the game processing.

Next, the details of the game processing according to the present embodiment will be described with reference to FIG. 87 to FIG. 89. FIG. 87 is a main flowchart showing the detail of the game processing according to the present embodiment. When the game apparatus D10 is powered on, the information processing section D31 (CPU D311) of the game apparatus D10 executes a boot program stored in a ROM, which is not shown, thereby initializing units such as the main memory D32. Next, a game program stored in a non-volatile memory (external memory D44 or the like, a computer-readable storage medium) is loaded onto a RAM (specifically, the main memory D32), and then the CPU D311 of the information processing section D31 starts to execute the game program. After the above processing is finished, processing indicated by the flowchart in FIG. 87 is executed by the information processing section D31 (the CPU D311 or the GPU D312).

It is noted that in FIG. 87, processing that is not directly relevant to the present invention is omitted. In addition, FIG. 87 will be described under the assumption that the marker D61 present in the real space has been shot by the outer imaging section D23. In addition, a loop of processing from step SD2 to step SD10 in FIG. 87 is repeated every frame (for example, 1/30 second or 1/60 second, which is referred to as a frame time).

First, in step SD1, the information processing section D31 sets the virtual model D55 and the like. Specifically, the information processing section D31 sets the coordinates of the points P representing the virtual model D55 (in the marker coordinate system) at predetermined values, and stores the values in the RAM. Specifically, the points P are set on the XZ-plane in the marker coordinate system. In addition, the information processing section D31 sets the coordinates of the points Q representing the deformation object D56 at predetermined values (the same values as those of the points P), and stores the values in the RAM. In addition, the information processing section D31 sets the mask object D57 at an end portion of the virtual model D55.

Figure 91:
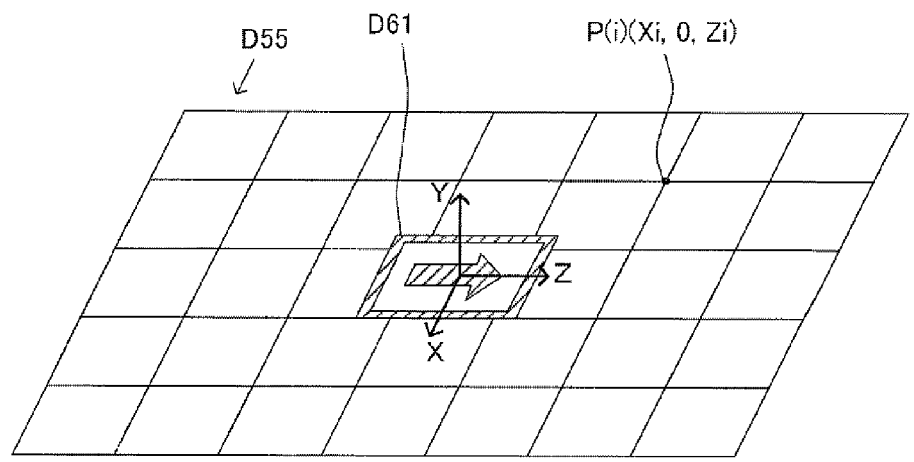
FIG. 91 shows a virtual model D55.

FIG. 91 shows the virtual model D55. As shown in FIG. 91, the virtual model D55 is a polygon including n vertices P and having a planar shape, and is placed on the XZ-plane (the plane in the real space on which the marker D61 is placed) in the marker coordinate system (XYZ coordinate system). After step SD1, the information processing section D31 executes processing of step SD2.

In step SD2, the information processing section D31 obtains a real camera image. Specifically, the information processing section D31 obtains the real image for a left eye D72L shot by the outer imaging section (left) D23a, and stores the obtained image in the RAM. In addition, the information processing section D31 obtains the real image for a right eye D72R shot by the outer imaging section (right) D23b, and stores the obtained image in the RAM. Next, the information processing section D31 executes processing of step SD3.

In step SD3, the information processing section D31 executes marker recognition processing. The marker recognition processing is processing of recognizing the marker D61 included in the real image for a left eye D72L and the real image for a right eye D72R obtained in step SD2, and setting virtual cameras (the left virtual camera D53a and the right virtual camera D53b). The details of the marker recognition processing in step SD3 will be described with reference to FIG. 88.

Figure 88:
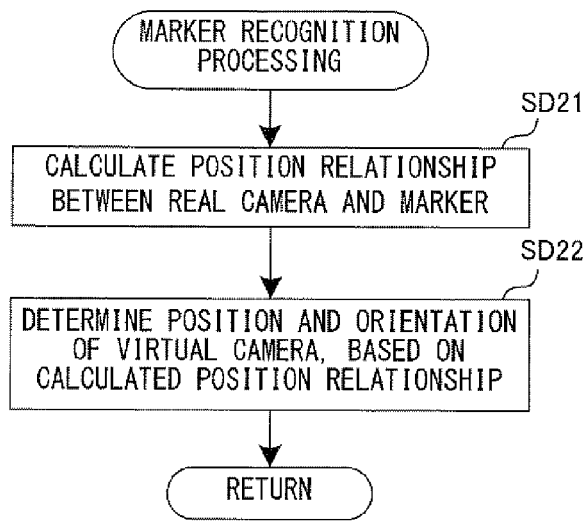
FIG. 88 is a flowchart showing the details of marker recognition processing (step SD3)

FIG. 88 is a flowchart showing the details of the marker recognition processing (step SD3).

In step SD21, the information processing section D31 calculates a position relationship between a real camera and a marker. Specifically, first, the information processing section D31 recognizes a marker included in the real image for a left eye D72L by a pattern matching method or the like. Then, the information processing section D31 calculates the position relationship between the outer imaging section (left) D23a, and the marker D61 present in the real space, based on the position, size, and shape of the marker in the real image for a left eye D72L, the direction of an arrow in the marker, and the like. Here, the position relationship between the outer imaging section (left) D23a and the marker D61 is the 3-dimensional position and the 3-dimensional orientation of one of the marker D61 and the outer imaging section (left) D23a relative to the other one.

Figure 90:
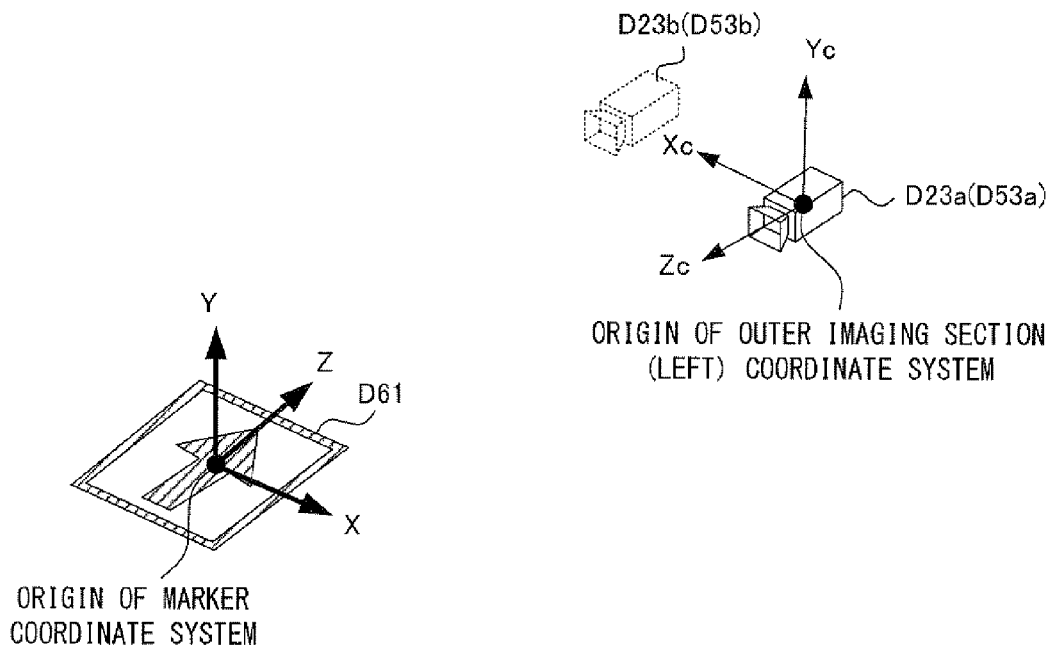

FIG. 90 shows the position relationship between the marker D61 and the outer imaging section (left) D23a. As shown in FIG. 90, the position relationship is the relative position and relative orientation of the outer imaging section (left) D23a with respect to the marker D61. In the same manner, the information processing section D31 calculates the position relationship between the outer imaging section (right) D23b, and the marker D61 present in the real space, by using the real image for a right eye D72R. Here, a matrix indicating the relative position and relative orientation of the outer imaging section (left) D23a with respect to the marker D61, and a matrix indicating the relative position and relative orientation of the outer imaging section (right) D23b with respect to the marker D61, are calculated.

More specifically, in step SD21, the marker coordinate system is set based on a result of the recognition of the marker, and the position relationship between the marker D61 and the outer imaging section (left) D23a are calculated (see FIG. 90). As shown in FIG. 90, the origin of the marker coordinate system is set at the center of the marker D61. In addition, the Z-axis of the marker coordinate system is set in parallel with the direction of the arrow of the marker D61 (that is, set in parallel with the longitudinal sides of the marker D61), and the X-axis of the marker coordinate system is set in the direction that is perpendicular and rightward with respect to the direction of the arrow (that is, set in parallel with the short sides of the marker D61). In addition, the Y-axis is set vertically and upward with respect to the marker D61 (that is, set upward in the normal direction of the rectangular marker D61). The marker coordinate system is a coordinate system for defining the virtual space, and associating the virtual space with the real space. That is, the origin of the marker coordinate system coincides with the origin of the virtual space, and also with the center of the marker D61 in the real space.

Then, a matrix indicating the relative position and relative orientation of the outer imaging section (left) D23a with respect to the marker D61 is calculated. As shown in FIG. 90, the matrix indicating the position and orientation of the outer imaging section (left) D23a is a coordinate transform matrix that transforms coordinates represented in the marker coordinate system in the virtual space, into coordinates represented in an outer imaging section (left) coordinate system based on the position and the orientation of the outer imaging section (left) D23a. In step SD21, the matrix indicating the position and orientation of the outer imaging section (left) D23a is calculated based on the marker in the real image for a left eye D72L, and a matrix indicating the position and orientation of the outer imaging section (right) D23b is calculated based on the marker in the real image for a right eye D72R.

It is noted that the outer imaging section (left) D23a and the outer imaging section (right) D23b are provided such that the shooting directions thereof are in parallel with each other and the outer imaging section (left) D23a and the outer imaging section (right) D23b do not rotate with respect to the shooting directions. That is, the orientation of the outer imaging section (left) D23a and the orientation of the outer imaging section (right) D23b always coincide with each other. In addition, the outer imaging section (left) D23a and the outer imaging section (right) D23b are provided being separated by a predetermined interval. Therefore, under the assumption that there is no error in the attachment of the outer imaging section (left) D23a and the outer imaging section (right) D23b, if, for example, the position and the orientation of the outer imaging section (left) D23a is calculated based on the real image for a left eye D72L, it is possible to calculate the position and the orientation of the outer imaging section (right) D23b without using the real image for a right eye D72R. In addition, in order to consider error in the attachment of the outer imaging section (left) D23a and the outer imaging section (right) D23b, the position and the orientation of the outer imaging section (left) D23a may be calculated based on the real image for a left eye D72L, and the position and the orientation of the outer imaging section (right) D23b may be calculated based on the real image for a right eye D72R, thereby obtaining the error. For example, the positions and the like of the outer imaging section (left) D23a and the outer imaging section (right) D23b may be respectively calculated based on the real image for a left eye D72L and the real image for a right eye D72R during a certain time period, to calculate the error. Then, the position and the orientation of the outer imaging section (left) D23a may be calculated by using the real image for a left eye D72L (or the real image for a right eye D72R), and the position and the orientation of the outer imaging section (right) D23b may be calculated based on the calculated error, and the calculated position and orientation of the outer imaging section (left) D23a. After step SD21, the information processing section D31 executes processing of step SD22.

In step SD22, the information processing section D31 determines the positions and the orientations of the left virtual camera and the right virtual camera. Here, the positions and the orientations of the left virtual camera and the right virtual camera coincide with the respective positions and orientations of the outer imaging section D23. That is, the position and the orientation of the left virtual camera D53a in the virtual space are set so as to coincide with the position and the orientation of the outer imaging section (left) D23a (see FIG. 90). The position and the orientation of the right virtual camera D53b in the virtual space are set so as to coincide with the position and the orientation of the outer imaging section (right) D23b. Specifically, the position and the orientation of the left virtual camera D53a are represented by a matrix (left view matrix). A matrix indicating the position and the orientation of the outer imaging section (left) D23a calculated in step SD21 is stored as the left virtual camera information D75L, in the RAM. Similarly, the position and the orientation of the right virtual camera D53b are represented by a matrix (right view matrix). A matrix indicating the position and the orientation of the outer imaging section (right) D23b calculated in step SD21 is stored as the right virtual camera information D75R, in the RAM. It is noted that since the orientation of the outer imaging section (left) D23a, and the orientation of the outer imaging section (right) D23b always coincide with each other as described above, the orientation of the left virtual camera D53a, and the orientation of the right virtual camera D53b also coincide with each other. After step SD22, the information processing section D31 ends the marker recognition processing.

With reference to FIG. 87, the information processing section D31 executes processing of step SD4, after step SD3.

In step SD4, the information processing section D31 sets the fish object D52 in the virtual space. Specifically, the information processing section D31 places the fish object D52 so as to be away from the virtual model D55 in the negative direction of the Y-axis. It is noted that the fish object D52 moves in the virtual space in accordance with a predetermined regularity. Next, the information processing section D31 executes processing of step SD5.

Figure 92:
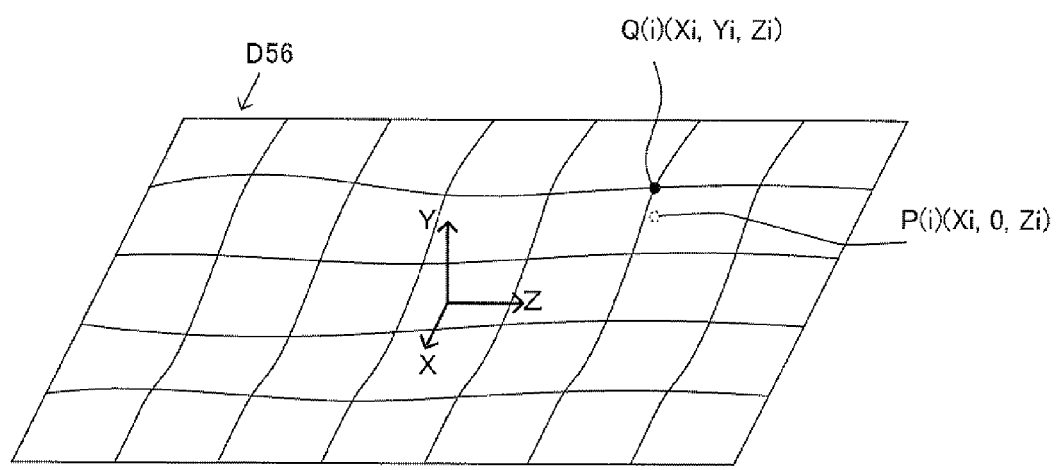
FIG. 92 shows a deformation object D56.

In step SD5, the information processing section D31 deforms a deformation object. FIG. 92 shows the deformation object D56. The deformation object D56 is an object into which the virtual model D55 is deformed. As shown in FIG. 92, the deformation object D56 is generated when each of the points P of the virtual model D55 is moved in the upward or downward direction (positive or negative direction of the Y-axis) of the marker coordinate system. Specifically, the information processing section D31 moves the vertices Q(i) (i=1 to n) of the deformation object D56 in the upward or downward direction in accordance with a predetermined pattern. For example, the information processing section D31 determines a movement vector indicating the direction (positive or negative direction of the Y-axis) and the distance of a movement of each of the vertices Q, in accordance with the distance from a predetermined point to the vertex Q in the marker coordinate system. Then, the information processing section D31 adds the determined movement vectors to the respective current vertices Q, to move the vertices Q (update the coordinate values of the vertices Q and store the updated values in the RAM).

It is noted that in step SD5, the information processing section D31 moves only points of the deformation object D56 other than points on its end portions. That is, the coordinates of vertices present at the boundary (circumference) of the deformation object D56 shown in FIG. 92 do not change. On the contrary, if the boundary of the deformation object D56 is deformed and the resultant deformation object D56 is shot by a virtual camera in step SD7 or SD8 described later, an image obtained by superimposing the image shot by the virtual camera onto a real image with each other can be unnatural because the consistency at the boundary is not maintained. Specifically, if the boundary of the deformation object D56 is greatly deformed, the image is discontinuous at the boundary because an area outside and in the vicinity of the boundary of the deformation object D56 is not deformed while the boundary of the deformation object D56 is deformed, whereby the image provides a feeling of strangeness. However, in the present embodiment, since the boundary of the deformation object D56 is not deformed, the image is natural even at the boundary.

Next, the information processing section D31 executes processing of step SD6.

In step SD6, the information processing section D31 calculates the normal of each of the vertices Q. Here, the information processing section D31 calculates the normal vectors N(i) of the vertices Q(i) updated in step SD5, and stores the normal vectors N(i) in the RAM. Next, the information processing section D31 executes processing of step SD7.

In step SD7, the information processing section D31 executes left virtual camera image generation processing.

The details of the left virtual camera image generation processing of step SD7 will be described with reference to FIG. 89.

Figure 89:
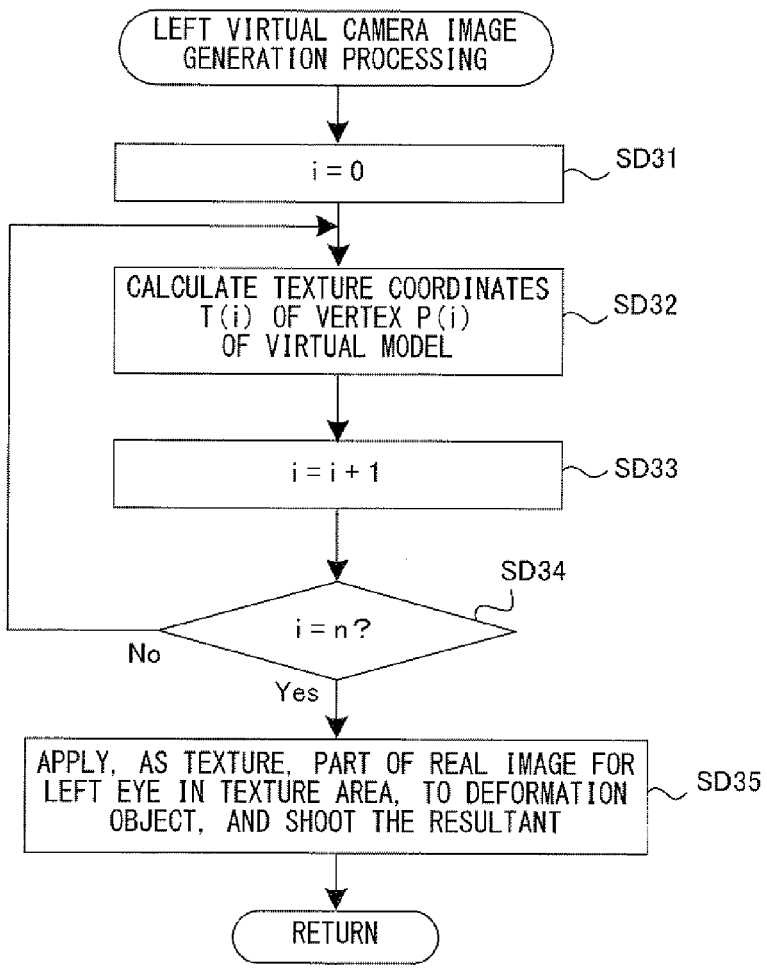
FIG. 89 is a flowchart showing the details of left virtual camera image generation processing (step SD7)

FIG. 89 is a flowchart showing the details of the left virtual camera image generation processing (step SD7).

First, in step SD31, the information processing section D31 sets the variable i at 0 and stores the variable in the RAM. Next, the information processing section D31 executes processing of step SD32.

In step SD32, the information processing section D31 calculates texture coordinates T(i) of the vertex P(i) of the virtual model D55. Here, the position (T(i)), in the real image for a left eye D72L, of the vertex P(i) (in the marker coordinate system) of the virtual model D55 which is placed in the virtual space is calculated.

Figure 93:
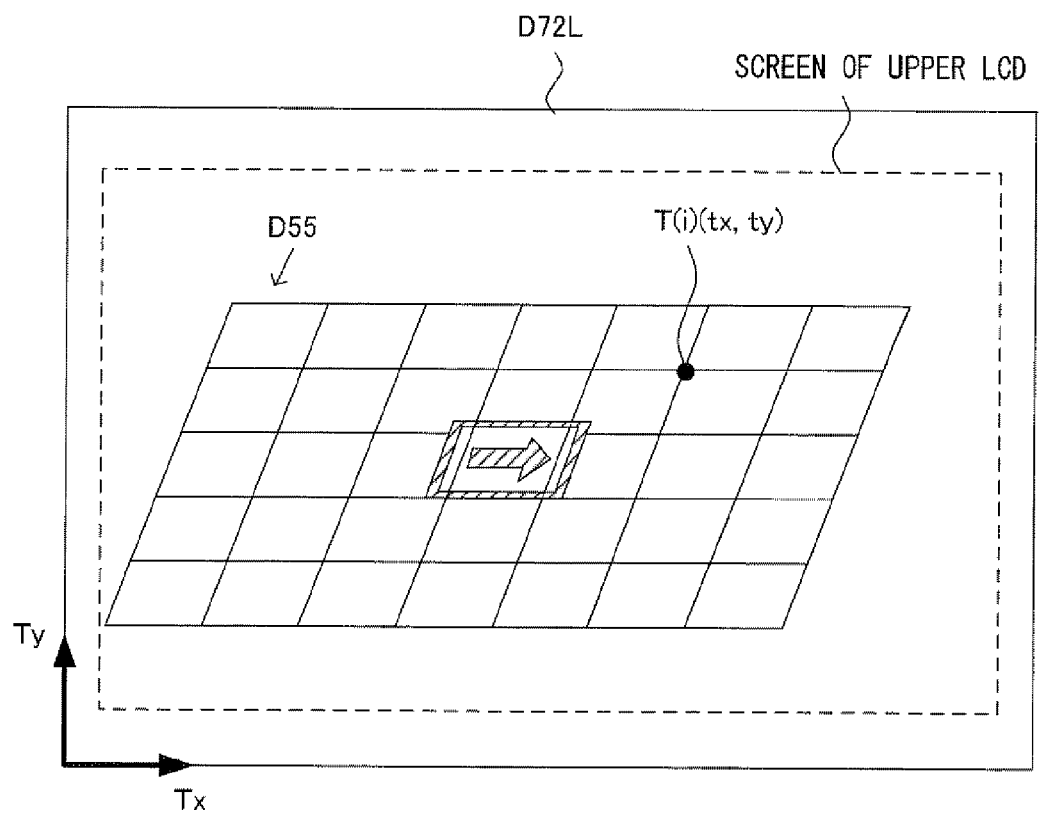
FIG. 93 shows texture coordinates T(i) of a vertex P(i)

FIG. 93 shows the texture coordinates T(i) of the vertex P(i). As shown in FIG. 93, the texture coordinates T(i) indicates a position in the real image for a left eye D72L. Specifically, the information processing section D31 multiplies the vertex P(i) of the virtual model D55 represented in the marker coordinate system, by the left view matrix for the left virtual camera D53a (a matrix calculated in step SD3, the left virtual camera information D75L), and by a projection matrix, thereby obtaining coordinates on the display of the upper LCD D22 (coordinates in a coordinate system whose origin is the lower left end of the screen of the upper LCD D22). Then, the information processing section D31 performs predetermined transform processing for the coordinates on the display, thereby calculating the coordinates T(i) (position in a coordinate system whose origin is the lower left end of the real image for a left eye D72L) in the real image for a left eye D72L. As shown in FIG. 93, the size of the real image for a left eye D72L is larger than that of the upper LCD D22. Therefore, the texture coordinates T are obtained by transforming the coordinates on the display into coordinates in the real image for a left eye D72L (Tx-Ty coordinate system). Next, the information processing section D31 executes processing of step SD33.

In step SD33, the information processing section D31 increments the variable i, Next, the information processing section D31 executes processing of step SD34.

In step SD34, the information processing section D31 determines whether or not i is equal to n. If the result of the determination is positive, the information processing section D31 executes processing of step SD35. If the result of the determination is negative, the information processing section D31 executes the processing of step SD32 again. The texture coordinates T of all the vertices P of the virtual model D55 are obtained by the processing from steps SD32 to SD34 being repeatedly executed.

In step SD35, the information processing section D31 applies, as a texture, to the deformation object D56, a part of the real image for a left eye D72L in an area corresponding to each set of the texture coordinates, and then shoots the resultant by the left virtual camera. Specifically, the information processing section D31 sets the respective sets of texture coordinates T(i) for the vertices Q(i) of the deformation object D56, maps textures thereto, and shoots the resultant by the left virtual camera D53a. Then, the information processing section D31 stores the shot image as the left virtual camera image D76L, in the RAM. The processing in step SD35 corresponds to processing of cutting an image included in a left texture area corresponding to each set of the texture coordinates T calculated in the processing from steps SD32 to SD34, from the real image for a left eye D72L, and applying the image to the deformation object D56. Hereinafter, the outline of the processing of step SD35 will be described with reference to FIG. 94 and FIG. 95.

Figure 94:
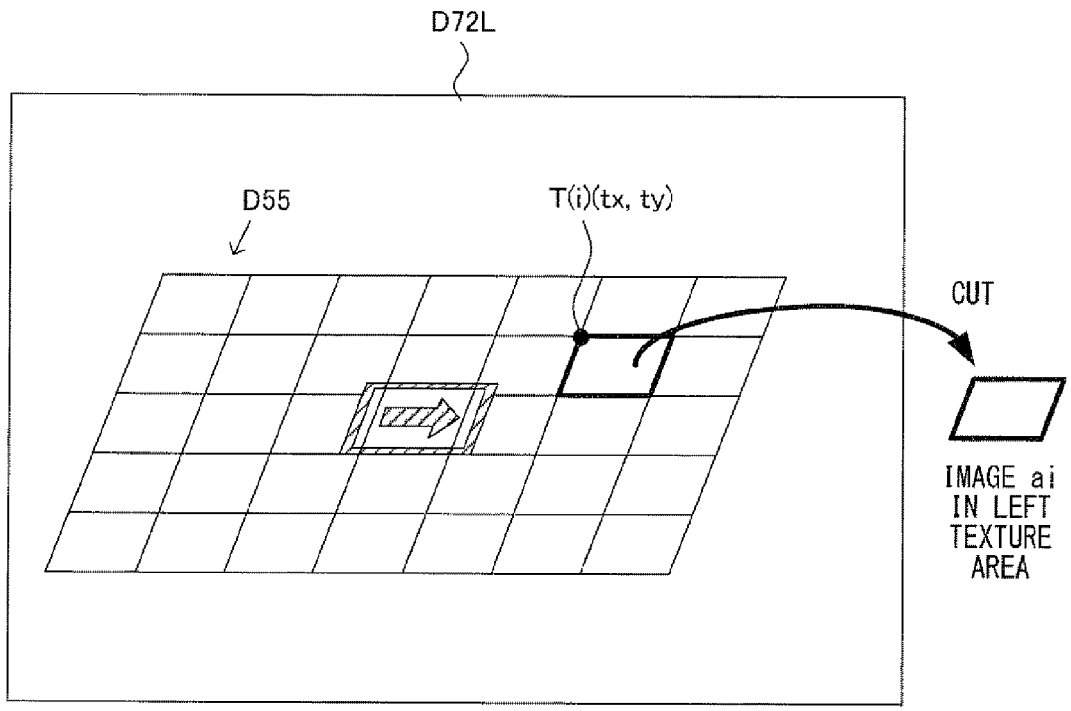
FIG. 94 is a diagram conceptually illustrating processing of step SD35, and shows cutting of an image in a left texture area from a real image for a left eye D72L.

FIG. 94 is a diagram conceptually illustrating the processing of step SD35, and shows cutting of an image in a left texture area from the real image for a left eye D72L. As shown in FIG. 94, an image ai (parallelogram image including the texture coordinates T(i)) in a left texture area corresponding to the texture coordinates T(i) is cut (copied) from the real image for a left eye D72L. Next, the cut image is applied to the deformation object D56.

Figure 95:
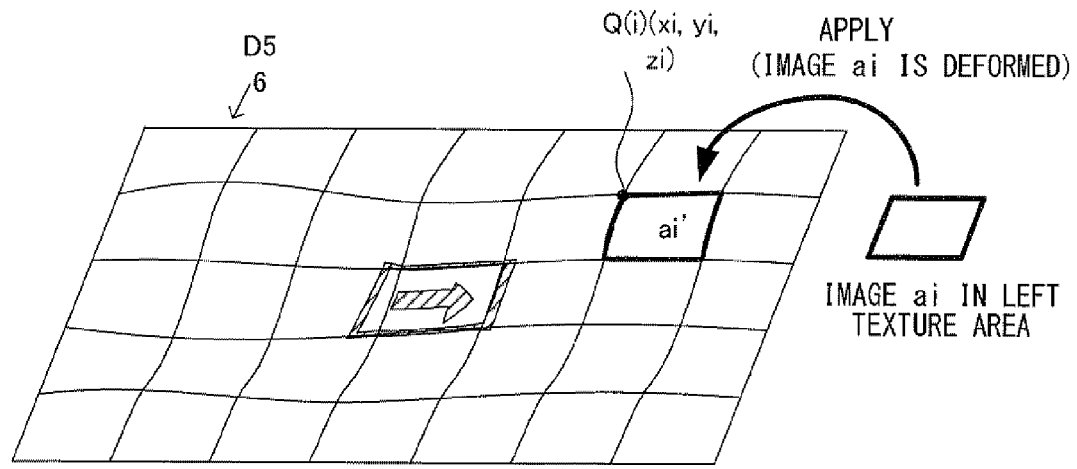
FIG. 95 is a diagram conceptually illustrating the processing of step SD35, and shows application of a cut image ai in the left texture area shown in FIG. 94 to the deformation object D56.

FIG. 95 is a diagram conceptually illustrating the processing of step SD35, and shows application of the cut image ai in the left texture area shown in FIG. 94 to the deformation object D56. As shown in FIG. 95, when the cut image ai in the left texture area has been applied as a texture to the deformation object D56, and then the resultant has been shot by the left virtual camera D53a, the image ai is deformed (image ai'). In this manner, cut images in the respective left texture areas are applied to the deformation object D56.

The left virtual camera image D76L generated in step SD35 is an image obtained by deforming a part of the real image for a left eye D72L in an area corresponding to the virtual model D55 (a part, in an area corresponding to the position and the contour of the virtual model D55, of a rendered image of the virtual model D55 shot by the left virtual camera D53a). As described above, the virtual model D55 is placed on the XZ-plane in the marker coordinate system (on the plane (table) in the real space on which the marker D61 is placed). Therefore, the left virtual camera image D76L includes the XZ-plane (plane in the real space) that has been deformed.

It is noted that in step SD35, a shadow is applied in accordance with the shape of the deformation object D56. As described above, in step SD6, the normal vectors of the vertices Q of the deformation object D56 have been calculated. Therefore, a shadow to be generated when the deformation object D56 is illuminated by a virtual light source can be calculated. In addition, in step SD35, the fish object D52 is also shot by the left virtual camera D53a. Therefore, the left virtual camera image D76L also includes an image of the fish object D52.

After generating the left virtual camera image D76L as described above, the information processing section D31 ends the left virtual camera image generation processing.

With reference to FIG. 87, next, the information processing section D31 executes processing of step SD8. In step SD8, the information processing section D31 executes right virtual camera image generation processing. In the right virtual camera image generation processing in step SD8, similarly to the processing of step SD7, an image in a texture area that is cut from the real image for a right eye D72R is applied as a texture to the deformation object D56, and the resultant is shot by the right virtual camera D53b.

In step SD8, first, the information processing section D31 calculates the texture coordinates T in the real image for a right eye D72R. More specifically, the information processing section D31 multiplies each of the vertices P of the virtual model D55 represented in the marker coordinate system, by the right view matrix for the right virtual camera D53b (a matrix calculated in step SD3, the right virtual camera information D75R), and by a projection matrix, thereby obtaining coordinates on the display of the upper LCD D22, and obtaining the texture coordinates in the real image for a right eye D72R. Then, the information processing section D31 sets the respective sets of texture coordinates for the vertices of the deformation object D56, maps textures thereto, and shoots the resultant by the right virtual camera D53b (an image in each of right texture areas is cut from the real image for a right eye D72R, and the image is applied to the deformation object D56). The information processing section D31 generates the right virtual camera image D76R in this manner, and stores the right virtual camera image D76R in the RAM. It is noted that as in step SD35, the fish object D52 is also shot by the right virtual camera D53b. Therefore, the right virtual camera image D76R also includes an image of the fish object D52.

Figure 96:
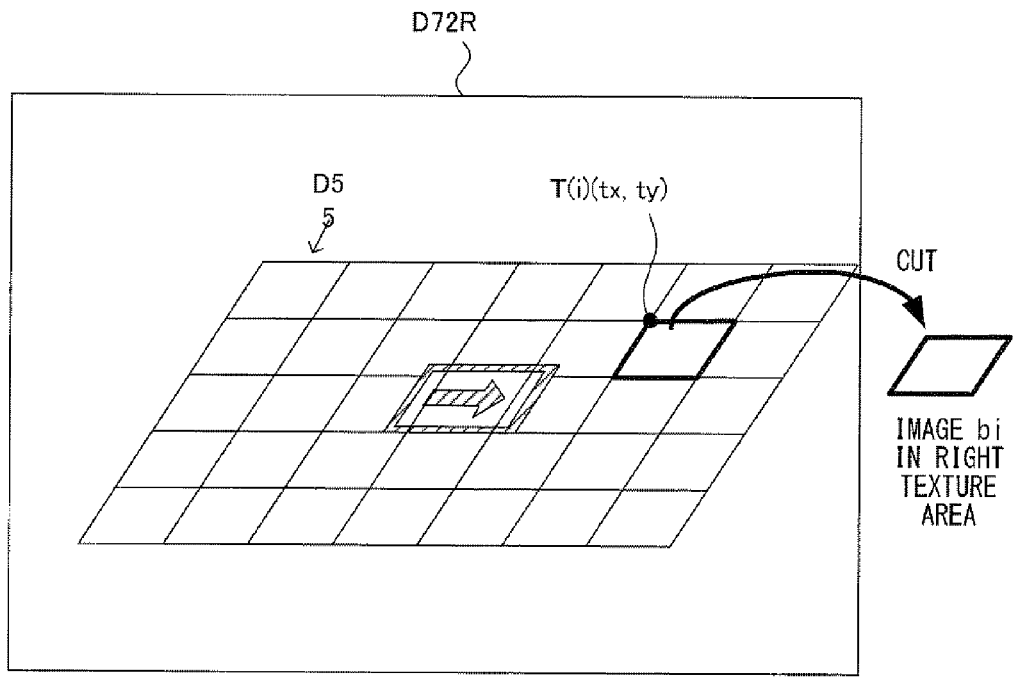
FIG. 96 shows cutting of an image in a right texture area from a real image for a right eye D72R.
Figure 97:
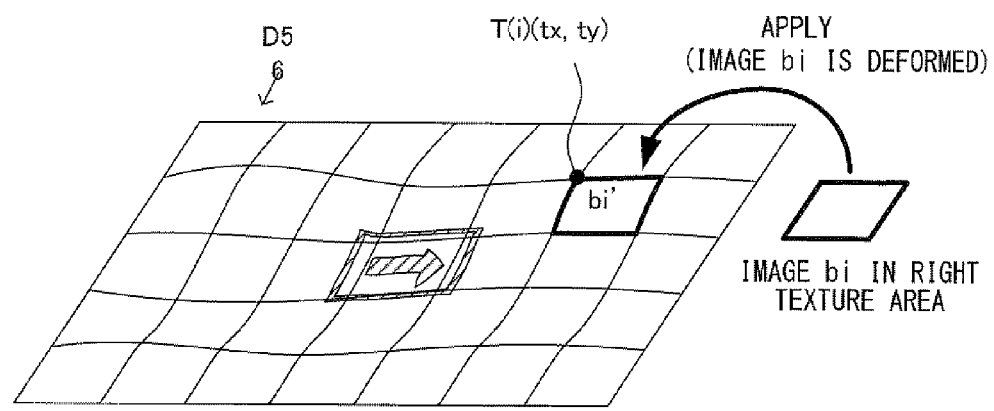
FIG. 97 shows application of a cut image bi in the right texture area shown in FIG. 96 to the deformation object D56.

FIG. 96 shows cutting of an image in a right texture area from the real image for a right eye D72R. Since there is a parallax between the real image for a right eye D72R and the real image for a left eye D72L, the real image for a right eye D72R and the real image for a left eye D72L are different from each other. As shown in FIG. 94 and FIG. 96, the position T(i) of each of the vertices P(i) of the virtual model in the real image for a right eye D72R is different from the position T(i) of the corresponding vertex P(i) in the real image for a left eye D72L. Therefore, an image bi in a right texture area cut from the real image for a right eye D72R has a shape different from the shape of an image ai in a left texture area cut from the real image for a left eye D72L. For example, the shape of the image bi in a right texture area is distorted more greatly than the shape of the image ai in a left texture area (in comparison of the image ai shown in FIG. 94 and the image bi shown in FIG. 96, the shape of the image ai is closer to a square than the shape of the image bi). Images in the respective right texture areas cut from the real image for a right eye D72R are applied as textures to the deformation object D56, and the resultant is shot by the right virtual camera D53b. Thus, the images in the respective right texture areas are deformed as in the images in the respective left texture areas. FIG. 97 shows application of the cut image bi in the right texture area shown in FIG. 96 to the deformation object D56. As shown in FIG. 97, when the cut image bi in the right texture area has been applied as a texture to the deformation object D56, and then the resultant has been shot by the right virtual camera D53b, the image bi is deformed (image bi'). In this manner, cut images in the respective right texture areas cut from the real image for a right eye D72R are applied to the deformation object D56.

The right virtual camera image D76R generated in step SD8 includes the XZ-plane (plane in the real space) that has been deformed, as in the left virtual camera image D76L generated in step SD7. The right virtual camera image D76R and the left virtual camera image D76L are different from each other, and there is a parallax therebetween.

After step SD8, the information processing section D31 executes processing of step SD9.

In step SD9, the information processing section D31 superimposes a virtual camera image onto a real image to generate a superimposed image. Specifically, the information processing section D31 superimposes the left virtual camera image D76L generated in step SD7 onto the real image for a left eye D72L obtained in step SD2 to generate a left superimposed image. In addition, the information processing section D31 superimposes the right virtual camera image D76R generated in step SD8 onto the real image for a right eye D72R obtained in step SD2 to generate a right superimposed image. Next, the information processing section D31 executes processing of step SD10.

In step SD10, the information processing section D31 executes output processing. By executing the output processing, images providing a stereoscopic view is displayed. Specifically, the information processing section D31 outputs two superimposed images generated in step SD9 to the upper LCD D22. The left superimposed image displayed on the upper LCD D22 is viewed by the left eye of the user via the parallax barrier, and the right superimposed image is viewed by the right eye of the user via the parallax barrier. As a result, the user can view a stereoscopic image. After step SD10, the information processing section D31 executes processing of step SD2 again.

Figure 98:
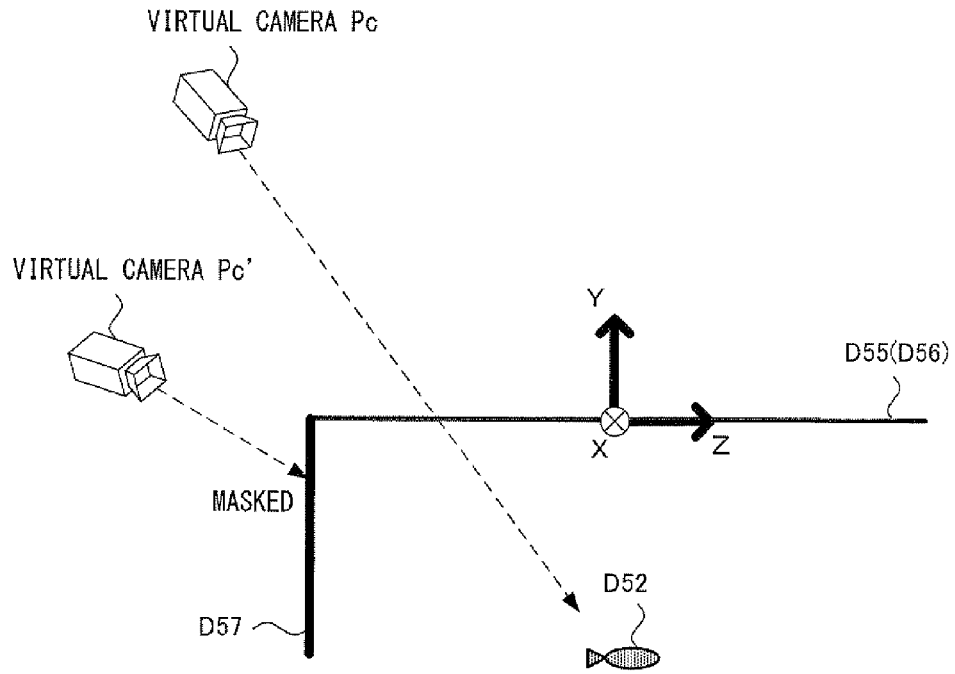
FIG. 98 shows the case where a fish object D52 is masked by a mask object D57.

It is noted that in steps SD7 and SD8, the fish object D52 might not be shot because the fish object D52 might be masked by the mask object D57 depending on the position or the orientation of a virtual camera. FIG. 98 shows the case where the fish object D52 is masked by the mask object D57, and shows the position relationship between the fish object D52 and a virtual camera when the virtual space is looked at from a direction parallel to the X-axis of the marker coordinate system. The mask object D57 is a virtual object, having a planar shape, that is set at an end portion of the virtual model D55 (deformation object D56). The mask object D57 hides the fish object D52, and is not displayed on the upper LCD D22. As shown in FIG. 98, when the fish object D52 is looked at from the position of a virtual camera Pc (left virtual camera or right virtual camera), the fish object D52 is not masked and is displayed on the upper LCD D22. However, when the fish object D52 is looked at from the position of a virtual camera Pc', the fish object D52 is masked by the mask object D57 and is not displayed on the upper LCD D22. If the mask object D57 is not provided at the end portion of the deformation object D56, when the fish object D52 is looked at from the position of the virtual camera Pc', the fish object D52 might be visible in the backward direction in an area where the plane in the real space is not deformed as the deformation object D56 (that is, an area where a wave does not occur), and as a result, a displayed image might provide a feeling of strangeness. In addition, in the real world, fish in water is not visible owing to reflection of light when the surface of water is looked at from a direction with a low angle (when the surface of water is looked at not from the vertical direction but from a direction almost horizontal). Therefore, the mask object D57 is provided at the end portion of the virtual model D55 (deformation object D56), thereby causing the fish object D52 to be invisible from the virtual camera Pc'. That is, if the deformation object D56 is not present between a virtual camera and the fish object D52 (the deformation object D56 is not present on a line connecting a virtual camera and the fish object D52), the fish object D52 is hidden.

As described above, in the present embodiment, the marker coordinate system is set on the marker D61. The virtual model D55, which has a planar shape, is placed on the XZ-plane (plane on which the marker D61 is placed) in the marker coordinate system, and an area, in the real image for a left eye D72L, that corresponds to the virtual model D55 is set as a left texture area (is cut as an image in a left texture area). Then, the image in the left texture area is applied as a texture to the deformation object D56 into which the virtual model D55 is deformed, and the resultant is shot by the left virtual camera, whereby the left virtual camera image is generated. In addition, an area, in the real image for a right eye D72R, that corresponds to the virtual model D55 is set as a right texture area (is cut as an image in a right texture area). Then, the image in the right texture area is applied as a texture to the deformation object D56 into which the virtual model D55 is deformed, and the resultant is shot by the right virtual camera, whereby the right virtual camera image is generated. As a result, an image including a plane in the real space that has been deformed can be generated, and a scene in which the plane in the real space on which the marker D61 is placed heaves can be displayed as described above.

In addition, in the present embodiment, the marker coordinate system is set on the marker D61 placed in the real space, and a virtual camera is set in accordance with the position and the orientation of a real camera. As a result, it is possible to provide a feeling (augmented reality) that an object present in a virtual space were present in the real space.

In addition, in the present embodiment, texture areas are respectively set for the real image for a left eye D72L and the real image for a right eye D72R (texture images are cut therefrom), to generate the left virtual camera image and the right virtual camera image. Therefore, an image having a high resolution is obtained in comparison with the case where the left virtual camera image and the right virtual camera image are generated from one of the real images. That is, for example, if an image in a left texture area is cut from the real image for a left eye D72L and the right virtual camera image is generated by using the cut image in the left texture area, the image in the left texture area needs to be greatly deformed because there is a parallax between the real image for a left eye D72L and the real image for a right eye D72R. As a result, a large amount of pixel information is lost.

Figure 99:
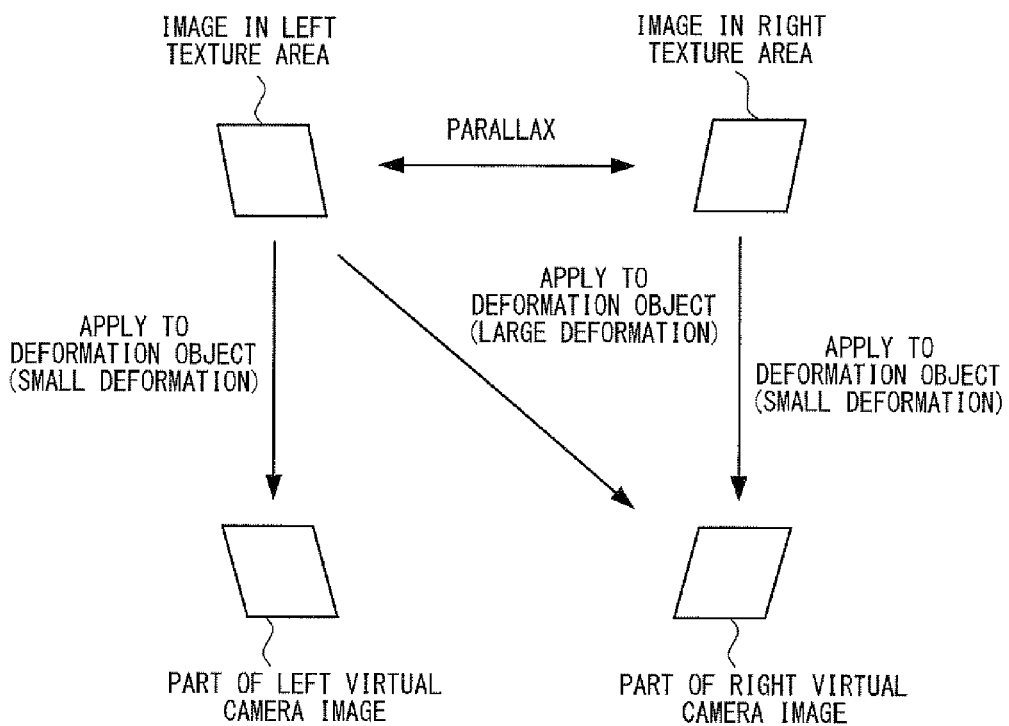
FIG. 99 is a diagram illustrating pixel information being lost when a right virtual camera image is generated by using the image in the left texture area.

FIG. 99 is a diagram illustrating pixel information being lost when the right virtual camera image is generated by using the image in the left texture area. As shown in FIG. 99, when the image in the left texture area is deformed to generate the left virtual camera image, the degree of the deformation of the image in the left texture area is relatively small. In addition, similarly, when the image in the right texture area is deformed to generate the right virtual camera image, the degree of the deformation of the image in the left texture area is relatively small. However, when the image in the left texture area is deformed to generate the right virtual camera image, the image in the left texture area needs to be greatly deformed. If an image is expanded or contracted to be deformed, the resolution of the image is reduced. However, in the present embodiment, texture images are respectively cut from the real image for a left eye D72L and the real image for a right eye D72R. Therefore, it is possible to prevent the resolution from being lowered.

In addition, in the present embodiment, an end portion (boundary) of the deformation object D56 is not deformed. Therefore, when a virtual camera image is superimposed onto a real image, an image whose boundary does not provide a feeling of strangeness is obtained. That is, if the boundary of the deformation object D56 is deformed, when an image shot by a virtual camera is superimposed onto a real image, the resultant image might be discontinuous at the boundary, whereby the image provides a feeling of strangeness. In addition, for example, if a virtual model image obtained by applying textures of the real image to the virtual model D55 which is not deformed is superimposed onto a real image, the overlapped areas coincide with each other. Therefore, a certain area (area corresponding to the virtual model) of the real image is completely hidden by the virtual model image, and the resultant image does not provide a feeling of strangeness. However, if, in deformation of the virtual model D55 into the deformation object D56, the boundary of the deformation object D56 is also deformed, when a deformation object image obtained by shooting the deformation object D56 is superimposed onto a real image, an area that is not hidden by the deformation object image occurs in the real image. Therefore, in some cases (for example, the case where the deformed object becomes smaller than the virtual model as a result of the deformation), the same two areas might be present in an image obtained by superimposing the deformation object image onto the real image and, whereby the image becomes unnatural. However, in the present embodiment, since the boundary of the deformation object D56 is not deformed, such an area that is not hidden by a deformation object does not occur. Therefore, it does not happen that the same two areas are doubly displayed, and a natural image is obtained.

In addition, when a deformed object is shot by the left virtual camera, a real image for a left eye is applied as textures, and when a deformed object is shot by the right virtual camera, a real image for a right eye is applied as textures, whereby continuity at the boundary can be better maintained. That is, for example, if textures cut from a real image for a left eye are applied to a deformed object, and a right virtual camera image obtained by shooting the resultant deformed object by a right virtual camera is superimposed onto the real image for a right eye, mismatch can occur between the background part in the real image for a right eye and a portion corresponding to the deformed object, in some cases (for example, in the case where an area visible only from one of real cameras is present). Thus, if respective textures are generated by using one of real images, continuity at the boundary cannot be maintained. However, in the present embodiment, since textures are generated by using the respective real images, continuity at the boundary can be maintained.

(Variations)

It is noted that in the present embodiment, a virtual model having a planar shape is placed on a plane on which the marker D61 is placed, and an image showing the plane heaving is displayed. In other embodiments, instead of a virtual model having a planar shape, a virtual model having a curved surface may be used (a 3-dimensional object may be used). For example, a virtual model may be placed so as to follow the shape of a 3-dimensional object (which may be a cup, the face of a person, or the like) present in the real space, and the virtual model may be deformed, to display a scene in which the 3-dimensional object in the real space is deformed. For example, the shape of a 3-dimensional object present in the real space may be recognized by using a camera capable of measuring a depth (distance in the forward direction of the camera) by infrared light or the like, a virtual model having the recognized shape may be set in a virtual space, and the 3-dimensional object may be deformed. Alternatively, based on a parallax between two images shot by the outer imaging section D23, a distance in the forward direction of a camera may be calculated. In addition, by using the above-described method, a scene in which a wall in the real space is deformed, or a scene in which a curtain swings may be displayed.

In addition, in other embodiments, by using the above-described method, a scene in which a part of the real space is deformed may be displayed, instead of a plane, a curved surface, or the like (for example, a table or the face of a person) in the real space.

In addition, in the present embodiment, a plane in the real space is deformed like the surface of water, using a fishing game as an example. However, the above-described processing can be applied to any types of games.

In addition, in the present embodiment, images (texture images) in texture areas cut respectively from left and right real images are applied to a deformed object into which a virtual model is deformed. In other embodiments, a virtual object may not be deformed. That is, in other embodiments, a left texture image obtained from a real image for a left eye may be applied as a texture to a virtual model and the resultant may be shot by a left virtual camera, and a right texture image obtained from a real image for a right eye may be applied as a texture to the virtual model and the resultant may be shot by a right virtual camera. In this way, by cutting texture images respectively from left and right real images, images shot by real cameras can be used as textures for a virtual model, and a stereoscopic image of the virtual model can be generated. By using a virtual model for display, it becomes possible to perform processing of changing the shooting direction of a virtual camera, or changing the color or the direction in writing. In this case, in the present embodiment, texture images are cut respectively from left and right images, and are applied as textures. Therefore, it is possible to prevent the resolution from being lowered. It is noted that the resolution is lowered if texture images are cut from one of the real images, the texture images are applied as textures, and the resultant is shot by both a left virtual camera and a right virtual camera.

In addition, in the present embodiment, the marker D61 is shot by the outer imaging section D23, and the position relationship (relative position and relative orientation) between the outer imaging section D23 and the marker D61 is calculated. Then, based on the calculated position relationship, a virtual space (marker coordinate system) is set. In other embodiments, an object other than the marker D61 may be recognized in a shot image, to calculate the position relationship. For example, a predetermined object present in the real space (for example, a chair or a table present in the real space) may be detected by image recognition such as pattern matching, to calculate the position relationship and define a virtual space. That is, in other embodiments, a particular object (the marker or the predetermined object mentioned above) present in the real space may be recognized in a shot image, and the position relationship between the particular object and the outer imaging section D23 may be calculated. In addition, instead of recognition based on an image shot by a real camera, the particular object may be recognized by another recognition means (for example, an ultrasonic sensor), to calculate the position relationship between the particular object and the outer imaging section D23.

In addition, in other embodiments, the position and the orientation of a real camera may be detected by a GPS, an acceleration sensor, an angular velocity sensor, a geomagnetic sensor, or the like. Then, the position and the orientation of a virtual camera in a virtual space may be set based on the detected position and orientation, and an image obtained by shooting the virtual space by a virtual camera may be superimposed onto an image shot by the real camera. For example, a virtual object may be placed at a predetermined position, in a virtual space corresponding to the real space, and a position, in the real space, that corresponds to the predetermined position in the virtual space may be shot by a real camera from a predetermined direction. In this case, the position and the orientation of the real camera can be detected by a GPS or orientation detection means (an acceleration sensor, an angular velocity sensor, a geomagnetic sensor, or the like), and a virtual camera can be set in the virtual space such that the position and the orientation of the virtual camera coincide with the position and the orientation of the real camera.

In addition, in the present embodiment, augmented reality is realized by using a video see-through method. That is, in the present embodiment, an image shot by a virtual camera (left or right virtual camera) is superimposed onto an image shot by the outer imaging section D23, to generate a superimposed image, and the superimposed image is displayed on the upper LCD D22. In other embodiments, augmented reality may be realized by using a optical see-through method. For example, the user may wear a head-mounted display having a camera for detecting a marker placed in the real space, and the user may view the real space via a display section which corresponds to lenses of glasses. The display section is formed of a material allowing the real world to be directly guided into the eyes of the user. Moreover, an image of a virtual object generated by a computer can be displayed in the display section.

In addition, in other embodiments, the method of shooting processing described above may be applied to any electronic device such as a PDA (Personal Digital Assistant), a high-tech mobile telephone, or a camera (camera apparatus), instead of a game apparatus.

In the present embodiment, an LCD capable of displaying an image that is stereoscopically visible by naked eyes is used as a display apparatus. In other embodiments, the present invention is also applicable to a stereoscopic display using glasses based on a time sharing system, a polarizing filter method, an anaglyph method (red and blue glasses method), or the like.

In addition, in other embodiments, the display processing method described above may be realized by a display processing system in which processing is shared by a plurality of information processing apparatuses which are connected, for example, by wire or wirelessly, in a communicable manner. For example, the outer imaging section D23 and the information processing apparatus may be separately provided, and the outer imaging section D23 may be connected to the information processing apparatus, wirelessly or by another means. The information processing apparatus and the display apparatus may be separately provided, and may be connected to each other. The position and the orientation of the outer imaging section D23 may be detected by detection means provided separately from the information processing apparatus, and a result of the detection may be transmitted to the information processing apparatus.

In addition, in the present embodiment, the information processing section D31 of the game apparatus D10 executes a predetermined program, to execute processing of the flowchart. In other embodiments, a part or all of the above steps of processing may be executed by a dedicated circuit included in the game apparatus D10.

In addition, the above game program (information processing program) may be stored in a computer-readable storage medium such as an optical disc or a magnetic disc, instead of the memory mentioned above, and then may be supplied to the game apparatus D10. In addition, for example, the program may be stored in a RAM in a server in a network, and the program may be supplied to the game apparatus D10 by the game apparatus D10 being connected to the network.

(Configuration of Game Apparatus)

Figure 100:
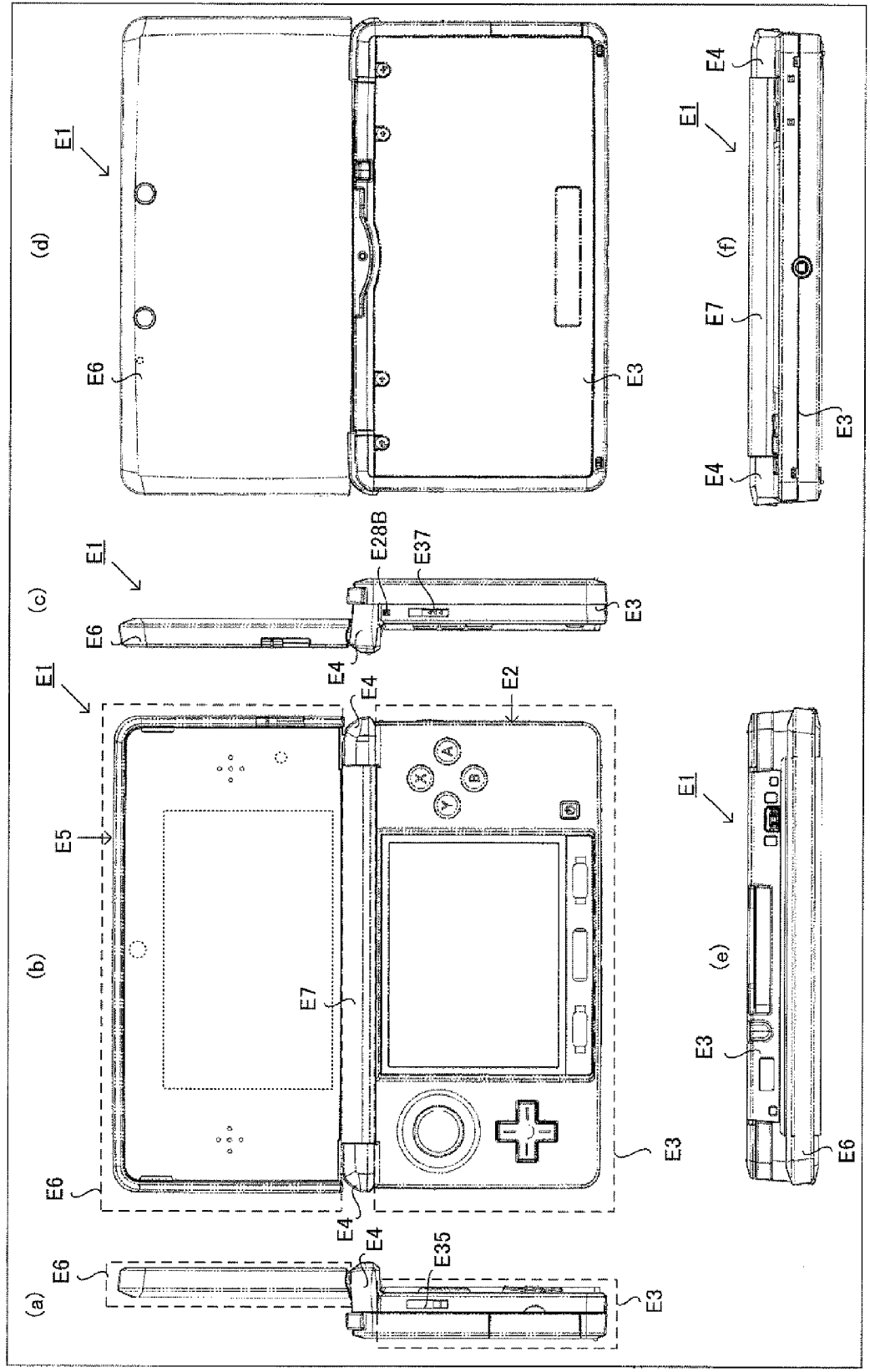
FIG. 100 shows a left side view, a front view, a right side view, a back view, a top view, and a bottom view of a game apparatus E1 in an open state.
Figure 101:
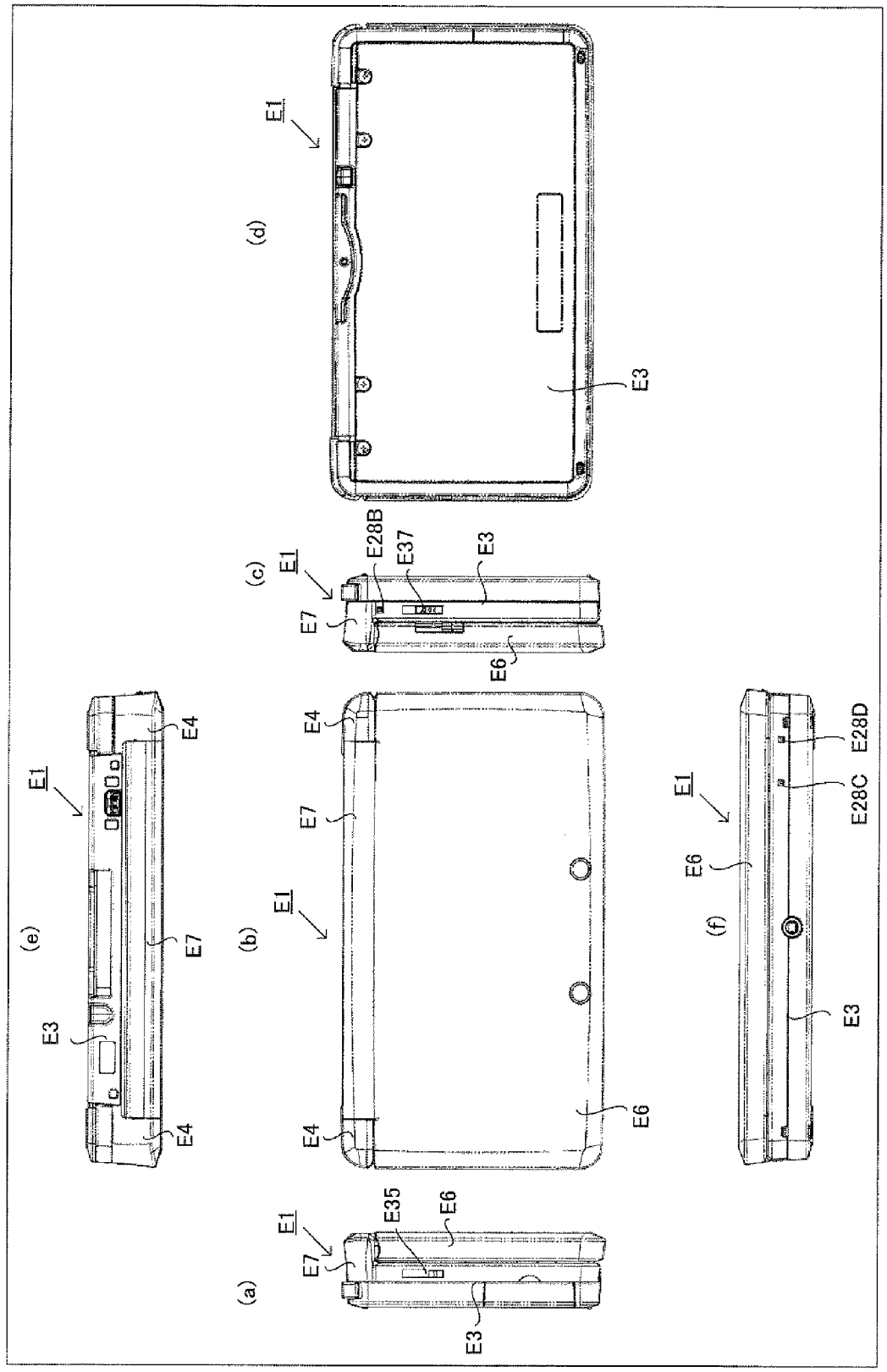
FIG. 101 shows a left side view, a front view, a right side view, a back view, a top view, and a bottom view of the game apparatus E1 in a closed state.

Hereinafter, a game apparatus according to one embodiment of the present invention will be described. FIG. 100 and FIG. 101 are diagrams, each illustrating an external view of the game apparatus E1. The game apparatus E1 is a hand-held game apparatus and is foldably configured as shown in FIG. 100 and FIG. 101. The game apparatus E1 is operable to shoot an image by means of a camera, to display the shot image on a screen, and to store data of the shot image. In addition, the game apparatus E1 is operable to execute a game program stored in an exchangeable memory card or a game program received from a server or from other game apparatus and to display an image generated by computer graphics processing, such as an image shot by a virtual camera which is set in a virtual space.

FIG. 100(a) is a left side view of the game apparatus E1 in an open state; FIG. 100(b) is a front view of the game apparatus E1 in the open state; FIG. 100(c) is a right side view of the game apparatus E1 in the open state; FIG. 100(d) is a back view of the game apparatus E1 in the open state; FIG. 100(e) is a top view of the game apparatus E1 in the open state; and FIG. 100(f) is a bottom view of the game apparatus E1 in the open state. FIG. 101(a) is a left side view of the game apparatus E1 in a closed state; FIG. 101(b) is a front view of the game apparatus E1 in the closed state; FIG. 101(c) is a right side view of the game apparatus E1 in the closed state; FIG. 101(d) is a back view of the game apparatus E1 in the closed state; FIG. 101(e) is a top view of the game apparatus E1 in the closed state; and FIG. 101(f) is a bottom view of the game apparatus E1 in the closed state.

As shown in FIG. 100 and FIG. 101, the game apparatus E1 has a lower housing E2 and an upper housing E5. The lower housing E2 and the upper housing E5 are connected in an openable and closable (foldable) manner. In the present embodiment, each of the lower housing E2 and the upper housing E5 is of a shape of a horizontally-long rectangular plate, and a long side portion of the lower housing E2 and a long side portion of the upper housing E5 are mutually connected in a pivotable manner.

Specifically, as shown in FIG. 100 and FIG. 101, the upper housing E5 has a substantially-rectangular-shaped first component E6 (a portion enclosed by a broken line) and a first connecting part E7 which protrudes from a central portion of a bottom surface of the first component E6 in a direction perpendicular to the bottom surface. The first component E6 can also be defined as a part of the upper housing E5, which is other than the first connecting part E7 (a part of the upper housing E5 in the open state, which is located above an upper edge of the first connecting part E7, as viewed from the front; or a part below a lower edge of the first connecting part E7 in the closed state). In addition, the lower housing E2 has a substantially-rectangular-shaped second component E3 (a portion enclosed by a broken line) and a second connecting part E4 above the second component E3.

The second connecting part E4 has, at both ends, protrusion parts E4a protruding in a direction perpendicular to an inner surface (surface which comes to be located on an inner side when the upper housing E5 and the lower housing E2 are folded) of the second component E3 and a depression part E4b which receives the first connecting part E7 (refer to FIG. 102(b)). In other words, as shown in FIG. 102(b), the second connecting part E4 is a part which includes the protrusion parts E4a provided at the both ends and the depression part E4b and is a part of the lower housing E2, which is located above an upper edge of the substantially-rectangular-shaped second component E3. The first connecting part E7 of the upper housing E5 is received by the depression part E4b of the second connecting part E4 of the lower housing E2, and the first connecting part E7 of the upper housing E5 and the protrusion parts E4a of the second connecting part E4 of the lower housing E2 are connected by a hinge pin E59 (refer to FIG. 106 and FIG. 107), whereby the upper housing E5 and the lower housing E2 are foldably connected. When the upper housing E5 and the lower housing E2 are folded, the above-mentioned first component E6 of the upper housing E5 lie on top of the above-mentioned second component E3 of the lower housing E2.

On the other hand, the second component E3 is a part of the lower housing E2, which is located below lower edges of the protrusion parts E4a of the lower housing E2, as viewed from the front. The protrusion parts E4a of the lower housing E2 and a protrusion (first connecting part E7) of the upper housing E5 are joined and constitute a connecting part for folding the hand-held game apparatus E1. More specifically, the lower edges of the protrusion parts E4a of the lower housing E2 and a lower edge of the protrusion of the upper housing E5 are joined so as to coincide with each other. Therefore, in other words, the first component E6 is a part of the upper housing E5, which is located above the connecting part in the open state (a part, which is located therebelow in the closed state), and the second component E3 is a part of the lower housing E2, which is located below the connecting part.

The lower housing E2 is held by one or both of a user's hands. The game apparatus E1 is held by a user such that inner surfaces of the lower housing E2 and the upper housing E5, which are located thereinside when the lower housing E2 and the upper housing E5 are folded, are located in the front; and the lower housing E2 is located on a lower side and the upper housing E5 is located on an upper side. In other words, when used by a user, the game apparatus E1 is set in the open state (FIG. 100) and is held such that the inner surfaces of the lower housing E2 and the upper housing E5 are located in the front; and the lower housing E2 is located on the lower side and the upper housing E5 is located on the upper side (refer to FIG. 120).

(Description of Lower Housing)

Figure 102:
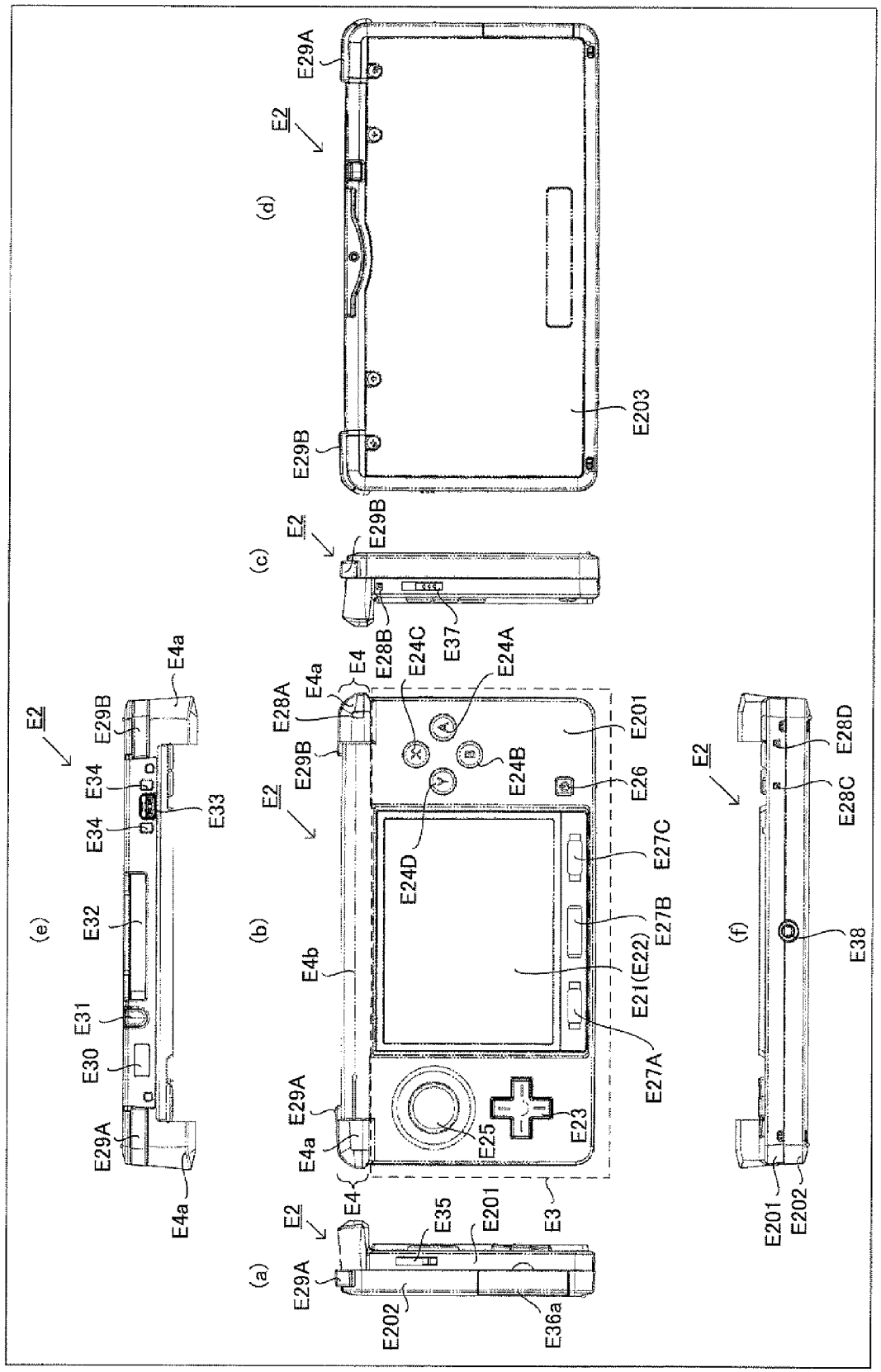
FIG. 102 shows a left side view, a front view, a right side view, a back view, a top view, and a bottom view of a lower housing E2.
Figure 103:
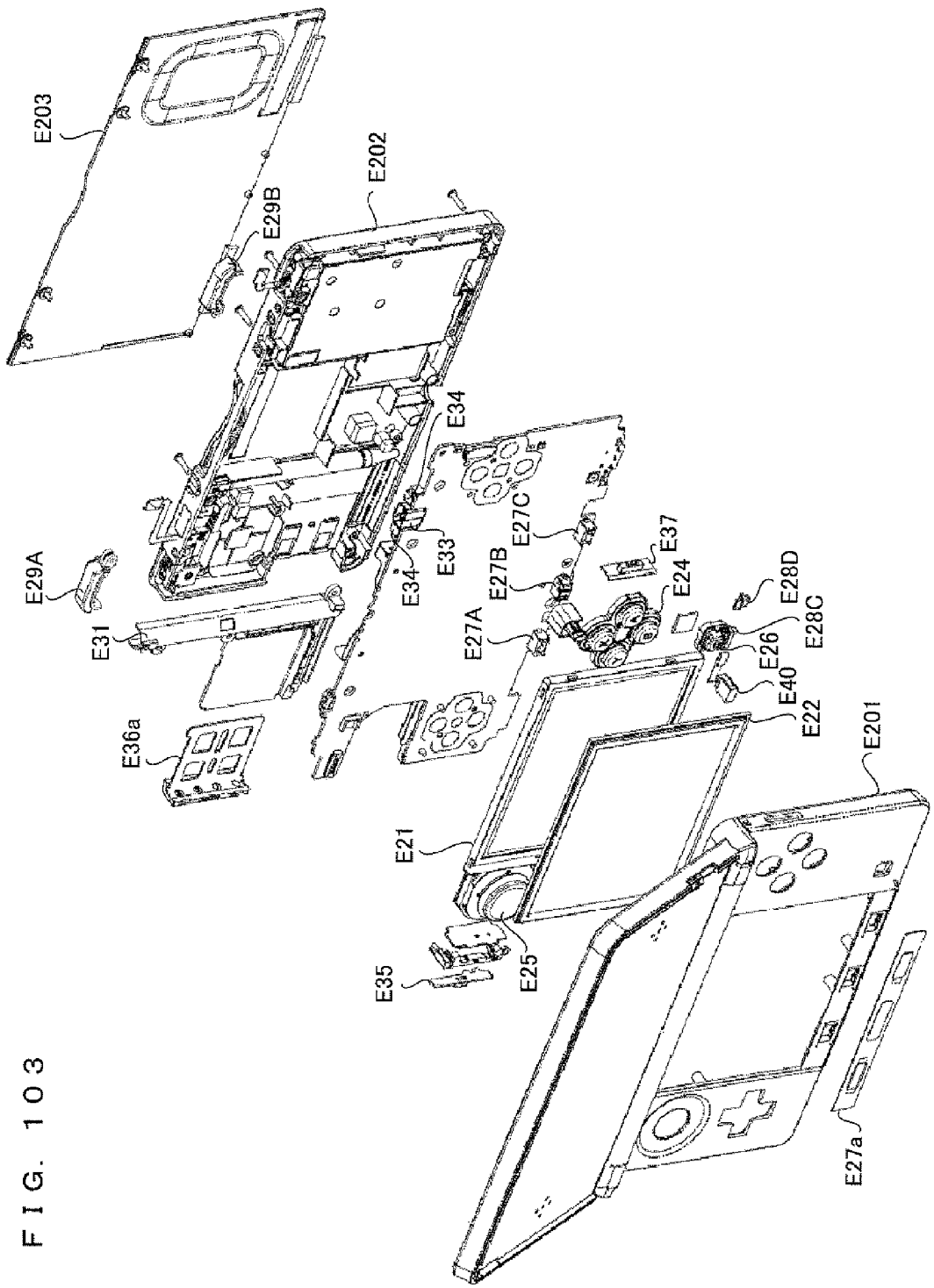
FIG. 103 shows an exploded perspective view of the lower housing E2, as viewed from the front.
Figure 104:
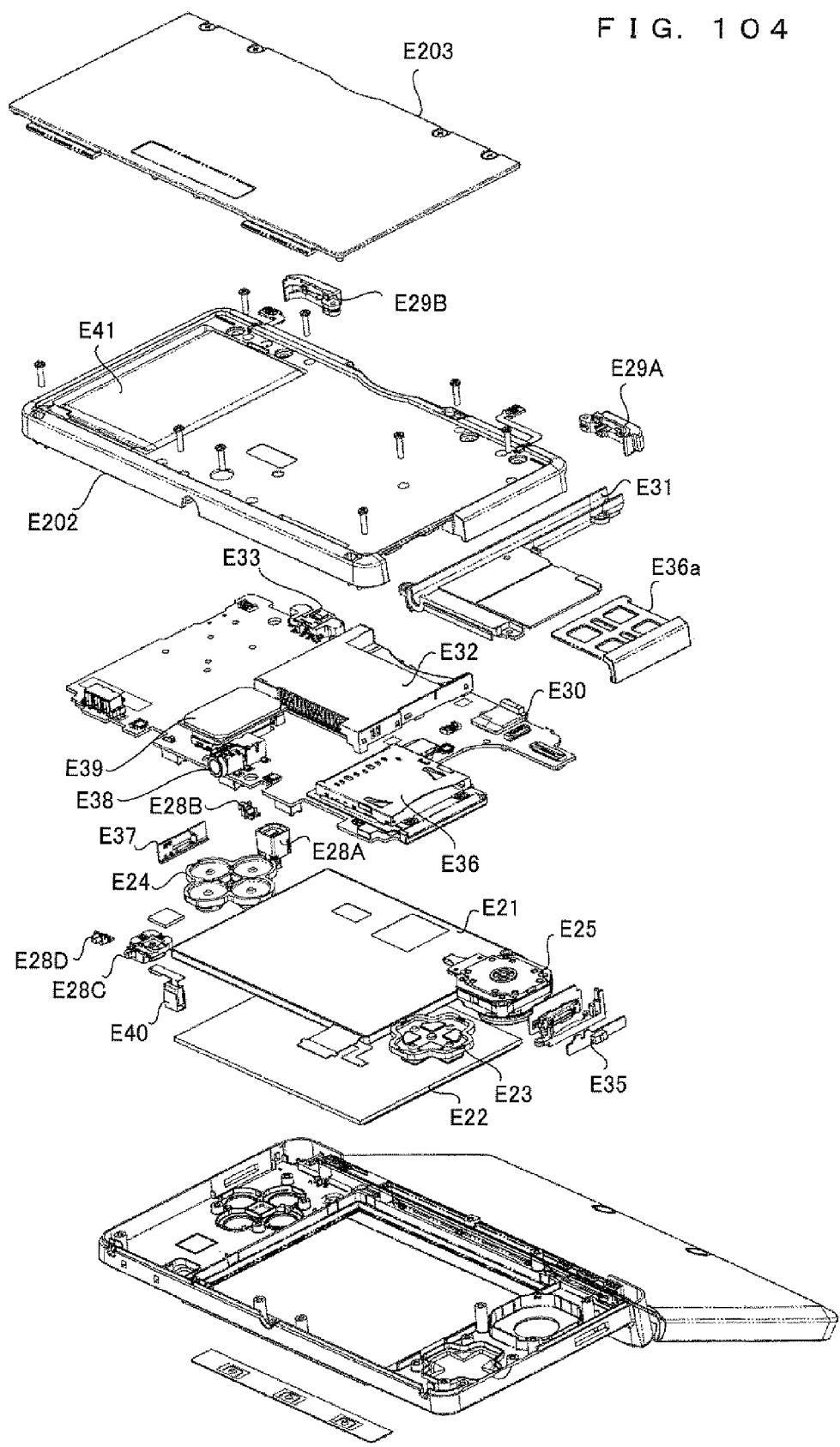
FIG. 104 shows an exploded perspective view of the lower housing E2, as viewed from the back.

First, with reference to FIG. 102 through FIG. 104, the lower housing E2 will be described. FIG. 102(a) is a left side view of the lower housing E2; FIG. 102(b) is a front view of the lower housing E2; FIG. 102(c) is a right side view of the lower housing E2; FIG. 102(d) is a back view of the lower housing E2; FIG. 102(e) is a top view of the lower housing E2; and FIG. 102(f) is a bottom view of the lower housing E2. In addition, FIG. 103 is an exploded perspective view of the lower housing E2, as viewed from the front. FIG. 104 is an exploded perspective view of the lower housing E2, as viewed from the back.

As shown in FIG. 102 through FIG. 104, a fifth part E201, a fourth part E202, and a sixth part E203 constitute the lower housing E2. Each of the fifth part E201, the fourth part E202, and the sixth part E203 is integrally molded. The fifth part E201 is a part which includes a front surface (an inner surface; an inner surface of the second component E3 of the lower housing E2) of the lower housing E2, the second connecting part E4, a front surface side portion of a right side surface of the lower housing E2, a front surface side portion of a left side surface thereof, a front surface side portion of the front surface thereof, and a front surface side portion of a bottom surface thereof. The fourth part E202 is a part which includes a back surface portion of a right side surface, a back surface side portion of a left side surface, a back surface side portion of a top surface, and a back surface side portion of a bottom surface of the lower housing E2. The sixth part E203 is a member which a back surface of the lower housing E2 constitutes and is substantially-rectangular-shaped and flat-plate-like. The fifth part E201, the fourth part E202, and the sixth part E203 are assembled, thereby forming the lower housing E2. Details of the parts E201 through E203 constituting the lower housing E2 will be described later.

As shown in FIG. 102(b), on the inner surface (the inner surface of the second component E3) of the lower housing E2, a lower side LCD (Liquid Crystal Display) E21, a touch panel E22, a cross key E23, operation buttons E24A, E24B, E24C, and E24D (an operation button unit E24; refer to FIG. 103), an analog key E25, a power button E26, a select button E27A, a HOME button E27B, and a start button E27C are provided. In addition, on a right side of the second connecting part E4 of the lower housing E2, a notification LED E28A is provided. In addition, as shown in FIG. 102(e), in a top surface of the lower housing E2, an L button E29A, an R button E29B, an infrared-ray communication module E30, an insertion slot of a touch pen holder E31, an insertion slot for inserting a game card into a game card unit E32, a power connector E33, and a cradle connecting terminal E34 are provided. In addition, as shown in FIG. 102(a), in a left side surface of the lower housing E2, a sound volume switch E35, and an insertion slot (not shown) for inserting an SD card into an SD card unit E36 are provided. The insertion slot of the SD card unit E36 is covered by a cover E36a formed of an elastomer. In addition, as shown in FIG. 102(c), in a right side surface of the lower housing E2, a wireless switch E37 and a wireless LED E28B are provided. In addition, as shown in FIG. 102(f), in a bottom surface of the lower housing E2, a power LED E28C, a charge LED E28D, and an earphone jack E38 are provided. The above-mentioned parts E21 through E38 are housed in the lower housing E2. In addition, inside the lower housing E2, a wireless communication module E39, a microphone E40, a battery E41 (refer to FIG. 103 and FIG. 104), an information processing section E42, and the like are housed. Hereinafter, details of these parts will be described.

The lower side LCD E21 is of a horizontally-long shape and is arranged such that a long-side direction thereof coincides with a long-side direction of the lower housing E2. The lower side LCD E21 is arranged in a central portion of the lower housing E2. When the game apparatus E1 is not in use, the closed state is set, thereby allowing a screen of the lower side LCD E21 to be prevented from becoming soiled or scratched. The lower side LCD E21 is a display device which has a predetermined resolution and, unlike the later-described upper side LCD E51, displays an image in a planar manner (not allowing an image to be displayed in a stereoscopic manner). In the present embodiment, as the display devices, the LCDs are used. However, any other display devices such as a display device utilizing EL (Electro Luminescence) may be used.

On the screen of the lower side LCD E21, the touch panel E22 is attached. The touch panel E22 detects coordinates of a position on an input screen of the touch panel E22, at which inputting is performed. In the present embodiment, the touch panel E22 is a resistive touch panel. However, the touch panel is not limited to the resistive touch panel, and a touch panel of any type, for example, such as a capacitive touch panel, may be used. In the present embodiment, as the touch panel E22, a touch panel having the same resolution (detection accuracy) as that of the lower side LCD E21 is used. However, it is not necessarily required that the resolution of the touch panel E22 is the same as that of the lower side LCD E21. A touch pen (not shown) used for performing operations on the touch panel E22 is inserted into the touch pen holder E31 and housed therein. Inputting onto the touch panel E22 can be performed by not only the touch pen but also a finger of a user.

On a left side of the lower side LCD E21, the cross key E23 is arranged, and in a position above the cross key E23, the analog key E25 is arranged (FIG. 102(b)). More specifically, the analog key E25 is provided in an upper region of a left region beside the lower side LCD E21, and the cross key E23 is provided in a lower region of the left region beside the lower side LCD E21. In addition, the analog key E25 and the cross key E23 are designed so as to be located in positions where a thumb of a left hand holding the lower housing can perform operations. The analog key E25 is provided in the upper region thereof, whereby the analog key E25 is arranged in a position where the thumb of the left hand holding the lower housing E2 is naturally located and the cross key E23 is arranged in a position where the thumb of the left hand is shifted slightly downward (refer to FIG. 120). The cross key E23 is a cross-shaped key and is used for specifying up, down, right, and left directions. The cross key E23 allows inputting of the up, down, right, and left directions. In addition, the analog key E25 is a key which can be slid E360 degrees in any direction in parallel with the inner surface of the lower housing E2 and is used for specifying any direction. The analog key E25 and the cross key E23 function in accordance with a program executed by the game apparatus E1. For example, in a case where a game in which a predetermined object appears in a 3-dimensional virtual space is executed by the game apparatus E1, the analog key E25 functions as an input device for moving the predetermined object within the 3-dimensional virtual space. In this case, the predetermined object is moved in accordance with a direction in which a key top of the analog key E25 is slid.

On a right side of the lower side LCD E21, the operation buttons E24A, E24B, E24C, and E24D are arranged in upper, lower, right, and left positions in a cross-like manner. More specifically, the operation buttons E24A, E24B, E24C, and E24D are arranged in an upper region of a right region beside the lower side LCD E21. The operation buttons E24A, E24B, E24C, and E24D are designed so as to be in positions where a thumb of a right hand can perform operations when a user holds the lower housing E2. Functions in accordance with a program executed by the game apparatus E1 are appropriately assigned to the operation buttons E24A, E24B, E24C, and E24D. For example, the operation buttons E24A, E24B, E24C, and E24D are used for performing a determination operation, a cancellation operation, and the like. In addition, in a right lower position of the right region beside the lower side LCD E21, the power button E26 is arranged. The power button E26 is a button for turning on and off of the power of the game apparatus E1 or proceeding to a sleep state thereof.

On a lower side of the lower side LCD E21, the select button E27A, the HOME button E27B, and the start button E27C are arranged. Upper portions of the buttons E27A, E27B, and E27C are covered by a sheet key E27a which is integrally formed and is horizontally long. In other words, the sheet key E27a is a key top of these buttons. Functions in accordance with a program executed by the game apparatus E1 are appropriately assigned to the buttons E27A, E27B, and E27C. For example, the start button E27C is used when a game executed by the game apparatus E1 is started, and the HOME button is used when a game being played is suspended or stopped and an operation for returning to a menu of the hand-held game apparatus is performed.

In addition, on a right side of the second connecting part E4 of the lower housing E2 as viewed from the front, the notification LED E28A is provided. The notification LED E28A is used for notifying a user that the game apparatus E1 enters a predetermined state. For example, when the game apparatus E1 enters a predetermined state through communication with other apparatus (for example, in a case where data such as a message is received from other apparatus through wireless communication, and the like), the notification LED E28A is lit up.

At a left end portion of a top surface of the lower housing E2, the L button E29A is arranged, and at a right end portion of the top surface of the lower housing E2, the R button E29B is arranged. Functions in accordance with a program executed by the game apparatus E1 are appropriately assigned to the L button E29A and the R button E29B. In addition, in the top surface of the lower housing E2, the infrared-ray communication module E30, the insertion slot of the touch pen holder E31, the insertion slot for inserting a game card into the game card unit E32, the power connector E33, and the cradle connecting terminal E34 are provided. The infrared-ray communication module E30 is a communication module for transmitting and receiving data and the like to and from other apparatus through infrared-ray communication. Detachably attached to the game card unit E32 is the game card (not shown) which is a nonvolatile memory. The game card having stored therein a predetermined game program is attached to the game card unit E32, whereby the game program is loaded and executed. A power cable, not shown, is connected to the power connector E33, whereby supplying power to the game apparatus E1 and charging the battery E41 are conducted. In addition, the cradle connecting terminal E34 is a terminal for electrically connecting to cradles (not shown) used for charging and for connections and the like with peripheral devices.

In the left side surface of the lower housing E2, the sound volume switch E35 and the insertion slot (the later-described opening E202F) for inserting the SD card (not shown) into the SD card unit E36 are provided. The sound volume switch E35 has an operation part which can be slid in up-and-down directions (up-and-down directions when the hand-held game apparatus E1 is in use; and up-and-down directions on a plane of paper of FIG. 102) and is a switch for adjusting a volume of sound outputted from speakers E54 (refer to FIG. 106). Detachably attached to the SD card unit E36 is the SD card which is a nonvolatile memory. The SD card unit E36 reads and writes data from and to the SD card. The insertion slot for inserting the SD card into the SD card unit E36 is covered by the cover E36a.

In the right side surface of the lower housing E2, the wireless switch E37 and the wireless LED E28B are provided. The game apparatus E1 has a function which allows connection to a wireless LAN through, for example, a system in conformity with standards of IEEE 802.11.b/g. The wireless switch (wireless slide switch) E37 has an operation part which can be slid in up-and-down directions (up-and-down directions when the hand-held game apparatus E1 is in use; and up-and-down directions on a plane of paper of FIG. 102) and is a switch which enables/disables the function of this wireless communication. The wireless LED E28B indicates whether or not the wireless communication is established, and specifically, is lit up when the wireless communication is established, or the wireless LED E28B is lit up when the function of the wireless communication is enabled.

In the bottom surface of the lower housing E2, the power LED E28C, the charge LED E28D, and the earphone jack E38 are provided. The power LED E28C is lit up when the power of the game apparatus E1 is on. The charge LED E28D is lit up when the game apparatus E1 is being charged. Connected to the earphone jack E38 are earphones (not shown). When the earphones are connected to the earphone jack E38, the game apparatus E1 outputs sound from the earphones, not from the speakers E54.

Figure 122:
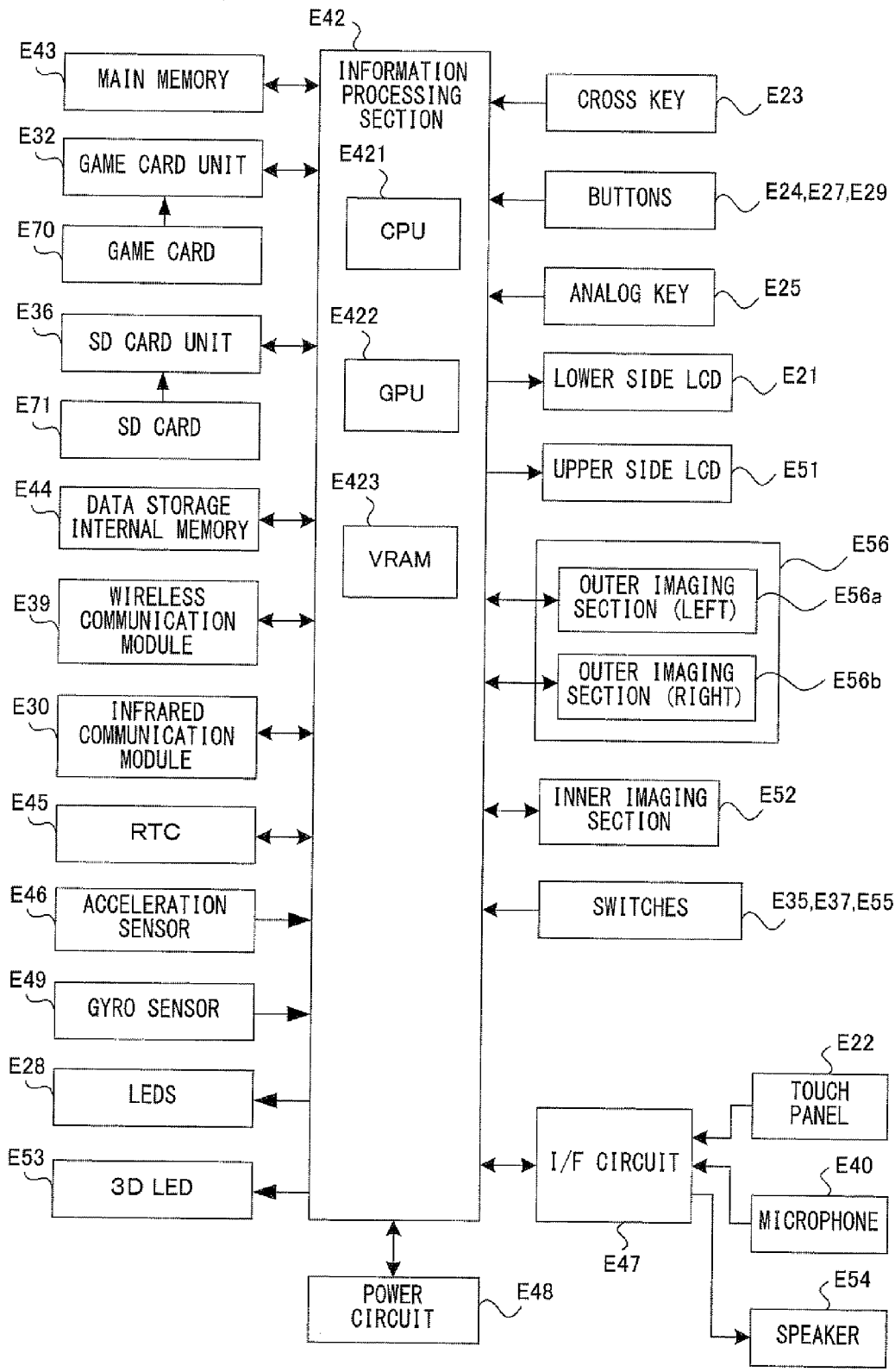
FIG. 122 is a block diagram illustrating an internal configuration of the game apparatus E1.

In addition, though not shown, housed inside the lower housing E2 are the later-described information processing section E42, a main memory E43, an internal memory E44 for storing data, an RTC E45, an acceleration sensor E46, a gyro sensor E49, an interface (I/F) circuit E47, a power circuit E48, and the like (refer to FIG. 122). The information processing section E42 is a semiconductor chip on which a CPU (Central Processing Unit) E421, a GPU (Graphics Processing Unit) E422, a VRAM (Video RAM) E423, and the like are implemented. These information processing section E42, the main memory E43, and the like are arranged, for example, on a back side of the game card unit E32 (a lower side in FIG. 104).

(Description of Upper Housing)

Figure 105:
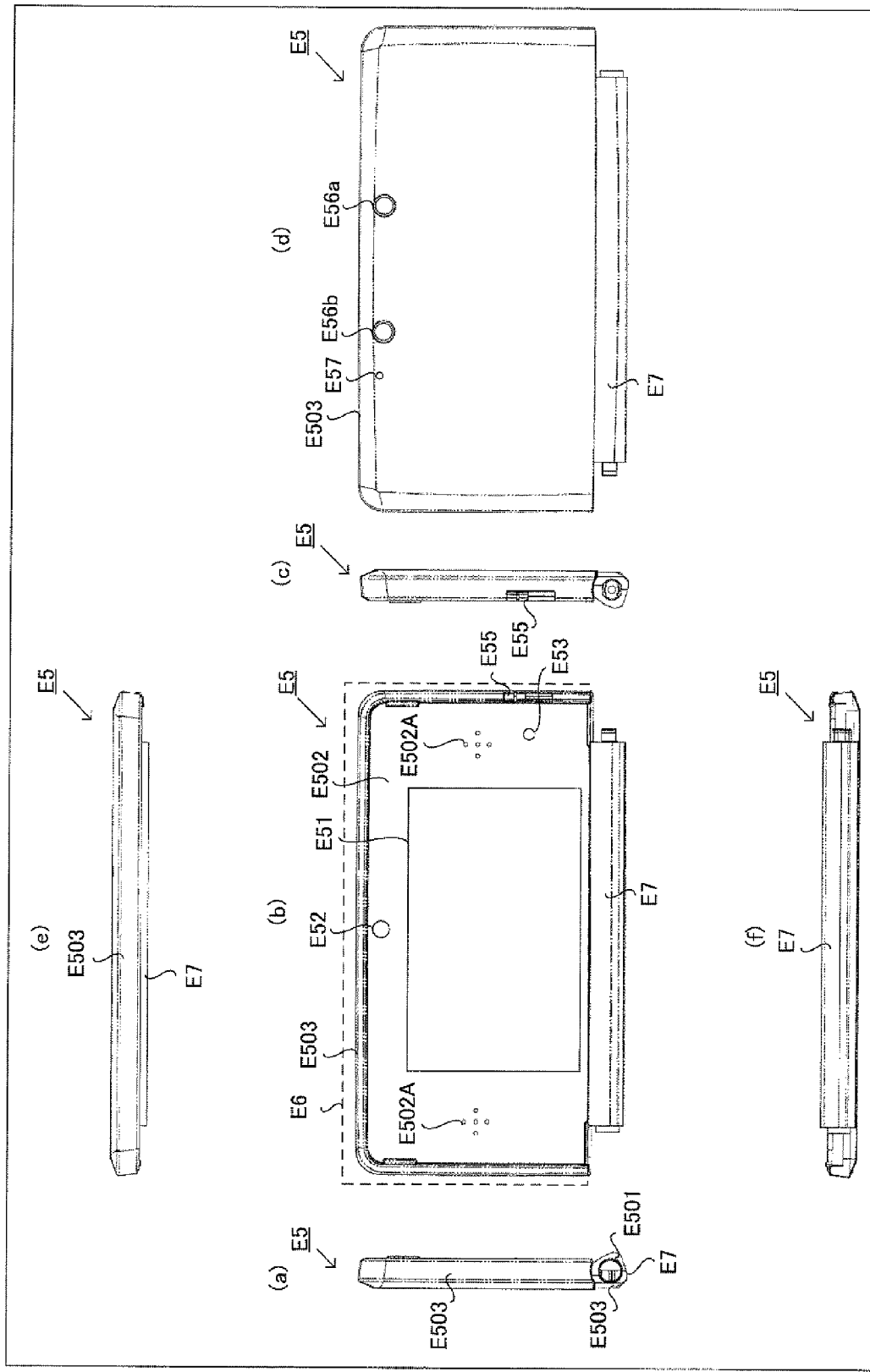
FIG. 105 shows a left side view, a front view, a right side view, a back view, a top view, and a bottom view of an upper housing E5.
Figure 106:
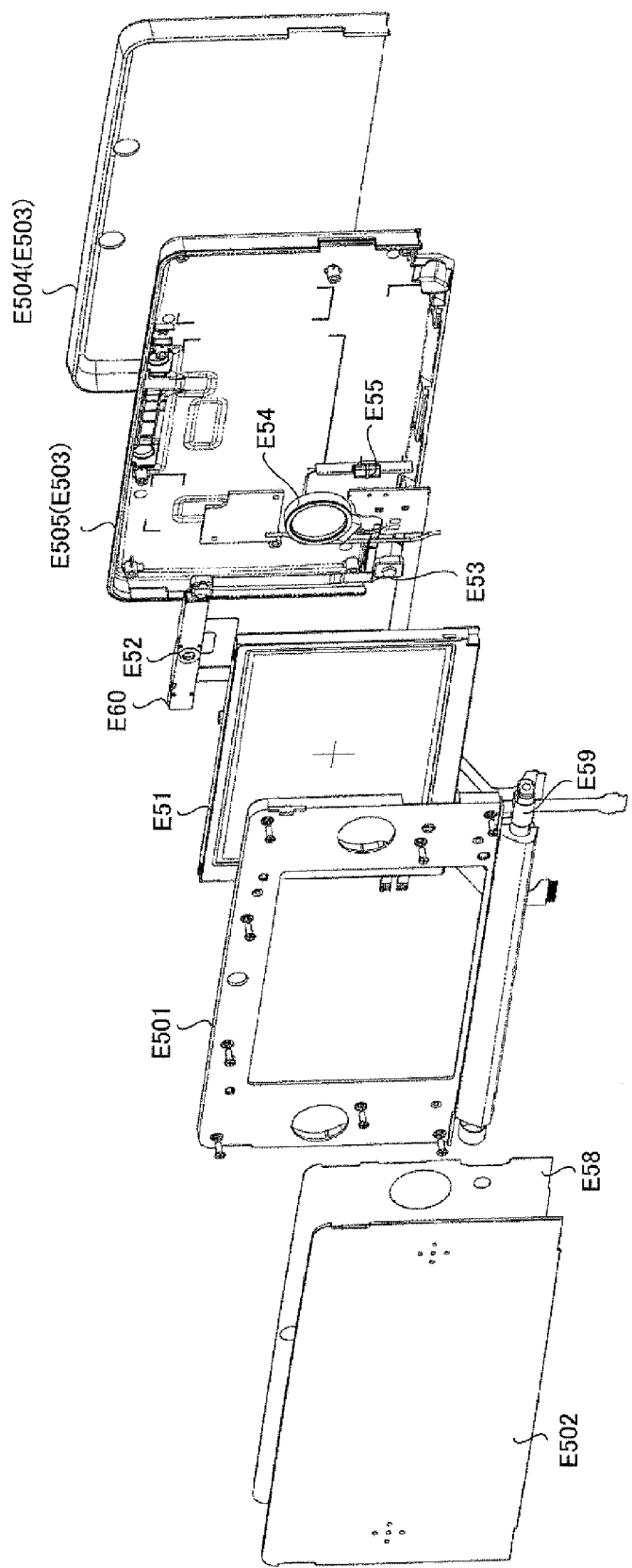
FIG. 106 shows an exploded perspective view of the upper housing E5, as viewed from the front.
Figure 107:
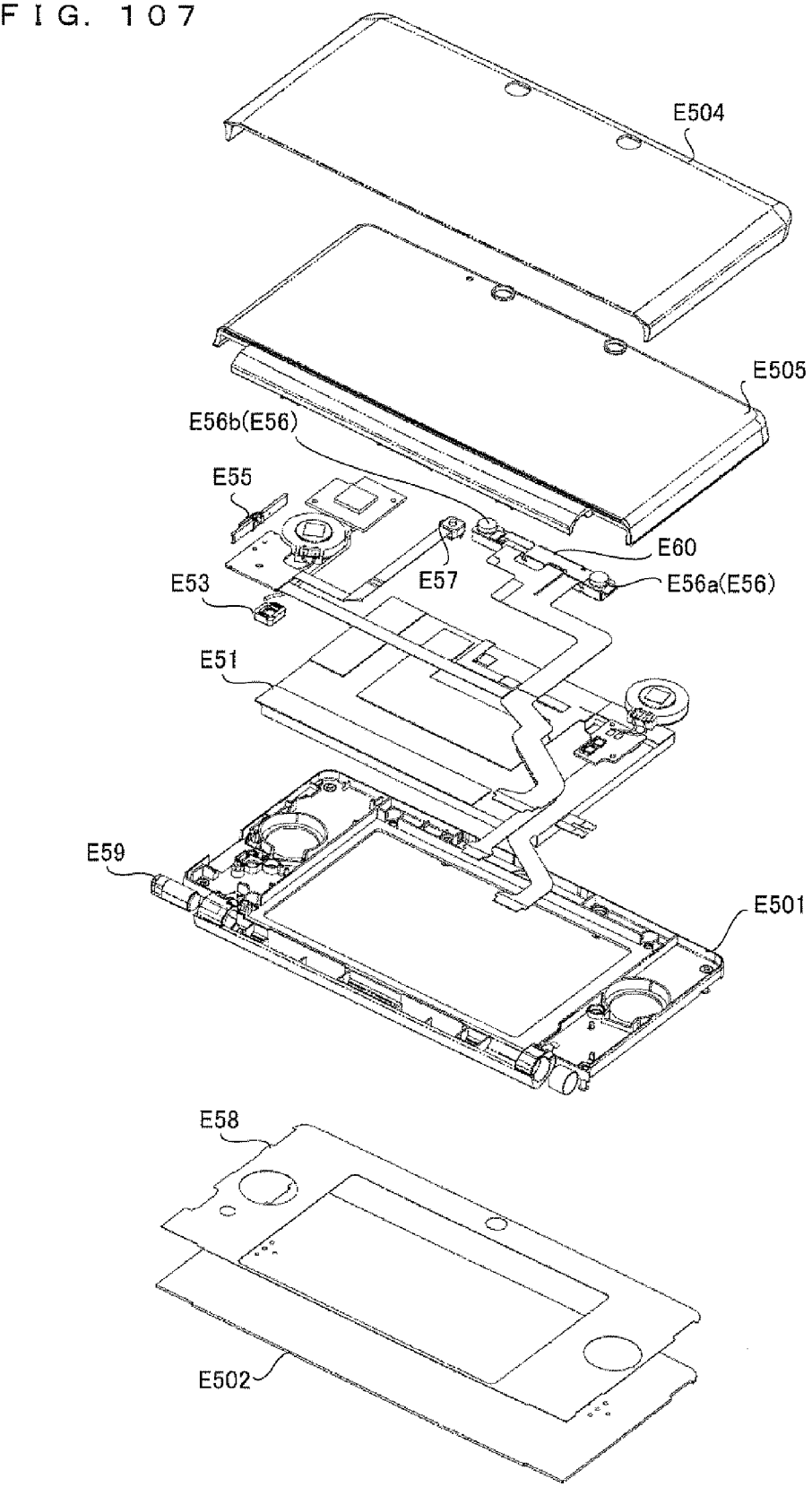
FIG. 107 shows an exploded perspective view of the upper housing E5, as viewed from the back.

Next, with reference to FIG. 105 through FIG. 107, the upper housing E5 will be described. FIG. 105(a) is a left side view of the upper housing E5; FIG. 105(b) is a front view of the upper housing E5; FIG. 105(c) is a right side view of the upper housing E5; FIG. 105(d) is a back view of the upper housing E5; FIG. 105(e) is a top view of the upper housing E5; and FIG. 105(f) is a bottom view of the. In addition, FIG. 106 is an exploded perspective view of the upper housing E5, as viewed from the front. FIG. 107 is an exploded perspective view of the upper housing E5, as viewed from the back.

As shown in FIG. 105 through FIG. 107, a first part E501, a second part E502, and a third part E503 constitute the upper housing E5. A third A part E504 and a third. B part E505 further constitute the third part E503. Each of the first part E501, the second part E502, the third A part E504, and the third B part E505 is integrally molded. The third part E503 may be integrally molded. The first part E501 is a part integrally formed by the substantially rectangular third component E501A (refer to FIG. 111(b)) arranged inside the upper housing E5 (in other words, the third component E501A is housed in the third part E503 and covered by the second part E502) and a protrusion part E501B constituting a part (front surface side portion) of the first connecting part E7 of the upper housing E5. In addition, the second part E502 is a member which has a transparent region constituting a front surface of the upper housing E5, is flat-plate-like, and is integrally molded. In addition, the third part E503 includes a back surface, right and left side surfaces, a top surface, and a bottom surface of the upper housing E5 and also includes a part (back surface side portion) of the first connecting part E7 of the upper housing E5. Details of these parts (E501, E502, E504, and E505) constituting the upper housing E5 will be described later.

As shown in FIG. 105 through FIG. 107, housed in the upper housing E5 are the upper side LCD (Liquid Crystal Display) E51, an inner imaging section E52, a 3D LED E53, the speakers E54, a parallax amount adjustment switch E55, and an outer imaging section E56 (E56a and E56b). A screen of the upper side LCD ESL the inner imaging section E52, and the 3D LED E53 are provided in an inner surface (inner surface of the first component E6) of the upper housing E5. In addition, in the inner surface (inner surface of the first component E6) of the upper housing E5, a plurality of sound holes E502A of the speakers for outputting sound from the speakers E54 (FIG. 106) are provided on a right side and a left side beside the upper side LCD E51. In addition, in a right side surface of the upper housing E5, the parallax amount adjustment switch E55 is provided (FIG. 105(b) and FIG. 105(e)). The parallax amount adjustment switch E55 is provided in edge portions of the inner surface and the right side surface of the upper housing E5, and a key top thereof is exposed toward the inner surface. In the open state, the parallax amount adjustment switch E55 is arranged such that with the upper housing E5 viewed from the front, the key top of the parallax amount adjustment switch E55 is visible. This makes an operation state of the parallax amount adjustment switch E55 be visible as viewed from the front. In addition, an operation part of the parallax amount adjustment switch E55 is exposed in a right side surface direction of the upper housing E5 and is visible and operable from the right side surface. In addition, in a back surface of the upper housing E5, the outer imaging section E56 (E56a and E56b) and an LED E57 for the outer imaging section are provided.

As described above, the second part E502 which is the flat-plate-like member formed of a transparent resin constitutes the front surface (inner surface) of the upper housing E5. Since in FIG. 100(b), the second part E502 which is transparent in reality is shown as not being transparent, the upper side LCD E51, the inner imaging section E52, and the 3D LED E53 are not shown (indicated by the broken line in FIG. 100(b)). On the other hand, in FIG. 105(b), since the second part E502 is shown as being transparent, the upper side LCD E51, the inner imaging section E52, and the 3D LED E53 are shown. Similarly, the third A part E504 formed of a transparent resin constitutes the back surface of the upper housing E5. In FIG. 100(d), since the third A part E504 which is transparent in reality is shown as not being transparent, the LED E57 for the outer imaging section is not shown (indicated by the broken line in FIG. 100(d)). In FIG. 105(d), since the third A part E504 is shown as being transparent, the LED E57 for the outer imaging section is shown.

Hereinafter, the above-mentioned parts E51 through E57 housed in the upper housing E5 will be described.

The upper side LCD E51 is of a horizontally-long shape and is arranged such that a long-side direction thereof coincides with a long-side direction of the upper housing E5. The upper side LCD E51 is arranged in a central portion of the upper housing E5. An area of a screen of the upper side LCD E51 is set to be larger than that of the screen of the lower side LCD E21. The upper side LCD E51 is a display device which has a predetermined resolution. In the present embodiment, the upper side LCD E51 is a liquid crystal display. However, for example, a display device utilizing EL (Electro Luminescence) or the like may be used.

Specifically, the upper side LCD E51 is a display device capable of displaying an image which can be viewed stereoscopically by the naked eyes, and as the upper side LCD E51, a lenticular system or a parallax barrier system is used. In the present embodiment, as the upper side LCD E51, the parallax barrier system is used. The upper side LCD E51 displays an image (3-dimensional image) which can be stereoscopically viewed by the naked eyes, using images for a right eye and images for a left eye. In other words, the upper side LCD E51 displays each of the images for a right eye and each of the images for a left eye so as to be placed side by side in an alternate manner per predetermined unit and causes the images for a right eye to be viewed by a user's right eye and the images for a left eye to be viewed by a user's left eye by using the parallax barrier, thereby allowing a 3-dimensional image (stereoscopically viewable image) giving a user a stereoscopic vision to be displayed. In addition, the upper side LCD E51 is capable of disabling the above-mentioned parallax barrier and of displaying an image in a two-dimensional manner when the parallax barrier is disabled (capable of displaying a two-dimensionally viewable image which is opposite to the above-described 3-dimensionally viewable image in the meaning). As described above, the upper side LCD E51 is a display device which is capable of switching between a 3-dimensional display mode in which a stereoscopically viewable image is displayed and a two-dimensional display mode in which an image is displayed in a planar manner (a two-dimensionally viewable image is displayed). This switching between the display modes is performed by the parallax amount adjustment switch E55.

The inner imaging section E52 is arranged at an upper portion (more specifically, above the upper side LCD E51) of the inner surface of the upper housing E5, which is located in a central position with respect to a right and left direction of the upper housing E5. The inner imaging section E52 is an imaging device which shoots an image in an inner surface direction (inward normal direction) of the upper housing E5. The inner imaging section E52 includes an imaging element (for example, a CCD image sensor, a CMOS image sensor, etc.) having a predetermined resolution and including a lens. The lens may have a zoom mechanism.

The 3D LED E53 is provided on a right side beside the upper side LCD E51 and indicates whether or not a display mode of the upper side LCD E51 is the 3-dimensional display mode. When the display mode of the upper side LCD E51 is the 3-dimensional display mode, the 3D LED E53 is lit up. The 3D LED E53 may be lit up when the upper side LCD E51 displays the 3-dimensionally viewable image and may be lit up when the 3-dimensionally viewable image can be displayed (in a state where the 3-dimensionally viewable image can be displayed even when the parallax amount adjustment switch E55 turns off the 3-dimensional display mode and the two-dimensionally viewable image is displayed). In addition, the speakers E54 are arranged on right and left sides of the upper side LCD E51, outputting sound.

The parallax amount adjustment switch E55 has an operation part, which can be slid in an up-and-down direction, and is used for switching between the display modes of the upper side LCD E51 as described above. When the operation part of the parallax amount adjustment switch E55 is slid so as to be positioned at the lowest point, the display mode of the upper side LCD E51 is switched to the two-dimensional display mode (the 3-dimensional display is turned off). In addition, the parallax amount adjustment switch E55 is also used for adjusting the way in which a 3-dimensional image displayed on the upper side LCD E51 is viewed. For example, when the game apparatus E1 displays on the upper side LCD E51 a view of a 3-dimensional virtual space, which is shot by a virtual stereo camera, a distance between imaging elements of the virtual stereo camera is adjusted in accordance with a position of the operation part of the parallax amount adjustment switch E55. By adjusting the parallax amount adjustment switch E55, a user can adjust the way in which a 3-dimensional image displayed on the upper side LCD E51 is viewed.

The outer imaging section E56 is provided on the back surface of the upper housing E5 and is a stereo camera which shoots a back surface direction (an outward normal direction of the back surface). Specifically, two imaging devices which are an outer imaging section (left) E56a and an outer imaging section (right) E56b constitute the outer imaging section E56. An imaging direction of each of the outer imaging section (left) E56a and the outer imaging section (right) E56b is an outward normal direction of the back surface of the upper housing E5. In addition, each of these imaging sections is designed so as to be located in a direction which is opposite to a normal direction of the screen of the upper side LCD E51 by E180 degrees. In other words, an imaging direction of the outer imaging section (left) E56a and an imaging direction of the outer imaging section (right) E56b are in parallel with each other. By a program executed by the game apparatus E1, it is also made possible to use the outer imaging section E56 as a non-stereo camera by singly using either one of the two outer imaging sections (E56a and E56b). In addition, depending on a program, it is also made possible to perform imaging, whose imaging range is expanded, by synthesizing or using in a complementary manner images shot by the two outer imaging section (E56a and E56b). Each of the outer imaging section (left) E56a and the outer imaging section (right) E56b includes an imaging element (for example, a CCD image sensor, a CMOS image sensor, etc.) having a predetermined common resolution and a lens. The lens may have a zoom mechanism. The outer imaging section E56 is provided on an upper portion of the back surface of the upper housing E5, and the right and left imaging sections are provided at positions which are symmetrical with respect to the right and left direction of the upper housing E5. More specifically, at a position on a back side of the midpoint position between the outer imaging section (left) E56a and the outer imaging section (right) E56b, the above-mentioned inner imaging section E52 is arranged. As shown in FIG. 106 and FIG. 107, the outer imaging section E56 and the inner imaging section E52 are integrally assembled as an imaging unit E60 and housed inside the upper housing E5.

The LED E57 for the outer imaging section is provided in the back surface of the upper housing E5. Specifically, the LED E57 for the outer imaging section is provided in an upper portion of the back surface of the upper housing E5 and in the vicinity of the outer imaging section (right) E56b (on a left side beside the outer imaging section (right) E56b in a case where the back surface of the upper housing E5 is viewed from the front). The LED E57 for the outer imaging section indicates whether or not shooting images by the outer imaging section E56 is possible, and specifically, when shooting images by the outer imaging section E56 is possible, the LED E57 for the outer imaging section is lit up.

(Details of Parts Constituting Housings)

Figure 108:
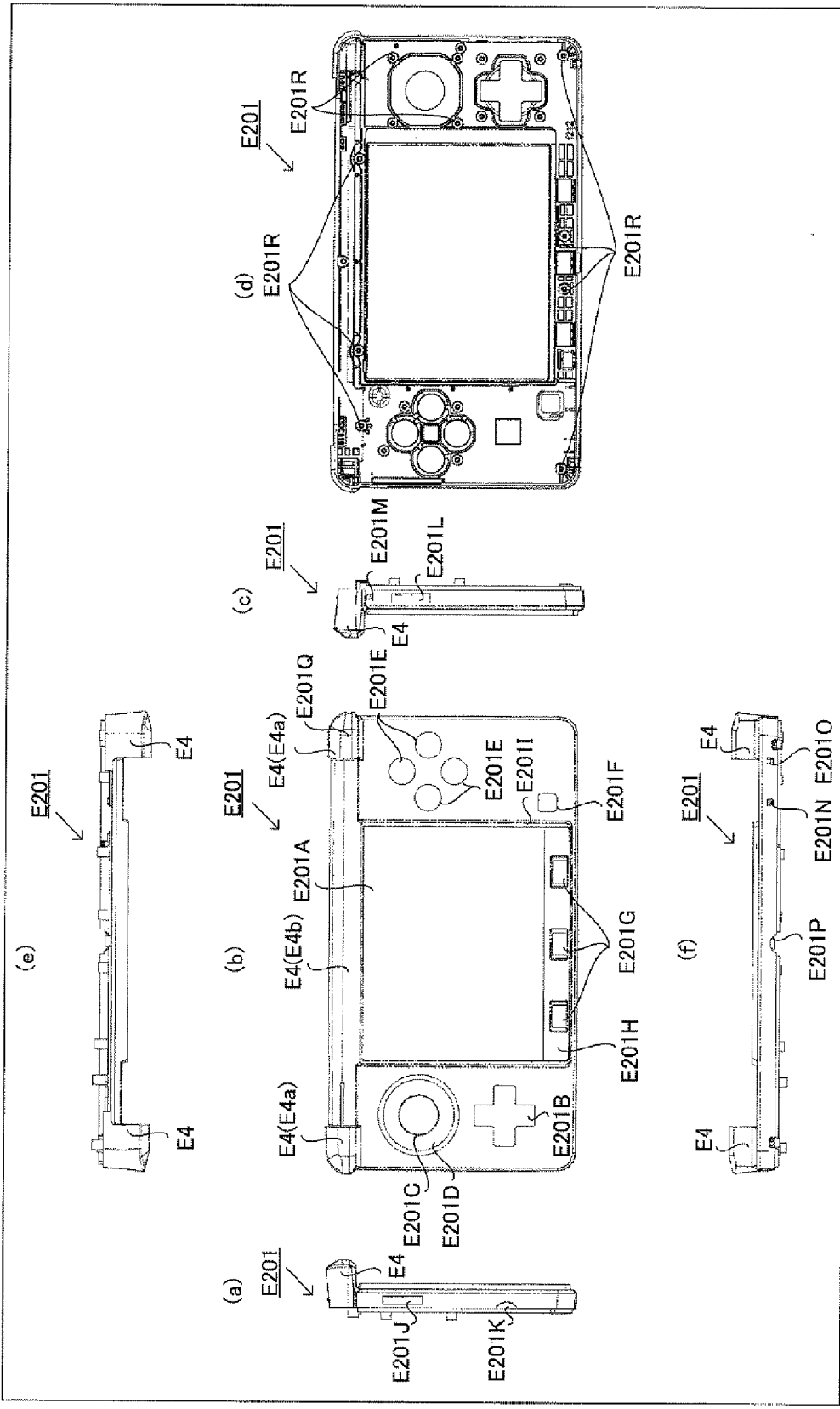
FIG. 108 shows a left side view, a front view, a right side view, a back view, a top view, and a bottom view of a fifth part E201 constituting the lower housing E2.

Next, details of the parts constituting the lower housing E2 and the upper housing E5 will be described. First, with reference to FIG. 108 through FIG. 110, details of the parts (the fourth part E202, the fifth part E201, and the sixth part E203) constituting the lower housing E2 will be described.

(Details of Parts Constituting Lower Housing E2)

FIG. 108(a) is a left side view of the fifth part E201 constituting the lower housing E2; FIG. 108(b) is a front view of the fifth part E201 constituting the lower housing E2; FIG. 108(e) is a right side view of the fifth part E201 constituting the lower housing E2; FIG. 108(d) is a back view of the fifth part E201 constituting the lower housing E2; FIG. 108(e) is a top view of the fifth part E201 constituting the lower housing E2; and FIG. 108(f) is a bottom view of the fifth part E201 constituting the lower housing E2.

(Description of Fifth Part)

The fifth part E201 is a part which the front surface (the inner surface; the inner surface of the second component E3) of the lower housing E2, the second connecting part E4, the front surface side portion of the right side surface of the lower housing E2, the front surface side portion of the left side surface thereof, the front surface side portion of the top surface thereof, and the front surface side portion of the bottom surface thereof constitute. In a central portion of the front surface (the inner surface of the lower housing E2) of the fifth part E201, an opening E201A is formed, the screen of the lower side LCD E21 is exposed from the opening E201A. On a left side beside the opening E201A, a cross-shaped opening E201B is formed, and on a side above the opening E201B, a circular opening E201C is formed. In other words, the opening E201C is provided in an upper region of a left side region beside the opening E201A, and the opening E201B is provided in a lower region of the left side region beside the opening E201A. In addition, the opening E201C and the opening E201B are arranged in positions which a thumb of a left hand reaches when a user holds the lower housing E2. A key top of the cross key E23 is exposed from the opening E201B and a key top of the analog key E25 is exposed from the opening E201C. The opening E201C is formed in a recess E201D, which has a radius larger than that of the opening E201C and is of a shape of a circle which is concentric with a circle of a shape of the opening E201C. The opening E201C from which the key top of the analog key E25 is exposed is formed in the recess E201D, whereby it is prevented that when the lower housing E2 and the upper housing E5 are folded, the key top of the analog key E25 comes in contact with the upper housing E5 and the lower housing E2 and the upper housing E5 thereby cannot be folded. In addition, in an upper region of a right side region beside the opening E201A, four openings E201E are formed in a cross-like manner, and key tops of the operation buttons E24A, E24B, E24C, and E24D are exposed from these openings E201E. In addition, in a lower portion of a right side beside the opening E201A, an opening E201F for exposing the power button E26 is formed. In addition, on a side below the opening E201A, three openings E201G for exposing the select button E27A, the HOME button E27B, and the start button E27C are formed so as to be arranged in a horizontal direction. The openings E201G for these buttons E27A, E27B, and E27C are formed inside a sheet key top mounting part E201H for mounting a sheet-like key top (sheet E27a). The opening E201A from which the screen of the lower side LCD E21 is exposed and the sheet key top mounting part E201H are formed inside a rectangular region E201I which is arranged in a central portion of the front surface of the fifth part E201. The rectangular region E201I is a rectangular region which is enclosed with an upper edge of the opening E201A, a right edge of the opening E201A, a right edge of the sheet key top mounting part E201H, a lower edge of the sheet key top mounting part E201H, a left edge of the opening E201A, and a left edge of the sheet key top mounting part E201H. Because right and left ends and a lower end of the rectangular region E201I are protruded, when the lower housing E2 and the upper housing E5 are folded, the screen of the lower side LCD E21 and a key top (key tops of the buttons E27A, E27B, and E27C) of the sheet key do not contact the upper housing E5.

In a left side surface of the fifth part E201, an opening E201J for exposing a key top of the sound volume switch E35 is formed. In addition, in a position below the opening E201J on the left side surface of the fifth part E201, a recess E201K is formed. Specifically, in an edge portion of the left side surface of the fifth part E201 on a side (back surface side) which is opposite to a side on the front surface of the fifth part E201, the recess E201K which is of a semicircular shape is formed. The recess E201K is formed, whereby when the parts have been assembled and the lower housing E2 has been thereby formed, it is made easy for a user to pick up the cover E36a with his or her finger when a user removes the cover E36a of the SD card unit E36. In other words, the recess E201K is a dent which is provided in a portion facing the opening E202F (described later) of the fourth part E202, with the fifth part E201 and the fourth part E202 assembled, and is of a shape whose width increases toward a back surface edge.

In a right side surface of the fifth part E201, an opening E201L for exposing a key top of the wireless switch E37 and an opening E201M for exposing an LED lens of the wireless LED E28B are formed. The key top of the wireless switch E37 is protruded and exposed in a right side surface direction from the opening E201L. In addition, the LED lens of the wireless LED E28B is protruded and exposed in the right side surface direction from the opening E201M.

On a right side beside a center of a bottom surface of the fifth part E201, an opening E201N for exposing the power LED E28C and an opening E2010 for exposing the charge LED E28D are formed. The LED lens of the power LED E28C is protruded and exposed in a bottom surface direction from the opening E201N. In addition, the LED lens of the charge LED E28D is protruded and exposed in a bottom surface direction from the opening E201O. In addition, in a central portion of the bottom surface of the fifth part E201, an opening E201P, which is of a semicircular shape, for exposing the earphone jack E38 is formed. By assembling the fourth part E202 and the fifth part E201, the opening E201P constitutes a circular earphone insertion slot.

On a right side of the second connecting part E4 of the fifth part E201, an opening E201Q for exposing the notification LED E28A is formed. The LED lens of the notification LED E28A is protruded and exposed in a front surface direction from the opening E201Q.

In a back surface of the fifth part E201, screw holes E201R, the number of which is n (nine), are formed, and screw holes E202C of the fourth part E202 and the screw holes E201R are fastened by screws, the number of which is n.

(Description of Fourth Part)

Figure 109:
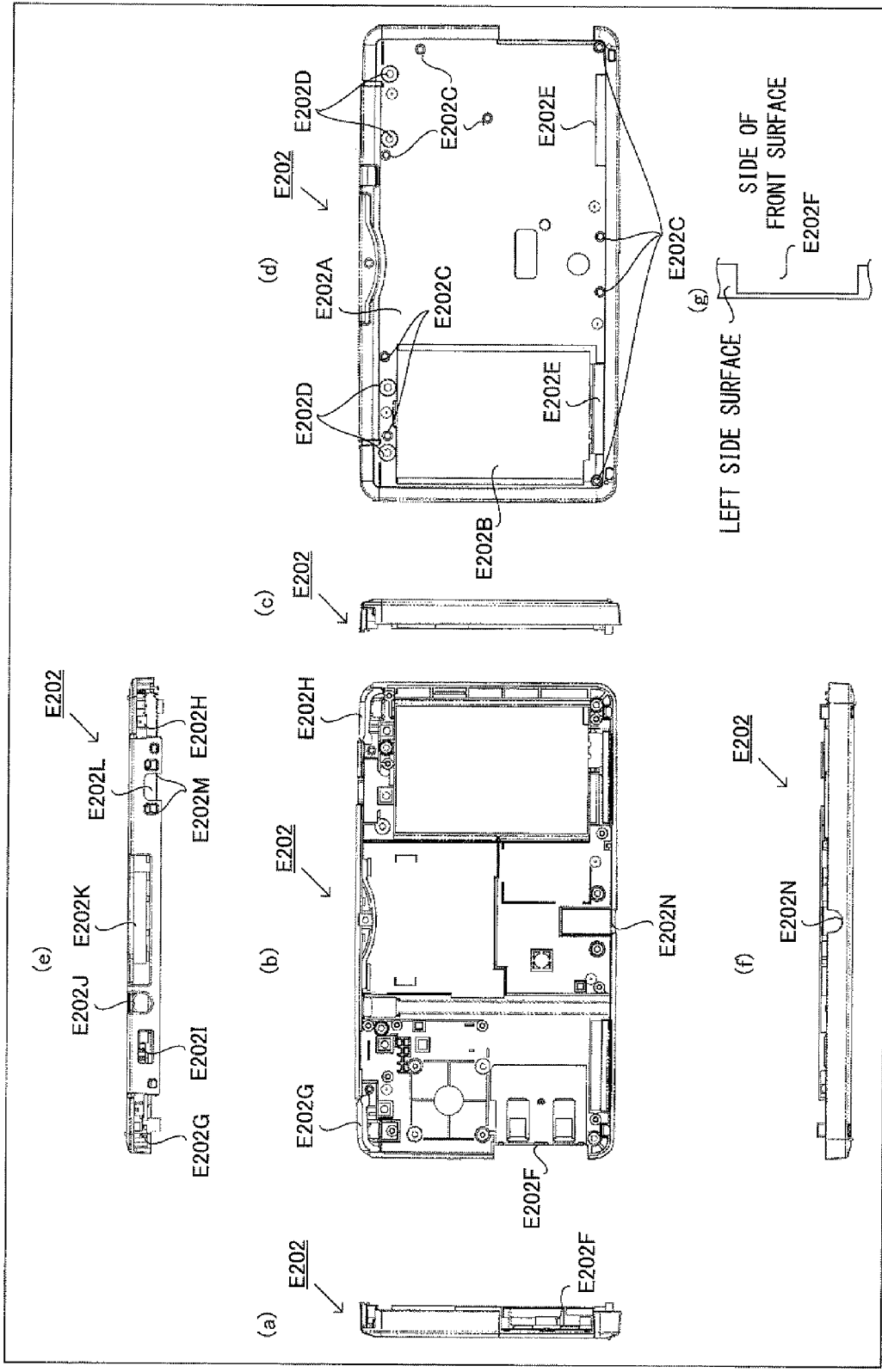
FIG. 109 shows a left side view, a front view, a right side view, a back view, a top view, and a bottom view of a fourth part E202 constituting the lower housing E2.

Next, with reference to FIG. 109, the fourth part E202 will be described. FIG. 109(a) is a left side view of the fourth part E202 constituting the lower housing E2; FIG. 109(b) is a front view of the fourth part E202 constituting the lower housing E2; FIG. 109(c) is a right side view of the fourth part E202 constituting the lower housing E2; FIG. 109(d) is a back view of the fourth part E202 constituting the lower housing E2; FIG. 109(e) is a top view of the fourth part E202 constituting the lower housing E2; and FIG. 109(f) is a bottom view of the fourth part E202 constituting the lower housing E2.

The fourth part E202 is a part which a back surface side portion of the right side surface, a back surface side portion of the left side surface, a back surface side portion of the top surface, and a back surface side portion of the bottom surface of the lower housing E2 constitute. As shown in FIG. 109(d), on a back surface side of the fourth part E202, a rectangular recess E202A whose size, as viewed from the front, is greater than or equal to 70% (specifically, approximately 80%) of a size of the back surface of the lower housing E2, as viewed from the front. In other words, the recess E202A has an area of 70% or more of an area of the back surface of the lower housing E2. In the recess E202A, a battery housing part E202B which houses the battery E41 and allows the battery E41 to be taken out from a back surface direction (frontward from a plane of paper of FIG. 109(d)) is formed. In addition, in the recess E202A, the screw holes E202C, the number of which is n (nine), and screw holes E202D, the number of which is m (four) smaller than n, are formed. The screw holes E202C of the fourth part E202 and the screw holes E201R of the fifth part E201 are fastened by the screws, the number of which is n, whereby the fourth part E202 and the fifth part E201 are assembled. In addition, in the recess E202A, two hook slots E202E are formed. In these hook slots E202E, the later-described hooks E203B of the sixth part E203 are engaged.

In addition, on a left side surface of the fourth part E202, an opening E202F constituting an insertion slot for inserting the SD card into the SD card unit E36 is formed. The opening E202F is formed such that a front surface side thereof is open. FIG. 109(g) is a diagram illustrating an enlarged view of the opening E202F formed in the left side surface of the fourth part E202. As shown in FIG. 109(g), the opening E202F is not a closed opening itself and a front surface end is open. When the fourth part E202 and the fifth part E201 have been assembled, the front surface end of the opening E202F of the fourth part E202 is closed by a left side surface end portion of the fifth part E201 facing the opening E202F, and a closed opening is formed, whereby the insertion slot for the SD card is formed. The opening E202F is covered by the cover E36a. The cover E36a is a lid member which is opened and closed in a back surface direction and is formed of an elastomer.

In both end portions of a top surface of the fourth part E202, an opening E202G and an opening E202H for exposing key tops of the L button E29A and the R button E29B, respectively are formed. In addition, in the top surface of the fourth part E202, openings E202I, E202J, E202K, and E202L for exposing the infrared-ray communication module E30, the touch pen holder E31, the game card insertion slot of the game card unit E32, and the power connector E33, respectively are formed. In addition, in the top surface of the fourth part E202, an opening E202M for exposing the cradle connecting terminal E34 is formed.

In addition, in a central portion of a bottom surface of the fourth part E202, an opening E202N, which is of a semicircular shape, for exposing the earphone jack E38 is formed. By assembling the fourth part E202 and the fifth part E201, the opening E202N constitutes the circular earphone insertion slot.

(Description of Sixth Part)

Figure 110:
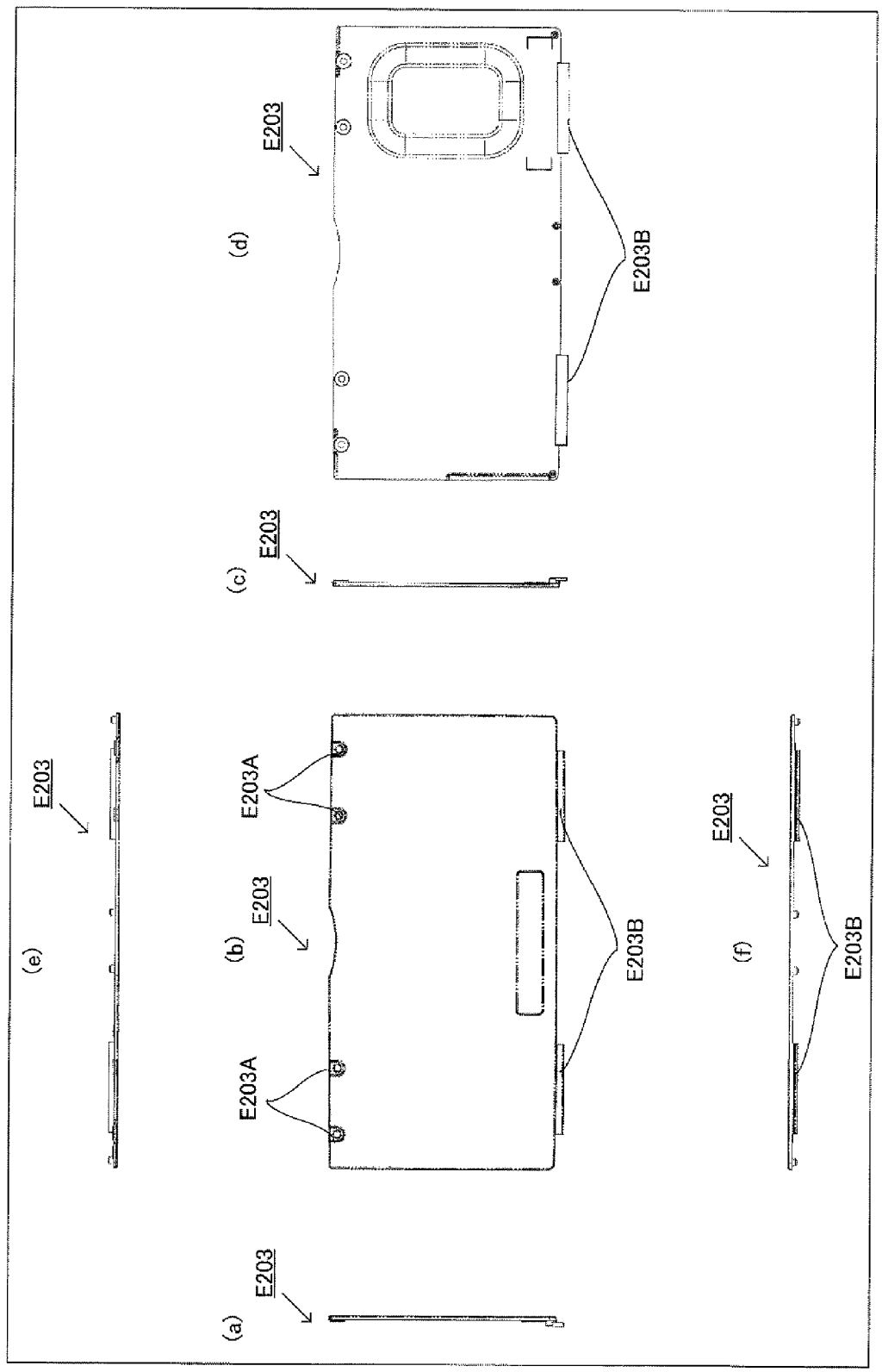
FIG. 110 shows a left side view, a front view, a right side view, a back view, a top view, and a bottom view of a sixth part E203 constituting the lower housing E2.

Next, with reference to FIG. 110, the sixth part E203 will be described. FIG. 110(a) is a left side view of the sixth part E203 constituting the lower housing E2; FIG. 110(b) is a front view of the sixth part E203 constituting the lower housing E2; FIG. 110(c) is a right side view of the sixth part E203 constituting the lower housing E2; FIG. 110(d) is a back view of the sixth part E203 constituting the lower housing E2; FIG. 110(e) is a top view of the sixth part E203 constituting the lower housing E2; and FIG. 110(f) is a bottom view of the sixth part E203 constituting the lower housing E2.

The sixth part E203 is a flat-plate-like member constituting the back surface of the lower housing E2. The sixth part E203 is a substantially-rectangular flat plate and has a shape and size which allow the sixth part E203 to be fitted into the recess E202A formed in the back surface of the fourth part E202. The sixth part E203 is a battery lid, and a size thereof, as viewed from the front, is greatly larger than a size of the battery, as viewed from the front. Specifically, the size of the sixth part E203, as viewed from the front, is twice or more (more specifically, 2.5 times or more) as large as the size of the battery, as viewed from the front. Although as the battery lid, such a size is unnecessary, the sixth part E203 is designed so as to have the larger size than that of the battery as described above, thereby attaining the later-described effect. In the vicinity of an upper edge portion of the sixth part E203, screw holes E203A, the number of which is m (four), are formed. In addition, on a lower edge portion of the sixth part E203, two hooks E203B are formed, and the hooks E203B are engaged in the hook slots E202E of the fourth part E202. The screw holes E203A of the sixth part E203 and the screw holes E202D of the fourth part E202 are fastened by the screws, the number of which is m, whereby the fourth part E202 and the sixth part E203 are assembled.

As described above, the fourth part E202, the fifth part E201, and the sixth part E203 are assembled, whereby the lower housing E2 is formed.

(Details of Parts Constituting Upper Housing)

Next, with reference to FIG. 111 through FIG. 114, the details of the parts constituting the upper housing E5 will be described. The first part E501, the second part E502, and the third part E503 constitute the upper housing E5. The third A part E504 and the third B part E505 further constitute the third part E503.

(Description of First Part)

FIG. 111(a) is a left side view of the first part E501 constituting the upper housing E5; FIG. 111(b) is a front view of the first part E501 constituting the upper housing E5; FIG. 111(c) is a right side view of the first part E501 constituting the upper housing E5; FIG. 111(d) is a back view of the first part E501 constituting the upper housing E5; FIG. 111(e) is a top view of the first part E501 constituting the upper housing E5; and FIG. 111(f) is a bottom view of the first part E501 constituting the upper housing E5.

Figure 111:
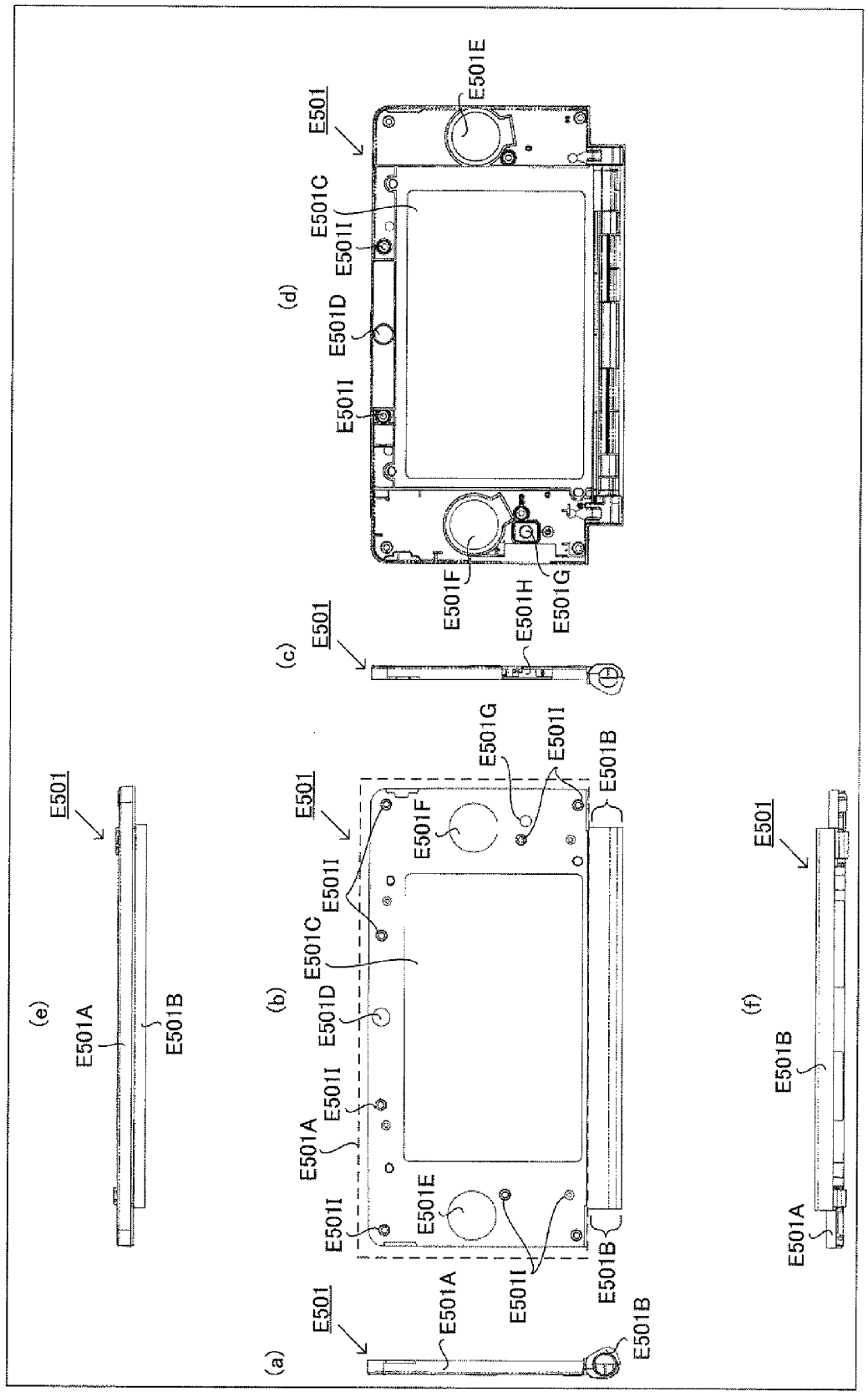
FIG. 111 shows a left side view, a front view, a right side view, a back view, a top view, and a bottom view of a first part E501 constituting the upper housing E5.
Figure 112:
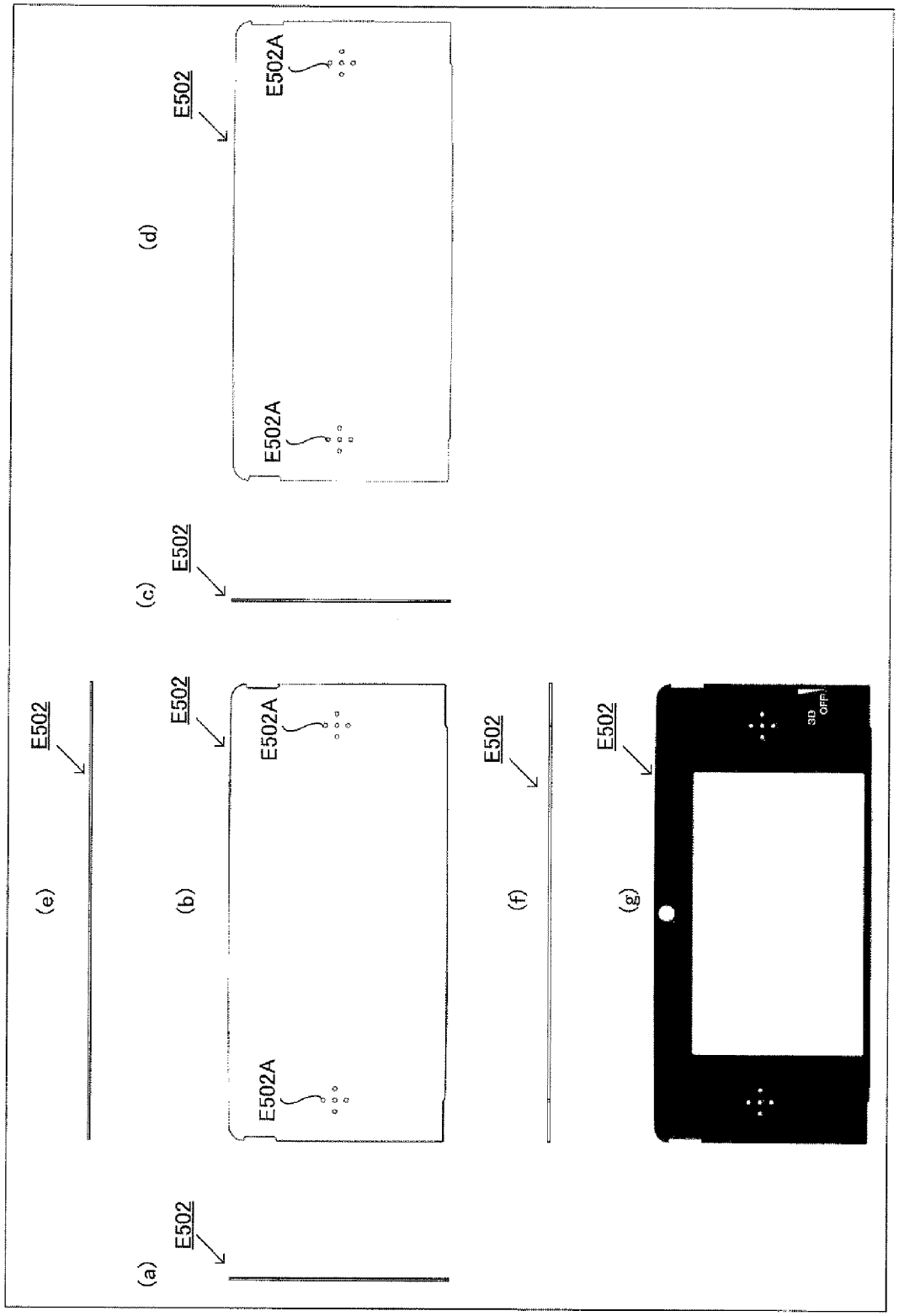
FIG. 112 shows a left side view, a front view, a right side view, a back view, a top view, and a bottom view of a second part E502 constituting the upper housing E5 and shows a front view in a case where the second part has been subjected to printing.

The first part E501 is a part integrally formed by the third component E501A (portion enclosed by a broken line) arranged inside the upper housing E5 and the protrusion part E501B constituting a part (front surface side portion) of the first connecting part E7 of the upper housing E5. The third component E501A is of a substantially-rectangular shape, as viewed from the front, and has a shape and a size which are equivalent to those of a front surface of the first component E6 of the upper housing E5. However, since the third component E501A is housed in a recess enclosed by the top surface, the both side surfaces, and the bottom surface of the third part E503 (more specifically, the third A part E504 in the present embodiment), the size of the third component E501A, as viewed from the front, is slightly smaller than the size of the front surface of the upper housing E5 (smaller by thicknesses of the top surface, the both side surfaces, and the bottom surface of the third part E503), to be accurate. In addition, the third component E501A has the same size as that of the recess enclosed by the top surface, the both side surfaces, and the bottom surface of the third part E503 (more specifically, the third A part E504 in the present embodiment). As shown in FIG. 111, the protrusion part E501B is formed so as to be protruded downward from a central portion of a lower edge of the third component E501A. The protrusion part E501B constitutes the front surface side portion of the first connecting part E7 of the upper housing E5. In both right and left end portions of the protrusion part E501B, cylindrical parts are formed, and the hinge pin E59 is inserted into the cylindrical parts, whereby the hinge pin E59 is supported (refer to FIG. 107). Since in the side views shown in FIG. 111(a) and FIG. 111(c), the cylindrical parts are shown, the protrusion part E501B seems to constitute also the back surface side portion of the first connecting part E7. In reality, however, the protrusion part E501B does not constitute the back surface side portion of the first connecting part E7 (only the both ends (cylindrical parts) constitutes a part of the back surface side portion of the first connecting part E7), but constitutes the front surface side portion of the first connecting part E7.

In a central portion of the front surface of the third component E501A of the first part E501, an upper side LCD opening E501C for exposing the screen of the upper side LCD E51 is provided. In a portion above the opening E501C, an inner imaging section opening E501D for exposing the inner imaging section E52 is provided. In addition, on a right side and a left side beside the upper side LCD opening E501C, speaker openings E501E and E501F for exposing the speakers E54 are provided. In addition, on the right side (below the opening E501F for the speaker) beside the upper side LCD opening E501C, a 3D LED opening E501G for exposing the LED lens of the 3D LED E53 is provided.

In addition, in a right side surface of the first part E501, an opening E501H for exposing the operation part of the parallax amount adjustment switch E55 in a side surface direction (a normal direction of the right side surface) is provided. In addition, in the third component E501A of the first part E501, a plurality of screw holes E5011 are provided. The first part E501 is connected with the third B part E505 by screws.

(Description of Second Part)

Next, the second part E502 will be described. FIG. 112(a) is a left side view of the second part E502 constituting the upper housing E5; FIG. 112(b) is a front view of the second part E502 constituting the upper housing E5; FIG. 112(c) is a right side view of the second part E502 constituting the upper housing E5; FIG. 112(d) is a back view of the second part E502 constituting the upper housing E5; FIG. 112(e) is a top view of the second part E502 constituting the upper housing E5; and FIG. 112(f) is a bottom view of the second part E502 constituting the upper housing E5. FIG. 112(g) is a front view in a case where the second part E502 has been subjected to printing.

The second part E502 is a flat-plate-like part which is formed of a transparent resin and constitutes the front surface of the upper housing E5. The second part E502 has a shape and a size, which allow the whole of the third component E501A of the first part E501 to be covered, is formed so as to have the substantially same shape and size as those of the third component E501A of the first part E501, and is bonded to the third component E501A of the first part E501. Thus, the second part E502 constitutes the front surface (inner surface) of the upper housing E5. In addition, the second part E502 has a shape and a size which are equivalent to those of the front surface of the first component E6 of the upper housing E5 (to be accurate, however, the size thereof is smaller by the thicknesses of the top surface, the both side surfaces, and the bottom surface of the third part E503, as described above).

On a right side and a left side of the second part E502, the sound holes E502A for the speakers E54 are provided. Specifically, the sound holes E502A are provided in portions corresponding to positions of the speaker opening E501E and the speaker opening E501F of the first part E501, respectively. The first part E501 and the second part E502 are bonded by an bonding sheet E58 in a region which excludes a region corresponding to the upper side LCD opening E501C, provided in the first part E501; a region corresponding to the inner imaging section opening E501D, provided therein; and a region corresponding to the opening E501G for the 3D LED E53, provided therein (refer to FIG. 106).

In addition, though the second part E502 is originally the transparent member, a region thereof other than the region corresponding to the upper side LCD opening E501C and other than the region corresponding to the inner imaging section opening E501D is subjected to screen printing (silkscreen printing) or the like such that at least the region corresponding to the upper side LCD opening E501C and the region corresponding to the inner imaging section opening E501D become transparent, the printing conducted from a back surface (a surface bonded to the first part E501). In addition, in a region corresponding to the opening E501G for the 3D LED E53 of the first part E501, characters which are inscribed so as to appear transparent are printed from the back surface. Specifically, as shown in FIG. 112(g), the region thereof other than the region corresponding to the upper side LCD opening E501C and other than the region corresponding to the inner imaging section opening E501D is subjected to printing (painting) using a predetermined color. In addition, in the region corresponding to the opening E501G for the 3D LED E53, characters inscribed so as to appear transparent (characters formed by printing only a background with a predetermined color) are printed such that predetermined characters (for example, "3D") are displayed when the 3D LED E53 emits light. In addition, in the vicinity of a right edge portion of the second part E502, characters (for example, "OFF") inscribed so as to appear transparent, which indicates that the 3-dimensional display of the upper side LCD E51 is turned off, are printed at a position of the lowest point of the parallax amount adjustment switch E55. The printing of these characters is conducted at the same time in the same processing.

Thus, the portions corresponding to the upper side LCD E51 and the inner imaging section E52 become transparent, are thereby made visible from the front surface, and serve as covers for the upper side LCD E51 and the inner imaging section E52. In addition, the characters are displayed when the 3D LED E53 emits light whereas a back side of the region other than these portions become invisible. Accordingly, when the first part E501 and the second part E502 are assembled, the screws and the like provided in the third component E501A of the first part E501 can be concealed.

(Description of Third Part)

Figure 113:
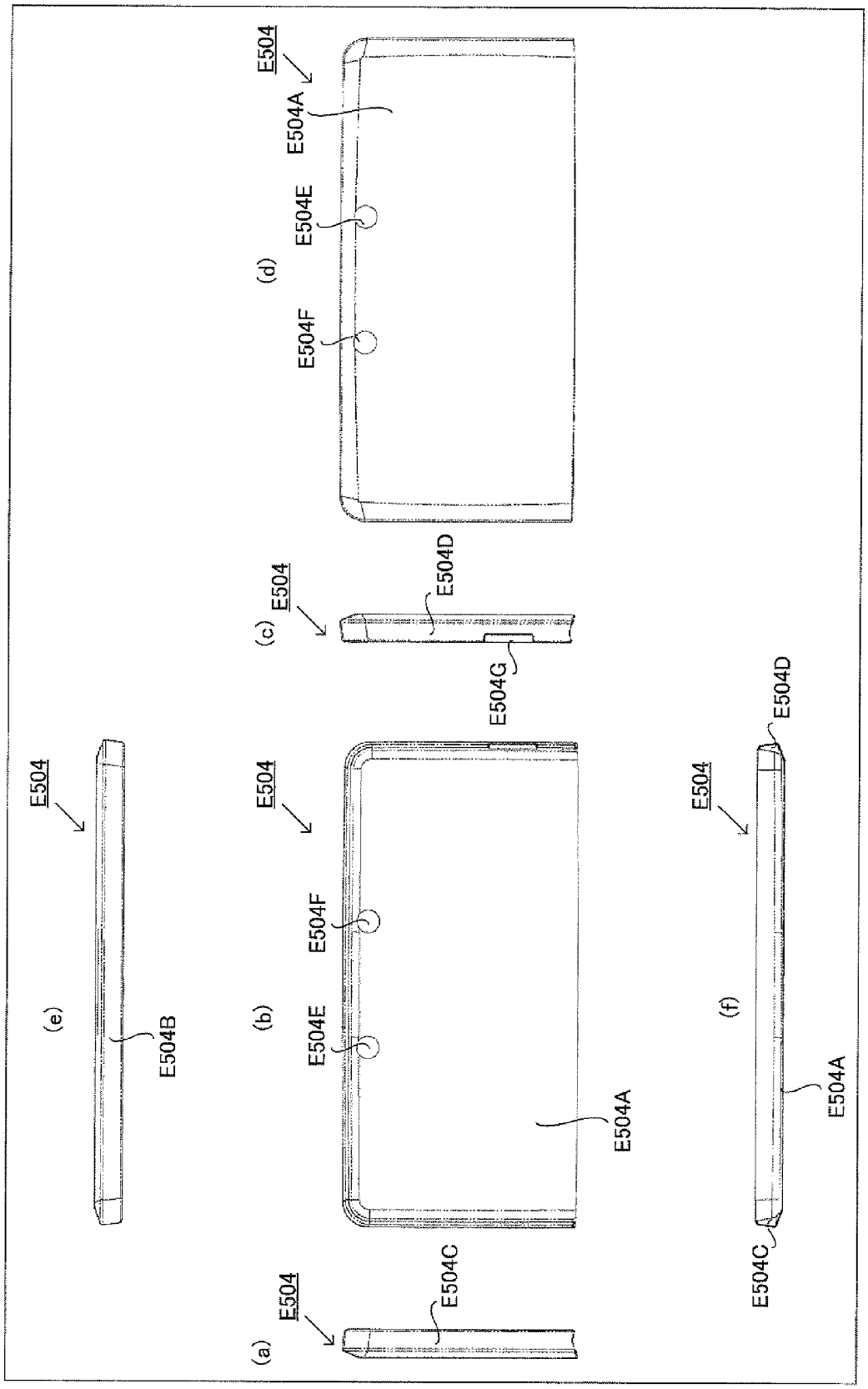
FIG. 113 shows a left side view, a front view, a right side view, a back view, a top view, and a bottom view of a third A part E504 constituting the upper housing E5.
Figure 114:
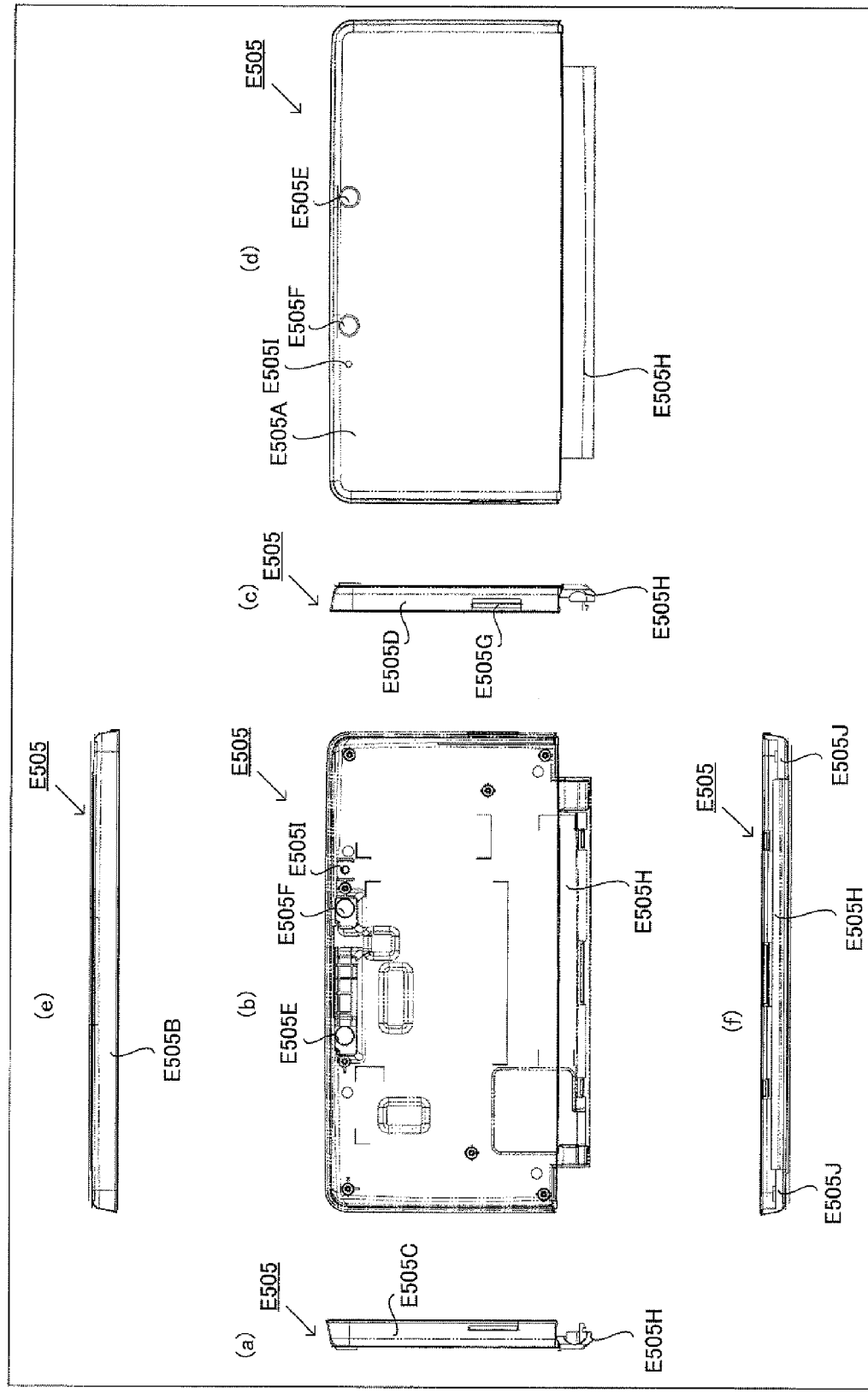
FIG. 114 shows a left side view, a front view, a right side view, a back view, a top view, and a bottom view of a third B part E505 constituting the upper housing E5.

Next, the third part E503 will be described. As described above, the outside third A part E504 and the inside third B part E505 constitute the third part E503. In other words, the third A part E504 is a part which becomes a surface of the back surface side when assembled, and the third B part E505 is a part which is present in a layer below the third A part E504. FIG. 113(a) is a left side view of the third A part E504 constituting the upper housing E5; FIG. 113(b) is a front view of the third A part E504 constituting the upper housing E5; FIG. 113(*c*) is a right side view of the third A part E504 constituting the upper housing E5; FIG. 113(*d*) is a back view of the third A part E504 constituting the upper housing E5; FIG. 113(*e*) is a top view of the third A part E504 constituting the upper housing E5; and FIG. 113(*f*) is a bottom view of the third A part E504 constituting the upper housing E5. In addition, FIG. 114(*a*) is a left side view of the third B part E505 constituting the upper housing E5; FIG. 114(*b*) is a front view of the third B part E505 constituting the upper housing E5; FIG. 114(*c*) is a right side view of the third B part E505 constituting the upper housing E5; FIG. 114(*d*) is a back view of the third B part E505 constituting the upper housing E5; FIG. 114(*e*) is a top view of the third B part E505 constituting the upper housing E5; and FIG. 114(*f*) is a bottom view of the third B part E505 constituting the upper housing E5.

The third part E503 is a part which the back surface, the left side surface, the right side surface, and the top surface of the upper housing E5 as well as a part (back surface side portion) of the first connecting part E7 constitute. In the third part E503, a recess is formed by the back surface, the left side surface, the right side surface, and the top surface of the third part E503. In the recess of the third part E503, the third component E501A of the first part E501 and the second part E502 are housed with the one on top of the other. In other words, horizontal and vertical dimensions of the third part E503, with the recess of the third part E503 viewed from the front surface, are designed so as to be the substantially same as those of each of the third component E501A of the first part E501 and the second part E502, as viewed from the front. In the recess of the third part E503, the third component E501A of the first part E501 and the second part E502 are housed with the one on top of the other, whereby the upper housing E5 is formed.

As shown in FIG. 113, the third A part E504 has: a back surface part E504A constituting the back surface of the upper housing E5; a top surface part E504B constituting the top surface of the upper housing E5; a left side surface E504C constituting the left side surface of the upper housing E5; and a right side surface E504D constituting the right side surface of the upper housing E5. A lower edge of the third A part E504 is open. In addition, in the back surface part E504A of the third A part E504, an opening E504E for exposing the outer imaging section (left) E56*a* and an opening E504F for exposing the outer imaging section (right) E56*b* are provided. In addition, in a front surface side edge portion of the right side surface of the third A part E504, an opening E504G for exposing the parallax amount adjustment switch E55 in a right side surface direction and a front surface direction. The third A part E504 is formed of a transparent resin.

In addition, as shown in FIG. 114, the third B part E505 has: a back surface part E505A; a top surface part E505B; a left side surface part E505C; a right side surface part E505D; a bottom surface part E505J; and a protrusion part E505H protruding downward from a lower edge of the back surface part E505A. The protrusion part E505H constitutes a back surface side portion of the first connecting part E7 of the upper housing E5. In other words, when the third B part E505 and the first part E501 are assembled, the first connecting part E7 of the upper housing E5 is formed by the protrusion part E505H of the third B part E505 and the protrusion part E501B of the first part E501. In addition, the recess of the third part E503 is formed by the back surface part E505A, the top surface part E505B, the left side surface part E505C, the right side surface part E505D, and the bottom surface part E505J of the third B part E505. In the recess, the third component E501A of the first part E501 and the second part E502 are housed with the one on top of the other. In addition, in the back surface part E505A of the third B part E505, an opening E505E for exposing the outer imaging section (left) E56*a* and an opening E505F for exposing the outer imaging section (right) E56*b* are provided. In addition, in the right side surface part E505D of the third B part E505, an opening E505G for exposing the parallax amount adjustment switch E55 in a right side surface direction and a front surface direction. In addition, in the back surface part E505A of the third B part E505, an opening E505I for exposing the LED E57 for the outer imaging section is formed.

In the recess formed by the back surface part E504A, the top surface part E504B, the left side surface E504C, and the right side surface E504D of the third A part E504, the third B part E505 is engaged. The third A part E504 and the third B part E505 are bonded with a double-sided adhesive tape or the like. Thus, the third part E503 is formed. When the third A part E504 and the third B part E505 are bonded, the opening E504E of the third A part E504 and the opening E505E of the third B part E505 coincide with each other; and the opening E504F of the third A part E504 and the opening E505F of the third B part E505 coincide with each other. Thus, the outer imaging section (left) E56*a* and the outer imaging section (right) E56*b* are exposed in a back surface direction of the upper housing E5. In addition, when the third A part E504 and the third B part E505 are bonded, the opening E504G of the third A part E504 and the opening E505G of the third B part E505 coincide with each other. Thus, the parallax amount adjustment switch E55 is exposed in a right side surface direction and a front surface direction. In addition, since the third A part E504 is formed of the transparent resin, even when the third A part E504 is bonded on an outer side (back surface side) of the third B part E505, light of the LED E57 for the outer imaging section is not blocked. The third part E503 may be formed by integrally forming the third A part E504 and the third B part E505.

As described above, the first part E501, the second part E502, the third A part E504, and the third B part E505 are assembled, whereby the upper housing E5 is formed.

(Relationship Among Parts)

Next, a relationship of sizes of the parts will be described. First, a size of the fifth part E201 and the third part E503 will be described.

Figure 115:
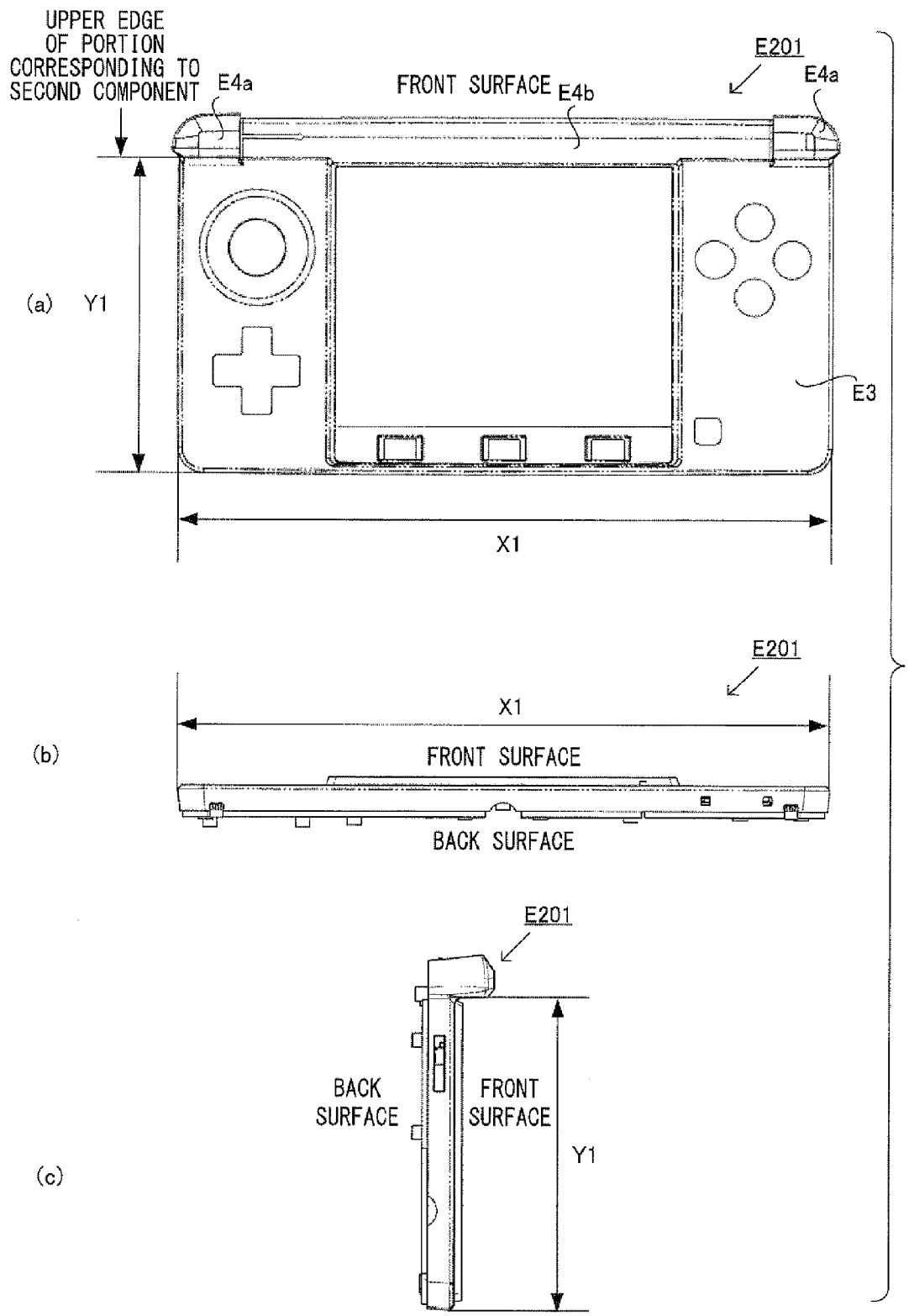
FIG. 115 shows horizontal and vertical dimensions, on a front surface side, of a portion corresponding to the second component E3 of the fifth part E201.

FIG. 115(*a*) is a front view of the fifth part E201, showing horizontal and vertical dimensions, on a front surface side, of a portion corresponding to the second component E3 of the fifth part E201. FIG. 115(*b*) is a bottom view of the fifth part E201, showing a horizontal dimension, on the front surface side, of the portion corresponding to the second component E3 of the fifth part E201. FIG. 115(*c*) is a left side view of the fifth part E201, showing a vertical dimension, on the front surface side, of the portion corresponding to the second component E3 of the fifth part E201. In FIG. 115(*b*), to facilitate the description, a portion corresponding to the second connecting part E4 of the fifth part E201 is omitted.

As shown in FIGS. E16A, E16B, and E16C, the horizontal dimension of an outer edge of a front surface side edge portion of a portion corresponding to the second component E3 of the fifth part E201 is set to be X1 (mm). The portion corresponding to the second component E3 of the fifth part E201 is substantially-rectangular-shaped as shown in FIG. 115(*a*) and is a part excluding the second connecting part E4 (E4*a* and E4*b*) of the fifth part E201. In addition, the vertical dimension of an outer edge of a front surface side edge portion of the portion corresponding to the second component E3 of the fifth part E201 set to be Y1 (mm). Here, the X1 is a distance (distance viewed the front surface), as viewed from the front, between an edge portion where the right side surface and the front surface of the fifth part E201 intersect and an edge portion where the left side surface and the front surface of the fifth part E201 intersect. In addition, the Y1 is a distance, as viewed from the front, between an edge portion where the bottom surface and the front surface of the fifth part E201 intersect and an upper edge of the portion corresponding to the second component E3 which is the front surface of the fifth part E201.

Figure 116:
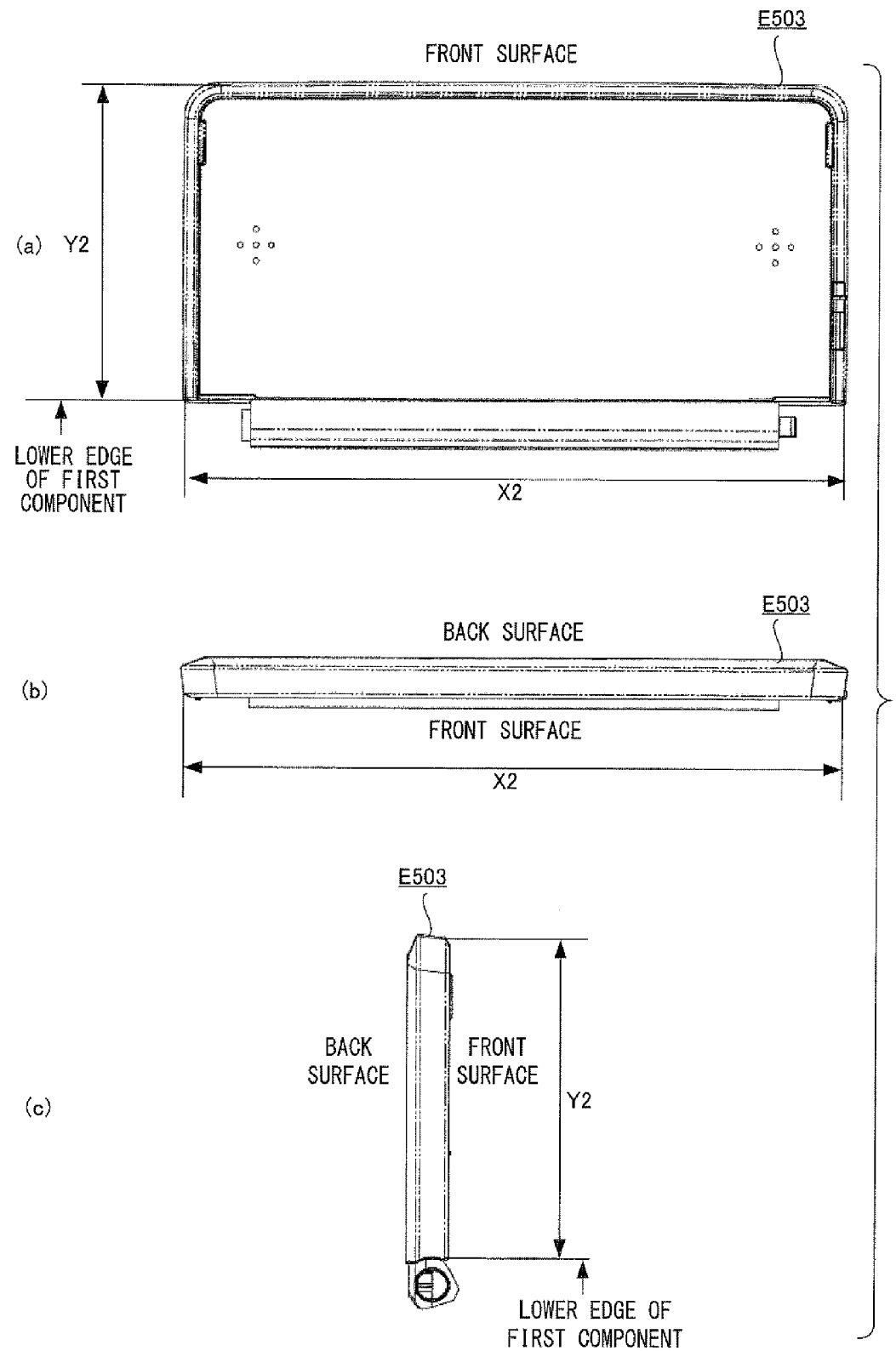
FIG. 116 shows horizontal and vertical dimensions of a portion corresponding to the first component E6 of the third part E503.

On the other hand, a size of the third part E503 will be described. FIG. 116(a) is a front view of the upper housing E5, showing horizontal and vertical dimensions of a portion corresponding to the first component E6 of the third part E503. FIG. 116(b) is a top view of the upper housing E5, showing a horizontal dimension of the portion corresponding to the first component E6 of the third part E503. FIG. 116(c) is a left side view of the upper housing E5, showing a vertical dimension of the portion corresponding to the first component E6 of the third part E503.

As shown in FIGS. E17A, E17B, and E17C, the horizontal dimension of an outer edge of a front surface side edge portion of the portion corresponding to the first component E6 of the third part E503 is set to be X2 (mm). In addition, the vertical dimension of an outer edge of a front surface side edge portion of the portion corresponding to the first component E6 of the third part E503 is set to be Y2 (mm). Here, the X2 is a distance, as viewed from the front, between the front surface side edge of the right side surface of the third part E503 and the front surface side edge of the left side surface of the third part E503. In addition, the Y2 is a distance, as viewed from the front, between the front surface side edge of the top surface of the third part E503 and the front surface side edge of each of the lower edges of the first component E6.

Here, the third part E503 is a part which the back surface, the left side surface, the right side surface, and the top surface of the upper housing E5 as well as a back surface side portion of the first connecting part E7 constitute. The substantially rectangular first component E6 and the first connecting part E7 constitute the upper housing E5. The portion corresponding to the first component E6 of the third part E503 is a part of the third part E503, which correspond to the first component E6 of the upper housing E5, that is, a substantially-rectangular-shaped part. In other words, the portion corresponding to the first component E6 of the third part E503 is a part of the third part E503, which excludes the back surface side portion of the first connecting part E7.

In addition, as described above, on the front surface side of the third part E503, the recess is formed by the surfaces of the third part E503, and in the recess, the first part E501 and the second part E502 are housed. When in the recess of the third part E503, the first part E501 and the second part E502 are housed, the upper housing E5 is formed. In other words, the outer edge of the front surface side edge portion (front surface edge) of the part (that is, the substantially rectangular part) corresponding to the first component E6 of the third part E503 coincides with the outer edge of the front surface edge portion of the first component E6 (substantially-rectangular-shaped portion) of the upper housing E5. Accordingly, in FIG. 116, the horizontal and vertical dimensions of the outer edges of the front surface edge portions of the first component E6 of the upper housing E5 are shown, and these dimensions show the horizontal and vertical dimensions of the outer edges of the front surface edge portions of the portion corresponding to the first component E6 of the third part E503.

When the upper housing E5 and the lower housing E2 are connected and folded, an upper edge (a lower edge of the first component in the open state, shown in FIG. 116(a)) of the first component E6 of the upper housing E5 coincides with an upper edge (an upper edge of the portion corresponding to the second component in the open state, shown in FIG. 115(a)) of the second component of the lower housing E2.

In addition, in FIG. 115(b), the horizontal dimension X1 of the front surface edge of the bottom surface of the fifth part E201 is shown, and the horizontal dimension of the front surface edge of the second component E3 of the fifth part E201 is X1 all over the fifth part E201. In other words, since the both side surfaces of the fifth part E201 extend so as to be perpendicular to the bottom surface (extend so as to be perpendicular to a plane of paper of FIG. 115(b)), in the second component E3, the horizontal dimension between the front surface edges is the X1 in every distance between the side surfaces of the fifth part E201. Similarly, since the bottom surface of the fifth part E201 extends so as to be perpendicular to the both side surfaces (extends so as to be perpendicular to a plane of paper of FIG. 115(c)), the vertical dimension between the front surface edges is the Y1 in every distance all over the bottom surface of the fifth part E201. Furthermore, similarly, in FIG. 116(b), a horizontal dimension X2 of the front surface edge of the top surface of the third part E503 is shown. Since the both side surfaces of the third part E503 extend so as to be perpendicular to the top surface (extend so as to be perpendicular to a plane of paper of FIG. 116(b)), in the first component E6, the horizontal dimension between the front surface edges is the X2 in every distance between the side surfaces of the third part E503. Similarly, since the top surface of the third part E503 extend so as to be perpendicular to the both side surfaces (extend so as to be perpendicular to a plane of paper of FIG. 116(c)), the vertical dimension between the front surface edges is the Y2 in every distance all over the top surface of the third part E503.

Here, the X2 is set to be larger than the X1, and the Y2 is set to be larger than the Y1. In other words, the horizontal dimension X1 of the outer edge of the front surface side edge portion of the portion corresponding to the second component E3 of the fifth part E201 is set to be smaller than the horizontal dimension X2 of the outer edge of the front surface side edge portion of the portion corresponding to the first component E6 of the third part E503. In addition, the vertical dimension Y1 of the outer edge of the front surface side edge portion of the portion corresponding to the second component E3 of the fifth part E201 is set to be smaller than the vertical dimension Y2 of the outer edge of the front surface side edge portion of the portion corresponding to the first component E6 of the third part E503.

Figure 117:
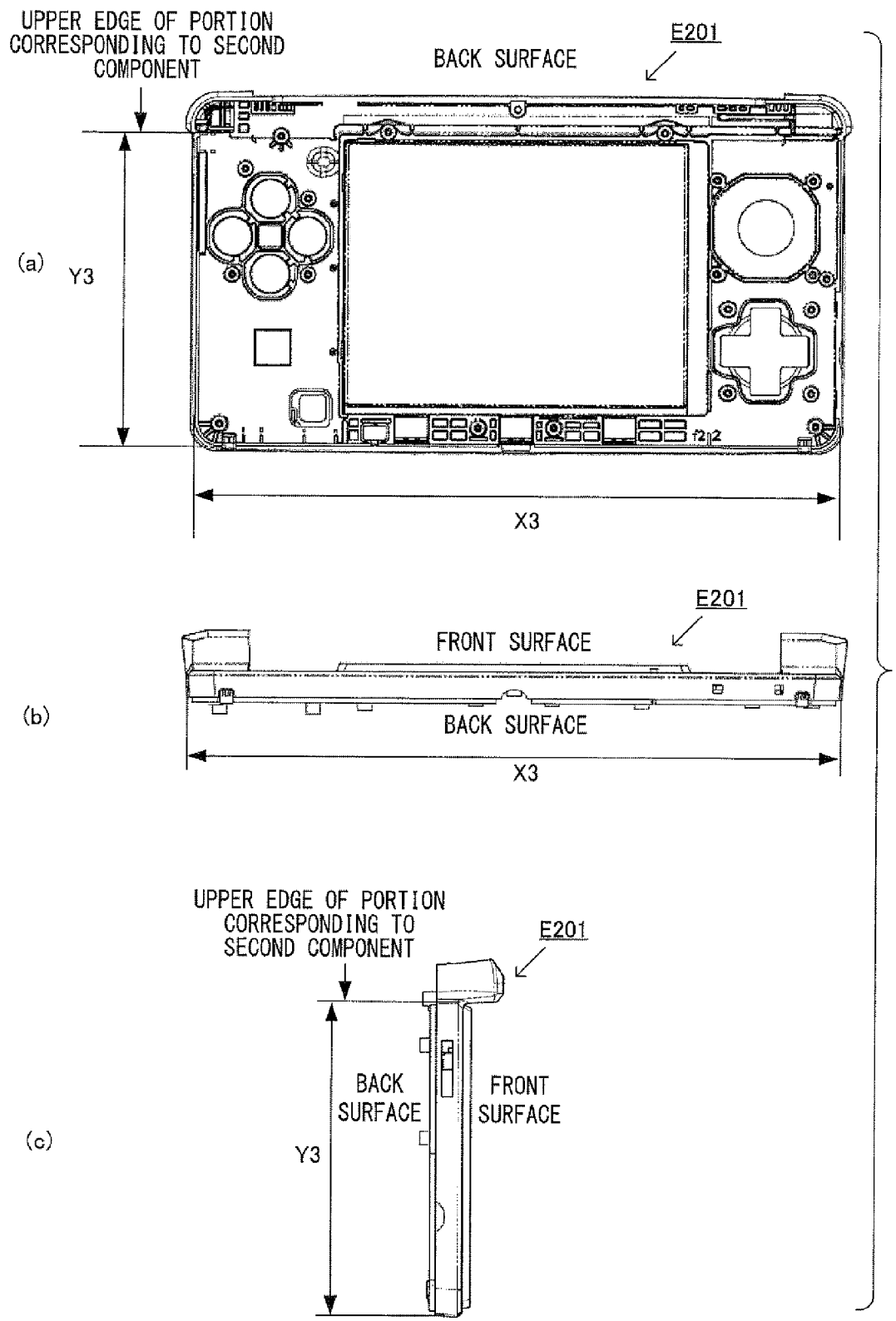
FIG. 117 shows horizontal and vertical dimensions, on a back surface side, of a portion corresponding to the second component E3 of the fifth part E201.

Next, sizes of the fifth part E201 and the fourth part E202 will be described. FIG. 117(a) is a back view of the fifth part E201, showing horizontal and vertical dimensions of a back surface side of a portion corresponding to the second component E3 of the fifth part E201. FIG. 117(b) is a bottom view of the fifth part E201, showing a horizontal dimension of the portion corresponding to the second component E3 of the fifth part E201. FIG. 117(c) is a left side view of the fifth part E201, showing a vertical dimension of the back surface side of the portion corresponding to the second component E3 of the fifth part E201.

As shown in FIGS. E18A, E18B, and E18C, the horizontal dimension of an outer edge of a back surface side edge portion of the portion corresponding to the second component E3 of the fifth part E201 is set to be X3 (mm). In addition, the vertical dimension of the outer edge of the back surface side portion of the portion corresponding to the second component E3 of the fifth part E201 is set to be Y3 (mm). Here, the X3 is a distance, as viewed from the front, between an edge of the back surface side portion of the left side surface of the fifth part E201 and an edge of the back surface side portion of the right side surface of the fifth part E201. In addition, the Y3 is a distance, as viewed from the front, between an edge of the back surface side edge portion of the bottom surface of the fifth part E201 and an upper edge of a portion corresponding to the second component E3 of the fifth part E201.

In FIG. 117(b), the horizontal dimension X3 between the back surface edges in the bottom surface of the fifth part E201 is shown. Since the both side surfaces of the fifth part E201 extend so as to be perpendicular to the bottom surface (extend so as to be perpendicular to a plane of paper of FIG. 117(b)), in the second component E3, the horizontal dimension between the back surface edges is the X3 in every distance between the side surfaces of the fifth part E201. Similarly, since the bottom surface of the fifth part E201 extends so as to be perpendicular to the both side surfaces (extends so as to be perpendicular to a plane of paper of E18C), the vertical dimension between the back surface edges is the Y3 in every distance all over the bottom surface of the fifth part E201.

Figure 118:
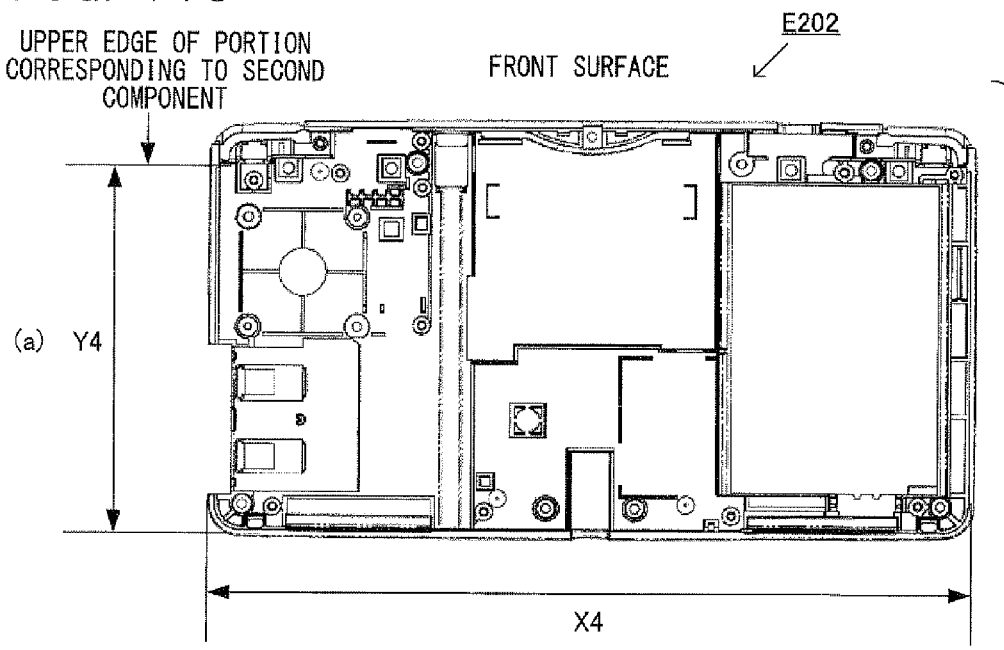
FIG. 118 shows horizontal and vertical dimensions, on the front surface side, of a portion corresponding to the second component E3 of the fourth part E202.

On the other hand, dimensions of the fourth part E202 will be described. FIG. 118(a) is a front view of the fourth part E202, showing horizontal and vertical dimensions of the front surface side of a portion corresponding to the second component E3 of the fourth part E202. FIG. 118(b) is a bottom view of the fourth part E202, showing a horizontal dimension of the front surface side of the portion corresponding to the second component E3 of the fourth part E202. FIG. 118(c) is a left side view of the fourth part E202, showing a vertical dimension of the front surface side of the portion corresponding to the second component E3 of the fourth part E202.

As shown in FIGS. E19A, E19B, and E19C, the horizontal dimension of an outer edge of the front surface side edge portion of the portion corresponding to the second component E3 of the fourth part E202 is set to be X4 (mm). The portion corresponding to the second component E3 of the fourth part E202 is the portion corresponding to of the second component E3 of the assembled lower housing E2 and is a region below an upper edge of the portion corresponding to the second component shown in FIG. 118(a) and FIG. 118(c). In other words, the portion corresponding to the second component E3 of the fourth part E202 is a part of the fourth part E202 and a substantially-rectangular-shaped part. In addition, the vertical dimension of an outer edge of the front surface side edge portion of the portion corresponding to the second component E3 of the fourth part E202 is set to be Y4 (mm). Here, the X4 is a distance, as viewed from the front, between a front surface side edge of the left side surface of the fourth part E202 and a front surface side edge of the right side surface of the fourth part E202. In addition, the Y4 is a distance, as viewed from the front, between a front surface edge of the bottom surface of the fourth part E202 and an upper edge of the portion corresponding to the second component E3 of the fourth part E202. In FIG. 118(a) and FIG. 118(c), the upper edge of the portion corresponding to the second component is shown. When the fourth part E202 and the fifth part E201 are assembled, the upper edge of the portion corresponding to the second component coincides with a lower edge (the upper edge of the portion corresponding to the second component of the fifth part E201 shown in FIG. 115) of each of the protrusion parts E4a of the second connecting part E4 of the fifth part E201.

In FIG. 118(b), the horizontal dimension X4 of the front surface edge of the bottom surface of the fourth part E202 is shown. Since both side surfaces of the fourth part E202 extend so as to be perpendicular to the bottom surface (extend so as to be perpendicular to a plane of paper FIG. 118(b)), in the second component E3, the horizontal dimension between the front surface edges is the X4 in every distance between the side surfaces of the fourth part E202. Similarly, the bottom surface of the fourth part E202 extends so as to be perpendicular to the both side surfaces (extends so as to be perpendicular to a plane of paper FIG. 118(c)), the vertical dimension between the front surface edges is the Y4 in every distance all over the bottom surface of the fourth part E202.

Here, the X4 is set to be larger than the X3, and the Y4 is set to be larger than the Y3. In other words, the horizontal dimension X3 between the outer edges of the back surface side edge portions of the portion corresponding to the second component E3 of the fifth part E201 is set to be smaller than the horizontal dimension X4 between the outer edges of the front surface side edge portions of the portion corresponding to the second component of the fourth part E202 all over the second component E3. In addition, the vertical dimension Y3 between the outer edges of the back surface side edge portions of the portion corresponding to of the second component E3 of the fifth part E201 is set to be smaller than the vertical dimension Y4 between the outer edges of the front surface side edge portions of the portion corresponding to the second component of the fourth part E202 all over the second component E3.

Note that X1>X3, X2>X4, Y1>Y3, and Y2>Y4 are set. Accordingly, the above-mentioned dimensions of the parts satisfy the following expressions (1) and (2).

$$X2>X4>X1>X3 \quad (1)$$

$$Y2>Y4>Y1>Y3 \quad (2)$$

Figure 119A:
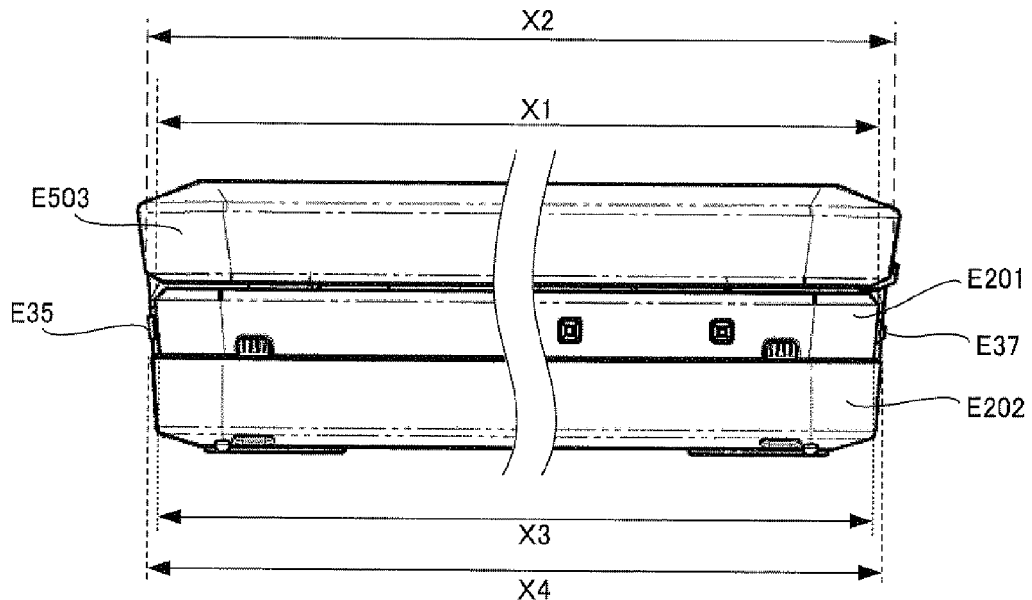
FIG. 119A shows an enlarged view of right and left edge portions of a bottom surface of the game apparatus E1 in a folded state.
Figure 119B:
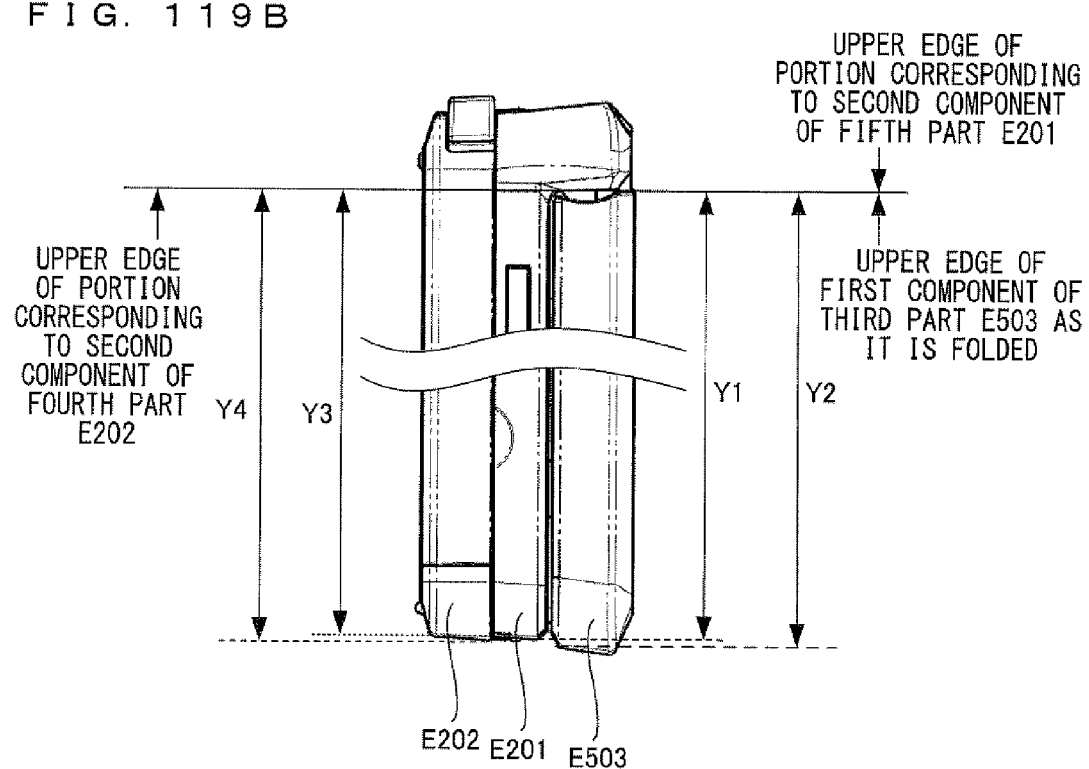
FIG. 119B shows an enlarged view of upper and lower edge portions of a left side surface of the game apparatus E1 in the folded state.

When the upper housing E5 and the lower housing E2 are configured by combining the above-described parts and the game apparatus E1 is folded, as shown in FIG. 119A and FIG. 119B, the game apparatus E1 comes to have a three-layered structure which has a shape in which a middle layer (the fifth part E201) is recessed between the other layers (a layer of the upper housing E5 and a layer of the fourth part E202). FIG. 119A is an enlarged view of right and left edge portions of a bottom surface of the game apparatus E1 in the folded state. FIG. 119B is an enlarged view of upper and lower edge portions of a left side surface of the game apparatus E1 in the folded state.

As shown in FIG. 119A, when the game apparatus E1 is folded, in the first component E6 and the second component E3, the front surface edges of the side surfaces of the fifth part E201 (edge portions where the side surfaces of the fifth part E201 and the front surface thereof intersect; upper edges of right and left both end portions of the fifth part E201 in FIG. 119A) are located inside the front surface edges of the side surfaces of the third part E503 (the back surface edges when folded (FIG. 101); lower edges of right and left both end portions of the third part E503 in FIG. 119A) (X1<X2). Here, when the upper housing E5 and the lower housing E2 are configured by assembling the parts, a center in a horizontal direction of the fifth part E201 and a center in a horizontal direction of the third part E503 coincide with each other. Since as described above, the fifth part E201 and the third part E503 are assembled such that the center in the horizontal direction of the fifth part E201 and the center in the horizontal direction of the third part E503 coincide with each other, the fifth part E201 and the third part E503 which satisfy X1<X2 are in the above-described relationship. In other words, in a state where the game apparatus is assembled, the front surface edges of the right and left side surfaces of the fifth part E201 are located inside the front surface edges of the right and left side surfaces of the third part E503 (the front surface edges in a state where the upper housing E5 is opened; and the back surface edges in a state where the upper housing E5 is folded) all over the second component.

In addition, as shown in FIG. 119B, all over the first component E6 and the second component E3, the front surface edge of the bottom surface of the fifth part E201 (the front surface side edge portion of the bottom surface of the fifth part E201; a right edge portion of the bottom surface of the fifth part E201 in FIG. 119B) is located inside the front surface edge of the top surface of the third part E503 (the front surface edge of the top surface with the upper housing E5 opened and the back surface edge of the bottom surface in (FIG. 101(b)) in the folded state; and the left edge of the lower edge of the third part E503 in FIG. 119B) (Y1<Y2). Here, when the upper housing E5 and the lower housing E2 are configured by assembling the parts and the upper housing E5 is folded, the upper edge of the portion corresponding to the second component of the fifth part E201 coincides with the upper edge of the portion corresponding to the first component of the third part E503 (refer to FIG. 119B). Therefore, in a state where the game apparatus is assembled as described above, all over the bottom surface, the front surface edge of the bottom surface of the fifth part E201 is located inside the back surface edge of the bottom surface of the third part E503 (the back surface edge of the bottom surface in the folded state and the front surface edge of the top surface in the opened state) when folded.

In addition, as shown in FIG. 119A, all over the second component E3, the back surface edges of the side surfaces of the fifth part E201 (the back surface side edge portions of the side surfaces of the fifth part E201; and the lower edges of the right and left both end portions of the fifth part E201 in FIG. 119A) are located inside the front surface edges of the side surfaces of the fourth part E202 (the front surface side edge portions of the side surfaces of the fourth part E202; and the upper edges of the right and left both end portions of the fourth part E202 in FIG. 119A) (X3<X4). Here, when the upper housing E5 and the lower housing E2 are configured by assembling the parts, a center of a horizontal direction of the fifth part E201 and a center of a horizontal direction of the fourth part E202 coincide with each other. As described above, since the fifth part E201 and the fourth part E202 are assembled such that the center of the horizontal direction of the fifth part E201 and the center of the horizontal direction of the fourth part E202 coincide with each other, the fifth part E201 and the fourth part E202 which satisfy X3<X4 are in the above-described relationship. In other words, the back surface edges of the right and left side surfaces of the fifth part E201 are located inside the front surface edges of the right and left side surfaces of the fourth part E202 all over the second component E3.

In addition, as shown in FIG. 119B, all over the second component E3, the back surface edge of the bottom surface of the fifth part E201 (the back surface side edge portion of the bottom surface of the fifth part E201; and a left edge portion of the bottom surface of the fifth part E201 in FIG. 119B) is located inside the front surface edge of the bottom surface of the fourth part E202 (the front surface side edge portion of the bottom surface of the fourth part E202; and a right edge portion of the bottom surface of the fourth part E202 in FIG. 119B) (Y3<Y4). Here, when the upper housing E5 and the lower housing E2 are configured by assembling the parts, an upper edge of the portion corresponding to the second component of the fifth part E201 and an upper edge of the portion corresponding to the second component of the fourth part E202 coincide with each other. Therefore, as described above, the back surface edge of the bottom surface of the fifth part E201 is located inside the front surface of the bottom surface of the fourth part E202 all over the bottom surface. Thus, when folded, the game apparatus E1 has formed therein continuous recesses in the side surfaces and the bottom surface.

When the game apparatus E1 is configured by assembling the parts formed as described above, as shown in FIG. 119A and FIG. 119B, in a state where the game apparatus E1 is folded, the recesses in the side surfaces and the bottom surface, which are continuously connected, are formed in a middle part of the game apparatus E1. In other words, as shown in FIG. 119A, when the game apparatus E1 is folded, the game apparatus E1 comes to have the three-layered structure whose middle layer is recessed. On a left side of the middle layer, the sound volume switch E35 is arranged, and on a right side of the middle layer, the wireless switch E37 is arranged (FIG. 119A).

As described above, since the switches (E35 and E37) are arranged in the middle layer which become recessed when the game apparatus E1 is folded, erroneous operations of the switches, caused while the game apparatus E1 is not in use, can be prevented. In other words, while the game apparatus E1 is not in use, the game apparatus E1 is in the folded state and the middle layer of the game apparatus E1 becomes recessed in such a state. Therefore, a degree to which key tops of the switches (E35 and E37) protrude in side surface directions and a bottom surface direction become small, as compared with a case where the game apparatus E1 has a two-layered structure (in other words, a case where the middle layer is not recessed). In a case where a game apparatus whose lower housing E2 is formed so as to be one layer is folded, since the key tops of the switches (E35 and E37) protrude in the side surface directions, a finger(s) of a user or other object may contact the switches while the game apparatus E1 is being carried, whereby erroneous operations may be easily caused. However, the middle layer which becomes recessed when the game apparatus E1 is folded is formed and the switches are arranged as described above, the degree to which the key tops of the switches protrude in the side surface directions become small, and thus, the erroneous operations caused when the game apparatus E1 is folded can be prevented.

In addition, since the game apparatus E1 has the three-layered structure whose middle layer is recessed when closed, it is easy to open and close the game apparatus E1. In other words, since the game apparatus E1 has the recessed portion formed in the middle part of the three-layered structure, a finger(s) of a user can be easily caught in the recess and the upper housing E5 can be easily lifted up.

In addition, since the game apparatus E1 has the three-layered structure whose middle layer is recessed, it is easy to open and close the cover E36a covering the SD card insertion slot of the SD card unit E36. The SD card insertion slot of the SD card unit E36 is provided in the left side surface of the fourth part E202 such that the front surface side thereof is open (refer to FIG. 109(a)). The SD card insertion slot is covered by the cover E36a. Since a back surface side of the middle layer (fifth part E201) is more recessed than a front surface side of a lower layer (fourth part E202), a front surface side edge portion of the cover E36a is slightly exposed in a boundary between the lower layer and the middle layer. Accordingly, it is easy for a user to pick up the front surface side edge portion of the cover E36a with his or her finger and to open and close the cover E36a. Furthermore, since in the left side surface of the fifth part E201, in a portion corresponding to the SD card insertion slot provided in the fourth part E202, the recess E201K is formed (refer to FIG. 108(a)), the cover E36a can be more easily opened and closed.

Figure 120:
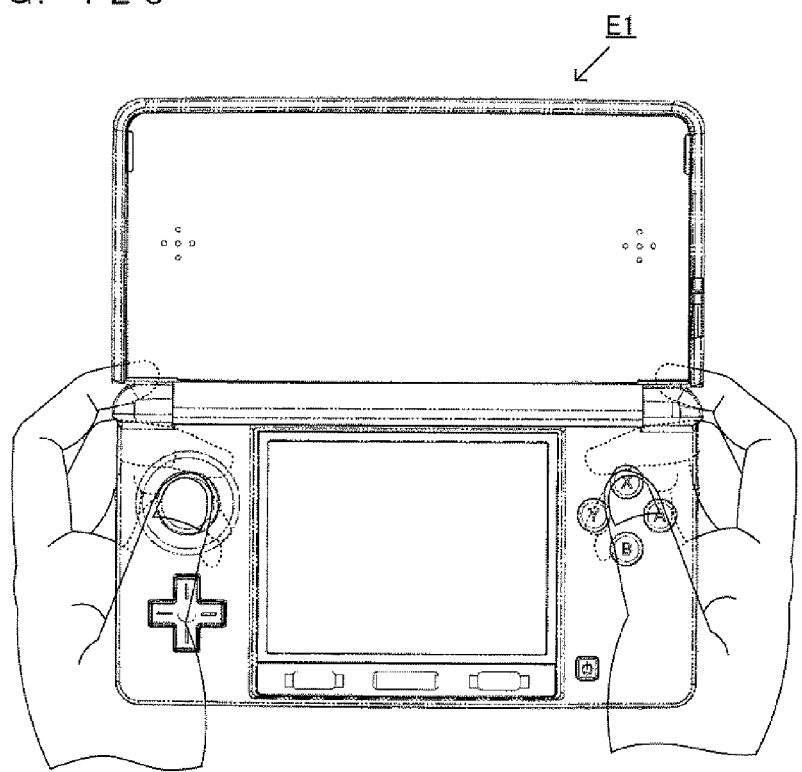
FIG. 120 shows a user holding and operating the game apparatus E1.

In addition, when the game apparatus E1 is used, a user opens the game apparatus E1, holds the lower housing E2 with his or her both hands, and looks straight at the upper side LCD E51. FIG. 120 is a diagram illustrating a view in which a user holds the game apparatus E1 and operates the game apparatus E1. Since the switches (E35 and E37) are arranged in the middle layer (fifth part E201) of the right and left side surfaces of the lower housing E2, when a user holds the lower housing E2, it is easy for a user to perform operations with his or her index finger, middle finger, or the like. In other words, the fifth part E201 (middle layer) of the lower housing E2, in which the switches (E35 and E37) are arranged, is more recessed inward than the fourth part E202. Therefore, a user can slide his or her finger(s) in up-and-down directions along this recess (the recess formed by the front surface edges of the side surfaces of the fourth part E202 and the side surfaces of the fifth part E201). Accordingly, while looking straight at the upper side LCD E51 (without visually checking the switches), a user can check the positions of the switches (E35 and E37) and operate the switches (E35 and E37).

Figure 121:
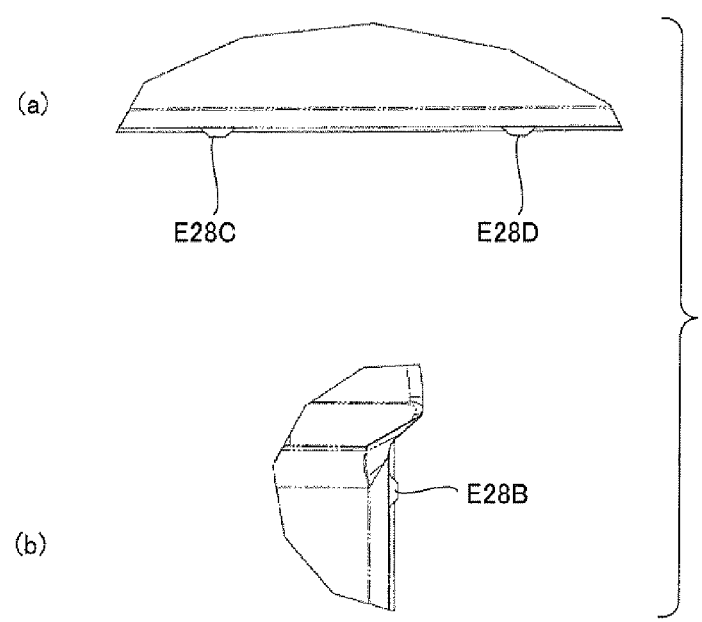
FIG. 121 is a diagram illustrating an enlarged view of portions in which the power LED E28C, the charge LED E28D, and the wireless LED E28B are arranged, as viewed from the front in the state where the game apparatus E1 is opened.

In addition, the LEDs E28B, E28C, and E28D are arranged in the side surface and the bottom surface of the fifth part E201 (middle layer). The LEDs E28B, E28C, and E28D are provided in the side surface and the bottom surface thereof, whereby the LEDs E28B, E28C, and E28D are visible when the game apparatus E1 is both opened and closed. However, when LEDs are provided in the side surface and the bottom surface, visibility of these LEDs from the front is poor. Therefore, the LED lenses are protruded by utilizing the recesses, whereby it is made possible to visually check a lighting state of each of the LEDs also from the front. In addition, the wireless switch E37 and the LED E28B indicating a functioning state of the wireless switch E37 can be provided in the same plane so as to be adjacent to each other, thereby allowing intuitive grasping. In a state where the game apparatus E1 is used (state where the game apparatus E1 is opened), the LED lenses of the LEDs E28B, E28C, and E28D are slightly protruded in a side surface direction and a bottom surface direction. FIG. 121(a) is a diagram illustrating an enlarged view of portions in which the power LED E28C and the charge LED E28D are arranged, as viewed from the front in the state where the game apparatus E1 is opened. FIG. 121(b) is a diagram illustrating an enlarged view of a portion in which the wireless LED E28B is arranged, as viewed from the front in the state where the game apparatus E1 is opened. As shown in FIGS. E22A and E22B, the LEDs E28B, E28C, and E28D are slightly protruded in the bottom surface direction and the side surface (right side surface) direction, as viewed from the front in the state where the game apparatus E1 is opened. Therefore, when the game apparatus E1 is viewed from the front, since a user can visually check the LEDs E28B, E28C, and E28D, a user can confirm a state of the game apparatus E1 (whether the power is turned on or off, whether or not the wireless communication is established, and the like). In addition, because these are provided in the recessed middle layer, even when the LED lenses are protruded, a degree to which the LED lenses are protruded from the side surface of the apparatus when the apparatus is folded can be eliminated or made small.

In addition, since the game apparatus E1 has the above-described three-layered structure, by varying colors, designs, and the like of the respective layers, it is made possible for the game apparatus E1 to have a lot of design variations (colors, designs, textures, etc.). For example, the upper layer (upper housing E5), the middle layer (fifth part E201), the lower layer (fourth part E202 and the sixth part E203) are designed so as to have the same type of color and to change color strengths. In addition, for example, the three layers can be designed so as to have colors which are different from one another. Furthermore, by coloring the sixth part E203 with a different color, color variations can be increased.

In addition, the inner surface of the upper housing E5 of the game apparatus E1 is covered by the second part E502 which is a flat plate having the transparent region. Therefore, the screws with which the first part E501 and the third part E503 are fastened are not exposed above the inner surface. In addition, the whole surface of the inner surface of the upper housing E5 is covered by the second part E502, whereby the inner surface and the upper side LCD E51 arranged in the inner surface can be caused to have a feeling of oneness and a feeling of unity. Thus, a user's attention can be brought to the upper side LCD E51. In other word, since the inner surface of the upper housing E5 has no irregularities and is fainted to be flat, when a user looks straight at the inner surface of the upper housing E5, a user can more easily pay attention to the upper side LCD E51. When a user look at a 3-dimensional image displayed on the upper side LCD E51, it is necessary to focus a user's eyes frontward from the screen or toward a depth direction of the screen. In this case, if the inner surface of the upper housing E5 has irregularities, there may be a case where it is difficult to focus a user's eyes. However, since the inner surface of the upper housing E5 is covered by the second part E502, it is easier for a user to look at the upper side LCD E51.

In addition, the second part E502 has the region, which is other than the regions corresponding to the upper side LCD ESI and the inner imaging section E52 and is subjected to printing from the back surface, and is bonded to the first part E501 (FIG. 112(g)). In addition, on the second part E502, the characters inscribed so as to appear transparent are printed on the region thereof which covers the LED and corresponds to the LED. As described above, the first part E501 and the second part E502 are separated, whereby printing processes conducted when the upper housing E5 is subjected to the printing can be made efficient. For example, when the printing is conducted directly onto the first part E501, and the inner surface of the upper housing E5 is thereby configured, the housing member which is formed by a mold is first subjected to painting. It is necessary for the painted housing member to be dried for a predetermined period of time. The dried housing member is subjected to pad printing. After the pad printing, the housing member is subjected to coating or the like for surface protection. These processes are independent processes and are conducted by using apparatuses which are different from one another. In addition, in the pad printing, it is necessary to accurately fix a position of the housing member, and if the position is not accurately fixed, the printing may be deviated. On the other hand, as in the present embodiment, in a case where the second part E502 is subjected to the printing and is bonded to the first part E501, the above-mentioned printing processes can be made efficient. In other words, the first part E501 and the second part E502 are formed in the separate processes, and while the first part E501 is being subjected to the painting and the drying, the second part E502 can be subjected to the printing. For the second part E502, the flat-plate-like transparent resin subjected to hard coating can be instantaneously subjected to the printing through the screen printing. Thus, in a case where the configuration is made by the two parts, the processes can be conducted in parallel, and time periods required for the printing processes are different from each other. As described above, the first part E501 and the second part E502 are separated, whereby the printing processes conducted when the upper housing E5 is subjected to the printing can be made efficient. In addition, the second part E502 which is the transparent member is subjected to the printing, and in the back surface thereof, the LED is arranged, whereby a variety of printing of characters inscribed so as to appear transparent and the like can be conducted and these characters and the like can be made luminous by the LED.

In addition, since the second part E502 covers the whole surface of the upper housing E5, the second part E502 can also serve as a lens cover for the inner imaging section E52.

In addition, since the substantially whole surface of the back surface of the lower housing E2 is covered by the sixth part E203, the screws fastening the fourth part E202 and the fifth part E201 can be concealed. Since the screws are concealed by the sixth part E203, with no limitations in terms of an external view imposed, the number and the arrangement of the parts housed inside the lower housing E2 can be designed, and a degree of freedom with which screws required in terms of a strength are arranged can be increased. In addition, since the sixth part E203 constitutes the back surface of the lower housing E2, by changing the color, the design, and the like of the sixth part E203, the design variations can be imparted. For example, if the sixth part E203 covers only one part of the back surface of the lower housing E2 (for example, one part where the battery E41 is arranged) and the back surface of the fourth part E202 or other member constitutes the other part, the back surface of the lower housing E2 comes to be formed by a plurality of regions. Therefore, in a case where a pattern is drawn on the whole back surface of the lower housing E2, boundaries of the regions are made discontinuous, which is not favorable in terms of an external view, and it is made difficult to draw a complicated pattern on the back surface. However, since the whole surface of the back surface of the lower housing E2 is covered by the sixth part E203, a complicated pattern or the like can be drawn.

In addition, in the inner surface of the lower housing E2, the sheet keys E27A, E27B, and E27C are arranged. The game apparatus E1 has a multitude of the buttons or the like (E23, E24, and E25) for operations and the sheet keys E27A, E27B, and E27C are used for uses which are different from those of these buttons or the like (E23, E24, and E25) for operations. In other words, whereas the buttons or the like (E23, E24, and E25) for operations are mainly used for the operations of characters and the like which appear in a game, the sheet keys E27A, E27B, and E27C are mainly used for special purposes such as switching of the screens and starting and suspending of a game. Thus, since the different kinds of the sheet keys constitute the keys (E27A, E27B, and E27C) whose uses are different from one another, a confusion of a user caused in a case where the game apparatus E1 has a multitude of operation buttons can be prevented and erroneous operations can be thereby prevented. In other words, if the game apparatus E1 has a multitude of switches, buttons, and the like, when a user performs some operation, there may be a case where it is difficult for a user to find which switch or button should be pressed and therefore, a confusion may be easily caused. However, as in a case of the game apparatus E1, the sheet keys constitute the keys whose uses are different from one another, thereby preventing the above-mentioned confusion and erroneous operations.

(Internal Configuration of Game Apparatus E1)

Next, with reference to FIG. 122, an internal electrical configuration of the game apparatus E1 will be described. FIG. 122 is a block diagram illustrating the internal configuration of the game apparatus E1. As shown in FIG. 122, in addition to the above-described parts, the game apparatus E1 includes electronic components such as an information processing section E42, a main memory E43, an internal memory E44 for storing data, a real-time clock (RTC) E45, an acceleration sensor E46, a gyro sensor E49, and a power circuit E48. These electronic components are implemented on an electronic circuit board and housed inside the lower housing E2.

The information processing section E42 is information processing means which includes a CPU (Central Processing Unit) E421 for executing a predetermined program, a GPU (Graphics Processing Unit) E422 for performing image processing, and the like. In the present embodiment, the predetermined programs are stored in memories in the game apparatus E1 (for example, the game card E70 connected to the game card unit E32 and the internal memory E44 for storing data). By executing the predetermined program, the CPU E421 of the information processing section E42 shoots an image by using the above-mentioned outer imaging section E56 and inner imaging section E52 and performs a predetermined game. The program executed by the CPU E421 of the information processing section E42 may be obtained from other apparatus through communication with other apparatus. In addition, the information processing section E42 includes a VRAM (Video RAM) E423. The GPU E422 of the information processing section E42 generates an image in accordance with an instruction from the CPU E421 of the information processing section E42 and writes it in the VRAM E423. The GPU E422 of the information processing section E42 outputs the image written in the VRAM E423 to the upper side LCD E51 and/or the lower side LCD E21, and the image is displayed on the upper side LCD E51 and/or the lower side LCD E21.

Connected to the information processing section E42 are the main memory E43, the game card unit E32, the SD card unit E36, the internal memory E44 for storing data, the wireless communication module E39, the infrared-ray communication module E30, the RTC E45, the acceleration sensor E46, the LEDs E28A, E28B, E28C, and E28D, the 3D LED E53, the cross key E23, the buttons (the operation button unit E24, the buttons E27A, E27B, and E27C, and the buttons E29A, E29B, and E29C), the analog key E25, the lower side LCD E21, the upper side LCD E51, the outer imaging section E56, the inner imaging section E52, the switches (the sound volume switch E35, the wireless switch E37, and the parallax amount adjustment switch E55), the interface (I/F) circuit E47, and the like.

The main memory E43 is volatile storage means used as a work region and a buffer region for (the CPU E421 of) the information processing section E42. In other words, the main memory E43 temporarily stores various kinds of data used while the above-mentioned predetermined program is being executed and temporarily stores a program obtained externally (from the game card E70 or from other apparatus or the like). In the present embodiment, as the main memory E43, for example, a PSRAM (Pseudo-SRAM) is used.

The game card E70 is nonvolatile storage means for storing the program executed by the information processing section E42. For example, a read-only semiconductor memory constitutes the game card E70. Upon connecting the game card E70 to the game card unit E32, the information processing section E42 can load the program stored in the game card E70. By executing the program loaded by the information processing section E42, predetermined processing is performed. A nonvolatile random access memory (for example, a NAND-type flash memory) constitutes the SD card E71, and the SD card E71 is used for storing predetermined data. For example, stored in the SD card E71 are an image shot by the outer imaging section E56 and an image shot by other apparatus. Upon connecting the SD card E71 to the SD card unit E36, the information processing section E42 reads an image stored in the SD card E71, and the image can be displayed on the upper side LCD E51 and/or the lower side LCD E21

A nonvolatile random access memory (for example, a NAND-type flash memory) constitutes the internal memory E44 for storing data, and the internal memory E44 for storing data is used for storing predetermined data. For example, stored in the internal memory E44 for storing data are data and a program which are downloaded through wireless communication via the wireless communication module E39.

In addition, connected to the information processing section E42 is the acceleration sensor E46. The acceleration sensor E46 detects magnitudes of accelerations (linear accelerations) in straight-line directions along three-axis (an x-axis, a y-axis, and a z-axis) directions. The acceleration sensor E46 is provided inside the lower housing E2. With the game apparatus E1 being set in the open state and viewed from the front (FIG. 100), the acceleration sensor E46 detects the magnitudes of the linear accelerations of the x axis which is a long-side direction of the lower housing E2, the y axis which is a short-side direction of the lower housing E2, and the z axis which is a direction perpendicular to the inner surface (front surface) of the lower housing E2. Although as the acceleration sensor E46, for example, a capacitance type acceleration sensor is used, other type acceleration sensor may be used. In addition, the acceleration sensor E46 may be an acceleration sensor which detects one axis or two axes. The information processing section E42 receives data (acceleration data) indicating the accelerations detected by the acceleration sensor E46 and can detect a posture and a motion of the game apparatus E1.

In addition, connected to the information processing section E42 is the gyro sensor E49. The gyro sensor E49 detects magnitudes of angular velocities in three-axis directions. The gyro sensor E49 detects the angular velocities, and the information processing section E42 can thereby detect a posture and a motion of the game apparatus E1. In other words, by integrating the angular velocities detected by the gyro sensor E49 with respect to time, the information processing section E42 can detect rotation angles of the axes. When the game apparatus E1 is in a predetermined posture, it is necessary to initialize the gyro sensor E49. By detecting a change occurring from the predetermined posture based on the angular velocities detected by the gyro sensor E49, the information processing section E42 can detect a posture in a space of the game apparatus E1.

The RTC E45 counts a time and outputs it to the information processing section E42. Based on the time counted by the RTC E45, the information processing section E42 calculates a current time (date). The power circuit E48 controls electric power supplied from the power source (battery E41), which the game apparatus E1 has, and supplies the electric power to each of the parts of the game apparatus E1.

In addition, connected to the information processing section E42 is the I/F circuit E47. Connected to the I/F circuit E47 are the touch panel E22, the microphone E40, and the speakers E54. Specifically, the speakers E54 are connected to the I/F circuit E47 via an amplifier not shown. The microphone E40 detects a voice of a user and outputs an audio signal to the I/F circuit E47. The amplifier amplifies the audio signal from the I/F circuit E47, and the voice is outputted from the speakers E54.

In addition, the cross key E23, the analog key E25, the buttons (E24, E27, and E29), and the switches (E35, E37, and E55) are connected to the information processing section E42. The information processing section E42 detects that these operation means (the keys, the buttons, the switches, etc.) are operated and performs predetermined processes in accordance with the operated operation means.

The lower side LCD E21 and the upper side LCD E51 are connected to the information processing section E42. The lower side LCD E21 and the upper side LCD E51 display images in accordance with instructions issued from (the GPU E422 of) the information processing section E42. For example, the information processing section E42 causes the upper side LCD E51 to display a 3-dimensional image (stereoscopically viewable image) using an image for a right eye and an image for a left eye, which are shot by the outer imaging section E56, and a two-dimensional image shot by the inner imaging section E52.

Specifically, the information processing section E42 is connected to an LCD controller (not shown) of the upper side LCD E51 and causes the LCD controller to control turning on/off of the parallax barrier. When the parallax barrier of the upper side LCD E51 is on, an image for a right eye and an image for a left eye, which have been stored in the VRAM E423 of the information processing section E42 (shot by the outer imaging section E56), are outputted to the upper side LCD E51. More specifically, by alternately repeating processing of reading out pixel data per line in a vertical direction with respect to the image for a right eye and processing of reading out pixel data per line in a vertical direction with respect to the image for a left eye, the LCD controller reads out the image for a right eye and the image for a left eye from the VRAM E423. Thus, the image for a right eye and the image for a left eye are divided into strip-like images whose pixels vertically line up, each of the pixels being one line, and an image in which each of the strip-like images of the divided image for a right eye and each of the strip-like images of the divided image for a left eye are alternately arranged is displayed on the screen of the upper side LCD E51. The image is visually recognized by a user via the parallax barrier of the upper side LCD E51, whereby a user's right eye visually recognizes the image for a right eye and a user's left eye visually recognizes the image for a left eye. As described above, on the screen of the upper side LCD E51, the stereoscopically viewable image is displayed.

The outer imaging section E56 and the inner imaging section E52 are connected to the information processing section E42. In accordance with instructions from the information processing section E42, the outer imaging section E56 and the inner imaging section E52 shoot images and output data of the shot images to the information processing section E42.

In addition, the 3D LED E53 is connected to the information processing section E42. The information processing section E42 controls lighting of the 3D LED E53. As above, the internal configuration of the game apparatus E1 is described.

While the invention has been described in detail, the foregoing description is in all aspects illustrative and not restrictive. It should be understood that numerous other modifications and variations can be devised without departing from the scope of the invention. It should be understood that the scope of the present invention is interpreted only by the scope of the claims. It also should be understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any conflicition, the present specification (including meanings defined herein) has priority.

Hereinafter, relevant embodiments associated with the above embodiments will be disclosed.

An image display program according to a first relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye, and causes a computer to function as first position orientation calculation means, virtual camera setting means, right virtual space image generation means, left virtual space image generation means, and display control means. The first position orientation calculation means recognizes a predetermined shooting target in a piece of real world image data outputted from one of the real camera for a right eye and the real camera for a left eye, among pieces of real world image data respectively outputted from the real camera for a right eye and the real camera for a left eye, and calculates position orientation information indicating relative positions and relative orientations of the one of the real cameras and the predetermined shooting target with respect to each other. The virtual camera setting means determines the position and the orientation of a right virtual camera for generating an image for a right eye, and the position and the orientation of a left virtual camera for generating an image for a left eye, in a predetermined virtual space, by using the position orientation information calculated by the first position orientation calculation means. The right virtual space image generation means generates a right virtual space image indicating the predetermined virtual space as it is looked at from the right virtual camera. The left virtual space image generation means generates a left virtual space image indicating the predetermined virtual space as it is looked at from the left virtual camera. The display control means superimposes the right virtual space image onto the piece of real world image data outputted from the real camera for a right eye, and superimposes the left virtual space image onto the piece of real world image data outputted from the real camera for a left eye, to output images for a stereoscopic view to the stereoscopic display apparatus.

It is noted that the virtual camera setting means may determine the position and the orientation of the right virtual camera for generating the image for a right eye, and the position and the orientation of the left virtual camera for generating the image for a left eye, in the predetermined virtual space, without using a result of recognition of the predetermined shooting target in the piece of real world image data outputted from the other one of the real cameras which is different from the one of the real camera in the first position orientation calculation means.

According to the above configuration, even if the predetermined shooting target can be recognized only in one of the two pieces of real world image data respectively outputted from the two real cameras, the position and the orientation of one of the two virtual cameras are determined based on the position orientation information calculated based on the one, of the two pieces of real world image data, in which the predetermined shooting target can be recognized, and the position and the orientation of the other one of the two virtual cameras are determined based on the position and the orientation of the one of the two virtual cameras which have been determined. Therefore, even if the predetermined shooting target can be recognized only in one of the two pieces of real world image data respectively outputted from the two real cameras, a virtual object can be appropriately displayed in a stereoscopic manner. In addition, even if the predetermined shooting target can be recognized in both the two pieces of real world image data respectively outputted from the two real cameras, a virtual object can be appropriately displayed in a stereoscopic manner merely by recognizing the predetermined shooting target in one of the two pieces of real world image data. Thus, a load of processing on the computer can be reduced.

In another preferable configuration, the virtual camera setting means may determine the positions and the orientations of the right virtual camera and the left virtual camera such that the relationship between the relative orientations of the right virtual camera and the left virtual camera with respect to each other is the same as the relationship between designed relative orientations of the real camera for a right eye and the real camera for a left eye with respect to each other.

According to the above configuration, even if the position orientation information calculated based on the piece of real world image data outputted from one of the two real cameras, and the position orientation information calculated based on the piece of real world image data outputted from the other one of the two real cameras do not accurately correspond to the respective relative orientations of the two real cameras because of error in recognition of the predetermined shooting target, error in attachment of the two real cameras, or the like, the relative orientations of the right virtual camera and the left virtual camera can be set appropriately. Therefore, a virtual object can be appropriately displayed in a stereoscopic manner.

In another preferable configuration, the virtual camera setting means may include: a first virtual camera orientation determination section for determining the orientation of one of the right virtual camera and the left virtual camera that corresponds to the one of the real cameras in the first position orientation calculation means, by using the position orientation information calculated by the first position orientation calculation means; and a second camera orientation determination section for, based on the orientation of the one of the right virtual camera and the left virtual camera determined by the first virtual camera orientation determination section, determining the orientation of the other one of the right virtual camera and the left virtual camera such that the relationship between the relative orientations of the right virtual camera and the left virtual camera with respect to each other is the same as the relationship between designed relative orientations of the real camera for a right eye and the real camera for a left eye with respect to each other.

In another preferable configuration, the image display program may further cause the computer to function as virtual camera relative position relationship determination means for determining a relative position relationship between the right virtual camera and the left virtual camera. The virtual camera setting means may include: a first virtual camera position determination section for determining the position of one of the right virtual camera and the left virtual camera that corresponds to the one of the real cameras in the first position orientation calculation means, by using the position orientation information calculated by the first position orientation calculation means; and a second camera position determination section for determining the position of the other one of the right virtual camera and the left virtual camera so as to be separated, by the relative position determined by the virtual camera relative position relationship determination means, from the position of the one of the right virtual camera and the left virtual camera determined by the first virtual camera position determination section.

It is noted that the "relative position relationship" mentioned above may be the distance between the left virtual camera and the right virtual camera, or may be the relative position of one of the virtual cameras with respect to the other one of the virtual cameras.

It is noted that the virtual camera relative position relationship determination means may determine the relative position relationship between the right virtual camera and the left virtual camera, based on a result of recognition of the predetermined shooting target in the two pieces of real world image data respectively outputted from the two real cameras, or may determine the relative position relationship between the right virtual camera and the left virtual camera, based on the designed relative relationship between the real camera for a right eye and the real camera for a left eye.

According to the above configuration, even if the position orientation information calculated based on the piece of real world image data outputted from one of the two real cameras, and the position orientation information calculated based on the piece of real world image data outputted from the other one of the two real cameras do not accurately correspond to the relative position relationship between the two real cameras because of error in recognition of the predetermined shooting target, error in attachment of the two real cameras, or the like, the relative position relationship between the right virtual camera and the left virtual camera can be set appropriately. Therefore, a virtual object can be appropriately displayed in a stereoscopic manner.

In another preferable configuration, the virtual camera setting means may include: a first virtual camera position determination section for determining the position of one of the right virtual camera and the left virtual camera that corresponds to the one of the real cameras in the first position orientation calculation means, by using the position orientation information calculated by the first position orientation calculation means; a first virtual camera orientation determination section for determining the orientation of the one of the right virtual camera and the left virtual camera that corresponds to the one of the real cameras in the first position orientation calculation means, by using the position orientation information calculated by the first position orientation calculation means; and a second virtual camera position determination section for determining the position of the other one of the right virtual camera and the left virtual camera so as to be present, in a direction based on the orientation of the one of the right virtual camera and the left virtual camera determined by the first virtual camera orientation determination section, from the position of the one of the right virtual camera and the left virtual camera determined by the first virtual camera position determination section.

It is noted that the second virtual camera position determination section may determine the position of the other one of the right virtual camera and the left virtual camera so as to be present, in the lateral direction of the orientation of the one of the right virtual camera and the left virtual camera determined by the first virtual camera orientation determination section, from the position of the one of the right virtual camera and the left virtual camera determined by the first virtual camera position determination section.

In another preferable configuration, the image display program may further cause the computer to function as virtual cameras distance determination means for determining the distance between the right virtual camera and the left virtual camera. The second camera position determination section may determine the position of the other one of the right virtual camera and the left virtual camera so as to be separated by the distance determined by the virtual cameras distance determination means, in the direction based on the orientation of the one of the right virtual camera and the left virtual camera determined by the first virtual camera orientation determination section, from the position of the one of the right virtual camera and the left virtual camera determined by the first virtual camera position determination section.

In another preferable configuration, the virtual camera relative position relationship determination means may determine the relative position relationship between the right virtual camera and the left virtual camera, based on a parallax between the pieces of real world image data respectively outputted from the real camera for a right eye and the real camera for a left eye.

According to the above configuration, the relative position relationship between the right virtual camera and the left virtual camera is determined based on the parallax between the two pieces of real world image data. Therefore, even if the relative position relationship between the two real cameras is not known, or even if the relative position relationship between the two real cameras has error because of error in the attachment of the two real camera, the right virtual camera and the left virtual camera can be set appropriately.

In another preferable configuration, the relative position relationship which is determined by the relative position relationship determination means may be the interval between the right virtual camera and the left virtual camera.

In another preferable configuration, the image display program may further cause the computer to function as second position orientation calculation means for recognizing the predetermined shooting target in the piece of real world image data outputted from the other one of the real cameras which is different from the one of the real cameras in the first position orientation calculation means, among the two pieces of real world image data respectively outputted from the two real cameras, and calculating position orientation information indicating relative positions and relative orientations of the other one of the real cameras and the predetermined shooting target with respect to each other. The virtual camera relative position relationship determination means may calculate the distance between the one of the real cameras and the other one of the real cameras, based on the information, about the relative positions of the one of the real cameras and the predetermined shooting target, which is calculated by the first position orientation calculation means, and on the information, about the relative positions of the other one of the real cameras and the predetermined shooting target, which is calculated by the second position orientation calculation means.

In another preferable configuration, the first position orientation calculation means may include first transform matrix generation means for, based on the piece of real world image data outputted from the one of the real cameras, generating a first transform matrix that transforms a coordinate value represented in a coordinate system whose origin is the position of the predetermined shooting target, into a coordinate value represented in a first shooting section coordinate system whose origin is the position of the one of the real cameras. The second position orientation calculation means may include second transform matrix generation means for, based on the piece of real world image data outputted from the other one of the real cameras, generating a second transform matrix that transforms a coordinate value represented in a coordinate system whose origin is the position of the predetermined shooting target, into a coordinate value represented in a second shooting section coordinate system whose origin is the position of the other one of the real cameras.

In another preferable configuration, the virtual camera relative position relationship determination means may execute processing of calculating the relative position relationship between the right virtual camera and the left virtual camera every time a new piece of real world image data is outputted from each of the two real cameras, and may determine the relative position relationship between the right virtual camera and the left virtual camera, based on results of a plurality of the calculations of the relative position relationship obtained by the processing being executed a plurality of times.

According to the above configuration, influence of error in recognition of the predetermined shooting target in each piece of real world image data is reduced. Therefore, reliability of the relative position relationship between the right virtual camera and the left virtual camera determined by the virtual camera relative position relationship determination means is improved.

In another preferable configuration, the virtual camera relative position relationship determination means may determine the relative position relationship between the right virtual camera and the left virtual camera, based on the results of the plurality of calculations of the relative position relationship, only when all the results of the plurality of calculations of the relative position relationship are within a predetermined range.

According to the above configuration, reliability of the relative position relationship between the right virtual camera and the left virtual camera determined by the virtual camera relative position relationship determination means is improved.

In another preferable configuration, the image display program may further cause the computer to function as depth variation determination means for determining whether or not the depth distance from each of the two real cameras to the predetermined shooting target has varied beyond a predetermined range in comparison with the depth distance as it was when the virtual camera relative position relationship determination means determined the relative position relationship between the right virtual camera and the left virtual camera. The virtual camera relative position relationship determination means may determine again the relative position relationship between the right virtual camera and the left virtual camera, when the result of the determination by the depth variation determination means is positive.

The magnitude of influence of error in attachment of the two real cameras varies depending on the depth distance from each of the two real cameras to the predetermined shooting target. According to the above configuration, the influence of error in attachment of the two real cameras can appropriately be corrected as necessary at any time.

In another preferable configuration, the image display program may further cause the computer to function as depth distance calculation means for calculating the depth distance from each of the two real cameras to the predetermined shooting target, based on a piece of real world image data that includes the predetermined shooting target. The depth variation determination means may determine whether or not the depth distance from each of the two real cameras to the predetermined shooting target has varied beyond the predetermined range by comparing a reference depth distance calculated by the depth distance calculation means at a time when the virtual camera relative position relationship determination means determined the relative position relationship between the right virtual camera and the left virtual camera, with the depth distance calculated by the depth distance calculation means after the calculation of the reference depth distance.

In another preferable configuration, the depth distance calculation means may execute processing of calculating the depth distance from each of the two real cameras to the predetermined shooting target every time a new piece of real world image data is outputted from each of the two real cameras, and may calculate the reference depth distance, based on results of a plurality of the calculations of the depth distance obtained by the processing being executed a plurality of times.

According to the above configuration, influence of error in recognition of the predetermined shooting target in each piece of real world image data is reduced. Therefore, reliability of the depth distance from each of the two real cameras to the predetermined shooting target calculated by the depth distance calculation means is improved.

In another preferable configuration, the depth distance calculation means may determine the reference depth distance, based on the results of the plurality of calculations of the depth distance, only when all the results of the plurality of calculations of the depth distance are within a predetermined range.

According to the above configuration, reliability of the depth distance from each of the two real cameras to the predetermined shooting target calculated by the depth distance calculation means is improved.

In another preferable configuration, the image display program may further cause the computer to function as: second position orientation calculation means for recognizing the predetermined shooting target in the piece of real world image data outputted from the other one of the real cameras which is different from the one of the real cameras in the first position orientation calculation means, among the two pieces of real world image data respectively outputted from the two real cameras, and calculating position orientation information indicating relative positions and relative orientations of the other one of the real cameras and the predetermined shooting target with respect to each other; and real camera selection means for selecting one of the two real cameras in accordance with the position of the predetermined shooting target in at least one of the two pieces of real world image data respectively outputted from the two real cameras. The virtual camera setting means may, if the real camera selected by the real camera selection means is the one of the real cameras, determine the position and the orientation of the right virtual camera, and the position and the orientation of the left virtual camera, by using the position orientation information indicating the relative positions and relative orientations of the one of the real cameras and the predetermined shooting target, which is calculated by the first position orientation calculation means, and if the real camera selected by the real camera selection means is the other one of the real cameras, determine the position and the orientation of the right virtual camera, and the position and the orientation of the left virtual camera, by using the position orientation information indicating the relative positions and relative orientations of the other one of the real cameras and the predetermined shooting target, which is calculated by the second position orientation calculation means.

According to the above configuration, even if the predetermined shooting target is out of a shooting area of one of the real cameras, the right virtual camera and the left virtual camera can be set appropriately. Therefore, it is possible to keep stereoscopically displaying a virtual object.

In another preferable configuration, the real camera selection means may switch the real camera for a left eye to the real camera for a right eye, in accordance with entrance of the position of the predetermined shooting target in the piece of real world image data outputted from the real camera for a left eye of the two real cameras into a right end area of the piece of real world image data, and may switch the real camera for a right eye to the real camera for a left eye, in accordance with entrance of the position of the predetermined shooting target in the piece of real world image data outputted from the real camera for a right eye of the two real cameras into a left end area of the piece of real world image data.

In another preferable configuration, the pieces of real world image data to be used by the first position orientation calculation means and the display control means may be outputted in real time from the real cameras.

According to the above configuration, it is possible to make a virtual object on the screen of the stereoscopic display apparatus appear as if the virtual object were present in real time in the real world.

In another preferable configuration, the computer may be included in an information processing apparatus having the two real cameras and the stereoscopic display apparatus.

An image display apparatus according to the first relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye, and causes a computer to function as first position orientation calculation means, virtual camera setting means, right virtual space image generation means, left virtual space image generation means, and display control means. The first position orientation calculation means recognizes a predetermined shooting target in a piece of real world image data outputted from one of the real camera for a right eye and the real camera for a left eye, among pieces of real world image data respectively outputted from the real camera for a right eye and the real camera for a left eye, and calculates position orientation information indicating relative positions and relative orientations of the one of the real cameras and the predetermined shooting target with respect to each other.

The virtual camera setting means determines the position and the orientation of a right virtual camera for generating an image for a right eye, and the position and the orientation of a left virtual camera for generating an image for a left eye, in a predetermined virtual space, by using the position orientation information calculated by the first position orientation calculation means. The right virtual space image generation means generates a right virtual space image indicating the predetermined virtual space as it is looked at from the right virtual camera. The left virtual space image generation means generates a left virtual space image indicating the predetermined virtual space as it is looked at from the left virtual camera. The display control means superimposes the right virtual space image onto the piece of real world image data outputted from the real camera for a right eye, and superimposes the left virtual space image onto the piece of real world image data outputted from the real camera for a left eye, to output images for a stereoscopic view to the stereoscopic display apparatus.

An image display system according to the first relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye, and comprises first position orientation calculation means, virtual camera setting means, right virtual space image generation means, left virtual space image generation means, and display control means. The first position orientation calculation means recognizes a predetermined shooting target in a piece of real world image data outputted from one of the real camera for a right eye and the real camera for a left eye, among pieces of real world image data respectively outputted from the real camera for a right eye and the real camera for a left eye, and calculates position orientation information indicating relative positions and relative orientations of the one of the real cameras and the predetermined shooting target with respect to each other. The virtual camera setting means determines the position and the orientation of a right virtual camera for generating an image for a right eye, and the position and the orientation of a left virtual camera for generating an image for a left eye, in a predetermined virtual space, by using the position orientation information calculated by the first position orientation calculation means. The right virtual space image generation means generates a right virtual space image indicating the predetermined virtual space as it is looked at from the right virtual camera. The left virtual space image generation means generates a left virtual space image indicating the predetermined virtual space as it is looked at from the left virtual camera. The display control means superimposes the right virtual space image onto the piece of real world image data outputted from the real camera for a right eye, and superimposes the left virtual space image onto the piece of real world image data outputted from the real camera for a left eye, to output images for a stereoscopic view to the stereoscopic display apparatus.

An image display method according to the first relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye, and comprises a first position orientation calculation step, a virtual camera setting step, a right virtual space image generation step, a left virtual space image generation step, and a display control step. The first position orientation calculation step recognizes a predetermined shooting target in a piece of real world image data outputted from one of the real camera for a right eye and the real camera for a left eye, among pieces of real world image data respectively outputted from the real camera for a right eye and the real camera for a left eye, and calculates position orientation information indicating relative positions and relative orientations of the one of the real cameras and the predetermined shooting target with respect to each other. The virtual camera setting step determines the position and the orientation of a right virtual camera for generating an image for a right eye, and the position and the orientation of a left virtual camera for generating an image for a left eye, in a predetermined virtual space, by using the position orientation information calculated in the first position orientation calculation step. The right virtual space image generation step generates a right virtual space image indicating the predetermined virtual space as it is looked at from the right virtual camera. The left virtual space image generation step generates a left virtual space image indicating the predetermined virtual space as it is looked at from the left virtual camera. The display control step superimposes the right virtual space image onto the piece of real world image data outputted from the real camera for a right eye, and superimposes the left virtual space image onto the piece of real world image data outputted from the real camera for a left eye, to output images for a stereoscopic view to the stereoscopic display apparatus.

An image display program according to a second relevant embodiment stereoscopically displays a real world image onto which a 3-dimensional virtual object is superimposed, on a screen of a stereoscopic display apparatus capable of providing a stereoscopic view, and causes a computer to function as first real world image obtaining means, second real world image obtaining means, camera relative position relationship calculation means, virtual camera setting means, first virtual space image generation means, second virtual space image generation means, and display control means. The first real world image obtaining means obtains a first real world image shot by a real camera for a left eye. The second real world image obtaining means obtains a second real world image shot by a real camera for a right eye. The camera relative position relationship calculation means calculates a relative position relationship between the real camera for a left eye and the real camera for a right eye, based on a manner in which a predetermined shooting target is visible on the first real world image and a manner in which the predetermined shooting target is visible on the second real world image. The virtual camera setting means determines the position of a left virtual camera for generating an image for a left eye, and the position of a right virtual camera for generating an image for a right eye, in a predetermined virtual space, so as to be separated from each other in accordance with the relative position relationship calculated by the camera relative position relationship calculation means. The first virtual space image generation means generates a first virtual space image indicating the predetermined virtual space as it is looked at from the left virtual camera. The second virtual space image generation means generates a second virtual space image indicating the predetermined virtual space as it is looked at from the right virtual camera. The display control means superimposes the first virtual space image onto the first real world image, and superimposes the second virtual space image onto the second real world image, to output images for a stereoscopic view to the stereoscopic display apparatus.

According to the above configuration, the relative position relationship between the two virtual cameras are calculated by using the real world images shot by the two real cameras, and the positions of the two virtual cameras in the virtual space are determined based on the relative position relationship which has been calculated. Therefore, for example, even if the relative position relationship between the two real cameras is not known, or even if there is error in the attachment of the two real camera, a relative position relationship between the right virtual camera and the left virtual camera can be set appropriately, and a virtual object can appropriately be displayed in a stereoscopic manner.

In another preferable configuration, the image display program may further cause the computer to function as: first position orientation calculation means for calculating at least relative positions of the real camera for a left eye and the predetermined shooting target with respect to each other, based on the position and the orientation of the predetermined shooting target in the first real world image; and second position orientation calculation means for calculating at least relative positions of the real camera for a right eye and the predetermined shooting target with respect to each other, based on the position and the orientation of the predetermined shooting target in the second real world image. The camera relative position relationship calculation means may calculate the relative position relationship between the real camera for a left eye and the real camera for a right eye, based on the relative position of the real camera for a left eye with respect to the predetermined shooting target which is calculated by the first position orientation calculation means, and on the relative position of the real camera for a right eye with respect to the predetermined shooting target which is calculated by the second position orientation calculation means.

In another preferable configuration, at least one of the first position orientation calculation means and the second position orientation calculation means may calculate relative orientations of the corresponding one of the real cameras and the predetermined shooting target with respect to each other, in addition to the relative positions, based on the position and the orientation of the predetermined shooting target in the corresponding piece of real world image. The virtual camera setting means may determine the orientations of the left virtual camera and the right virtual camera, based on the relative orientations of the real cameras and the predetermined shooting target which are calculated by the at least one of the first position orientation calculation means and the second position orientation calculation means.

In another preferable configuration, the relative position relationship which is calculated by the camera relative position relationship calculation means may be the interval between the left virtual camera and the right virtual camera.

In another preferable configuration, the camera relative position relationship calculation means calculates the relative position relationship between the real camera for a left eye and the real camera for a right eye, based on the difference between the relative position of the predetermined shooting target with respect to the real camera for a left eye which is calculated based on the first real world image, and the relative position of the predetermined shooting target with respect to the real camera for a right eye which is calculated based on the second real world image.

In another preferable configuration, the image display program may further cause the computer to function as: first transform matrix calculation means for, based on the first real world image, calculating a first transform matrix that transforms coordinates represented in a coordinate system based on the predetermined shooting target, into coordinates represented in a coordinate system based on the real camera for a left eye; and second transform matrix calculation means for, based on the second real world image, calculating a second transform matrix that transforms coordinates represented in the coordinate system based on the predetermined shooting target, into coordinates represented in a coordinate system based on the real camera for a right eye. The camera relative position relationship calculation means may multiply a 3-dimensional vector indicating an origin by one of the first transform matrix and the first transform matrix, and multiply the resultant vector by the inverse matrix of the other one, to calculate a relative position vector indicating the relative position relationship between the real camera for a left eye and the real camera for a right eye. The virtual camera setting means may set the interval between the left virtual camera and the right virtual camera, based on the magnitude of the relative position vector.

In another preferable configuration, the virtual camera setting means may set the orientations of the left virtual camera and the right virtual camera such that the shooting directions thereof are in parallel with each other.

In another preferable configuration, the image display program may further cause the computer to function as scale relevant processing means for executing, in the virtual space, predetermined processing in accordance with a scale in the real world, based on the relative position relationship calculated by the camera relative position relationship calculation means, and on a designed relative position relationship between the real camera for a left eye and the real camera for a right eye.

According to the above configuration, it is possible to execute processing in accordance with a scale in the real world, in the virtual space.

In another preferable configuration, the image display program may further cause the computer to function as depth variation determination means for determining whether or not the depth distance from the real camera for a left eye or the real camera for a right eye to the predetermined shooting target has varied beyond a predetermined range in comparison with the depth distance as it was when the camera relative position relationship calculation means calculated the relative position relationship between the real camera for a left eye and the real camera for a right eye. The camera relative position relationship calculation means may keep the relative position relationship that was last determined, without calculating again the relative position relationship between the real camera for a left eye and the real camera for a right eye, as long as the result of the determination by the depth variation determination means is negative.

According to the above configuration, the relative position relationship between the real camera for a left eye and the real camera for a right eye does not need to be constantly updated, and as a result, a load of processing can be reduced.

In another preferable configuration, the image display program may further cause the computer to function as depth variation determination means for determining whether or not the depth distance from the real camera for a left eye or the real camera for a right eye to the predetermined shooting target has varied beyond a predetermined range in comparison with the depth distance as it was when the camera relative position relationship calculation means calculated the relative position relationship between the real camera for a left eye and the real camera for a right eye. The camera relative position relationship calculation means may calculate again the relative position relationship between the real camera for a left eye and the real camera for a right eye, when the result of the determination by the depth variation determination means is positive.

According to the above configuration, reliability of the calculated relative position relationship between the real camera for a left eye and the real camera for a right eye can be prevented from being reduced.

In another preferable configuration, the image display program may further cause the computer to function as depth distance calculation means for calculating the depth distance from the real camera for a left eye or the real camera for a right eye to the predetermined shooting target, based on the real world image including the predetermined shooting target. The depth variation determination means may determine whether or not the depth distance from the real camera for a left eye or the real camera for a right eye to the predetermined shooting target has varied beyond the predetermined range by comparing a reference depth distance calculated by the depth distance calculation means at a time when the camera relative position relationship calculation means calculated the relative position relationship between the real camera for a left eye and the real camera for a right eye, with the latest depth distance calculated by the depth distance calculation means after the calculation of the reference depth distance.

In another preferable configuration, the depth distance calculation means may execute processing of calculating the depth distance from the real camera for a left eye or the real camera for a right eye to the predetermined shooting target every time a new real world image is obtained by the first real world image obtaining means or the second real world image obtaining means, and may calculate the reference depth distance, based on results of a plurality of the calculations of the depth distance obtained by the processing being executed a plurality of times.

According to the above configuration, reliability of the calculated reference depth distance is improved.

In another preferable configuration, the depth distance calculation means may determine the reference depth distance, based on the results of the plurality of calculations of the depth distance, only when all the results of the plurality of calculations of the depth distance are within a predetermined range.

According to the above configuration, reliability of the calculated reference depth distance is improved.

An image display apparatus according to a second relevant embodiment stereoscopically displays a real world image onto which a 3-dimensional virtual object is superimposed, on a screen of a stereoscopic display apparatus capable of providing a stereoscopic view, and comprises first real world image obtaining means, second real world image obtaining means, camera relative position relationship calculation means, virtual camera setting means, first virtual space image generation means, second virtual space image generation means, and display control means. The first real world image obtaining means obtains a first real world image shot by a real camera for a left eye. The second real world image obtaining means obtains a second real world image shot by a real camera for a right eye. The camera relative position relationship calculation means calculates a relative position relationship between the real camera for a left eye and the real camera for a right eye, based on a manner in which a predetermined shooting target is visible on the first real world image and a manner in which the predetermined shooting target is visible on the second real world image. The virtual camera setting means determines the position of a left virtual camera for generating an image for a left eye, and the position of a right virtual camera for generating an image for a right eye, in a predetermined virtual space, so as to be separated from each other in accordance with the relative position relationship calculated by the camera relative position relationship calculation means. The first virtual space image generation means generates a first virtual space image indicating the predetermined virtual space as it is looked at from the left virtual camera. The second virtual space image generation means generates a second virtual space image indicating the predetermined virtual space as it is looked at from the right virtual camera. The display control means superimposes the first virtual space image onto the first real world image, and superimposes the second virtual space image onto the second real world image, to output images for a stereoscopic view to the stereoscopic display apparatus.

An image display system according to a second relevant embodiment stereoscopically displays a real world image onto which a 3-dimensional virtual object is superimposed, on a screen of a stereoscopic display apparatus capable of providing a stereoscopic view, and comprises first real world image obtaining means, second real world image obtaining means, camera relative position relationship calculation means, virtual camera setting means, first virtual space image generation means, second virtual space image generation means, and display control means. The first real world image obtaining means obtains a first real world image shot by a real camera for a left eye. The second real world image obtaining means obtains a second real world image shot by a real camera for a right eye. The camera relative position relationship calculation means calculates a relative position relationship between the real camera for a left eye and the real camera for a right eye, based on a manner in which a predetermined shooting target is visible on the first real world image and a manner in which the predetermined shooting target is visible on the second real world image. The virtual camera setting means determines the position of a left virtual camera for generating an image for a left eye, and the position of a right virtual camera for generating an image for a right eye, in a predetermined virtual space, so as to be separated from each other in accordance with the relative position relationship calculated by the camera relative position relationship calculation means. The first virtual space image generation means generates a first virtual space image indicating the predetermined virtual space as it is looked at from the left virtual camera. The second virtual space image generation means generates a second virtual space image indicating the predetermined virtual space as it is looked at from the right virtual camera. The display control means superimposes the first virtual space image onto the first real world image, and superimposes the second virtual space image onto the second real world image, to output images for a stereoscopic view to the stereoscopic display apparatus.

An image display method according to a second relevant embodiment stereoscopically displays a real world image onto which a 3-dimensional virtual object is superimposed, on a screen of a stereoscopic display apparatus capable of providing a stereoscopic view, and comprises a first real world image obtaining step, a second real world image obtaining step, a camera relative position relationship calculation step, a virtual camera setting step, a first virtual space image generation step, a second virtual space image generation step, and a display control step. The first real world image obtaining step obtains a first real world image shot by a real camera for a left eye. The second real world image obtaining step obtains a second real world image shot by a real camera for a right eye. The camera relative position relationship calculation step calculates a relative position relationship between the real camera for a left eye and the real camera for a right eye, based on a manner in which a predetermined shooting target is visible on the first real world image and a manner in which the predetermined shooting target is visible on the second real world image. The virtual camera setting step determines the position of a left virtual camera for generating an image for a left eye, and the position of a right virtual camera for generating an image for a right eye, in a predetermined virtual space, so as to be separated from each other in accordance with the relative position relationship calculated in the camera relative position relationship calculation step. The first virtual space image generation step generates a first virtual space image indicating the predetermined virtual space as it is looked at from the left virtual camera. The second virtual space image generation step generates a second virtual space image indicating the predetermined virtual space as it is looked at from the right virtual camera. The display control step superimposes the first virtual space image onto the first real world image, and superimposes the second virtual space image onto the second real world image, to output images for a stereoscopic view to the stereoscopic display apparatus.

An image display program according to a third relevant embodiment stereoscopically displays a real world image onto which a 3-dimensional virtual object is superimposed, on a screen of a stereoscopic display apparatus capable of providing a stereoscopic view, by using outputs from a real camera imaging section for a right eye and a real camera imaging section for a left eye, and causes a computer to function as: position orientation calculation means for recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera imaging section for a right eye, and superimposing the left virtual space image onto the piece of real world image data outputted from the real camera imaging section for a left eye, to output images for a stereoscopic view to the stereoscopic display apparatus.

In the present relevant embodiment, the virtual camera setting means may determine the positions and the orientations of the right virtual camera and the left virtual camera such that the relationship between relative orientations of the right virtual camera and the left virtual camera with respect to each other is the same as the relationship between designed relative orientations of the real camera for a right eye and the real camera for a left eye with respect to each other.

In the present relevant embodiment, the position orientation integrating means may integrate the information about the relative orientations of the real camera imaging section for a right eye and the predetermined shooting target with respect to each other, and the information about the relative orientations of the real camera imaging section for a left eye and the predetermined shooting target with respect to each other, which are calculated by the position orientation calculation means, thereby calculating one orientation. The virtual camera setting means may use the integrated orientation calculated by the position orientation integrating means, as each of the orientations of the right virtual camera and the left virtual camera.

In the present relevant embodiment, the position orientation integrating means may integrate the information about the relative positions of the real camera imaging section for a right eye and the predetermined shooting target with respect to each other, and the position about the relative positions of the real camera imaging section for a left eye and the predetermined shooting target with respect to each other, which are calculated by the position orientation calculation means, thereby calculating one position. The virtual camera setting means may set the positions of the right virtual camera and the left virtual camera so as to be symmetric about the one position integrated by the position orientation integrating means.

In the present relevant embodiment, the position orientation integrating means may average the information about the relative orientations of the real camera imaging section for a right eye and the predetermined shooting target with respect to each other, and the information about the relative orientations of the real camera imaging section for a left eye and the predetermined shooting target with respect to each other, which are calculated by the position orientation calculation means, thereby calculating an averaged orientation. The virtual camera setting means may use the averaged orientation calculated by the position orientation integrating means, as each of the orientations of the right virtual camera and the left virtual camera.

In the present relevant embodiment, the position orientation integrating means may calculate the midpoint between the relative position of the real camera imaging section for a right eye and the relative position of the real camera imaging section for a left eye, by using the information about the relative positions of the real camera imaging section for a right eye and the predetermined shooting target with respect to each other, and the position about the relative positions of the real camera imaging section for a left eye and the predetermined shooting target with respect to each other, which are calculated by the position orientation calculation means. The virtual camera setting means may set the positions of the right virtual camera and the left virtual camera so as to be symmetric about the midpoint calculated by the position orientation integrating means.

In the present relevant embodiment, the image display program may further cause the computer to function as virtual cameras distance determination means for determining the distance between the right virtual camera and the left virtual camera. The virtual camera setting means may set the positions of the right virtual camera and the left virtual camera so as to be symmetric about the position integrated by the position orientation integrating means, and separated by the distance determined by the virtual cameras distance determination means.

In the present relevant embodiment, the virtual cameras distance determination means may determine the distance between the right virtual camera and the left virtual camera, based on a parallax between the two pieces of real world image data outputted from the real camera for a right eye and the real camera for a left eye.

In the present relevant embodiment, the virtual cameras distance determination means may calculate the distance between the right virtual camera and the left virtual camera, by using the information about the relative positions and relative orientations of the real camera imaging section for a right eye and the predetermined shooting target with respect to each other, and the information about the relative positions and relative orientations of the real camera imaging section for a left eye and the predetermined shooting target with respect to each other, which are calculated by the position orientation calculation means.

An image display apparatus according to a third relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye. The image display apparatus comprises: position orientation calculation means for recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual, space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera for a right eye, and superimposing the left virtual space image onto the piece of real world image data outputted from the real camera for a left eye, to output images for a stereoscopic view to the stereoscopic display apparatus.

An image display system according to a third relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye. The image display system comprises: position orientation calculation means for recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; position orientation integrating means for integrating the two pieces of position orientation information calculated by the position orientation calculation means, thereby calculating one piece of position orientation information; virtual camera setting means for determining the position and the orientation of a right virtual camera for generating a virtual image for a right eye, and the position and the orientation of a left virtual camera for generating a virtual image for a left eye, in a predetermined virtual space, based on the one piece of position orientation information integrated by the first position orientation integrating means; right virtual space image generation means for generating a right virtual space image indicating the predetermined virtual space as it is looked at from the right virtual camera; left virtual space image generation means for generating a left virtual space image indicating the predetermined virtual space as it is looked at from the left virtual camera; and display control means for superimposing the right virtual space image onto the piece of real world image data outputted from the real camera for a right eye, and superimposing the left virtual space image onto the piece of real world image data outputted from the real camera for a left eye, to output images for a stereoscopic view to the stereoscopic display apparatus.

An image display method according to a third relevant embodiment stereoscopically displays a real world image onto which a 3-dimensional virtual object is superimposed, on a screen of a stereoscopic display apparatus capable of providing a stereoscopic view, by using outputs from a real camera for a right eye and a real camera for a left eye. The image display method comprises: a position orientation calculation step of recognizing a predetermined shooting target in each of pieces of real world image data respectively outputted from the two real camera imaging sections, and calculating position orientation information indicating relative positions and relative orientations of each of the two real camera imaging sections, and the predetermined shooting target with respect to each other; a position orientation integrating step of integrating the two pieces of position orientation information calculated in the position orientation calculation step, thereby calculating one piece of position orientation information; a virtual camera setting step of determining the position and the orientation of a right virtual camera for generating a virtual image for a right eye, and the position and the orientation of a left virtual camera for generating a virtual image for a left eye, in a predetermined virtual space, based on the one piece of position orientation information integrated in the first position orientation integrating step; a right virtual space image generation step of generating a right virtual space image indicating the predetermined virtual space as it is looked at from the right virtual camera; a left virtual space image generation step of generating a left virtual space image indicating the predetermined virtual space as it is looked at from the left virtual camera; and a display control step of superimposing the right virtual space image onto the piece of real world image data outputted from the real camera for a right eye, and superimposing the left virtual space image onto the piece of real world image data outputted from the real camera for a left eye, to output images for a stereoscopic view to the stereoscopic display apparatus.

An information processing program according to a first aspect of a fourth relevant embodiment causes a computer of an information processing apparatus, which is connected to an imaging device, an input device, and a display device having a screen on which a user can view a real space, to function as captured image data obtaining means, input data obtaining means, detection means, calculation means, virtual camera setting means, generation means, and display control means. The captured image data obtaining means successively obtains captured image data indicating an image captured by the imaging device. The input data obtaining means successively obtains input data indicating an image inputted by the input device. The detection means detects a specific target from the captured image data successively obtained by the captured image data obtaining means. The calculation means calculates relative positions of the imaging device and the specific target, based on a result of the detection for the specific target. The virtual camera setting means successively sets a virtual camera in a virtual space, based on a result of the calculation by the calculation means. The generation means captures, using the virtual camera, an object in the virtual space, which is indicated by the input data successively inputted by the input data obtaining means, to generate an object image corresponding to the object. The display control means causes the display device to successively display a superimposed image in which the object image generated by the generation means is superimposed on the real space on the screen.

According to the above configuration, a superimposed image in which the object image is superimposed on the real space in the screen is displayed on the display device. In this case, the object image is an input image successively inputted by the user from the input device such as a pointing device, and it is, for example, a hand-drawn image. The object image is composed of object image data generated by capturing an object with the virtual camera. Setting of the virtual camera in the virtual space is successively changed based on a result of detection (recognition) of a specific target such as a marker which is included in the captured image. Therefore, setting of the virtual camera is changed in accordance with a change in the manner in which the marker or the like is visible, due to a change in the imaging direction. Accordingly, display of the object image data of the object captured by the virtual camera is changed in accordance with the change in the imaging direction. As a result, the object image created by the user's hand-drawing or the like is displayed as if it exists in the real world, and thus natural augmented reality is achieved.

Preferably, the input device may be configured by a pointing device. In this case, the input data obtaining means obtains, at a predetermined time interval, input data indicating an object which is configured by a hand-drawn trajectory inputted to the pointing device. The display control means causes the display device to display a superimposed image in which the degree of progress of the hand-drawing in the predetermined time interval is reflected.

According to the above configuration, an object image constituted by a track which is manually inputted to the pointing device is superimposed on a background image, and displayed as if it exists in the real space. At this time, since the input data indicating the object is obtained at a predetermined time interval, if the predetermined time interval is set shorter relative to the user's hand-drawing operation, the partially-drawn object can be displayed. Therefore, the user can complete the object image while checking the displayed partially-drawn object image.

Preferably, the display device includes a first screen area on which the superimposed image is displayed; and a second screen area different from the first screen area. In this case, the display control means causes the display device to display the superimposed image on the first screen area, and causes the display device to display the inputted image on the second screen area.

According to the above configuration, the superimposed image is displayed on the first screen area, and the input image is displayed on the second screen area. Therefore, even when it is difficult for the user to check the input image in the superimposed image displayed on the first screen area, the user can check the input image displayed on the second screen area.

Preferably, the program may cause the computer to function as change means for changing a display manner of the object. In this case, the display control means causes the display device to successively display a superimposed image in which object image data indicating an object whose display manner is changed by the change means is superimposed on the captured image data.

The object, which is superimposed on the real space and displayed as if it exists in the real space, is changed in its display manner (display position and/or display shape) when displayed. Therefore, it is possible to change the display manner so as to cause the user to have a stronger sense of reality, or it is possible to change the display manner so as to cause the user to have a stronger interest.

Preferably, the change means changes a display position of the object in accordance with a predetermined rule.

By changing the position where the object is displayed, it is possible to cause the user to have a stronger sense of reality and/or a stronger interest. As an example of such change, the object may be shaken vertically or horizontally when displayed.

Preferably, the change means changes the display position of the object in accordance with a passage of time.

By changing the position where the object is displayed in accordance with a passage of time, it is possible to cause the user to have a stronger sense of reality and/or a stronger interest. As an example of such change, the object may be moved vertically or horizontally every time a predetermined period has passed (i.e., periodically).

Preferably, the change means changes a display shape of the object.

By changing the display shape of the object, it is possible to cause the user to have a stronger sense of reality and/or a stronger interest. As an example of such change, the object may be increased or decreased in size, or the object may be expanded or contracted laterally or longitudinally. At this time, the shape may be changed periodically.

Preferably, the change means changes the display shape of the object to a display shape in which a shadow of the object is applied to the object.

By applying a shadow of the object to the object, it is possible to cause the user to have a stronger sense of reality and/or a stronger interest.

Preferably, the change means changes a thickness of the object.

By giving a thickness to the object, it is possible to cause the user to have a stronger sense of reality and/or a stronger interest.

Preferably, the change means changes the thickness of the object by arranging a plurality of the objects.

By arranging a plurality of object images as planar images to give a thickness to the object, it is possible to cause the user to have a stronger sense of reality and/or a stronger interest.

An information processing apparatus according to a second aspect of the fourth relevant embodiment comprises: imaging means for capturing an image; input means by which a user inputs an image; display means having a screen on which the user can view a real space; captured image data obtaining means for successively obtaining captured image data indicating the image captured by the imaging means; input data obtaining means for successively obtaining input data indicating an image inputted by the input means; detection means for detecting a specific target from the captured image data successively obtained by the captured image data obtaining means; calculation means for calculating relative positions of the imaging means and the specific target, based on a result of the detection for the specific target; virtual camera setting means for successively setting a virtual camera in a virtual space, based on a result of the calculation by the calculation means; generation means for capturing, using the virtual camera, an object in the virtual space, which is indicated by the input data successively inputted by the input data obtaining means, to generate an object image corresponding to the object; and display control means for causing the display means to successively display a superimposed image in which the object image generated by the generation means is superimposed on the real space on the screen.

An information processing system according to a third aspect of the fourth relevant embodiment comprises: imaging means for capturing an image; input means by which a user inputs an image; display means having a screen on which the user can view a real space; captured image data obtaining means for successively obtaining captured image data indicating the image captured by the imaging means; input data obtaining means for successively obtaining input data indicating an image inputted by the input means; detection means for detecting a specific target from the captured image data successively obtained by the captured image data obtaining means; calculation means for calculating relative positions of the imaging means and the specific target, based on a result of the detection for the specific target; virtual camera setting means for successively setting a virtual camera in a virtual space, based on a result of the calculation by the calculation means; generation means for capturing, using the virtual camera, an object in the virtual space, which is indicated by the input data successively inputted by the input data obtaining means, to generate an object image corresponding to the object; and display control means for causing the display means to successively display a superimposed image in which the object image generated by the generation means is superimposed on the real space on the screen.

An information processing method according to a fourth aspect of the fourth relevant embodiment comprises: an imaging step of capturing an image by imaging means; an input step in which a user inputs an image; a display step in which the user can view a real space on a screen; a captured image data obtaining step of successively obtaining captured image data indicating the image captured in the imaging step; an input data obtaining step of successively obtaining input data indicating an image inputted in the input step; a detection step of detecting a specific target from the captured image data successively obtained in the captured image data obtaining step; a calculation step of calculating relative positions of the imaging means and the specific target, based on a result of the detection for the specific target; a virtual camera setting step of successively setting a virtual camera in a virtual space, based on a result of the calculation in the calculation step; a generation step of capturing, using the virtual camera, an object in the virtual space, which is indicated by the input data successively inputted in the input data obtaining step, to generate an object image corresponding to the object; and a display control step of causing the display step to successively display a superimposed image in which the object image generated in the generation step is superimposed on the real space on the screen.

According to the information processing apparatus of the second aspect of the fourth relevant embodiment, the information processing system of the third aspect, and the information processing method of the fourth aspect, the same functions and effects as those of the information processing program of the first aspect can be achieved.

An example of configuration of a computer-readable storage medium having stored therein an image processing program of a fifth relevant embodiment causes a computer of an image processing apparatus for displaying an image on a display device to function as shot image obtaining means, position and orientation calculation means, sound data obtaining means, sound recognition means, setting means, image generation means, and display control means. The shot image obtaining means repeatedly obtains an image shot by a real camera. The position and orientation calculation means repeatedly calculates position and orientation information determined in accordance with a position and an orientation of the real camera in a real space. The sound data obtaining means obtains sound data representing a sound signal from a sound input device. The sound recognition means recognizes a sound inputted into the sound input device. The setting means sets one of a virtual object and a letter to be additionally displayed on the shot image, as an additional display object, and sets, based on a sound recognition result by the sound recognition means, at least one selected from the group consisting of a display position, an orientation, and a display form of the additional display object. The image generation means repeatedly generates a combined image by superimposing, with reference to a position in the shot image in accordance with the position and orientation information, the additional display object set by the setting means. The display control means causes the display device to repeatedly display the combined image.

According to the above, when an additional display object is additionally displayed on a shot image, it is possible to perform an operation by means of a sound on the additional display object and to perform a highly simple operation by using the new input method onto the virtual object or letter additionally displayed on the real world image.

Further, the position and orientation calculation means may detect one of a certain imaging target and a certain characteristic point included in the shot image and may calculate, based on a result of the detection, information representing a relative position and a relative orientation between the real camera and the one of the imaging target and the characteristic point, as the position and orientation information.

According to the above, by using the imaging target such as a predetermined marker arranged in the real space or a natural characteristic point, it is possible to accurately recognize the position and the orientation of the real camera in the real space.

Further, the position and orientation calculation means may calculate the position and orientation information by using at least one of a geographic position of the real camera and an azimuth of an imaging direction of the real camera in the real space.

According to the above, by using at least one of the geographic position of the real camera obtained by GPS or the like and the azimuth of the imaging direction of the real camera obtained by means of a magnetic sensor of the like, it is possible to accurately recognize the position and the orientation of the real camera in the real space.

Further, the setting means may set the virtual object as the additional display object. Further, the image generation means may include virtual camera setting means, virtual object arrangement means, and virtual world image generation means. The virtual camera setting means sets in a virtual world a position and an orientation of a virtual camera based on the position and orientation information. The virtual object arrangement means arranges the virtual object set by the setting means in the virtual world. The virtual world image generation means generates as a virtual world image an image in the virtual world seen from the virtual camera. In this case, the image generation means may generate as the combined image an image obtained by superimposing the virtual world image on the shot image.

According to the above, the virtual object in the virtual world seen from the virtual camera which has been set based on the position and orientation information determined in accordance with the position and the orientation of the real camera in the real space, is combined as a virtual world image with the shot image. Therefore, it is possible to display an image in which the virtual object is displayed as if it exists in the real world.

Further, the setting means may set, when the sound inputted into the sound input device is recognized as a first sound and the position and orientation information satisfies a first condition, at least one selected from the group consisting of the display position, the orientation, and the display form of the virtual object based on a first action, and may set, when the sound inputted into the sound input device is recognized as the first sound and the position and orientation information does not satisfy the first condition, at least one selected from the group consisting of the display position, the orientation, and the display form of the virtual object based on a second action.

According to the above, even when the same sound is inputted, the action of the virtual object differs depending on the position and the orientation of the real camera in the real space. Therefore, it is further possible to perform an operation with a high interactiveness between the real world and the Augmented Reality.

The position and orientation calculation means may calculate, as the position and orientation information, information representing a relative position and a relative orientation between the imaging target and the real camera. The setting means may set the virtual object as the additional display object. The image generation means may include virtual camera setting means, virtual object arrangement means, and virtual world image generation means. The virtual camera setting means sets in a virtual world a position and a direction corresponding to the imaging target, based on the position and orientation information, and sets in the virtual world a position and an orientation of the virtual camera, with reference to the position and the direction corresponding to the imaging target, based on the position and orientation information. The virtual object arrangement means arranges the virtual object set by the setting means in the virtual world with reference to the position corresponding to the imaging target. The virtual world image generation means generates as a virtual world image an image of the virtual world seen from the virtual camera. The setting means may set, when the sound inputted into the sound input device is recognized as a first sound, at least one selected from the group consisting of the display position, the orientation, and the display form of the virtual object, based on a first action to be performed with reference to the direction corresponding to the imaging target in the virtual world, and may set, when the sound inputted into the sound input device is recognized as a second sound, at least one selected from the group consisting of the display position, the orientation, and the display form of the virtual object, based on a second action to be performed with reference to the direction to the virtual camera in the virtual world. The image generation means may generate as the combined image an image obtained by superimposing the virtual world image on the shot image.

According to the above, when a different kind of sound is inputted, the virtual object may act with reference to the direction of the imaging target such as the predetermined marker arranged in the real space, and the virtual object may act as if it is acting with reference to the direction to the virtual camera, that is, the direction to the real camera in the real space. Therefore, it is further possible to perform an operation with a high interactiveness between the real world and the Augmented Reality and with much interest.

Further, the setting means may set, at one of a case where the sound is not inputted into the sound input device and a case where the sound recognized by the sound recognition means is not a sound that causes the additional display object to be set, at least one selected from the group consisting of the display position, the orientation, and the display form of the additional display object, to a predetermined content.

According to the above, since the display position, the orientation, and the display form of the additional display object may be automatically changed even when the user does not input a sound, it is possible to display an image in which the additional display object is displayed as if it is acting freely.

Further, the image processing program may cause the computer to function as photograph saving means. The photograph saving means saves in storage means a latest combined image currently generated by the image generation means, in accordance with a photographing instruction given by a user.

According to the above, it is possible to save an image which has been photographed in a state where the additional display object is superimposed on the shot image. Accordingly, it is possible to display the state again.

The shot image obtaining means may repeatedly obtain a first image shot by a first real camera and a second image shot by a second real camera which is provided at a position spaced from the first real camera by a predetermined distance. The position and orientation calculation means may repeatedly calculate first position and orientation information determined in accordance with a position and an orientation of the first real camera in the real space and a second position and orientation information determined in accordance with a position and an orientation of the second real camera in the real space. The image generation means may repeatedly generate a first combined image by superimposing, with reference to a position in the first shot image in accordance with the first position and orientation information, the additional display object set by the setting means, and may repeatedly generate a second combined image by superimposing, with reference to a position in the second shot image in accordance with the second position and orientation information, the additional display object set by the setting means. The display control means may output the first combined image and the second combined image to a display device capable of displaying a stereoscopically visible image, and may cause the display device to repeatedly stereoscopically display the combined image including the additional display object.

According to the above, it is possible to additionally display the additional display object on the shot image, which is stereoscopically displayed on the display device capable of displaying an image in a stereoscopically visible manner.

Further, the sound recognition means may determine whether the sound inputted into the sound input device is a first sound at least by verifying the sound inputted into the sound input device against a sound registered in advance as a registered sound, and may determine whether the sound inputted into the sound input device is a second sound based only on the level of the sound waveform of the sound inputted into the sound input device.

According to the above, it is possible to perform an operation by using a sound (words) uttered as speech sound, which has been verified as a sound registered in advance, or to perform an operation by using a clapping sound which is determined as such based on the level of the waveform of the sound.

The sound recognition means may determine whether the sound inputted into the sound input device is a first sound, based on the likelihood of a feature parameter time series registered in advance as a registered sound against a feature parameter time series obtained from the sound input pattern inputted into the sound input device, and may determine whether the sound inputted into the sound input device is a third sound, based only on at least one of the level of the sound waveform and the spectrum information of the sound inputted into the sound input device.

According to the above, it is possible to perform an operation by means of the sound (words) uttered as a speech sound, by performing sound recognition based on the likelihood of the feature parameter time series registered in advance against the feature parameter time series obtained from the sound input pattern of the inputted sound. It is also possible to perform an operation by means of a clapping sound, a whistle sound, a breath sound, or the like, by performing sound recognition based on at least one of the level of the sound waveform and the spectrum information of the inputted sound.

Further, the image processing program may cause the computer to function as sound registration means. The sound registration means allows a user to input a sound corresponding to an instruction to be given to the additional display object, and registers in a storage means sound data corresponding to the sound as the registered sound corresponding to the instruction. In this case, the sound recognition means may determine whether the sound inputted into the sound input device is the first sound by using the sound data registered as the registered sound by the sound registration means.

When the sound recognition means has determined that the sound inputted into the sound input device is the first sound, the setting means may set at least one selected from the group consisting of the display position, the orientation, and the display form of the additional display object, based on the instruction corresponding to the first sound and registered in advance by the sound registration means.

According to the above, the user inputs a sound (words), which is a speech sound corresponding to an instruction, and registers sound data thereof in advance. Accordingly, it is possible to prevent a wrong recognition of the sound, and also possible to register words in advance that the user likes.

The setting means may estimate a subject whose image has been shot in the shot image, based on at least one of the geographic position of the real camera and the azimuth of the imaging direction of the real camera represented by the position and orientation information, and may set a letter which represents information about the subject as the additional display object. The image generation means may repeatedly generate the combined image by superimposing, with reference to a position in the shot image in accordance with the position and orientation information, the letter corresponding to the subject set by the setting means. When a letter which coincides with a word recognized through sound recognition by the sound recognition means is set as the additional display object, the setting means may change a display form into that indicating that the letter has been selected, and may set the letter. The image generation means may generate the combined image by superimposing on the shot image the letter which coincides with the word in the display form updated by the setting means.

According to the above, in a case where an image being shot by the imaging apparatus is being displayed on the display device, when a plurality of pieces of letter information related to the location or the subject (building, signboard, and the like) whose image is being shot by the imaging apparatus are superimposed as additional information to be displayed on the shot image, it is possible to select such letter information by means of a sound. Accordingly, it is possible to provide an input method having a high interactiveness with the Augmented Reality and having a high operability.

Further, the shot image obtaining means may obtain the shot image from the real camera incorporated in a housing which incorporates the image processing apparatus. The sound data obtaining means may obtain the sound data from the sound input device incorporated in the housing. The display control means may cause the display device incorporated in the housing to display the combined image.

According to the above, by incorporating the image processing apparatus, the real camera, the display device, and the sound input device into the same housing, it is possible to realize Augmented Reality in which the user feels as if he or she is looking the real space via the display device, and also to provide the user with an operational feeling as if he or she is giving an instruction by uttering sound into the real space and thus a realistic feeling.

Further, the fifth relevant embodiment may be realized as an image processing apparatus and an image processing system, each including the above means, and an image processing method including the above operation steps performed by the above means.

A sixth relevant embodiment causes a computer to function as: real image obtaining means; virtual camera setting means; left texture area setting means; right texture area setting means; left virtual camera image obtaining means; right virtual camera image obtaining means; and display control means, which computer is included in an information processing apparatus connected to a left real camera and a right real camera for shooting a real space, and to display means capable of displaying a stereoscopic visible image. The real image obtaining means obtains a real image for a left eye shot by the left real camera, and a real image for a right eye shot by the right real camera. The virtual camera setting means sets a left virtual camera and a right virtual camera in a virtual space such that the left virtual camera and the right virtual camera are placed in accordance with a position and an orientation of the left real camera in the real space, and a position and an orientation of the right real camera in the real space. The left texture area setting means sets, as a left texture area, an area in the real image for a left eye that corresponds to a predetermined virtual model in the virtual space when the area is looked at from the left virtual camera set by the virtual camera setting means. The right texture area setting means sets, as a right texture area, an area in the real image for a right eye that corresponds to a predetermined virtual model in the virtual space when the area is looked at from the right virtual camera set by the virtual camera setting means. The left virtual camera image obtaining means applies an image included in the left texture area set by the left texture area setting means, to a drawing model that is the same as the virtual model or has a predetermined relationship with the virtual camera, and obtains a left virtual camera image of the drawing model shot by the left virtual camera. The right virtual camera image obtaining means applies an image included in the right texture area set by the right texture area setting means, to the drawing model, and obtains a right virtual camera image of the drawing model shot by the right virtual camera. The display control means displays the left virtual camera image and the right virtual camera image on the display means such that the left virtual camera image is viewed by the left eye of a user and the right virtual camera image is viewed by the right eye of the user.

The virtual camera setting means may set the left virtual camera, based on relative positions and relative orientations of a predetermined subject present in the real space and the real camera for a left eye with respect to each other. That is, the virtual camera setting means may set the left virtual camera, based on the position and orientation of the real camera for a left eye relative to a predetermined subject present in the real space, or based on the position and orientation of a predetermined subject present in the real space relative to the real camera for a left eye. Alternatively, the virtual camera setting means may set the left virtual camera, based on the absolute position and the absolute orientation of the left real camera detected by means for detecting an absolute position (for example, a GPS), and orientation detection means (for example, an angular velocity sensor, an acceleration sensor, or means for detecting a geomagnetism). In the same manner, the virtual camera setting means may set the right virtual camera, based on relative positions and relative orientations of a predetermined subject present in the real space and the real camera for a right eye with respect to each other, or based on the absolute position and the absolute orientation of the right real camera.

According to the above configuration, it is possible to apply each of the real image for a left eye and the real image for a right eye as textures to the virtual model, and to stereoscopically display the virtual model. Also, it is possible to vary a display manner of the virtual model depending on the obtained real images. In addition, since each of the real image for a left eye and the real image for a right eye is used as textures, it is possible to generate the left virtual camera image and the right virtual camera image without reducing the resolution in comparison with the case where one of the real images is used.

In another configuration of the present relevant embodiment, the left texture area setting means may set, as a left texture area, an area corresponding to the position and the contour of the virtual model in a rendered image obtained by shooting the virtual model by the left virtual camera. The right texture area setting means may set, as a right texture area, an area corresponding to the position and the contour of the virtual model in a rendered image obtained by shooting the virtual model by the right virtual camera.

According to the above configuration, it is possible to set, as a texture area, an area corresponding to the position and the contour of the virtual model in an image obtained by shooting the virtual model by each virtual camera.

In another configuration of the present relevant embodiment, the information processing program may further cause the computer to function as superimposed image generation means for generating a superimposed image for a left eye obtained by superimposing the left virtual camera image onto the real image for a left eye, and a superimposed image for a right eye obtained by superimposing the right virtual camera image onto the real image for a right eye. Then, the display control means displays the superimposed image for a left eye and the superimposed image for a right eye on the display means.

According to the above configuration, it is possible to display a superimposed image including the real image for a left eye, and the left virtual camera image obtained by shooting the virtual model, and a superimposed image including the real image for a right eye, and the right virtual camera image obtained by shooting the virtual model.

In another configuration of the present relevant embodiment, the information processing program may further cause the computer to function as deformation object setting means for generating a deformation object into which the virtual model is deformed, and setting the deformation object in the virtual space. The left virtual camera image obtaining means applies an image included in the left texture area set by the left texture area setting means, to the deformation object, and obtains the left virtual camera image of the deformation object shot by the left virtual camera. The right virtual camera image obtaining means applies an image included in the right texture area set by the right texture area setting means, to the deformation object, and obtains the right virtual camera image of the deformation object shot by the right virtual camera.

According to the above configuration, it is possible to 3-dimensionally vary a shot image of the real space. For example, by deforming a virtual model on a plane, an image including a plane, in the real world, that has been deformed can be displayed.

In another configuration of the present relevant embodiment, the virtual model may have a planar shape or a curved-surface shape, and may be set in the virtual space so as to follow the shape of a plane or a curved surface in the real space. The deformation object setting means generates the deformation object into which the virtual model having a planar shape or a curved-surface shape, and sets the deformation object in the virtual space.

According to the above configuration, it is possible to display a scene in which a plane or a curved surface in the real space varies 3-dimensionally.

In another configuration of the present relevant embodiment, the deformation object setting means may generate the deformation object into which the virtual model is deformed without its end portion being deformed.

According to the above configuration, when the virtual camera image is superimposed onto the real image, the resultant image does not provide a feeling of strangeness at the boundary of the deformation object.

In another configuration of the present relevant embodiment, the information processing program may further cause the computer to function as second object setting means for setting a second object different from the deformation object in the virtual space such that the second object has a predetermined position relationship with the deformation object. The left virtual camera image obtaining means obtains a left virtual camera image including the deformation object and the second object shot by the left virtual camera. The right virtual camera image obtaining means obtains a right virtual camera image of the deformation object and the second object shot by the right virtual camera.

According to the above configuration, the second object is set in the virtual space so as to have a predetermined position relationship with the deformation object, and an image obtained by superimposing an image of the second object in the virtual space onto an image of the real space that has been deformed, is displayed. Therefore, the second object appears to actually exist having the predetermined position relationship with the deformed portion in the real space. For example, it is possible to display a water surface that is heaving as a result of deformation of a plane in the real space, and a fish present in water.

In another configuration of the present relevant embodiment, the second object may be placed so as to be away from the deformation object in the shooting direction of each of the left virtual camera and the right virtual camera. The information processing program may further cause the computer to function as mask object setting means for setting a predetermined mask object for masking the second object, at an end portion of the deformation object.

According to the above configuration, when the virtual camera is set at a position where the second object is not visible via the deformation object (when the second object is shot from an oblique direction), the second object is masked.

In another configuration of the present relevant embodiment, the left real camera and the right real camera may shoot a marker, having a predetermined planar shape, that is placed in the real space. The virtual camera setting means may set the left virtual camera and the right virtual camera in the virtual space such that the left virtual camera and the right virtual camera are placed in accordance with the position and the orientation of the left real camera in the real space relative to the position and the orientation of the marker, and the position and the orientation of the right real camera in the real space relative to the position and the orientation of the marker. The virtual model may be a model, having a planar shape, that is placed on a plane on which the marker is placed, in the marker coordinate system set based on the marker. In addition, the information processing program may further cause the computer to function as deformation object setting means for generating the deformation object into which the virtual model is deformed, and setting the deformation object in the virtual space. The left virtual camera image obtaining means applies, as a texture, an image included in the left texture area set by the left texture area setting means, to the deformation object, and obtains a left virtual camera image of the deformation object shot by the left virtual camera. The right virtual camera image obtaining means applies, as a texture, an image included in the right texture area set by the right texture area setting means, to the deformation object, and obtains a right virtual camera image of the deformation object shot by the right virtual camera.

According to the above configuration, it is possible to stereoscopically display a scene in which a plane in the real space on which the marker is placed varies. As a result, for example, it is possible to display a scene in which the plane in the real world is heaving as a water surface.

In another configuration of the present relevant embodiment, the virtual camera setting means may detect a specific subject included in the real image for a left eye, obtain relative positions and relative orientations of the left real camera and the specific subject present in the real space with respect to each other, based on a result of the detection, and set the left virtual camera, based on the relative positions and the relative orientations. In addition, the virtual camera setting means may detect the specific subject included in the real image for a right eye, obtain relative positions and relative orientations of the right real camera and the specific subject present in the real space with respect to each other, based on a result of the detection, and set the right virtual camera, based on the relative positions and the relative orientations.

According to the above configuration, by shooting the specific subject, it is possible to place the left virtual camera and the right virtual camera such that the positions and the orientations of the left virtual camera and the right virtual camera correspond to the positions and the orientations of the left real camera and the right real camera in the real space, without using another component in addition to the left real camera and the right real camera.

In another configuration of the present relevant embodiment, the virtual model may be placed based on a position, in the virtual space, that corresponds to the position of the specific subject in the real space.

According to the above configuration, since the virtual model is placed at the position of the specific object, if the specific subject is shot, the virtual model can always be shot by the virtual camera.

The present relevant embodiment may be an information processing apparatus that realizes the above means. Alternatively, the present relevant embodiment may be an information processing system including a plurality of components that realize the above means and operate in a coordinated manner. The information processing system may include one apparatus, or may include a plurality of apparatuses.

A hand-held electronic apparatus according to a seventh relevant embodiment includes a stereoscopic display section capable of providing an image that is stereoscopically visible by naked eyes, the stereoscopic display section being provided on a main surface of a housing. Substantially the entirety of the main surface is covered with a screen cover formed in an integrated manner.

When the user views a stereoscopic display in an apparatus including a stereoscopic display section capable of providing an image that is stereoscopically visible by naked eyes, the user's eyes are to be focused on a real object on a main surface of a housing on which the stereoscopic display section is placed. Since images displayed on the stereoscopic display section can have variable stereoscopic effects, the user might not be able to appropriately obtain a stereoscopic view if the eyes are focused on the real object on the main surface of the housing. According to the present relevant embodiment, substantially the entirety of the main surface of the housing on which the stereoscopic display section is placed is covered with the screen cover formed in an integrated manner. Therefore, the real object on the main surface of the housing can be hidden, and the entirety of the main surface can be made flat. As a result, the user can easily obtain a stereoscopic view.

In the present relevant embodiment, a speaker may be provided in the main surface, and the screen cover may have a sound hole formed at a position corresponding to the position of the speaker.

According to the present relevant embodiment, the speaker section can be hidden by the screen cover. In addition, since the speaker section is provided in the main surface in which the stereoscopic display section is present, a sense of unity of image and sound can be obtained.

In the present relevant embodiment, an imaging section may be provided in the main surface such that the imaging section is covered with the screen cover.

According to the present relevant embodiment, a lens cover for the imaging section does not need to be provided.

In the present relevant embodiment, a light emitting section indicating the state of display of the stereoscopic display section may be provided in the main surface such that the light emitting section is covered with the screen cover.

According to the present relevant embodiment, a cover for the light emitting section does not need to be provided.

In the present relevant embodiment, the housing may include a front surface side part and a back surface side part which are fastened by screws. A print in a predetermined color may be applied on the back surface of the screen cover except an area corresponding to the stereoscopic display section, so that the screw fastening portion is covered with the print. The screen cover may be bonded to the main surface of the housing.

In the present relevant embodiment, the housing may include a front surface side part and a back surface side part which are fastened by screws. A print in a predetermined color may be applied to the back surface of the screen cover except an area corresponding to the stereoscopic display section and an area corresponding to the imaging section, so that the screw fastening portion is covered with the print.

According to the present relevant embodiment, it is possible to reduce or eliminate exposure of the screws. As a result, a stereoscopic view can be more easily perceived, and a more aesthetic design and increased safety can be realized.

In the present relevant embodiment, a print in a predetermined color is applied to the back surface of the screen cover so as to include a transparent character or sign at a position corresponding to the light emitting section.

According to the present relevant embodiment, efficiency of printing processing for the light emitting section can be increased.

While the invention has been described in detail, the foregoing description is in all aspects illustrative and not restrictive. It will be understood that numerous other modifications and variations can be devised without departing from the scope of the invention.

What is claimed is:

1. An image display system for superimposing a virtual space image onto a real world image and displaying the resultant composite image, the image display system comprising: an image display apparatus that is of a hand-held type; and a marker to be placed in a real world, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

a detector for automatically detecting a position and an orientation of the marker from a real world image shot by at least one of the first imaging section and the second imaging section;

a determiner for determining and updating positions and orientations of a pair of virtual cameras including a first virtual camera and a second virtual camera in a virtual space, based on the position and the orientation of the marker in the real world image detected by the marker detector, without using coordinates in the real world that indicate the position of the marker;

a first virtual space image generator for generating a first virtual space image by drawing the virtual space, based on the first virtual camera;

a second virtual space image generator for generating a second virtual space image by drawing the virtual space, based on the second virtual camera; and a display controller for displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section, one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand, the image display apparatus further comprising a switch for switching display between stereoscopic display and planar display, the switch being provided at end portions of the inner side surface and a right side surface of the upper housing, and the display controller switching display between the stereoscopic display in which an image is displayed in a stereoscopically visible manner, and the planar display in which an image is displayed in a planar manner, in accordance with a state of the switch.

2. The image display system according to claim 1, wherein a third imaging section is provided on the inner side surface of the upper housing and on a line vertically dividing in half the screen of the stereoscopic display section.

3. The image display system according to claim 1, wherein a pair of speakers are provided in the upper housing, and a pair of speaker holes corresponding to the pair of speakers are provided on the inner side surface of the upper housing such that the screen of the stereoscopic display section is sandwiched between the pair of speaker holes in the left-right direction.

4. The image display system according to claim 1, wherein operation buttons are provided at a right end portion and a left end portion of one, of two side surfaces of the lower housing that are parallel to a long-side direction of the lower housing, that is connected to the upper housing.

5. The image display system according to claim 1, wherein the image display apparatus is a portable game apparatus.

6. An image display apparatus, of a hand-held type, that superimposes a virtual space image onto a real world image and displays the resultant composite image, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

a detection unit for automatically detecting a position and an orientation of the marker from a real world image shot by at least one of the first imaging section and the second imaging section;

a determination unit for determining and updating positions and orientations of a pair of virtual cameras including a first virtual camera and a second virtual camera in a virtual space, based on the position and the orientation of the marker in the real world image detected by the marker detection unit, without using coordinates in the real world that indicate the position of the marker;

a first virtual space image generation unit for generating a first virtual space image by drawing the virtual space, based on the first virtual camera;

a second virtual space image generation unit for generating a second virtual space image by drawing the virtual space, based on the second virtual camera; and a display control unit for displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section, one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand, the image display apparatus further comprising a switch for switching display between stereoscopic display and planar display, the switch being provided at end portions of the inner side surface and a right side surface of the upper housing, and the display control unit switching display between the stereoscopic display in which an image is displayed in a stereoscopically visible manner, and the planar display in which an image is displayed in a planar manner, in accordance with a state of the switch.

7. An image display method for superimposing a virtual space image onto a real world image and displaying the resultant composite image, in an image display system comprising: an image display apparatus that is of a hand-held type; and a marker to be placed in a real world, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand; and a switch for switching display between stereoscopic display and planar display, the switch being provided at end portions of the inner side surface and a right side surface of the upper housing, the image display method comprising:

a detection including detecting a position and an orientation of the marker from a real world image shot by at least one of the first imaging section and the second imaging section;

a determination including determining and updating positions and orientations of a pair of virtual cameras including a first virtual camera and a second virtual camera in a virtual space, based on the position and the orientation of the detected marker in the real world image, without using coordinates in the real world that indicate the position of the marker;

a first virtual space image generation including generating a first virtual space image by drawing the virtual space, based on the first virtual camera;

a second virtual space image generation including generating a second virtual space image by drawing the virtual space, based on the second virtual camera;

a display control including displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section; and a display control including switching display between the stereoscopic display in which an image is displayed in a stereoscopically visible manner, and the planar display in which an image is displayed in a planar manner, in accordance with a state of the switch.

8. An image display system for superimposing a virtual space image onto a real world image and displaying the resultant composite image, the image display system comprising: an image display apparatus that is of a hand-held type; and a marker to be placed in a real world, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

detection means for automatically detecting a position and an orientation of the marker from a real world image shot by at least one of the first imaging section and the second imaging section;

determination means for determining and updating positions and orientations of a pair of virtual cameras including a first virtual camera and a second virtual camera in a virtual space, based on the position and the orientation of the marker in the real world image detected by the marker detection means, without using coordinates in the real world that indicate the position of the marker;

first virtual space image generation means for generating a first virtual space image by drawing the virtual space, based on the first virtual camera;

second virtual space image generation means for generating a second virtual space image by drawing the virtual space, based on the second virtual camera; and display control means for displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section, one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand, the image display apparatus further comprising a switch for switching display between stereoscopic display and planar display, the switch being provided at end portions of the inner side surface and a right side surface of the upper housing, and the display control means switching display between the stereoscopic display in which an image is displayed in a stereoscopically visible manner, and the planar display in which an image is displayed in a planar manner, in accordance with a state of the switch.

9. An image display apparatus, of a hand-held type, that superimposes a virtual space image onto a real world image and displays the resultant composite image, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

detection means for automatically detecting a position and an orientation of the marker from a real world image shot by at least one of the first imaging section and the second imaging section;

determination means for determining and updating positions and orientations of a pair of virtual cameras including a first virtual camera and a second virtual camera in a virtual space, based on the position and the orientation of the marker in the real world image detected by the marker detection means, without using coordinates in the real world that indicate the position of the marker;

first virtual space image generation means for generating a first virtual space image by drawing the virtual space, based on the first virtual camera;

second virtual space image generation means for generating a second virtual space image by drawing the virtual space, based on the second virtual camera; and display control means for displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section, one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand, the image display apparatus further comprising a switch for switching display between stereoscopic display and planar display, the switch being provided at end portions of the inner side surface and a right side surface of the upper housing, and the display control means switching display between the stereoscopic display in which an image is displayed in a stereoscopically visible manner, and the planar display in which an image is displayed in a planar manner, in accordance with a state of the switch.

10. An image display method for superimposing a virtual space image onto a real world image and displaying the resultant composite image, in an image display system comprising: an image display apparatus that is of a hand-held type; and a marker to be placed in a real world, the image display apparatus comprising:

an upper housing and a lower housing which are connected in a foldable manner via connection sections provided at the respective longitudinal sides of the upper housing and the lower housing, and which have rectangular shapes that are longer in the lateral direction than in the height direction;

a planar display section provided on an inner side surface of the lower housing, which is a main surface of the lower housing that faces the upper housing when the upper housing and the lower housing are folded, the planar display section being adjacent to the connection section of the lower housing;

a touch panel provided on a screen of the planar display section;

a stereoscopic display section capable of providing an image that is stereoscopically visible by naked eyes, which stereoscopic display section has a screen whose area is larger than the area of the screen of the planar display section, and which stereoscopic display section does not have a touch panel on the screen thereof, the stereoscopic display section being provided on an inner side surface of the upper housing, which is a main surface of the upper housing that faces the lower housing when the upper housing and the lower housing are folded, the stereoscopic display section being adjacent to the connection section of the upper housing;

a first imaging section and a second imaging section provided on an outer side surface of the upper housing, which is a main surface of the upper housing different from the inner side surface of the upper housing, the first imaging section and the second imaging section being arranged along a long-side direction (hereinafter, left-right direction) of the upper housing so as to be symmetrical with respect to the middle of the screen of the stereoscopic display section, the first imaging section and the second imaging section being integrated with the upper housing;

one or more operation buttons being provided, on the inner side surface of the lower housing, at each of a position that allows a user to operate the one or more operation buttons with the right hand while the user is holding a right end portion of the lower housing with the right hand, and a position that allows a user to operate the one or more operation buttons with the left hand while the user is holding a left end portion of the lower housing with the left hand; and a switch for switching display between stereoscopic display and planar display, the switch being provided at end portions of the inner side surface and a right side surface of the upper housing, the image display method comprising:

a step of detection means of the image display apparatus detecting a position and an orientation of the marker from a real world image shot by at least one of the first imaging section and the second imaging section;

a step of determination means of the image display apparatus determining and updating positions and orientations of a pair of virtual cameras including a first virtual camera and a second virtual camera in a virtual space, based on the position and the orientation of the marker in the real world image detected by the marker detection means, without using coordinates in the real world that indicate the position of the marker;

a step of first virtual space image generation means of the image display apparatus generating a first virtual space image by drawing the virtual space, based on the first virtual camera;

a step of second virtual space image generation means of the image display apparatus generating a second virtual space image by drawing the virtual space, based on the second virtual camera;

a step of display control means of the image display apparatus displaying an image that is stereoscopically visible by naked eyes on the stereoscopic display section, based on a first composite image obtained by superimposing the first virtual space image onto a first real world image shot by the first imaging section, and on a second composite image obtained by superimposing the second virtual space image onto a second real world image shot by the second imaging section; and a step of the display control means switching display between the stereoscopic display in which an image is displayed in a stereoscopically visible manner, and the planar display in which an image is displayed in a planar manner, in accordance with a state of the switch.

* * * * *